US012379827B2

(12) United States Patent
Klimczak et al.

(10) Patent No.: US 12,379,827 B2
(45) Date of Patent: Aug. 5, 2025

(54) USER INTERFACES FOR MANAGING ACCESSORIES

(71) Applicant: Apple Inc., Cupertino, CA (US)

(72) Inventors: Erik R. Klimczak, Mill Valley, CA (US); James F. Felkins, San Jose, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/204,888

(22) Filed: Jun. 1, 2023

(65) Prior Publication Data

US 2023/0393714 A1 Dec. 7, 2023

Related U.S. Application Data

(60) Provisional application No. 63/349,014, filed on Jun. 3, 2022.

(51) Int. Cl.

| | |
|---|---|
| ***G06F 3/0484*** | (2022.01) |
| ***G05B 15/02*** | (2006.01) |
| ***G06F 3/0482*** | (2013.01) |

(52) U.S. Cl.

CPC .......... *G06F 3/0484* (2013.01); *G05B 15/02* (2013.01); *G06F 3/0482* (2013.01)

(58) Field of Classification Search

CPC .. G06F 3/0484; G06F 3/0482; G06F 3/04815; G06F 3/04847; G06F 3/0486; G06F 3/0488; G06F 3/04883; G06F 3/165; G05B 15/02; F24F 11/523; F24F 11/56; H05B 47/1965

See application file for complete search history.

(56) References Cited

U.S. PATENT DOCUMENTS

| | | | |
|---|---|---|---|
| 5,086,385 | A | 2/1992 | Launey et al. |
| 5,974,235 | A | 10/1999 | Nunally et al. |
| 6,140,987 | A | 10/2000 | Stein et al. |
| 6,456,306 | B1 | 9/2002 | Chin et al. |
| 6,483,986 | B1 | 11/2002 | Krapf |
| 6,504,934 | B1 | 1/2003 | Kasai et al. |
| 6,611,297 | B1 | 8/2003 | Akashi et al. |
| 6,901,439 | B1 | 5/2005 | Bonasia et al. |
| 6,912,429 | B1 | 6/2005 | Bilger |
| 6,931,594 | B1 | 8/2005 | Jun |
| 7,043,477 | B2 | 5/2006 | Mercer et al. |

(Continued)

FOREIGN PATENT DOCUMENTS

| | | | |
|---|---|---|---|
| CN | 1641589 | A | 7/2005 |
| CN | 1679019 | A | 10/2005 |

(Continued)

OTHER PUBLICATIONS

Advisory Action received for U.S. Appl. No. 16/404,605, mailed on Apr. 15, 2020, 10 pages.

(Continued)

*Primary Examiner* — Andrey Belousov

(74) *Attorney, Agent, or Firm* — DLA Piper LLP (US)

(57) ABSTRACT

The present disclosure generally relates to managing accessories. In some examples, a device displays a user interface having a plurality of category options and, in response to detecting selection of a category option, a device displays accessory controls and sub-category options.

57 Claims, 75 Drawing Sheets

(56) References Cited

U.S. PATENT DOCUMENTS

| | | | |
|---|---|---|---|
| 7,092,768 | B1 | 8/2006 | Labuda |
| 7,293,280 | B1 | 11/2007 | Gupta et al. |
| 7,360,152 | B2 | 4/2008 | Capps et al. |
| 7,401,351 | B2 | 7/2008 | Boreczky et al. |
| 7,571,014 | B1 | 8/2009 | Lambourne et al. |
| 7,730,223 | B1 | 6/2010 | Bavor et al. |
| 7,859,571 | B1 | 12/2010 | Brown et al. |
| 7,904,814 | B2 | 3/2011 | Errico et al. |
| 8,028,323 | B2 | 9/2011 | Weel |
| 8,031,230 | B2 | 10/2011 | Takada |
| 8,214,494 | B1 | 7/2012 | Slavin |
| 8,234,395 | B2 | 7/2012 | Millington |
| 8,253,704 | B2 | 8/2012 | Jang |
| 8,290,603 | B1 | 10/2012 | Lambourne |
| 8,458,780 | B1 | 6/2013 | Takkallapally et al. |
| 8,462,961 | B1 | 6/2013 | Bywaters et al. |
| 8,516,374 | B2 | 8/2013 | Fleischman et al. |
| 8,745,500 | B1 | 6/2014 | Kostello et al. |
| 8,762,844 | B2 | 6/2014 | Kim et al. |
| 8,914,752 | B1 | 12/2014 | Spiegel |
| 8,954,889 | B2 | 2/2015 | Fujibayashi |
| 8,990,861 | B2 | 3/2015 | Nishikawa et al. |
| 9,021,526 | B1 | 4/2015 | Baron et al. |
| 9,042,556 | B2 | 5/2015 | Kallai et al. |
| 9,080,736 | B1 | 7/2015 | Salzinger et al. |
| 9,082,018 | B1 | 7/2015 | Laska et al. |
| 9,084,003 | B1 | 7/2015 | Sanio et al. |
| 9,112,849 | B1 | 8/2015 | Werkelin Ahlin et al. |
| 9,158,974 | B1 | 10/2015 | Laska et al. |
| 9,170,707 | B1 | 10/2015 | Laska et al. |
| 9,185,062 | B1 | 11/2015 | Yang et al. |
| 9,202,509 | B2 | 12/2015 | Kallai et al. |
| 9,247,363 | B2 | 1/2016 | Triplett et al. |
| 9,247,380 | B1 | 1/2016 | Vincent |
| 9,251,787 | B1 | 2/2016 | Hart et al. |
| 9,313,556 | B1 | 4/2016 | Borel et al. |
| 9,319,782 | B1 | 4/2016 | Crump et al. |
| 9,361,011 | B1 | 6/2016 | Burns et al. |
| 9,361,521 | B1 | 6/2016 | Mclean et al. |
| 9,374,607 | B2 | 6/2016 | Bates et al. |
| 9,413,606 | B1 | 8/2016 | Roberts |
| 9,431,021 | B1 | 8/2016 | Scalise et al. |
| 9,433,032 | B1 | 8/2016 | Ghadge et al. |
| 9,450,812 | B2 | 9/2016 | Lee et al. |
| 9,454,336 | B1 | 9/2016 | Rudradevan et al. |
| 9,519,413 | B2 | 12/2016 | Bates |
| 9,582,178 | B2 | 2/2017 | Grant et al. |
| 9,628,414 | B1 | 4/2017 | Umapathy et al. |
| 9,665,242 | B2 | 5/2017 | Kim et al. |
| 9,680,982 | B2 | 6/2017 | Fiedler |
| 9,727,346 | B2 | 8/2017 | Shao |
| 9,728,230 | B2 | 8/2017 | Cudak et al. |
| 9,750,116 | B2 | 8/2017 | Witzgall |
| 9,759,917 | B2 | 9/2017 | Osterhout et al. |
| 9,774,917 | B1 | 9/2017 | Christie et al. |
| 9,784,417 | B1 | 10/2017 | Springer |
| 9,794,720 | B1 | 10/2017 | Kadri |
| 9,858,739 | B1 | 1/2018 | Johnson et al. |
| 9,898,175 | B2 | 2/2018 | Fiedler |
| 9,898,250 | B1 | 2/2018 | Williams et al. |
| 10,027,775 | B1 * | 7/2018 | Mierau .................. H04L 67/54 |
| 10,055,094 | B2 | 8/2018 | Li et al. |
| 10,068,364 | B2 | 9/2018 | Cui |
| 10,091,017 | B2 | 10/2018 | Landow et al. |
| 10,120,536 | B2 | 11/2018 | Cha et al. |
| 10,142,122 | B1 | 11/2018 | Hill et al. |
| 10,157,040 | B2 | 12/2018 | Ballinger et al. |
| 10,219,026 | B2 | 2/2019 | Eim et al. |
| 10,237,141 | B2 | 3/2019 | Sasaki et al. |
| 10,282,068 | B2 | 5/2019 | Dubin et al. |
| 10,284,980 | B1 | 5/2019 | Woo et al. |
| 10,296,128 | B1 | 5/2019 | Nold et al. |
| 10,298,643 | B1 | 5/2019 | Toal et al. |
| 10,300,394 | B1 | 5/2019 | Evans et al. |
| 10,303,422 | B1 | 5/2019 | Woo et al. |
| 10,310,725 | B2 | 6/2019 | Smith et al. |
| 10,339,769 | B2 | 7/2019 | Mixter et al. |
| 10,409,239 | B2 | 9/2019 | Reeder et al. |
| 10,436,977 | B2 | 10/2019 | Bergman et al. |
| 10,454,781 | B2 | 10/2019 | Sasaki et al. |
| 10,474,349 | B2 | 11/2019 | Jang et al. |
| 10,511,456 | B2 | 12/2019 | Smith et al. |
| 10,523,625 | B1 | 12/2019 | Allen et al. |
| 10,631,123 | B2 | 4/2020 | O'keeffe |
| 10,708,653 | B1 | 7/2020 | Stinson et al. |
| 10,713,699 | B1 | 7/2020 | Lien et al. |
| 10,779,085 | B1 | 9/2020 | Carrigan |
| 10,783,883 | B2 | 9/2020 | Mixter et al. |
| 10,924,446 | B1 | 2/2021 | Paul |
| 10,929,099 | B2 | 2/2021 | Querze et al. |
| 10,963,145 | B1 | 3/2021 | Voss et al. |
| 11,024,303 | B1 | 6/2021 | Devaraj et al. |
| 11,062,156 | B1 | 7/2021 | Vallance et al. |
| 11,079,913 | B1 | 8/2021 | Kim et al. |
| 11,164,580 | B2 | 11/2021 | Kraker |
| 11,176,940 | B1 | 11/2021 | Zhong et al. |
| 11,283,916 | B2 | 3/2022 | Coffman et al. |
| 11,316,709 | B2 | 4/2022 | Brown et al. |
| 11,343,613 | B2 | 5/2022 | Gordon et al. |
| 11,523,166 | B1 | 12/2022 | Tu et al. |
| 12,014,118 | B2 | 6/2024 | Gruber et al. |
| 12,085,421 | B2 | 9/2024 | Yedid et al. |
| 2001/0030597 | A1 | 10/2001 | Inoue et al. |
| 2002/0002039 | A1 | 1/2002 | Qureshey et al. |
| 2002/0012526 | A1 | 1/2002 | Sai et al. |
| 2002/0060701 | A1 | 5/2002 | Naughton et al. |
| 2002/0063737 | A1 | 5/2002 | Feig et al. |
| 2002/0154888 | A1 | 10/2002 | Allen et al. |
| 2002/0168938 | A1 | 11/2002 | Chang |
| 2002/0180774 | A1 | 12/2002 | Errico et al. |
| 2003/0040813 | A1 | 2/2003 | Gonzales et al. |
| 2003/0063130 | A1 | 4/2003 | Barbieri et al. |
| 2003/0093790 | A1 | 5/2003 | Logan et al. |
| 2003/0110511 | A1 | 6/2003 | Schutte et al. |
| 2003/0112938 | A1 | 6/2003 | Kanakubo et al. |
| 2004/0003051 | A1 | 1/2004 | Krzyzanowski et al. |
| 2004/0032955 | A1 | 2/2004 | Hashimoto et al. |
| 2004/0095377 | A1 | 5/2004 | Salandro |
| 2004/0131254 | A1 | 7/2004 | Liang et al. |
| 2004/0239692 | A1 | 12/2004 | Balle et al. |
| 2005/0055472 | A1 | 3/2005 | Krzyzanowski et al. |
| 2005/0094610 | A1 | 5/2005 | De et al. |
| 2005/0144247 | A1 | 6/2005 | Christensen et al. |
| 2005/0163345 | A1 | 7/2005 | Van et al. |
| 2005/0169503 | A1 | 8/2005 | Howell et al. |
| 2005/0275626 | A1 | 12/2005 | Mueller et al. |
| 2006/0002523 | A1 | 1/2006 | Bettis et al. |
| 2006/0013554 | A1 | 1/2006 | Poslinski et al. |
| 2006/0034586 | A1 | 2/2006 | Millar et al. |
| 2006/0132455 | A1 | 6/2006 | Rimas-ribikauskas et al. |
| 2006/0161621 | A1 | 7/2006 | Rosenberg |
| 2006/0171453 | A1 | 8/2006 | Rohlfing et al. |
| 2006/0174035 | A1 | 8/2006 | Tufail |
| 2006/0221184 | A1 | 10/2006 | Vallone et al. |
| 2006/0258289 | A1 | 11/2006 | Dua |
| 2006/0279628 | A1 | 12/2006 | Fleming |
| 2006/0280186 | A1 | 12/2006 | Carlton et al. |
| 2007/0027682 | A1 | 2/2007 | Bennett |
| 2007/0033632 | A1 | 2/2007 | Baynger et al. |
| 2007/0050452 | A1 | 3/2007 | Raju et al. |
| 2007/0061020 | A1 | 3/2007 | Bovee et al. |
| 2007/0064105 | A1 | 3/2007 | Ohshima et al. |
| 2007/0065044 | A1 | 3/2007 | Park et al. |
| 2007/0113294 | A1 | 5/2007 | Field et al. |
| 2007/0162762 | A1 | 7/2007 | Huh et al. |
| 2007/0174774 | A1 | 7/2007 | Lerman et al. |
| 2007/0192486 | A1 | 8/2007 | Wilson et al. |
| 2007/0198111 | A1 | 8/2007 | Oetzel et al. |
| 2007/0216764 | A1 | 9/2007 | Kwak |
| 2007/0241945 | A1 | 10/2007 | Moorer et al. |
| 2008/0034306 | A1 | 2/2008 | Ording et al. |
| 2008/0080743 | A1 | 4/2008 | Schneiderman et al. |
| 2008/0081558 | A1 | 4/2008 | Dunko et al. |
| 2008/0091717 | A1 | 4/2008 | Garbow et al. |

(56) References Cited

U.S. PATENT DOCUMENTS

| | | | |
|---|---|---|---|
| 2008/0122796 | A1 | 5/2008 | Jobs et al. |
| 2008/0165160 | A1 | 7/2008 | Kocienda et al. |
| 2008/0273712 | A1 | 11/2008 | Eichfeld et al. |
| 2008/0273713 | A1 | 11/2008 | Hartung et al. |
| 2008/0285772 | A1 | 11/2008 | Haulick et al. |
| 2009/0055377 | A1 | 2/2009 | Hedge et al. |
| 2009/0133070 | A1 | 5/2009 | Hamano et al. |
| 2009/0153289 | A1 | 6/2009 | Hope et al. |
| 2009/0199119 | A1 | 8/2009 | Park et al. |
| 2009/0220206 | A1 | 9/2009 | Kisliakov |
| 2009/0232028 | A1 | 9/2009 | Baalbergen et al. |
| 2009/0282362 | A1 | 11/2009 | Matsumoto |
| 2009/0299810 | A1 | 12/2009 | Jardine et al. |
| 2009/0304205 | A1 | 12/2009 | Hardacker et al. |
| 2010/0004031 | A1 | 1/2010 | Kim |
| 2010/0070490 | A1 | 3/2010 | Amidon et al. |
| 2010/0081375 | A1 | 4/2010 | Rosenblatt et al. |
| 2010/0106647 | A1 | 4/2010 | Raman |
| 2010/0121636 | A1 | 5/2010 | Burke et al. |
| 2010/0138007 | A1 | 6/2010 | Clark et al. |
| 2010/0138794 | A1 | 6/2010 | Ganey et al. |
| 2010/0145485 | A1 | 6/2010 | Duchene et al. |
| 2010/0191575 | A1 | 7/2010 | Raleigh |
| 2010/0191833 | A1 | 7/2010 | Hofrichter et al. |
| 2010/0201815 | A1 | 8/2010 | Anderson et al. |
| 2010/0267370 | A1 | 10/2010 | Lee |
| 2010/0284389 | A1 | 11/2010 | Ramsay et al. |
| 2010/0293598 | A1 | 11/2010 | Collart et al. |
| 2010/0296678 | A1 | 11/2010 | Kuhn-rahloff et al. |
| 2010/0299639 | A1 | 11/2010 | Ramsay et al. |
| 2010/0318917 | A1 | 12/2010 | Holladay et al. |
| 2010/0318928 | A1 | 12/2010 | Neuman et al. |
| 2010/0318939 | A1 | 12/2010 | Moon |
| 2010/0321201 | A1 | 12/2010 | Huang et al. |
| 2011/0040754 | A1 | 2/2011 | Peto et al. |
| 2011/0040760 | A1 | 2/2011 | Fleischman et al. |
| 2011/0071656 | A1 | 3/2011 | Mckiel, Jr. |
| 2011/0106279 | A1 | 5/2011 | Cho et al. |
| 2011/0145745 | A1 | 6/2011 | Hyeon et al. |
| 2011/0173545 | A1 | 7/2011 | Meola et al. |
| 2011/0228084 | A1 | 9/2011 | Colciago |
| 2011/0249123 | A1 | 10/2011 | Subbian et al. |
| 2011/0249861 | A1 | 10/2011 | Tokutake |
| 2011/0252357 | A1 | 10/2011 | Chaudhri |
| 2011/0254683 | A1 | 10/2011 | Soldan et al. |
| 2011/0291971 | A1 | 12/2011 | Masaki et al. |
| 2012/0004920 | A1 | 1/2012 | Kelly et al. |
| 2012/0054278 | A1 | 3/2012 | Taleb et al. |
| 2012/0066632 | A1 | 3/2012 | Sundermeyer et al. |
| 2012/0070129 | A1 | 3/2012 | Lin et al. |
| 2012/0079507 | A1 | 3/2012 | Agarwal et al. |
| 2012/0098854 | A1 | 4/2012 | Ohnishi |
| 2012/0144416 | A1 | 6/2012 | Wetzer et al. |
| 2012/0169583 | A1 | 7/2012 | Rippel et al. |
| 2012/0173767 | A1 | 7/2012 | Kim et al. |
| 2012/0177339 | A1 | 7/2012 | Chang et al. |
| 2012/0178431 | A1 | 7/2012 | Gold |
| 2012/0210226 | A1 | 8/2012 | Mccoy et al. |
| 2012/0222092 | A1 | 8/2012 | Rabii |
| 2012/0223890 | A1 | 9/2012 | Borovsky et al. |
| 2012/0260169 | A1 | 10/2012 | Schwartz et al. |
| 2012/0266199 | A1 | 10/2012 | Noonan et al. |
| 2012/0269361 | A1 | 10/2012 | Bhow et al. |
| 2012/0274850 | A1 | 11/2012 | Hawkins et al. |
| 2012/0282974 | A1 | 11/2012 | Green et al. |
| 2012/0291068 | A1 | 11/2012 | Khushoo et al. |
| 2012/0294118 | A1 | 11/2012 | Haulick et al. |
| 2012/0311499 | A1 | 12/2012 | Dellinger et al. |
| 2013/0022221 | A1 | 1/2013 | Kallai et al. |
| 2013/0027289 | A1 | 1/2013 | Choi et al. |
| 2013/0047084 | A1 | 2/2013 | Sanders et al. |
| 2013/0051755 | A1 | 2/2013 | Brown et al. |
| 2013/0060352 | A1 | 3/2013 | Kouda et al. |
| 2013/0073584 | A1 | 3/2013 | Kuper et al. |
| 2013/0080516 | A1 | 3/2013 | Bologh |
| 2013/0080955 | A1 | 3/2013 | Reimann et al. |
| 2013/0099672 | A1 | 4/2013 | Lin et al. |
| 2013/0113822 | A1 | 5/2013 | Putrevu et al. |
| 2013/0124207 | A1 | 5/2013 | Sarin et al. |
| 2013/0124997 | A1 | 5/2013 | Speir et al. |
| 2013/0132865 | A1 | 5/2013 | Li |
| 2013/0141223 | A1 | 6/2013 | Brandsma et al. |
| 2013/0141378 | A1 | 6/2013 | Yumiki et al. |
| 2013/0148020 | A1 | 6/2013 | Cook |
| 2013/0159858 | A1 | 6/2013 | Joffray et al. |
| 2013/0173794 | A1 | 7/2013 | Agerbak et al. |
| 2013/0191454 | A1 | 7/2013 | Oliver et al. |
| 2013/0194476 | A1 | 8/2013 | Shimosato |
| 2013/0205375 | A1 | 8/2013 | Woxblom et al. |
| 2013/0225152 | A1 | 8/2013 | Matthews et al. |
| 2013/0227414 | A1 | 8/2013 | Hwang et al. |
| 2013/0246522 | A1 | 9/2013 | Bilinski et al. |
| 2013/0246916 | A1 | 9/2013 | Reimann et al. |
| 2013/0251329 | A1 | 9/2013 | Mccoy et al. |
| 2013/0268593 | A1 | 10/2013 | Parekh |
| 2013/0275881 | A1 | 10/2013 | Hahm et al. |
| 2013/0282180 | A1 | 10/2013 | Layton |
| 2013/0283161 | A1 | 10/2013 | Reimann et al. |
| 2013/0298021 | A1 | 11/2013 | Park et al. |
| 2013/0322634 | A1 | 12/2013 | Bennett et al. |
| 2013/0324081 | A1 | 12/2013 | Gargi et al. |
| 2013/0331083 | A1 | 12/2013 | Oslund |
| 2013/0346859 | A1 | 12/2013 | Bates et al. |
| 2013/0347022 | A1 | 12/2013 | Bates et al. |
| 2014/0013243 | A1 | 1/2014 | Flynn et al. |
| 2014/0025798 | A1 | 1/2014 | Apte et al. |
| 2014/0037107 | A1 | 2/2014 | Marino et al. |
| 2014/0046464 | A1 | 2/2014 | Reimann |
| 2014/0049447 | A1 | 2/2014 | Choi |
| 2014/0053281 | A1 | 2/2014 | Benoit et al. |
| 2014/0068439 | A1 | 3/2014 | Lacaze et al. |
| 2014/0068486 | A1 | 3/2014 | Sellers et al. |
| 2014/0070959 | A1 | 3/2014 | Bhargava et al. |
| 2014/0075321 | A1 | 3/2014 | Masera |
| 2014/0082501 | A1 | 3/2014 | Bae et al. |
| 2014/0092292 | A1 | 4/2014 | Kuznetsov et al. |
| 2014/0114966 | A1 | 4/2014 | Bilinski et al. |
| 2014/0150029 | A1 | 5/2014 | Avedissian et al. |
| 2014/0173082 | A1 | 6/2014 | Shin |
| 2014/0181202 | A1 | 6/2014 | Gossain |
| 2014/0181654 | A1 | 6/2014 | Kumar et al. |
| 2014/0181658 | A1 | 6/2014 | Kumar et al. |
| 2014/0207707 | A1 | 7/2014 | Na et al. |
| 2014/0215365 | A1 | 7/2014 | Hiraga et al. |
| 2014/0215564 | A1 | 7/2014 | Banatwala et al. |
| 2014/0218517 | A1 | 8/2014 | Kim et al. |
| 2014/0232273 | A1 | 8/2014 | Sasaki et al. |
| 2014/0236325 | A1 | 8/2014 | Sasaki et al. |
| 2014/0237361 | A1 | 8/2014 | Martin et al. |
| 2014/0237419 | A1 | 8/2014 | Ryu |
| 2014/0257532 | A1 | 9/2014 | Kim et al. |
| 2014/0258854 | A1 | 9/2014 | Li |
| 2014/0267068 | A1 | 9/2014 | Smith et al. |
| 2014/0267549 | A1 | 9/2014 | Pinter et al. |
| 2014/0267911 | A1 | 9/2014 | Grant et al. |
| 2014/0270183 | A1 | 9/2014 | Luna |
| 2014/0285017 | A1 | 9/2014 | Noguchi et al. |
| 2014/0293046 | A1 | 10/2014 | Ni |
| 2014/0313032 | A1 | 10/2014 | Sager et al. |
| 2014/0335789 | A1 | 11/2014 | Cohen et al. |
| 2014/0359524 | A1 | 12/2014 | Sasaki et al. |
| 2014/0362293 | A1 | 12/2014 | Bakar et al. |
| 2014/0363024 | A1 | 12/2014 | Apodaca |
| 2014/0364056 | A1 | 12/2014 | Belk et al. |
| 2014/0365980 | A1 | 12/2014 | Morrison et al. |
| 2014/0375819 | A1 | 12/2014 | Larsen et al. |
| 2014/0380234 | A1* | 12/2014 | Shim .................. G06F 3/04842 715/781 |
| 2015/0008845 | A1 | 1/2015 | Kim et al. |
| 2015/0010167 | A1 | 1/2015 | Arling et al. |
| 2015/0032812 | A1 | 1/2015 | Dudley |
| 2015/0040012 | A1 | 2/2015 | Faaborg et al. |
| 2015/0042576 | A1 | 2/2015 | Wang |
| 2015/0052222 | A1 | 2/2015 | Farrell et al. |

(56) References Cited

U.S. PATENT DOCUMENTS

2015/0058780 A1 2/2015 Malik et al.
2015/0067803 A1 3/2015 Alduaiji
2015/0071601 A1 3/2015 Dabous et al.
2015/0081072 A1 3/2015 Kallai et al.
2015/0082225 A1 3/2015 Shearer
2015/0092009 A1 4/2015 Deluca et al.
2015/0095804 A1 4/2015 Grossman et al.
2015/0095937 A1 4/2015 Tobin
2015/0100623 A1 4/2015 Gudell et al.
2015/0106721 A1 4/2015 Cha et al.
2015/0113418 A1 4/2015 Sasaki et al.
2015/0120768 A1 4/2015 Wellen et al.
2015/0135068 A1 5/2015 Chiu
2015/0138101 A1 5/2015 Park et al.
2015/0142587 A1 5/2015 Salgar et al.
2015/0145435 A1 5/2015 Ogawa
2015/0146945 A1 5/2015 Han
2015/0147067 A1 5/2015 Ryan et al.
2015/0149599 A1 5/2015 Caunter et al.
2015/0159895 A1 6/2015 Quam et al.
2015/0160797 A1 6/2015 Shearer et al.
2015/0177914 A1 6/2015 Coyner et al.
2015/0180922 A1 6/2015 Draznin et al.
2015/0181169 A1 6/2015 Kim et al.
2015/0188724 A1 7/2015 Kim et al.
2015/0193127 A1* 7/2015 Chai .................... G06F 3/0482
715/719
2015/0193196 A1 7/2015 Lin et al.
2015/0198938 A1 7/2015 Steele et al.
2015/0201480 A1 7/2015 Ogawa
2015/0205971 A1 7/2015 Sanio et al.
2015/0206529 A1 7/2015 Kwon et al.
2015/0207849 A1 7/2015 Bingzhou et al.
2015/0212705 A1 7/2015 Sasaki et al.
2015/0215382 A1 7/2015 Arora et al.
2015/0222615 A1 8/2015 Allain et al.
2015/0222680 A1 8/2015 Grover
2015/0223005 A1 8/2015 Hardman et al.
2015/0229650 A1 8/2015 Grigg et al.
2015/0242073 A1 8/2015 Munoz et al.
2015/0242597 A1 8/2015 Danciu
2015/0242611 A1 8/2015 Cotterill
2015/0243163 A1 8/2015 Shoemake
2015/0244539 A1 8/2015 Ickman et al.
2015/0248268 A1 9/2015 Kumar et al.
2015/0253960 A1 9/2015 Lin et al.
2015/0256957 A1 9/2015 Kim et al.
2015/0261493 A1 9/2015 Lemmon et al.
2015/0264304 A1 9/2015 Chastney et al.
2015/0309768 A1 10/2015 Van Der Heide
2015/0312299 A1 10/2015 Chen
2015/0319006 A1 11/2015 Plummer et al.
2015/0319046 A1 11/2015 Plummer et al.
2015/0324552 A1 11/2015 Beckhardt
2015/0332586 A1 11/2015 Hamm et al.
2015/0341227 A1 11/2015 Tatzel et al.
2015/0348493 A1 12/2015 Chae et al.
2015/0350031 A1 12/2015 Burks et al.
2015/0355818 A1 12/2015 Corbin
2015/0355879 A1 12/2015 Beckhardt et al.
2015/0356278 A1 12/2015 Britt et al.
2015/0358304 A1 12/2015 Beckhardt et al.
2015/0370230 A1 12/2015 Duchene et al.
2015/0370426 A1 12/2015 Carrigan et al.
2015/0373178 A1 12/2015 Felt et al.
2015/0378522 A1 12/2015 Butts
2016/0004499 A1 1/2016 Kim et al.
2016/0005280 A1 1/2016 Laska et al.
2016/0005281 A1 1/2016 Laska et al.
2016/0011850 A1 1/2016 Sheen et al.
2016/0021603 A1 1/2016 Mueck et al.
2016/0026429 A1 1/2016 Triplett
2016/0033985 A1 2/2016 Gulli' et al.
2016/0037140 A1 2/2016 Lindsey et al.
2016/0037436 A1 2/2016 Spencer et al.
2016/0043905 A1 2/2016 Fiedler
2016/0043962 A1 2/2016 Kim et al.
2016/0050476 A1 2/2016 Patil
2016/0062567 A1 3/2016 Yang et al.
2016/0070244 A1 3/2016 Cipollo et al.
2016/0073138 A1 3/2016 Francisco et al.
2016/0073197 A1 3/2016 Hammer et al.
2016/0073439 A1 3/2016 Palin et al.
2016/0073482 A1 3/2016 Fok et al.
2016/0077795 A1 3/2016 Cha et al.
2016/0085412 A1 3/2016 Meganathan et al.
2016/0088039 A1 3/2016 Millington et al.
2016/0088438 A1 3/2016 Okeeffe
2016/0092072 A1 3/2016 So et al.
2016/0093180 A1 3/2016 Fitzgibbon et al.
2016/0093338 A1 3/2016 Laska et al.
2016/0099901 A1 4/2016 Allen et al.
2016/0103830 A1 4/2016 Cheong et al.
2016/0117402 A1 4/2016 Gowel
2016/0120009 A1 4/2016 Aliakseyeu et al.
2016/0127799 A1 5/2016 Alsina et al.
2016/0133297 A1 5/2016 Thornton et al.
2016/0134942 A1 5/2016 Lo
2016/0139752 A1 5/2016 Shim et al.
2016/0150135 A1 5/2016 Chen
2016/0150624 A1 5/2016 Meerbeek et al.
2016/0155443 A1 6/2016 Khan et al.
2016/0156687 A1 6/2016 Leung
2016/0162252 A1 6/2016 Di Censo et al.
2016/0165390 A1 6/2016 Hartzell et al.
2016/0173318 A1 6/2016 Ha et al.
2016/0179068 A1 6/2016 Qian et al.
2016/0187995 A1 6/2016 Rosewall
2016/0191992 A1 6/2016 Kwon
2016/0196106 A1 7/2016 Hammer et al.
2016/0210983 A1 7/2016 Amada et al.
2016/0216879 A1 7/2016 Park et al.
2016/0224233 A1 8/2016 Phang et al.
2016/0231902 A1 8/2016 Sirpal et al.
2016/0239167 A1 8/2016 Reimann et al.
2016/0246566 A1 8/2016 Fullerton et al.
2016/0253145 A1 9/2016 Lee et al.
2016/0255706 A1 9/2016 Kim et al.
2016/0259459 A1 9/2016 Yang et al.
2016/0267081 A1 9/2016 Keene
2016/0277903 A1 9/2016 Poosala et al.
2016/0286630 A1 9/2016 Witzgall
2016/0291824 A1 10/2016 Grossman et al.
2016/0291924 A1 10/2016 Bierbower et al.
2016/0295340 A1 10/2016 Baker et al.
2016/0299669 A1 10/2016 Bates
2016/0299736 A1 10/2016 Bates et al.
2016/0301566 A1 10/2016 Ramasubramani et al.
2016/0320849 A1 11/2016 Koo
2016/0335041 A1 11/2016 Wachter et al.
2016/0336531 A1 11/2016 Yokoyama
2016/0342386 A1 11/2016 Kallai et al.
2016/0345039 A1 11/2016 Billmeyer
2016/0351191 A1 12/2016 Vilermo et al.
2016/0364114 A1 12/2016 Von Dehsen et al.
2016/0364123 A1 12/2016 Burns et al.
2016/0364129 A1 12/2016 Mclean et al.
2016/0365986 A1 12/2016 Song et al.
2016/0366481 A1 12/2016 Lim et al.
2016/0366531 A1 12/2016 Popova
2016/0372113 A1 12/2016 David et al.
2016/0381476 A1 12/2016 Gossain et al.
2017/0003931 A1 1/2017 Dvortsov et al.
2017/0017531 A1 1/2017 Choi et al.
2017/0025124 A1 1/2017 Mixter et al.
2017/0026686 A1 1/2017 Glazier et al.
2017/0031552 A1 2/2017 Lin
2017/0040039 A1 2/2017 Snibbe et al.
2017/0041727 A1 2/2017 Reimann
2017/0046025 A1 2/2017 Dascola et al.
2017/0053008 A1 2/2017 Frenkel et al.
2017/0068402 A1 3/2017 Lochhead et al.
2017/0070346 A1 3/2017 Lombardi et al.
2017/0070775 A1 3/2017 Taxier et al.

(56) References Cited

U.S. PATENT DOCUMENTS

2017/0078294 A1 3/2017 Medvinsky
2017/0078767 A1 3/2017 Borel et al.
2017/0083285 A1 3/2017 Meyers et al.
2017/0083494 A1 3/2017 Kim et al.
2017/0084132 A1 3/2017 Scalisi
2017/0084135 A1 3/2017 Yu
2017/0091551 A1 3/2017 Zhang et al.
2017/0092270 A1 3/2017 Newendorp et al.
2017/0097621 A1 4/2017 Ackmann et al.
2017/0099270 A1 4/2017 Anson
2017/0127145 A1 5/2017 Rajapakse
2017/0142087 A1 5/2017 Maninder et al.
2017/0176035 A1 6/2017 Reeder et al.
2017/0185277 A1 6/2017 Sundermeyer et al.
2017/0195130 A1 7/2017 Landow et al.
2017/0206779 A1 7/2017 Lee et al.
2017/0223429 A1 8/2017 Schreiner et al.
2017/0230705 A1 8/2017 Pardue et al.
2017/0235545 A1 8/2017 Millington et al.
2017/0242653 A1 8/2017 Lang et al.
2017/0251314 A1 8/2017 Pye et al.
2017/0285788 A1 10/2017 Park et al.
2017/0302779 A1 10/2017 Zhao et al.
2017/0311368 A1 10/2017 Kandur-Raja et al.
2017/0315715 A1 11/2017 Fujita et al.
2017/0318322 A1 11/2017 Lamb et al.
2017/0337791 A1 11/2017 Gordon-carroll
2017/0345420 A1 11/2017 Barnett, Jr.
2017/0352380 A1 12/2017 Doumbouya et al.
2017/0357425 A1 12/2017 Smith et al.
2017/0357434 A1 12/2017 Coffman et al.
2017/0359189 A1 12/2017 Smith et al.
2017/0359191 A1 12/2017 Smith et al.
2017/0359311 A1 12/2017 Chen
2017/0359555 A1 12/2017 Irani et al.
2018/0014043 A1 1/2018 Zhang et al.
2018/0014077 A1 1/2018 Hou et al.
2018/0018081 A1 1/2018 Dattilo-green et al.
2018/0019889 A1 1/2018 Burns et al.
2018/0020530 A1 1/2018 Scordato et al.
2018/0039916 A1 2/2018 Ravindra
2018/0040324 A1 2/2018 Wilberding
2018/0070187 A1 3/2018 Drinkwater et al.
2018/0088795 A1 3/2018 Van Os et al.
2018/0091381 A1 3/2018 Mclaughlin et al.
2018/0096064 A1 4/2018 Lennon et al.
2018/0101297 A1 4/2018 Yang et al.
2018/0109754 A1 4/2018 Kwon
2018/0113577 A1 4/2018 Burns et al.
2018/0115788 A1 4/2018 Burns et al.
2018/0122378 A1 5/2018 Mixter et al.
2018/0139292 A1 5/2018 Koren et al.
2018/0190279 A1 7/2018 Anderson et al.
2018/0199080 A1 7/2018 Jackson et al.
2018/0213396 A1 7/2018 Segal et al.
2018/0227341 A1 8/2018 Rizzi
2018/0228003 A1 8/2018 O'driscoll et al.
2018/0228006 A1 8/2018 Baker et al.
2018/0232592 A1 8/2018 Stewart et al.
2018/0232705 A1 8/2018 Baker et al.
2018/0246639 A1 8/2018 Han et al.
2018/0249113 A1 8/2018 Faulkner
2018/0267774 A1 9/2018 Williams et al.
2018/0286395 A1 10/2018 Li et al.
2018/0288104 A1 10/2018 Padilla et al.
2018/0308480 A1 10/2018 Jang et al.
2018/0310042 A1 10/2018 Mayalil et al.
2018/0332559 A1 11/2018 Gudivada et al.
2018/0335903 A1 11/2018 Coffman et al.
2018/0337924 A1 11/2018 Graham et al.
2018/0338038 A1 11/2018 Ly et al.
2018/0341448 A1 11/2018 Behzadi et al.
2018/0349707 A1 12/2018 Bataller et al.
2018/0349736 A1 12/2018 Bapat et al.
2018/0364665 A1* 12/2018 Clymer ................. H05B 45/10
2018/0367578 A1 12/2018 Verma et al.
2019/0012069 A1 1/2019 Bates
2019/0012073 A1 1/2019 Hwang
2019/0025943 A1 1/2019 Jobs et al.
2019/0026021 A1 1/2019 Coffman et al.
2019/0028419 A1 1/2019 Sullivan
2019/0056907 A1 2/2019 So et al.
2019/0058777 A1 2/2019 Chen
2019/0075105 A1 3/2019 Rajakumar
2019/0089934 A1 3/2019 Goulden et al.
2019/0090014 A1 3/2019 Shoop
2019/0102145 A1 4/2019 Wilberding et al.
2019/0124745 A1 4/2019 Mason et al.
2019/0130185 A1 5/2019 Delaney et al.
2019/0138951 A1 5/2019 Brownhill et al.
2019/0208282 A1 7/2019 Singh et al.
2019/0265946 A1 8/2019 Bae et al.
2019/0266800 A1 8/2019 Khalid et al.
2019/0273664 A1 9/2019 Fujita et al.
2019/0279634 A1 9/2019 Tak et al.
2019/0286651 A1 9/2019 Lee et al.
2019/0294406 A1 9/2019 Bierbower et al.
2019/0294889 A1 9/2019 Sriram et al.
2019/0295393 A1 9/2019 Lee et al.
2019/0325229 A1 10/2019 Koyama et al.
2019/0332400 A1 10/2019 Spoor et al.
2019/0339769 A1 11/2019 Cox et al.
2019/0342621 A1 11/2019 Carrigan et al.
2019/0342622 A1 11/2019 Carrigan et al.
2019/0354252 A1 11/2019 Badr
2019/0361575 A1 11/2019 Ni et al.
2020/0042775 A1 2/2020 Lim
2020/0050502 A1 2/2020 Ghafourifar et al.
2020/0104018 A1 4/2020 Coffman et al.
2020/0110443 A1 4/2020 Leong et al.
2020/0120378 A1 4/2020 Elliot
2020/0127988 A1 4/2020 Bradley et al.
2020/0135191 A1 4/2020 Nourbakhsh
2020/0142667 A1 5/2020 Querze et al.
2020/0152186 A1 5/2020 Koh et al.
2020/0186378 A1 6/2020 Six et al.
2020/0201491 A1 6/2020 Coffman et al.
2020/0201495 A1 6/2020 Coffman et al.
2020/0220914 A1 7/2020 Carrigan et al.
2020/0225817 A1 7/2020 Coffman et al.
2020/0225841 A1 7/2020 Coffman et al.
2020/0301575 A1 9/2020 Lindholm et al.
2020/0302913 A1 9/2020 Marcinkiewicz
2020/0312318 A1 10/2020 Olson et al.
2020/0335187 A1 10/2020 Lefkofsky et al.
2020/0382332 A1 12/2020 Carrigan et al.
2020/0382559 A1 12/2020 Kramar et al.
2020/0395012 A1 12/2020 Kim et al.
2020/0413197 A1 12/2020 Carrigan et al.
2021/0011588 A1 1/2021 Coffman et al.
2021/0014610 A1 1/2021 Carrigan et al.
2021/0043189 A1 2/2021 Pyun
2021/0064317 A1 3/2021 Juenger et al.
2021/0065134 A1 3/2021 Chhabra et al.
2021/0092491 A1 3/2021 Carrigan et al.
2021/0099829 A1 4/2021 Soto et al.
2021/0144422 A1 5/2021 Wagner et al.
2021/0152685 A1* 5/2021 Li ......................... G06F 3/0484
2021/0158830 A1 5/2021 Boehlke
2021/0243084 A1 8/2021 Lou et al.
2021/0266274 A1 8/2021 Liu et al.
2021/0321197 A1 10/2021 Annamraju
2021/0323406 A1 10/2021 So et al.
2021/0349680 A1 11/2021 Kim et al.
2021/0352172 A1 11/2021 Kim et al.
2021/0383130 A1 12/2021 Deets et al.
2021/0385417 A1 12/2021 Park et al.
2021/0392223 A1 12/2021 Coffman et al.
2022/0004356 A1 1/2022 Kim et al.
2022/0078506 A1 3/2022 Sanders et al.
2022/0180862 A1 6/2022 Sharifi et al.
2022/0279022 A1 9/2022 Kramar et al.
2022/0279063 A1 9/2022 Coffman et al.
2022/0286549 A1 9/2022 Coffman et al.

(56) References Cited

U.S. PATENT DOCUMENTS

| | | | |
|---|---|---|---|
| 2022/0303383 | A1 | 9/2022 | Coffman et al. |
| 2022/0365667 | A1 | 11/2022 | Carrigan et al. |
| 2023/0041125 | A1 | 2/2023 | Kim et al. |
| 2023/0057851 | A1 | 2/2023 | Ansari et al. |
| 2023/0073844 | A1 | 3/2023 | Coffman et al. |
| 2023/0082492 | A1 | 3/2023 | Coffman et al. |
| 2023/0084551 | A1 | 3/2023 | Coffman et al. |
| 2023/0104819 | A1 | 4/2023 | Coffman et al. |
| 2023/0106600 | A1 | 4/2023 | Coffman et al. |
| 2023/0106761 | A1 | 4/2023 | Coffman et al. |
| 2023/0209016 | A1 | 6/2023 | Park et al. |
| 2023/0266866 | A1 | 8/2023 | Bates et al. |
| 2023/0403509 | A1 | 12/2023 | Carrigan et al. |
| 2024/0040198 | A1 | 2/2024 | Carrigan et al. |
| 2024/0069711 | A1 | 2/2024 | Carrigan et al. |
| 2024/0077991 | A1 | 3/2024 | Von Hagen |
| 2024/0220095 | A1 | 7/2024 | Ye et al. |
| 2024/0259638 | A1 | 8/2024 | Carrigan et al. |
| 2024/0406632 | A1 | 12/2024 | Carrigan et al. |

FOREIGN PATENT DOCUMENTS

| | | | |
|---|---|---|---|
| CN | 1863281 | A | 11/2006 |
| CN | 101517557 | A | 8/2009 |
| CN | 101627361 | A | 1/2010 |
| CN | 101989072 | A | 3/2011 |
| CN | 102063253 | A | 5/2011 |
| CN | 102202192 | A | 9/2011 |
| CN | 102281294 | A | 12/2011 |
| CN | 102301323 | A | 12/2011 |
| CN | 102740146 | A | 10/2012 |
| CN | 102915630 | A | 2/2013 |
| CN | 102932216 | A | 2/2013 |
| CN | 103136497 | A | 6/2013 |
| CN | 103260079 | A | 8/2013 |
| CN | 103347116 | A | 10/2013 |
| CN | 103593154 | A | 2/2014 |
| CN | 103677711 | A | 3/2014 |
| CN | 103970814 | A | 8/2014 |
| CN | 104076757 | A | 10/2014 |
| CN | 104106036 | A | 10/2014 |
| CN | 104155938 | A | 11/2014 |
| CN | 104247449 | A | 12/2014 |
| CN | 104284477 | A | 1/2015 |
| CN | 104298188 | A | 1/2015 |
| CN | 204155434 | U | 2/2015 |
| CN | 104429094 | A | 3/2015 |
| CN | 104469512 | A | 3/2015 |
| CN | 104581043 | A | 4/2015 |
| CN | 104618672 | A | 5/2015 |
| CN | 104684207 | A | 6/2015 |
| CN | 104766021 | A | 7/2015 |
| CN | 104780654 | A | 7/2015 |
| CN | 104820631 | A | 8/2015 |
| CN | 104898603 | A | 9/2015 |
| CN | 104956276 | A | 9/2015 |
| CN | 104956417 | A | 9/2015 |
| CN | 105069118 | A | 11/2015 |
| CN | 105159107 | A | 12/2015 |
| CN | 105204742 | A | 12/2015 |
| CN | 105263114 | A | 1/2016 |
| CN | 105283840 | A | 1/2016 |
| CN | 105359199 | A | 2/2016 |
| CN | 105373165 | A | 3/2016 |
| CN | 105374192 | A | 3/2016 |
| CN | 105388773 | A | 3/2016 |
| CN | 105474580 | A | 4/2016 |
| CN | 105531671 | A | 4/2016 |
| CN | 105549947 | A | 5/2016 |
| CN | 105553796 | A | 5/2016 |
| CN | 105554516 | A | 5/2016 |
| CN | 105745863 | A | 7/2016 |
| CN | 105794231 | A | 7/2016 |
| CN | 105847746 | A | 8/2016 |
| CN | 105900376 | A | 8/2016 |
| CN | 105940678 | A | 9/2016 |
| CN | 106030700 | A | 10/2016 |
| CN | 106062810 | A | 10/2016 |
| CN | 106134209 | A | 11/2016 |
| CN | 106383645 | A | 2/2017 |
| CN | 106537991 | A | 3/2017 |
| CN | 106572326 | A | 4/2017 |
| CN | 106878676 | A | 6/2017 |
| CN | 107197441 | A | 9/2017 |
| CN | 107533368 | A | 1/2018 |
| CN | 107613235 | A | 1/2018 |
| CN | 107637073 | A | 1/2018 |
| CN | 107819928 | A | 3/2018 |
| CN | 109117078 | A | 1/2019 |
| CN | 109196825 | A | 1/2019 |
| CN | 109287140 | A | 1/2019 |
| CN | 109302531 | A | 2/2019 |
| CN | 109348052 | A | 2/2019 |
| CN | 109688441 | A | 4/2019 |
| CN | 109688442 | A | 4/2019 |
| CN | 110069190 | A | 7/2019 |
| DK | 180842 | B1 | 5/2022 |
| EP | 1133119 | A2 | 9/2001 |
| EP | 1881649 | A2 | 1/2008 |
| EP | 2018032 | A1 | 1/2009 |
| EP | 2675195 | A2 | 12/2013 |
| EP | 2750062 | A2 | 7/2014 |
| EP | 2770673 | A1 | 8/2014 |
| EP | 2784611 | A2 | 10/2014 |
| EP | 2797391 | A1 | 10/2014 |
| EP | 2879470 | A1 | 6/2015 |
| EP | 2894948 | A2 | 7/2015 |
| EP | 2933953 | A1 | 10/2015 |
| EP | 2981093 | A1 | 2/2016 |
| EP | 2993909 | A1 | 3/2016 |
| EP | 3038427 | A1 | 6/2016 |
| EP | 3041229 | A1 | 7/2016 |
| EP | 3138300 | A1 | 3/2017 |
| EP | 3420441 | A1 | 1/2019 |
| EP | 3445058 | A1 | 2/2019 |
| EP | 3460770 | A1 | 3/2019 |
| EP | 3038427 | B1 | 12/2019 |
| EP | 3579093 | A1 | 12/2019 |
| EP | 3751405 | A1 | 12/2020 |
| EP | 4134799 | A1 | 2/2023 |
| GB | 2499123 | A | 8/2013 |
| GB | 2512821 | A | 10/2014 |
| GB | 2533101 | A | 6/2016 |
| IN | 1038MUM2005 | A | 6/2007 |
| JP | 4-175921 | A | 6/1992 |
| JP | 6-178356 | A | 6/1994 |
| JP | 2000-224542 | A | 8/2000 |
| JP | 2001-67099 | A | 3/2001 |
| JP | 2002-153678 | A | 5/2002 |
| JP | 2003-228780 | A | 8/2003 |
| JP | 2004-96397 | A | 3/2004 |
| JP | 2004-110559 | A | 4/2004 |
| JP | 2005-333294 | A | 12/2005 |
| JP | 2006-350819 | A | 12/2006 |
| JP | 2007-58663 | A | 3/2007 |
| JP | 2007-179302 | A | 7/2007 |
| JP | 2008-99330 | A | 4/2008 |
| JP | 2009-201127 | A | 9/2009 |
| JP | 2011-124665 | A | 6/2011 |
| JP | 2012-73839 | A | 4/2012 |
| JP | 2012-123460 | A | 6/2012 |
| JP | 2013-098613 | A | 5/2013 |
| JP | 2013-200879 | A | 10/2013 |
| JP | 2014-071835 | A | 4/2014 |
| JP | 2014-087126 | A | 5/2014 |
| JP | 2014-160461 | A | 9/2014 |
| JP | 2014-170982 | A | 9/2014 |
| JP | 2014-186961 | A | 10/2014 |
| JP | 5628461 | B1 | 11/2014 |
| JP | 2015-070327 | A | 4/2015 |
| JP | 2015-125671 | A | 7/2015 |
| JP | 2015-128043 | A | 7/2015 |
| JP | 2015-128326 | A | 7/2015 |
| JP | 2015-149710 | A | 8/2015 |

(56) References Cited

FOREIGN PATENT DOCUMENTS

| | | | |
|---|---|---|---|
| JP | 2015-154253 | A | 8/2015 |
| JP | 2015-195222 | A | 11/2015 |
| JP | 2015-211035 | A | 11/2015 |
| JP | 2016-38615 | A | 3/2016 |
| JP | 2016-051661 | A | 4/2016 |
| JP | 2016-63520 | A | 4/2016 |
| JP | 2016-63531 | A | 4/2016 |
| JP | 2016-72953 | A | 5/2016 |
| JP | 2016-100791 | A | 5/2016 |
| JP | 2016-119600 | A | 6/2016 |
| JP | 2016-525732 | A | 8/2016 |
| JP | 2016-157292 | A | 9/2016 |
| JP | 2017-508195 | A | 3/2017 |
| JP | 2017-84253 | A | 5/2017 |
| JP | 2017-158202 | A | 9/2017 |
| JP | 2017-173998 | A | 9/2017 |
| JP | 2017-212096 | A | 11/2017 |
| JP | 2018-007158 | A | 1/2018 |
| JP | 2018-063826 | A | 4/2018 |
| JP | 2018-200624 | A | 12/2018 |
| JP | 2019-526095 | A | 9/2019 |
| KR | 10-2001-0091156 | A | 10/2001 |
| KR | 10-2011-0022980 | A | 3/2011 |
| KR | 10-2011-0075136 | A | 7/2011 |
| KR | 10-2011-0093040 | A | 8/2011 |
| KR | 10-2012-0059860 | A | 6/2012 |
| KR | 10-2012-0079208 | A | 7/2012 |
| KR | 10-2013-0115611 | A | 10/2013 |
| KR | 10-2014-0075932 | A | 6/2014 |
| KR | 10-2014-0148289 | A | 12/2014 |
| KR | 10-2015-0005134 | A | 1/2015 |
| KR | 10-2015-0043146 | A | 4/2015 |
| KR | 10-1522311 | B1 | 5/2015 |
| KR | 10-2015-0136440 | A | 12/2015 |
| KR | 10-2017-0008601 | A | 1/2017 |
| KR | 10-2017-0100358 | A | 9/2017 |
| KR | 10-2018-0027707 | A | 3/2018 |
| KR | 10-2018-0034637 | A | 4/2018 |
| KR | 10-2018-0042013 | A | 4/2018 |
| KR | 10-2018-0085931 | A | 7/2018 |
| KR | 10-2019-0002658 | A | 1/2019 |
| KR | 10-2019-0014495 | A | 2/2019 |
| KR | 10-2019-0057414 | A | 5/2019 |
| KR | 10-2020-0039030 | A | 4/2020 |
| KR | 10-2020-0054298 | A | 5/2020 |
| TW | 201547326 | A | 12/2015 |
| WO | 2000/39964 | A1 | 7/2000 |
| WO | 2005/055521 | A1 | 6/2005 |
| WO | 2008/027924 | A2 | 3/2008 |
| WO | 2009/067670 | A1 | 5/2009 |
| WO | 2009/086599 | A1 | 7/2009 |
| WO | 2010/087988 | A1 | 8/2010 |
| WO | 2011/027964 | A1 | 3/2011 |
| WO | 2011/126502 | A1 | 10/2011 |
| WO | 2012/004288 | A1 | 1/2012 |
| WO | 2012/085794 | A1 | 6/2012 |
| WO | 2012/104288 | A1 | 8/2012 |
| WO | 2013/049346 | A1 | 4/2013 |
| WO | 2013/153405 | A2 | 10/2013 |
| WO | 2014/030320 | A1 | 2/2014 |
| WO | 2014/030540 | A1 | 2/2014 |
| WO | 2014/107469 | A2 | 7/2014 |
| WO | 2014/128800 | A1 | 8/2014 |
| WO | 2014/155429 | A1 | 10/2014 |
| WO | 2014/197339 | A1 | 12/2014 |
| WO | 2014/208057 | A1 | 12/2014 |
| WO | 2014/210304 | A1 | 12/2014 |
| WO | 2015/008409 | A1 | 1/2015 |
| WO | 2015/039000 | A1 | 3/2015 |
| WO | 2015/076930 | A1 | 5/2015 |
| WO | 2015/102572 | A1 | 7/2015 |
| WO | 2015/105763 | A1 | 7/2015 |
| WO | 2015/114690 | A1 | 8/2015 |
| WO | 2015/124831 | A1 | 8/2015 |
| WO | 2015/134692 | A1 | 9/2015 |
| WO | 2015/179031 | A1 | 11/2015 |
| WO | 2016/033400 | A1 | 3/2016 |
| WO | 2016/052888 | A1 | 4/2016 |
| WO | 2016/057117 | A1 | 4/2016 |
| WO | 2016/079889 | A1 | 5/2016 |
| WO | 2016/103546 | A1 | 6/2016 |
| WO | 2016/200603 | A1 | 12/2016 |
| WO | 2017/027526 | A1 | 2/2017 |
| WO | 2017/058293 | A1 | 4/2017 |
| WO | 2017/058442 | A1 | 4/2017 |
| WO | 2017/147081 | A1 | 8/2017 |
| WO | 2017/205657 | A1 | 11/2017 |
| WO | 2017/218143 | A1 | 12/2017 |
| WO | 2017/218192 | A1 | 12/2017 |
| WO | 2018/144339 | A2 | 8/2018 |
| WO | 2018/213401 | A1 | 11/2018 |
| WO | 2018/213415 | A1 | 11/2018 |
| WO | 2018/213844 | A1 | 11/2018 |
| WO | 2018/232333 | A1 | 12/2018 |
| WO | 2019/090653 | A1 | 5/2019 |
| WO | 2019/217341 | A1 | 11/2019 |
| WO | 2021/231412 | A1 | 11/2021 |

OTHER PUBLICATIONS

Applicant Initiated Interview Summary received for U.S. Appl. No. 16/404,605, mailed on Nov. 13, 2019, 3 pages.

Applicant Initiated Interview Summary received for U.S. Appl. No. 16/702,968, mailed on Jul. 1, 2020, 5 pages.

Applicant Initiated Interview Summary received for U.S. Appl. No. 16/817,328, mailed on Dec. 21, 2021, 3 pages.

Applicant-Initiated Interview Summary received for U.S. Appl. No. 15/910,263, mailed on Nov. 18, 2020, 6 pages.

Applicant-Initiated Interview Summary received for U.S. Appl. No. 16/584,743, mailed on May 1, 2020, 5 pages.

Applicant-Initiated Interview Summary received for U.S. Appl. No. 16/586,002, mailed on Apr. 28, 2020, 5 pages.

Applicant-Initiated Interview Summary received for U.S. Appl. No. 16/702,968, mailed on Sep. 28, 2020, 6 pages.

Applicant-Initiated Interview Summary received for U.S. Appl. No. 16/803,849, mailed on Aug. 21, 2020, 5 pages.

Applicant-Initiated Interview Summary received for U.S. Appl. No. 16/803,849, mailed on Dec. 21, 2020, 5 pages.

Applicant-Initiated Interview Summary received for U.S. Appl. No. 16/803,849, mailed on Feb. 28, 2022, 9 pages.

Applicant-Initiated Interview Summary received for U.S. Appl. No. 16/803,849, mailed on Oct. 12, 2021, 6 pages.

Applicant-Initiated Interview Summary received for U.S. Appl. No. 16/807,604, mailed on Dec. 21, 2020, 7 pages.

Applicant-Initiated Interview Summary received for U.S. Appl. No. 16/807,604, mailed on Jul. 24, 2020, 5 pages.

Applicant-Initiated Interview Summary received for U.S. Appl. No. 16/830,838, mailed on Apr. 6, 2022, 2 pages.

Applicant-Initiated Interview Summary received for U.S. Appl. No. 16/830,838, mailed on Dec. 16, 2022, 2 pages.

Applicant-Initiated Interview Summary received for U.S. Appl. No. 16/830,838, mailed on Jun. 1, 2023, 2 pages.

Applicant-Initiated Interview Summary received for U.S. Appl. No. 16/830,838, mailed on May 24, 2021, 3 pages.

Applicant-Initiated Interview Summary received for U.S. Appl. No. 16/830,838, mailed on Sep. 21, 2022, 2 pages.

Applicant-Initiated Interview Summary received for U.S. Appl. No. 16/836,571, mailed on Jul. 7, 2021, 6 pages.

Applicant-Initiated Interview Summary received for U.S. Appl. No. 17/026,818, mailed on Dec. 15, 2020, 7 pages.

Applicant-Initiated Interview Summary received for U.S. Appl. No. 17/026,818, mailed on Mar. 8, 2021, 4 pages.

Applicant-Initiated Interview Summary received for U.S. Appl. No. 17/028,176, mailed on Jun. 2, 2022, 5 pages.

Applicant-Initiated Interview Summary received for U.S. Appl. No. 17/028,176, mailed on Oct. 14, 2022, 5 pages.

Applicant-Initiated Interview Summary received for U.S. Appl. No. 17/031,833, mailed on Dec. 21, 2020, 5 pages.

(56) References Cited

OTHER PUBLICATIONS

Applicant-Initiated Interview Summary received for U.S. Appl. No. 17/031,833, mailed on May 24, 2021, 6 pages.
Applicant-Initiated Interview Summary received for U.S. Appl. No. 17/116,938, mailed on Dec. 13, 2021, 3 pages.
Applicant-Initiated Interview Summary received for U.S. Appl. No. 17/116,938, mailed on Jun. 14, 2022, 2 pages.
Applicant-Initiated Interview Summary received for U.S. Appl. No. 17/116,938, mailed on Oct. 13, 2022, 3 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/337,110, mailed on Sep. 21, 2022, 2 pages.
Applicant-Initiated Interview Summary received for U.S. Appl. No. 17/461,103, mailed on Jan. 26, 2022, 6 pages.
Applicant-Initiated Interview Summary received for U.S. Appl. No. 17/464,477, mailed on Mar. 21, 2022, 3 pages.
Applicant-Initiated Interview Summary received for U.S. Appl. No. 17/464,477, mailed on May 26, 2023, 2 pages.
Applicant-Initiated Interview Summary received for U.S. Appl. No. 17/464,477, mailed on Sep. 6, 2022, 3 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Jun. 2, 2023, 2 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/742,273, mailed on Jan. 18, 2023, 4 pages.
Applicant-Initiated Interview Summary received for U.S. Appl. No. 17/742,273, mailed on Mar. 30, 2023, 5 pages.
Applicant-Initiated Interview Summary received for U.S. Appl. No. 17/747,804, mailed on Mar. 17, 2023, 4 pages.
Applicant-Initiated Interview Summary received for U.S. Appl. No. 17/747,804, mailed on May 31, 2023, 4 pages.
Applicant-Initiated Interview Summary received for U.S. Appl. No. 17/752,582, mailed on Apr. 17, 2023, 3 pages.
Blinkx.tv and Heinlein's Newsbox, Available at: http://http://www.technovelgy.com/ct/Science-Fiction-News.asp?NewsNum=470>, 2005, 3 pages.
Brief Communication Regarding Oral Proceedings received for European Patent Application No. 17813777.4, mailed on Nov. 23, 2020, 6 pages.
Brief Communication Regarding Oral Proceedings received for European Patent Application No. 18197583.0, mailed on Feb. 18, 2021, 2 pages.
Brief Communication Regarding Oral Proceedings received for European Patent Application No. 18728002.9, mailed on Dec. 7, 2022, 1 page.
Brief Communication Regarding Oral Proceedings received for European Patent Application No. 18728002.9, mailed on Nov. 28, 2022, 7 pages.
Brief Communication Regarding Oral Proceedings received for European Patent Application No. 19182037.2, mailed on Apr. 15, 2021, 2 pages.
Brief Communication Regarding Oral Proceedings received for European Patent Application No. 19728558.8, mailed on Jul. 5, 2022, 1 page.
Brief Communication Regarding Oral Proceedings received for European Patent Application No. 20158824.1, mailed on May 30, 2022, 1 page.
Brief Communication Regarding Oral Proceedings received for European Patent Application No. 20187610.9, mailed on May 31, 2022, 1 page.
Certificate of Examination received for Australian Patent Application No. 2019100487, mailed on Jan. 7, 2020, 2 pages.
Certificate of Examination received for Australian Patent Application No. 2020100303, mailed on Apr. 17, 2020, 2 pages.
Certificate of Examination received for Australian Patent Application No. 2020100886, mailed on Dec. 22, 2020, 2 pages.
Certificate of Examination received for Australian Patent Application No. 2021100721, mailed on Dec. 16, 2021, 2 pages.
Certification of Examination received for Australian Patent Application No. 2017100666, mailed on Jan. 29, 2018, 2 pages.
Corrected International Search Report and Written Opinion received for PCT Patent Application No. PCT/US2017/035293, mailed on Dec. 8, 2017, 21 pages.
Corrected Notice of Allowance received for U.S. Appl. No. 15/427,516, mailed on Apr. 29, 2019, 2 pages.
Corrected Notice of Allowance received for U.S. Appl. No. 15/427,516, mailed on May 8, 2019, 2 pages.
Corrected Notice of Allowance received for U.S. Appl. No. 15/910,263, mailed on Feb. 10, 2021, 3 pages.
Corrected Notice of Allowance received for U.S. Appl. No. 15/910,263, mailed on Mar. 17, 2021, 3 pages.
Corrected Notice of Allowance received for U.S. Appl. No. 15/910,263, mailed on Mar. 18,2021, 3 pages.
Corrected Notice of Allowance received for U.S. Appl. No. 16/143,379, mailed on Dec. 18, 2019, 2 pages.
Corrected Notice of Allowance received for U.S. Appl. No. 16/143,379, mailed on Feb. 14, 2020, 2 pages.
Corrected Notice of Allowance received for U.S. Appl. No. 16/143,379, mailed on Mar. 3, 2020, 2 pages.
Corrected Notice of Allowance received for U.S. Appl. No. 16/143,379, mailed on Mar. 12, 2020, 2 pages.
Corrected Notice of Allowance received for U.S. Appl. No. 16/404,605, mailed on Dec. 23, 2020, 3 pages.
Corrected Notice of Allowance received for U.S. Appl. No. 16/584,743, mailed on Dec. 30, 2020, 3 pages.
Corrected Notice of Allowance received for U.S. Appl. No. 16/702,968, mailed on Jun. 8, 2021, 3 pages.
Corrected Notice of Allowance received for U.S. Appl. No. 16/702,968, mailed on Jun. 16, 2021, 4 pages.
Corrected Notice of Allowance received for U.S. Appl. No. 16/702,968, mailed on Jun. 28, 2021, 4 pages.
Corrected Notice of Allowance received for U.S. Appl. No. 16/702,968, mailed on May 26, 2021, 4 pages.
Corrected Notice of Allowance received for U.S. Appl. No. 16/702,968, mailed on May 28, 2021, 4 pages.
Corrected Notice of Allowance received for U.S. Appl. No. 16/803,849, mailed on Jul. 7, 2022, 3 pages.
Corrected Notice of Allowance received for U.S. Appl. No. 16/803,849, mailed on Jun. 8, 2022, 3 pages.
Corrected Notice of Allowance received for U.S. Appl. No. 16/807,604, mailed on Jul. 26, 2021, 3 pages.
Corrected Notice of Allowance received for U.S. Appl. No. 16/807,604, mailed on Jun. 28, 2021, 3 pages.
Corrected Notice of Allowance received for U.S. Appl. No. 16/807,604, mailed on May 28, 2021, 3 pages.
Corrected Notice of Allowance received for U.S. Appl. No. 16/807,604, mailed on Oct. 4, 2021, 5 pages.
Corrected Notice of Allowance received for U.S. Appl. No. 16/807,604, mailed on Oct. 14, 2021, 3 pages.
Corrected Notice of Allowance received for U.S. Appl. No. 16/807,604, mailed on Oct. 22, 2021, 3 pages.
Corrected Notice of Allowance received for U.S. Appl. No. 16/836,571, mailed on Dec. 6, 2021, 5 pages.
Corrected Notice of Allowance received for U.S. Appl. No. 16/836,571, mailed on Mar. 25, 2022, 2 pages.
Corrected Notice of Allowance received for U.S. Appl. No. 16/836,571, mailed on Nov. 4, 2021, 4 pages.
Corrected Notice of Allowance received for U.S. Appl. No. 16/836,571, mailed on Nov. 18, 2021, 3 pages.
Corrected Notice of Allowance received for U.S. Appl. No. 16/836,571, mailed on Oct. 12, 2021, 4 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/028,176, mailed on Mar. 6, 2023, 3 pages.

(56) References Cited

OTHER PUBLICATIONS

Corrected Notice of Allowance received for U.S. Appl. No. 17/031,833, mailed on Aug. 2, 2021, 3 pages.
Corrected Notice of Allowance received for U.S. Appl. No. 17/337,110, mailed on Jan. 19, 2023, 7 pages.
Corrected Notice of Allowance received for U.S. Appl. No. 17/461,103, mailed on Apr. 14, 2022, 2 pages.
Corrected Notice of Allowance received for U.S. Appl. No. 17/461,103, mailed on Aug. 3, 2022, 2 pages.
Corrected Notice of Allowance received for U.S. Appl. No. 17/461,103, mailed on May 10, 2022, 2 pages.
Corrected Notice of Allowance received for U.S. Appl. No. 18/077,905, mailed on Apr. 10, 2023, 2 pages.
Corrected Notice of Allowance received for U.S. Appl. No. 18/077,905, mailed on Apr. 19, 2023, 2 pages.
Corrected Notice of Allowance received for U.S. Appl. No. 18/077,905, mailed on Apr. 26, 2023, 3 pages.
Corrected Notice of Allowance received for U.S. Appl. No. 18/077,905, mailed on May 4, 2023, 2 pages.
Corrected Notice of Allowance received for U.S. Appl. No. 16/143,379, mailed on Aug. 15, 2019, 2 pages.
Corrected Notice of Allowance received for U.S. Appl. No. 16/143,379, mailed on Nov. 12, 2019, 2 pages.
Corrected Notice of Allowance received for U.S. Appl. No. 16/143,379, mailed on Oct. 16, 2019, 2 pages.
Decision to Grant received for Danish Patent Application No. PA201670601, mailed on Jun. 21, 2019, 2 pages.
Decision to Grant received for Danish Patent Application No. PA201670602, mailed on Nov. 30, 2018, 2 pages.
Decision to Grant received for Danish Patent Application No. PA201670604, mailed on Aug. 22, 2018, 2 pages.
Decision to Grant received for Danish Patent Application No. PA201670605, mailed on Nov. 29, 2018, 2 pages.
Decision to Grant received for Danish Patent Application No. PA201770392, mailed on Oct. 24, 2018, 2 pages.
Decision to Grant received for Danish Patent Application No. PA201770401, mailed on Oct. 24, 2018, 2 pages.
Decision to Grant received for Danish Patent Application No. PA201770403, mailed on Oct. 24, 2018, 2 pages.
Decision to Grant received for Danish Patent Application No. PA201770404, mailed on Nov. 11, 2019, 3 pages.
Decision to Grant received for Danish Patent Application No. PA201770406, mailed on May 15, 2020, 2 pages.
Decision to Grant received for Danish Patent Application No. PA201870293, mailed on Dec. 3, 2018, 2 pages.
Decision to Grant received for Danish Patent Application No. PA201870435, mailed on Oct. 20, 2020, 2 pages.
Decision to Grant received for Danish Patent Application No. PA202070560, mailed on Oct. 21, 2021, 2 pages.
Decision to Grant received for Danish Patent Application No. PA202070627, mailed on May 11, 2022, 2 pages.
Decision to Grant received for Danish Patent Application No. PA202170320, mailed on Nov. 10, 2022, 2 pages.
Decision to Grant received for Danish Patent Application No. PA202270464, mailed on May 9, 2023, 1 page.
Decision to Grant received for European Patent Application No. 18197583.0, mailed on Feb. 3, 2022, 3 pages.
Decision to Grant received for European Patent Application No. 18197589.7, mailed on Jun. 10, 2021, 2 pages.
Decision to Grant received for European Patent Application No. 19182037.2, mailed on Sep. 16, 2021, 3 pages.
Decision to Grant received for European Patent Application No. 19207753.5, mailed on Jun. 2, 2022, 3 pages.
Decision to Grant received for European Patent Application No. 20158824.1, mailed on Dec. 15, 2022, 3 pages.
Decision to Grant received for Japanese Patent Application No. 2021-051415, mailed on Jan. 6, 2022, 3 pages (1 page of English Translation and 2 pages of Official Copy).
Decision to Refuse received for European Patent Application No. 20187610.9, mailed on Jul. 19, 2022, 13 pages.
Examiner-Initiated Interview Summary received for U.S. Appl. No. 17/027,373, mailed on Mar. 31, 2022, 4 pages.
Examiner-Initiated Interview Summary received for U.S. Appl. No. 17/028,176, mailed on Nov. 17, 2021, 2 pages.
Examiner's Pre-Review Report received for Japanese Patent Application No. 2020- 047952, mailed on Dec. 13, 2022, 10 pages (5 pages of English Translation and 5 pages of Official Copy).
Extended European Search Report (includes Supplementary European Search Report and Search Opinion) received for European Patent Application No. 17813777.4, mailed on Mar. 25, 2019, 8 pages.
Extended European Search Report received for European Patent Application No. 18197583.0, mailed on Jun. 4, 2019, 20 pages.
Extended European Search Report received for European Patent Application No. 18197589.7, mailed on Jan. 7, 2019, 9 pages.
Extended European Search Report received for European Patent Application No. 19182037.2, mailed on Oct. 31, 2019, 8 pages.
Extended European Search Report received for European Patent Application No. 19207753.5, mailed on Dec. 18, 2019, 9 pages.
Extended European Search Report received for European Patent Application No. 20158824.1, mailed on Aug. 10, 2020, 13 pages.
Extended European Search Report received for European Patent Application No. 20187610.9, mailed on Nov. 16, 2020, 7 pages.
Extended European Search Report received for European Patent Application No. 21160991.2, mailed on Jul. 16, 2021, 14 pages.
Extended European Search Report received for European Patent Application No. 21197457.1, mailed on Nov. 15, 2021, 8 pages.
Extended European Search Report received for European Patent Application No. 22196865.4, mailed on Jan. 13, 2023, 7 pages.
Extended European Search Report received for European Patent Application No. 22201007.6, mailed on Jan. 12, 2023, 7 pages.
Extended European Search Report received for European Patent Application No. 22191264.5, mailed on Nov. 11, 2022, 8 pages.
Extended Search Report received for European Patent Application No. 21161005.0, mailed on Jun. 14, 2021, 12 pages.
Final Office Action Received for U.S. Appl. No. 11/462,696 , mailed on Jan. 6, 2009, 22 pages.
Final Office Action Received for U.S. Appl. No. 11/462,696 , mailed on Jul. 7, 2010, 24 pages.
Final Office Action Received for U.S. Appl. No. 11/462,696 , mailed on May 5, 2011, 42 pages.
Final Office Action received for U.S. Appl. No. 15/910,263, mailed on Aug. 28, 2019, 32 pages.
Final Office Action received for U.S. Appl. No. 16/404,605, mailed on Feb. 10, 2020, 21 pages.
Final Office Action received for U.S. Appl. No. 16/702,968, mailed on Jul. 27, 2020, 21 pages.
Final Office Action received for U.S. Appl. No. 16/803,849, mailed on Nov. 2, 2021, 37 pages.
Final Office Action received for U.S. Appl. No. 16/803,849, mailed on Sep. 24, 2020, 29 pages.
Final Office Action received for U.S. Appl. No. 16/807,604, mailed on Aug. 19, 2020, 35 pages.
Final Office Action received for U.S. Appl. No. 16/830,838, mailed on Dec. 9, 2021, 16 pages.
Final Office Action received for U.S. Appl. No. 16/830,838, mailed on Oct. 14, 2022, 16 pages.
Final Office Action received for U.S. Appl. No. 17/026,818, mailed on Jan. 29, 2021, 21 pages.
Final Office Action received for U.S. Appl. No. 17/028,176, mailed on Mar. 9, 2022, 22 pages.
Final Office Action received for U.S. Appl. No. 17/031,833, mailed on Jan. 26, 2021, 17 pages.
Final Office Action received for U.S. Appl. No. 17/116,938, mailed on Dec. 29, 2022, 42 pages.
Final Office Action received for U.S. Appl. No. 17/116,938, mailed on Mar. 1, 2022, 27 pages.
Final Office Action received for U.S. Appl. No. 17/464,477, mailed on Jun. 22, 2022, 21 pages.
Final Office Action received for U.S. Appl. No. 17/476,404, mailed on May 5, 2022, 30 pages.
Final Office Action received for U.S. Appl. No. 17/742,273, mailed on Feb. 15, 2023, 56 pages.

(56) References Cited

OTHER PUBLICATIONS

Final Office Action received for U.S. Appl. No. 17/747,804, mailed on Apr. 28, 2023, 17 pages.
Final Office Action Received for U.S. Appl. No. 11/462,696 , mailed on Nov. 16, 2011, 45 pages.
Intention to Grant received for Danish Patent Application No. PA201670601, mailed on Apr. 10, 2019, 2 pages.
Intention to Grant received for Danish Patent Application No. PA201670602, mailed on Aug. 1, 2018, 2 pages.
Intention to Grant received for Danish Patent Application No. PA201670604, mailed on Jun. 14, 2018, 2 Pages.
Intention to Grant received for Danish Patent Application No. PA201670604, mailed on Mar. 15, 2018, 2 pages.
Intention to Grant received for Danish Patent Application No. PA201670605, mailed on Aug. 1, 2018, 2 pages.
Intention to Grant received for Danish Patent Application No. PA201770392, mailed on Aug. 31, 2018, 2 pages.
Intention to Grant received for Danish Patent Application No. PA201770392, mailed on Jul. 2, 2018, 2 pages.
Intention to Grant received for Danish Patent Application No. PA201770401, mailed on Jun. 14, 2018, 2 Pages.
Intention to Grant received for Danish Patent Application No. PA201770401, mailed on Sep. 17, 2018, 2 pages.
Intention to Grant received for Danish Patent Application No. PA201770403, mailed on May 7, 2018, 2 pages.
Intention to Grant received for Danish Patent Application No. PA201770403, mailed on Oct. 3, 2018, 2 pages.
Intention to Grant received for Danish Patent Application No. PA201770404, mailed on Sep. 23, 2019, 3 pages.
Intention to Grant received for Danish Patent Application No. PA201770406, mailed on Feb. 6, 2020, 3 pages.
Intention to Grant received for Danish Patent Application No. PA201770408, mailed on Nov. 30, 2018, 3 pages.
Intention to Grant received for Danish Patent Application No. PA201870293, mailed on Aug. 31, 2018, 2 pages.
Intention to Grant received for Danish Patent Application No. PA201870435, mailed on Jul. 1, 2020, 2 pages.
Intention to Grant received for Danish Patent Application No. PA202070560, mailed on Apr. 26, 2021, 2 pages.
Intention to Grant received for Danish Patent Application No. PA202070617, mailed on Nov. 15, 2021, 2 pages.
Intention to Grant received for Danish Patent Application No. PA202070627, mailed on Jan. 4, 2022, 2 pages.
Intention to Grant received for Danish Patent Application No. PA202170320, mailed on Jul. 27, 2022, 2 pages.
Intention to Grant received for Danish Patent Application No. PA202270464, mailed on Feb. 20, 2023, 2 pages.
Intention to Grant received for European Patent Application No. 18197583.0, mailed on Jan. 17, 2022, 9 pages.
Intention to Grant received for European Patent Application No. 18197583.0, mailed on Jul. 23, 2021, 9 pages.
Intention to Grant received for European Patent Application No. 18197589.7, mailed on Jan. 21, 2021, 8 pages.
Intention to Grant received for European Patent Application No. 18728002.9, mailed on Apr. 12, 2023, 9 pages.
Intention to Grant received for European Patent Application No. 19182037.2, mailed on May 4, 2021, 9 pages.
Intention to Grant received for European Patent Application No. 19207753.5, mailed on Jan. 28, 2022, 8 pages.
Intention to Grant received for European Patent Application No. 19207753.5, mailed on Sep. 3, 2021, 8 pages.
Intention to Grant received for European Patent Application No. 20158824.1, mailed on Aug. 11, 2022, 10 pages.
International Preliminary Report on Patentability received for PCT Patent Application No. PCT/US2017/035293, mailed on Dec. 27, 2018, 16 pages.
International Preliminary Report on Patentability received for PCT Patent Application No. PCT/US2018/032904, mailed on Nov. 28, 2019, 14 pages.
International Preliminary Report on Patentability received for PCT Patent Application No. PCT/US2019/030963, mailed on Nov. 19, 2020, 12 pages.
International Preliminary Report on Patentability received for PCT Patent Application No. PCT/US2020/024390, mailed on Dec. 9, 2021, 20 pages.
International Preliminary Report on Patentability received for PCT Patent Application No. PCT/US2020/035426, mailed on Dec. 9, 2021, 10 pages.
International Preliminary Report on Patentability received for PCT Patent Application No. PCT/US2021/031760, mailed on Nov. 24, 2022, 11 pages.
International Preliminary Report on Patentability received for PCT Patent Application No. PCT/US2021/035715, mailed on Dec. 15, 2022, 14 pages.
International Preliminary Report on Patentability received for PCT Patent Application No. PCT/US2021/046861, mailed on Mar. 16, 2023, 8 pages.
International Search Report and Written Opinion received for PCT Patent Application No. PCT/US2017/035293, mailed on Oct. 10, 2017, 25 pages.
International Search Report and Written Opinion received for PCT Patent Application No. PCT/US2018/032904, mailed on Oct. 1, 2018, 21 pages.
International Search Report and Written Opinion received for PCT Patent Application No. PCT/US2019/030963, mailed on Oct. 17, 2019, 21 pages.
International Search Report and written Opinion received for PCT Patent Application No. PCT/US2020/024390, mailed on Aug. 17, 2020, 22 pages.
International Search Report and Written Opinion received for PCT Patent Application No. PCT/US2020/024390, mailed on Oct. 23, 2020, 26 pages.
International Search Report and Written Opinion received for PCT Patent Application No. PCT/US2020/035426, mailed on Sep. 11, 2020, 12 pages.
International Search Report and Written Opinion received for PCT Patent Application No. PCT/US2021/031760, mailed on Sep. 16, 2021, 18 pages.
International Search Report and Written Opinion received for PCT Patent Application No. PCT/US2021/035715, mailed on Nov. 15, 2021, 19 pages.
International Search Report and Written Opinion received for PCT Patent Application No. PCT/US2021/046861, mailed on Dec. 9, 2021, 11 pages.
International Search Report and Written Opinion received for PCT Patent Application No. PCT/US2022/029282, mailed on Nov. 9, 2022, 22 pages.
Invitation to Pay Addition Fees and Partial International Search Report received for PCT Patent Application No. PCT/US2018/032904, mailed on Jul. 31, 2018, 18 pages.
Invitation to Pay Addition Fees received for PCT Patent Application No. PCT/US2017/035293, mailed on Aug. 17, 2017, 3 pages.
Invitation to Pay Additional Fees and Partial International Search Report received for PCT Patent Application No. PCT/US2021/035715, mailed on Sep. 21, 2021, 15 pages.
Invitation to Pay Additional Fees and Partial International Search Report received for PCT Patent Application No. PCT/US2022/029282, mailed on Sep. 15, 2022, 15 pages.
Invitation to Pay Additional Fees received for PCT Patent Application No. PCT/US2020/024390, mailed on Jun. 26, 2020, 15 pages.
Invitation to Pay Additional Fees received for PCT Patent Application No. PCT/US2019/030963, mailed on Aug. 22, 2019, 12 pages.
Invitation to Pay Search Fees received for European Patent Application No. 18728002.9, mailed on Sep. 2, 2020, 8 pages.
Invitation to Pay Search Fees received for European Patent Application No. 19728558.8, mailed on Apr. 20, 2021, 4 pages.
Invitation to Pay Search Fees received for European Patent Application No. 20719301.2, mailed on Dec. 17, 2020, 5 pages.
Invitation to Pay Search Fees received for European Patent Application No. 21728781.2, mailed on Dec. 2, 2022, 3 pages.

(56) References Cited

OTHER PUBLICATIONS

Minutes of Oral Proceedings received for European Patent Application No. 18728002.9, mailed on Dec. 22, 2022, 7 pages.
Minutes of the Oral Proceedings received for European Patent Application No. 18197583.0, mailed on Mar. 9, 2021, 6 pages.
Minutes of the Oral Proceedings received for European Patent Application No. 20187610.9, mailed on Jun. 7, 2022, 6 pages.
Multi-camera view on Alexa, online available at: https://forums.wyzecam.com/t/multi-camera-view-on-alexa/24290, Retrieved on May 12, 2021, 8 pages.
Non-Final Office Action received for U.S. Appl. No. 17/464,477, mailed on Feb. 8, 2022, 16 pages.
Non-Final Office Action Received for U.S. Appl. No. 11/462,696 , mailed on Aug. 5, 2008, 15 pages.
Non-Final Office Action Received for U.S. Appl. No. 11/462,696 , mailed on Nov. 16, 2010, 43 pages.
Non-Final Office Action Received for U.S. Appl. No. 11/462,696 , mailed on Sep. 1, 2009, 18 pages.
Non-Final Office Action received for U.S. Appl. No. 15/427,516, mailed on Aug. 28, 2018, 11 Pages.
Non-Final Office Action received for U.S. Appl. No. 15/910,263, mailed on Jun. 15, 2020, 38 pages.
Non-Final Office Action received for U.S. Appl. No. 15/910,263, mailed on Mar. 4, 2019, 26 pages.
Non-Final Office Action received for U.S. Appl. No. 16/404,605, mailed on Jun. 24, 2020, 18 pages.
Non-Final Office Action received for U.S. Appl. No. 16/404,605, mailed on Aug. 1, 2019, 19 Pages.
Non-Final Office Action received for U.S. Appl. No. 16/404,612, mailed on Feb. 28, 2020, 13 pages.
Non-Final Office Action received for U.S. Appl. No. 16/584,743, mailed on Feb. 6, 2020, 15 pages.
Non-Final Office Action received for U.S. Appl. No. 16/586,002, mailed on Feb. 20, 2020, 15 pages.
Non-Final Office Action received for U.S. Appl. No. 16/702,968, mailed on Apr. 8, 2020, 20 pages.
Non-Final Office Action received for U.S. Appl. No. 16/803,849, mailed on Jul. 13, 2020, 23 pages.
Non-Final Office Action received for U.S. Appl. No. 16/803,849, mailed on May 14, 2021, 34 pages.
Non-Final Office Action received for U.S. Appl. No. 16/807,604, mailed on Jun. 2, 2020, 28 pages.
Non-Final Office Action received for U.S. Appl. No. 16/817,328, mailed on Oct. 29, 2021, 9 pages.
Non-Final Office Action received for U.S. Appl. No. 16/830,838, mailed on Apr. 1, 2021, 13 pages.
Non-Final Office Action received for U.S. Appl. No. 16/830,838, mailed on Jun. 9, 2022, 17 pages.
Non-Final Office Action received for U.S. Appl. No. 16/830,838, mailed on Mar. 30, 2023, 16 pages.
Non-Final Office Action received for U.S. Appl. No. 16/836,571, mailed on Mar. 25, 2021, 28 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/028,176, mailed on Aug. 25, 2021, 20 pages.
Non-Final Office Action received for U.S. Appl. No. 17/028,176, mailed on Jul. 14, 2022, 23 pages.
Non-Final Office Action received for U.S. Appl. No. 17/031,833, mailed on Dec. 7, 2020, 13 pages.
Non-Final Office Action received for U.S. Appl. No. 17/116,938, mailed on Aug. 1, 2022, 15 pages.
Non-Final Office Action received for U.S. Appl. No. 17/116,938, mailed on Jul. 30, 2021, 19 pages.
Non-Final Office Action received for U.S. Appl. No. 17/223,794, mailed on Jun. 16, 2021, 32 pages.
Non-Final Office Action received for U.S. Appl. No. 17/337,110, mailed on Jun. 20, 2022, 30 pages.
Non-Final Office Action received for U.S. Appl. No. 17/461,103, mailed on Nov. 22, 2021, 15 pages.
Non-Final Office Action received for U.S. Appl. No. 17/464,477, mailed on Mar. 10, 2023, 21 pages.
Non-Final Office Action received for U.S. Appl. No. 17/476,404, mailed on Feb. 8, 2022, 26 pages.
Non-Final Office Action received for U.S. Appl. No. 17/476,404, mailed on Mar. 30, 2023, 29 pages.
Non-Final Office Action received for U.S. Appl. No. 17/476,404, mailed on Sep. 14, 2022, 31 pages.
Non-Final Office Action received for U.S. Appl. No. 17/742,273, mailed on Dec. 7, 2022, 47 pages.
Non-Final Office Action received for U.S. Appl. No. 17/747,804, mailed on Mar. 1, 2023, 14 pages.
Non-Final Office Action received for U.S. Appl. No. 17/752,582, mailed on Mar. 6, 2023, 17 pages.
Non-Final Office Action received for U.S. Appl. No. 17/835,110, mailed on Apr. 3, 2023, 28 pages.
Non-Final Office Action received for U.S. Appl. No. 18/077,971, mailed on Apr. 3, 2023, 24 pages.
Non-Final Office Action received for U.S. Appl. No. 16/143,379, mailed on Mar. 14, 2019, 10 pages.
Notice of Acceptance received for Australian Patent Application No. 2018223051, mailed on Oct. 30, 2018, 3 Pages.
Notice of Acceptance received for Australian Patent Application No. 2018236872, mailed on Jul. 9, 2019, 3 pages.
Notice of Acceptance received for Australian Patent Application No. 2019268111, mailed on Feb. 18, 2021, 3 pages.
Notice of Acceptance received for Australian Patent Application No. 2020217458, mailed on Sep. 7, 2022, 3 pages.
Notice of Acceptance received for Australian Patent Application No. 2020239711, mailed on Dec. 16, 2021, 3 pages.
Notice of Acceptance received for Australian Patent Application No. 2020257092, mailed on Aug. 27, 2021, 3 pages.
Notice of Acceptance received for Australian Patent Application No. 2021201403, mailed on Oct. 22, 2021, 3 pages.
Notice of Acceptance received for Australian Patent Application No. 2021203669, mailed on May 25, 2022, 3 pages.
Notice of Acceptance received for Australian Patent Application No. 2021204454, mailed on Feb. 25, 2022, 3 pages.
Notice of Acceptance received for Australian Patent Application No. 2021261941, mailed on Mar. 15, 2023, 3 pages.
Notice of Acceptance received for Australian Patent Application No. 2022200515, mailed on Dec. 21, 2022, 3 pages.
Notice of Acceptance received for Australian Patent Application No. 2022200901, mailed on Mar. 9, 2023, 3 pages.
Notice of Acceptance received for Australian Patent Application No. 2022201532, mailed on May 22, 2023, 3 pages.
Notice of Allowance received for Australian Patent Application No. 2017286129, mailed on Dec. 10, 2018, 3 pages.
Notice of Allowance received for Chinese Patent Application No. 201710493025.3, mailed on May 7, 2021, 6 pages (3 pages of English Translation and 3 pages of Official Copy).
Notice of Allowance received for Chinese Patent Application No. 201810730279.7, mailed on Nov. 5, 2020, 2 pages (1 page of English translation and 1 page of Official Copy).
Notice of Allowance received for Chinese Patent Application No. 201811151702.4, mailed on Jul. 6, 2020, 6 pages (3 pages of English Translation and 3 pages of Official Copy).
Notice of Allowance received for Chinese Patent Application No. 201811152097.2, mailed on Oct. 28, 2019, 6 pages (3 pages of English Translation and 3 pages of Official Copy).
Notice of Allowance received for Chinese Patent Application No. 201811539260.0, mailed on Mar. 15, 2021, 2 pages (1 page of English Translation and 1 page of Official Copy).
Notice of Allowance received for Chinese Patent Application No. 201880001436.9, mailed on May 8, 2020, 3 pages (2 pages of English Translation and 1 page of Official Copy).
Notice of Allowance received for Chinese Patent Application No. 202010125114.4, mailed on Nov. 24, 2021, 2 pages (1 page of English Translation and 1 page of Official Copy).

(56) References Cited

OTHER PUBLICATIONS

Notice of Allowance received for Chinese Patent Application No. 202010742019.9, mailed on Jul. 6, 2021, 7 pages (4 pages of English Translation and 3 pages of Official Copy).
Notice of Allowance received for Chinese Patent Application No. 202011336156.9, mailed on Jan. 6, 2022, 3 pages (2 pages of English Translation and 1 pages of Official Copy).
Notice of Allowance received for Chinese Patent Application No. 202011450203.2, mailed on Sep. 30, 2022, 4 pages (1 page of English Translation and 3 pages of Official Copy).
Notice of Allowance received for Chinese Patent Application No. 202110248576.X, mailed on Mar. 21, 2022, 2 pages (1 page of English Translation and 1 page of Official Copy).
Notice of Allowance received for Chinese Patent Application No. 202110818370.6, mailed on Sep. 2, 2022, 7 pages (4 pages of English Translation and 3 pages of Official Copy).
Notice of Allowance received for Chinese Patent Application No. 202110819254.6, mailed on Dec. 27, 2022, 4 pages (1 page of English Translation and 3 pages of Official Copy).
Notice of Allowance received for Danish Patent Application No. PA201770408, mailed on Feb. 8, 2019, 2 pages.
Notice of Allowance received for Japanese Patent Application No. 2018-562659, mailed on Jul. 30, 2021, 4 pages (1 page of English Translation and 3 pages of Official Copy).
Notice of Allowance received for Japanese Patent Application No. 2020-159840, mailed on Jul. 8, 2022, 4 pages (1 page of English Translation and 3 pages of Official Copy).
Notice of Allowance received for Japanese Patent Application No. 2020-558885, mailed on Jul. 26, 2021, 4 pages (1 page of English Translation and 3 pages of Official Copy).
Notice of Allowance received for Japanese Patent Application No. 2020-560927, mailed on May 30, 2022, 3 pages (1 page of English Translation and 2 pages of Official Copy).
Notice of Allowance received for Japanese Patent Application No. 2021-026630, mailed on Jan. 7, 2022, 4 pages (1 page of English Translation and 3 pages of Official Copy).
Notice of Allowance received for Japanese Patent Application No. 2022-014389, mailed on Jan. 27, 2023, 4 pages (1 page of English Translation and 3 pages of Official Copy).
Notice of Allowance received for Japanese Patent Application No. 2022-125792, mailed on Jan. 27, 2023, 4 pages (1 page of English Translation and 3 pages of Official Copy).
Notice of Allowance received for Korean Patent Application No. 10-2018-7034909, mailed on Sep. 30, 2019, 4 pages (1 page of English Translation and 3 pages of Official Copy).
Notice of Allowance received for Korean Patent Application No. 10-2019-7038093, mailed on Aug. 10, 2020, 5 pages (2 pages of English Translation and 3 pages of Official Copy).
Notice of Allowance received for Korean Patent Application No. 10-2020-0123805, mailed on Jun. 19, 2022, 5 pages (2 pages of English Translation and 3 pages of Official Copy).
Notice of Allowance received for Korean Patent Application No. 10-2020-7031319, mailed on Apr. 6, 2021, 5 pages (2 pages of English Translation and 3 pages of Official Copy).
Notice of Allowance received for Korean Patent Application No. 10-2020-7031700, mailed on Apr. 21, 2021, 4 pages (2 pages of English Translation and 2 pages of Official Copy).
Notice of Allowance received for Korean Patent Application No. 10-2020-7032488, mailed on Jun. 16, 2021, 4 pages (1 page of English Translation and 3 pages of Official Copy).
Notice of Allowance received for Korean Patent Application No. 10-2021-7021047, mailed on Dec. 6, 2021, 3 pages (1 page of English Translation and 2 pages of Official Copy).
Notice of Allowance received for Korean Patent Application No. 10-2021-7022610, mailed on Oct. 13, 2021, 3 pages (1 page of English Translation and 2 pages of Official Copy).
Notice of Allowance received for Korean Patent Application No. 10-2021-7029861, mailed on Jan. 4, 2023, 7 pages (2 pages of English Translation & 5 pages of Official Copy).
Notice of Allowance received for Korean Patent Application No. 10-2022-0091730, mailed on Oct. 4, 2022, 5 pages (2 pages of English Translation and 3 pages of Official Copy).
Notice of Allowance received for Korean Patent Application No. 10-2022-7014651, mailed on Aug. 18, 2022, 5 pages (2 pages of English Translation and 3 pages of Official Copy).
Notice of Allowance received for Korean Patent Application No. 10-2022-7014651, mailed on Nov. 25, 2022, 7 pages (2 pages of English Translation and 5 pages of Official Copy).
Notice of Allowance received for U.S. Appl. No. 16/702,968, mailed on Apr. 21, 2021, 20 pages.
Notice of Allowance received for U.S. Appl. No. 15/427,516, mailed on Mar. 4, 2019, 7 pages.
Notice of Allowance received for U.S. Appl. No. 15/910,263, mailed on Feb. 18, 2021, 3 pages.
Notice of Allowance received for U.S. Appl. No. 15/910,263, mailed on Jan. 22, 2021, 33 pages.
Notice of Allowance received for U.S. Appl. No. 16/143,379, mailed on Jan. 29, 2020, 5 pages.
Notice of Allowance received for U.S. Appl. No. 16/404,605, mailed on Sep. 18, 2020, 5 pages.
Notice of Allowance received for U.S. Appl. No. 16/404,612, mailed on Jul. 13, 2020, 6 pages.
Notice of Allowance received for U.S. Appl. No. 16/404,612. mailed on Aug. 7, 2019, 9 pages.
Notice of Allowance received for U.S. Appl. No. 16/584,743, mailed on Aug. 7, 2020, 8 pages.
Notice of Allowance received for U.S. Appl. No. 16/584,743, mailed on Nov. 16, 2020, 7 pages.
Notice of Allowance received for U.S. Appl. No. 16/586,002, mailed on Jun. 9, 2020, 5 pages.
Notice of Allowance received for U.S. Appl. No. 16/803,849, mailed on May 17, 2022, 12 pages.
Notice of Allowance received for U.S. Appl. No. 16/807,604, mailed on Apr. 30, 2021, 25 pages.
Notice of Allowance received for U.S. Appl. No. 16/817,328, mailed on Apr. 18, 2022, 8 pages.
Notice of Allowance received for U.S. Appl. No. 16/817,328, mailed on Feb. 16, 2022, 9 pages.
Notice of Allowance received for U.S. Appl. No. 16/836,571, mailed on Feb. 14, 2022, 31 pages.
Notice of Allowance received for U.S. Appl. No. 16/836,571, mailed on Sep. 8, 2021, 25 pages.
Notice of Allowance received for U.S. Appl. No. 17/019,845, mailed on Jun. 5, 2023, 10 pages.
Notice of Allowance received for U.S. Appl. No. 17/026,818, mailed on May 13, 2021, 10 pages.
Notice of Allowance received for U.S. Appl. No. 17/027,373, mailed on Aug. 2, 2022, 2 pages.
Notice of Allowance received for U.S. Appl. No. 17/027,373, mailed on Jun. 3, 2022, 8 pages.
Notice of Allowance received for U.S. Appl. No. 17/027,373, mailed on Oct. 3, 2022, 5 pages.
Notice of Allowance received for U.S. Appl. No. 17/028,176, mailed on Jan. 19, 2023, 9 pages.
Notice of Allowance received for U.S. Appl. No. 17/031,833, mailed on Jun. 25, 2021, 15 pages.
Notice of Allowance received for U.S. Appl. No. 17/031,833, mailed on Sep. 20, 2021, 6 pages.
Notice of Allowance received for U.S. Appl. No. 17/337,110, mailed on Oct. 11, 2022, 11 pages.
Notice of Allowance received for U.S. Appl. No. 17/461,103, mailed on Jun. 20, 2022, 6 pages.
Notice of Allowance received for U.S. Appl. No. 17/461,103, mailed on Mar. 17, 2022, 10 pages.
Notice of Allowance received for U.S. Appl. No. 17/752,582, mailed on Jun. 13, 2023, 18 pages.
Notice of Allowance received for U.S. Appl. No. 18/077,905, mailed on Mar. 24, 2023, 18 pages.
Notice of Allowance received for U.S. Appl. No. 16/143,379, mailed on Jun. 26, 2019, 5 Pages.
Notice of Allowance received for U.S. Appl. No. 16/143,379, mailed on Sep. 25, 2019, 5 pages.

(56) References Cited

OTHER PUBLICATIONS

Notice of Allowance Received for U.S. Appl. No. 11/462,696 , mailed on Apr. 2, 2012, 18 pages.
Notice of Reasons for Refusal received for Japanese Patent Application No. 2020-047952, mailed on Apr. 3, 2023, 4 pages (2 pages of English Translation and 2 pages of Official Copy).
Office Action received for Australian Patent Application No. 2017100666, mailed on Jul. 27, 2017, 4 pages.
Office Action received for Australian Patent Application No. 2017286129, mailed on Oct. 18, 2018, 3 Pages.
Office Action received for Australian Patent Application No. 2018236870, mailed on Jul. 29, 2019, 7 pages.
Office Action received for Australian Patent Application No. 2018236870, mailed on Nov. 21, 2018, 10 pages.
Office Action received for Australian Patent Application No. 2018236870, mailed on Oct. 31, 2019, 8 pages.
Office Action received for Australian Patent Application No. 2018236872, mailed on Nov. 23, 2018, 4 pages.
Office Action received for Australian Patent Application No. 2019100487, mailed on Aug. 16, 2019, 5 pages.
Office Action received for Australian Patent Application No. 2019100523, mailed on Jan. 23, 2020, 3 pages.
Office Action received for Australian Patent Application No. 2019100523, mailed on Mar. 2, 2020, 3 pages.
Office Action received for Australian Patent Application No. 2019100523, mailed on Sep. 2, 2019, 3 pages.
Office Action received for Australian Patent Application No. 2019201853, mailed on Apr. 23, 2020, 5 pages.
Office Action received for Australian Patent Application No. 2019201853, mailed on Aug. 10, 2020, 4 pages.
Office Action received for Australian Patent Application No. 2019201853, mailed on Aug. 16, 2019, 5 pages.
Office Action received for Australian Patent Application No. 2019201853, mailed on Dec. 9, 2019, 5 pages.
Office Action received for Australian Patent Application No. 2019267527, mailed on Dec. 2, 2021, 4 pages.
Office Action received for Australian Patent Application No. 2019267527, mailed on Jun. 15, 2022, 3 pages.
Office Action received for Australian Patent Application No. 2019267527, mailed on Jun. 24, 2021, 8 pages.
Office Action received for Australian Patent Application No. 2019267527, mailed on Mar. 3, 2022, 3 pages.
Office Action received for Australian Patent Application No. 2019268111, mailed on Oct. 27, 2020, 7 pages.
Office Action received for Australian Patent Application No. 2020100886, mailed on Aug. 5, 2020, 6 pages.
Office Action received for Australian Patent Application No. 2020217458, mailed on Aug. 2, 2022, 4 pages.
Office Action received for Australian Patent Application No. 2020217458, mailed on May 10, 2022, 3 pages.
Office Action received for Australian Patent Application No. 2020217458, mailed on Sep. 2, 2021, 6 pages.
Office Action received for Australian Patent Application No. 2020239711, mailed on Sep. 13, 2021, 5 pages.
Office Action received for Australian Patent Application No. 2020257092, mailed on Mar. 3, 2021, 7 pages.
Office Action received for Australian Patent Application No. 2020257092, mailed on Nov. 30, 2020, 6 pages.
Office Action received for Australian Patent Application No. 2021100721, mailed on Jun. 4, 2021, 7 pages.
Office Action received for Australian Patent Application No. 2021100721, mailed on Oct. 18, 2021, 4 pages.
Office Action received for Australian Patent Application No. 2021201403, mailed on Mar. 16,2021, 3 pages.
Office Action received for Australian Patent Application No. 2021203669, mailed on Apr. 5, 2022, 3 pages.
Office Action received for Australian Patent Application No. 2021204454, mailed on Aug. 9, 2021, 7 pages.
Office Action received for Australian Patent Application No. 2021261941, mailed on Nov. 3, 2022, 3 pages.
Office Action received for Australian Patent Application No. 2022200515, mailed on Nov. 2, 2022, 2 pages.
Office Action received for Australian Patent Application No. 2022200901, mailed on Dec. 19, 2022, 4 pages.
Office Action received for Australian Patent Application No. 2022201532, mailed on Dec. 19, 2022, 5 pages.
Office Action received for Australian Patent Application No. 2022204466, mailed on Jun. 7, 2023, 4 pages.
Office Action received for Australian Patent Application No. 2022241590, mailed on Jun. 7, 2023, 7 pages.
Office Action received for Australian Patent Application No. 2022241590, mailed on Mar. 17, 2023, 5 pages.
Office Action received for Australian Patent Application No. 2022241590, mailed on Nov. 18, 2022, 8 pages.
Office Action received for Chinese Patent Application No. 201710493025.3, mailed on Dec. 6, 2019, 11 pages (5 pages of English Translation and 6 pages of Official Copy).
Office Action received for Chinese Patent Application No. 201710493025.3, mailed on Jan. 6, 2021, 17 pages (8 pages of English Translation and 9 pages of Official Copy).
Office Action received for Chinese Patent Application No. 201710493025.3, mailed on Jul. 10, 2020, 17 pages (9 pages of English Translation and 8 pages of Official Copy).
Office Action received for Chinese Patent Application No. 201710493025.3, mailed on Sep. 19, 2017, 2 pages (1 page of English Translation and 1 page of official copy).
Office Action received for Chinese Patent Application No. 201810730279.7, mailed on Jul. 6, 2020, 7 pages (4 pages of English Translation and 3 pages of Official Copy).
Office Action received for Chinese Patent Application No. 201810730279.7, mailed on Mar. 4, 2020, 14 pages (8 pages of English Translation and 6 pages of Official Copy).
Office Action received for Chinese Patent Application No. 201810730279.7, mailed on May 7, 2019, 15 pages (8 pages of English Translation and 7 pages of Official Copy).
Office Action received for Chinese Patent Application No. 201810730279.7, mailed on Nov. 5, 2019, 14 pages (8 pages of English Translation and 6 pages of Official Copy).
Office Action received for Chinese Patent Application No. 201811151702.4, mailed on Mar. 4, 2020, 13 pages (8 pages of English Translation and 5 pages of Official Copy).
Office Action received for Chinese Patent Application No. 201811151702.4, mailed on May 7, 2019, 16 pages (8 pages of English Translation and 8 pages of Official Copy).
Office Action received for Chinese Patent Application No. 201811151702.4, mailed on Oct. 9, 2019, 11 pages (6 pages of English Translation and 5 pages of Official Copy).
Office Action received for Chinese Patent Application No. 201811152097.2, mailed on May 7, 2019, 18 pages (9 pages of English Translation and 9 pages of Official Copy).
Office Action received for Chinese Patent Application No. 201811152726.1, mailed on Apr. 22, 2019, 15 pages(7 pages of English Translation and 8 pages of Official Copy).
Office Action received for Chinese Patent Application No. 201811152726.1, mailed on Apr. 28, 2021, 14 pages (3 pages of English Translation and 11 pages of Official Copy).
Office Action received for Chinese Patent Application No. 201811152726.1, mailed on Jan. 28, 2021, 13 pages (7 pages of English Translation and 6 pages of Official Copy).
Office Action received for Chinese Patent Application No. 201811152726.1, mailed on Mar. 18, 2020, 12 pages (7 pages of English Translation and 5 pages of Official Copy).
Office Action received for Chinese Patent Application No. 201811152726.1, mailed on Oct. 24, 2019, 14 pages (8 pages of English Translation and 6 pages of Official Copy).
Office Action received for Chinese Patent Application No. 201811152726.1, mailed on Oct. 29, 2020, 12 pages (6 pages of English Translation and 6 pages of Official Copy).
Office Action received for Chinese Patent Application No. 201811539259.8, mailed on Apr. 3, 2020, 10 pages (6 pages of English Translation and 4 pages of Official Copy).

(56) References Cited

OTHER PUBLICATIONS

Office Action received for Chinese Patent Application No. 201811539259.8, mailed on Mar. 13, 2023, 16 pages (8 pages of English Translation and 8 pages of Official Copy).
Office Action received for Chinese Patent Application No. 201811539259.8, mailed on May 24, 2023, 22 pages (2 pages of English Translation and 20 pages of Official Copy).
Office Action received for Chinese Patent Application No. 201811539259.8, mailed on Sep. 3, 2020, 10 pages (6 pages of English Translation and 4 pages of Official Copy).
Office Action received for Chinese Patent Application No. 201811539259.8, mailed on Sep. 18, 2019, 12 pages (6 pages of English Translation and 6 pages of Official Copy).
Office Action received for Chinese Patent Application No. 201811539260.0, mailed on Jun. 3, 2020, 8 pages (5 pages of English Translation and 3 pages of Official Copy).
Office Action received for Chinese Patent Application No. 201811539260.0, mailed on Nov. 4, 2020, 9 pages (5 pages of English Translation and 4 pages of Official Copy).
Office Action received for Chinese Patent Application No. 201811539260.0, mailed on Oct. 8, 2019, 14 pages (7 pages of English Translation and 7 pages of Official Copy).
Office Action received for Chinese Patent Application No. 201880001436.9, mailed on Apr. 28, 2019, 19 pages (11 pages of English Translation and 8 pages of Official copy).
Office Action received for Chinese Patent Application No. 201880001436.9, mailed on Nov. 6, 2019, 24 pages (15 pages of English Translation and 9 pages of Official Copy).
Office Action received for Chinese Patent Application No. 201911128105.4, mailed on Apr. 8, 2021, 10 pages (5 pages of English Translation and 5 pages of Official Copy).
Office Action received for Chinese Patent Application No. 201911128105.4, mailed on Jan. 4, 2021, 14 pages (7 pages of English Translation and 7 pages of Official Copy).
Office Action received for Chinese Patent Application No. 201911128105.4, mailed on Jul. 3, 2020, 18 pages (9 pages of English Translation and 9 pages of Official Copy).
Office Action received for Chinese Patent Application No. 202010125114.4, mailed on Aug. 21, 2020, 16 pages (8 pages of English Translation and 8 pages of Official Copy).
Office Action received for Chinese Patent Application No. 202010125114.4, mailed on Jun. 7, 2021, 7 pages (4 pages of English Translation and 3 pages of Official Copy).
Office Action received for Chinese Patent Application No. 202010125114.4, mailed on Mar. 1, 2021, 15 pages (9 pages of English Translation and 6 pages of Official Copy).
Office Action received for Chinese Patent Application No. 202010742019.9, mailed on Feb. 3, 2021, 17 pages (9 pages of English Translation and 8 pages of Official Copy).
Office Action received for Chinese Patent Application No. 202011336156.9, mailed on May 20, 2021, 13 pages (7 pages of English Translation and 6 pages of Official Copy).
Office Action received for Chinese Patent Application No. 202011450203.2, mailed on Apr. 20, 2022, 9 pages (5 pages of English Translation and 4 pages of Official Copy).
Office Action received for Chinese Patent Application No. 202011450203.2, mailed on Sep. 1, 2021, 12 pages (6 pages of English Translation and 6 pages of Official Copy).
Office Action received for Chinese Patent Application No. 202110235995.X, mailed on Mar. 22, 2022, 17 pages (9 pages of English Translation and 8 pages of Official Copy).
Office Action received for Chinese Patent Application No. 202110235995.X, mailed on Sep. 30, 2022, 13 pages (7 pages of English Translation and 6 pages of Official Copy).
Office Action received for Chinese Patent Application No. 202110248576.X, mailed on Sep. 15, 2021, 28 pages (16 pages of English Translation and 12 pages of Official Copy).
Office Action received for Chinese Patent Application No. 202110818370.6, mailed on Jun. 22, 2022, 7 pages (4 pages of English Translation and 3 pages of Official Copy).
Office Action received for Chinese Patent Application No. 202110818370.6, mailed on Mar. 2, 2022, 13 pages (7 pages of English Translation and 6 pages of Official Copy).
Office Action received for Chinese Patent Application No. 202110819254.6, mailed on May 16, 2022, 16 pages (8 pages of English Translation and 8 pages of Official Copy).
Office Action received for Chinese Patent Application No. 202110819254.6, mailed on Sep. 15, 2022, 13 pages (7 pages of English Translation and 6 pages of Official Copy).
Office Action received for Chinese Patent Application No. 202111652452.4, mailed on Aug. 29, 2022, 23 pages (12 pages of English Translation and 11 pages of Official Copy).
Office Action received for Chinese Patent Application No. 202111652452.4, mailed on Feb. 11, 2023, 28 pages (13 pages of English Translation and 15 pages of Official Copy).
Office Action received for Chinese Patent Application No. 202210646482.2, mailed on Dec. 28, 2022, 17 pages (9 pages of English Translation and 8 pages of Official Copy).
Office Action Received for Danish Patent Application No. PA201670601, mailed on Apr. 10, 2018, 3 pages.
Office Action Received for Danish Patent Application No. PA201670601, mailed on Aug. 9, 2018, 2 pages.
Office Action Received for Danish Patent Application No. PA201670601, mailed on Dec. 11, 2018, 3 pages.
Office Action Received for Danish Patent Application No. PA201670601, mailed on Feb. 6, 2017, 5 pages.
Office Action Received for Danish Patent Application No. PA201670601, mailed on Oct. 21, 2016, 9 pages.
Office Action Received for Danish Patent Application No. PA201670601, mailed on Sep. 26, 2017, 3 pages.
Office Action received for Danish Patent Application No. PA201670602, mailed on Apr. 16, 2018, 3 pages.
Office Action received for Danish Patent Application No. PA201670602, mailed on Feb. 9, 2017, 3 pages.
Office Action received for Danish Patent Application No. PA201670602, mailed on Oct. 25, 2016, 9 pages.
Office Action received for Danish Patent Application No. PA201670602, mailed on Sep. 26, 2017, 3 pages.
Office Action received for Danish Patent Application No. PA201670602, mailed on Nov. 1, 2016, 9 pages.
Office Action received for Danish Patent Application No. PA201670602, mailed on Feb. 19, 2018, 3 pages.
Office Action received for Danish Patent Application No. PA201670604, mailed on Jun. 9, 2017, 3 pages.
Office Action received for Danish Patent Application No. PA201670604, mailed on Nov. 8, 2016, 8 pages.
Office Action received for Danish Patent Application No. PA201670605, mailed on Apr. 9, 2018, 2 pages.
Office Action received for Danish Patent Application No. PA201670605, mailed on Feb. 19, 2018, 2 pages.
Office Action received for Danish Patent Application No. PA201670605, mailed on Jun. 13, 2017, 4 pages.
Office Action received for Danish Patent Application No. PA201670605, mailed on Nov. 14, 2016, 8 pages.
Office Action received for Danish Patent Application No. PA201770392, mailed on Apr. 17, 2018, 2 pages.
Office Action received for Danish Patent Application No. PA201770392, mailed on Dec. 8, 2017, 4 pages.
Office Action received for Danish Patent Application No. PA201770392, mailed on Jun. 20, 2017, 11 pages.
Office Action received for Danish Patent Application No. PA201770401, mailed on Jan. 31, 2018, 3 pages.
Office Action received for Danish Patent Application No. PA201770401, mailed on May 17, 2018, 3 Pages.
Office Action received for Danish Patent Application No. PA201770402, mailed on Apr. 16, 2018, 5 pages.
Office Action received for Danish Patent Application No. PA201770402, mailed on Dec. 18, 2017, 6 pages.
Office Action received for Danish Patent Application No. PA201770402, mailed on Jun. 19, 2017, 11 pages.
Office Action received for Danish Patent Application No. PA201770403, mailed on Dec. 12, 2017, 3 pages.

(56) References Cited

OTHER PUBLICATIONS

Office Action received for Danish Patent Application No. PA201770403, mailed on Jun. 16, 2017, 8 pages.
Office Action received for Danish Patent Application No. PA201770404, mailed on Aug. 8, 2018, 4 pages.
Office Action received for Danish Patent Application No. PA201770404, mailed on Dec. 1, 2017, 5 pages.
Office Action received for Danish Patent Application No. PA201770404, mailed on Feb. 21, 2019, 2 pages.
Office Action received for Danish Patent Application No. PA201770404, mailed on May 1, 2019, 2 pages.
Office Action received for Danish Patent Application No. PA201770406, mailed on Feb. 27, 2018, 7 pages.
Office Action received for Danish Patent Application No. PA201770406, mailed on Jan. 25, 2019, 8 pages.
Office Action received for Danish Patent Application No. PA201770406, mailed on Jun. 22, 2017, 11 pages.
Office Action received for Danish Patent Application No. PA201770406, mailed on Mar. 26, 2019, 3 pages.
Office Action received for Danish Patent Application No. PA201770406, mailed on Nov. 11, 2019, 4 pages.
Office Action received for Danish Patent Application No. PA201770408, mailed on Dec. 21, 2017., 6 pages.
Office Action received for Danish Patent Application No. PA201770408, mailed on Jun. 20, 2017, 9 pages.
Office Action received for Danish Patent Application No. PA201770408, mailed on May 3, 2018, 7 pages.
Office Action received for Danish Patent Application No. PA201770410, mailed on Apr. 9, 2018, 5 pages.
Office Action received for Danish Patent Application No. PA201770410, mailed on Jun. 23, 2017, 9 pages.
Office Action received for Danish Patent Application No. PA201770410, mailed on Nov. 22, 2018, 5 pages.
Office Action received for Danish Patent Application No. PA201870060, mailed on Jan. 15, 2019, 4 pages.
Office Action received for Danish Patent Application No. PA201870060, mailed on Jul. 25, 2019, 2 pages.
Office Action received for Danish Patent Application No. PA201870293, mailed on Jul. 17, 2018, 2 pages.
Office Action received for Danish Patent Application No. PA201870293, mailed on Jun. 19, 2018, 8 pages.
Office Action received for Danish Patent Application No. PA201870419, mailed on Feb. 27, 2020, 8 pages.
Office Action received for Danish Patent Application No. PA201870419, mailed on Sep. 30, 2019, 4 pages.
Office Action received for Danish Patent Application No. PA201870435, mailed on Feb. 6, 2020, 3 pages.
Office Action received for Danish Patent Application No. PA201870435, mailed on May 2, 2019, 3 pages.
Office Action received for Danish Patent Application No. PA201870435, mailed on May 25, 2020, 3 pages.
Office Action received for Danish Patent Application No. PA201870598, mailed on May 1, 2019, 3 pages.
Office Action received for Danish Patent Application No. PA201870598, mailed on Nov. 8, 2019, 4 pages.
Office Action received for Danish Patent Application No. PA202070560, mailed on Dec. 11, 2020, 7 pages.
Office Action received for Danish Patent Application No. PA202070560, mailed on Mar. 10, 2021, 7 pages.
Office Action received for Danish Patent Application No. PA202070617, mailed on Sep. 24, 2021, 4 pages.
Office Action received for Danish Patent Application No. PA202170320, mailed on May 3, 2022, 3 pages.
Office Action received for Danish Patent Application No. PA202270464, mailed on Dec. 20, 2022, 3 pages.
Office Action received for Danish Patent Application No. PA202270464, mailed on Oct. 25, 2022, 9 pages.
Office Action received for Danish Patent Application No. PA202070627, mailed on Oct. 19, 2021, 3 pages.
Office Action received for European Patent Application No. 17813777.4, mailed on Jan. 3, 2020, 5 pages.
Office Action received for European Patent Application No. 18197583.0, mailed on Feb. 28, 2020, 8 pages.
Office Action received for European Patent Application No. 18197589.7, mailed on Oct. 1, 2019, 5 pages.
Office Action received for European Patent Application No. 18728002.9, mailed on Dec. 14, 2020, 15 pages.
Office Action received for European Patent Application No. 19182037.2, mailed on Jun. 16, 2020, 6 pages.
Office Action received for European Patent Application No. 19207753.5, mailed on May 10, 2021, 4 pages.
Office Action received for European Patent Application No. 19207753.5, mailed on Nov. 12, 2020, 5 pages.
Office Action received for European Patent Application No. 19728558.8, mailed on Jun. 21, 2021, 9 pages.
Office Action received for European Patent Application No. 20158824.1, mailed on Jun. 13, 2022, 5 pages.
Office Action received for European Patent Application No. 20158824.1, mailed on May 18, 2021, 10 pages.
Office Action received for European Patent Application No. 20187610.9, mailed on May 21, 2021, 7 pages.
Office Action received for European Patent Application No. 20719301.2, mailed on Feb. 21, 2022, 9 pages.
Office Action received for European Patent Application No. 20719301.2, mailed on Jan. 24, 2023, 9 pages.
Office Action received for European Patent Application No. 20719301.2, mailed on Jan. 28,2021, 15 pages.
Office Action received for European Patent Application No. 21160991.2, mailed on Mar. 24, 2022, 11 pages.
Office Action received for European Patent Application No. 21161005.0, mailed on Apr. 22, 2022, 11 pages.
Office Action received for European Patent Application No. 21197457.1, mailed on May 30, 2023, 8 pages.
Office Action received for European Patent Application No. 21197457.1, mailed on Sep. 2, 2022, 8 pages.
Office Action received for European Patent Application No. 21728781.2, mailed on Mar. 1, 2023, 13 pages.
Office Action received for Indian Patent Application No. 202014041529, mailed on Dec. 6, 2021, 6 pages.
Office Action received for Indian Patent Application No. 202118046028, mailed on Apr. 6, 2022, 6 pages.
Office Action received for Indian Patent Application No. 202215025360, mailed on Mar. 29, 2023, 6 pages.
Office Action received for Indian Patent Application No. 202215025361, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Office Action received for Japanese Patent Application No. 2018-562659, mailed on Dec. 6, 2019, 7 pages (3 pages of English Translation and 4 pages of Official Copy).
Office Action received for Japanese Patent Application No. 2018-562659, mailed on Jul. 26, 2019, 9 pages (4 pages of English Translation and 5 pages of Official Copy).
Office Action received for Japanese Patent Application No. 2018-562659, mailed on Mar. 12, 2021, 79 pages (34 pages of English Translation and 45 pages of Official Copy).
Office Action received for Japanese Patent Application No. 2018-562659, mailed on May 28, 2020, 5 pages (3 pages of English Translation and 2 pages of Official Copy).
Office Action received for Japanese Patent Application No. 2020-047952, mailed on Aug. 27, 2021, 13 pages (6 pages of English Translation and 7 pages of Official Copy).
Office Action received for Japanese Patent Application No. 2020-047952, mailed on Feb. 8, 2021, 6 pages (3 pages of English Translation and 3 pages of Official Copy).
Office Action received for Japanese Patent Application No. 2020-047952, mailed on Jul. 1, 2022, 8 pages (4 pages of English Translation and 4 pages of Official Copy).

(56) References Cited

OTHER PUBLICATIONS

Office Action received for Japanese Patent Application No. 2020-159840, mailed on Dec. 10, 2021, 13 pages (7 pages of English Translation and 6 pages of Official Copy).
Office Action received for Japanese Patent Application No. 2020-159840, mailed on Mar. 28, 2022, 6 pages (3 pages of English Translation and 3 pages of Official Copy).
Office Action received for Japanese Patent Application No. 2020-560927, mailed on Dec. 1, 2021, 3 pages (1 page of English Translation and 2 pages of Official Copy).
Office Action received for Japanese Patent Application No. 2020-560927, mailed on Jun. 10, 2021, 5 pages (2 pages of English Translation and 3 pages of Official Copy).
Office Action received for Japanese Patent Application No. 2021-026630, mailed on Aug. 20, 2021, 7 pages (3 pages of English Translation and 4 pages of Official Copy).
Office Action received for Japanese Patent Application No. 2021-051415, mailed on Jul. 19, 2021, 4 pages (2 pages of English Translation and 2 pages of Official Copy).
Office Action received for Japanese Patent Application No. 2022-016138, mailed on Apr. 24, 2023, 9 pages (5 pages of English Translation and 4 pages of Official Copy).
Office Action received for Korean Patent Application No. 10-2019-7038093, mailed on Feb. 13, 2020, 11 pages (5 pages of English Translation and 6 pages of Official Copy).
Office Action received for Korean Patent Application No. 10-2020-7031319, mailed on Dec. 8, 2020, 14 pages (6 pages of English Translation and 8 pages of Official Copy).
Office Action received for Korean Patent Application No. 10-2020-7031700, mailed on Dec. 15, 2020, 6 pages (2 pages of English Translation and 4 pages of official Copy).
Office Action received for Korean Patent Application No. 10-2020-7032488, mailed on Feb. 9, 2021, 11 pages (5 pages of English Translation and 6 pages of Official Copy).
Office Action received for Korean Patent Application No. 10-2021-7021047, mailed on Aug. 13, 2021, 5 pages (2 pages of English Translation and 3 pages of Official Copy).
Office Action received for Korean Patent Application No. 10-2021-7029861, mailed on Jan. 25, 2022, 11 pages (5 pages of English Translation and 6 pages of Official Copy).
Office Action received for Korean Patent Application No. 10-2021-7029861, mailed on Nov. 1, 2022, 7 pages (3 pages of English Translation and 4 pages of Official Copy).
Office Action received for Korean Patent Application No. 10-2022-7001332, mailed on Apr. 20, 2023, 8 pages (4 pages of English Translation and 4 pages of Official Copy).
Office Action received for Korean Patent Application No. 10-2022-7001521, mailed on Dec. 26, 2022, 13 pages (6 pages of English Translation and 7 pages of Official Copy).
Partial European Search Report received for European Patent Application No. 20158824.1, mailed on May 8, 2020, 14 pages.
Partial European Search Report received for European Patent Application No. 18197583.0, mailed on Jan. 14, 2019, 18 pages.
Result of Consultation received for European Patent Application No. 18197583.0, mailed on Feb. 24, 2021, 3 pages.
Result of Consultation received for European Patent Application No. 18197589.7, mailed on Dec. 1, 2020, 9 pages.
Result of Consultation received for European Patent Application No. 18197589.7, mailed on Dec. 17, 2020, 6 pages.
Result of Consultation received for European Patent Application No. 19182037.2, mailed on Mar. 22, 2021, 5 pages.
Result of Consultation received for European Patent Application No. 19728558.8, mailed on Jun. 28, 2022, 4 pages.
Result of Consultation received for European Patent Application No. 20158824.1, mailed on May 17, 2022, 7 pages.
Result of Consultation received for European Patent Application No. 20187610.9, mailed on Jun. 1, 2022, 3 pages.
Search Report and Opinion received for Danish Patent Application No. PA201770401, mailed on Jun. 19, 2017, 6 pages.
Search Report and Opinion received for Danish Patent Application No. PA201870060 mailed on Apr. 30, 2018, 7 pages.
Search Report and Opinion received for Danish Patent Application No. PA201870419, mailed on Aug. 27, 2018, 7 pages.
Search Report and Opinion received for Danish Patent Application No. PA201870419, mailed on Sep. 10, 2018, 9 pages.
Search Report and Opinion received for Danish Patent Application No. PA201870435, mailed on Oct. 26, 2018, 9 pages.
Search Report and Opinion received for Danish Patent Application No. PA201870598, mailed on Dec. 5, 2018, 8 pages.
Search Report and Opinion received for Danish Patent Application No. PA202070617, mailed on Dec. 23, 2020, 8 pages.
Search Report and Opinion received for Danish Patent Application No. PA202070627, mailed on Jan. 26, 2021, 9 pages.
Search Report and Opinion received for Danish Patent Application No. PA202170320, mailed on Oct. 6, 2021, 9 pages.
Search Report and Opinion received for Danish Patent Application No. PA202270086, mailed on Apr. 7, 2022, 11 pages.
Search Report received for Danish Patent Application No. PA201770404, mailed on Jun. 20, 2017., 8 Pages.
Search Report received for Danish Patent Application No. PA201770409, mailed on Jun. 20, 2017., 9 Pages.
SolarWinds Network Configuration Manager Administrator Guide, Available online at:—https://web.archive.org/web/20141031133207/http://www.solarwinds.com/documentation/orionNCM/docs/OrionNCMAdministratorGuide.pdf, Oct. 31, 2014, 466 pages.
Summons to Attend Oral Proceedings received for European Patent Application 20158824.1, mailed on Dec. 7, 2021, 6 pages.
Summons to Attend Oral Proceedings received for European Patent Application No. 17813777.4, mailed on Jun. 18, 2020, 8 pages.
Summons to Attend Oral Proceedings received for European Patent Application No. 18197583.0, mailed on Aug. 14, 2020, 12 pages.
Summons to attend Oral proceedings received for European Patent Application No. 18197589.7, mailed on Apr. 9, 2020, 7 pages.
Summons to Attend Oral Proceedings received for European Patent Application No. 18728002.9, mailed on Jun. 3, 2022, 15 pages.
Summons to Attend Oral Proceedings received for European Patent Application No. 19182037.2, mailed on Nov. 24, 2020, 12 pages.
Summons to Attend Oral Proceedings received for European Patent Application No. 19728558.8, mailed on Jan. 18, 2022, 9 pages.
Summons to Attend Oral Proceedings received for European Patent Application No. 20187610.9, mailed on Dec. 16, 2021, 12 pages.
Summons to Attend Oral Proceedings received for European Patent Application No. 20187610.9, mailed on Jan. 27, 2022, 2 pages.
Summons to Attend Oral Proceedings received for European Patent Application No. 21160991.2, mailed on Oct. 19, 2022, 10 pages.
Summons to Attend Oral Proceedings received for European Patent Application No. 21161005.0, mailed on Dec. 13, 2022, 9 pages.
Supplemental Notice of Allowance received for U.S. Appl. No. 16/584,743, mailed on Nov. 25, 2020, 2 pages.
Androidcentral, "How do I respond to group messages from notification bar?", Available online at: https://forums.androidcentral.com/ask-question/952030-how-do-i-respond-group-messages-notification-bar.html, Mar. 25, 2019, 3 pages.
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Bluejeans, "Video Conferencing Software | BlueJeans", Online Available at:—https://www.bluejeans.com/features/video-conferences Retrieved from online at: Apr. 28, 2020, 6 pages.
Boxer David, "Change the permissions of the Google Drive file or folder or Share the file or folder", Blake School Website, Online Available at: https://support.blakeschool.org/hc/en-us/articles/

(56) References Cited

OTHER PUBLICATIONS

231790648-Change-the-permissions-of-the-Google-Drive-file-or-folder-or-Share-the-file-or-folder, Oct. 31, 2016, 2 pages.
Call Me, "Samsung R3 speaker gives you a delicious 360-degree sound experience—with WiFi and Bluetooth | Call me", 0:24 / 3:22, Available Online at: <https://www.youtube.com/watch?v=4Uv_sOhrlro>, Sep. 22, 2016, 3 pages.
CCTV Camera Pros, "View HD Security Cameras on iDVR-PRO iPhone App", Online Available at: https://www.youtube.com/watch?v=LAsZdfys2GM, Apr. 12, 2017, 3 pages.
Computeradv, "Sonos App Navigation & Menu on iPhone", Available online at: https://www.youtube.com/watch?v=Jhz9XvWQ204, Aug. 4, 2015, 1 page.
Crutnacker, "Amazon Echo Tips and Tricks: Playing Music Demonstration", Available Online at: https://www.youtube.com/watch?v=W_bqq2ynUll, Nov. 4, 2015, 1 page.
Review: Samsung Radiant R3 Wireless Speakers, Available Online at: <https://www.youtube.com/watch?v=ZBICVE1WdKE>, Jan. 19, 2016, 3 pages.
Google, "Google Home Help, Listen to music", Datasheet [online], Available Online at: <https://web.archive.org/web/20170326051235/https:/support.google.com/googlehome/answer/7030379?hl=en&ref_topic=7030084>, Mar. 26, 2017, 3 pages.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
IDB, "HomeCam is the Best Way to View Multiple HomeKit Cameras on iPhone & Apple TV", Available online at: https://www.youtube.com/watch?v=6x2oCHgSVUU, Feb. 20, 2018, 3 pages.
Jarvie, "Alexa plays me music", Available online at: https://www.youtube.com/watch?v=bR2ZC8Sy8YQ, Feb. 23, 2015, 1 page.
NBC News, "NBC News—YouTube Democratic Debate (full)", Online available at:—https://www.youtube.com/watch?v=ti2Nokoq1J4, Jan. 17, 2016, 1 page.
Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.
Ring, "Using the Motion Detection Control to Completely Disable Recording", Online available at: https://support.ring.com/hc/en-us/articles/360021797252-Using-the-Motion-Detection-Control-to-Completely-Disable-Recording, Retrieved on May 4, 2021, 4 pages.
Rossignol Joe, "iOS 10 Concept Simplifies Lock Screen with Collapsed Notifications", Available online at : https://www.macrumors.com/2016/06/16/ios-10-collapsed-notifications-concept/, Jun. 16, 2016, 10 pages.
Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.
PartyShare—turn your Xperia into a jukebox, Available at: https://forum.xda-developers.com/crossdevice-dev/sony/app-partyshare-xperia-jukebox-t2877807, Sep. 15, 2014, 5 pages.
Seifert Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Smarttricks, "Top 3 Music Player for Android", Available online at: <https://www.youtube.com/watch?v=He7RTn4CL34>, Feb. 22, 2017, 4 pages.
Sonos, "Sonos Controller App for iPad Product Guide", Available online at:—https://www.sonos.com/documents/productguides/en/iPadGuide_EN.pdf, Nov. 2014, 47 pages.
Spectrum, "Using the Picture-in-Picture (PIP) Feature _ Spectrum Support", Online available at:—https://www.spectrum.net/support/tv/dvr-picture-picture/, 2 pages.
Steve Does, "Arlo's NEW App with new Feature + (Giveaway)", Available online at: https://www.youtube.com/watch?v=jiyWEYCH1BA, Sep. 5, 2019, 5 pages.
Woolsey Amanda, "Apple Watch Tips—How to Add and Play Music", Available online at: <https://www.youtube.com/watch?v=E0QEuqMaoi8>, Apr. 26, 2015, 3 pages.
Advisory Action received for U.S. Appl. No. 16/830,838, mailed on Oct. 10, 2023, 5 pages.
Advisory Action received for U.S. Appl. No. 17/747,804, mailed on Jun. 23, 2023, 6 pages.
Applicant-Initiated Interview Summary received for U.S. Appl. No. 16/830,838, mailed on Sep. 22, 2023, 2 pages.
Applicant-Initiated Interview Summary received for U.S. Appl. No. 17/476,404, mailed on Oct. 31, 2023, 4 pages.
Applicant-Initiated Interview Summary received for U.S. Appl. No. 17/742,273, mailed on Sep. 27, 2023, 4 pages.
Applicant-Initiated Interview Summary received for U.S. Appl. No. 17/992,229, mailed on Aug. 28, 2023, 3 pages.
Applicant-Initiated Interview Summary received for U.S. Appl. No. 17/992,229, mailed on Nov. 30, 2023, 2 pages.
Corrected Notice of Allowance received for U.S. Appl. No. 17/019,845, mailed on Aug. 7, 2023, 4 pages.
Corrected Notice of Allowance received for U.S. Appl. No. 17/752,582, mailed on Jul. 17, 2023, 3 pages.
Corrected Notice of Allowance received for U.S. Appl. No. 18/111,484, mailed on Nov. 8, 2023, 7 pages.
Decision to Grant received for European Patent Application No. 18728002.9, mailed on Aug. 31, 2023, 4 pages.
Examiner's Answer to Appeal Brief received for U.S. Appl. No. 17/116,938, mailed on Oct. 31, 2023, 55 pages.
Extended European Search Report received for European patent Application No. 23191379.9, mailed on Sep. 18, 2023, 8 pages.
Final Office Action received for U.S. Appl. No. 16/830,838, mailed on Jun. 26, 2023, 16 pages.
Final Office Action received for U.S. Appl. No. 17/476,404, mailed on Sep. 12, 2023, 30 pages.
Final Office Action received for U.S. Appl. No. 17/742,273, mailed on Oct. 12, 2023, 58 pages.
Final Office Action received for U.S. Appl. No. 17/992,229, mailed on Sep. 25, 2023, 16 pages.
Intention to Grant received for European Patent Application No. 21728781.2, mailed on Dec. 12, 2023, 8 pages.
Intention to Grant received for European Patent Application No. 21728781.2, mailed on Jul. 28, 2023, 9 pages.
International Preliminary Report on Patentability received for PCT Patent Application No. PCT/US2022/029282, mailed on Nov. 30, 2023, 17 pages.
International Search Report and Written Opinion received for PCT Patent Application No. PCT/US2023/024279, mailed on Nov. 17, 2023, 20 pages.
Invitation to Pay Additional Fees and Partial International Search Report received for PCT Patent Application No. PCT/US2023/024279, mailed on Sep. 26, 2023, 12 pages.
Non-Final Office Action received for U.S. Appl. No. 17/742,273, mailed on Sep. 13, 2023, 58 pages.
Non-Final Office Action received for U.S. Appl. No. 17/746,789, mailed on Jun. 22, 2023, 8 pages.
Non-Final Office Action received for U.S. Appl. No. 17/992,229, mailed on Jul. 13, 2023, 14 pages.
Non-Final Office Action received for U.S. Appl. No. 18/111,484, mailed on Aug. 2, 2023, 8 pages.
Notice of Acceptance received for Australian Patent Application No. 2022204466, mailed on Jul. 25, 2023, 3 pages.
Notice of Acceptance received for Australian Patent Application No. 2022241590, mailed on Nov. 14, 2023, 3 pages.
Notice of Allowance received for Chinese Patent Application No. 202210646482.2, mailed on Sep. 2, 2023, 2 pages (1 page of English Translation and 1 page of Official Copy).

(56) References Cited

OTHER PUBLICATIONS

Notice of Allowance received for Japanese Patent Application No. 2020-047952, mailed on Jun. 26, 2023, 25 pages (1 page of English Translation and 24 pages of Official Copy).
Notice of Allowance received for Japanese Patent Application No. 2022-016138, mailed on Sep. 25, 2023, 3 pages (1 page of English Translation and 2 pages of Official Copy).
Notice of Allowance received for Korean Patent Application No. 10-2022-7001332, mailed on Oct. 25, 2023, 7 pages (2 pages of English Translation and 5 pages of Official Copy).
Notice of Allowance received for Korean Patent Application No. 10-2022-7040554, mailed on Sep. 26, 2023, 7 pages (2 pages of English Translation and 5 pages of Official Copy).
Notice of Allowance received for U.S. Appl. No. 17/464,477, mailed on Jul. 25, 2023, 5 pages.
Notice of Allowance received for U.S. Appl. No. 17/746,789, mailed on Aug. 9, 2023, 7 pages.
Notice of Allowance received for U.S. Appl. No. 18/077,891, mailed on Oct. 19, 2023, 18 pages.
Notice of Allowance received for U.S. Appl. No. 18/111,484, mailed on Oct. 24, 2023, 10 pages.
Office Action received for Australian Patent Application No. 2022241590, mailed on Aug. 15, 2023, 6 pages.
Office Action received for Australian Patent Application No. 2022291522, mailed on Jul. 20, 2023, 3 pages.
Office Action received for Australian Patent Application No. 2022291522, mailed on Oct. 11, 2023, 2 pages.
Office Action received for Chinese Patent Application No. 202110817799.3, mailed on Oct. 26, 2023, 22 pages (13 pages of English Translation and 9 pages of Official Copy).
Office Action received for Chinese Patent Application No. 202111652452.4, mailed on May 19, 2023, 15 pages (8 pages of English Translation and 7 pages of Official Copy).
Office Action received for European Patent Application No. 20719301.2, mailed on Oct. 20, 2023, 11 pages.
Office Action received for European Patent Application No. 20746426.4, mailed on Aug. 17, 2023, 5 pages.
Office Action received for European Patent Application No. 22201007.6, mailed on Oct. 9, 2023, 5 pages.
Office Action received for Japanese Patent Application No. 2022-104306, mailed on Sep. 19, 2023, 4 pages (2 pages of English Translation and 2 pages of Official Copy).
Office Action received for Korean Patent Application No. 10-2022-7001521, mailed on Jun. 21, 2023, 10 pages (5 page of English Translation and 5 pages of Official Copy).
Office Action received for Korean Patent Application No. 10-2022-7040554, mailed on Jun. 20, 2023, 5 pages (2 pages of English Translation and 3 pages of Official Copy).
Office Action received for Korean Patent Application No. 10-2022-7044372, mailed on Aug. 21, 2023, 9 pages (4 pages of English Translation and 5 pages of Official Copy).
Office Action received for Korean Patent Application No. 10-2023-0001668, mailed on Nov. 3, 2023, 5 pages (2 pages of English Translation and 3 pages of Official Copy).
Summons to Attend Oral Proceedings received for European Patent Application No. 21197457.1, mailed on Nov. 23, 2023, 12 pages.
101989072, CN, A, Cited by Chinese Patent Office in an Office Action for related Patent Application No. 202110817799.3 on Feb. 22, 2024.
106134209, CN, A, Cited by the Chinese Patent Office in an Office Action for related Patent Application No. 202010728844.3 on Jan. 27, 2024.
2001-67099, JP, A, Cited by the Japanese Patent Office in an Office Action for related Patent Application No. 2023-028786 on Mar. 22, 2024.
2004-96397, JP, A, Cited by the Japanese Patent Office in an Office Action for related Patent Application No. 2023-022576 on Feb. 26, 2024.
2016-38615, JP, A, Cited by the Japanese Patent Office in an Office Action for related Patent Application No. 2023-028786 on Mar. 22, 2024.
2016-63520, JP, A, Cited by Japanese Patent Office in an Office Action for related Patent Application No. 2022-155232 on Dec. 15, 2023.
2016-157292, JP, A, Cited by the Japanese Patent Office in an Office Action for related Patent Application No. 2023-028786 on Mar. 22, 2024.
2018-200624, JP, A, Cited by the Japanese Patent Office in an Office Action for related Patent Application No. 2023-028786 on Mar. 22, 2024.
Applicant-Initiated Interview Summary received for U.S. Appl. No. 17/978,930, mailed on Apr. 26, 2024, 4 pages.
Brief Communication Regarding Oral Proceedings received for European Patent Application No. 21197457.1, mailed on May 23, 2024, 5 pages.
Decision to Grant received for European Patent Application No. 20746426.4, mailed on May 10, 2024, 2 pages.
Extended European Search Report received for European Patent Application No. 23200934.0, mailed on Apr. 19. 2024, 11 pages.
Extended European Search Report received for European Patent Application No. 24159380.5, mailed on Jun. 4, 2024, 9 pages.
Non-Final Office Action received for U.S. Appl. No. 17/747,804, mailed on Jun. 4, 2024, 20 pages.
Notice of Acceptance received for Australian Patent Application No. 2023203357, mailed on May 16, 2024, 3 pages.
Notice of Acceptance received for Australian Patent Application No. 2023204396, mailed on Apr. 15, 2024, 3 pages.
Notice of Allowance received for Chinese Patent Application No. 201911128105.4, mailed on May 24, 2024, 2 pages (1 page of English Translation and 1 page of Official Copy).
Notice of Allowance received for Korean Patent Application No. 10-2023-7044810, mailed on Apr. 24, 2024, 7 pages (2 pages of English Translation and 5 pages of Official Copy).
Notice of Allowance received for Korean Patent Application No. 10-2024-7001084, mailed on May 22, 2024, 7 pages (2 pages of English Translation and 5 pages of Official Copy).
Notice of Allowance received for U.S. Appl. No. 18/375,457, mailed on May 16, 2024, 15 pages.
Office Action received for European Patent Application No. 21736104.7, mailed on May 22, 2024, 11 pages.
Photo Supreme, "Quick Start Manual", Retrieved from the Internet: URL: https://manualsu.idimager.com/version4/QuickStart-PhotoSupreme.pdf, Dec. 31, 2018, pp. 1-11.
Record of Oral Hearing received for U.S. Appl. No. 17/116,938, mailed on May 29, 2024, 13 pages.
103347116, CN, A, Cited by Chinese Patent Office in an Office Action for related Patent Application No. 201710493025.3 on Dec. 6, 2019.
104469512, CN, A, Cited by Chinese Patent Office in an Office Action for related Patent Application No. 202110248576.X on Sep. 15, 2021.
104766021, CN, A, Cited by Chinese Patent Office in an Office Action for related Patent Application No. 202110819254.6 on May 16, 2022.
104898603, CN, A, Cited by Chinese Patent Office in an Office Action for related Patent Application No. 202010742019.9 on Jul. 6, 2021.
105069118, CN, A, Cited by Chinese Patent Office in an Office Action for related Patent Application No. 201710493025.3 on Dec. 6, 2019.
105159107, CN, A, Cited by Chinese Patent Office in an Office Action for related Patent Application No. 202010742019.9 on Feb. 3, 2021.
105263114, CN, A, Cited by Chinese Patent Office in an Office Action for related Patent Application No. 202010742019.9 on Feb. 3, 2021.
105549947, CN, A, Cited by Chinese Patent Office in an Office Action for related Patent Application No. 202010125114.4 on Aug. 21, 2020.

(56) References Cited

OTHER PUBLICATIONS

105553796, CN, A, Cited by Chinese Patent Office in an Office Action for related Patent Application No. 202010742019.9 on Feb. 3, 2021.
107197441, CN, A, Cited by Chinese Patent Office in an Office Action for related Patent Application No. 202010742019.9 on Jul. 6, 2021.
107613235, CN, A, Cited by Chinese Patent Office in an Office Action for related Patent Application No. 202011336156.9 on May 20, 2021.
1881649, EP, A2, Cited by U.S. Patent Office in an Office Action for related U.S. Appl. No. 15/427,516 on Aug. 28, 2018.
6-178356, JP, A, Cited by Japanese Patent Office in an Office Action for related Patent Application No. 2020-047952 on Feb. 8, 2021.
2002-153678, JP, A, Cited by Japanese Patent Office in an Office Action for related Patent Application No. 2018-562659 on Dec. 6, 2019.
2004-110559, JP, A, Cited by Japanese Patent Office in an Office Action for related Patent Application No. 2022-016138 on Apr. 24, 2023.
2008-99330, JP, A, Cited by Japanese Patent Office in an Office Action for related Patent Application No. 2022-125792 on Jan. 27, 2023.
2009-201127, JP, A, Cited by Japanese Patent Office in an Office Action for related Patent Application No. 2021-051415 on Jul. 19, 2021.
2012-73839, JP, A, Cited by Japanese Patent Office in an Office Action for related Patent Application No. 2022-016138 on Apr. 24, 2023.
2012-123460, JP, A, Cited by Japanese Patent Office in an Office Action for related Patent Application No. 2020-560927 on Jun. 10, 2021.
2014-071835, JP, A, Cited by Japanese Patent Office in an Office Action for related Patent Application No. 2020-159840 on Dec. 10, 2021.
2014-087126, JP, A, Cited by Japanese Patent Office in an Office Action for related Patent Application No. 2020-159840 on Dec. 10, 2021.
2004-110559, JP, A, Cited by Japanese Patent Office in an Office Action for related Patent Application No. 2022-125792 on Jan. 27, 2023.
2015-125671, JP, A, Cited by Japanese Patent Office in an Office Action for related Patent Application No. 2021-051415 on Jul. 19, 2021.
2016-051661, JP, A, Cited by Japanese Patent Office in an Office Action for related Patent Application No. 2020-047952 on Aug. 27, 2021.
2016-119600, JP, A, Cited by Japanese Patent Office in an Office Action for related Patent Application No. 2020-560927 on Jun. 10, 2021.
2017-84253, JP, A, Cited by Japanese Patent Office in an Office Action for related Patent Application No. 2022-016138 on Apr. 24, 2023.
2018-007158, JP, A, Cited by Japanese Patent Office in an Office Action for related Patent Application No. 2020-159840 on Dec. 10, 2021.
2018-063826, JP, A, Cited by Japanese Patent Office in an Office Action for related Patent Application No. 2020-560927 on Jun. 10, 2021.
10-2011-0093040, KR, A, Cited by Australian Patent Office in an Office Action for related Patent Application No. 2019267527 on Jun. 24, 2021.
10-2014-0075932, KR, A, Cited by Korean Patent Office in an Office Action for related Patent Application No. 10-2022-7014651 on Aug. 18, 2022.
10-2015-0005134, KR, A, Cited by Korean Patent Office in an Office Action for related Patent Application No. 10-2018-7034909 on Sep. 30, 2019.
10-2015-0043146, KR, A, Cited by Korean Patent Office in an Office Action for related Patent Application No. 10-2021-7022610 on Oct. 13, 2021.
10-1522311, KR, B1, Cited by Korean Patent Office in an Office Action for related Patent Application No. 10-2020-7031700 on Apr. 21, 2021.
10-2018-0027707, KR, A, Cited by Korean Patent Office in an Office Action for related Patent Application No. 10-2022-7014651 on Aug. 18, 2022.
10-2018-0085931, KR, A, Cited by Indian Patent Office in an Office Action for related Patent Application No. 202215025361 on Mar. 29, 2023.
Applicant-Initiated Interview Summary received for U.S. Appl. No. 16/830,838, mailed on Jun. 17, 2024, 6 pages,.
Applicant-Initiated Interview Summary received for U.S. Appl. No. 17/970,417, mailed on Jun. 26, 2024, 2 pages.
Brief Communication Regarding Oral Proceedings received for European Patent Application No. 21197457.1, mailed on Jun. 19, 2024, 1 page.
Decision on Appeal received for U.S. Appl. No. 17/116,938, mailed on Jun. 14, 2024, 12 pages.
Notice of Allowance received for Korean Patent Application No. 10-2023-0001668, mailed on May 22, 2024, 6 pages (2 pages of English Translation and 4 pages of Official Copy).
10-2020-0054298, KR, A, Cited by the Korean Patent Office in an Office Action for related Patent Application No. 10-2023-7044810 on Apr. 24, 2024.
Applicant-Initiated Interview Summary received for U.S. Appl. No. 16/830,838, mailed on Mar. 11, 2024, 2 pages.
Applicant-Initiated Interview Summary received for U.S. Appl. No. 17/978,930, mailed on Mar. 13, 2024, 3 pages.
Applicant-Initiated Interview Summary received for U.S. Appl. No. 17/992,229, mailed on Mar. 11, 2024, 2 pages.
Corrected Notice of Allowance received for U.S. Appl. No. 18/375,457, mailed on Apr. 11, 2024, 2 pages.
Decision to Grant received for European Patent Application No. 21728781.2, mailed on Feb. 8, 2024, 3 pages.
Decision to Grant received for Japanese Patent Application No. 2022-104306, mailed on Jan. 4, 2024, 3 pages (1 page of English Translation and 2 pages of Official Copy).
Extended European Search Report received for European Patent Application No. 23203414.0, mailed on Jan. 26, 2024, 10 pages.
Extended European Search Report received for European Patent Application No. 23203433.0, mailed on Feb. 7, 2024. 7 pages.
Final Office Action received for U.S. Appl. No. 16/830,838, mailed on Apr. 11, 2024, 17 pages.
Final Office Action received for U.S. Appl. No. 17/978,930, mailed on Apr. 05. 2024. 28 pages.
Intention to Grant received for European Patent Application No. 20746426.4, mailed on Apr. 12, 2024, 9 pages.
Intention to Grant received for European Patent Application No. 20746426.4, mailed on Jan. 5, 2024, 9 pages.
International Search Report and Written Opinion received for PCT Patent Application No. PCT/US2023/031749. mailed on Dec. 6, 2023, 23 pages.
Non-Final Office Action received for U.S. Appl. No. 16/830,838, mailed on Jan. 22, 2024, 17 pages.
Non-Final Office Action received for U.S. Appl. No. 17/970,417, mailed on Apr. 10, 2024, 16 pages.
Non-Final Office Action received for U.S. Appl. No. 17/978,930, mailed on Feb. 12, 2024, 25 pages.
Non-Final Office Action received for U.S. Appl. No. 17/992,229, mailed on Feb. 15, 2024, 17 pages.
Notice of Acceptance received for Australian Patent Application No. 2022291522, mailed on Jan. 31, 2024, 3 pages.
Notice of Allowance received for Chinese Patent Application No. 202210463449.6, mailed on Mar. 9, 2024, 2 pages (1 page of English Translation and 1 page of Official Copy).
Notice of Allowance received for Japanese Patent Application No. 2022-155232, mailed on Feb. 26, 2024, 4 pages (1 page of English Translation and 3 pages of Official Copy).

(56) References Cited

OTHER PUBLICATIONS

Notice of Allowance received for Korean Patent Application No. 10-2022-7001521, mailed on Mar. 22, 2024, 7 pages (2 pages of English Translation and 5 pages of Official Copy).
Notice of Allowance received for U.S. Appl. No. 17/992,229, mailed on Apr. 17, 2024, 9 pages.
Notice of Allowance received for U.S. Appl. No. 18/375,457, mailed on Feb. 23. 2024, 16 pages.
Office Action received for Australian Patent Application No. 2022291522, mailed on Jan. 19, 2024, 2 pages.
Office Action received for Australian Patent Application No. 2023203357. mailed on Feb. 14, 2024, 3 pages.
Office Action received for Australian Patent Application No. 2023204396, mailed on Jan. 8, 2024, 5 pages.
Office Action received for Chinese Patent Application No. 201911128105.4, mailed on Mar. 16, 2024, 7 pages (4 pages of English Translation and 3 pages of Official Copy).
Office Action received for Chinese Patent Application No. 201911128105.4, mailed on Mar. 19, 2024, 16 pages (8 pages of English Translation and 8 pages of Official Copy).
Office Action received for Chinese Patent Application No. 202010728711.6, mailed on Feb. 1, 2024, 30 pages (18 pages of English Translation and 12 pages of Official Copy).
Office Action received for Chinese Patent Application No. 202010728844.3, mailed on Jan. 27, 2024, 16 pages (8 pages of English Translation and 8 pages of Official Copy).
Office Action received for Chinese Patent Application No. 202110817799.3, mailed on Feb. 22, 2024, 24 pages (15 pages of English Translation and 9 pages of Official Copy).
Office Action received for Chinese Patent Application No. 202210463449.6, mailed on Dec. 19, 2023, 11 pages (6 pages of English Translation and 5 pages of Official Copy).
Office Action received for European Patent Application No. 22201007.6. mailed on Mar. 13, 2024, 4 pages.
Office Action received for Japanese Patent Application No. 2022-155232, mailed on Dec. 15, 2023, 9 pages (4 pages of English Translation and 5 pages of Official Copy).
Office Action received for Japanese Patent Application No. 2023-022576, mailed on Feb. 26, 2024, 10 pages (5 pages of English Translation and 5 pages of Official Copy).
Office Action received for Japanese Patent Application No. 2023-028786, mailed on Mar. 22, 2024, 10 pages (5 pages of English Translation and 5 pages of Official Copy).
Office Action received for Korean Patent Application No. 10-2022-7001521, mailed on Dec. 19, 2023, 7 pages (3 pages of English Translation and 4 pages of Official Copy).
Office Action received for Korean Patent Application No. 10-2022-7044372, mailed on Feb. 13, 2024, 10 pages (4 pages of English Translation and 6 pages of Official Copy).
Office Action received for Korean Patent Application No. 10-2023-7011715, mailed on Dec. 20, 2023, 9 pages (4 pages of English Translation and 5 pages of Official Copy).
Corrected Notice of Allowance received for U.S. Appl. No. 18/375,457, mailed on Aug. 16, 2024, 2 pages.
Notice of Allowance received for U.S. Appl. No. 17/978,930, mailed on Aug. 19, 2024, 9 pages.
Office Action received for Australian Patent Application No. 2023251497, mailed on Aug. 9, 2024, 2 pages.
Result of Consultation received for European Patent Application No. 22201007.6, mailed on Aug. 20, 2024, 3 pages.
Applicant-Initiated Interview Summary received for U.S. Appl. No. 18/230,107, mailed on Sep. 20, 2024, 5 pages.
Final Office Action received for U.S. Appl. No. 17/970,417, mailed on Sep. 18, 2024, 24 pages.
Notice of Acceptance received for Australian Patent Application No. 2023251497, mailed on Sep. 19, 2024, 3 pages.
Notice of Allowance received for U.S. Appl. No. 17/116,938, mailed on Sep. 18, 2024, 5 pages.
Office Action received for Chinese Patent Application No. 202110817799.3, mailed on Sep. 4, 2024, 23 pages (15 pages of English Translation and 8 pages of Official Copy).
Office Action received for Chinese Patent Application No. 202410229610.2, mailed on Sep. 3, 2024, 14 pages (7 pages of English Translation and 7 pages of Official Copy).
Corrected Notice of Allowance received for U.S. Appl. No. 18/235,291, mailed on Jul. 18, 2024, 3 pages.
Extended European Search Report received for European Patent Application No. 24165156.1, mailed on Jul. 16, 2024, 7 pages.
Intention to Grant received for European Patent Application No. 20719301.2, mailed on Jul. 2, 2024, 9 pages.
Intention to Grant received for European Patent Application No. 21197457.1, mailed on Jul. 9, 2024, 12 pages.
Minutes of the Oral Proceedings received for European Patent Application No. 21197457.1, mailed on Jul. 3, 2024, 9 pages.
Notice of Allowance received for Chinese Patent Application No. 202010728711.6, mailed on Jul. 1, 2024, 2 pages (1 page of English Translation and 1 page of Official Copy).
Notice of Allowance received for U.S. Appl. No. 16/830,838, mailed on Jul. 15, 2024, 8 pages.
Notice of Allowance received for U.S. Appl. No. 18/235,291, mailed on Jul. 3, 2024, 18 pages.
Office Action received for European Patent Application No. 22201007.6, mailed on Jul. 18, 2024, 4 pages.
Office Action received for European Patent Application No. 23203433.0, mailed on Jul. 9, 2024, 6 pages.
Office Action received for Japanese Patent Application No. 2023-028786, mailed on Aug. 23, 2024, 10 pages (5 pages of English Translation and 5 pages of Official Copy).
Corrected Notice of Allowance received for U.S. Appl. No. 18/235,291, mailed on Aug. 7, 2024, 2 pages.
Decision to Refuse received for Japanese Patent Application No. 2023-022576, mailed on Jul. 26, 2024, 6 pages (3 pages of English Translation and 3 pages of Official Copy).
Non-Final Office Action received for U.S. Appl. No. 18/230,107, mailed on Aug. 7, 2024, 31 pages.
Notice of Allowance received for Korean Patent Application No. 10-2022-7044372, mailed on Jul. 30, 2024, 7 pages (2 pages of English Translation and 5 pages of Official Copy).
Notice of Allowance received for Korean Patent Application No. 10-2023-7011715, mailed on Jul. 25, 2024, 7 pages (2 pages of English Translation and 5 pages of Official Copy).
Adobe Creative Cloud, "Use facial recognition to organize your photos I Adobe Creative Cloud", XP093214604, Available online at: https://www.youtube.com/watch?app=desktop&v=iTDV8nn611A, Jun. 30, 2016, 2 pages.
Advisory Action received for U.S. Appl. No. 17/970,417, mailed on Dec. 12, 2024, 7 pages.
Applicant-Initiated Interview Summary received for U.S. Appl. No. 17/970,417, mailed on Nov. 4, 2024, 2 pages.
Applicant-Initiated Interview Summary received for U.S. Appl. No. 17/991,708, mailed on Dec. 16, 2024, 5 pages.
Applicant-Initiated Interview Summary received for U.S. Appl. No. 18/230,107, mailed on Jan. 21, 2025, 5 pages.
Applicant-Initiated Interview Summary received for U.S. Appl. No. 18/504,001, mailed on Oct. 29, 2024, 4 pages.
Corrected Notice of Allowance received for U.S. Appl. No. 17/992,229, mailed on Oct. 31, 2024, 3 pages.
Decision to Grant received for European Patent Application No. 20719301.2, mailed on Nov. 7, 2024, 3 pages.
Decision to Grant received for European Patent Application No. 21197457.1, mailed on Jan. 7, 2025, 4 pages.
Extended European Search Report received for European Patent Application No. 24208135.4, mailed on Jan. 21, 2025, 13 pages.
Final Office Action received for U.S. Appl. No. 17/991,708, mailed on Dec. 30, 2024, 22 pages.
Final Office Action received for U.S. Appl. No. 18/230,107, mailed on Dec. 2, 2024, 33 pages.
Intention to Grant received for European Patent Application No. 21197457.1, mailed on Nov. 21, 2024, 12 pages.
Intention to Grant received for European Patent Application No. 21197457.1, mailed on Oct. 24, 2024, 12 pages.

(56) References Cited

OTHER PUBLICATIONS

Intention to Grant received for European Patent Application No. 22201007.6, mailed on Jan. 29, 2025, 9 pages.
International Preliminary Report on Patentability received for PCT Patent Application No. PCT/US2023/024279, mailed on Dec. 12, 2024, 15 pages.
Non-Final Office Action received for U.S. Appl. No. 17/991,708, mailed on Oct. 22, 2024, 20 pages.
Non-Final Office Action received for U.S. Appl. No. 18/504,001, mailed on Oct. 9, 2024, 28 pages.
Notice of Acceptance received for Australian Patent Application No. 2024200283, mailed on Nov. 13, 2024, 3 pages.
Notice of Allowance received for Chinese Patent Application No. 202010728844.3, mailed on Sep. 29, 2024, 2 pages (1 page of English Translation and 1 page of Official Copy).
Notice of Allowance received for Chinese Patent Application No. 202080032669.2, mailed on Nov. 11, 2024, 2 pages (1 page of English Translation and 1 page of Official Copy).
Notice of Allowance received for Chinese Patent Application No. 202110817799.3, mailed on Dec. 1, 2024, 3 pages (2 pages of English Translation and 1 page of Official Copy).
Notice of Allowance received for Chinese Patent Application No. 202311560430.4, mailed on Jun. 14, 2024, 4 pages (1 page of English Translation and 3 pages of Official Copy).
Notice of Allowance received for Japanese Patent Application No. 2023-022576, mailed on Dec. 24, 2024, 4 pages (1 page of English Translation and 3 pages of Official Copy).
Notice of Allowance received for Japanese Patent Application No. 2023-028786, mailed on Dec. 2, 2024, 4 pages (1 page of English Translation and 3 pages of Official Copy).
Notice of Allowance received for Korean Patent Application No. 10-2024-0112016, mailed on Dec. 2, 2024, 6 pages (2 pages of English Translation and 4 pages of Official Copy).
Notice of Allowance received for Korean Patent Application No. 10-2024-7028393, mailed on Nov. 20, 2024, 7 pages (2 pages of English Translation and 5 pages of Official Copy).
Notice of Allowance received for U.S. Appl. No. 17/116,938, mailed on Jan. 30, 2025, 5 pages.
Notice of Allowance received for U.S. Appl. No. 17/970,417, mailed on Feb. 5, 2025, 8 pages.
Notice of Allowance received for U.S. Appl. No. 17/992,229, mailed on Oct. 22, 2024, 9 pages.
Notice of Allowance received for U.S. Appl. No. 18/077,891, mailed on Dec. 10, 2024, 9 pages.
Notice of Allowance received for U.S. Appl. No. 18/627,363, mailed on Dec. 20, 2024, 14 pages.
Office Action received for Australian Patent Application No. 2024200283, mailed on Oct. 8, 2024, 2 pages.
Office Action received for Chinese Patent Application No. 202080032669.2, mailed on Sep. 20, 2024, 9 pages (4 pages of English Translation and 5 pages of Official Copy).
Office Action received for Chinese Patent Application No. 202410229610.2, mailed on Dec. 2, 2024, 14 pages (8 pages of English Translation and 6 pages of Official Copy).
Office Action received for European Patent Application No. 21736104.7, mailed on Oct. 21, 2024, 7 pages.
Office Action received for European Patent Application No. 22196865.4, mailed on Oct. 18, 2024, 6 pages.
Office Action received for European Patent Application No. 23200934.0, mailed on Jan. 28, 2025, 8 pages.
Office Action received for European Patent Application No. 24159380.5, mailed on Jan. 31, 2025, 7 pages.
Office Action received for Japanese Patent Application No. 2024-015643, mailed on Jan. 28, 2025, 3 pages (1 page of English Translation and 4 pages of Official Copy).
Office Action received for Korean Patent Application No. 10-2024-7028393, mailed on Sep. 24, 2024, 6 pages (2 pages of English Translation and 4 pages of Official Copy).
Prabeesh, R. K., "Android Studio Tutorial—17—Highlight selected item in a ListView", Available Online at: https://www.youtube.com/watch?v=W6bBYmXP0HY Feb. 24, 2075, 5 pages.
Shoe, Laura, "How to Use Face Detection and Tagging in Adobe Lightroom CC & 6", XP093214657, Available online at: https://www.youtube.com/watch?v=i4Dm3I71UpU, Apr. 21, 2015, 2 pages.
Corrected Notice of Allowance received for U.S. Appl. No. 16/830,838, mailed on Feb. 25, 2025, 2 pages.
Corrected Notice of Allowance received for U.S. Appl. No. 17/116,938, mailed on Feb. 18, 2025, 2 pages.
Corrected Notice of Allowance received for U.S. Appl. No. 17/970,417, mailed on Feb. 20, 2025, 2 pages.
Notice of Allowance received for U.S. Appl. No. 16/830,838, mailed on Feb. 12, 2025, 9 pages.
Notice of Allowance received for U.S. Appl. No. 18/230,107, mailed on Feb. 20, 2025, 28 pages.

* cited by examiner

Figure 7E:
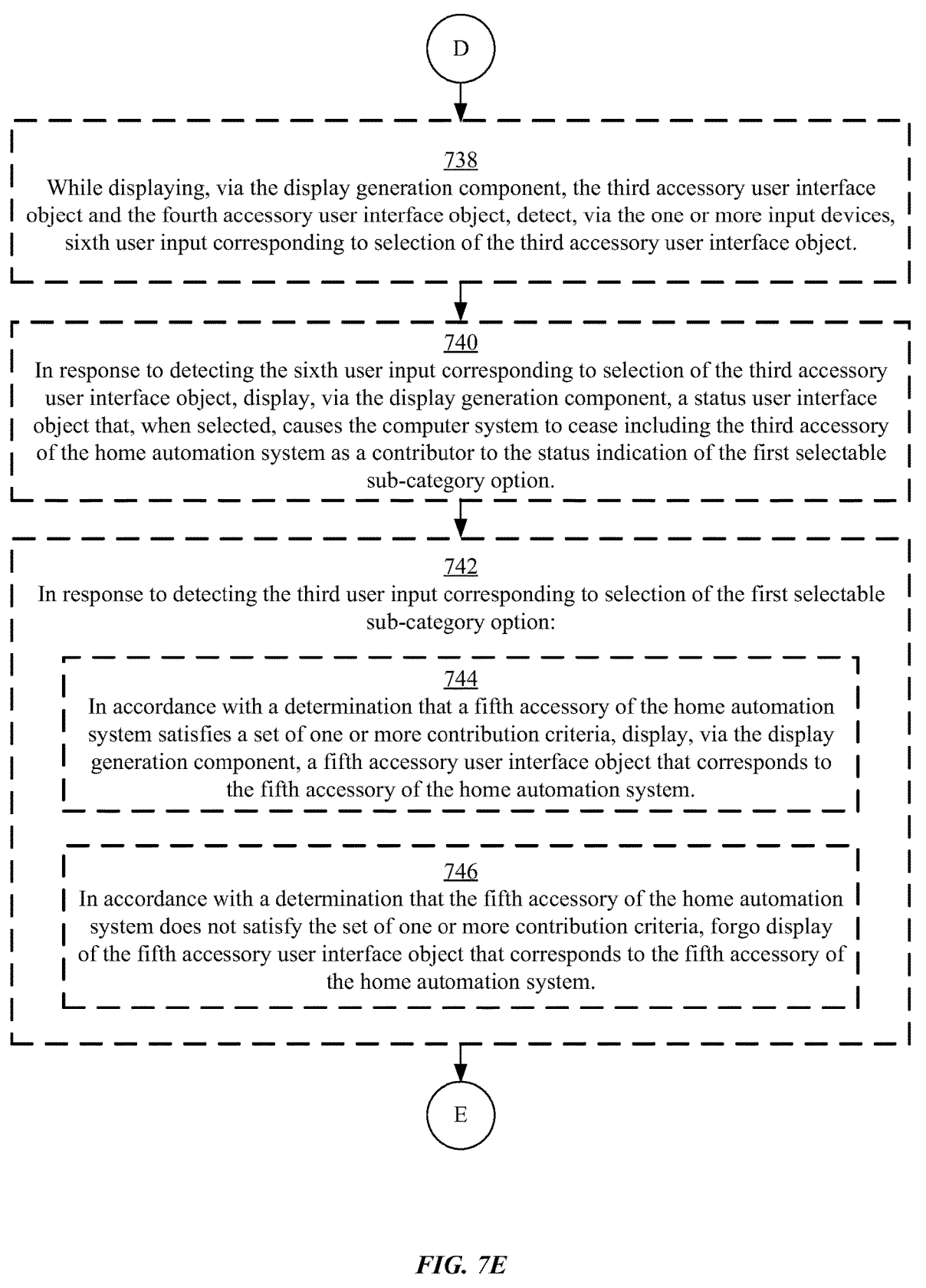

D

738
While displaying, via the display generation component, the third accessory user interface object and the fourth accessory user interface object, detect, via the one or more input devices, sixth user input corresponding to selection of the third accessory user interface object.

740
In response to detecting the sixth user input corresponding to selection of the third accessory user interface object, display, via the display generation component, a status user interface object that, when selected, causes the computer system to cease including the third accessory of the home automation system as a contributor to the status indication of the first selectable sub-category option.

742
In response to detecting the third user input corresponding to selection of the first selectable sub-category option:

744
In accordance with a determination that a fifth accessory of the home automation system satisfies a set of one or more contribution criteria, display, via the display generation component, a fifth accessory user interface object that corresponds to the fifth accessory of the home automation system.

746
In accordance with a determination that the fifth accessory of the home automation system does not satisfy the set of one or more contribution criteria, forgo display of the fifth accessory user interface object that corresponds to the fifth accessory of the home automation system.

Figure 9B:
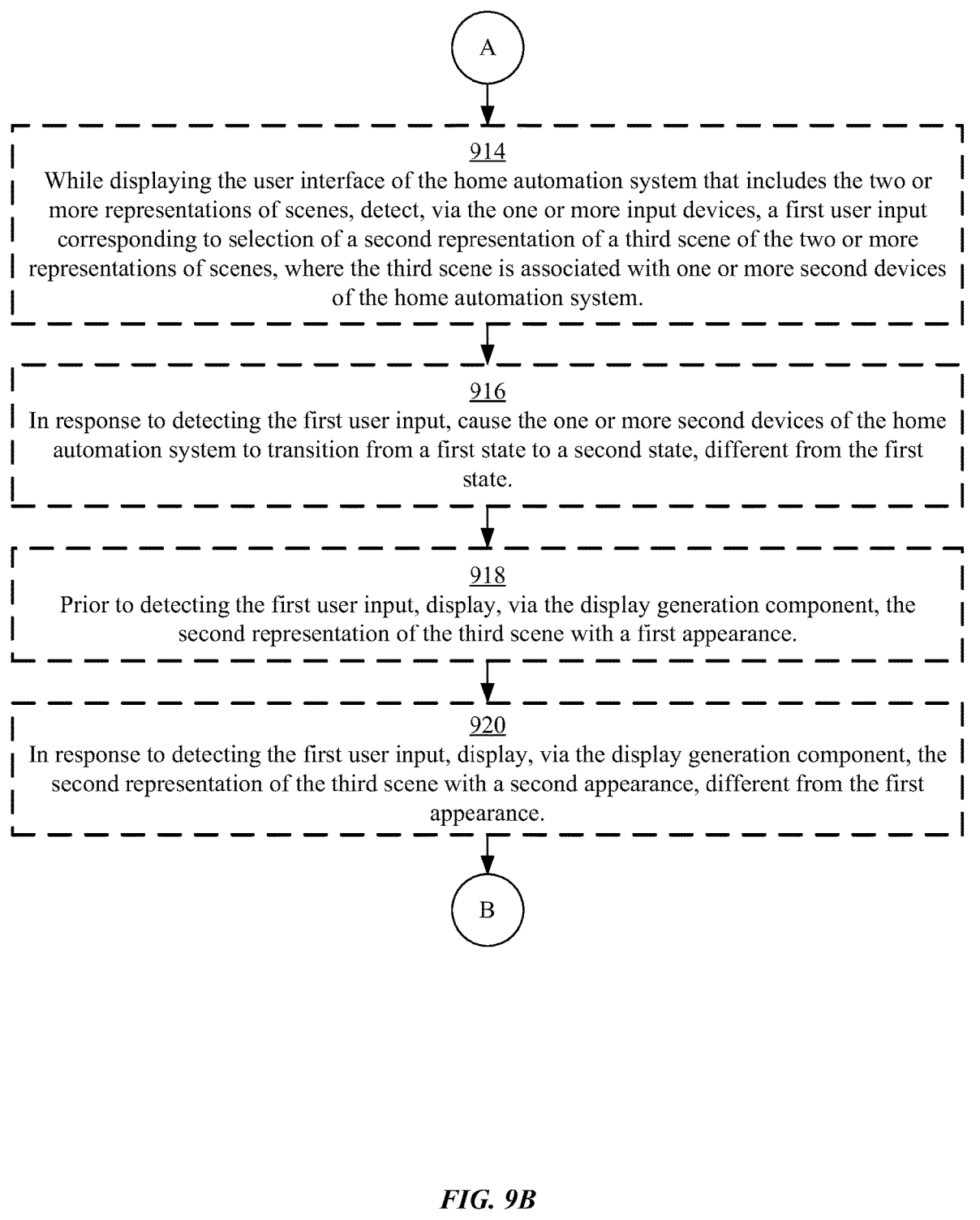

914
While displaying the user interface of the home automation system that includes the two or more representations of scenes, detect, via the one or more input devices, a first user input corresponding to selection of a second representation of a third scene of the two or more representations of scenes, where the third scene is associated with one or more second devices of the home automation system.

916
In response to detecting the first user input, cause the one or more second devices of the home automation system to transition from a first state to a second state, different from the first state.

918
Prior to detecting the first user input, display, via the display generation component, the second representation of the third scene with a first appearance.

920
In response to detecting the first user input, display, via the display generation component, the second representation of the third scene with a second appearance, different from the first appearance.

Figure 9C:
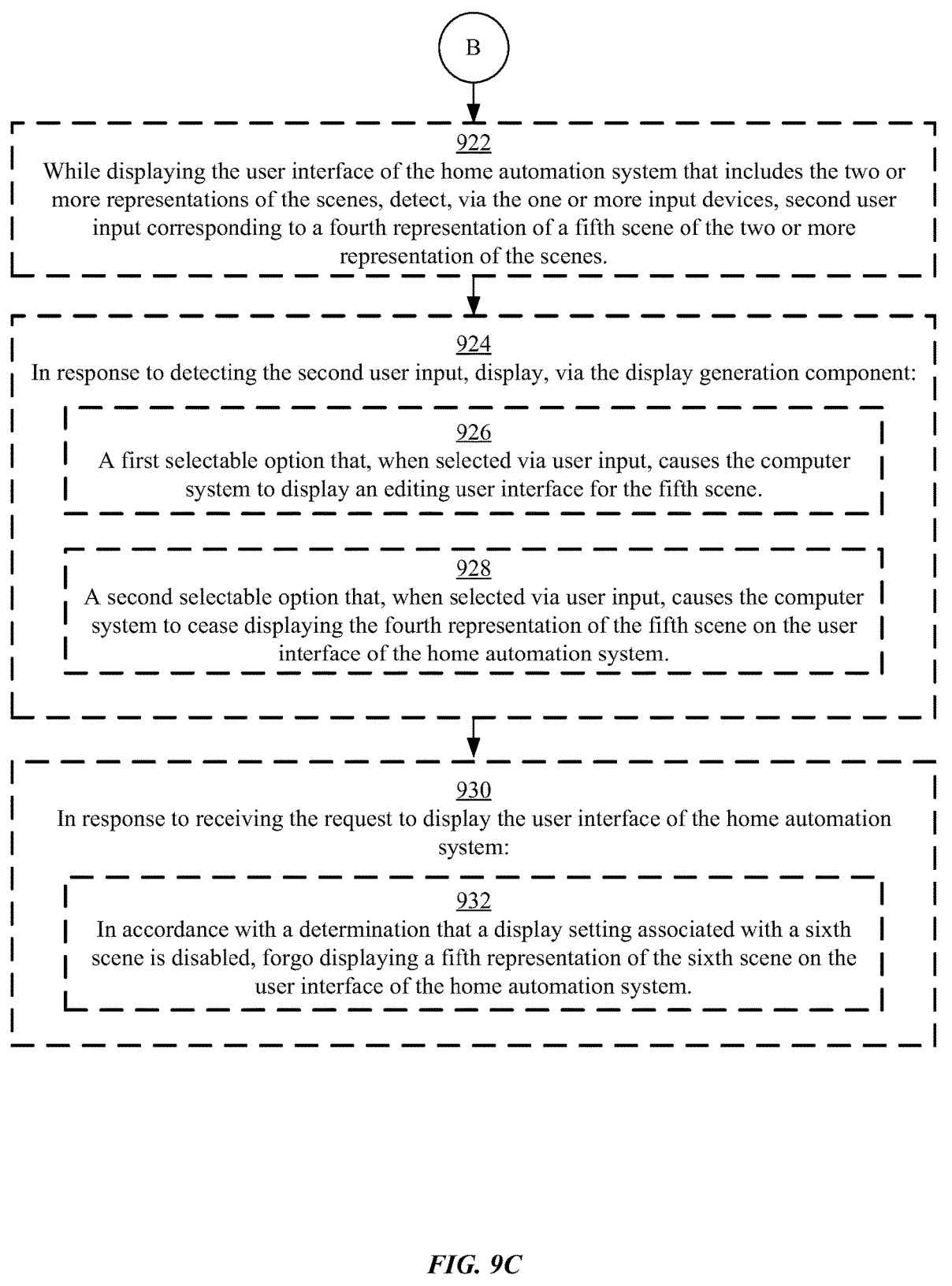

922
While displaying the user interface of the home automation system that includes the two or more representations of the scenes, detect, via the one or more input devices, second user input corresponding to a fourth representation of a fifth scene of the two or more representation of the scenes.

924
In response to detecting the second user input, display, via the display generation component:

926
A first selectable option that, when selected via user input, causes the computer system to display an editing user interface for the fifth scene.

928
A second selectable option that, when selected via user input, causes the computer system to cease displaying the fourth representation of the fifth scene on the user interface of the home automation system.

930
In response to receiving the request to display the user interface of the home automation system:

932
In accordance with a determination that a display setting associated with a sixth scene is disabled, forgo displaying a fifth representation of the sixth scene on the user interface of the home automation system.

Figure 11B:
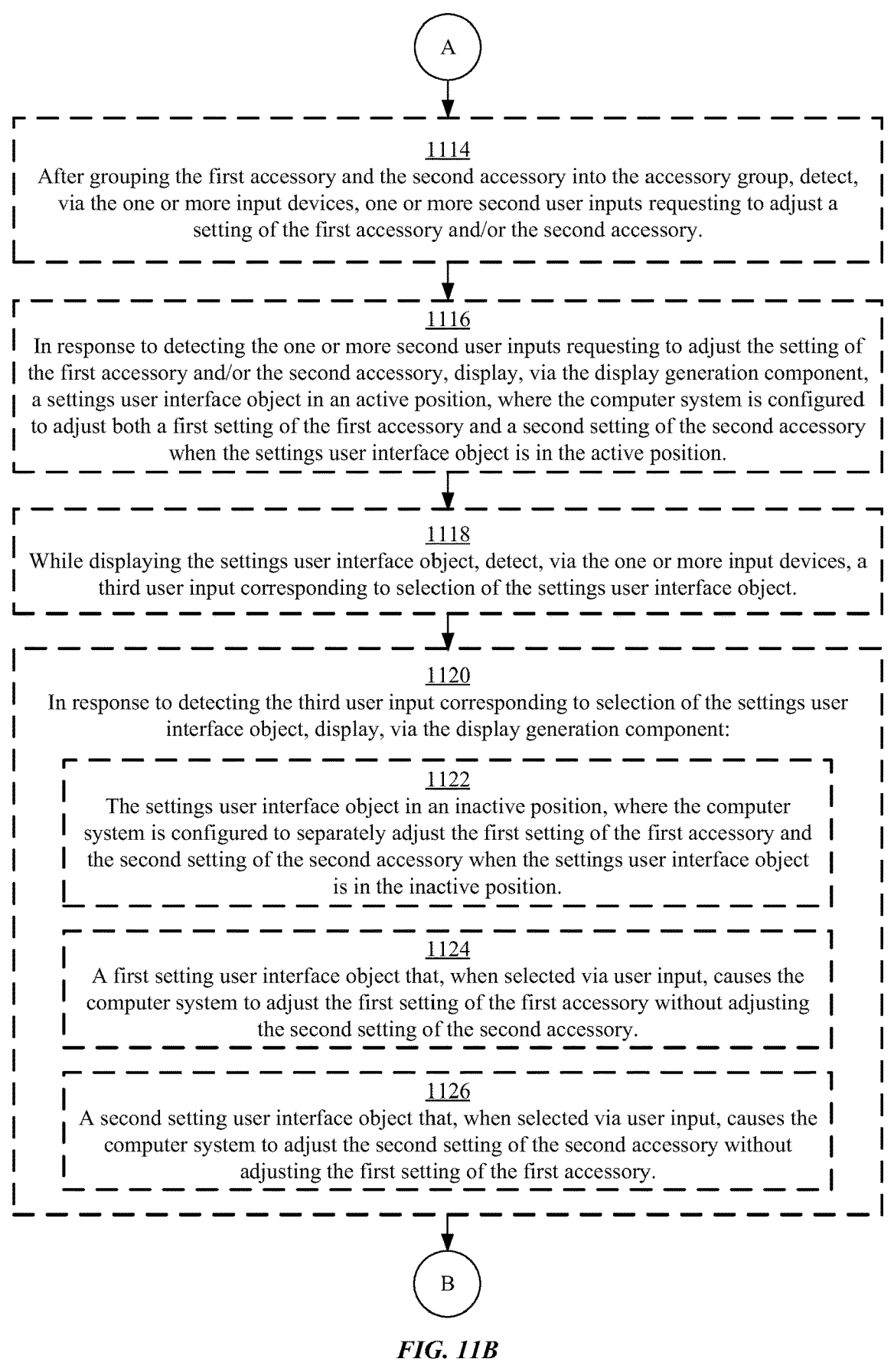

1114
After grouping the first accessory and the second accessory into the accessory group, detect, via the one or more input devices, one or more second user inputs requesting to adjust a setting of the first accessory and/or the second accessory.

1116
In response to detecting the one or more second user inputs requesting to adjust the setting of the first accessory and/or the second accessory, display, via the display generation component, a settings user interface object in an active position, where the computer system is configured to adjust both a first setting of the first accessory and a second setting of the second accessory when the settings user interface object is in the active position.

1118
While displaying the settings user interface object, detect, via the one or more input devices, a third user input corresponding to selection of the settings user interface object.

1120
In response to detecting the third user input corresponding to selection of the settings user interface object, display, via the display generation component:

1122
The settings user interface object in an inactive position, where the computer system is configured to separately adjust the first setting of the first accessory and the second setting of the second accessory when the settings user interface object is in the inactive position.

1124
A first setting user interface object that, when selected via user input, causes the computer system to adjust the first setting of the first accessory without adjusting the second setting of the second accessory.

1126
A second setting user interface object that, when selected via user input, causes the computer system to adjust the second setting of the second accessory without adjusting the first setting of the first accessory.

Figure 15A:
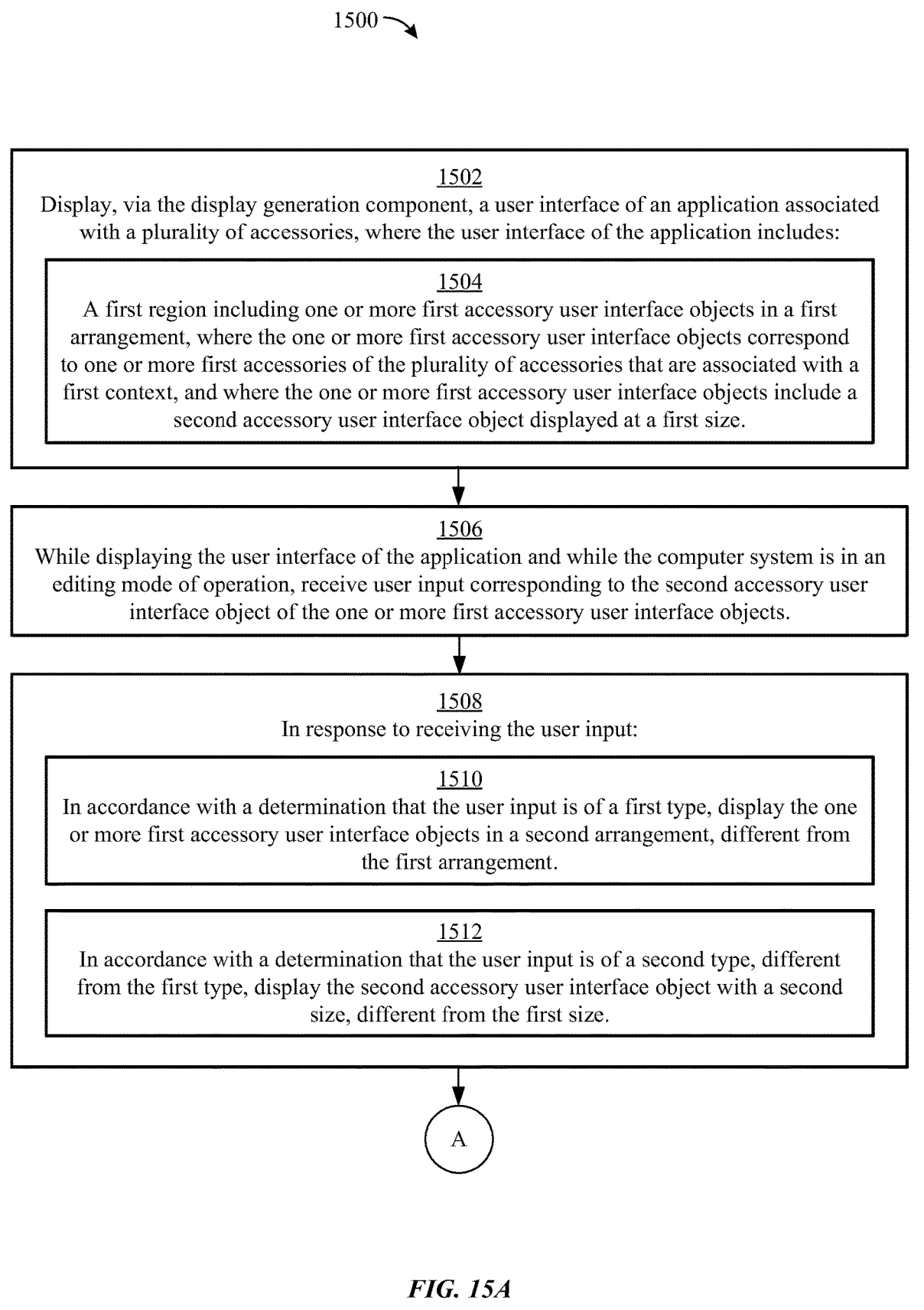

1502
Display, via the display generation component, a user interface of an application associated with a plurality of accessories, where the user interface of the application includes:

1504
A first region including one or more first accessory user interface objects in a first arrangement, where the one or more first accessory user interface objects correspond to one or more first accessories of the plurality of accessories that are associated with a first context, and where the one or more first accessory user interface objects include a second accessory user interface object displayed at a first size.

↓

1506
While displaying the user interface of the application and while the computer system is in an editing mode of operation, receive user input corresponding to the second accessory user interface object of the one or more first accessory user interface objects.

↓

1508
In response to receiving the user input:

1510
In accordance with a determination that the user input is of a first type, display the one or more first accessory user interface objects in a second arrangement, different from the first arrangement.

1512
In accordance with a determination that the user input is of a second type, different from the first type, display the second accessory user interface object with a second size, different from the first size.

USER INTERFACES FOR MANAGING ACCESSORIES

CROSS-REFERENCE TO RELATED APPLICATIONS

This application claims priority to U.S. Provisional Patent Application Ser. No. 63/349,014, entitled "USER INTERFACES FOR MANAGING ACCESSORIES," filed on Jun. 3, 2022, the content of which is hereby incorporated by reference in its entirety.

FIELD

The present disclosure relates generally to computer user interfaces, and more specifically to techniques for managing accessories.

BACKGROUND

Electronic devices are able to communicate with various electronic accessories, such as lights, outlets, locks, speakers, and/or other devices. In addition, when connected to an accessory, an electronic device can adjust a state, setting, and/or position of the accessory.

BRIEF SUMMARY

Some techniques for managing accessories using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing accessories. Such methods and interfaces optionally complement or replace other methods for managing accessories. Such methods and interfaces reduce the cognitive burden on a user and produce a more efficient human-machine interface. For instance, such methods and interfaces display relevant accessories and/or user interface objects that reduce a number of inputs needed to control and/or adjust a respective accessory. In addition, such methods and interfaces provide improved techniques for rearranging accessory user interface objects that reduces the number of unnecessary and/or extraneous user inputs. For battery-operated computing devices, such methods and interfaces conserve power and increase the time between battery charges.

In accordance with some embodiments, a method is described. The method is performed at a computer system that is in communication with a display generation component and one or more input devices. The method comprises: while displaying, via the display generation component, a user interface associated with a home automation system, the user interface including a plurality of selectable category options that correspond to respective contexts of the home automation system, detecting, via the one or more input devices, user input corresponding to selection of a first selectable category option of the plurality of selectable category options, where the first selectable category option of the plurality of selectable category options corresponds to a first context of the home automation system; and in response to detecting the user input corresponding to selection of the first selectable category option of the plurality of selectable category options, displaying, via the display generation component: a first accessory user interface object on the user interface, where the first accessory user interface object corresponds to a first accessory of the home automation system that is associated with the first context of the first selectable category option; a second accessory user interface object on the user interface, where the second accessory user interface object corresponds to a second accessory of the home automation system that is associated with the first context of the first selectable category option; and a first selectable sub-category option corresponding to a sub-category of a category associated with the first selectable category option, wherein the first selectable sub-category option includes a status indication related to one or more accessories of the home automation system that are associated with the sub-category.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while displaying, via the display generation component, a user interface associated with a home automation system, the user interface including a plurality of selectable category options that correspond to respective contexts of the home automation system, detecting, via the one or more input devices, user input corresponding to selection of a first selectable category option of the plurality of selectable category options, where the first selectable category option of the plurality of selectable category options corresponds to a first context of the home automation system; and in response to detecting the user input corresponding to selection of the first selectable category option of the plurality of selectable category options, displaying, via the display generation component: a first accessory user interface object on the user interface, where the first accessory user interface object corresponds to a first accessory of the home automation system that is associated with the first context of the first selectable category option; a second accessory user interface object on the user interface, where the second accessory user interface object corresponds to a second accessory of the home automation system that is associated with the first context of the first selectable category option; and a first selectable sub-category option corresponding to a sub-category of a category associated with the first selectable category option, wherein the first selectable sub-category option includes a status indication related to one or more accessories of the home automation system that are associated with the sub-category.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while displaying, via the display generation component, a user interface associated with a home automation system, the user interface including a plurality of selectable category options that correspond to respective contexts of the home automation system, detecting, via the one or more input devices, user input corresponding to selection of a first selectable category option of the plurality of selectable category options, where the first selectable category option of the plurality of selectable category options corresponds to a first context of the home automation system; and in response to detecting the user input corresponding to selection of the first selectable category option of the plurality of selectable category options, displaying, via the display generation component: a first accessory user interface object on the user interface, where the first accessory user interface object corresponds to a first accessory of the home automation system that is associated with the first context of the first selectable category option; a second accessory user interface object on the user interface, where the second accessory user interface object corresponds to a second accessory of the home automation system that is associated with the first context of the first selectable category option; and a first selectable sub-category option corresponding to a sub-category of a category associated with the first selectable category option, wherein the first selectable sub-category option includes a status indication related to one or more accessories of the home automation system that are associated with the sub-category.

In accordance with some embodiments, a computer system is described. The computer system is in communication with a display generation component and one or more input devices. The computer system comprises: one or more processors; and memory storing one or more programs configured to be executed by the one or more processors, the one or more programs including instructions for: while displaying, via the display generation component, a user interface associated with a home automation system, the user interface including a plurality of selectable category options that correspond to respective contexts of the home automation system, detecting, via the one or more input devices, user input corresponding to selection of a first selectable category option of the plurality of selectable category options, where the first selectable category option of the plurality of selectable category options corresponds to a first context of the home automation system; and in response to detecting the user input corresponding to selection of the first selectable category option of the plurality of selectable category options, displaying, via the display generation component: a first accessory user interface object on the user interface, where the first accessory user interface object corresponds to a first accessory of the home automation system that is associated with the first context of the first selectable category option; a second accessory user interface object on the user interface, where the second accessory user interface object corresponds to a second accessory of the home automation system that is associated with the first context of the first selectable category option; and a first selectable sub-category option corresponding to a sub-category of a category associated with the first selectable category option, wherein the first selectable sub-category option includes a status indication related to one or more accessories of the home automation system that are associated with the sub-category.

In accordance with some embodiments, a computer system is described. The computer system is in communication with a display generation component and one or more input devices. The computer system comprises: means for, while displaying, via the display generation component, a user interface associated with a home automation system, the user interface including a plurality of selectable category options that correspond to respective contexts of the home automation system, detecting, via the one or more input devices, user input corresponding to selection of a first selectable category option of the plurality of selectable category options, where the first selectable category option of the plurality of selectable category options corresponds to a first context of the home automation system; and means for, in response to detecting the user input corresponding to selection of the first selectable category option of the plurality of selectable category options, displaying, via the display generation component: a first accessory user interface object on the user interface, where the first accessory user interface object corresponds to a first accessory of the home automation system that is associated with the first context of the first selectable category option; a second accessory user interface object on the user interface, where the second accessory user interface object corresponds to a second accessory of the home automation system that is associated with the first context of the first selectable category option; and a first selectable sub-category option corresponding to a sub-category of a category associated with the first selectable category option, wherein the first selectable sub-category option includes a status indication related to one or more accessories of the home automation system that are associated with the sub-category.

In accordance with some embodiments, a computer program product is described. The computer program product comprises one or more programs configured to be executed by one or more processors of a computer system that is in communication with a display generation component and one or more input devices, the one or more programs including instructions for: while displaying, via the display generation component, a user interface associated with a home automation system, the user interface including a plurality of selectable category options that correspond to respective contexts of the home automation system, detecting, via the one or more input devices, user input corresponding to selection of a first selectable category option of the plurality of selectable category options, where the first selectable category option of the plurality of selectable category options corresponds to a first context of the home automation system; and in response to detecting the user input corresponding to selection of the first selectable category option of the plurality of selectable category options, displaying, via the display generation component: a first accessory user interface object on the user interface, where the first accessory user interface object corresponds to a first accessory of the home automation system that is associated with the first context of the first selectable category option; a second accessory user interface object on the user interface, where the second accessory user interface object corresponds to a second accessory of the home automation system that is associated with the first context of the first selectable category option; and a first selectable sub-category option corresponding to a sub-category of a category associated with the first selectable category option, wherein the first selectable sub-category option includes a status indication related to one or more accessories of the home automation system that are associated with the sub-category.

In accordance with some embodiments, a method is described. The method is performed at a computer system that is in communication with one or more input devices and a display generation component. The method comprises: receiving, via the one or more input devices, a request to display a user interface of a home automation system; in response to receiving the request to display the user interface of the home automation system, displaying, via the display generation component, the user interface of the home automation system that includes two or more representations of scenes associated with one or more respective devices of the home automation system, where: in accordance with a determination that a set of one or more suggestion criteria indicates a first relative priority of the scenes, displaying the two or more representations of the scenes in a first arrangement on the user interface of the home automation system; and in accordance with a determination that the set of one or more suggestion criteria indicates a second relative priority of the scenes, different from the first relative priority, displaying the two or more representations of the scenes in a second arrangement, different from the first arrangement, on the user interface of the home automation system; and after displaying the user interface of the home automation system including the two or more representations of the scenes: in accordance with a determination that the set of one or more suggestion criteria indicates a change in relative priority of the scenes, displaying the user interface of the home automation system with the two or more representations of the scenes in a third arrangement on the user interface of the home automation system.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: receiving, via the one or more input devices, a request to display a user interface of a home automation system; in response to receiving the request to display the user interface of the home automation system, displaying, via the display generation component, the user interface of the home automation system that includes two or more representations of scenes associated with one or more respective devices of the home automation system, where: in accordance with a determination that a set of one or more suggestion criteria indicates a first relative priority of the scenes, displaying the two or more representations of the scenes in a first arrangement on the user interface of the home automation system; and in accordance with a determination that the set of one or more suggestion criteria indicates a second relative priority of the scenes, different from the first relative priority, displaying the two or more representations of the scenes in a second arrangement, different from the first arrangement, on the user interface of the home automation system; and after displaying the user interface of the home automation system including the two or more representations of the scenes: in accordance with a determination that the set of one or more suggestion criteria indicates a change in relative priority of the scenes, displaying the user interface of the home automation system with the two or more representations of the scenes in a third arrangement on the user interface of the home automation system.

In accordance with some embodiments, a transitory computer-readable storage medium is described. The transitory computer-readable storage medium stores one or more programs configured to be executed by one or more processors of a computer system that is in communication with one or more input devices and a display generation component, the one or more programs including instructions for: receiving, via the one or more input devices, a request to display a user interface of a home automation system; in response to receiving the request to display the user interface of the home automation system, displaying, via the display generation component, the user interface of the home automation system that includes two or more representations of scenes associated with one or more respective devices of the home automation system, where: in accordance with a determination that a set of one or more suggestion criteria indicates a first relative priority of the scenes, displaying the two or more representations of the scenes in a first arrangement on the user interface of the home automation system; and in accordance with a determination that the set of one or more suggestion criteria indicates a second relative priority of the scenes, different from the first relative priority, displaying the two or more representations of the scenes in a second arrangement, different from the first arrangement, on the user interface of the home automation system; and after displaying the user interface of the home automation system including the two or more representations of the scenes: in accordance with a determination that the set of one or more suggestion criteria indicates a change in relative priority of the scenes, displaying the user interface of the home automation system with the two or more representations of the scenes in a third arrangement on the user interface of the home automation system.

In accordance with some embodiments, a computer system is described. The computer system is in communication with one or more input devices and a display generation component. The computer system comprises: one or more processors; and memory storing one or more programs configured to be executed by the one or more processors, the one or more programs including instructions for: receiving, via the one or more input devices, a request to display a user interface of a home automation system; in response to receiving the request to display the user interface of the home automation system, displaying, via the display generation component, the user interface of the home automation system that includes two or more representations of scenes associated with one or more respective devices of the home automation system, where: in accordance with a determination that a set of one or more suggestion criteria indicates a first relative priority of the scenes, displaying the two or more representations of the scenes in a first arrangement on the user interface of the home automation system; and in accordance with a determination that the set of one or more suggestion criteria indicates a second relative priority of the scenes, different from the first relative priority, displaying the two or more representations of the scenes in a second arrangement, different from the first arrangement, on the user interface of the home automation system; and after displaying the user interface of the home automation system including the two or more representations of the scenes: in accordance with a determination that the set of one or more suggestion criteria indicates a change in relative priority of the scenes, displaying the user interface of the home automation system with the two or more representations of the scenes in a third arrangement on the user interface of the home automation system.

In accordance with some embodiments, a computer system is described. The computer system is in communication with one or more input devices and a display generation component. The computer system comprises: means for receiving, via the one or more input devices, a request to display a user interface of a home automation system; means for, in response to receiving the request to display the user interface of the home automation system, displaying, via the display generation component, the user interface of the home automation system that includes two or more representations of scenes associated with one or more respective devices of the home automation system, where: in accordance with a determination that a set of one or more suggestion criteria indicates a first relative priority of the scenes, displaying the two or more representations of the scenes in a first arrangement on the user interface of the home automation system; and in accordance with a determination that the set of one or more suggestion criteria indicates a second relative priority of the scenes, different from the first relative priority, displaying the two or more representations of the scenes in a second arrangement, different from the first arrangement, on the user interface of the home automation system; and means for, after displaying the user interface of the home automation system including the two or more representations of the scenes: in accordance with a determination that the set of one or more suggestion criteria indicates a change in relative priority of the scenes, displaying the user interface of the home automation system with the two or more representations of the scenes in a third arrangement on the user interface of the home automation system.

In accordance with some embodiments, a computer program product is described. The computer program product comprises one or more programs configured to be executed by one or more processors of a computer system that is in communication with one or more input devices and a display generation component, the one or more programs including instructions for: receiving, via the one or more input devices, a request to display a user interface of a home automation system; in response to receiving the request to display the user interface of the home automation system, displaying, via the display generation component, the user interface of the home automation system that includes two or more representations of scenes associated with one or more respective devices of the home automation system, where: in accordance with a determination that a set of one or more suggestion criteria indicates a first relative priority of the scenes, displaying the two or more representations of the scenes in a first arrangement on the user interface of the home automation system; and in accordance with a determination that the set of one or more suggestion criteria indicates a second relative priority of the scenes, different from the first relative priority, displaying the two or more representations of the scenes in a second arrangement, different from the first arrangement, on the user interface of the home automation system; and after displaying the user interface of the home automation system including the two or more representations of the scenes: in accordance with a determination that the set of one or more suggestion criteria indicates a change in relative priority of the scenes, displaying the user interface of the home automation system with the two or more representations of the scenes in a third arrangement on the user interface of the home automation system.

In accordance with some embodiments, a method is described. The method is performed at a computer system that is in communication with one or more input devices and a display generation component. The method comprises: while displaying, via the display generation component, a user interface associated with a home automation system that includes a first accessory, receiving, via the one or more input devices, a set of one or more user inputs that includes a request to associate a second accessory with the home automation system; and in response to receiving the set of one or more user inputs that includes a request to associate the second accessory with the home automation system: in accordance with a determination that the second accessory satisfies a set of one or more criteria: grouping the first accessory and the second accessory into an accessory group, such that the first accessory and the second accessory operate in conjunction with one another, and wherein the accessory group is configured to include the first accessory and the second accessory until a request to remove the first accessory and/or the second accessory from the accessory group is received; and displaying, via the display generation component, an accessory group user interface object corresponding to the accessory group on the user interface without displaying a first user interface object, different from the accessory group user interface object, that corresponds to the first accessory and without displaying a second user interface object, different from the accessory group user interface object, that corresponds to the second accessory; and in accordance with a determination that the second accessory does not satisfy the set of one or more criteria, associating the second accessory with the home automation system without grouping the first accessory and the second accessory into the accessory group.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: while displaying, via the display generation component, a user interface associated with a home automation system that includes a first accessory, receiving, via the one or more input devices, a set of one or more user inputs that includes a request to associate a second accessory with the home automation system; and in response to receiving the set of one or more user inputs that includes a request to associate the second accessory with the home automation system: in accordance with a determination that the second accessory satisfies a set of one or more criteria: grouping the first accessory and the second accessory into an accessory group, such that the first accessory and the second accessory operate in conjunction with one another, and wherein the accessory group is configured to include the first accessory and the second accessory until a request to remove the first accessory and/or the second accessory from the accessory group is received; and displaying, via the display generation component, an accessory group user interface object corresponding to the accessory group on the user interface without displaying a first user interface object, different from the accessory group user interface object, that corresponds to the first accessory and without displaying a second user interface object, different from the accessory group user interface object, that corresponds to the second accessory; and in accordance with a determination that the second accessory does not satisfy the set of one or more criteria, associating the second accessory with the home automation system without grouping the first accessory and the second accessory into the accessory group.

In accordance with some embodiments, a transitory computer-readable storage medium is described. The transitory computer-readable storage medium stores one or more programs configured to be executed by one or more processors of a computer system that is in communication with one or more input devices and a display generation component, the one or more programs including instructions for: while displaying, via the display generation component, a user interface associated with a home automation system that includes a first accessory, receiving, via the one or more input devices, a set of one or more user inputs that includes a request to associate a second accessory with the home automation system; and in response to receiving the set of one or more user inputs that includes a request to associate the second accessory with the home automation system: in accordance with a determination that the second accessory satisfies a set of one or more criteria: grouping the first accessory and the second accessory into an accessory group, such that the first accessory and the second accessory operate in conjunction with one another, and wherein the accessory group is configured to include the first accessory and the second accessory until a request to remove the first accessory and/or the second accessory from the accessory group is received; and displaying, via the display generation component, an accessory group user interface object corresponding to the accessory group on the user interface without displaying a first user interface object, different from the accessory group user interface object, that corresponds to the first accessory and without displaying a second user interface object, different from the accessory group user interface object, that corresponds to the second accessory; and in accordance with a determination that the second accessory does not satisfy the set of one or more criteria, associating the second accessory with the home automation system without grouping the first accessory and the second accessory into the accessory group.

In accordance with some embodiments, a computer system is described. The computer system is in communication with one or more input devices and a display generation component. The computer system comprises: one or more processors; and memory storing one or more programs configured to be executed by the one or more processors, the one or more programs including instructions for: while displaying, via the display generation component, a user interface associated with a home automation system that includes a first accessory, receiving, via the one or more input devices, a set of one or more user inputs that includes a request to associate a second accessory with the home automation system; and in response to receiving the set of one or more user inputs that includes a request to associate the second accessory with the home automation system: in accordance with a determination that the second accessory satisfies a set of one or more criteria: grouping the first accessory and the second accessory into an accessory group, such that the first accessory and the second accessory operate in conjunction with one another, and wherein the accessory group is configured to include the first accessory and the second accessory until a request to remove the first accessory and/or the second accessory from the accessory group is received; and displaying, via the display generation component, an accessory group user interface object corresponding to the accessory group on the user interface without displaying a first user interface object, different from the accessory group user interface object, that corresponds to the first accessory and without displaying a second user interface object, different from the accessory group user interface object, that corresponds to the second accessory; and in accordance with a determination that the second accessory does not satisfy the set of one or more criteria, associating the second accessory with the home automation system without grouping the first accessory and the second accessory into the accessory group.

In accordance with some embodiments, a computer system is described. The computer system is in communication with one or more input devices and a display generation component. The computer system comprises: means for, while displaying, via the display generation component, a user interface associated with a home automation system that includes a first accessory, receiving, via the one or more input devices, a set of one or more user inputs that includes a request to associate a second accessory with the home automation system; and means for, in response to receiving the set of one or more user inputs that includes a request to associate the second accessory with the home automation system: in accordance with a determination that the second accessory satisfies a set of one or more criteria: grouping the first accessory and the second accessory into an accessory group, such that the first accessory and the second accessory operate in conjunction with one another, and wherein the accessory group is configured to include the first accessory and the second accessory until a request to remove the first accessory and/or the second accessory from the accessory group is received; and displaying, via the display generation component, an accessory group user interface object corresponding to the accessory group on the user interface without displaying a first user interface object, different from the accessory group user interface object, that corresponds to the first accessory and without displaying a second user interface object, different from the accessory group user interface object, that corresponds to the second accessory; and in accordance with a determination that the second accessory does not satisfy the set of one or more criteria, associating the second accessory with the home automation system without grouping the first accessory and the second accessory into the accessory group.

In accordance with some embodiments, a computer program product is described. The computer program product comprises one or more programs configured to be executed by one or more processors of a computer system that is in communication with one or more input devices and a display generation component, the one or more programs including instructions for: while displaying, via the display generation component, a user interface associated with a home automation system that includes a first accessory, receiving, via the one or more input devices, a set of one or more user inputs that includes a request to associate a second accessory with the home automation system; and in response to receiving the set of one or more user inputs that includes a request to associate the second accessory with the home automation system: in accordance with a determination that the second accessory satisfies a set of one or more criteria: grouping the first accessory and the second accessory into an accessory group, such that the first accessory and the second accessory operate in conjunction with one another, and wherein the accessory group is configured to include the first accessory and the second accessory until a request to remove the first accessory and/or the second accessory from the accessory group is received; and displaying, via the display generation component, an accessory group user interface object corresponding to the accessory group on the user interface without displaying a first user interface object, different from the accessory group user interface object, that corresponds to the first accessory and without displaying a second user interface object, different from the accessory group user interface object, that corresponds to the second accessory; and in accordance with a determination that the second accessory does not satisfy the set of one or more criteria, associating the second accessory with the home automation system without grouping the first accessory and the second accessory into the accessory group.

In accordance with some embodiments, a method is described. The method is performed at a computer system that is in communication with one or more input devices and a display generation component. The method comprises: displaying, via the display generation component, a user interface of an application associated with a plurality of camera accessories, where the user interface of the application includes an arrangement of camera tiles corresponding to the plurality of cameras, the arrangement of camera tiles including: a first camera tile having a first size that is displayed at a first position on the user interface of the application; and a second camera tile having a second size, different from the first size, that is displayed at a second position on the user interface of the application, different from the first position; while displaying the user interface, receiving, via the one or more input devices, user input corresponding to the first camera tile; and in response to receiving the user input corresponding to the first camera tile: displaying the first camera tile at a third position, different from the first position; and displaying the first camera tile at the second size.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: displaying, via the display generation component, a user interface of an application associated with a plurality of camera accessories, where the user interface of the application includes an arrangement of camera tiles corresponding to the plurality of cameras, the arrangement of camera tiles including: a first camera tile having a first size that is displayed at a first position on the user interface of the application; and a second camera tile having a second size, different from the first size, that is displayed at a second position on the user interface of the application, different from the first position; while displaying the user interface, receiving, via the one or more input devices, user input corresponding to the first camera tile; and in response to receiving the user input corresponding to the first camera tile: displaying the first camera tile at a third position, different from the first position; and displaying the first camera tile at the second size.

In accordance with some embodiments, a transitory computer-readable storage medium is described. The transitory computer-readable storage medium stores one or more programs configured to be executed by one or more processors of a computer system that is in communication with one or more input devices and a display generation component, the one or more programs including instructions for: displaying, via the display generation component, a user interface of an application associated with a plurality of camera accessories, where the user interface of the application includes an arrangement of camera tiles corresponding to the plurality of cameras, the arrangement of camera tiles including: a first camera tile having a first size that is displayed at a first position on the user interface of the application; and a second camera tile having a second size, different from the first size, that is displayed at a second position on the user interface of the application, different from the first position; while displaying the user interface, receiving, via the one or more input devices, user input corresponding to the first camera tile; and in response to receiving the user input corresponding to the first camera tile: displaying the first camera tile at a third position, different from the first position; and displaying the first camera tile at the second size.

In accordance with some embodiments, a computer system is described. The computer system is in communication with one or more input devices and a display generation component. The computer system comprises: one or more processors; and memory storing one or more programs configured to be executed by the one or more processors, the one or more programs including instructions for: displaying, via the display generation component, a user interface of an application associated with a plurality of camera accessories, where the user interface of the application includes an arrangement of camera tiles corresponding to the plurality of cameras, the arrangement of camera tiles including: a first camera tile having a first size that is displayed at a first position on the user interface of the application; and a second camera tile having a second size, different from the first size, that is displayed at a second position on the user interface of the application, different from the first position; while displaying the user interface, receiving, via the one or more input devices, user input corresponding to the first camera tile; and in response to receiving the user input corresponding to the first camera tile: displaying the first camera tile at a third position, different from the first position; and displaying the first camera tile at the second size.

In accordance with some embodiments, a computer system is described. The computer system is in communication with one or more input devices and a display generation component. The computer system comprises: means for displaying, via the display generation component, a user interface of an application associated with a plurality of camera accessories, where the user interface of the application includes an arrangement of camera tiles corresponding to the plurality of cameras, the arrangement of camera tiles including: a first camera tile having a first size that is displayed at a first position on the user interface of the application; and a second camera tile having a second size, different from the first size, that is displayed at a second position on the user interface of the application, different from the first position; means for, while displaying the user interface, receiving, via the one or more input devices, user input corresponding to the first camera tile; and means for, in response to receiving the user input corresponding to the first camera tile: displaying the first camera tile at a third position, different from the first position; and displaying the first camera tile at the second size.

In accordance with some embodiments, a computer program product is described. The computer program product comprises one or more programs configured to be executed by one or more processors of a computer system that is in communication with one or more input devices and a display generation component, the one or more programs including instructions for: displaying, via the display generation component, a user interface of an application associated with a plurality of camera accessories, where the user interface of the application includes an arrangement of camera tiles corresponding to the plurality of cameras, the arrangement of camera tiles including: a first camera tile having a first size that is displayed at a first position on the user interface of the application; and a second camera tile having a second size, different from the first size, that is displayed at a second position on the user interface of the application, different from the first position; while displaying the user interface, receiving, via the one or more input devices, user input corresponding to the first camera tile; and in response to receiving the user input corresponding to the first camera tile: displaying the first camera tile at a third position, different from the first position; and displaying the first camera tile at the second size.

In accordance with some embodiments, a method is described. The method is performed at a computer system that is in communication with one or more input devices and a display generation component. The method comprises: displaying, via the display generation component, a user interface of an application associated with a plurality of accessories, where the user interface of the application includes: a first region including one or more first accessory user interface objects in a first arrangement, where the one or more first accessory user interface objects correspond to one or more first accessories of the plurality of accessories that are associated with a first context, and where the one or more first accessory user interface objects include a second accessory user interface object displayed at a first size; while displaying the user interface of the application and while the computer system is in an editing mode of operation, receiving user input corresponding to the second accessory user interface object of the one or more first accessory user interface objects; and in response to receiving the user input: in accordance with a determination that the user input is of a first type, displaying the one or more first accessory user interface objects in a second arrangement, different from the first arrangement; and in accordance with a determination that the user input is of a second type, different from the first type, displaying the second accessory user interface object with a second size, different from the first size.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: displaying, via the display generation component, a user interface of an application associated with a plurality of accessories, where the user interface of the application includes: a first region including one or more first accessory user interface objects in a first arrangement, where the one or more first accessory user interface objects correspond to one or more first accessories of the plurality of accessories that are associated with a first context, and where the one or more first accessory user interface objects include a second accessory user interface object displayed at a first size; while displaying the user interface of the application and while the computer system is in an editing mode of operation, receiving user input corresponding to the second accessory user interface object of the one or more first accessory user interface objects; and in response to receiving the user input: in accordance with a determination that the user input is of a first type, displaying the one or more first accessory user interface objects in a second arrangement, different from the first arrangement; and in accordance with a determination that the user input is of a second type, different from the first type, displaying the second accessory user interface object with a second size, different from the first size.

In accordance with some embodiments, a transitory computer-readable storage medium is described. The transitory computer-readable storage medium stores one or more programs configured to be executed by one or more processors of a computer system that is in communication with one or more input devices and a display generation component, the one or more programs including instructions for: displaying, via the display generation component, a user interface of an application associated with a plurality of accessories, where the user interface of the application includes: a first region including one or more first accessory user interface objects in a first arrangement, where the one or more first accessory user interface objects correspond to one or more first accessories of the plurality of accessories that are associated with a first context, and where the one or more first accessory user interface objects include a second accessory user interface object displayed at a first size; while displaying the user interface of the application and while the computer system is in an editing mode of operation, receiving user input corresponding to the second accessory user interface object of the one or more first accessory user interface objects; and in response to receiving the user input: in accordance with a determination that the user input is of a first type, displaying the one or more first accessory user interface objects in a second arrangement, different from the first arrangement; and in accordance with a determination that the user input is of a second type, different from the first type, displaying the second accessory user interface object with a second size, different from the first size.

In accordance with some embodiments, a computer system is described. The computer system is in communication with one or more input devices and a display generation component. The computer system comprises: one or more processors; and memory storing one or more programs configured to be executed by the one or more processors, the one or more programs including instructions for: displaying, via the display generation component, a user interface of an application associated with a plurality of accessories, where the user interface of the application includes: a first region including one or more first accessory user interface objects in a first arrangement, where the one or more first accessory user interface objects correspond to one or more first accessories of the plurality of accessories that are associated with a first context, and where the one or more first accessory user interface objects include a second accessory user interface object displayed at a first size; while displaying the user interface of the application and while the computer system is in an editing mode of operation, receiving user input corresponding to the second accessory user interface object of the one or more first accessory user interface objects; and in response to receiving the user input: in accordance with a determination that the user input is of a first type, displaying the one or more first accessory user interface objects in a second arrangement, different from the first arrangement; and in accordance with a determination that the user input is of a second type, different from the first type, displaying the second accessory user interface object with a second size, different from the first size.

In accordance with some embodiments, a computer system is described. The computer system is in communication with one or more input devices and a display generation component. The computer system comprises: means for displaying, via the display generation component, a user interface of an application associated with a plurality of accessories, where the user interface of the application includes: a first region including one or more first accessory user interface objects in a first arrangement, where the one or more first accessory user interface objects correspond to one or more first accessories of the plurality of accessories that are associated with a first context, and where the one or more first accessory user interface objects include a second accessory user interface object displayed at a first size; means for, while displaying the user interface of the application and while the computer system is in an editing mode of operation, receiving user input corresponding to the second accessory user interface object of the one or more first accessory user interface objects; and means for, in response to receiving the user input: in accordance with a determination that the user input is of a first type, displaying the one or more first accessory user interface objects in a second arrangement, different from the first arrangement; and in accordance with a determination that the user input is of a second type, different from the first type, displaying the second accessory user interface object with a second size, different from the first size.

In accordance with some embodiments, a computer program product is described. The computer program product comprises one or more programs configured to be executed by one or more processors of a computer system that is in communication with one or more input devices and a display generation component, the one or more programs including instructions for: displaying, via the display generation component, a user interface of an application associated with a plurality of accessories, where the user interface of the application includes: a first region including one or more first accessory user interface objects in a first arrangement, where the one or more first accessory user interface objects correspond to one or more first accessories of the plurality of accessories that are associated with a first context, and where the one or more first accessory user interface objects include a second accessory user interface object displayed at a first size; while displaying the user interface of the application and while the computer system is in an editing mode of operation, receiving user input corresponding to the second accessory user interface object of the one or more first accessory user interface objects; and in response to receiving the user input: in accordance with a determination that the user input is of a first type, displaying the one or more first accessory user interface objects in a second arrangement, different from the first arrangement; and in accordance with a determination that the user input is of a second type, different from the first type, displaying the second accessory user interface object with a second size, different from the first size.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing accessories, thereby increasing the effectiveness, efficiency, and user satisfaction with such devices. Such methods and interfaces may complement or replace other methods for managing accessories.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7G are a flow diagram illustrating methods for managing accessories of a home automation system, in accordance with some embodiments.

FIGS. 9A-9C are a flow diagram illustrating methods for managing accessory groups, in accordance with some embodiments.

FIGS. 11A-11G are a flow diagram illustrating methods for managing speaker accessories, in accordance with some embodiments.

FIGS. 15A-15D are a flow diagram illustrating methods for displaying accessory user interface objects, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing accessories. For instance, there is a need for electronic devices that provide display groups of accessories and/or devices that are associated with respective categories and/or sub-categories of a home automation system. There is also a need for electronic devices that suggest and/or predict an adjustment to a state of one or more accessories. In addition, there is a need for electronic devices that group two or more accessories into an accessory group that lasts indefinitely. Further, there is a need for electronic devices that facilitate an ability of a user to rearrange and/or resize a display of accessory user interface objects and/or camera user interface objects. Such techniques can reduce the cognitive burden on a user who manages accessories, thereby enhancing productivity. Further, such techniques can reduce processor and battery power otherwise wasted on redundant user inputs.

Figure 8A:
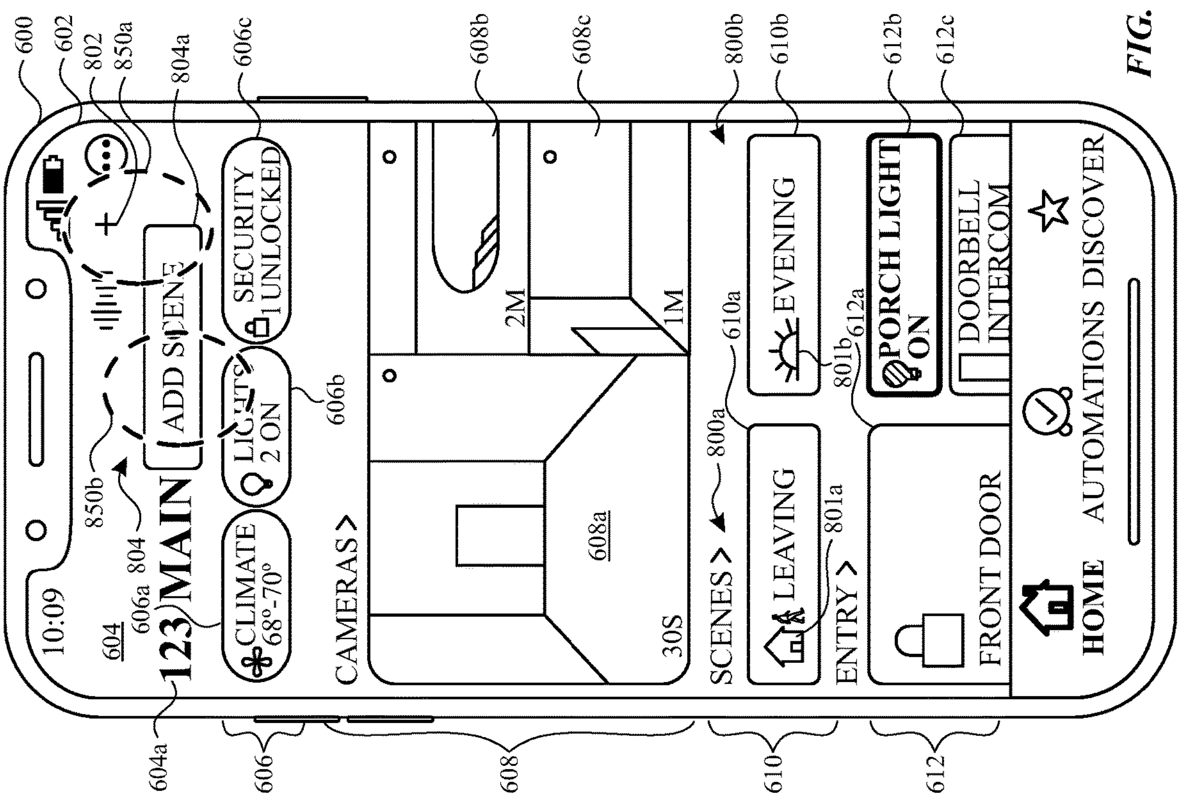
Figure 8P:
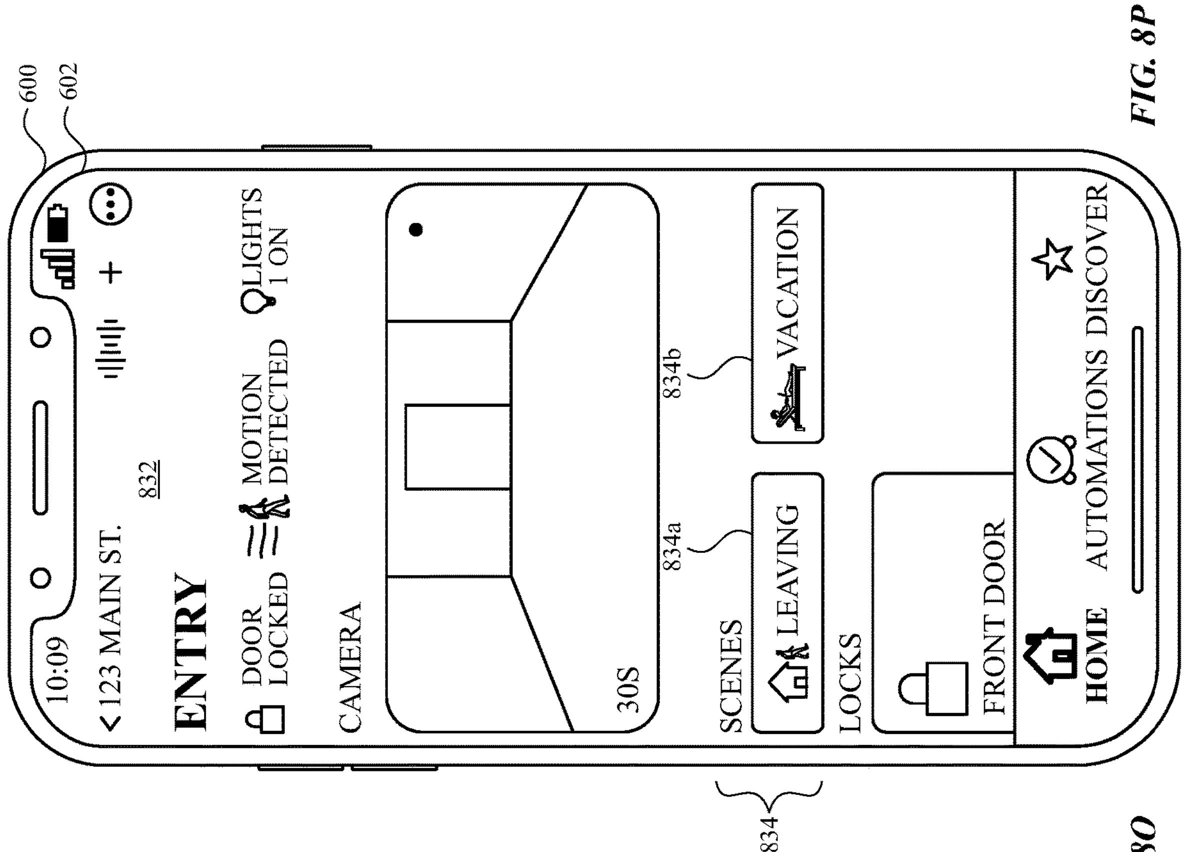
Figure 9A:
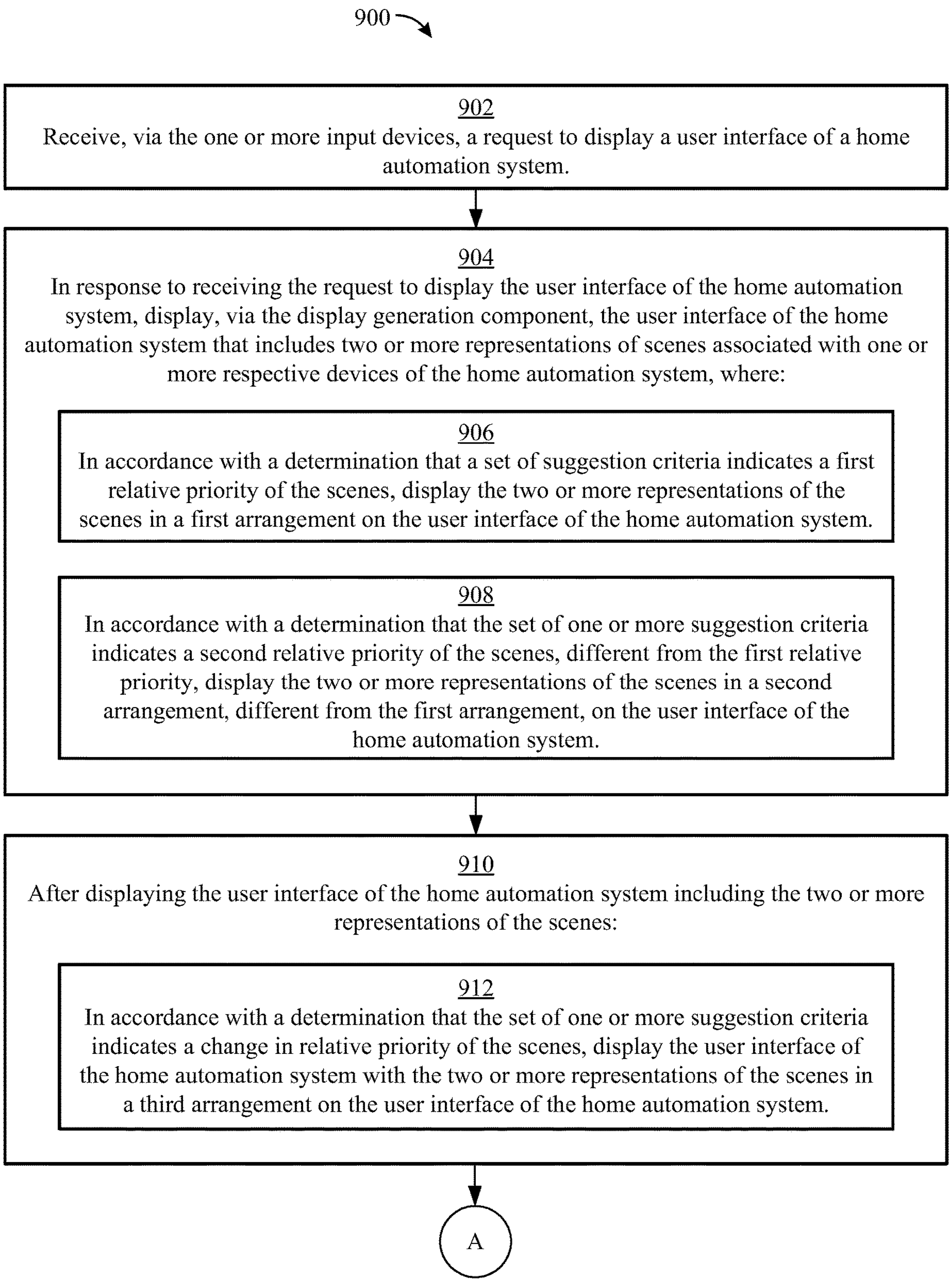
Figure 12B:
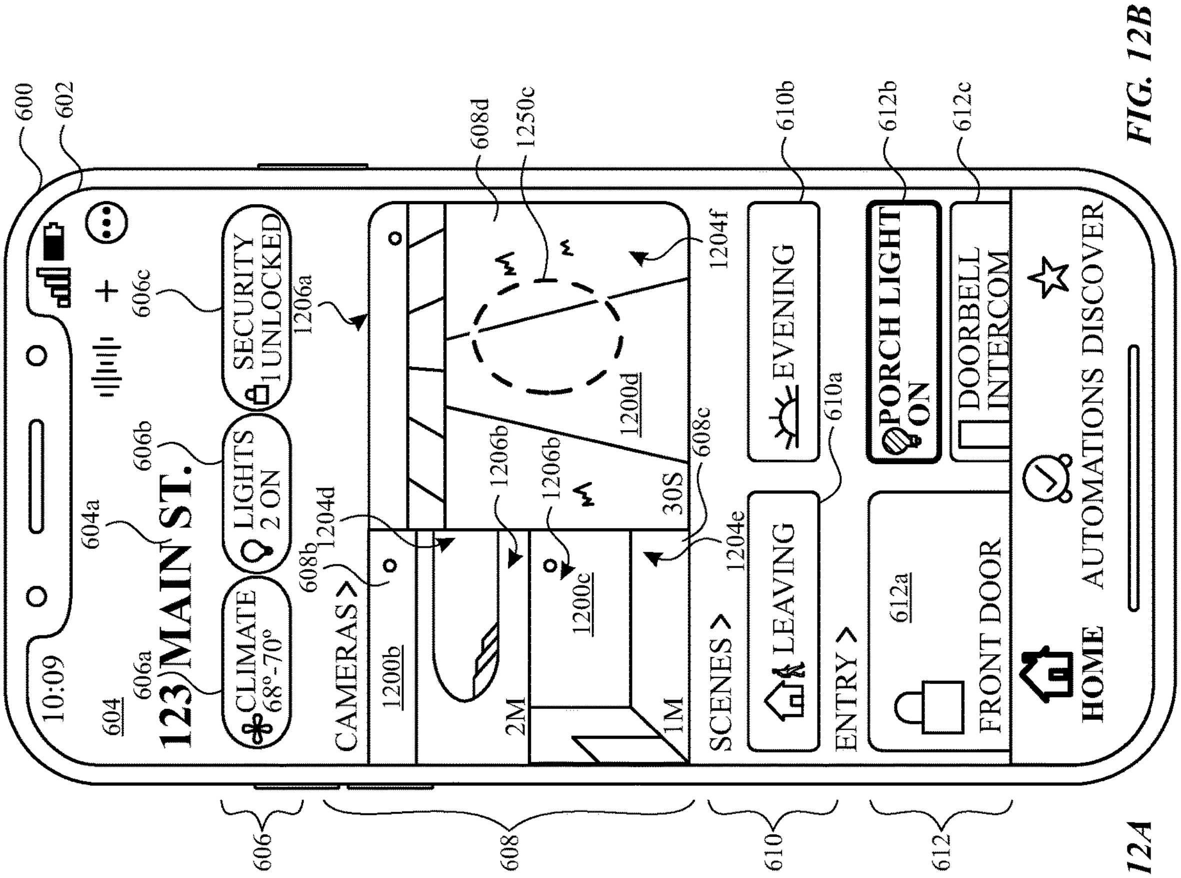
FIGS. 12A-12I illustrate exemplary user interfaces for managing camera accessories, in accordance with some embodiments.

Below, FIGS. 1A-1B, 2, 3, 4A-4B, and 5A-5B provide a description of exemplary devices for performing the techniques for managing accessories. FIGS. 6A-6R illustrate exemplary user interfaces for managing accessories of a home automation system. FIGS. 7A-7G are a flow diagram illustrating methods of managing accessories of a home automation system in accordance with some embodiments. The user interfaces in FIGS. 6A-6R are used to illustrate the processes described below, including the processes in FIGS. 7A-7G. FIGS. 8A-8P illustrate exemplary user interfaces for managing accessory groups. FIGS. 9A-9C are a flow diagram illustrating methods of managing accessory groups in accordance with some embodiments. The user interfaces in FIGS. 8A-8P are used to illustrate the processes described below, including the processes in FIGS. 9A-9C. FIGS. 10A-10AA illustrate exemplary user interfaces for managing speaker accessories. FIGS. 11A-11G are a flow diagram illustrating methods of managing speaker accessories in accordance with some embodiments. The user interfaces in FIGS. 10A-10AA are used to illustrate the processes described below, including the processes in FIGS. 11A-11G. FIGS. 12A-12I illustrate exemplary user interfaces for managing camera accessories. FIGS. 13A-13C are a flow diagram illustrating methods of managing camera accessories in accordance with some embodiments. The user interfaces in FIGS. 12A-12I are used to illustrate the processes described below, including the processes in FIGS. 13A-13C. FIGS. 14A-14M illustrate exemplary user interfaces for displaying accessory user interface objects. FIGS. 15A-15D are a flow diagram illustrating methods of displaying accessory user interface objects in accordance with some embodiments. The user interfaces in FIGS. 14A-14M are used to illustrate the processes described below, including the processes in FIGS. 15A-15D.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms “first,” “second,” etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, “displaying” content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
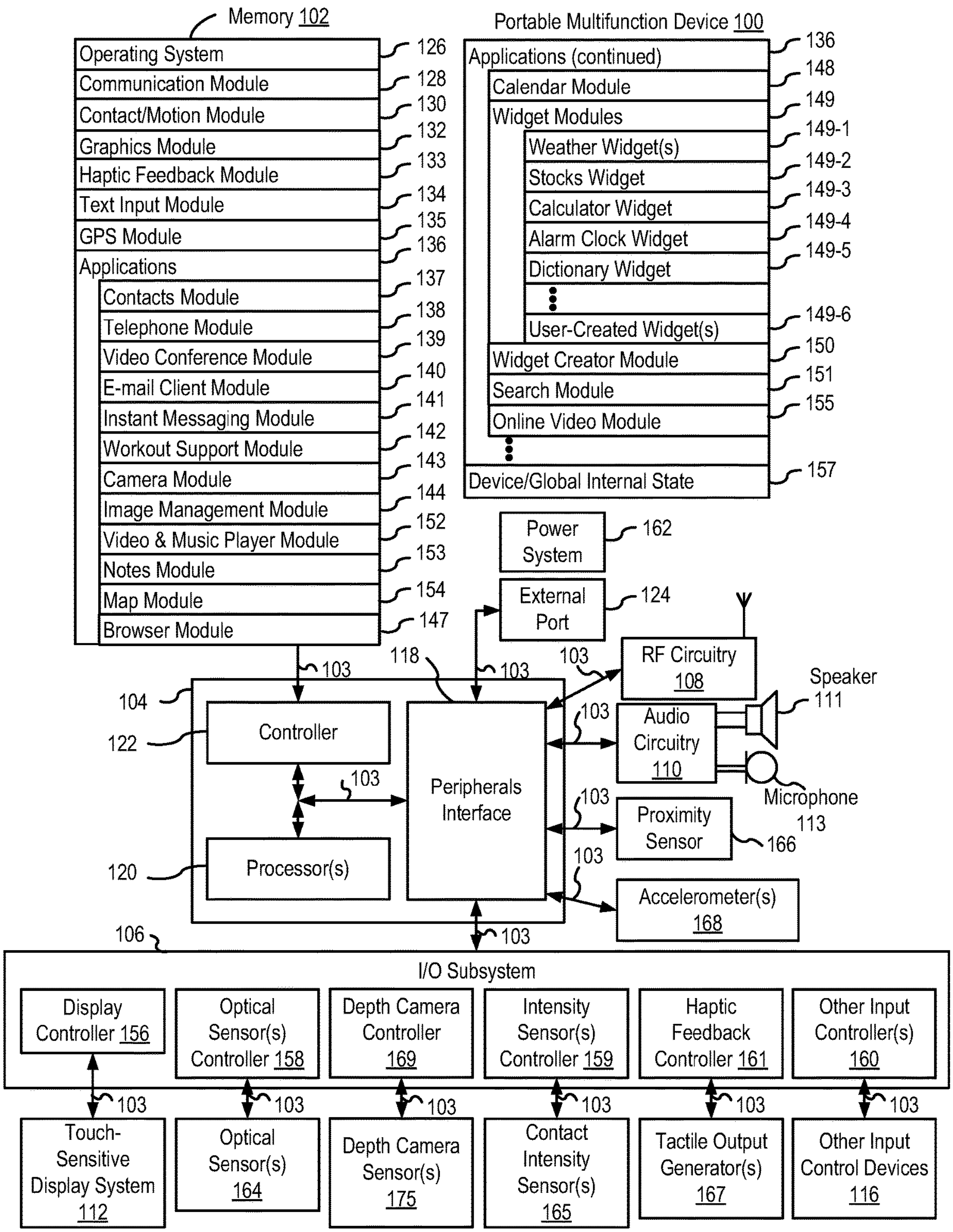
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
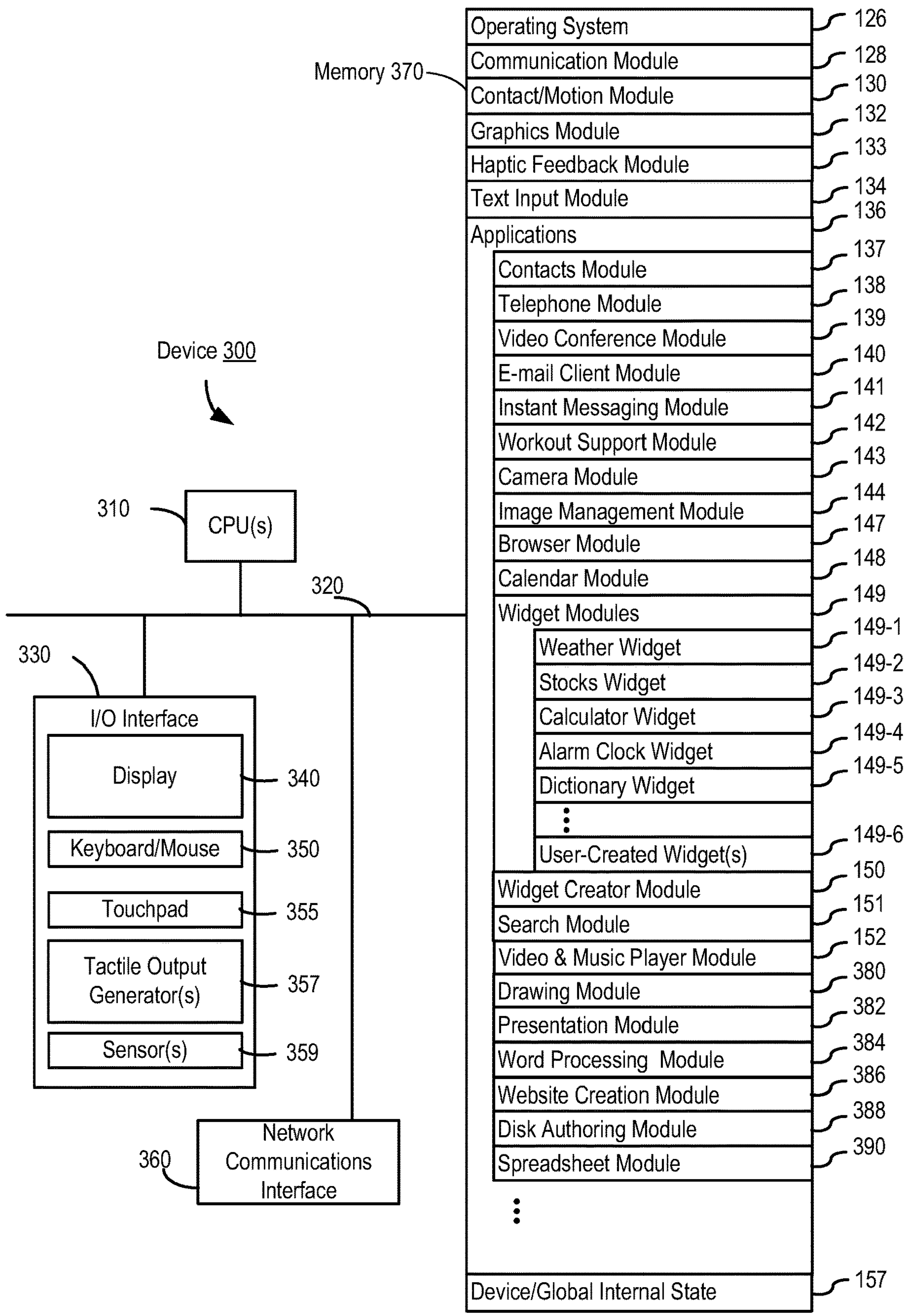
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124.

External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
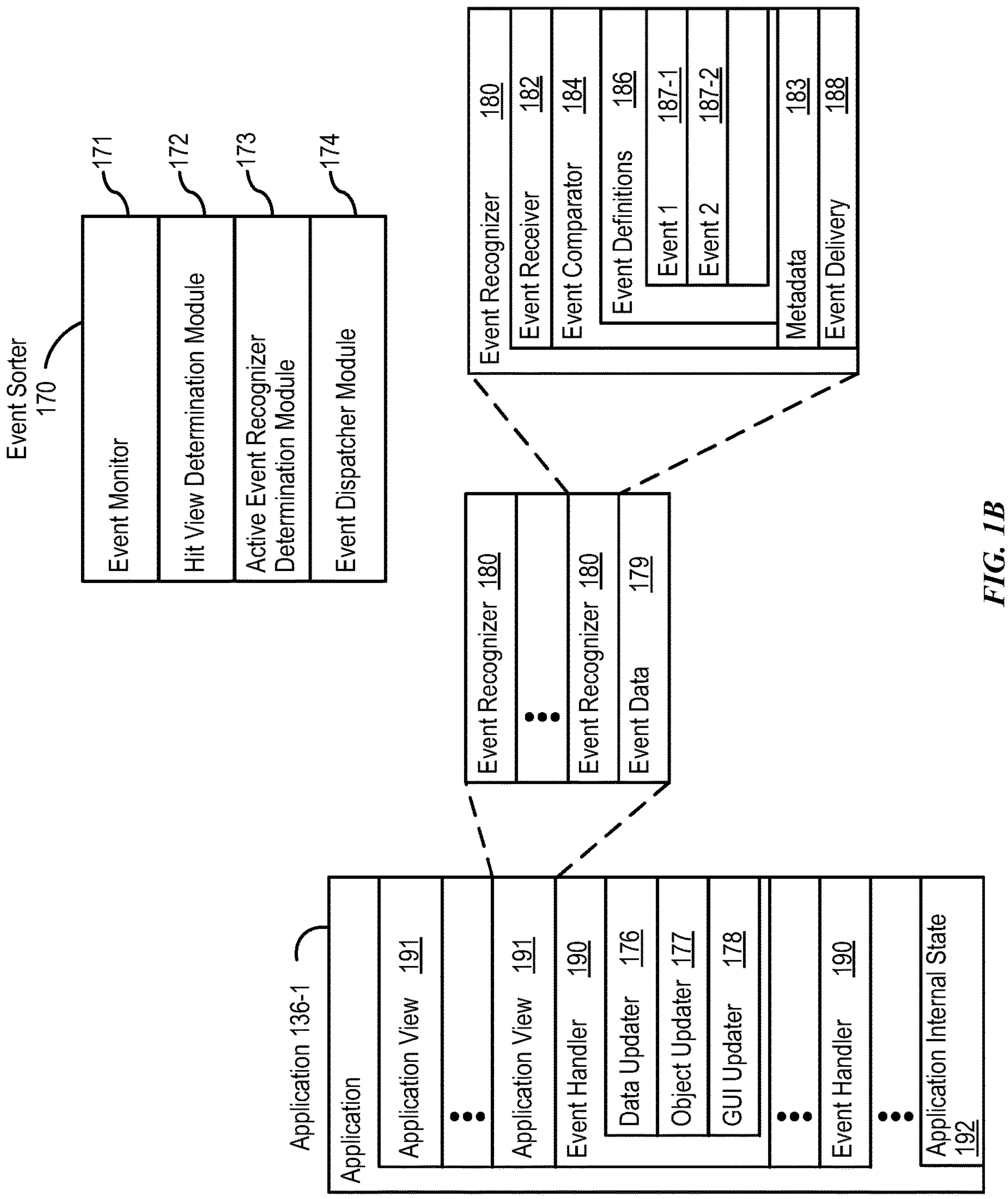
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
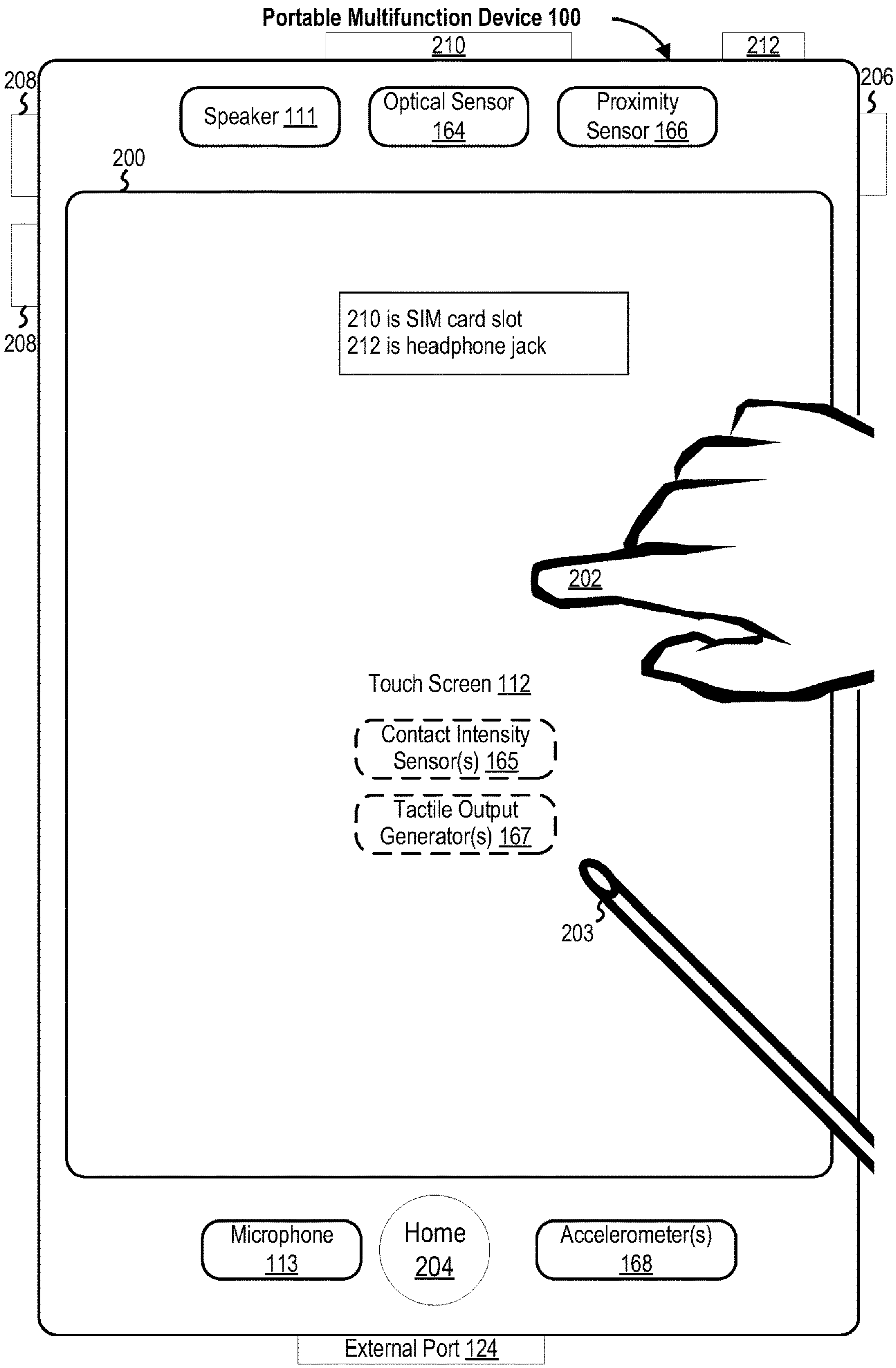
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
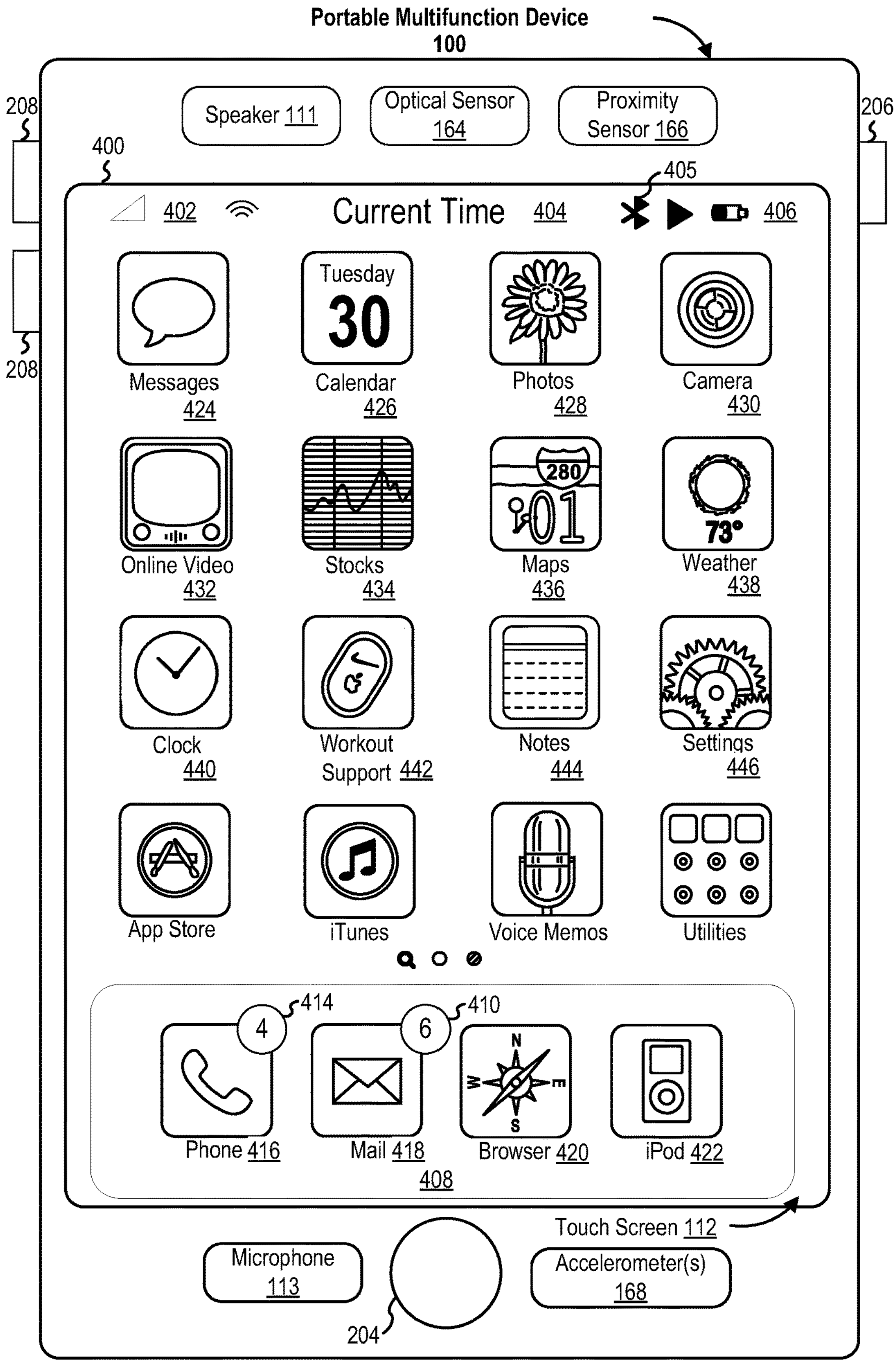
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
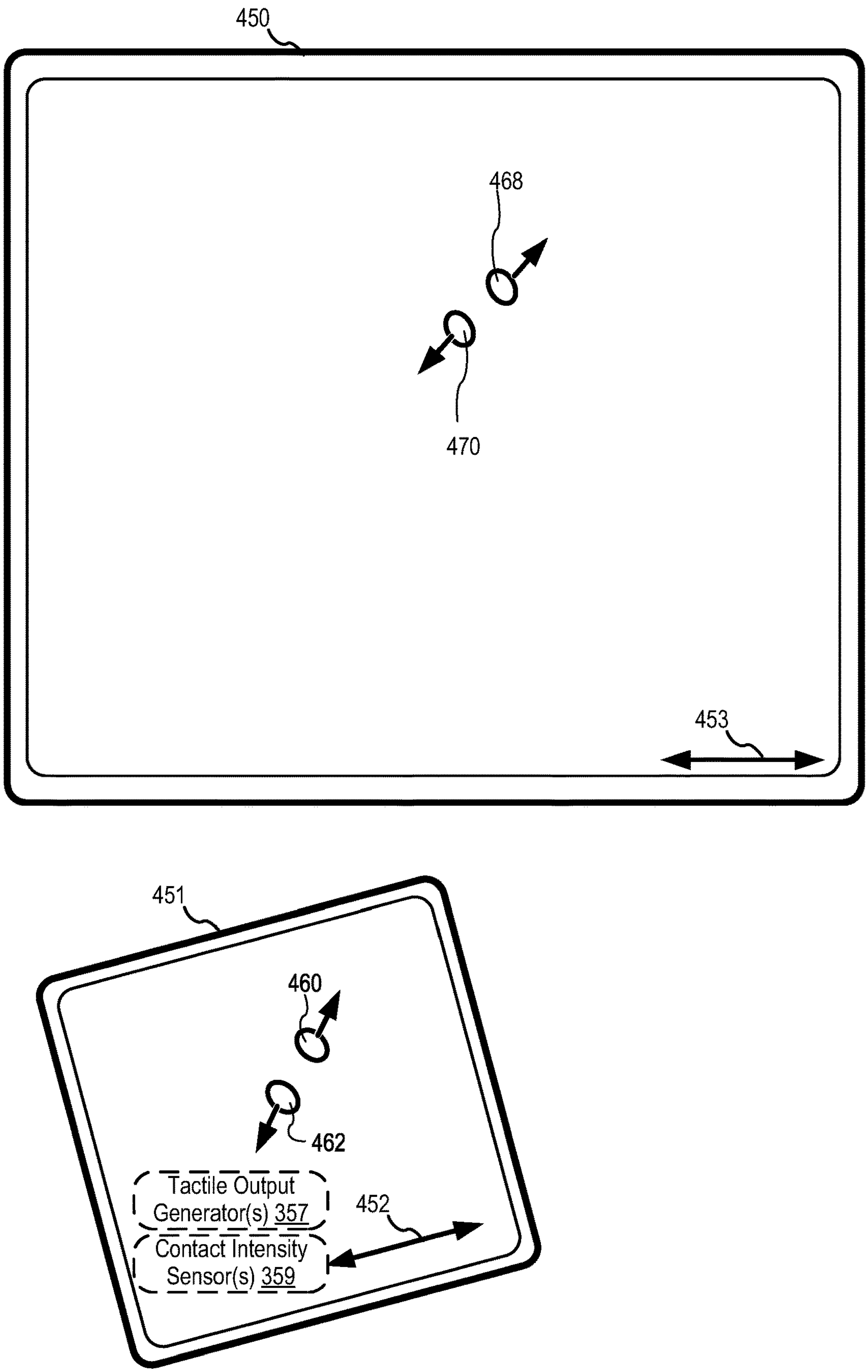
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
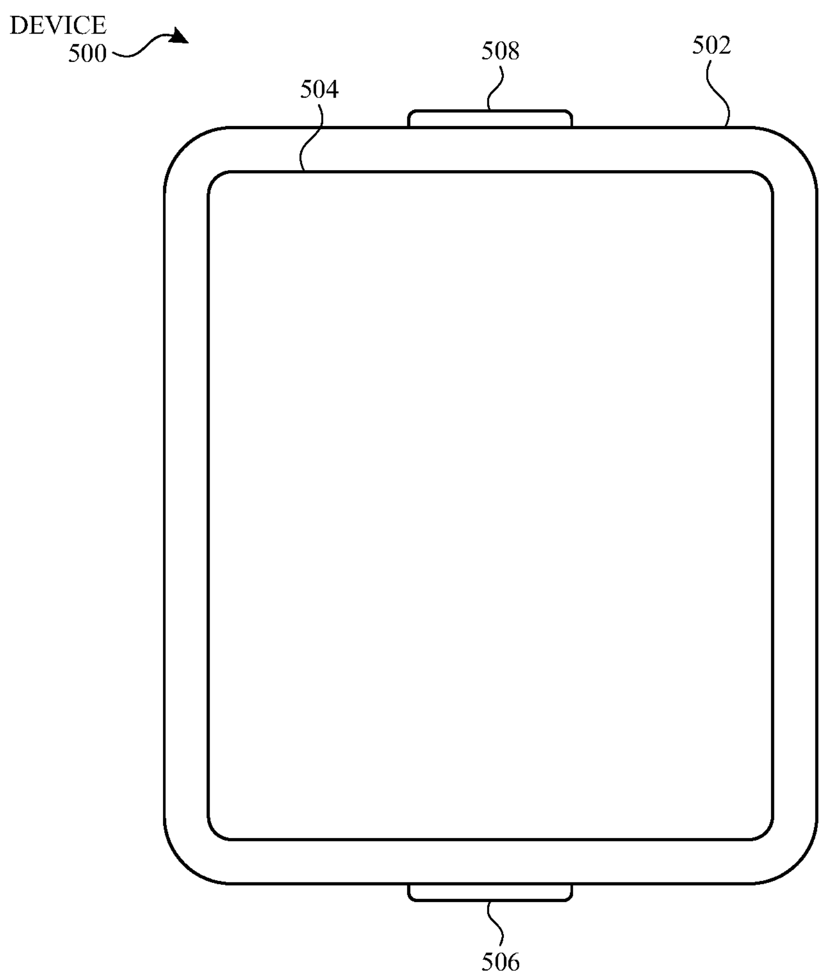
FIG. 5A illustrates a personal electronic device in accordance with some embodiments.
Figure 6B:
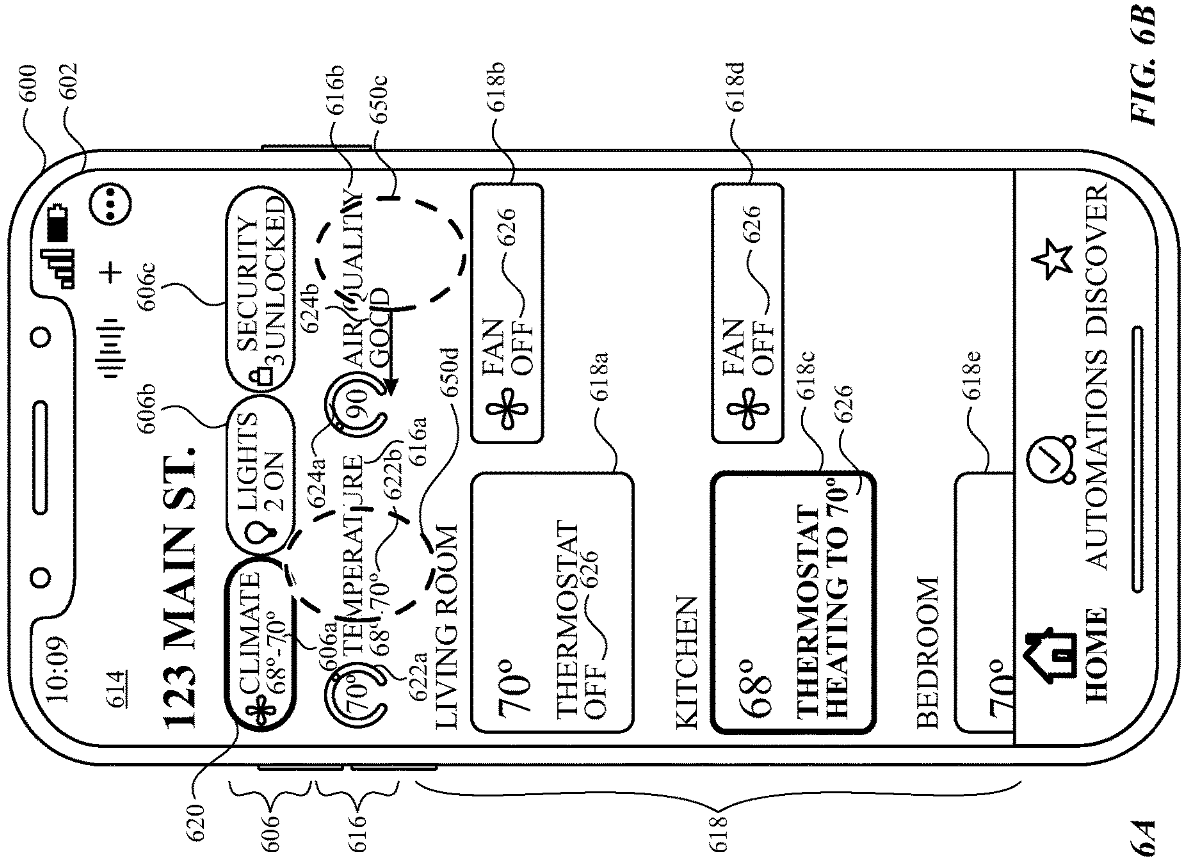
FIGS. 6A-6R illustrate exemplary user interfaces for managing accessories of a home automation system, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
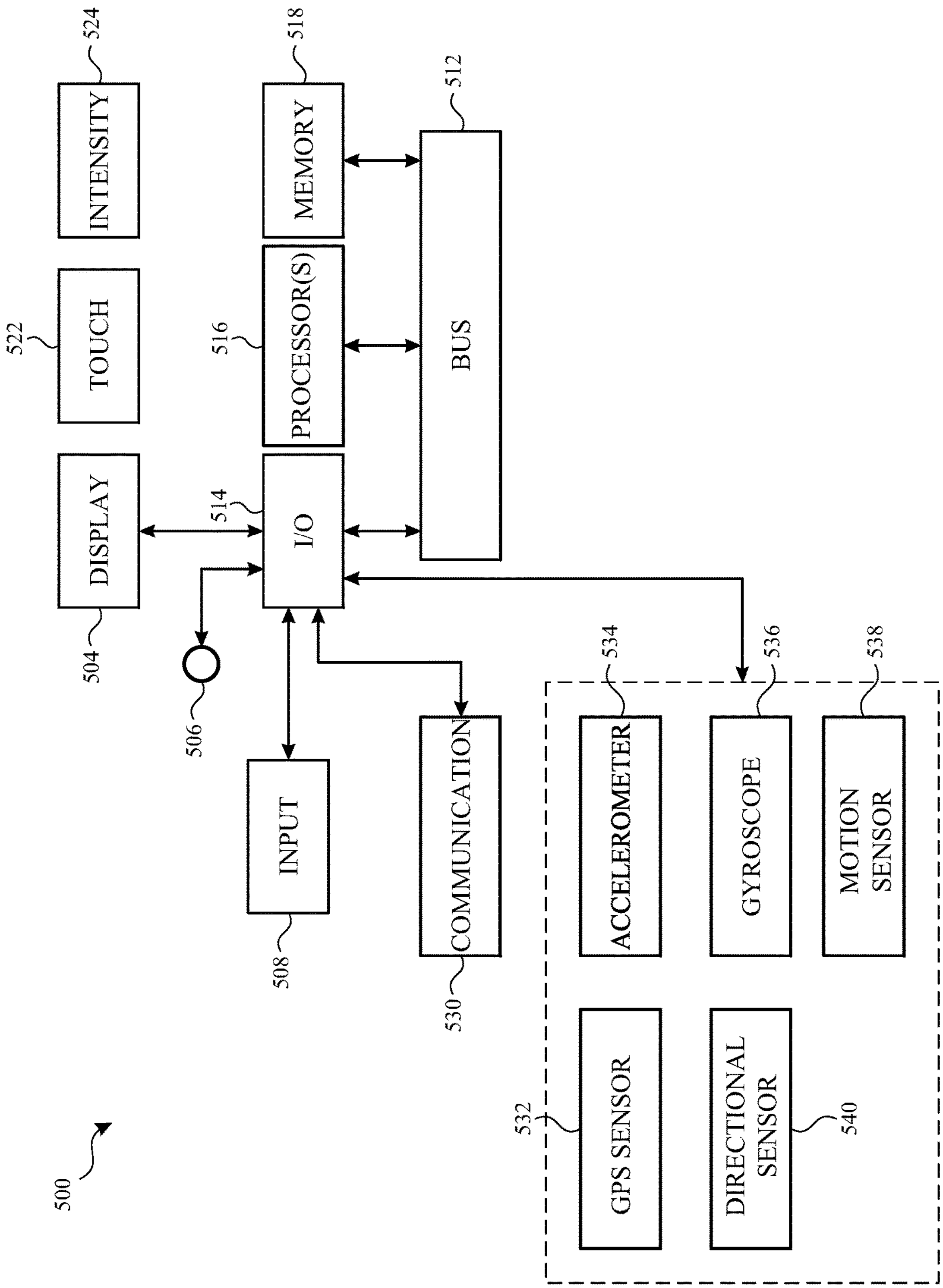
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, and 1500 (FIGS. 7A-7G, 9A-9C, 11A-11G, 13A-13C, and 15A-15D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6R illustrate exemplary user interfaces for managing accessories of a home automation system, in accordance with some embodiments. The user interfaces in these figures are used to illustrate the processes described below, including the processes in FIGS. 7A-7G.

In some embodiments, any of the inputs described herein (e.g., input 650*a*, 650*b*, 650*c*, 650*d*, 650*e*, 650*f*, 650*g*, 650*h*, 650*i*, 650*j*, 650*k*, and/or 650*l*) is or includes a touch input (e.g., a tap gesture and/or a swipe gesture). In some embodiments, any of the inputs described herein (e.g., input 650*a*, 650*b*, 650*c*, 650*d*, 650*e*, 650*f*, 650*g*, 650*h*, 650*i*, 650*j*, 650*k*, and/or 650*l*) is or includes a voice input (e.g., a voice command to select a user interface element or to activate a feature or perform a function, such as a feature or function associated with a user interface element). In some embodiments, any of the inputs described herein (e.g., input 650*a*, 650*b*, 650*c*, 650*d*, 650*e*, 650*f*, 650*g*, 650*h*, 650*i*, 650*j*, 650*k*, and/or 650*l*) is or includes an air gesture (e.g., an air gesture to select a user interface element or to activate a feature or perform a function, such as a feature or function associated with a user interface element). In some embodiments, any of the inputs described herein (e.g., input 650*a*, 650*b*, 650*c*, 650*d*, 650*e*, 650*f*, 650*g*, 650*h*, 650*i*, 650*j*, 650*k*, and/or 650*l*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIG. 6A illustrates electronic device 600 displaying, via display 602, home user interface 604 associated with a home automation system. In some embodiments, the home automation system includes one or more accessory devices (e.g., devices configured to be in communication with and/or controlled by electronic device 600) that are associated with a location, such as a structure, a home, an office, and/or an apartment. At FIG. 6A, electronic device 600 is configured to adjust and/or control a state and/or settings of one or more of the accessory devices of the home automation system via home user interface 604. In some embodiments, home user interface 604 is a user interface that is first displayed by electronic device 600 in response to launching an application associated with the home automation system.

At FIG. 6A, home user interface 604 includes home indicator 604*a* (e.g., "123 MAIN ST.") that provides an indication of a location (e.g., a physical address) of a location associated with the home automation system. In addition, home user interface 604 includes category region 606, camera region 608, scene region 610, and first room region 612. As set forth below, home user interface 604 is scrollable so that one or more additional regions corresponding to respective rooms and/or accessory devices of the home automation system can be displayed in response to a swipe and/or scroll gesture on home user interface 604.

Category region 606 includes category user interface objects 606*a*-606*c* associated with respective categories of the home automation system. For instance, first category user interface object 606*a* corresponds to a climate category of the home automation system, second category user interface object 606*b* corresponds to a lighting category of the home automation system, and third category user interface object 606*c* corresponds to a security category of the home automation system. In some embodiments, the respective categories associated with category user interface objects

606*a*-606*c* include information about accessory devices of the home automation system, where the accessory devices of the home automation system include accessory devices of different types (e.g., accessory devices that are configured to perform different functions (e.g., primary functions)) and/or accessory devices associated with different rooms of a location associated with the home automation system. As set forth below, in response to user input selecting a respective category user interface object, electronic device 600 displays a category user interface associated with the selected category user interface object. The category user interface includes user interface objects identifying the accessory devices associated with the selected category user interface object and/or information about the category associated with the selected category user interface object. Further, as set forth below, category region 606 is scrollable, such that electronic device 600 displays additional category user interface objects (e.g., fourth category user interface object 606*d*, as shown at FIG. 6G) in response to detecting user input (e.g., a swipe gesture and/or a scroll gesture).

At FIG. 6A, first category user interface object 606*a* includes status indicator 607*a* that provides information about a current status of the climate category of the home automation system. Status indicator 607*a* includes temperature range, 68°-70°, which is indicative of current temperatures detected and/or measured by one or more thermometers and/or thermostats of the home automation system. In some embodiments, the home automation system includes a single thermostat, such that status indicator 607*a* includes a single temperature instead of a temperature range. Second category user interface object 606*b* includes status indicator 607*b* that provides information about a current status of the lighting category of the home automation system. Status indicator 607*b* indicates that two lighting devices (e.g., lights and/or outlets) are currently active and/or on. Similarly, third category user interface object 606*c* includes status indicator 607*c* that provides information about a current status of the security category of the home automation system. Status indicator 607*c* indicates that one lock (e.g., a door lock, a window lock, a garage lock, and/or a vehicle lock) is currently unlocked and/or open. Accordingly, category user interface objects 606*a*-606*c* provide information about a current status of the respective category.

In some embodiments, electronic device 600 does not display status indicator 607*a* when electronic device 600 determines that no accessory devices associated with the climate category are active, enabled, and/or on. For instance, when all thermostats of the home automation system are turned off (e.g., not enabled to cause heating, cooling, and/or ventilation of the location of the home automation system), electronic device 600 does not display status indicator 607*a*. Similarly, in some embodiments, electronic device 600 does not display status indicator 607*b* (or displays a status of, e.g., "OFF") when no lighting devices of the home automation system are currently on, and/or electronic device 600 does not display status indicator 607*c* (or displays a status of, e.g., "LOCKED") when all lock devices of the home automation system are locked. In some embodiments, electronic device 600 displays different statuses for category user interface objects 606*a*-606*c* based on a priority of a respective status. For instance, in some embodiments, electronic device 600 does not display status indicator 607*c* of third category user interface object 606*c* when a security alarm of the home automation system has been triggered and/or activated. In some embodiments, electronic device 600 replaces status indicator 607*c* with a status indicator indicating that the security alarm was triggered because the security alarm status is of a higher priority than status indicator 607*c* indicating that a lock device is in an unlocked state.

Camera region 608 includes one or more camera tiles 608*a*-608*c* having camera views of camera accessory devices of the home automation system. Features of camera region 608 are described below with reference to FIGS. 12A-12I. Scenes region 610 includes scene user interface objects 610*a* and 610*b*, which correspond to predetermined automations for adjusting a state of one or more accessory devices of the home automation system. Scenes region 610 is described in detail below with reference to FIGS. 8A-8P. First room region 612 includes accessory user interface objects 612*a*-612*c* corresponding to accessory devices of the home automation system that are associated with (e.g., programmatically mapped to) a particular room (e.g., "ENTRY") of a location associated with the home automation system. First room region 612 is describe below with reference to FIGS. 14A-14M.

Figure 6A:
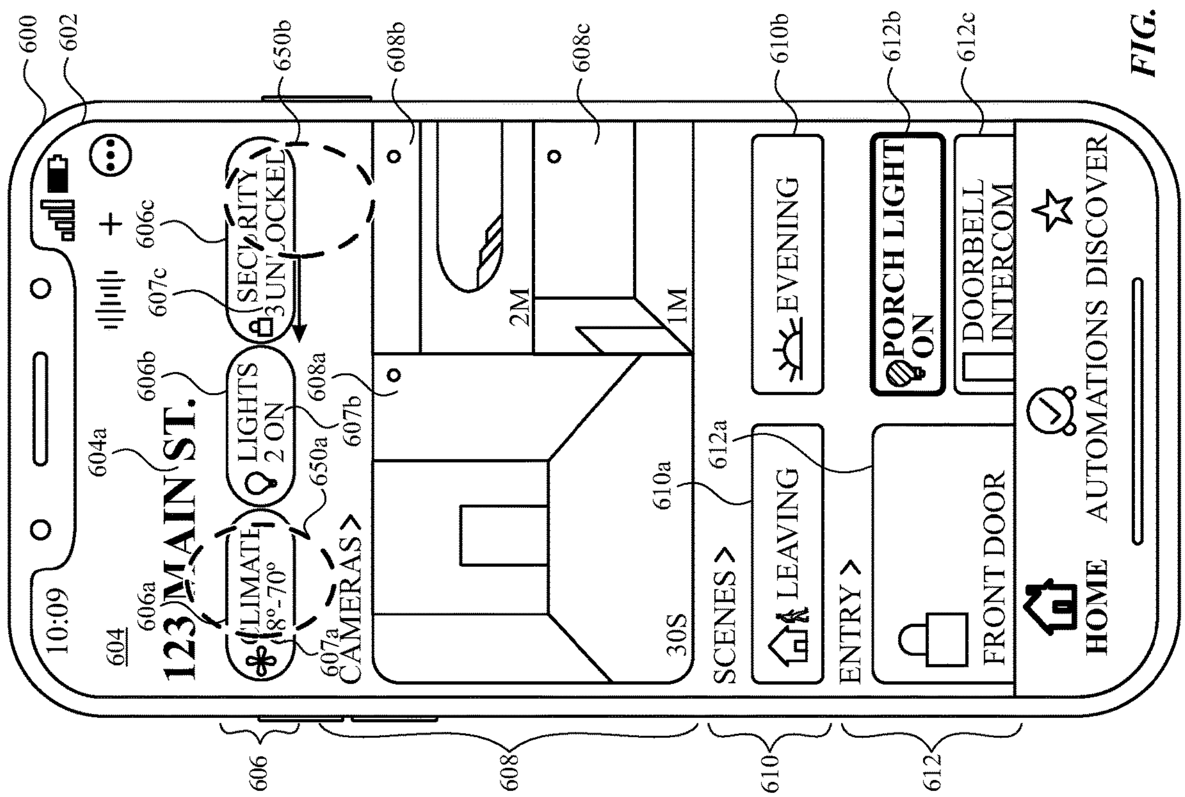
Figure 6C:
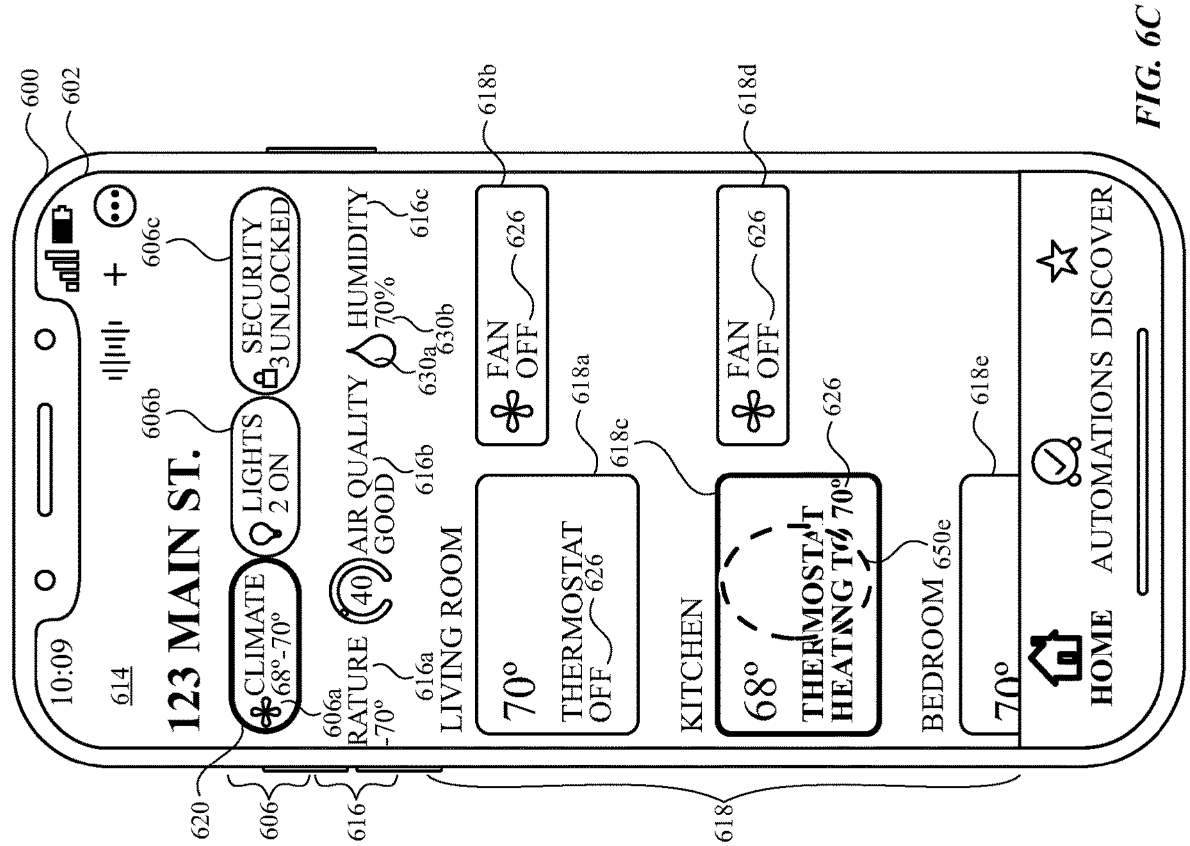
Figure 6D:
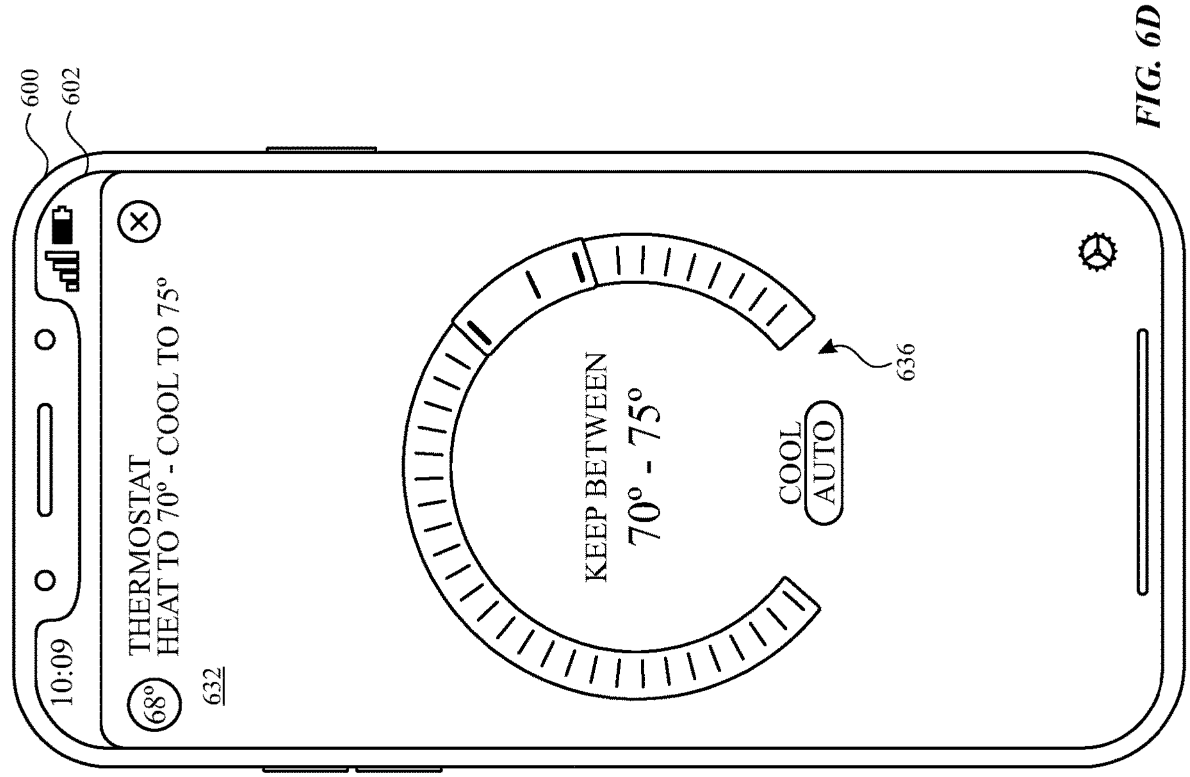
Figure 6F:
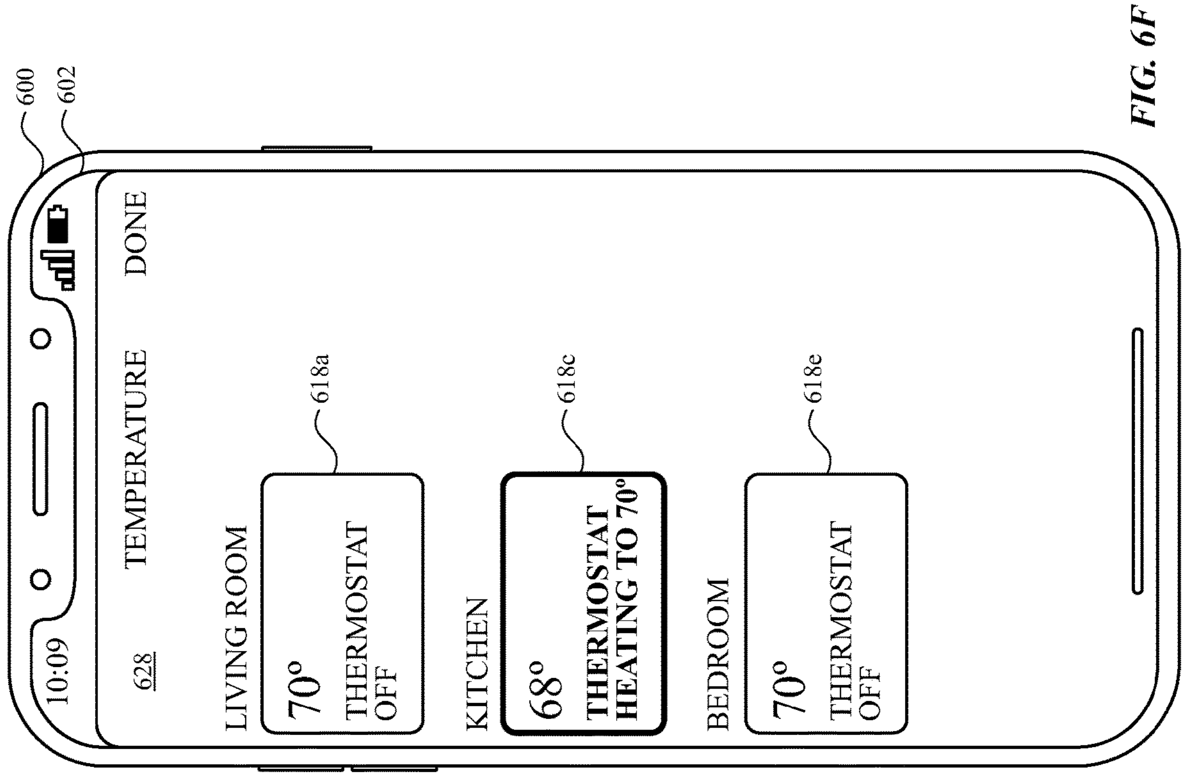

At FIG. 6A, electronic device 600 detects user input 650*a* (e.g., a tap gesture or other selection/navigation input) corresponding to selection of first category user interface object 606*a*. In response to detecting user input 650*a*, electronic device 600 displays, via display 602, climate category user interface 614, as shown at FIG. 6B. Additionally or alternatively, electronic device 600 detects user input 650*b* (e.g., a swipe gesture or other selection/navigation input) corresponding to category region 606. In response to detecting user input 650*b*, electronic device 600 scrolls and/or moves category user interface objects 606*a*-606*c* to display fourth category user interface object 606*d*, as shown at FIG. 6G.

At FIG. 6B, climate category user interface 614 includes category region 606, sub-category region 616, and accessory region 618. Category region 606 includes category user interface objects 606*a*-606*c*, where first category user interface object 606*a* includes emphasis 620 (e.g., a bold outline, an outline having a different color compared to category user interface objects 606*b* and/or 606*c*, and/or a thicker outline as compared to category user interface objects 606*b* and/or 606*c*) indicating that first category user interface object 606*a* has been selected.

Sub-category region 616 includes sub-category user interface objects 616*a* and 616*b*, which correspond to sub-categories of the category (e.g., climate) associated with first category user interface object 606*a*. At FIG. 6B, sub-category user interface objects 616*a* and 616*b* include information about sub-categories of the climate category, such as status information. For instance, at FIG. 6B, first sub-category user interface object 616*a* corresponds to a temperature sub-category of the climate category and includes information about one or more current temperatures of the location associated with the home automation system. First sub-category user interface object 616*a* includes visual indicator 622*a* and status indicator 622*b*. Visual indicator 622*a* includes an image, icon, text, and/or symbol representative of the sub-category associated with first sub-category user interface object 616*a*. At FIG. 6B, visual indicator 622*a* includes a temperature setting symbol (e.g., a partial ring having a dot and/or marking indicative of a temperature setting) and text (e.g., "70°"), which both provide information about a current temperature setting in which one or more accessory devices are configured to adjust a temperature of the location associated with the home automation system toward (e.g., heat and/or cool the temperature of the location toward the current temperature setting). Status indicator 622*b* includes a status of one or more current temperatures of the location associated with the home automation system. For instance, status indicator 622*b* indicates that the temperature of the location ranges from 68° to 70°. At FIG. 6B, the home automation system includes more than one thermostat (e.g., more than one temperature control accessory device), such that status indicator 622*b* includes a range of temperatures associated with measurements of the thermostats. In some embodiments, the home automation system includes a single thermostat, such that status indicator includes a single, current temperature associated with the single thermostat.

Second sub-category user interface object 616*b* corresponds to an air quality sub-category of the climate category and includes information about a current air quality of the location associated with the home automation system. Second sub-category user interface object 616*b* includes visual indicator 624*a* and status indicator 624*b*. Visual indicator 624*a* includes an image, icon, text, and/or symbol representative of the sub-category associated with second sub-category user interface object 616*b*. At FIG. 6B, visual indicator 624*a* includes an air quality setting symbol (e.g., a partial ring having a dot and/or marking indicative of an air quality setting) and text (e.g., "90"), which both provide information about a current air quality setting in which one or more accessory devices are configured to detect and/or adjust an air quality of the location associated with the home automation system toward (e.g., increase and/or decrease the air quality of the location of the home automation system toward the current air quality setting). Status indicator 624*b* includes a status of a current air quality of the location associated with the home automation system. For instance, status indicator 624*b* indicates that the air quality of the location is "GOOD."

Accessory region 618 includes accessory user interface objects 618*a*-618*e* corresponding to respective accessory devices of the home automation system that are associated with the climate category. For instance, accessory user interface objects 618*a*-618*e* include thermostat devices and fan devices that are configured to regulate, control, and/or adjust the climate of the location associated with the home automation system. In some embodiments, an accessory device of the home automation system is included within a respective category when the accessory device includes a function (e.g., a primary function) that matches and/or fits within the respective category (e.g., the accessory device includes a functions that matches and/or corresponds to a function, description, and/or purpose associated with the respective category). At FIG. 6B, accessory user interface objects 618*a*-618*e* are arranged, grouped, and/or listed based on rooms of the location associated with the home automation system. In some embodiments, accessory user interface objects 618*a*-618*e* are arranged, grouped, and/or listed based on device type and/or based on another criterion (e.g., most recently active and/or most recently used).

At FIG. 6B, accessory user interface objects 618*a*-618*e* include status indicators 626 that provide information about a status of the respective accessory device corresponding to accessory user interface objects 618*a*-618*e*. For instance, status indicator 626 of third accessory user interface object 618*c* indicates that the thermostat (e.g., kitchen thermostat) corresponding to third accessory user interface object 618*c* is heating at least a portion of the location associated with the home automation system to 70°. Accordingly, climate category user interface 614 includes information about sub-categories as well as individual accessory devices of the climate category, which enables a user to easily obtain information about the climate of the location associated with the home automation system.

At FIG. 6B, electronic device 600 detects user input 650*c* (e.g., a swipe gesture or other selection/navigation input) corresponding to sub-category region 616. In response to detecting user input 650*c*, electronic device 600 scrolls sub-category user interface objects 616*a* and 616*b*, while displaying (e.g., maintaining display of) climate category user interface 614, as shown at FIG. 6C. Additionally or alternatively, electronic device 600 detects user input 650*d* (e.g., a tap gesture or other selection/navigation input) corresponding to selection of first sub-category user interface object 616*a*. In response to detecting user input 650*d*, electronic device 600 displays sub-category user interface 628, as shown at FIG. 6F.

At FIG. 6C, electronic device 600 has scrolled and/or moved sub-category user interface objects 616*a* and 616*b* (e.g., to the left with respect to display 602) and displays third sub-category user interface object 616*c*. Third sub-category user interface object 616*c* corresponds to a humidity sub-category of the climate category and includes information about a current humidity of the location associated with the home automation system. In some embodiments, electronic device 600 is configured to display additional sub-category user interface objects in response to receiving one or more additional swipe and/or scroll gestures. At FIG. 6C, third sub-category user interface object 616*c* includes visual indicator 630*a* (e.g., an image, icon, and/or symbol of a water droplet) and status indicator 630*b* (e.g., "70%"). Status indicator 630*b* includes a status of a current humidity of the location associated with the home automation system. For instance, status indicator 630 indicates that the humidity of the location is "70%."

At FIG. 6C, electronic device 600 detects user input 650*e* (e.g., a tap gesture or other selection/navigation input) corresponding to selection of third accessory user interface object 618*c*. In response to detecting user input 650*e*, electronic device 600 displays accessory user interface 632, as shown at FIG. 6D. In response to continuing to detect user input 650*e* for a predetermined amount of time (e.g., the user maintains user input 650*e* for one second, two seconds, or five seconds), electronic device 600 displays menu 634, as shown at FIG. 6E.

At FIG. 6D, accessory user interface 632 enables electronic device 600 to adjust one or more settings of a thermostat that corresponds to third accessory user interface object 618*c*. For instance, in response to detecting user input corresponding to temperature adjustment user interface object 636, electronic device 600 causes the thermostat to heat and/or cool a temperature within at least a portion of the location to a different temperature setting. At FIG. 6D, accessory user interface 632 indicates that the thermostat is currently configured to heat the temperature within at least a portion of the location to 70° and cool the temperature within at least a portion of the location to 75°. Accordingly, electronic device 600 can change the current temperature settings of the thermostat in response to detecting user input corresponding to temperature adjustment user interface object 636. In some embodiments, electronic device 600 transmits data and/or information to the thermostat (e.g., via a server) to cause the thermostat to change the temperature settings in response to detecting user input on temperature adjustment user interface object 636.

Figure 6E:
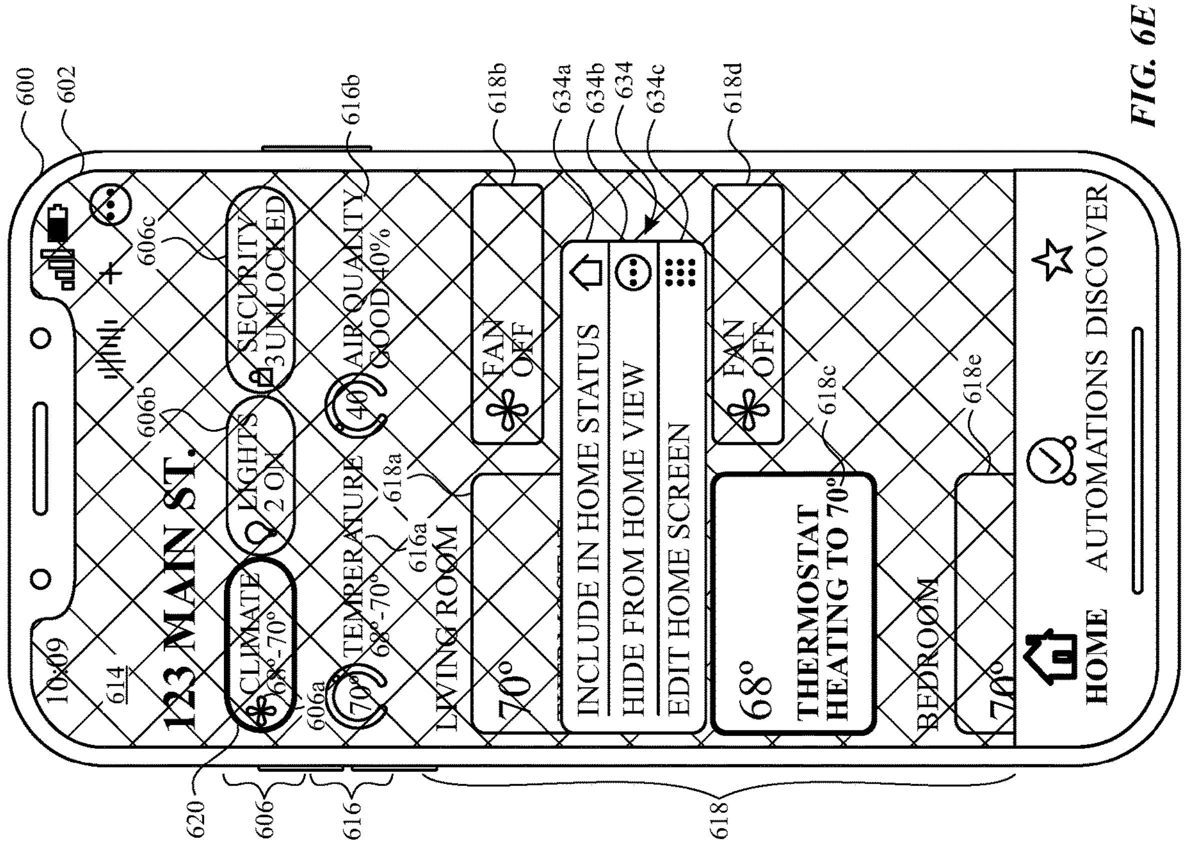

As set forth above, in response to continuing to detect user input 650*e* for the predetermined amount of time, electronic device 600 displays menu 634, as shown at FIG. 6E. Menu 634 includes selectable options 634*a*-634*c* that enable electronic device 600 to customize third accessory user interface object 618*c* and/or home user interface 604. For instance, in response to detecting selection of first selectable option 634*a*, electronic device 600 changes whether information about the thermostat (e.g., information received from the thermostat) associated with third accessory user interface object 618*c* is included in a status of the home automation system, such as status indicator 607*a* and/or status indicator 622*b*. In some embodiments, electronic device 600 does not use information about the thermostat when the thermostat associated with third accessory user interface object 618*c* is not included in the status of the home automation system. In some embodiments, electronic device 600 displays status indicators 607*a* and/or 622*b* with information about other thermostats and/or accessory devices of the home automation system when the thermostat associated with third accessory user interface object 618*c* is not included in the status of the home automation system.

In some embodiments, in response to detecting selection of second selectable option 634*b*, electronic device 600 ceases and/or does not display third accessory user interface object 618*c* on home user interface 604 (and, optionally, on climate category user interface 614). In some embodiments, in response to detecting selection of third selectable option 634*c*, electronic device activates an editing mode that enables accessory user interface objects 618*a*-618*e* to be rearranged and/or moved with respect to one another on climate category user interface 614. The editing mode of electronic device 600 is discussed in detail below with reference to FIGS. 14A-14M.

As set forth above, in response to detecting user input 650*d* corresponding to selection of first sub-category user interface object 616*a*, electronic device 600 displays sub-category user interface 628, as shown at FIG. 6F. At FIG. 6F, sub-category user interface 628 includes first accessory user interface object 618*a*, third accessory user interface object 618*c*, and fifth accessory user interface object 618*e*. First sub-category user interface object 616*a* corresponds to a temperature sub-category of the climate category. Accordingly, electronic device 600 displays user interface objects corresponding to accessory devices that are associated with the temperature sub-category. For instance, at FIG. 6F, first accessory user interface object 618*a* corresponds to a living room thermostat of the home automation system, third accessory user interface object 618*c* corresponds to a kitchen thermostat of the home automation system, and fifth accessory user interface object 618*e* corresponds to a bedroom thermostat of the home automation system. Because thermostats are configured to cause adjustment of temperatures of the location associated with the home automation system, electronic device 600 includes first accessory user interface object 618*a*, third accessory user interface object 618*c*, and fifth accessory user interface object 618*e* on sub-category user interface 628 associated with the temperature sub-category.

In some embodiments, electronic device 600 is configured to display accessory user interface 632 in response to detecting user input corresponding to third accessory user interface object 618*c*. In addition, in some embodiments, electronic device 600 is configured to display similar user interfaces to accessory user interface 632 in response to detecting user input selecting first accessory user interface object 618*a* and/or fifth accessory user interface object 618*e*. Accordingly, sub-category user interface 628 enables a user to view accessory devices that are associated with the sub-category associated with first sub-category user interface object 616*a* and also enables a user to control the individual accessory devices in response to one or more additional user inputs.

At FIG. 6F, electronic device 600 does not include second accessory user interface object 618*b* and/or fourth accessory user interface object 618*d* on sub-category user interface 628. Second accessory user interface object 618*b* corresponds to a living room fan of the home automation system and fourth accessory user interface object 618*d* corresponds to a kitchen fan of the home automation system. Because fans do not directly cause temperature adjustments of the location of the home automation system, second accessory user interface object 618*b* and fourth accessory user interface object 618*d* are not included on sub-category user interface 628 associated with the temperature sub-category. In some embodiments, electronic device 600 includes second accessory user interface object 618*b* and/or fourth accessory user interface object 618*d* on a sub-category user interface (e.g., a sub-category user interface different from sub-category user interface 628) that is associated with a ventilation sub-category of the climate category.

As set forth above, in response to detecting user input 650*b* corresponding to category region 606, electronic device 600 scrolls and/or moves category user interface objects 606*a*-606*c* to display fourth category user interface object 606*d*, as shown at FIG. 6G. At FIG. 6G, fourth category user interface object 606*d* corresponds to an entertainment (e.g., "SPEAKERS & TVS") category of the home automation system. Fourth category user interface object 606*d* does not include a status indicator (e.g., 607*a*-607*c*). In some embodiments, fourth category user interface object 606*d* does not include the status indicator because electronic device 600 determines that accessory devices that are associated with the entertainment category of the home automation system are not in an on and/or active state. For instance, no speaker and/or television accessory devices of the home automation system are currently outputting media, such as music, audiobooks, podcasts, videos, and/or television shows. In some embodiments, when electronic device 600 determines that accessory devices associated with the entertainment category of the home automation system are in the on and/or active state, electronic device 600 includes a status indicator on fourth category user interface object 606*d*.

Figure 6H:
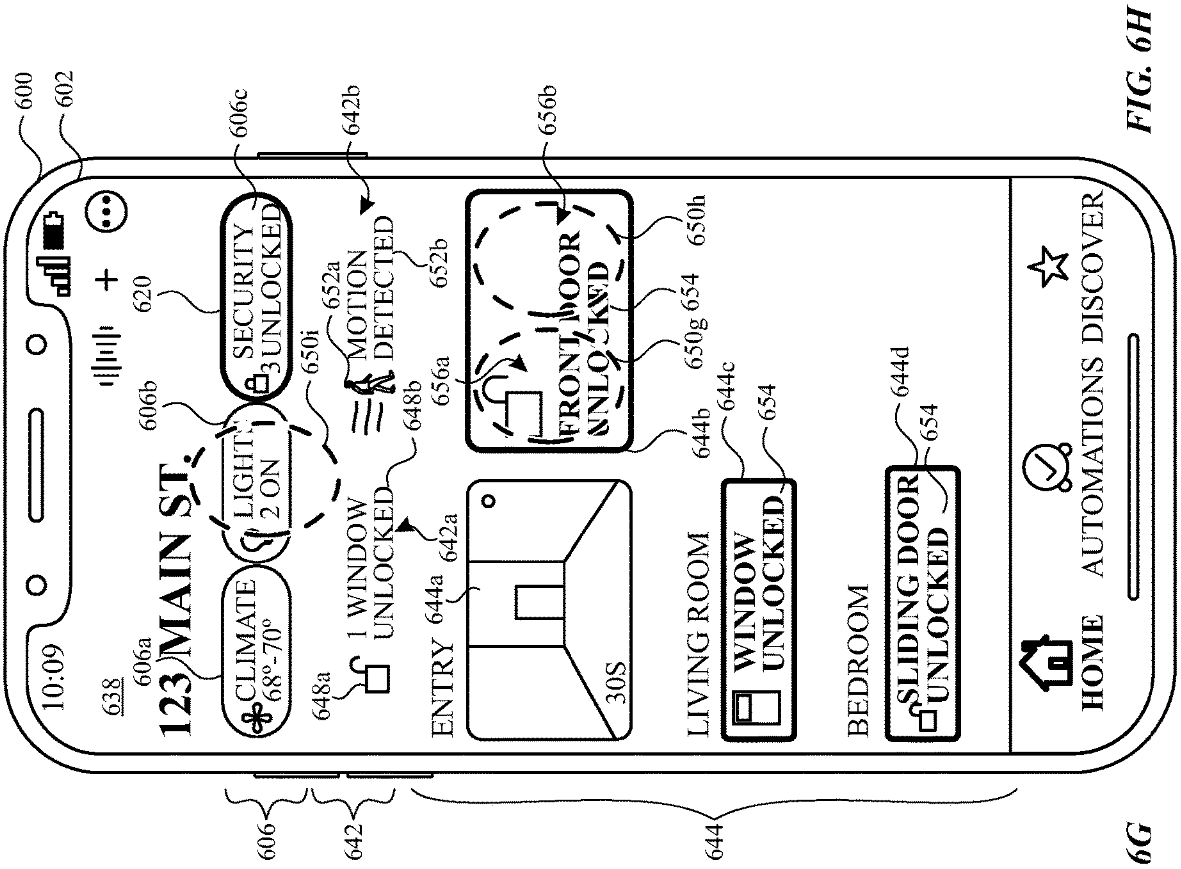
Figure 6G:
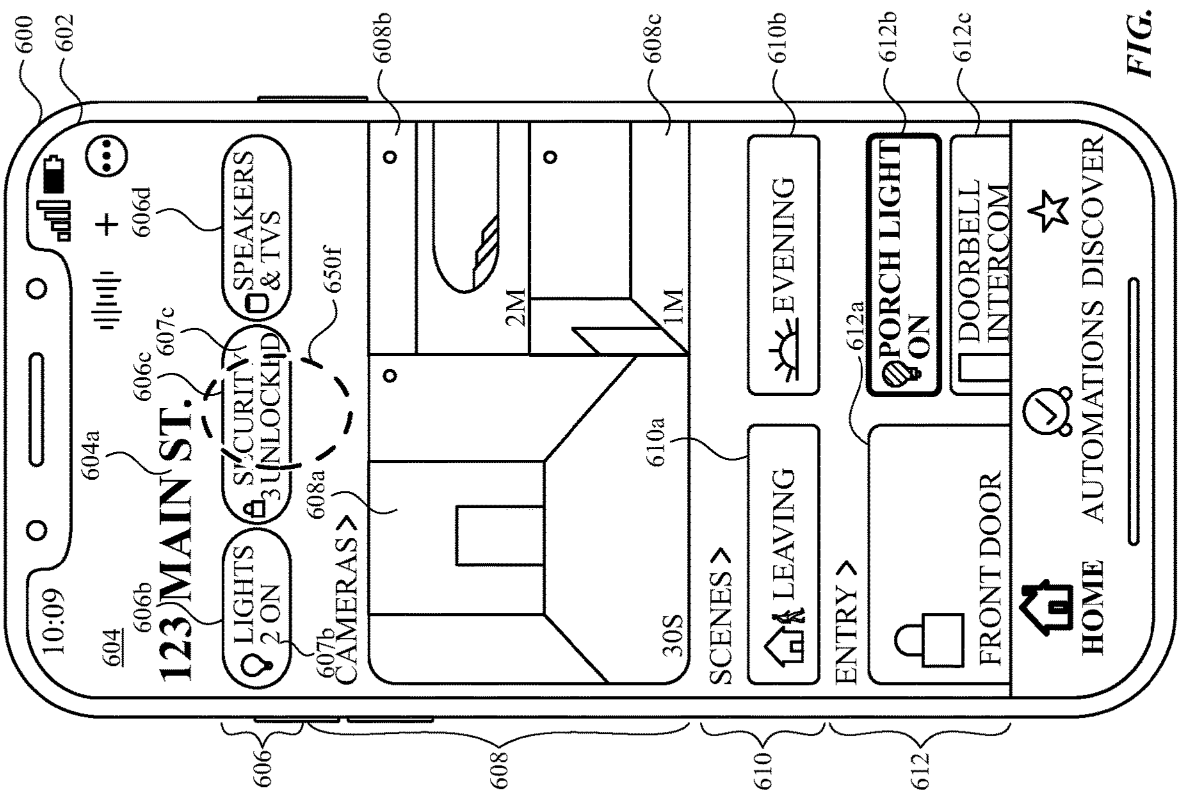
Figure 6J:
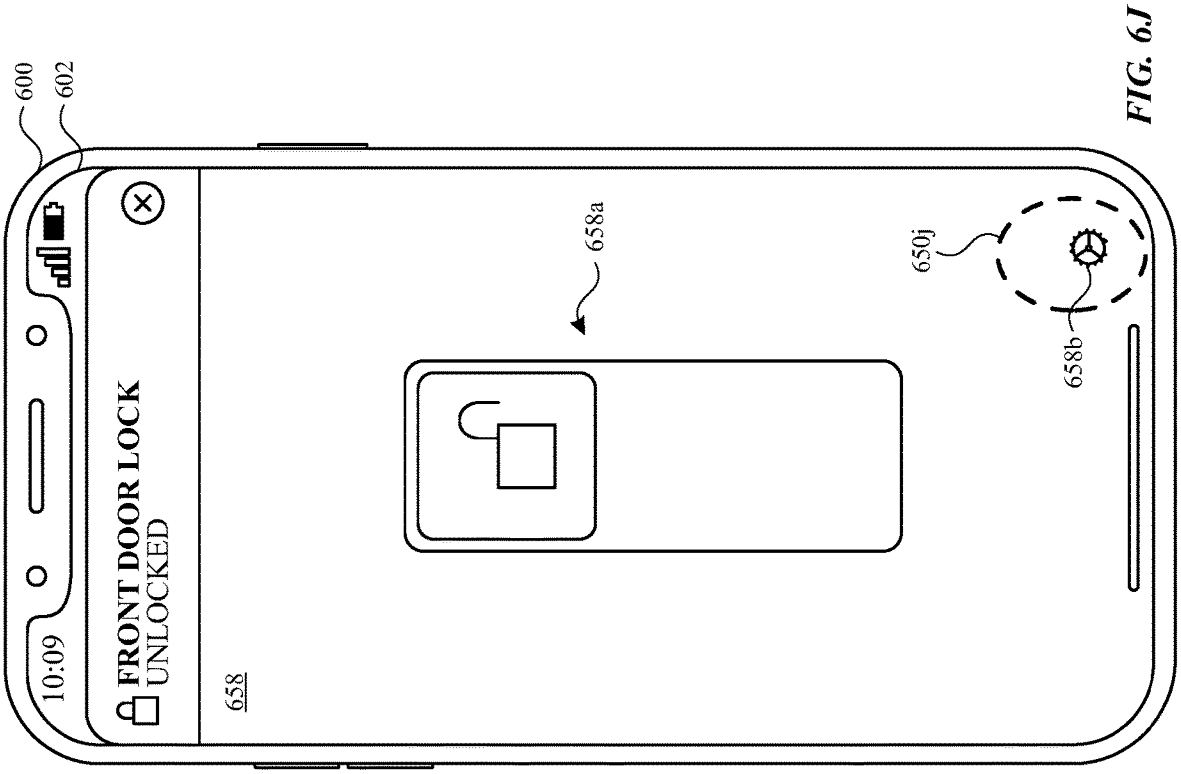
Figure 6I:
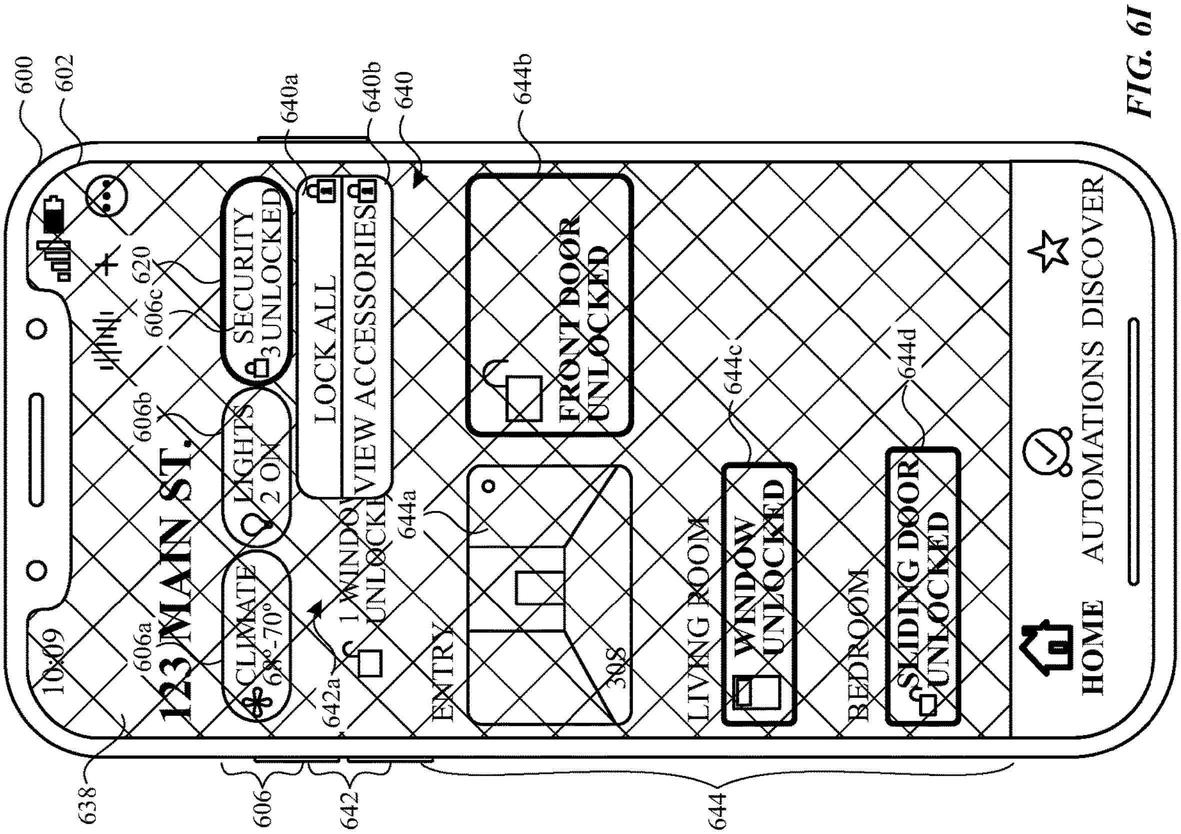

At FIG. 6G, electronic device 600 detects user input 650*f* (e.g., a tap gesture or other selection/navigation input) corresponding to third category user interface object 606*c*. In response to detecting user input 650*f*, electronic device 600 displays security category user interface 638, as shown at FIG. 6H. Additionally or alternatively, in response to continuing to detect user input 650*f* for a predetermined amount of time (e.g., continued and/or maintained input for one second, two seconds, or five seconds), electronic device 600 displays menu 640, as shown at FIG. 6I.

At FIG. 6H, security category user interface 638 includes category region 606, sub-category region 642, and accessory region 644. Category region 606 includes category user interface objects 606*a*-606*c*, where third category user interface object 606*c* includes emphasis 620 (e.g., a bold outline, an outline having a different color compared to category user interface objects 606*a* and/or 606*b*, and/or a thicker outline as compared to category user interface objects 606*a* and/or 606*b*) indicating that third category user interface object 606*c* has been selected.

Accessory region 644 includes camera tile 644*a* having a camera view associated with a camera (e.g., a security camera) of the home automation system. The camera is associated with the security category of the home automation system, and therefore, electronic device 600 includes camera tile 644*a* on security category user interface 638. Electronic device 600 does not include a camera tile and/or user interface object on climate category user interface 614 because a camera accessory device of the home automation system does not fall within and/or correspond to the climate category. As such, electronic device 600 displays relevant user interface objects and/or information about accessory devices that are associated with and/or fall within a category of a respective category user interface.

Sub-category region 642 includes sub-category user interface objects 642*a* and 642*b*, which correspond to sub-categories of the security category associated with third category user interface object 606*c*. At FIG. 6H, sub-category user interface objects 642*a* and 642*b* include information about sub-categories of the security category, such as status information. For instance, at FIG. 6H, first sub-category user interface object 642*a* corresponds to a lock sub-category of the security category and includes information about a number of current lock devices of the location associated with the home automation system that are in an unlocked state. First sub-category user interface object 642*a* includes visual indicator 648*a* and status indicator 648*b*. Visual indicator 648*a* includes an image, icon, text, and/or symbol representative of the sub-category associated with first sub-category user interface object 642*a*. At FIG. 6H, visual indicator 648*a* includes an unlock symbol indicating that first sub-category user interface object 642*a* corresponds to lock devices that are in the unlocked state. Status indicator 648*b* includes a status of a number (e.g., "1") of lock devices that are in the unlocked state and/or an indication of which lock devices (e.g., "WINDOW") and/or lock device types are in the unlocked state.

Second sub-category user interface object 642*b* corresponds to detected events of the security category and includes information about a current and/or recent event detected by one or more accessory devices associated with the security category. Second sub-category user interface object 642*b* includes visual indicator 652*a* and status indicator 652*b*. Visual indicator 652*a* includes an image, icon, text, and/or symbol representative of the sub-category associated with second sub-category user interface object 642*b*. At FIG. 6H, visual indicator 652*a* includes a symbol of a person moving, which provides information about a type of event detected (e.g., motion detected via a motion sensor device of the home automation system). Status indicator 652*b* includes a text related to the detected event, such as "MOTION DETECTED."

In addition to camera tile 644*a*, accessory region 644 includes accessory user interface objects 644*b*-646*d* corresponding to respective accessory devices of the home automation system that are associated with the security category. For instance, accessory user interface objects 644*b*-644*d* include lock devices that are configured to enhance, monitor, and/or increase security at a location associated with the home automation system. In some embodiments, an accessory device of the home automation system is included within the security category and/or displayed on security category user interface 638 when the accessory device includes a function (e.g., a primary function) that matches and/or fits within the security category (e.g., the respective accessory device includes a function that matches and/or corresponds to a function, description, and/or purpose associated with the security category). At FIG. 6H, accessory user interface objects 644*b*-644*d* are arranged, grouped, and/or listed based on rooms of the location associated with the home automation system. In some embodiments, accessory user interface objects 644*b*-644*d* are arranged, grouped, and/or listed based on device type and/or based on another criterion (e.g., most recently active and/or most recently used).

At FIG. 6H, accessory user interface objects 644*b*-644*d* include status indicators 654 that provide information about a status of the respective accessory device corresponding to accessory user interface objects 646*a*-646*c*. For instance, status indicator 654 of first accessory user interface object 646*a* indicates that the door lock (e.g., front door lock) corresponding to first accessory user interface object 646*a* is in an unlocked state. Accordingly, security category user interface 638 includes information about sub-categories as well as individual accessory devices of the security category, which enables a user to easily obtain information about the security of the location associated with the home automation system.

At FIG. 6H, electronic device 600 detects user input 650*g* (e.g., a tap gesture or other selection/navigation input) corresponding to first portion 656*a* of first accessory user interface object 646*a*. In some embodiments, in response to detecting user input 650*g*, electronic device 600 causes the door lock associated with first accessory user interface object 646*a* to transition from the unlocked state to a locked state. Accordingly, first portion 656*a* of first accessory user interface object 646*a* acts as a toggle that enables the door lock to be quickly locked and/or unlocked via user input 650*g*. In some embodiments, after detecting user input 650*g*, electronic device changes and/or modifies an appearance of first accessory user interface object 646*a* (e.g., changes a color, changes a brightness, and/or changes a thickness of a border around first accessory user interface object 646*a*) to provide a visual indication that the door lock has transitioned from the unlocked state to the locked state.

Additionally or alternatively, electronic device 600 detects user input 650*h* (e.g., a tap gesture or other selection/navigation input) corresponding to second portion 656*b* of first accessory user interface object 646*a*. In response to detecting user input 650*h*, electronic device 600 displays lock user interface 658, as shown at FIG. 6J. As set forth below, lock user interface 658 enables electronic device 600 to control a state of the door lock associated with first accessory user interface object 646*a* and enables electronic device 600 to adjust and/or modify one or more settings of the door lock. Therefore, accessory user interface objects 644*b*-644*dc* (and, optionally, accessory tiles 612*a*-612*c* and/or accessory user interface objects 618*a*-618*e*) include different portions that enable electronic device 600 to quickly control and/or adjust a state of a respective accessory device and/or to provide additional controls for the respective accessory device.

At FIG. 6H, electronic device 600 detects (e.g., in addition to detecting user inputs 650*g* and/or 650*h* or in lieu of detecting user inputs 650*g* and/or 650*h*) user input 650*i* (e.g., a tap gesture or other selection/navigation input) corresponding to second category user interface object 606*b*. In response to detecting user input 650*i*, electronic device 600 displays lighting category user interface 660, as shown at FIG. 6M.

As set forth above, in response to continuing to detect user input 650*f* for a predetermined amount of time (e.g., continued and/or maintained input for one second, two seconds, or five seconds), electronic device 600 displays menu 640, as shown at FIG. 6I. At FIG. 6I, menu 640 includes selectable options 640*a* and 640*b* corresponding to third category user interface object 606*c*. In some embodiments, in response to detecting selection of first selectable option 640*a*, electronic device 600 is configured to perform an action with respect to multiple accessory devices associated with the security category (e.g., the category associated with second category user interface object 606*b*). For instance, in some embodiments, in response to detecting user input selecting first selectable option 640*a*, electronic device 600 causes all of the lock devices that are associated with and/or included in the security category to be set to (e.g., transition to) a locked state (e.g., causes all lock devices that are in an unlocked state to transition to a locked state). Accordingly, electronic device 600 can control multiple accessory devices of the security category after detecting user input 650*f* for the predetermined amount of time and without requiring multiple user inputs requesting to control each accessory device separately.

In some embodiments, in response to detecting user input corresponding to second selectable option 640*b*, electronic device 600 displays a user interface (e.g., a user interface that is different from security category user interface 638) that includes a list of all accessory devices of the home automation system that are included in and/or associated with the security category.

As set forth above, in response to detecting user input 650*h* corresponding to second portion 656*b* of first accessory user interface object 646*a*, electronic device 600 displays lock user interface 658, as shown at FIG. 6J. At FIG. 6J, lock user interface 658 includes control user interface object 658*a* and settings user interface object 658*b*. In some embodiments, in response to detecting user input corresponding to control user interface object 658*a*, electronic device 600 causes the door lock to transition from the locked state to the unlocked state, or vice versa. As such, electronic device 600 is configured to cause the door lock to transition between states (e.g., the unlocked state and the locked state) in response to user input (e.g., user input 650*g*) corresponding to first portion 656*a* of first accessory user interface object 646*a* and/or user input corresponding to control user interface object 658*a*.

At FIG. 6J, electronic device 600 detects user input 650*j* (e.g., a tap gesture or other selection/navigation input) corresponding to settings user interface object 658*b*. In response to detecting user input 650*j*, electronic device 600 displays settings user interface 662 as shown at FIG. 6K. At FIG. 6K, settings user interface 662 enables electronic device 600 to adjust and/or configure settings of the door lock associated with first accessory user interface object 646*a*. At FIG. 6K, electronic device 600 detects user input 650*k* (e.g., a tap gesture or other selection/navigation input) corresponding to device indicator 662*a* of settings user interface 662. In response to detecting user input 650*k*, electronic device 600 displays appearance settings user interface 664, as shown at FIG. 6L.

Figure 6L:
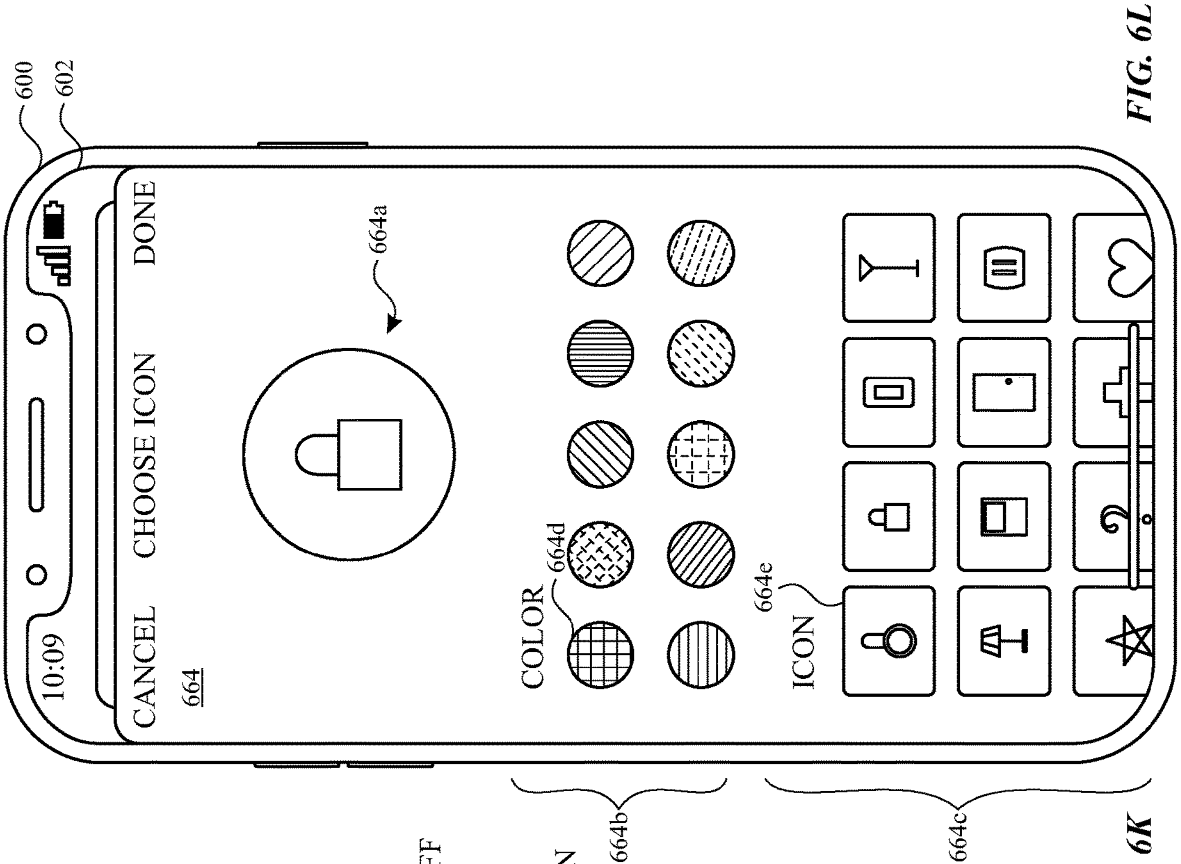
Figure 6K:
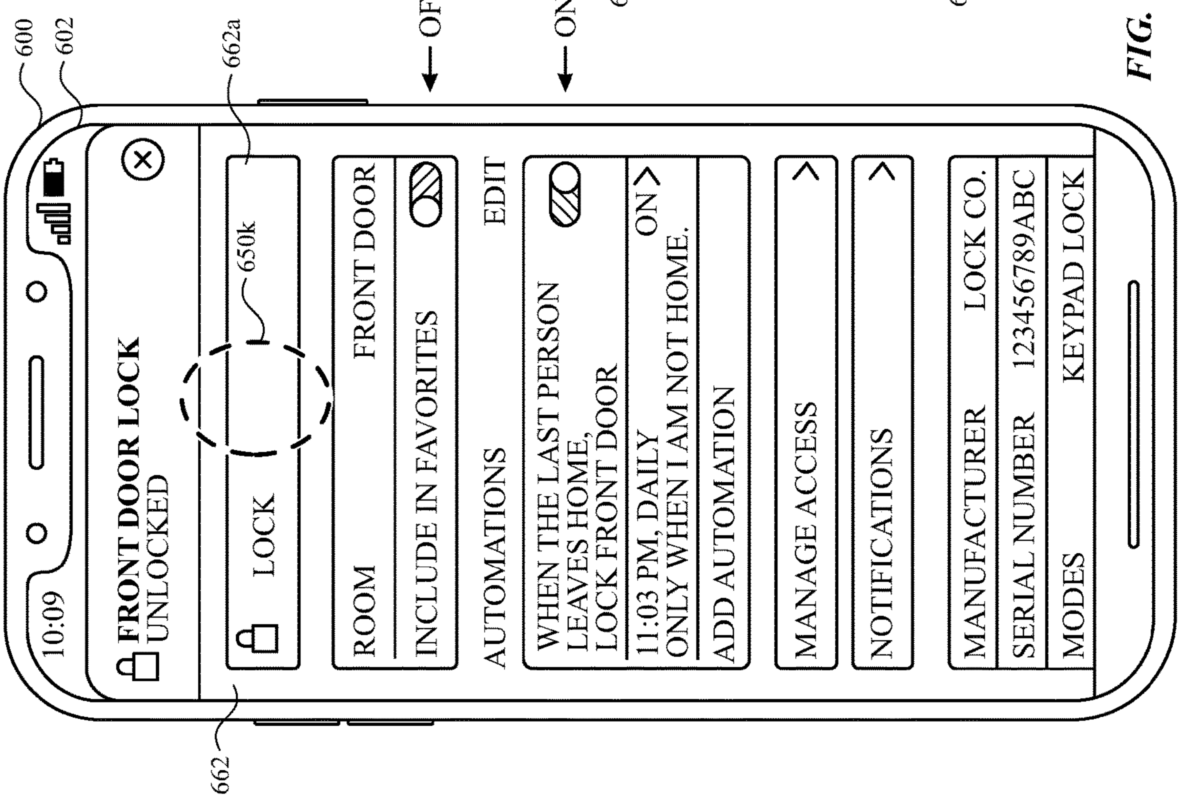

At FIG. 6L, appearance settings user interface 664 enables electronic device to modify, change, and/or customize an appearance of first accessory user interface object 646*a*. Appearance settings user interface 664 includes appearance indicator 664*a*, which provides a visual indication of a current appearance of first accessory user interface object 646*a*. At FIG. 6L, appearance indicator 664*a* includes a lock icon and a first color (e.g., as indicated by no hatching in appearance indicator 664*a*) that are associated with first accessory user interface object 646*a*. Appearance settings user interface 664 includes color region 664*b* and icon region 664*c* that include selectable options for customizing a color and a symbol, respectively, of first accessory user interface object 646*a*. For instance, in some embodiments, in response to detecting user input corresponding to selectable color option 664*d* of color region 664*b*, electronic device 600 adjusts and/or modifies the appearance of first accessory user interface object 646*a* to include a color corresponding to selectable color option 664*d*. In some embodiments, in response to detecting user input corresponding to icon selectable option 664*e* of icon region 664*c*, electronic device 600 adjusts and/or modifies a symbol and/or icon that is included on first accessory user interface object 646*a*. Accordingly, a user of electronic device 600 can customize an appearance of first accessory user interface object 646*a* so that the user can quickly identify and interact with first accessory user interface object 646*a*.

As set forth above, in response to detecting user input 650*i* corresponding to second category user interface object 606*b*, electronic device 600 displays lighting category user interface 660, as shown at FIG. 6M. At FIG. 6M, lighting category user interface 660 includes accessory user interface objects 660*a*-660*f* corresponding to accessory devices of the home automation system that are associated with a lighting category. At FIG. 6M, accessory user interface objects 660*a*-660*f* are associated with both light devices (e.g., accessory user interface objects 660*a*, 660*b*, 660*d*, and 660*e*) and outlet devices (e.g., accessory user interface objects 660*c* and 660*f*). In some embodiments, light devices include lamps (e.g., smart lamps), light bulbs (e.g., smart light bulbs), and/or other physical lighting devices that are configured to be controlled by electronic device 600. In some embodiments, outlet devices include smart outlets and/or smart plugs that control, adjust, and/or regulate a power supply to another device. For example, outlet devices are connected to both a power source and a device, such that the outlet devices control when power is supplied or not supplied from the power source to the connected device via circuitry of the outlet devices. In some embodiments, electronic device 600 associates one or more outlet devices with the lighting category based on a user designation of the one or more outlet devices (e.g., a user provides one or more user inputs that associate the one or more outlet devices with the lighting category). In some embodiments, electronic device 600 is configured to determine that one or more outlet devices are associated with the lighting category based on receiving information from the one or more outlet devices and/or a device connected to the one or more outlet devices.

Figure 6N:
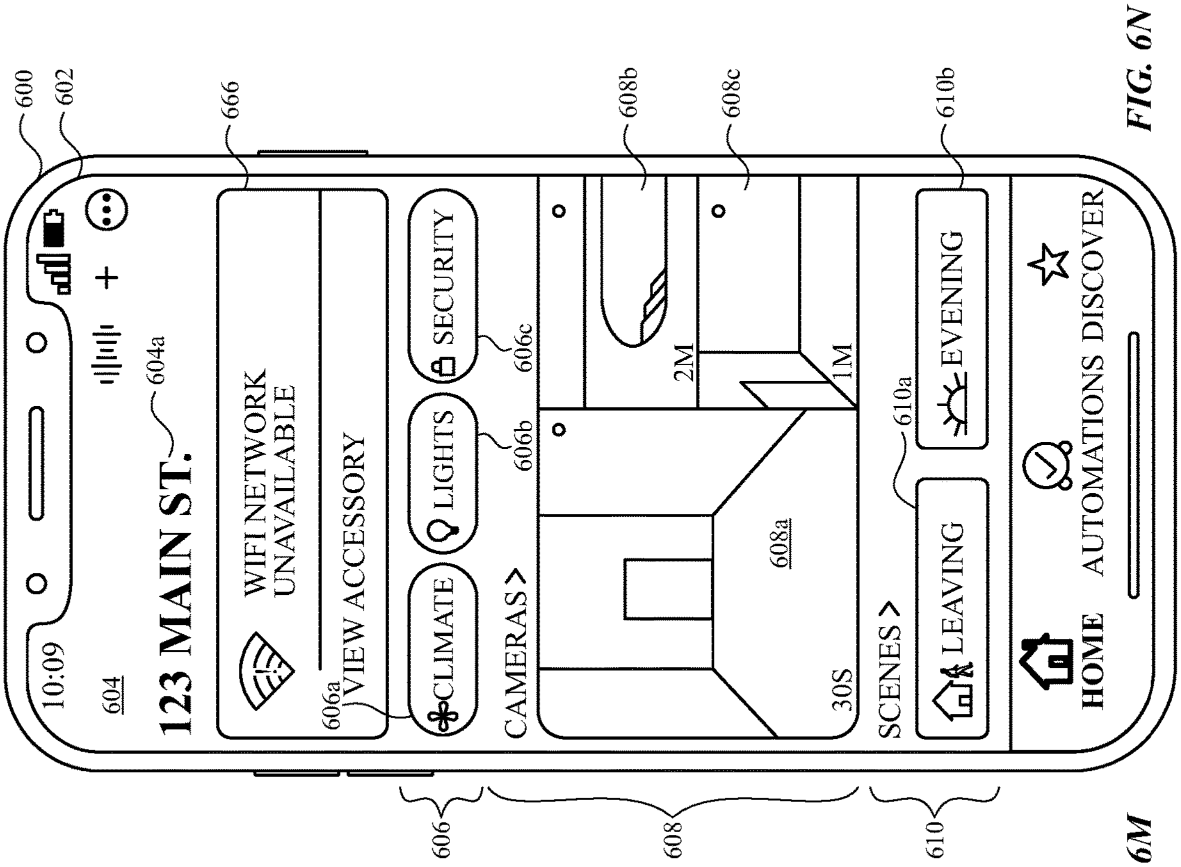
Figure 6M:
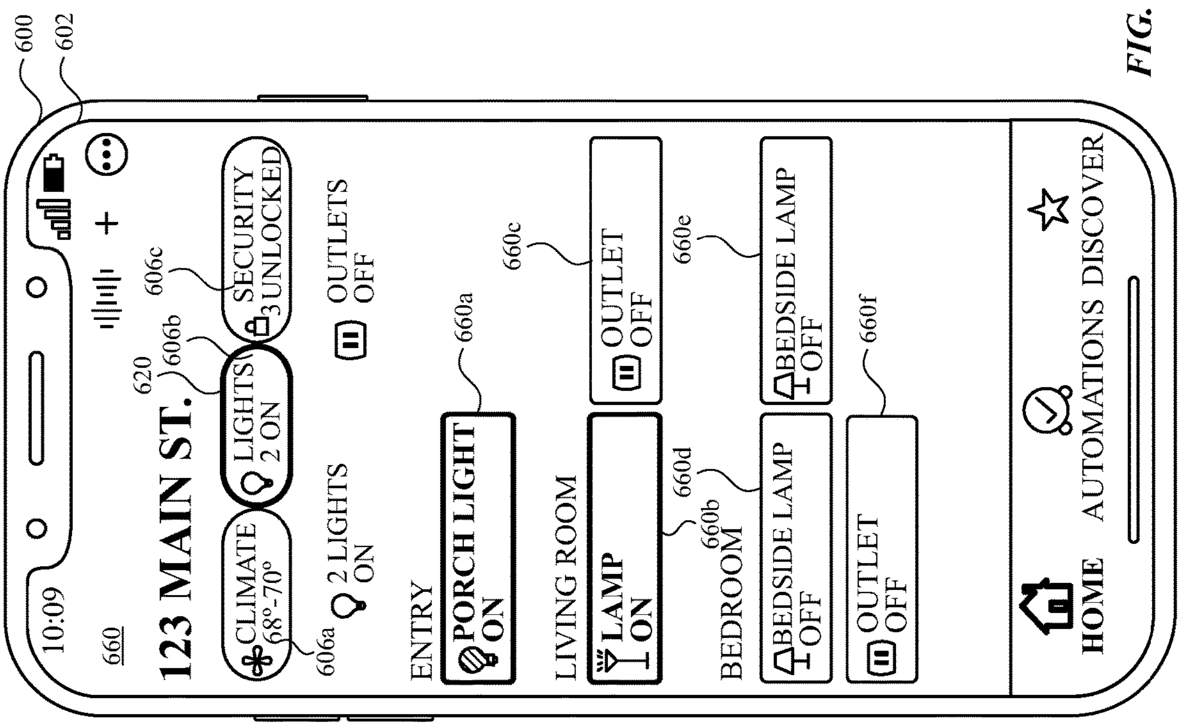

At FIG. 6N, electronic device 600 displays home user interface 604 including notification 666 based on receiving and/or detecting an event associated with the home automation system. For instance, at FIG. 6N, notification 666 relates to a wireless network of the home automation system being unavailable and/or disconnected. For instance, in some embodiments, accessory devices of the home automation system are connected to one or more wireless networks, which enables electronic device 600 to communicate with and/or control the accessory devices. In some embodiments, electronic device 600 determines that the wireless network of the home automation system is unavailable and/or disconnected based on an absence of communication with one or more accessory devices of the home automation system. For instance, in some embodiments, electronic device 600 periodically receives information from one or more accessory devices of the home automation system that includes statuses and/or a current state of the one or more accessory devices. In some embodiments, when electronic device 600 does not receive information from the one or more accessory devices of the home automation system for a predetermined time, electronic device 600 determines that the wireless network is unavailable and/or disconnected. In some embodiments, electronic device 600 determines that the wireless network of the home automation system is unavailable and/or disconnected based on an absence of a connection between electronic device 600 and the wireless network.

Electronic device 600 is configured to prioritize notifications, such as notification 666, that are displayed on home user interface 604 based on an importance and/or urgency of the notifications. For instance, at FIG. 6O, electronic device 600 displays notification 668 and does not display notification 666 based on receiving information about an event having a higher priority than the wireless network being unavailable and/or disconnected (e.g., the event associated with notification 666). At FIG. 6O, notification 668 relates to an accessory device of the home automation system detecting an alarm, such as a smoke alarm. Electronic device 600 displays notification 668 and does not display notification 666 because detection of the alarm has more urgency than the wireless network being unavailable and/or disconnected. Accordingly, electronic device 600 displays notifications on home user interface 604 that are determined to be of greater importance to the user and/or warrant action by the user of electronic device 600.

Figure 6P:
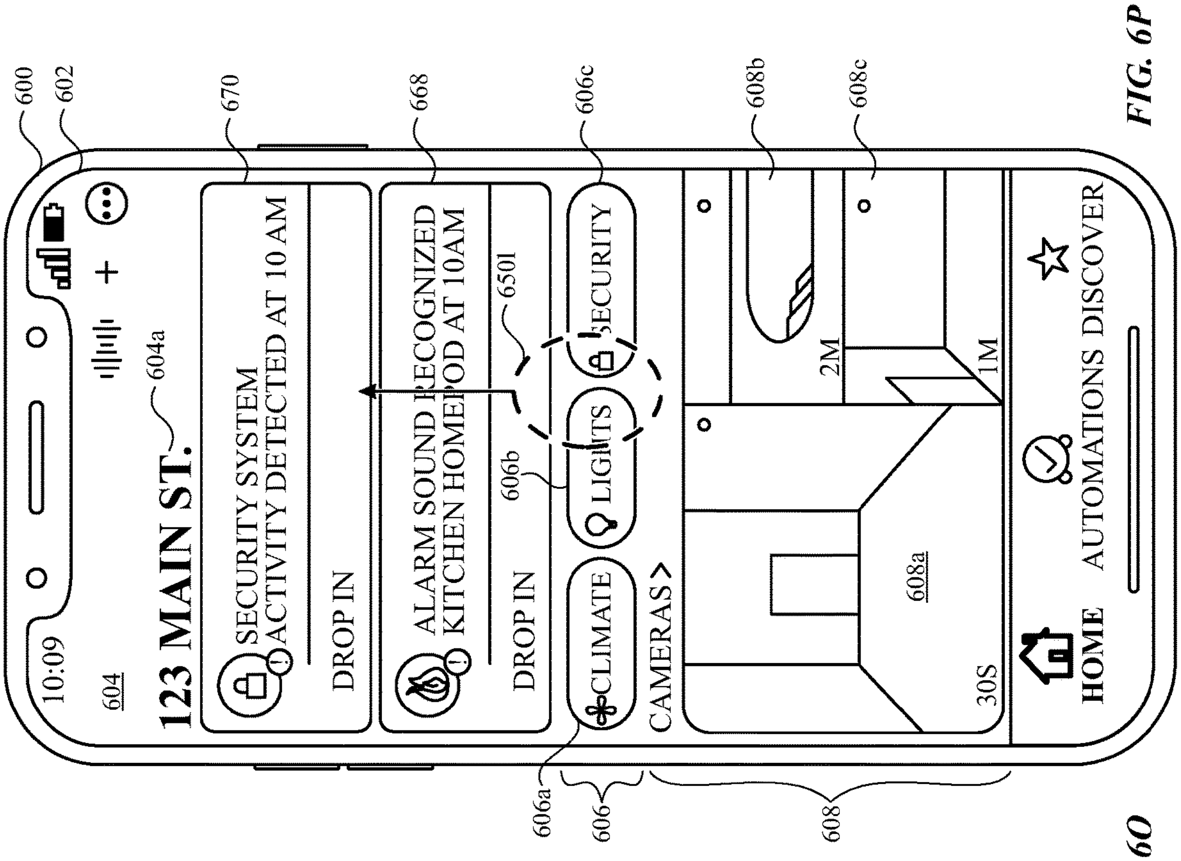
Figure 6O:
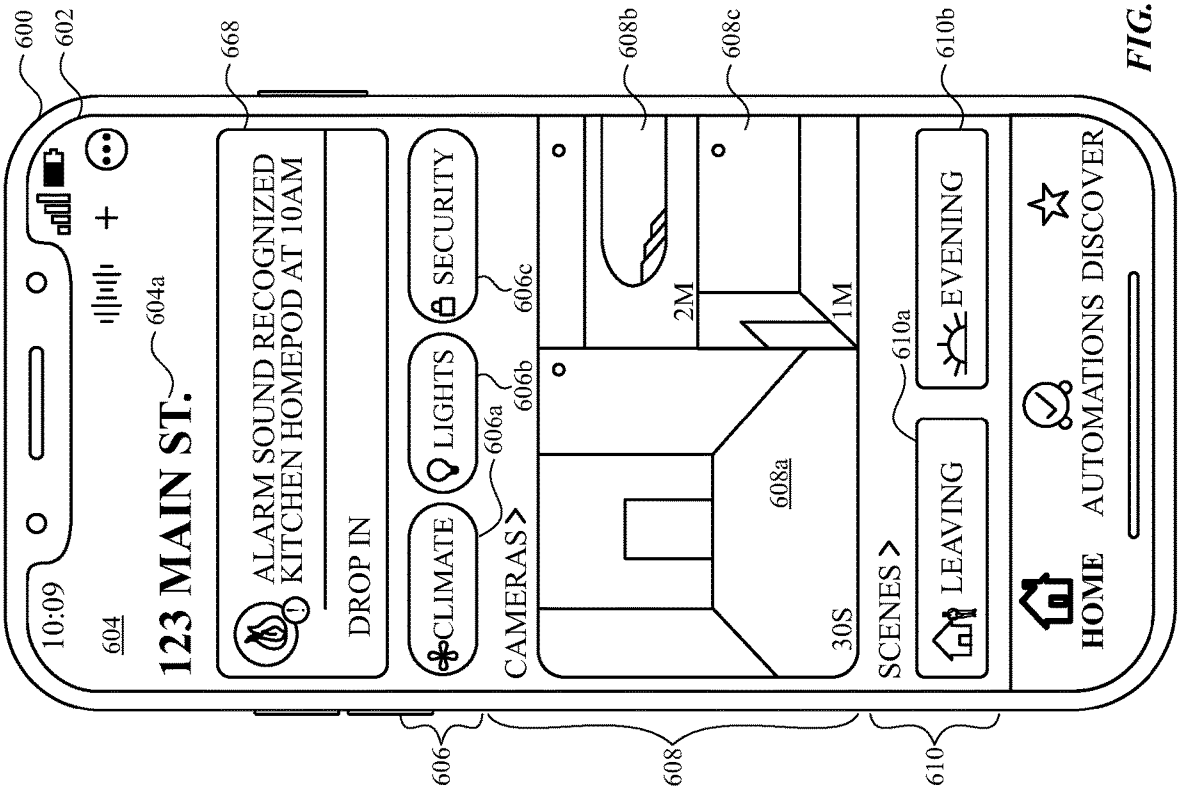
Figure 6R:
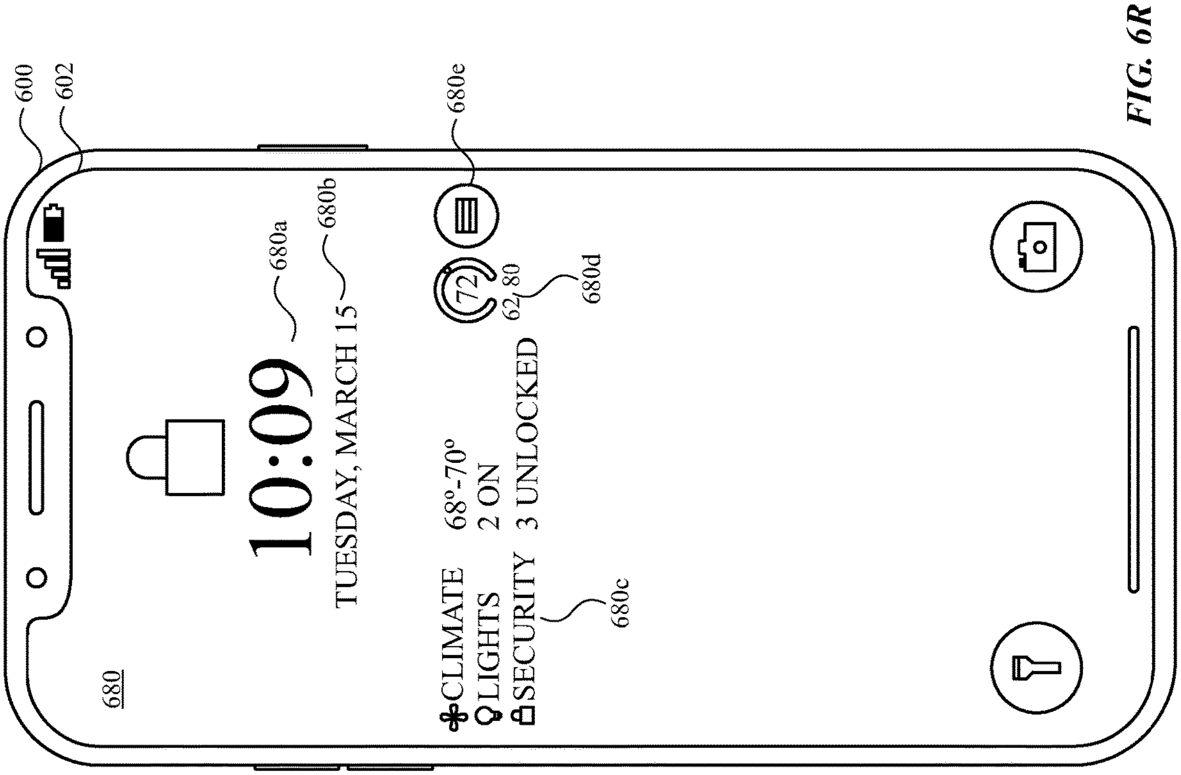

When electronic device 600 receives information about multiple events that are determined to have the same amount of importance and/or urgency, electronic device 600 displays multiple notifications on home user interface 604, as shown at FIG. 6P. At FIG. 6P, electronic device 600 displays notification 668 and notification 670 concurrently on home user interface 604. As set forth above, notification 668 relates to an accessory device of the home automation system detecting an alarm. Notification 670 relates to a security device of the home automation system detecting a security event, such as an event associated with a motion sensor, a glass breaking sensor, and/or an entry sensor. At FIG. 6P, electronic device 600 determines that the event associated with notification 668 and the event associated with notification 670 include the same priority level, importance, and/or urgency, and thus, electronic device 600 displays both notification 668 and notification 670 on home user interface 604. In some embodiments, electronic device 600 displays more than two notifications on home user interface 604 when electronic device 600 receives information about more than two events having the same priority level, importance, and/or urgency. As set forth above, electronic device 600 does not display notifications associated with events that are lower in priority level, importance, and/or urgency when electronic device detects an event that has a higher priority level, importance, and/or urgency.

At FIG. 6P, electronic device 600 detects user input **650*l* (e.g., a swipe gesture or other selection/navigation input) on home user interface 604. In response to detecting user input 650*l*, electronic device 600 scrolls home user interface 604 and displays favorites region 672, first room region 612, and second room region 676, as shown at FIG. 6**Q.

Figure 6Q:
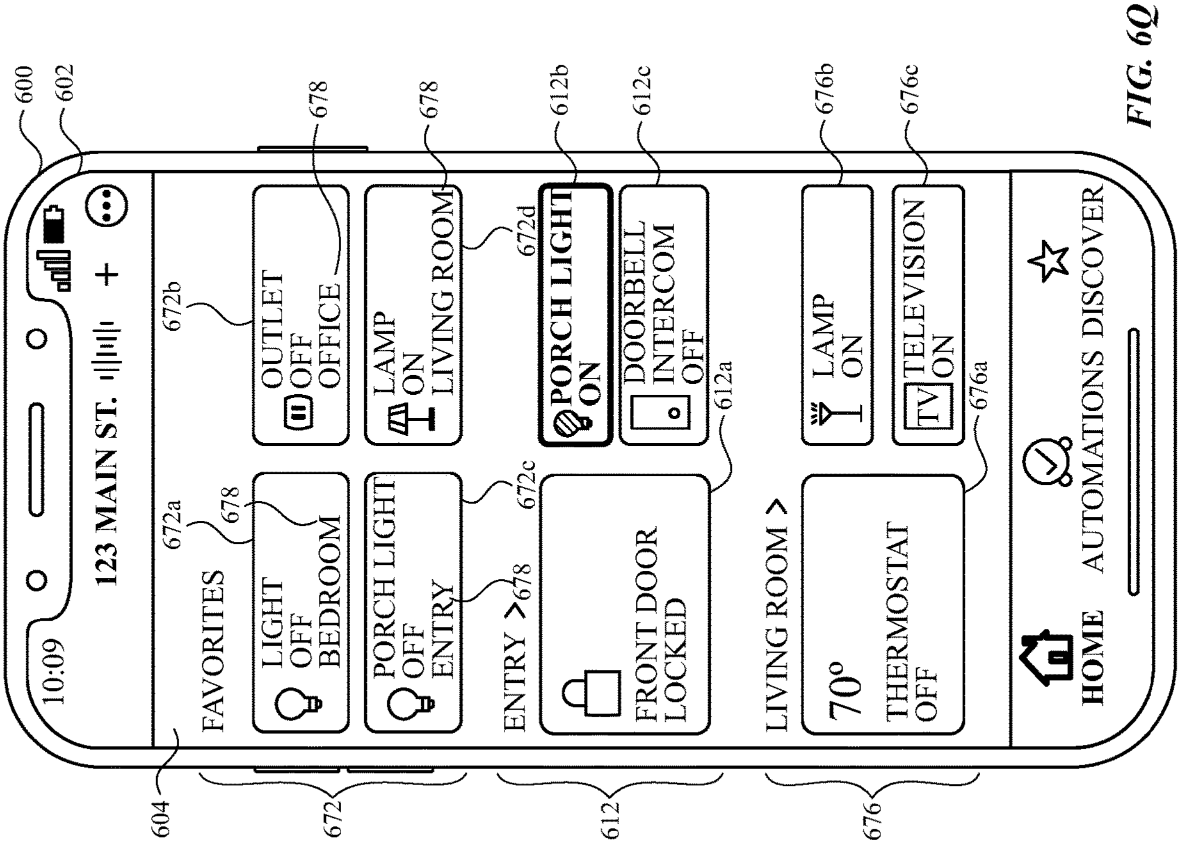
Figure 7A:
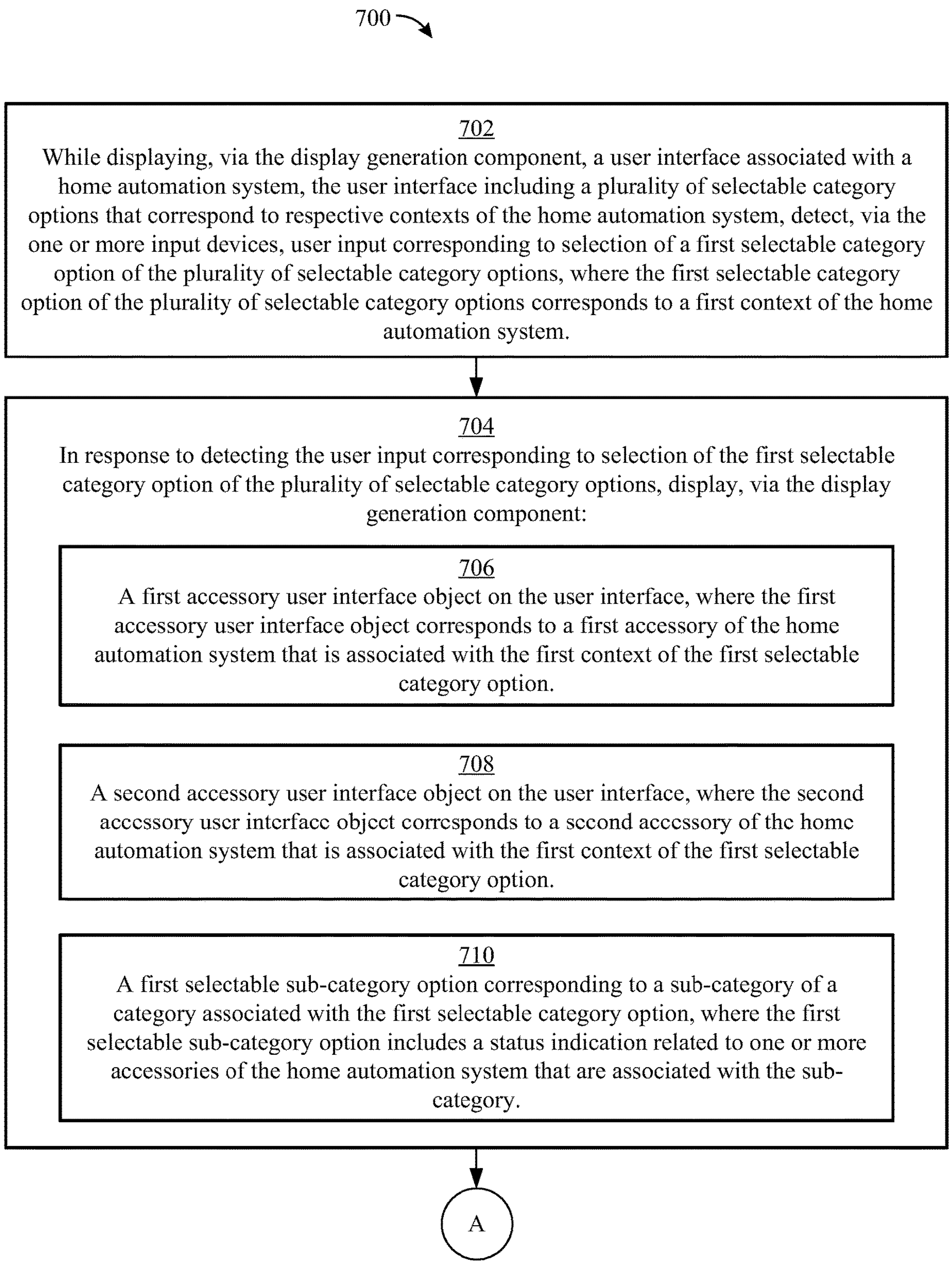
Figure 7B:
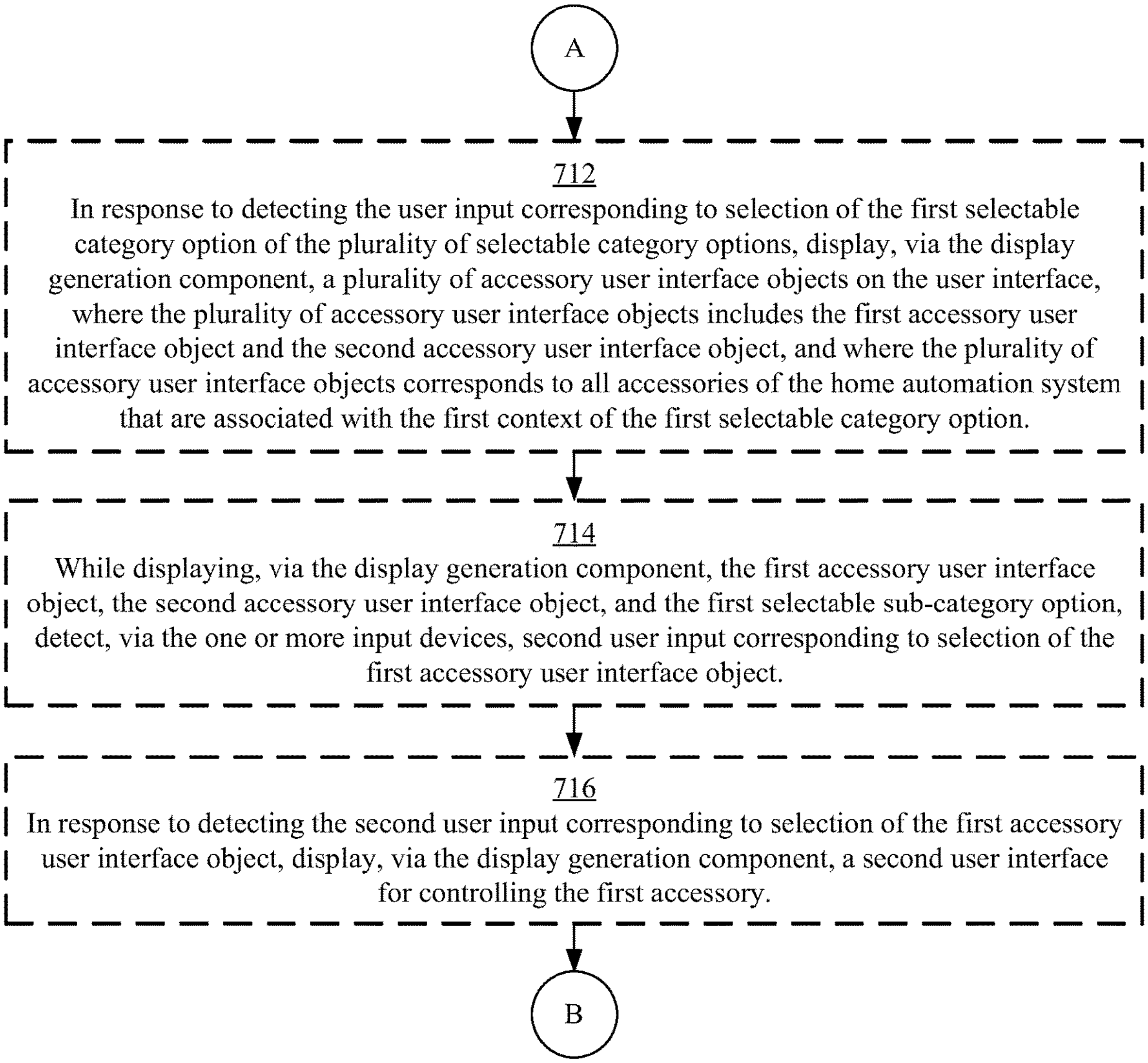
Figure 7C:
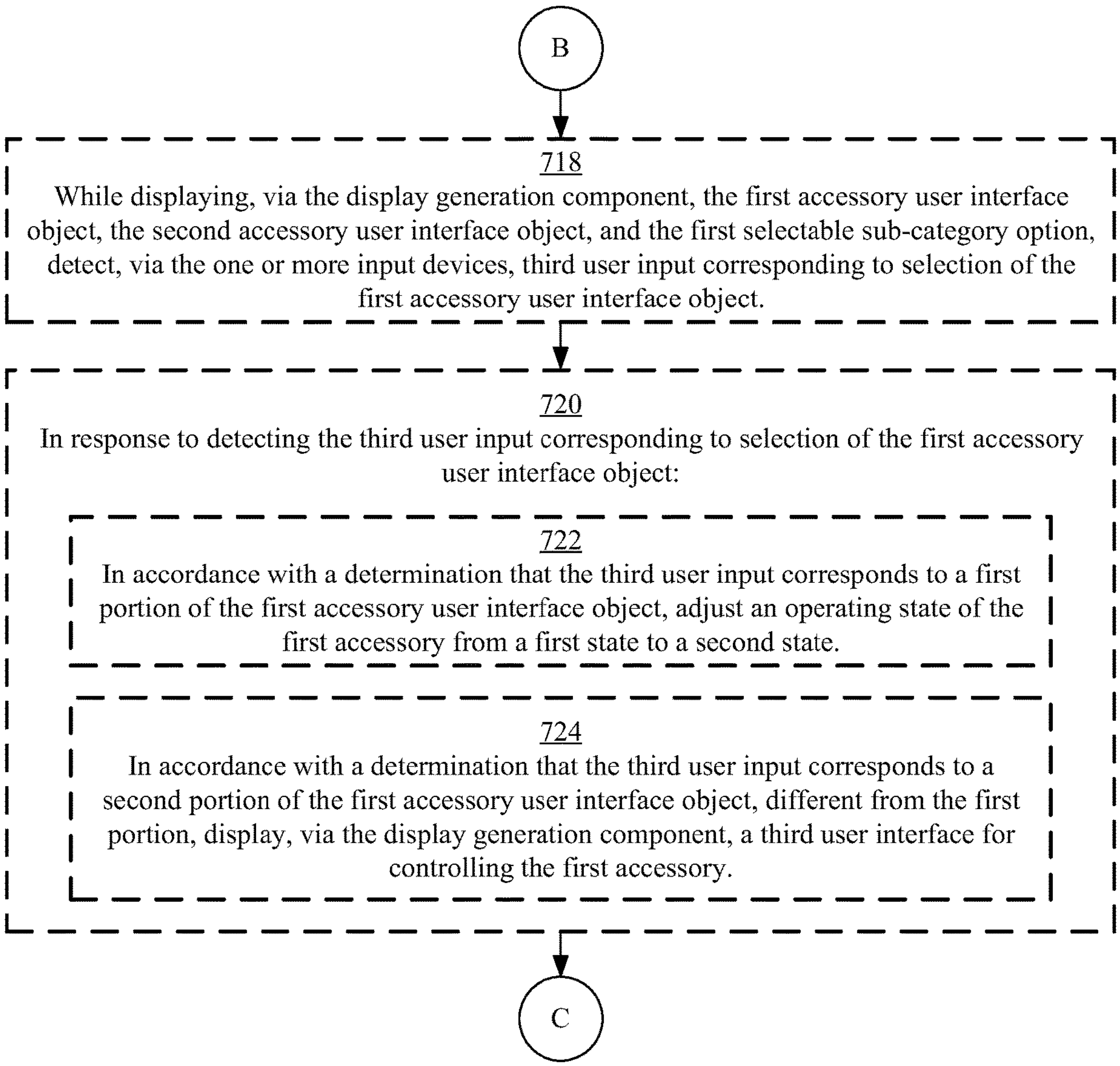
Figure 7D:
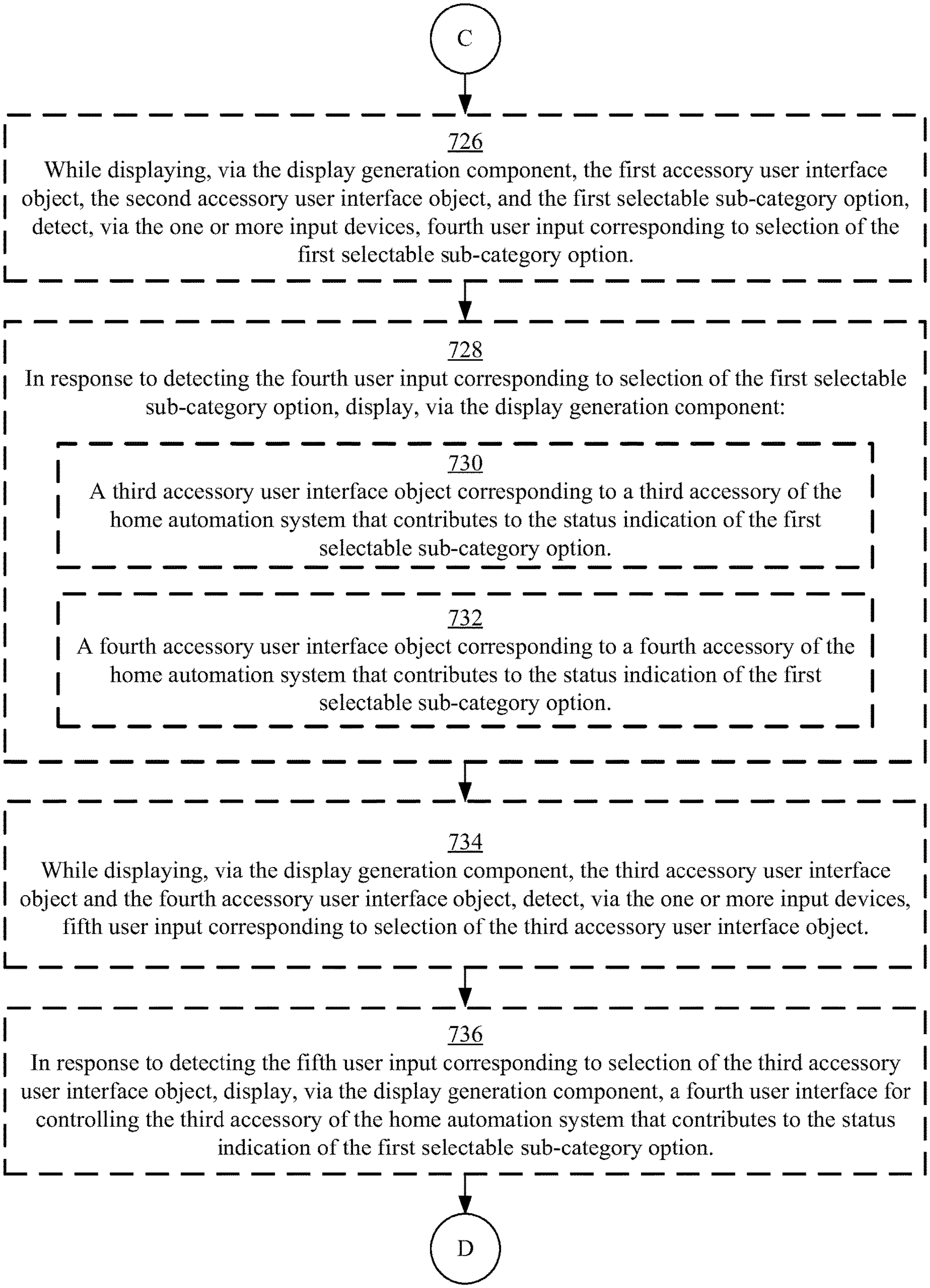
Figure 7F:
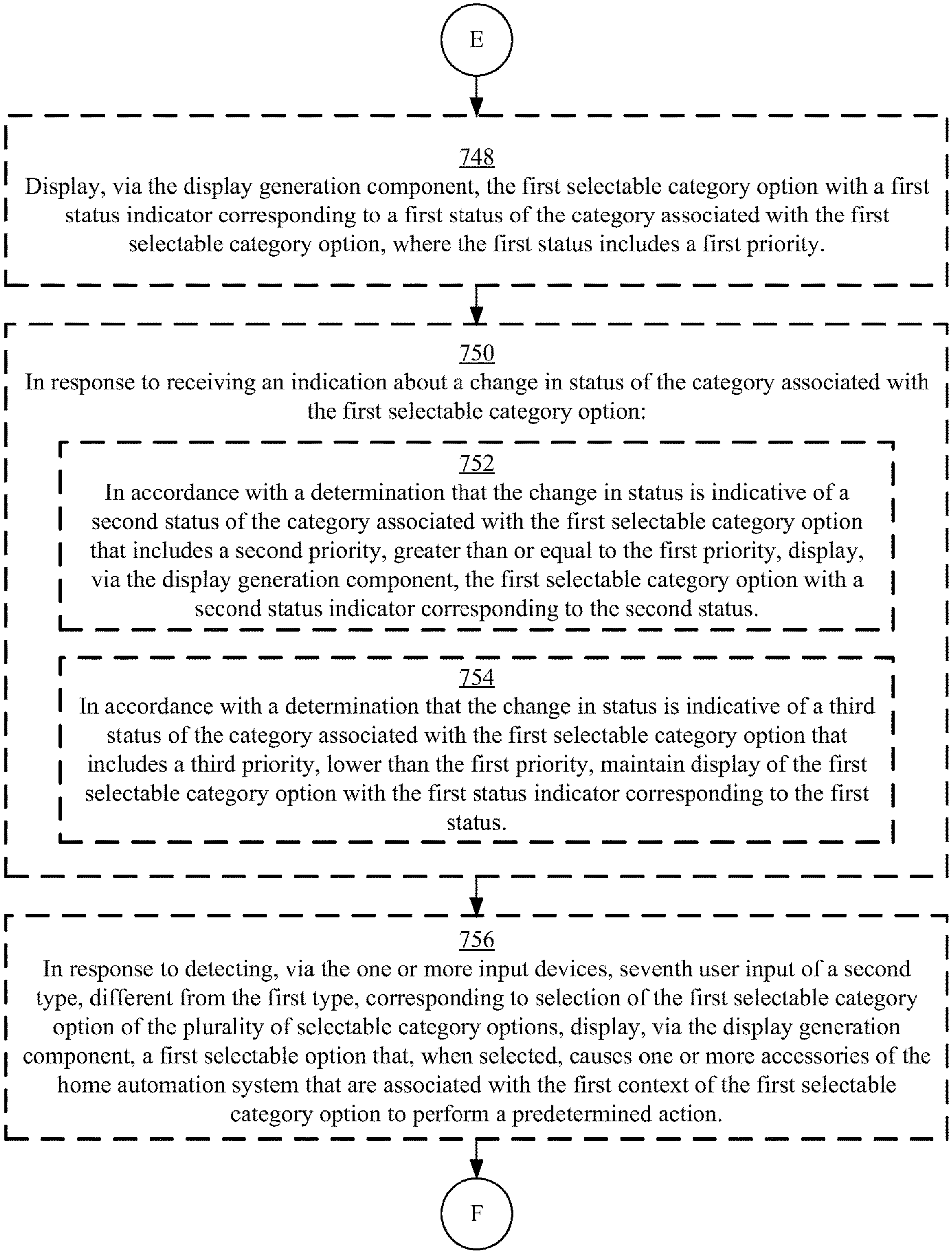
Figure 7G:
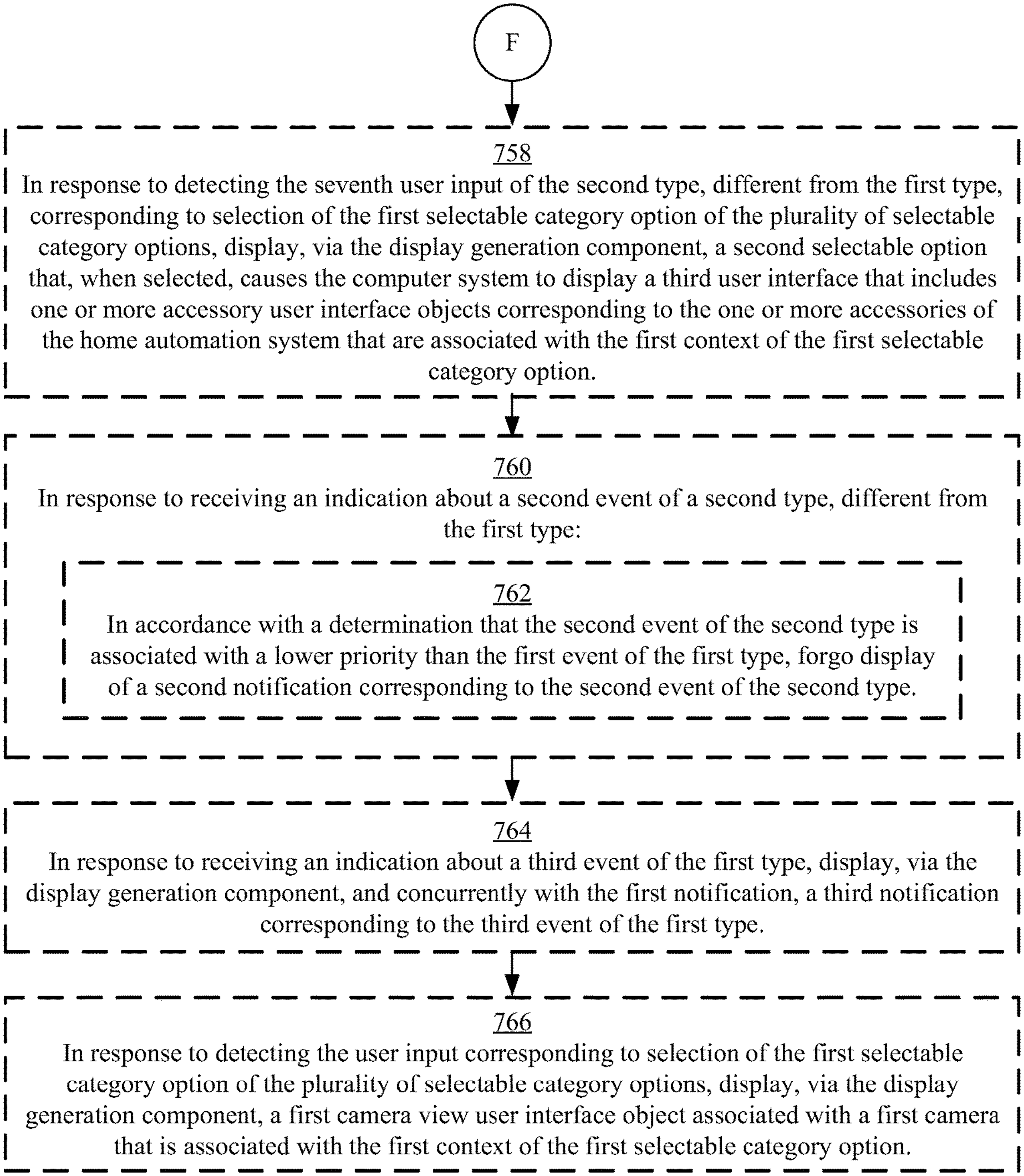

At FIG. 6Q, favorites region 672 of home user interface 604 includes accessory user interface objects **672*a*-672*d* corresponding to respective accessory devices of the home automation system that have been designated as favorites. In some embodiments, electronic device 600 designates an accessory device of the home automation system as a favorite accessory device in response to detecting one or more user inputs. In some embodiments, a user of electronic device 600 designates an accessory device as a favorite accessory device when the user frequently controls and/or interacts with the accessory device via electronic device 600. At FIG. 6Q, accessory user interface objects 672*a*-672*d* of favorites region 672 includes room indicators 678 that indicate where a respective accessory device is positioned in and/or associated with the location associated with the home automation system. Electronic device 600 displays room indicators 678 for accessory user interface objects 672*a*-672*d* of favorites region 672 because accessory devices from any room and/or area of the location associated with the home automation system can be included and/or designated as favorite accessory devices. At FIG. 6Q, electronic device 600 does not display room indicators 678 on accessory user interface objects 612*a*-612*c* of first room region 612 and/or on accessory user interface objects 676*a*-676*c* of second room region 676. Electronic device does not display room indicators 678 on accessory user interface objects 612*a*-612*c* and/or accessory user interface objects 676*a*-676*c* because they are displayed within room regions (e.g., first room region 674 and second room region 676**) that correspond to a particular room and/or area of the location associated with the home automation system.

At FIG. 6R, electronic device 600 displays (e.g., in response to detecting an absence of user input for a predetermined amount of time and/or in response to detecting a request to display wake screen user interface 680) wake screen user interface 680 (e.g., a lock screen). Wake screen user interface 680 includes time indicator **680*a*, date indicator 680*b*, home status indicator 680*c*, weather indicator 680*d*, and accessory user interface object 680*e*. Home status indicator 680*c* includes a summary of information associated with the home automation system so that a user can quickly view the information without providing authentication input that unlocks electronic device 600 (e.g., unlocks electronic device 600 so that electronic device 600 can display additional user interfaces that are different from wake screen user interface 680). For instance, home status indicator 680*c* includes status information for the climate category, the lighting category, and the security category of the home automation system. The status information of home status indicator 680*c* is based on information received from one or more accessory devices of the home automation system. At FIG. 6R, home status indicator 680*c* is separated into categories that correspond to category user interface objects 606*a*-606*c*. In some embodiments, home status indicator 680*c* includes different information and/or statuses related to the home automation system. In some embodiments, electronic device 600 updates home status indicator 680*c* as electronic device 600** receives information from one or more accessory devices of the home automation system.

At FIG. 6R, accessory user interface object **680*e* corresponds to a garage opener of the home automation system. In some embodiments, electronic device 600 displays accessory user interface object 680*e* in response to receiving one or more user inputs requesting to pin and/or include accessory user interface object 680*e* on wake screen user interface 680. In some embodiments, electronic device 600 causes garage opener to cause a garage door to open and/or close in response to receiving user input corresponding to accessory user interface object 680*e*. In some embodiments, electronic device 600 can cause the garage opener to cause the garage door to open and/or closer without detecting authentication user input that unlocks electronic device 600. In some embodiments, electronic device 600** displays one or more accessory user interface objects that correspond to accessory devices of the home automation system that are different from the garage opener.

FIGS. 7A-7G are a flow diagram illustrating a method for managing accessories of a home automation system using a computer system in accordance with some embodiments. Method 700 is performed at a computer system (e.g., 100, 300, 500, and/or 600) (e.g., an electronic device; a smart device, such as a smartphone or a smartwatch; a mobile device; a wearable device) that is in communication with a display generation component (e.g., 602) (e.g., a display controller, a touch-sensitive display system, a projector, a display screen, a display monitor, and/or a holographic display) and one or more input devices (e.g., a touch-sensitive surface, a touch-sensitive display, a mouse, a keyboard, and/or a controller). Some operations in method 700 are, optionally, combined, the orders of some operations are, optionally, changed, and some operations are, optionally, omitted.

As described below, method 700 provides an intuitive way for managing accessories of a home automation system. The method reduces the cognitive burden on a user for managing accessories of a home automation system, thereby creating a more efficient human-machine interface. For battery-operated computing devices, enabling a user to manage accessories of a home automation system faster and more efficiently conserves power and increases the time between battery charges.

While displaying, via the display generation component (e.g., 602), a user interface (e.g., 604, 614, 638, and/or 660) (e.g., a home and/or default user interface of an application that is configured to enable control of one or more accessories and/or devices that are part of a home automation system) associated with a home automation system (or an application) (e.g., a system or application that includes one or more accessories and/or devices of a home and/or other structure that are able to be controlled and/or adjusted via the computer system), the user interface (e.g., 604, 614, 638, and/or 660) including a plurality of selectable category options (e.g., 606*a*-606*d*) (e.g., climate control, security control, and/or entertainment control) that correspond to respective contexts (e.g., functions, operations, and/or actions of the home automation system) of the home automation system, the computer system (e.g., 100, 300, 500, and/or 600) detects (702), via the one or more input devices, user input (e.g., 650*a*, 650*f*, and/or 650*i*) (e.g., a tap gesture) corresponding to selection of a first selectable category option (e.g., 606*a*-606*d*) of the plurality of selectable category options (e.g., 606*a*-606*d*), where the first selectable category option (e.g., 606*a*-606*d*) of the plurality of selectable category options (e.g., 606*a*-606*d*) corresponds to a first context (e.g., a first function, operation, and/or action of the home automation system) of the home automation system. In some embodiments, a context of a selectable category option (e.g., 606*a*-606*d*) does not include a physical location, such as a group of devices and/or accessories within a room and/or area of a structure, and/or a type of device (e.g., a group of devices that are all of the same type).

In response to detecting the user input (e.g., 650*a*, 650*f*, and/or 650*i*) corresponding to selection of the first selectable category option (e.g., 606*a*-606*d*) of the plurality of selectable category options (e.g., 606*a*-606*d*), the computer system (e.g., 100, 300, 500, and/or 600) displays (704) (e.g., concurrently displaying), via the display generation component, a first accessory user interface object (706) (e.g., 618*a*-618*e*, 644*a*-644*d*, and/or 660*a*-660*f*) (e.g., a first user interface object and/or affordance associated with a first accessory of the home automation system that, when selected, is configured to control and/or adjust a state and/or setting of the first accessory of the home automation system) on the user interface (e.g., 604, 614, 638, and/or 660), where the first accessory user interface object (e.g., 618*a*-618*e*, 644*a*-644*d*, and/or 660*a*-660*f*) corresponds to a first accessory of the home automation system that is associated with the first context of the first selectable category option (e.g., the first accessory user interface object corresponds to a first accessory of the home automation system that is configured to perform a function that is consistent with the first context).

In response to detecting the user input (e.g., 650*a*, 650*f*, and/or 650*i*) corresponding to selection of the first selectable category option (e.g., 606*a*-606*d*) of the plurality of selectable category options (e.g., 606*a*-606*d*), the computer system (e.g., 100, 300, 500, and/or 600) displays (704) (e.g., concurrently displaying), via the display generation component, a second accessory user interface object (708) (e.g., 618*a*-618*e*, 644*a*-644*d*, and/or 660*a*-660*f*) on the user interface (e.g., 604, 614, 638, and/or 660) (e.g., a second user interface object and/or affordance associated with a second accessory of the home automation system that, when selected, is configured to control and/or adjust a state and/or setting of the second accessory of the home automation system), where the second accessory user interface object (e.g., 618*a*-618*e*, 644*a*-644*d*, and/or 660*a*-660*f*) corresponds to a second accessory of the home automation system that is associated with the first context of the first selectable category option (e.g., the second accessory user interface object corresponds to a second accessory of the home automation system that is configured to perform a function that is consistent with the first context). In some embodiments, the user interface (e.g., 604, 614, 638, and/or 660) includes accessory user interface objects (e.g., 618*a*-618*e*, 644*a*-644*d*, and/or 660*a*-660*f*) that correspond to all of the accessories of the home automation system that are configured to perform a function that is consistent with the first context. In some embodiments, the user interface (e.g., 604, 614, 638, and/or 660) does not include accessory user interface objects that do not correspond to accessories of the home automation system that are not configured to perform the function that is consistent with the first context. In some embodiments, the first context includes a climate control function and the first and second accessory user interface objects correspond to thermostats, fans, heating devices, cooling devices, ventilation devices, humidity devices and/or sensors, and/or air quality devices and/or sensors. In some embodiments, the first context includes a security function and the first and second accessory user interface objects correspond to alarms, locks, window sensors, door sensors, security cameras, and/or glass breaking sensors.

In response to detecting the user input (e.g., 650*a*, 650*f*, and/or 650*i*) corresponding to selection of the first selectable category option (e.g., 606*a*-606*d*) of the plurality of selectable category options (e.g., 606*a*-606*d*), the computer system (e.g., 100, 300, 500, and/or 600) displays (704) (e.g., concurrently displaying), via the display generation component, a first selectable sub-category option (710) (e.g., 616*a*-616*c*, 642*a*, and/or 642*b*) (e.g., a user interface object and/or affordance that. when selected, is configured to cause the computer system to display one or more third accessory user interface objects corresponding to respective accessories of the home automation system that are associated with and/or fall within a sub-category of the first selectable sub-category option) corresponding to a sub-category of a category associated with the first selectable category option (e.g. 606*a*-606*d*) (e.g., the first selectable sub-category option is associated with a subset of devices of the devices associated with the first context of the first selectable category option), where the first selectable sub-category option (e.g., 616*a*-616*c*, 642*a*, and/or 642*b*) includes a status indication (e.g., 622*a*, 622*b*, 624*a*, 624*b*, 630*a*, 630*b*, 648*a*, 648*b*, 652*a*, and/or 652*b*) (e.g., information and/or feedback about a current state and/or status of the subset of devices of the sub-category, such as one or more temperatures, an indication of air quality, an indication of humidity, an indication of a number of devices that are in a predetermined state (e.g., an active state, an on state, and/or an unlocked state), and/or an indication of an event detected by a device of the subset of devices) related to one or more accessories of the home automation system that are associated with the sub-category (e.g., one or more accessories of the home automation system that are associated with a second context of the sub-category, such as a function, operation, and/or action of the home automation system).

Displaying the first accessory user interface object, the second accessory user interface object, and the first selectable sub-category option in response to detecting user input corresponding to selection of a first category selectable option allows a user of the computer system to view relevant information about a category of the home automation system without having to search for individual accessories of the category, thereby providing improved visual feedback and reducing the number of inputs needed to perform an operation.

In some embodiments, in response to detecting the user input (e.g., 650*a*, 650*f*, and/or 650*i*) corresponding to selection of the first selectable category option (e.g., 606*a*-606*d*) of the plurality of selectable category options (e.g., 606*a*-606*d*), the computer system (e.g., 100, 300, 500, and/or 600) displays (712), via the display generation component (e.g., 602), a plurality of accessory user interface objects (e.g., 618*a*-618*e*, 644*a*-644*d*, and/or 660*a*-660*f*) (e.g., a plurality of user interface objects and/or affordances associated with respective accessories of the home automation system that, when selected, are configured to control and/or adjust a state and/or setting of the respective accessory of the home automation system) on the user interface (e.g., 604, 614, 638, and/or 660), where the plurality of accessory user interface objects (e.g., 618*a*-618*e*, 644*a*-644*d*, and/or 660*a*-660*f*) includes the first accessory user interface object (e.g., 618*a*-618*e*, 644*a*-644*d*, and/or 660*a*-660*f*) and the second accessory user interface object (e.g., 618*a*-618*e*, 644*a*-644*d*, and/or 660*a*-660*f*), and where the plurality of accessory user interface objects (e.g., 618*a*-618*e*, 644*a*-644*d*, and/or 660*a*-660*f*) corresponds to all accessories of the home automation system that are associated with the first context of the first selectable category option (e.g., 606*a*-606*d*) (e.g., selection of the first selectable category option causes the computer system to display user interface objects for all accessories that fall within and/or correspond to the category of the first selectable category option). In some embodiments, the computer system does not display the plurality of accessory user interface objects (e.g., 618*a*-618*e*, 644*a*-644*d*, and/or 660*a*-660*f*) concurrently with one another. In some embodiments, the computer system displays a first subset of the plurality of accessory user interface objects (e.g., 618*a*-618*e*, 644*a*-644*d*, and/or 660*a*-660*f*) in response to detecting the user input (e.g., 650*a*, 650*f*, and/or 650*i*) corresponding to selection of the first selectable category option (e.g., 606*a*-606*d*) and displays a second subset of the plurality of accessory user interface objects (e.g., 618*a*-618*e*, 644*a*-644*d*, and/or 660*a*-660*f*) in response to detecting a second user input requesting to scroll the user interface (e.g., 614 638, and/or 660) on which the plurality of accessory user interface objects (e.g., 618*a*-618*e*, 644*a*-644*d*, and/or 660*a*-660*f*) is displayed.

Displaying the plurality of accessory user interface objects that corresponds to all accessories of the home automation system that are associated with the first context of the first selectable category option allows a user of the computer system to quickly find and/or view accessories that fall with a particular category without having to search and/or provide additional user input, thereby providing improved visual feedback and reducing the number of inputs needed to perform an operation.

In some embodiments, while displaying, via the display generation component (e.g., 602), the first accessory user interface object (e.g., 618*a*-618*e*, 644*a*-644*d*, and/or 660*a*-660*f*), the second accessory user interface object (e.g., 618*a*-618*e*, 644*a*-644*d*, and/or 660*a*-660*f*), and the first selectable sub-category option (e.g., 616*a*-616*c*, 642*a*, and/or 642*b*), the computer system (e.g., 100, 300, 500, and/or 600) detects (714), via the one or more input devices, second user input (e.g., 650*e*) (e.g., a tap gesture) corresponding to selection of the first accessory user interface object (e.g., 618*a*-618*e*, 644*a*-644*d*, and/or 660*a*-660*f*). In response to detecting the second user input (e.g., 650*e*) corresponding to selection of the first accessory user interface object (e.g., 618*a*-618*e*, 644*a*-644*d*, and/or 660*a*-660*f*), the computer system (e.g., 100, 300, 500, and/or 600) displays (716), via the display generation component (e.g., 602), a second user interface (e.g., 632 and/or 634) (e.g., a user interface that includes one or more control user interface objects that enable the computer system to adjust an operating state of the first accessory corresponding to the first accessory user interface object and/or one or more settings user interface objects that enable the computer system to modify and/or configure settings of the first accessory corresponding to the first accessory user interface object) for controlling (e.g., adjusting an operating state (e.g., on, off, open, closed, locked, unlocked, playing, and/or paused) of the first accessory and/or modifying and/or configuring settings (e.g., audio settings, playback settings, automation settings, authorization settings, and/or notification settings) of the first accessory) the first accessory. Displaying the second user interface for controlling the first accessory in response to detecting second user input corresponding to selection of the first accessory user interface object allows a user of the computer system to quickly access controls for the first accessory, thereby reducing the number of inputs needed to perform an operation.

In some embodiments, the second user interface (e.g., 632 and/or 634) for controlling the first accessory includes a status user interface object (e.g., 634*a*) (e.g., a selectable user interface object, a slider, a toggle, and/or an affordance) that, when selected, causes the computer system (e.g., 100, 300, 500, and/or 600) to adjust whether or not information associated with the first accessory (e.g., information received from the first accessory that includes measurements collected by the first accessory, data collected and/or captured by the first accessory, a current operating state of the first accessory, and/or events detected by the first accessory) is included in a status (e.g., 607*a*-607*d*) displayed on the first selectable category option (e.g., 606*a*-606*d*) (e.g., a visual indication that includes a summary and/or relevant information about the first accessory, the second accessory, and/or additional accessories that are associated with the category of the first selectable category option). Enabling a user to include information associated with the first accessory in the status displayed on the first selectable category option allows a user of the computer system to customize information about the category of the first selectable category that is most relevant to the user, thereby providing improved visual feedback.

In some embodiments, while displaying, via the display generation component (e.g., 602), the first accessory user interface object (e.g., 618*a*-618*e*, 644*a*-644*d*, and/or 660*a*-

**660*f*), the second accessory user interface object (e.g., 618*a*-618*e*, 644*a*-644*d*, and/or 660*a*-660*f*), and the first selectable sub-category option (e.g., 616*a*-616*c*, 642*a*, and/or 642*b*), the computer system (e.g., 100, 300, 500, and/or 600) detects (718), via the one or more input devices, third user input (e.g., 650*g* and/or 650*h*) (e.g., a tap gesture corresponding to a first portion of the first accessory user interface object or a tap gesture corresponding to a second portion of the first accessory user interface object) corresponding to selection of the first accessory user interface object (e.g., 618*a*-618*e*, 644*a*-644*d*, and/or 660*a*-660*f*). In response to detecting the third user input (e.g., 650*g* and/or 650*h*) corresponding to selection of the first accessory user interface object (720) (e.g., 618*a*-618*e*, 644*a*-644*d*, and/or 660*a*-660*f*) and in accordance with a determination that the third user input (e.g., 650*g* and/or 650*h*) corresponds to a first portion (e.g., 656*a*) (e.g., a toggle portion that includes a left portion, a right portion, a top portion, or a bottom portion of the first accessory user interface object) of the first accessory user interface object (e.g., 618*a*-618*e*, 644*a*-644*d*, and/or 660*a*-660*f*), the computer system (e.g., 100, 300, 500, and/or 600) adjusts (722) an operating state (e.g., transmitting data and/or information to the first accessory that causes the first accessory to change between operating states) of the first accessory from a first state (e.g., on, open, unlocked, and/or outputting content) to a second state (e.g., off, closed, locked, and/or pausing and/or ceasing output of content). In response to detecting the third user input (e.g., 650*g* and/or 650*h*) corresponding to selection of the first accessory user interface object (720) (e.g., 618*a*-618*e*, 644*a*-644*d*, and/or 660*a*-660*f*) and in accordance with a determination that the third user input (e.g., 650*g* and/or 650*h*) corresponds to a second portion (e.g., 656*b*) (e.g., a non-toggle portion that includes a left portion, a right portion, a top portion, or a bottom portion of the first accessory user interface object) of the first accessory user interface object (e.g., 618*a*-618*e*, 644*a*-644*d*, and/or 660*a*-660*f*), different from the first portion (e.g., 656*a*) (e.g., the first portion and the second portion of the first accessory user interface object are visually distinct and/or do not overlap with one another on the display generation component), the computer system (e.g., 100, 300, 500, and/or 600) displays (724), via the display generation component (e.g., 602) (and, optionally, without adjusting an operating state of the first accessory), a third user interface (e.g., 632 and/or 658**) (e.g., a user interface that includes one or more control user interface objects that enable the computer system to adjust an operating state of the first accessory corresponding to the first accessory user interface object and/or one or more settings user interface objects that enable the computer system to modify and/or configure settings of the first accessory corresponding to the first accessory user interface object) for controlling (e.g., adjusting an operating state (e.g., on, off, open, closed, locked, unlocked, playing, and/or paused) of the first accessory and/or modifying and/or configuring settings (e.g., audio settings, playback settings, automation settings, authorization settings, and/or notification settings) of the first accessory) the first accessory. In some embodiments, the third user interface includes additional control user interface objects and/or settings user interface objects that adjust and/or control operation of the first accessory in a different way than the first portion of the first accessory user interface object.

The first accessory user interface object including different portions that perform different operations in response to user input allows a user of the computer system to quickly adjust a state of the first accessory and/or access additional controls for the first accessory, thereby reducing the number of inputs needed to perform an operation.

In some embodiments, while displaying, via the display generation component (e.g., 602), the first accessory user interface object (e.g., **618*a*-618*e*, 644*a*-644*d*, and/or 660*a*-660*f*), the second accessory user interface object (e.g., 618*a*-618*e*, 644*a*-644*d*, and/or 660*a*-660*f*), and the first selectable sub-category option (e.g., 616*a*-616*c*, 642*a*, and/or 642*b*), the computer system (e.g., 100, 300, 500, and/or 600) detects (726), via the one or more input devices, fourth user input (e.g., 650*d*) (e.g., a tap gesture) corresponding to selection of the first selectable sub-category option (e.g., 616*a*-616*c*, 642*a*, and/or 642*b*). In response to detecting the fourth user input (e.g., 650*d*) corresponding to selection of the first selectable sub-category option (e.g., 616*a*-616*c*, 642*a*, and/or 642*b*), the computer system (e.g., 100, 300, 500, and/or 600) displays (728) displaying, via the display generation component (602), a third accessory user interface object (730) (e.g., 618*a*-618*e*) (e.g., a third user interface object and/or affordance associated with a third accessory of the home automation system that, when selected, is configured to control and/or adjust a state and/or setting of the third accessory of the home automation system) corresponding to a third accessory of the home automation system that contributes to the status indication (e.g., 622*a*, 622*b*, 624*a*, 624*b*, 630*a*, 630*b*, 648*a*, 648*b*, 652*a*, and/652*b*) of the first selectable sub-category option (e.g., 616*a*-616*c*, 642*a*, and/or 642*b*) (e.g., the computer system receives first information and/or data about the third accessory and displays the status indication of the first selectable sub-category option based on the first information and/or data) and a fourth accessory user interface object (732) (e.g., 618*a*-618*e*) (e.g., a fourth user interface object and/or affordance associated with a fourth accessory of the home automation system that, when selected, is configured to control and/or adjust a state and/or setting of the fourth accessory of the home automation system) corresponding to a fourth accessory of the home automation system that contributes to the status indication (e.g., 622*a*, 622*b*, 624*a*, 624*b*, 630*a*, 630*b*, 648*a*, 648*b*, 652*a*, and/or 652*b*) of the first selectable sub-category option (e.g., 616*a*-616*c*, 642*a*, and/or 642*b***) (e.g., the computer system receives second information and/or data about the fourth accessory and displays the status indication of the first selectable sub-category option based on the second information and/or data).

Displaying the third accessory user interface object and the fourth accessory user interface object in response to detecting the fourth user input corresponding to selection of the first sub-category option allows a user of the computer system to quickly view and/or access controls for a sub-set of accessories that are corresponding to the first sub-category, thereby providing improved visual feedback reducing the number of inputs needed to perform an operation.

In some embodiments, while displaying, via the display generation component (e.g., 602), the third accessory user interface object (e.g., **618*a*-618*e*) and the fourth accessory user interface object (e.g., 618*a*-618*e*), the computer system (e.g., 100, 300, 500, and/or 600) detects (734), via the one or more input devices, fifth user input (e.g., a tap gesture) corresponding to selection of the third accessory user interface object (e.g., 618*a*-618*e*). In response to detecting the fifth user input corresponding to selection of the third accessory user interface object (e.g., 618*a*-618*e*), the computer system (e.g., 100, 300, 500, and/or 600) displays (736), via the display generation component (e.g., 602), a fourth user interface (e.g., 632 and/or 658) (e.g., a user interface that includes one or more control user interface objects that enable the computer system to adjust an operating state of the third accessory corresponding to the third accessory user interface object and/or one or more settings user interface objects that enable the computer system to modify and/or configure settings of the third accessory corresponding to the third accessory user interface object) for controlling (e.g., adjusting an operating state (e.g., on, off, open, closed, locked, unlocked, playing, and/or paused) of the third accessory and/or modifying and/or configuring settings (e.g., audio settings, playback settings, automation settings, authorization settings, and/or notification settings) of the third accessory) the third accessory of the home automation system that contributes to the status indicator (e.g., 622***a*, 622*b*, 624*a*, 624*b*, 630*a*, 630*b*, 648*a*, 648*b*, 652*a*, and/or 652*b*) of the first selectable sub-category option (e.g., 616*a*-616*c*, 642*a*, and/or 642*b*).

Displaying the fourth user interface for controlling the third accessory in response to detecting fifth user input corresponding to selection of the third accessory user interface object allows a user of the computer system to quickly access controls for the third accessory, thereby reducing the number of inputs needed to perform an operation.

In some embodiments, while displaying, via the display generation component (e.g., 602), the third accessory user interface object (e.g., 618*a*-618*e*) and the fourth accessory user interface object (e.g., 618*a*-618*e*), the computer system (e.g., 100, 300, 500, and/or 600) detects (738), via the one or more input devices, sixth user input (e.g., a gesture with a duration that satisfies a threshold duration) corresponding to selection of the third accessory user interface object (e.g., 618*a*-618*e*). In response to detecting the sixth user input corresponding to selection of the third accessory user interface object (e.g., 618*a*-618*e*), the computer system (e.g., 100, 300, 500, and/or 600) displays (740), via the display generation component (e.g., 602), a status user interface object (e.g., 634*a*) (e.g., a selectable user interface object, a slider, a toggle, and/or an affordance) that, when selected, causes the computer system (e.g., 100, 300, 500, and/or 600) to cease including the third accessory of the home automation system as a contributor to the status indicator (e.g., 622*a*, 622*b*, 624*a*, 624*b*, 630*a*, 630*b*, 648*a*, 648*b*, 652*a*, and/or 652*b*) of the first selectable sub-category option (e.g., 616*a*-616*c*, 642*a*, and/or 642*b*) (e.g., the computer system does not display the status indicator of the first selectable sub-category option based on information about the third accessory and/or the computer system ignores and/or does not receive information about the third accessory when determining what the status indicator includes).

Enabling a user to include information associated with the third accessory in the status indicator of the first selectable sub-category option allows a user of the computer system to customize information displayed about the sub-category of the first selectable sub-category option that is most relevant to the user, thereby providing improved visual feedback.

In some embodiments, in response to detecting the third user input (e.g., 650*d*) corresponding to selection of the first selectable sub-category option (742) (e.g., 616*a*-616*c*, 642*a*, and/or 642*b*) and in accordance with a determination that a fifth accessory of the home automation system satisfies a set of one or more contribution criteria (e.g., the fifth accessory includes a primary function and a secondary function, where the primary function of the first accessory is consistent with, corresponds to, and/or falls within the sub-category of the first selectable sub-category option), the computer system (e.g., 100, 300, 500, and/or 600) displays (744), via the display generation component (e.g., 602), a fifth accessory user interface object (e.g., 618*a*-618*e*) (e.g., a fifth user interface object and/or affordance associated with the fifth accessory of the home automation system that, when selected, is configured to control and/or adjust a state and/or setting of the fifth accessory of the home automation system) that corresponds to the fifth accessory of the home automation system (e.g., the computer system displays accessory user interface objects that are relevant to the sub-category of the first selectable sub-category option in response to detecting selection of the first selectable sub-category option). In response to detecting the third user input (e.g., 650*d*) corresponding to selection of the first selectable sub-category option (742) (e.g., 616*a*-616*c*, 642*a*, and/or 642*b*) and in accordance with a determination that the fifth accessory of the home automation system does not satisfy the set of one or more contribution criteria (e.g., the fifth accessory includes a primary function and a secondary function, where the primary function of the fifth accessory is not consistent, does not correspond to, and/or does not fall within the sub-category of the first selectable sub-category option (e.g., even when the secondary function is consistent with, corresponds to, and/or falls within the sub-category of the first selectable sub-category option)), the computer system (e.g., 100, 300, 500, and/or 600) forgoes (746) display of the fifth accessory user interface object (e.g., 618*a*-618*e*) that corresponds to the fifth accessory of the home automation system (e.g., the computer system does not display accessory user interface objects that are not relevant to the sub-category of the first selectable sub-category option in response to detecting selection of the first selectable sub-category option). In some embodiments, the sub-category of the first selectable sub-category option (e.g., 616*a*-616*c*, 642*a*, and/or 642*b*) includes a temperature sub-category and the fifth accessory is a thermostat, which has a primary function of controlling temperature. Accordingly, the fifth user interface object (e.g., 618*a*-618*e*) is displayed in response to detecting the third user input (e.g., 650*d*) corresponding to selection of the first selectable category option. In some embodiments, the sub-category of the first selectable sub-category option includes a temperature sub-category and the fifth accessory is a smart speaker, which has a secondary function of measuring temperature. Accordingly, the fifth user interface object is not displayed in response to detecting the third user input corresponding to selection of the first selectable category option because the primary function of a smart speaker is not to control temperature.

Forgoing displaying the fifth accessory user interface object when the fifth accessory does not satisfy the set of one or more contribution criteria allows a user of the computer system to view the most relevant accessories of the sub-category of the first selectable sub-category option, thereby providing improved visual feedback.

In some embodiments, displaying the user interface (e.g., 604, 614, 638, and/or 660) including the plurality of selectable category options (e.g., 606*a*-606*d*) that correspond to respective contexts of the home automation system includes, in accordance with a determination that a set of one or more status criteria is met (e.g., one or more accessory devices associated with the first context of the first selectable category option are in an active state (e.g., on, open, unlocked, actively measuring and/or collecting data, and/or outputting content) and/or detected (e.g., within a predetermined amount of time from a current time) an event (e.g., a motion detection event and/or a security alarm)), the computer system (e.g., 100, 300, 500, and/or 600) displaying, via the display generation component, the first selectable category option (e.g., 606*a*-606*d*) of the plurality of selectable category options (e.g., 606*a*-606*d*) with a status indicator (e.g.,

607a-607d) (e.g., information and/or feedback about a current state and/or status of one or more accessories associated with the category of the first selectable category option, such as one or more temperatures, an indication of air quality, an indication of humidity, an indication of a number of accessories that are in a predetermined state (e.g., an active state, an on state, and/or an unlocked state), and/or an indication of an event detected by an accessory). In some embodiments, displaying the user interface (e.g., 604, 614, 638, and/or 660) including the plurality of selectable category options (e.g., 606a-606d) that correspond to respective contexts of the home automation system includes, in accordance with a determination that the set of one or more status criteria is not met (e.g., no accessory device that is associated with the first context of the first selectable category option is in an active state (e.g., on, open, unlocked, actively measuring and/or collecting data, and/or outputting content) and/or detected (e.g., within a predetermined amount of time from a current time) an event (e.g., a motion detection event and/or a security alarm)), the computer system (e.g., 100, 300, 500, and/or 600) displaying the first selectable category option (e.g., 606a-606d) of the plurality of selectable category options (e.g., 606a-606d) without the status indicator (e.g., 607a-607d) (e.g., displaying the first selectable category option without information and/or feedback about a current state and/or status of one or more accessories associated with the category of the first selectable category option).

Displaying the status indicator when the one or more status criteria is met and forgoing displaying the status indicator when the one or more status criteria is not met provides a user of the computer system with information that may warrant action by the user, thereby providing improved visual feedback.

In some embodiments, the set of one or more status criteria includes a criterion that is met when a sixth accessory of the home automation system that is associated with the first context of the first selectable category option (e.g., 606a-606d) is in an active state (e.g., an on state, an open state, an unlocked state, a state that includes actively measuring and/or collecting data, and/or a state that includes outputting content). Displaying the status indicator when the sixth accessory is in an active state provides a user of the computer system with information that may warrant action by the user, thereby providing improved visual feedback.

In some embodiments, the computer system (e.g., 100, 300, 500, and/or 600) displays (748), via the display generation component (e.g., 602), the first selectable category option (e.g., 606a-606d) with a first status indicator (e.g., 607a-607d) (e.g., first information and/or feedback about a current state and/or status of the one or more accessories associated with the category of the first selectable category option, such as one or more temperatures, an indication of air quality, an indication of humidity, an indication of a number of accessories that are in a predetermined state (e.g., an active state, an on state, and/or an unlocked state), and/or an indication of an event detected by an accessory) corresponding to a first status of the category associated with the first selectable category option (e.g., 606a-606d), where the first status includes a first priority (e.g., a first level of importance and/or urgency). In response to receiving an indication about a change in status of the category associated with the first selectable category option (750) (e.g., 606a-606d) (e.g., a status of the category associated with the first selectable category option changes from the first status to a second status or from the first status to a third status) and in accordance with a determination that the change in status is indicative of a second status of the category associated with the first selectable category option (e.g., 606a-606d) that includes a second priority (e.g., a second level of importance and/or urgency that is the same as and/or greater than the first priority), greater than or equal to the first priority, the computer system (e.g., 100, 300, 500, and/or 600) displays (752), via the display generation component (e.g., 602), the first selectable category option (e.g., 606a-606d) with a second status indicator (e.g., 607a-607d) (e.g., second information and/or feedback about a current state and/or status of the one or more accessories associated with the category of the first selectable category option, such as one or more temperatures, an indication of air quality, an indication of humidity, an indication of a number of accessories that are in a predetermined state (e.g., an active state, an on state, and/or an unlocked state), and/or an indication of an event detected by an accessory) corresponding to the second status (e.g., the computer system modifies and/or the first selectable category option to reflect the second status because the second status is determined to be at least as relevant and/or useful to a user of the computer system as the first status) (in some embodiments, the computer system replaces display of the first status indicator with the second status indicator). In response to receiving an indication about a change in status of the category associated with the first selectable category option (750) (e.g., 606a-606d) (e.g., a status of the category associated with the first selectable category option changes from the first status to a second status or from the first status to a third status) and in accordance with a determination that the change in status is indicative of a third status of the category associated with the first selectable category option (e.g., 606a-606d) that includes a third priority (e.g., a third level of importance and/or urgency that is the less than the first priority), lower than the first priority, the computer system (e.g., 100, 300, 500, and/or 600) maintains (754) display of the first selectable category option (e.g., 606a-606d) with the first status indicator (e.g., 607a-607d) corresponding to the first status (e.g., the computer system does not modify and/or update the first selectable category option to reflect the third status because the first status is determined to be more relevant and/or useful to a user of the computer system as compared to the third status).

Displaying the second status indicator when a priority of the second status is greater than the first status and maintaining display of the first status indicator when a priority of the third status is less than the first status provides a user of the computer system with the most timely and/or relevant information that may warrant action by the user, thereby providing improved visual feedback.

In some embodiments, the user input (e.g., 650a, 650f, and/or 650i) is of a first type (e.g., a tap gesture). In response to detecting, via the one or more input devices, seventh user input (e.g., 650f) of a second type (e.g., a gesture with a duration that satisfies a threshold duration), different from the first type (e.g., the second user input of the second type is detected for a longer period of time than the user input of the first type and/or an end of the user input of the first type is detected before a predetermined amount of time has elapsed since first detecting the user input of the first type), corresponding to selection of the first selectable category option (e.g., 606a-606d) of the plurality of selectable category options (e.g., 606a-606d), the computer system (e.g., 100, 300, 500, and/or 600) displays (756), via the display generation component (e.g., 602), a first selectable option (e.g., 640a) (e.g., a selectable user interface object and/or an affordance) that, when selected, causes one or more accessories of the home automation system (e.g., all accessories of the home automation system that are associated with the first context of the first selectable category option and/or all accessories of the home automation system that are associated with the first context of the first selectable category option and that are in a predefined state) that are associated with the first context of the first selectable category option (e.g., 606*a*-606*d*) to perform a predetermined action (e.g., causing each of the one or more accessories to transition between a first operating state (e.g., on, open, unlocked, and/or outputting content) and a second operating state (e.g., off, closed, locked, and/or not outputting content)).

Displaying the selectable option in response to detecting the seventh user input of the second type allows a user of the computer system to adjust and/or control multiple accessory devices together without having to provide multiple inputs to control each accessory device individually, thereby reducing the number of inputs needed to perform an operation.

In some embodiments, in response to detecting the seventh user input (e.g., 650*a*, 650*f*, and/or 650*i*) of the second type, different from the first type, corresponding to selection of the first selectable category option (e.g., 606*a*-606*d*) of the plurality of selectable category options (e.g., 606*a*-606*d*), the computer system (e.g., 100, 300, 500, and/or 600) displays (758), via the display generation component (e.g., 602), a second selectable option (e.g., 640*b*) (e.g., a selectable user interface object and/or an affordance) that, when selected, causes the computer system (e.g., 100, 300, 500, and/or 600) to display a third user interface (e.g., 614, 628, 638, and/or 660) (e.g., a user interface that includes one or more accessory user interface objects, but does not include the plurality of selectable category options and/or the first selectable sub-category option) that includes one or more accessory user interface objects (e.g., 618*a*-618*e*, 644*a*-644*d*, and/or 660*a*-660*f*) corresponding to the one or more accessories of the home automation system that are associated with the first context of the first selectable category option (e.g., 606*a*-606*d*) (e.g., the third user interface includes accessory user interface objects corresponding to all of the accessories of the home automation system that are associated with the first context of the first selectable category option). Displaying the second selectable option in response to detecting the seventh user input of the second type allows a user of the computer system to quickly view the accessories that are included within the category of the first selectable category option, thereby improving visual feedback and reducing the number of inputs needed to perform an operation.

In some embodiments, the first selectable category option (e.g., 606*a*-606*d*) of the plurality of selectable category options (e.g., 606*a*-606*d*) includes a first appearance (e.g., a first color, a first brightness, a first contrast, a first hue, and/or a first icon, image, and/or symbol) associated with the first context of the home automation system (e.g., the first appearance visually indicates a function, operation, and/or action of the home automation system that is performed by, monitored, and/or controlled by one or more accessory devices included in the category associated with the first selectable category option) and a second selectable category option (e.g., 606*a*-606*d*) of the plurality of selectable category options (e.g., 606*a*-606*d*) includes a second appearance (e.g., a second color, a second brightness, a second contrast, a second hue, and/or a second icon, image, and/or symbol), different from the first appearance (e.g., the second appearance is visually distinguishable from the first appearance), associated with a second context of the home automation system (e.g., the second appearance visually indicates a function, operation, and/or action of the home automation system that is performed by, monitored, and/or controlled by one or more accessory devices included in the category associated with the second selectable category option). Displaying the first selectable category option with the first appearance and the second selectable category option with the second appearance, different from the first appearance, allows a user of the computer system to easily determine categories associated with the selectable category options and/or distinguish the selectable category options from one another, thereby improving visual feedback.

In some embodiments, the user interface (e.g., 604) includes (e.g., displays concurrently with the plurality of selectable category options) a first notification (e.g., 666, 668, and/or 670) (e.g., a banner, a user interface object, and/or affordance that includes information, such as text, images, symbols, icons, and/or visual elements, about an event associated with the home automation system that may warrant user action, such as a security and/or safety event detected by an accessory of the home automation system, an event affecting communication between the computer system and one or more accessories of the computer system (e.g., an accessory is offline, an Internet connection is interrupted and/or unavailable, and/or power is not being supplied to one or more accessories), and/or an event associated with setting up and/or configuring one or more accessories) associated with the home automation system. In some embodiments, the computer system (e.g., 100, 300, 500, and/or 600) maintains display of the notification (e.g., 666, 668, and/or 670) until the event associated with the notification has been resolved. In some embodiments, the computer system maintains display of the notification until the computer system detects user input corresponding to the notification. In some embodiments, the computer system maintains display of the notification until the computer system detects a second event that has a higher priority and/or urgency when compared to a first event associated with the notification. In some embodiments, the notification is associated with setting up and/or configuring one or more accessories and/or the home automation system when the computer system does not detect and/or receive an indication of an event that is associated with and/or detected by an accessory of the home automation system. Displaying the notification associated with the home automation system provides a user of the computer system with information about an event that may warrant action by the user, thereby providing improved visual feedback.

In some embodiments, the first notification (e.g., 666, 668, and/or 670) corresponds to a first event (e.g., a security and/or safety event detected by an accessory of the home automation system, an event affecting communication between the computer system and one or more accessories of the computer system (e.g., an accessory is offline, an Internet connection is interrupted and/or unavailable, and/or power is not being supplied to one or more accessories), and/or an event associated with setting up and/or configuring one or more accessories) of a first type (e.g., an event having a first priority, a first importance level, and/or a first urgency). In response to receiving an indication about a second event (e.g., a security and/or safety event detected by an accessory of the home automation system, an event affecting communication between the computer system and one or more accessories of the computer system (e.g., an accessory is offline, an Internet connection is interrupted and/or unavailable, and/or power is not being supplied to one or more accessories), and/or an event associated with setting up and/or configuring one or more accessories) of a second type (e.g., an event having a second priority, a second importance level, and/or a second urgency), different from the first type (760) and in accordance with a determination that the second event of the second type is associated with a lower priority (e.g., lower importance level and/or lower urgency) than the first event of the first type, the computer system (e.g., 100, 300, 500, and/or 600) forgoes (762) display (e.g., not displaying) of a second notification (e.g., 666, 668, and/or 670) (e.g., a banner, a user interface object, and/or affordance that includes information, such as text, images, symbols, icons, and/or visual elements, about an event associated with the home automation system that may warrant user action) corresponding to the second event of the second type.

Forgoing displaying the second notification corresponding to the second event of the second type provides a user of the computer system with information about the most relevant and/or urgent event that may warrant action by the user, thereby providing improved visual feedback.

In some embodiments, the first notification (e.g., 666, 668, and/or 670) corresponds to a first event (e.g., a security and/or safety event detected by an accessory of the home automation system, an event affecting communication between the computer system and one or more accessories of the computer system (e.g., an accessory is offline, an Internet connection is interrupted and/or unavailable, and/or power is not being supplied to one or more accessories), and/or an event associated with setting up and/or configuring one or more accessories) of a first type (e.g., an event having a first priority, a first importance level, and/or a first urgency). In response to receiving an indication about a third event (e.g., a security and/or safety event detected by an accessory of the home automation system, an event affecting communication between the computer system and one or more accessories of the computer system (e.g., an accessory is offline, an Internet connection is interrupted and/or unavailable, and/or power is not being supplied to one or more accessories), and/or an event associated with setting up and/or configuring one or more accessories) of the first type (e.g., the third event includes same priority, importance level, and/or urgency as the first event), the computer system (e.g., 100, 300, 500, and/or 600) displays (764), via the display generation component (e.g., 602), and concurrently with the first notification (e.g., 666, 668, and/or 670), a third notification (e.g., 666, 668, and/or 670) (e.g., a banner, a user interface object, and/or affordance that includes information, such as text, images, symbols, icons, and/or visual elements, about an event associated with the home automation system that may warrant user action) corresponding to the third event of the first type.

Concurrently displaying the first notification and the third notification provides a user of the computer system with information about the multiple events that may warrant action by the user, thereby providing improved visual feedback.

In some embodiments, in response to detecting the user input (e.g., 650*a*, 650*f*, and/or 650*i*) corresponding to selection of the first selectable category option (e.g., 606*a*-606*d*) of the plurality of selectable category options (e.g., 606*a*-606*d*), the computer system (e.g., 100, 300, 500, and/or 600) displays (766), via the display generation component (e.g., 602), a first camera view user interface object (e.g., 644*a*) (e.g., a user interface object that includes an image and/or video (e.g., a live video feed) captured by a first camera of the home automation system) associated with a first camera that is associated with the first context of the first selectable category option (e.g., 606*a*-606*d*). Displaying the first camera view user interface object in response to detecting user input corresponding to selection of the first selectable category option allows a user of the computer system to obtain additional information about a location associated with the home automation system, thereby providing improved visual feedback.

Note that details of the processes described above with respect to method 700 (e.g., FIGS. 7A-7G) are also applicable in an analogous manner to the methods described below. For example, methods 900, 1100, 1300, and/or 1500 optionally include one or more of the characteristics of the various methods described above with reference to method 700. For example, computer systems that perform methods 900, 1100, 1300, and/or 1500 can display the first accessory user interface object, the second accessory user interface object, and/or the first selectable sub-category option in response to detecting selection of the first selectable category option. For brevity, these details are not repeated below.

FIGS. 8A-8P illustrate exemplary user interfaces for managing accessory groups, in accordance with some embodiments. The user interfaces in these figures are used to illustrate the processes described below, including the processes in FIGS. 9A-9C.

In some embodiments, any of the inputs described herein (e.g., input 850*a*, 850*b*, 850*c*, 850*d*, 850*e*, 850*f*, 850*g*, 850*h*, 850*i*, 850*j*, 850*k*, 850*l*, 850*m*, and/or 850*n*) is or includes a touch input (e.g., a tap gesture and/or a swipe gesture). In some embodiments, any of the inputs described herein (e.g., input 850*a*, 850*b*, 850*c*, 850*d*, 850*e*, 850*f*, 850*g*, 850*h*, 850*i*, 850*j*, 850*k*, 850*l*, 850*m*, and/or 850*n*) is or includes a voice input (e.g., a voice command to select a user interface element or to activate a feature or perform a function, such as a feature or function associated with a user interface element). In some embodiments, any of the inputs described herein (e.g., input 850*a*, 850*b*, 850*c*, 850*d*, 850*e*, 850*f*, 850*g*, 850*h*, 850*i*, 850*j*, 850*k*, 850*l*, 850*m*, and/or 850*n*) is or includes an air gesture (e.g., an air gesture to select a user interface element or to activate a feature or perform a function, such as a feature or function associated with a user interface element). In some embodiments, any of the inputs described herein (e.g., input 850*a*, 850*b*, 850*c*, 850*d*, 850*e*, 850*f*, 850*g*, 850*h*, 850*i*, 850*j*, 850*k*, 850*l*, 850*m*, and/or 850*n*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIG. 8A illustrates electronic device 600 displaying, via display 602, home user interface 604 associated with a home automation system. At FIG. 8A, home user interface 604 includes home indicator 604*a* (e.g., "123 MAIN ST.") that provides an indication of a location (e.g., a physical address) associated with the home automation system. In addition, home user interface 604 includes category region 606, camera region 608, scene region 610, and first room region 612.

Scenes region 610 includes scene user interface objects 610*a* and 610*b*, which correspond to predetermined automations for adjusting a state of one or more accessory devices of the home automation system. In some embodiments, a scene enables electronic device 600 to control and/or adjust a state of one or more accessory devices of the home automation system via user input, based on a location of electronic device 600, and/or based on a condition being satisfied (e.g., a current time of day is at a predetermined time associated with activating and/or deactivating a scene). In some embodiments, a scene is user-defined in that a user selects which accessory devices of the home automation system to include in a scene and how the selected accessory devices are controlled when the scene is activated. In some embodiments, a scene is predetermined and/or suggested by electronic device 600 based on user habits. In some embodiments, electronic device 600 controls and/or adjusts a state of multiple accessory devices of the home automation system in response to a single user input selecting a scene user interface object (e.g., scene user interface objects 610*a* and/or 610*b*). Accordingly, scenes allow a user to easily control accessory devices and/or groups of accessory devices of the home automation system and reduces a number of user inputs needed to control and/or adjust the accessory devices and/or groups of accessory devices.

At FIG. 8A, first scene user interface object 610*a* is displayed at first position 800*a* of scenes region 610 and second scene user interface object 610*b* is displayed at second position 800*b* of scenes region 610. As set forth below, in some embodiments, electronic device 600 displays scene user interface objects 610*a* and 610*b* at first position 800*a* and second position 800*b*, respectively, based on a set of criteria. For instance, in some embodiments, electronic device 600 arranges and/or displays scene user interface objects 610*a* and 610*b* within scene region 610 based on context-based conditions, such as a time of day, a location of electronic device 600, and/or habits of the user, that indicate which scene user interface objects are more likely to be used and/or interacted with by a user.

In some embodiments, electronic device 600 arranges and/or displays scene user interface objects 610*a* and 610*b* within scene region 610 based on a number of scene user interface objects. In some embodiments, because scenes region 610 includes two scene user interface objects at FIG. 8A (e.g., first scene user interface object 610*a* and second scene user interface object 610*b*), electronic device 600 does not arrange and/or display scene user interface objects 610*a* and 610*b* based on the context-based conditions. In some embodiments, when scenes region 610 includes a predetermined number of scene user interface objects (e.g., two) or less than the predetermined number of scene user interface objects, electronic device 600 does not arrange and/or display scene user interface objects based on the context-based conditions.

At FIG. 8A, electronic device 600 displays first scene user interface object 610*a* with scene indicator 801*a* and second scene user interface object 610*b* with scene indicator 801*b*. Scene indicator 801*a* and scene indicator 801*b* provide a visual indication about a respective scene corresponding to first scene user interface object 610*a* and second scene user interface object 610*b*, respectively. For instance, at FIG. 8A, scene indicator 801*a* includes an icon of a person leaving a home indicating that the scene associated with first scene user interface object 610*a* is relevant to a user when the user leaves and/or is preparing to leave a location associated with the home automation system. Scene indicator 801*b* includes an icon of a sunrise indicating that the scene associated with second scene user interface object 610*b* is relevant to a user during the morning hours of a day. As set forth below with reference to FIG. 8M, electronic device 600 can change and/or modify scene indicator 801*a* and/or scene indicator 801*b* (e.g., change and/or modify an appearance of scene indicator 801*a* and/or scene indicator 801*b*) in response to detecting one or more user inputs.

At FIG. 8A, electronic device 600 detects user input 850*a* (e.g., a tap gesture or other selection/navigation input) corresponding to add user interface object 802 of home user interface 604. In response to detecting user input 850*a*, electronic device 600 displays menu 804, as shown at FIG. 8A. At FIG. 8A, electronic device 600 detects user input 850*b* (e.g., a tap gesture or other selection/navigation input) corresponding to add scene user interface object 804*a* of menu 804. In response to detecting user input 850*b*, electronic device 600 displays add scene user interface 806, as shown at FIG. 8B.

Figure 8B:
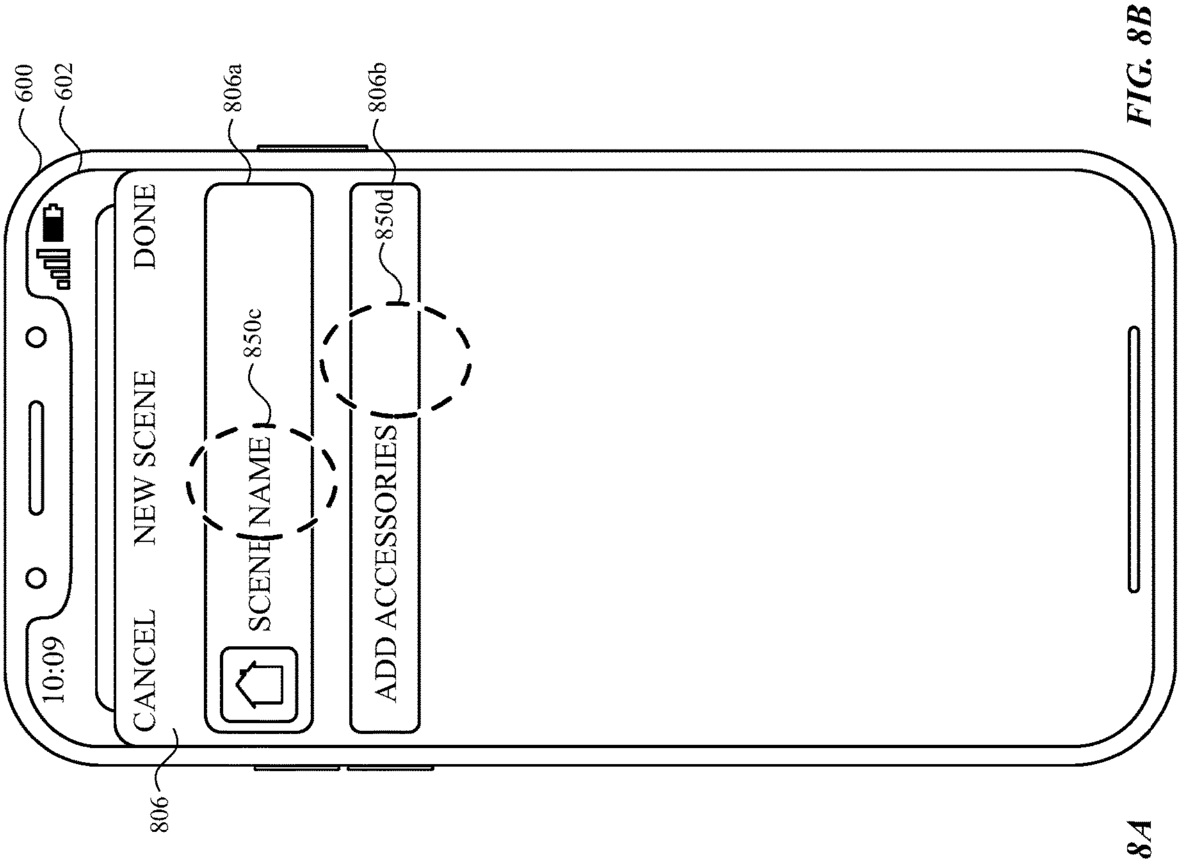
FIGS. 8A-8P illustrate exemplary user interfaces for managing accessory groups, in accordance with some embodiments.

At FIG. 8B, add scene user interface 806 enables electronic device 600 to create a new scene and/or display a new scene user interface object associated with the new scene on scenes region 610. Add scene user interface 806 includes scene name user interface object 806*a* and add accessory user interface object 806*b*. At FIG. 8B, electronic device 600 detects user input 850*c* (e.g., a tap gesture or other selection/navigation input) corresponding to selection of scene name user interface object 806*a*. In some embodiments, in response to detecting user input 850*c*, electronic device 600 displays a keyboard (e.g., a virtual keyboard) that enables a user of electronic device 600 to provide and/or input a name of a new scene. In some embodiments, electronic device 600 detects one or more user inputs associated with naming the new scene “MORNING” (e.g., as shown at FIG. 8D). At FIG. 8B, electronic device 600 detects user input 850*d* (e.g., a tap gesture or other selection/navigation input) corresponding to add accessory user interface object 806*b*. In response to detecting user input 850*d*, electronic device 600 displays accessory user interface 808, as shown at FIG. 8C.

Figure 8C:
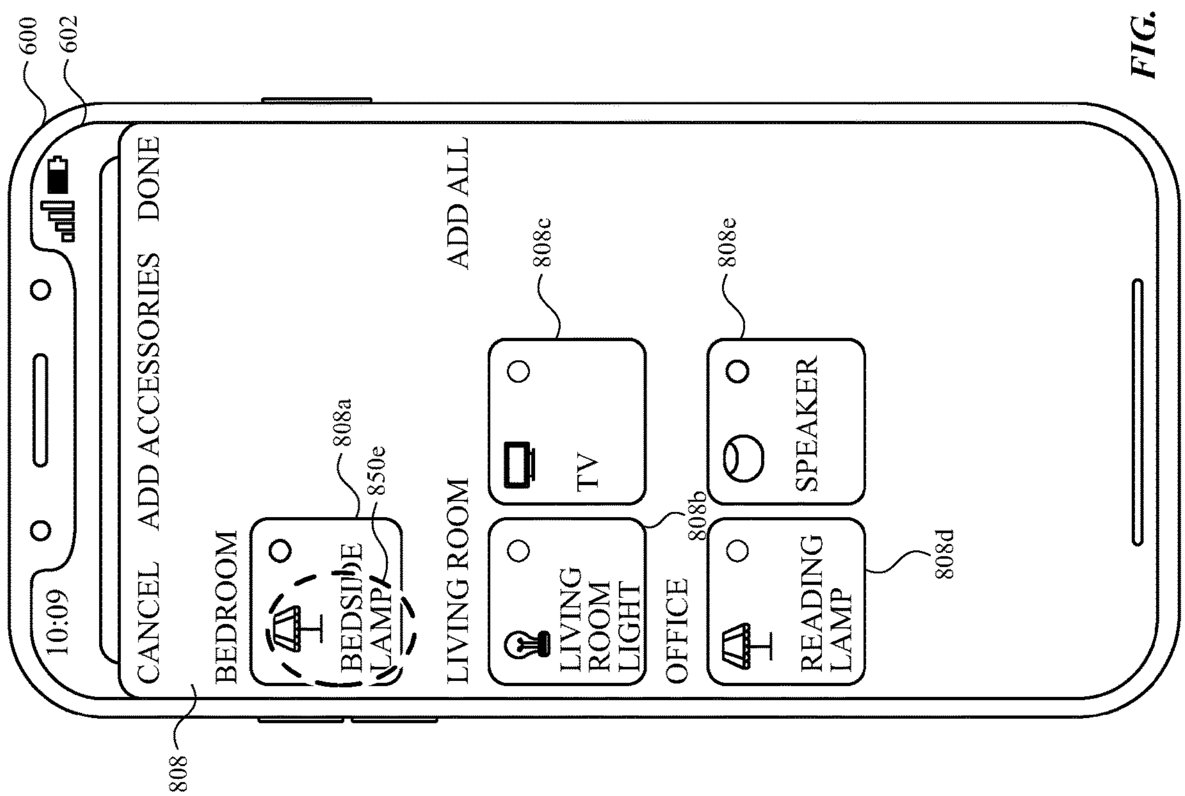
Figure 8D:
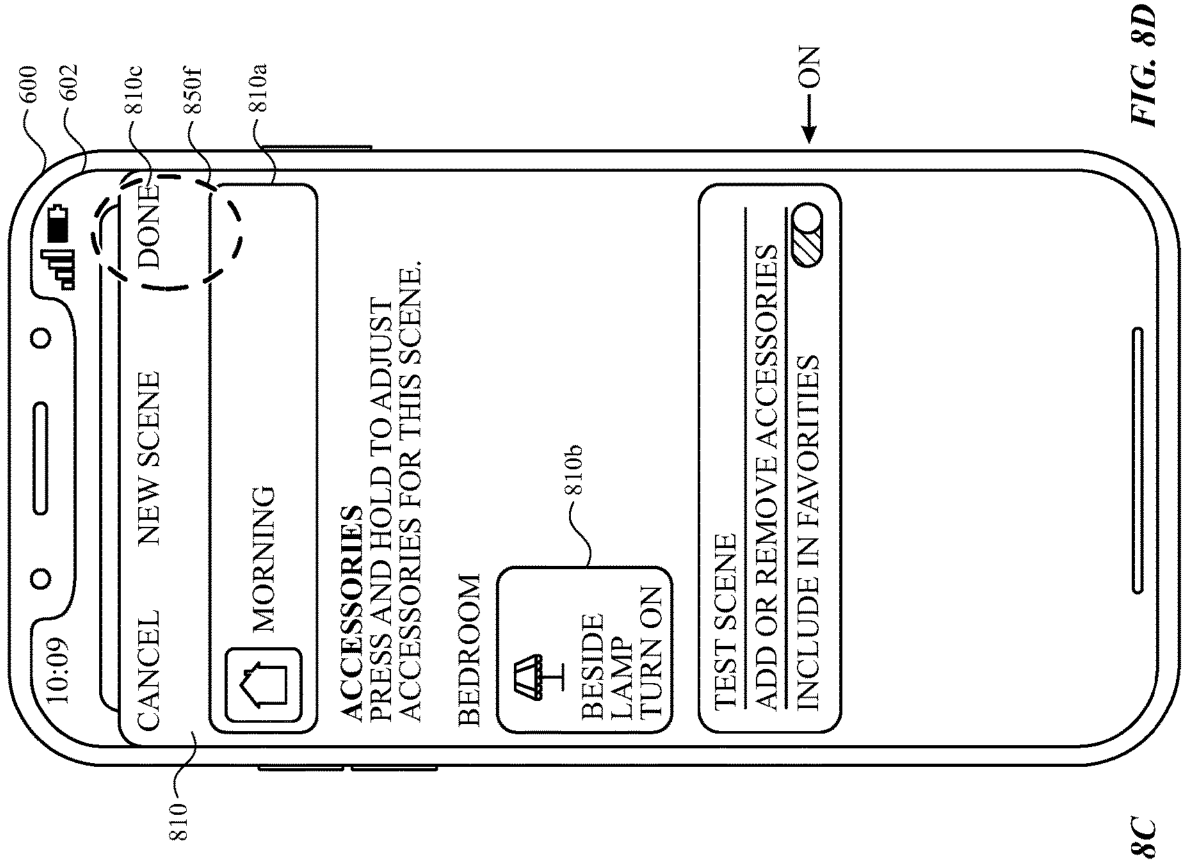
Figure 8F:
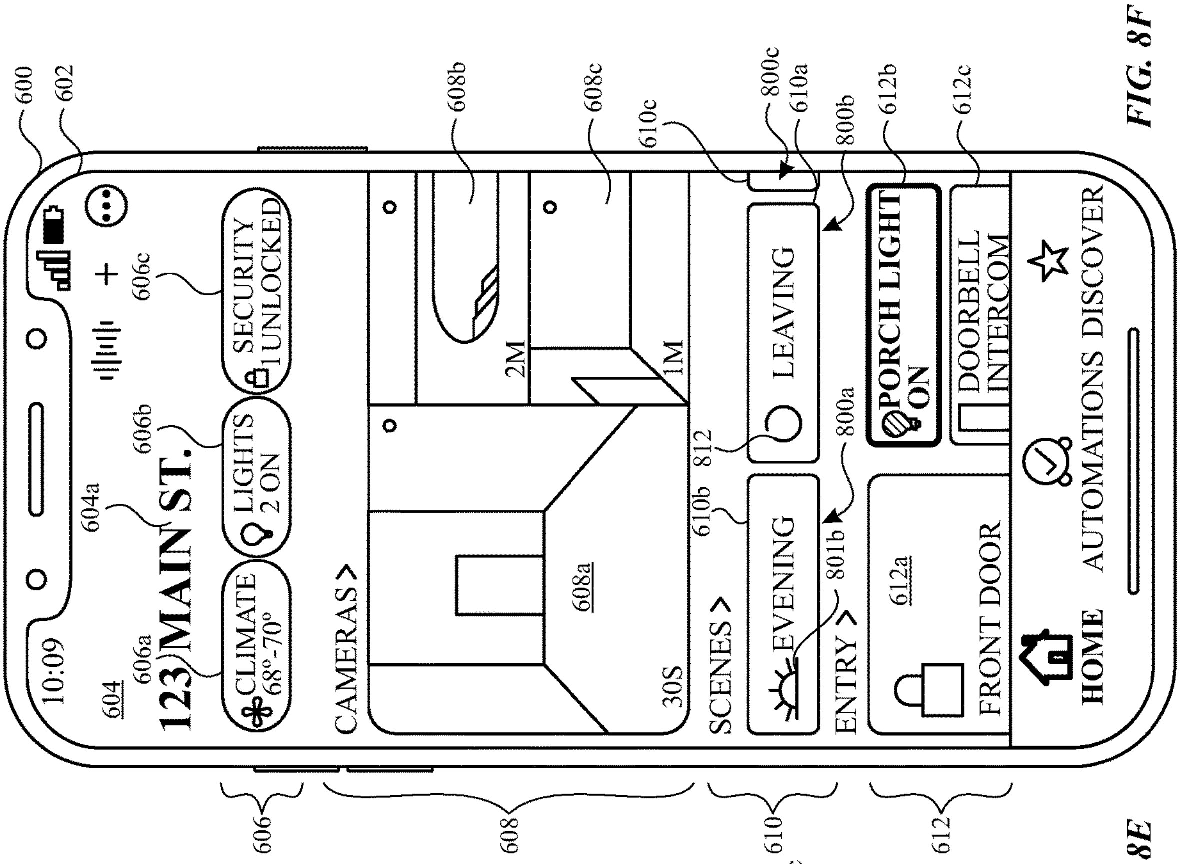

At FIG. 8C, accessory user interface 808 includes accessory user interface objects 808*a*-808*e* corresponding to respective accessory devices of the home automation system. At FIG. 8C, electronic device 600 arranges and/or sorts accessory user interface objects 808*a*-808*e* by room of the location associated with home automation system. In some embodiments, electronic device 600 arranges and/or sorts accessory user interface objects 808*a*-808*e* based on different criteria (e.g., alphabetic order). In some embodiments, accessory user interface 808 includes all accessory devices of the home automation system (e.g., all accessory devices that have been associated with the home automation system, such as via user input). In some embodiments, accessory user interface 808 includes more than five accessory user interface objects and is scrollable. For example, in some embodiments, electronic device 600 displays additional accessory user interface objects on accessory user interface 808 in response to detecting a swipe and/or scroll gesture. At FIG. 8C, electronic device 600 detects user input 850*e* (e.g., a tap gesture or other selection/navigation input) corresponding to first accessory user interface object 808*a*. In response to detecting user input 850*e*, electronic device 600 displays scene user interface 810, as shown at FIG. 8D.

At FIG. 8D, scene user interface 810 includes scene name user interface object 810*a* that includes an indication of a name of the scene received via one or more user inputs at FIG. 8B (e.g., “MORNING”). Scene user interface 810 includes first accessory user interface object 810*b*, which is based on selection of first accessory user interface object 808*a* (e.g., in response to user input 850*e*). At FIG. 8D, first accessory user interface object 810*b* is associated with a bedside lamp of the home automation system. First accessory user interface object 810*b* indicates that the bedside lamp is configured to be turned on when the scene is activated (e.g., user input selecting a scene user interface object). In some embodiments, in response to user input (e.g., a gesture with a duration that satisfies a threshold duration or other selection/navigation input) selecting first accessory user interface object 810*b*, electronic device 600 displays one or more selectable options corresponding to various controls and/or adjustments of the bedside lamp that electronic device 600 can perform when the scene is activated.

At FIG. 8D, electronic device 600 detects user input 850*f* (e.g., a tap gesture or other selection/navigation input) corresponding to selection of done user interface object 810*c* of scene user interface 810. In response to detecting user input 850*f*, electronic device 600 creates a new scene (e.g., a morning scene) and displays home user interface 604, as shown at FIG. 8E.

Figure 8E:
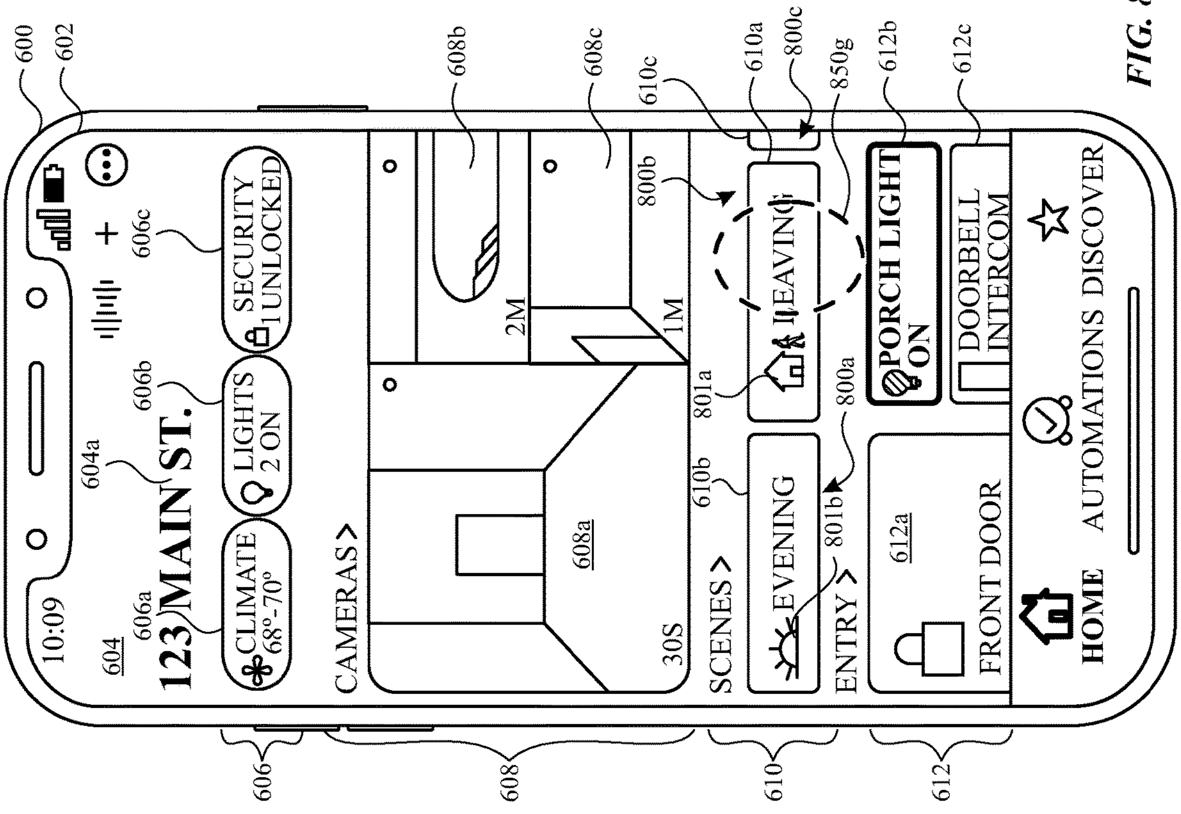

At FIG. 8E, scenes region 610 of home user interface 604 includes first scene user interface object 610*a*, second scene user interface object 610*b*, and third scene user interface object 610*c*. Third scene user interface object 610*c* corresponds to the new scene created by electronic device 600 in response to detecting user input 850*f*. At FIG. 8E, first scene user interface object 610*a* is displayed at second position 800*b*, second scene user interface object 610*b* is displayed at first position 800*a*, and third scene user interface object 610*c* is displayed at third position 800*c* on home user interface 604. As set forth above, in some embodiments, electronic device 600 displays scene user interface objects 610*a*-610*c* in different arrangements and/or at different positions on home user interface 604 based on context-based conditions. In some embodiments, electronic device 600 determines the respective positions of scene user interface objects 610*a*-610*c* based on the context-based conditions when the home automation system includes more than the predetermined number of scenes (e.g., more than two scenes).

At FIG. 8E, electronic device 600 has changed (e.g., switched) the positions of first scene user interface object 610*a* and second scene user interface object 610*b*, as compared to the respective positions shown at FIG. 8A. In some embodiments, first position 800*a* of home user interface 604 is a primary position that facilitates a user's ability to interact with a scene user interface object that is displayed at first position 800*a*. In some embodiments, a scene user interface object displayed at first position 800*a* corresponds to a suggested scene and/or a scene that electronic device 600 determines (e.g., predicts) to be most relevant to a user (e.g., as compared to the other scenes of the home automation system). For instance, in some embodiments, electronic device 600 determines a priority of scenes associated with the displayed scene user interface objects (e.g., scene user interface objects 610*a*-610*c*) based on the context-based conditions. In some embodiments, electronic device 600 determines how likely a user is to select, activate, and/or interact with a scene based on a current time of day, a location of electronic device 600, and/or habits of the user (e.g., historical user inputs that occur within the same time range over a period of usage of electronic device 600). In some embodiments, electronic device 600 determines the priority of the scenes based on the context-based conditions and displays a scene user interface object associated with a scene having the highest priority at position 800*a*, a scene user interface object that is associated with a scene having the second highest priority at position 800*b*, and a scene user interface object that is associated with a scene having the third highest priority at position 800*c*.

At FIG. 8E, electronic device 600 displays second scene user interface object 610*b* at first position 800*a* based on a determination that the scene associated with second scene user interface object 610*b* has the highest priority (e.g., is most likely to be selected, activated, and/or interacted with as compared to the other scenes). For instance, second scene user interface object 610*b* corresponds to an evening scene, which corresponds to an adjustment a state of one or more accessory devices of the home automation system that is convenient for the user during the evening hours of a day. At FIG. 8E, electronic device 600 indicates that the current time of day is 10:09 pm. In some embodiments, electronic device 600 determines that the evening scene associated with second scene user interface object 610*b* is most likely to be relevant to the user because the current time of day is during the night/evening.

At FIG. 8E, electronic device 600 displays first scene user interface object 610*a* at second position 800*b* based on a determination that the scene associated with first scene user interface object 610*a* is the next most relevant scene to a user after the evening scene. First scene user interface object 610*a* is associated with a leaving scene, which corresponds to an adjustment of a state of one or more accessory devices of the home automation system that is convenient for the user when the user is leaving a location associated with the home automation system. In some embodiments, electronic device 600 determines that the leaving scene is the next most relevant scene and/or the scene having the second highest priority because the user typically activates the leaving scene at later times of the day (e.g., historical usage of electronic device 600 indicates that a user activates the leaving scene during the night/evening).

At FIG. 8E, electronic device 600 displays third scene user interface object 610*c* at third position 800*c* based on a determination that the scene associated with third scene user interface object 610*c* is the third most relevant scene to the user. As set forth above, third scene user interface object 610*c* is associated with a morning scene, which corresponds to an adjustment of a state of one or more accessory devices of the home automation system that is convenient for the user during the morning hours of a day. In some embodiments, electronic device 600 determines that the morning scene is the third most relevant scene and/or the scene having the third highest priority based on the current time of day not being within typical morning hours. Accordingly, electronic device 600 can arrange scene user interface objects 610*a*-610*c* to display scene user interface objects 610*a*-610*c* at respective positions that enables a user to quickly select a scene that is determined to be most relevant to the user.

At FIG. 8E, electronic device 600 detects user input 850*g* (e.g., a tap gesture or other selection/navigation input) corresponding to selection of first scene user interface object 610*a*. In response to detecting user input 850*g*, electronic device 600 initiates a process for activating the scene associated with first scene user interface object 610*a* and displays first scene user interface object 610*a* with a different appearance, as shown at FIG. 8F.

At FIG. 8F, electronic device 600 displays first scene user interface object 610*a* having activation indicator 812. Activation indicator 812 includes a ring shape (e.g., a partial ring shape) to indicate and/or confirm that electronic device 600 has initiated the activation of the scene associated with first scene user interface object 610*a*. In some embodiments, electronic device 600 animates activation indicator 812 so that activation indicator 812 appears to spin and/or rotate over time. At FIG. 8F, electronic device 600 displays activation indicator 812 and does not display scene indicator 801*a* (e.g., electronic device 600 replaces (e.g., temporarily replaces) display of scene indicator 801*a* with activation indicator 812).

In some embodiments, electronic device 600 displays activation indicator 812 before receiving confirmation that one or more accessory devices associated with the scene have transitioned between states. For instance, in some embodiments, the scene associated with first scene user interface object 610*a* includes adjusting an operating state of one or more accessory devices of the home automation system, such as from an on state to an off state (or vice versa), from an open state to a closed state (or vice versa), and/or from a locked state to an unlocked state (or vice versa). In some embodiments, electronic device 600 communicates with the one or more accessory devices to cause the one or more accessory devices to transition between operating states and/or receives information from the one or more accessory devices confirming that the transition between operating states has occurred. Accordingly, in some embodiments, electronic device 600 displays activation indicator 812 to confirm that electronic device 600 is causing the one or more accessory devices to transition between operating states even though the one or more accessory devices may not have completed the transition.

Figure 8G:
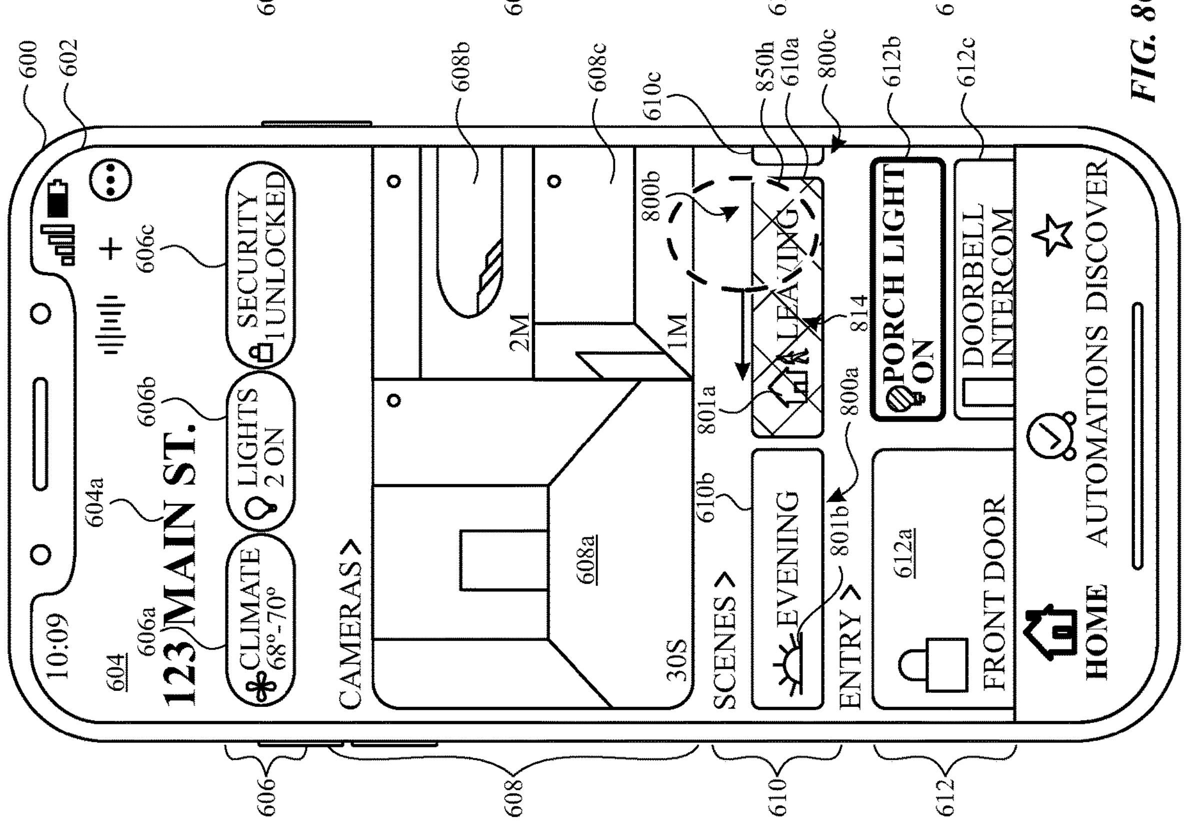

At FIG. 8G, electronic device 600 determines that the operating states of the one or more accessory devices of the scene (e.g., the scene associated with first scene user interface object 610*a*) have been adjusted and/or transitioned (e.g., electronic device 600 receives confirmation from the one or more devices). In response to determining that the operating states of the one or more accessory devices have been adjusted and/or transitioned, electronic device 600 displays first scene user interface object 610*a* having appearance 814, as shown at FIG. 8G. Appearance 814 includes a different color, shading, brightness, darkness, and/or contrast (e.g., indicated by hatching at FIG. 8G) as compared to the appearance of first scene user interface object 610*a* shown at FIGS. 8A, 8E, and 8F (e.g., indicated by no hatching at FIGS. 8A, 8E, and 8F). Accordingly, electronic device 600 changes the appearance of first scene user interface object 610*a* to appearance 814 to provide visual confirmation that the scene has been activated (e.g., the one or more accessory devices associated with the scene have transitioned between operating states).

At FIGS. 8E-8G, electronic device 600 partially displays third scene user interface object 610*c* at third position 800*c*. Scene region 610 of home user interface 604 is scrollable, so that a user of electronic device 600 can view and/or interact with additional scene user interface objects that are not displayed and/or partially displayed on scenes region 610. For instance, at FIG. 8G, electronic device 600 detects user input 850*h* (e.g., a swipe gesture or other selection/navigation input) corresponding to scenes region 610. In response to detecting user input 850*h*, electronic device 600 scrolls and/or moves scene user interface objects 610*a*-610*c*, as shown at FIG. 8H.

Figure 8H:
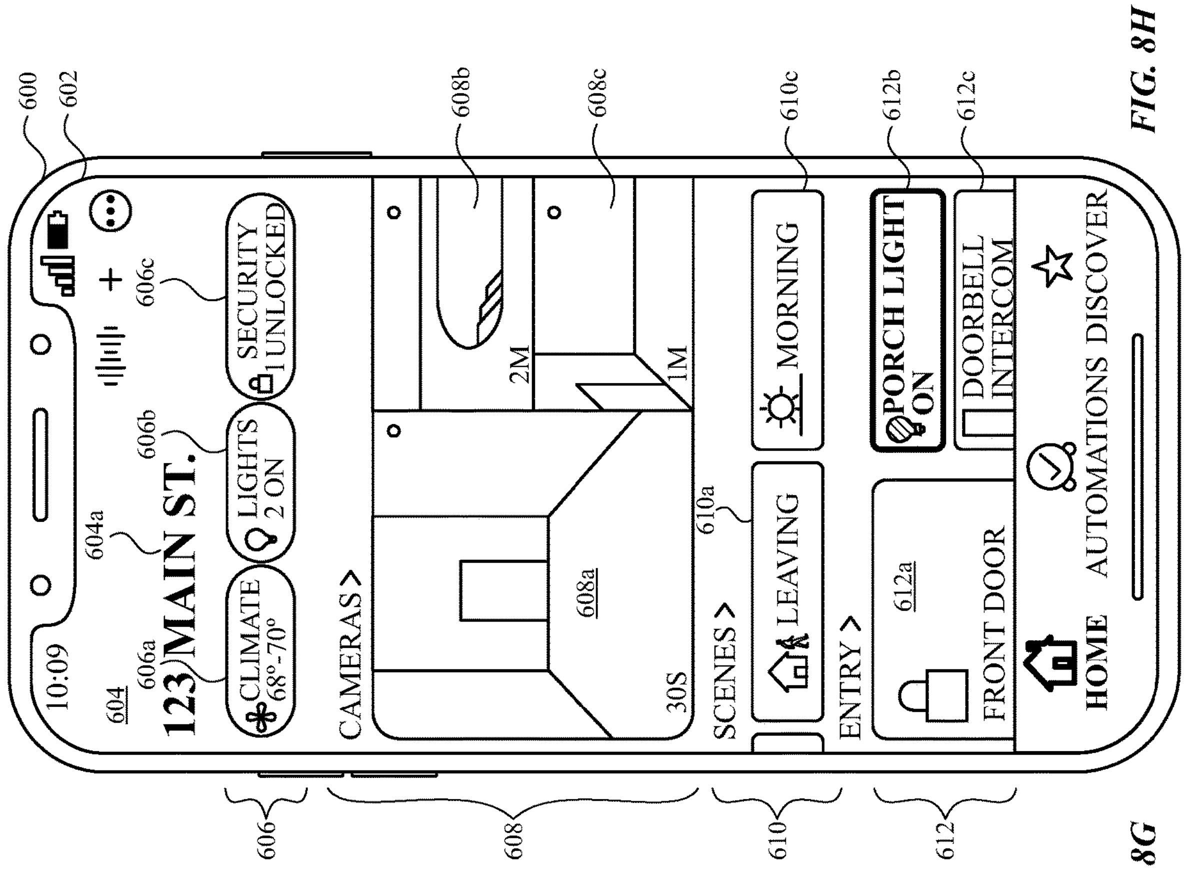
Figure 8J:
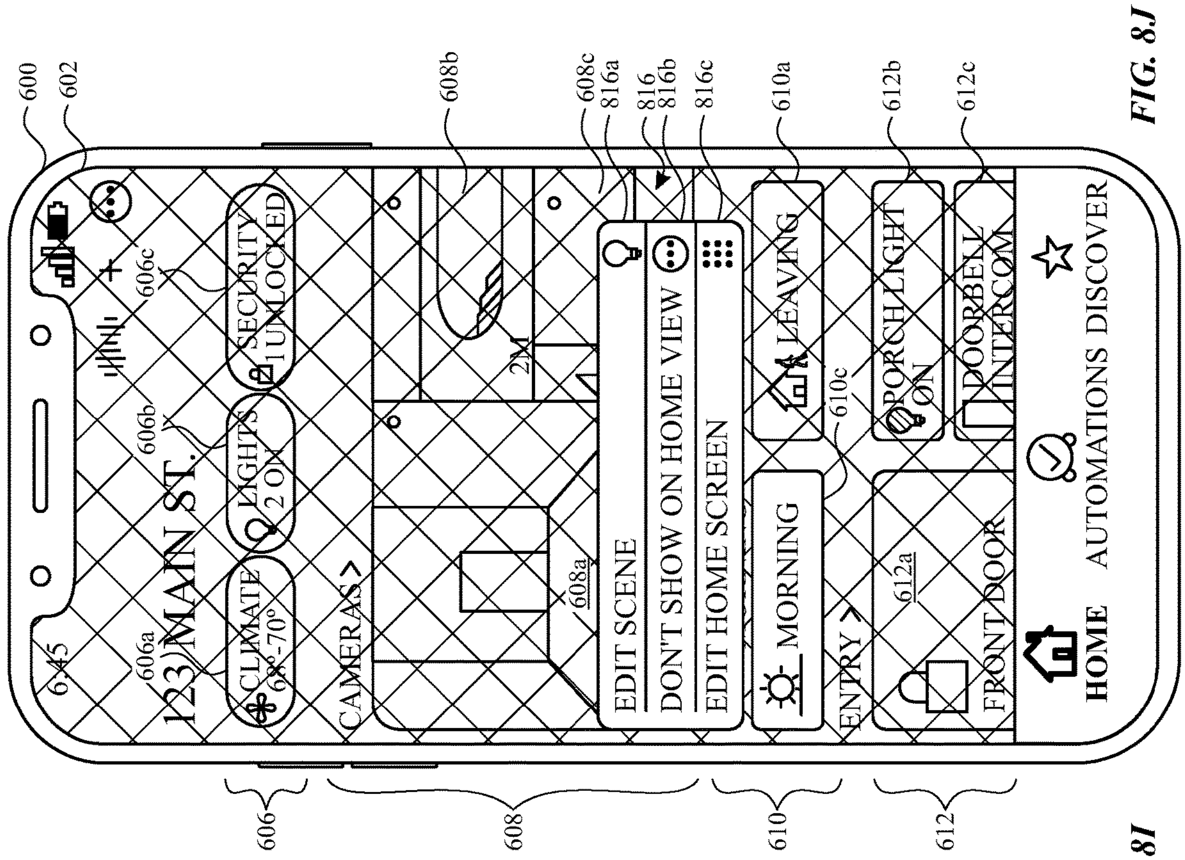

At FIG. 8H, electronic device 600 displays (e.g., fully displays) third scene user interface object 610*c* in response to detecting user input 850*h*. While electronic device 600 scrolls and/or moves scene user interface objects 610*a*-610*c* on home user interface 604, electronic device 600 maintains the order and/or respective positions of scene user interface objects 610*a*-610*c* with respect to one another. For example, electronic device 600 has not detected and/or determined (e.g., based on the context-based conditions) a change in priority of the scenes associated with scene user interface objects 610*a*-610*c*, and thus, maintains the arrangement and/or order of scene user interface objects 610*a*-610*c* within scene region 610.

Figure 8I:
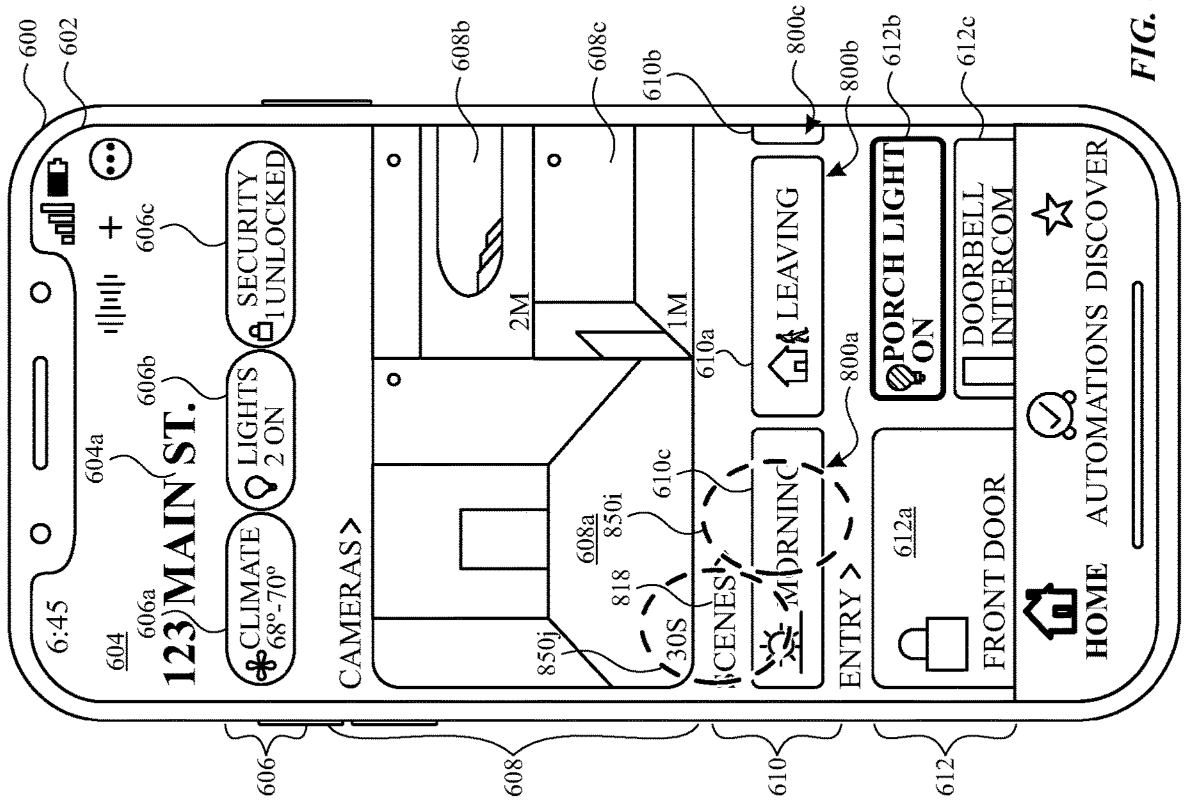

At FIG. 8I, electronic device 600 determines that a priority of the scenes associated with scene user interface objects 610*a*-610*c* has changed. In response to detecting that the priority of the scenes has changed, electronic device 600 displays third scene user interface object 610*c* at first position 800*a*, first scene user interface object 610*a* at second position 800*b*, and second scene user interface object 610*b* at third position 800*c*. At FIG. 8I, electronic device 600 indicates that the current time of day is 6:45 am. Electronic device 600 determines, based on the context-based criteria, that the scene associated with third scene user interface 610*c* has the highest priority as compared to the other scenes and displays third scene user interface object 610*c* at first position 800*a*. In some embodiments, electronic device 600 determines that the scene associated with third scene user interface object 610*c* has the highest priority because the current time of day is 6:45 am, which is during the morning hours of a day. As such, electronic device 600 determines that the morning scene associated with third scene user interface object 610*c* is likely to be most relevant to the user (e.g., as compared to the other scenes) and displays third scene user interface object 610*c* at first position 800*a* (e.g., a primary position within scene region 610).

At FIG. 8I, electronic device 600 displays first scene user interface object 610*a* at second position 800*b* because electronic device 600 determines that the leaving scene associated with first scene user interface object 610*a* includes the second highest priority among the scenes of electronic device 600. In some embodiments, electronic device 600 determines that the leaving scene has the second highest priority based on the current time of day, a location of electronic device 600, and/or habits of the user indicating that the user is likely to leave a location associated with the home automation system. Electronic device 600 displays second scene user interface object 610*b* at third position 800*c* based on a determination that the evening scene includes the third highest priority among the scenes. In some embodiments, electronic device 600 displays second scene user interface object 610*b* at third position 800*c* based on the current time of day, a location of electronic device 600, and/or user habits that indicate that a user is unlikely to use and/or activate the evening scene.

At FIG. 8I, electronic device 600 detects user input 850*i* (e.g., a gesture with a duration that satisfies a threshold duration or other selection/navigation input) corresponding to third scene user interface object 610*c*. In response to detecting user input 850*i*, electronic device 600 displays menu 816, as shown at FIG. 8J. Additionally or alternatively, electronic device 600 detects user input 850*j* (e.g., a tap gesture or other selection/navigation input) corresponding to scenes user interface object 818 of scenes region 610. In response to detecting user input 850*j*, electronic device 600 displays scenes user interface 820, as shown at FIG. 8K.

At FIG. 8J, menu 816 includes selectable options 816*a*-816*c* that enables electronic device 600 to configure and/or modify settings associated with third scene user interface object 610*c* and/or home user interface 604. For instance, in some embodiments, in response to detecting selection of first selectable option 816*a*, electronic device 600 displays a user interface (e.g., a user interface similar to scene settings user interface 822, shown at FIG. 8L) that enables electronic device 600 to edit, modify, and/or change the scene associated with third scene user interface object 610*c*. In some embodiments, in response to detecting selection of second selectable option 816*b*, electronic device 600 ceases to display third scene user interface object 610*c* on home user interface 604 (e.g., on scenes region 610 of home user interface 604). In some embodiments, in response to selection of second selectable option 816*b*, electronic device 600 displays a user interface object on scenes user interface 820 (e.g., as shown at FIG. 8K) that corresponds to the scene associated with third scene user interface object 610*c*, but does not display third scene user interface object 610*c* on home user interface 604. In some embodiments, in response to detecting selection of third selectable option 816*c*, electronic device 600 activates an editing mode that allows a user to rearrange user interface objects displayed on home user interface 604. The editing mode of electronic device 600 is discussed below with reference to FIGS. 14A-14M.

Figure 8L:
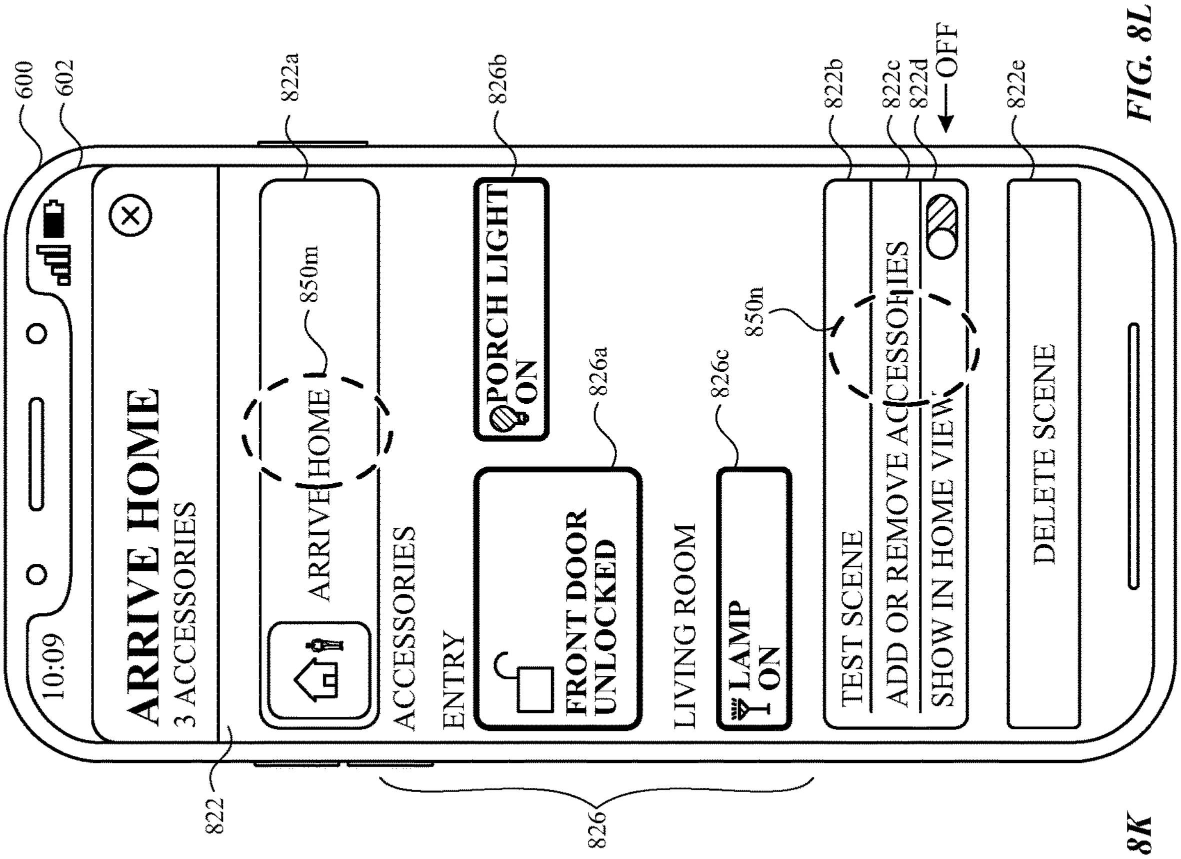
Figure 8K:
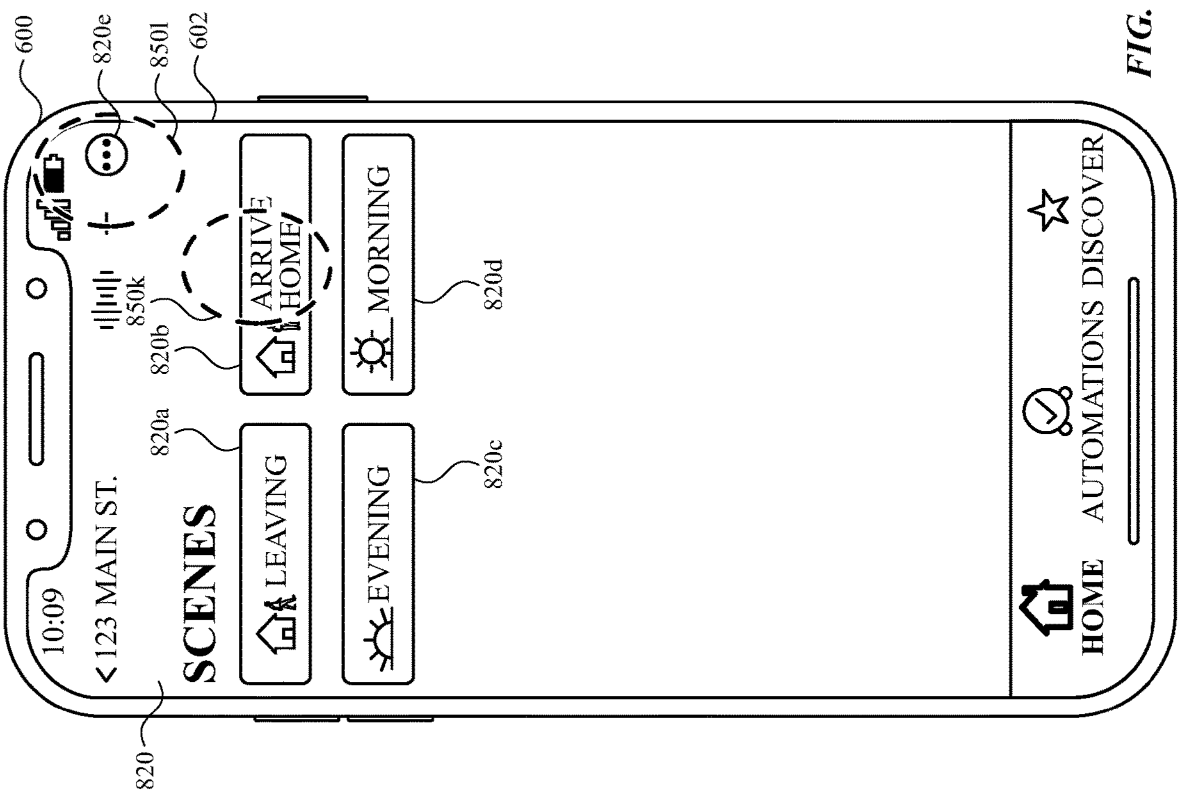

As set forth above, in response to detecting user input 850*j* corresponding to selection of scenes user interface object 818, electronic device 600 displays scenes user interface 820, as shown at FIG. 8K. At FIG. 8K, scenes user interface 820 includes scene user interface objects 820*a*-820*d*. First scene user interface object 820*a* corresponds to first scene user interface object 610*a* of home user interface 604, third scene user interface object 820*c* corresponds to second scene user interface object 610*b* of home user interface 604, and fourth scene user interface object 820*d* corresponds to third scene user interface object 610*c* of home user interface 604. Second scene user interface object 820*b* does not correspond to a scene user interface object that is displayed on home user interface 604 at FIGS. 8A-8J. As discussed below with reference to FIG. 8L, in some embodiments, second scene user interface object 820*b* corresponds to a scene of the home automation system that has been designated to not be displayed on home user interface 604. In some embodiments, scenes user interface 820 includes scene user interface objects corresponding to all of the scenes of the home automation system (e.g., regardless of whether the scenes have been designated to be displayed on home user interface 604). In some embodiments, even when a scene is designated to not be displayed on home user interface 604, a scene user interface object for the scene is still displayed on scenes user interface 820. Accordingly, a user of electronic device 600 can view, interact with, and/or modify scenes of the home automation system via scenes user interface 820.

At FIG. 8K, electronic device 600 detects user input 850*k* (e.g., a tap gesture or other selection/navigation input) corresponding to selection of second scene user interface object 820*b*. In response to detecting user input 850*k*, electronic device 600 displays scene settings user interface 822, as shown at FIG. 8L. Additionally or alternatively, electronic device 600 detects user input 850*l* (e.g., a tap gesture or other selection/navigation input) corresponding to selection of settings user interface object 820*e* of scenes user interface 820. In response to detecting user input 850*l*, electronic device 600 displays scene suggestion user interface 824, as shown at FIG.

At FIG. 8L, scene settings user interface 822 includes appearance user interface object 822*a*, accessories region 826, test scene user interface object 822*b*, edit accessories user interface object 822*c*, display user interface object 822*d*, and delete scene user interface object 822*e*. Accessories region 826 includes accessory user interface objects 826*a*-826*c* corresponding to respective accessory devices that are controlled and/or adjusted when the scene associated with second scene user interface object 820*b* is activated. While accessories region 826 at FIG. 8L includes three accessory user interface objects 826*a*-826*c* corresponding to three respective accessory devices of the home automation system, in some embodiments, electronic device 600 can add or remove accessories associated with the scene via user input (e.g., user input 850*n*) selecting edit accessories user interface object 822*c*.

At FIG. 8L, display user interface object 822*d* is in an inactive and/or off position indicating that electronic device 600 does not display a scene user interface object corresponding to the scene (e.g., the "Arrive home" scene) on home user interface 604. As set forth above, electronic device 600 maintains display of second scene user interface object 820*b* on scenes user interface 820 even though electronic device 600 does not display a scene user interface object corresponding to the scene on home user interface 604. In some embodiments, in response to detecting user input selecting display user interface object 822*d*, electronic device 600 displays a scene user interface object corresponding to the scene on home user interface 604 (and, optionally, displays display user interface object 822*d* with a different appearance to indicate that display user interface object 822*d* is in an active and/or on position).

At FIG. 8L, electronic device 600 detects user input 850*m* (e.g., a tap gesture or other selection/navigation input) corresponding to selection of appearance user interface object 822*a*. In response to detecting user input 850*m*, electronic device 600 displays appearance settings user interface 828, as shown at FIG. 8M. Additionally or alternatively, electronic device 600 detects user input 850*n* (e.g., a tap gesture or other selection/navigation input) corresponding to edit accessories user interface object 822*c*. In response to detecting user input 850*n*, electronic device 600 displays accessory user interface 830, as shown at FIG. 8N.

At FIG. 8M, appearance settings user interface 828 enables electronic device 600 to modify, change, and/or customize an appearance of second scene user interface object 820*b*. Appearance settings user interface 828 includes appearance indicator 828*a*, which provides a visual indication of a current appearance of second scene user interface object 820*b*. Second scene user interface object 820*b* corresponds to an arrive home scene, which may be convenient for a user to use when a user approaches a location associated with the home automation system. At FIG. 8M, appearance indicator 828*a* includes an image, icon, and/or symbol of a person located and/or arriving home and appearance indicator 828*a* includes a first color (e.g., as indicated by no hatching in appearance indicator 828*a*). Appearance settings user interface 828 includes color region 828*b* and icon region 828*c* that include selectable options for customizing a color and a symbol, respectively, of second scene user interface object 820*b*. For instance, in some embodiments, in response to detecting user input corresponding to selectable color option 828*d* of color region 828*b*, electronic device 600 adjusts and/or modifies the appearance of second scene user interface object 820*b* to include a color corresponding to selectable color option 828*d*. In some embodiments, in response to detecting user input corresponding to icon selectable option 828*e* of icon region 828*c*, electronic device 600 adjusts and/or modifies a symbol and/or icon that is included on second scene user interface object 820*b*. Accordingly, a user of electronic device 600 can customize an appearance of second scene user interface object 820*b* so that the user can quickly identify and interact with second scene user interface object 820*b*.

Figure 8N:
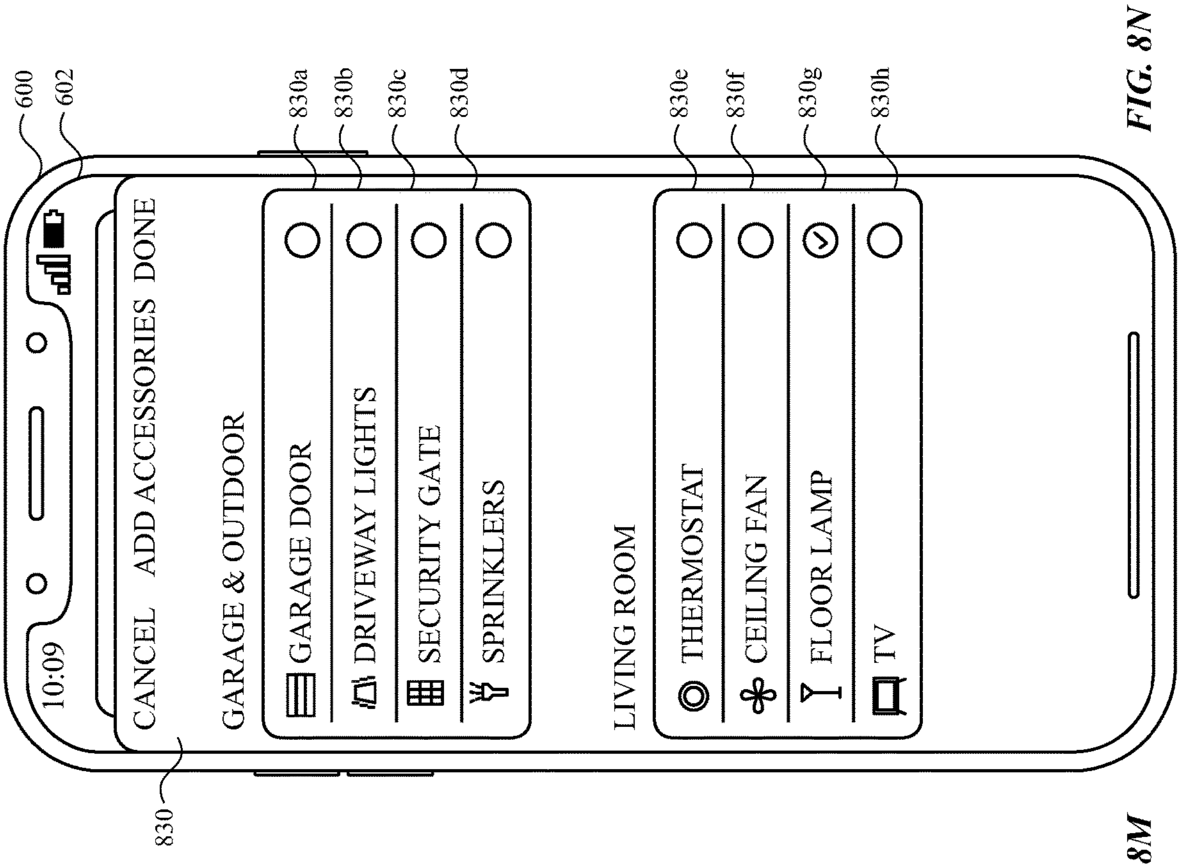
Figure 8M:
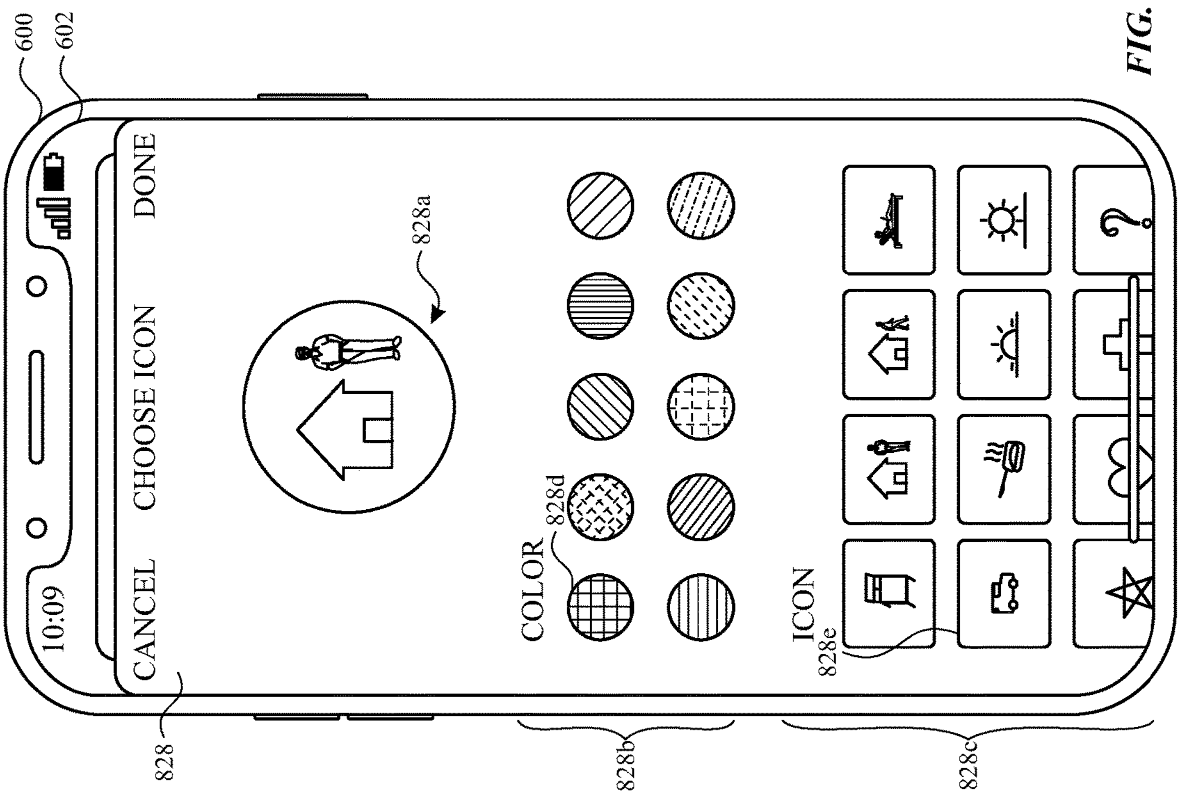

As set forth above, in response to detecting user input 850*n* corresponding to edit accessories user interface object 822*c*, electronic device 600 displays accessory user interface 830, as shown at FIG. 8N. Accessory user interface 830 includes accessory user interface objects 830*a*-830*h* that correspond to respective accessory devices of the home automation system. At FIG. 8N, accessory user interface objects 830*a*-830*h* are arranged and/or organized by room of the home automation system. In some embodiments, accessory user interface objects 830*a*-830*h* are listed based on different criteria, such as alphabetic order. In some embodiments, accessory user interface 830 includes accessory user interface objects for all accessory devices of the home automation system (e.g., all of the accessory devices that have been associated with the home automation system). In some embodiments, accessory user interface 830 is scrollable, such that electronic device 600 displays additional accessory user interface objects (e.g., accessory user interface objects different from accessory user interface objects 830*a*-830*h*) in response to receiving a scroll and/or swipe gesture on accessory user interface 830.

Figure 8O:
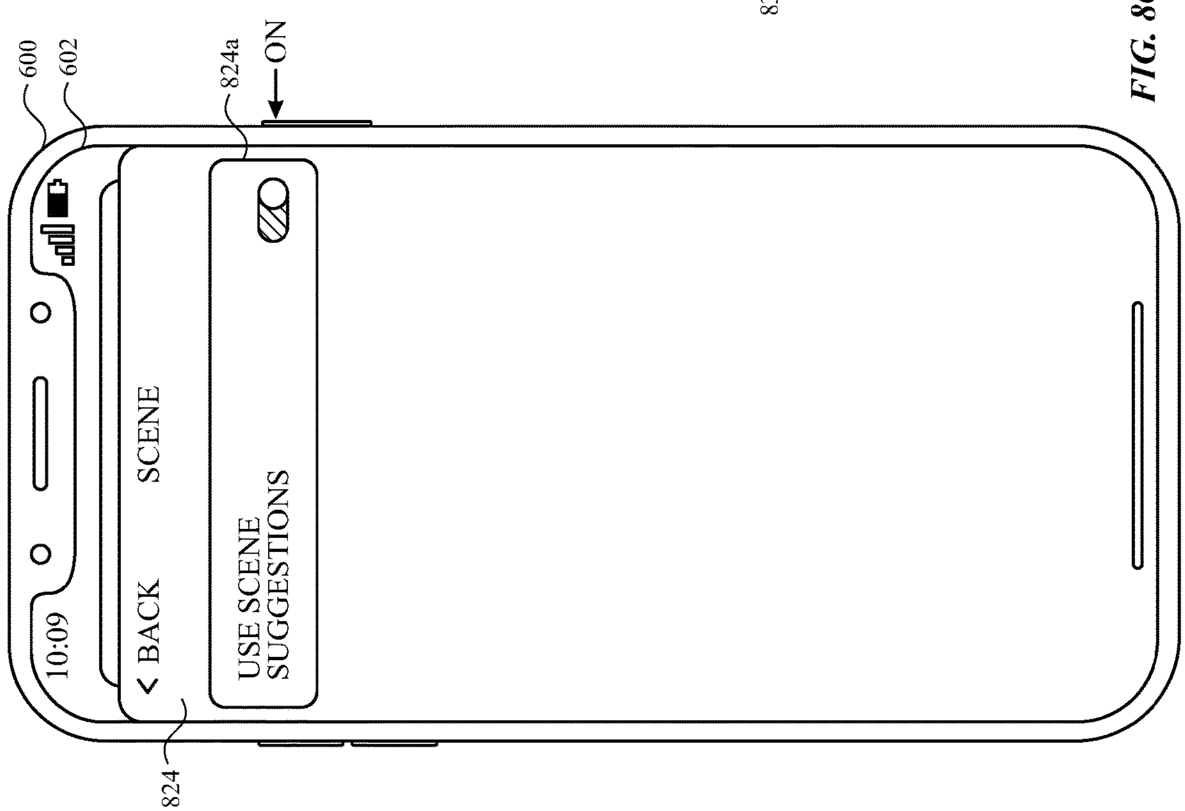

As set forth above, in response to detecting user input 850*l* corresponding to selection of settings user interface object 820*e* of scenes user interface 820, electronic device 600 displays scene suggestion user interface 824, as shown at FIG. 8O. At FIG. 8O, scene suggestion user interface 824 includes scene suggestion user interface object 824*a* that is in an active and/or on position. When scene suggestion user interface object 824*a* is in the active and/or on position, electronic device 600 arranges and/or orders scene user interface objects 610*a*-610*c* of scenes region 610 based on the context-based conditions. For instance, as set forth above, electronic device 600 determines which scene associated with scene user interface objects 610*a*-610*c* has the highest priority as compared to the other scenes and displays the respective scene user interface object for that scene at position 800*a*. In some embodiments, when scene suggestion user interface object 824*a* is in the active and/or on position, electronic device 600 arranges and/or orders scene user interface objects 610*a*-610*b* based on the context-based conditions when electronic device 600 is configured to display more than a predetermined number (e.g., two) of scene user interface objects in scene region 610.

In some embodiments, in response to detecting user input selecting scene suggestion user interface object 824*a*, electronic device 600 causes scene suggestion user interface object 824*a* to be in an inactive and/or off position. In some embodiments, when scene suggestion user interface object 824*a* is in the inactive and/or off position, electronic device 600 does not arrange and/or order scene user interface objects 610*a*-610*c* based on the context-based conditions (e.g., even when electronic device 600 is configured to display more than the predetermined number of scene user interface objects in scene region 610). In some embodiments, when scene suggestion user interface object 824*a* is in the inactive and/or off position, electronic device 600 displays scene user interface objects 610*a*-610*c* at respective positions based on alphabetical order, a last activated scene, and/or a user-defined order.

Electronic device 600 is also able to display scene user interface objects on user interfaces that are different from home user interface 604. For instance, at FIG. 8P, electronic device 600 displays first room user interface 832 corresponding to an entry room and/or area of a location associated with the home automation system. As set forth above, in some embodiments, electronic device 600 associates (e.g., programmatically maps) accessory devices of the home automation system with respective rooms and/or areas of the location associated with the home automation system. Accordingly, first room user interface 832 corresponds to accessory devices that are associated with the entry room and/or area of the location. In some embodiments, first room user interface 832 enables a user of electronic device to control and/or adjust a subset of accessory devices of all the accessory devices of the home automation system (e.g., accessory devices that are associated with the entry room and/or region of the location).

At FIG. 8P, first room user interface 832 includes scene region 834, which includes scene user interface objects 834*a* and 834*b*. In some embodiments, scene user interface objects 834*a* and 834*b* correspond to respective scenes that control and/or adjust a state of at least one accessory device that is associated with the entry room and/or area of the location. In some embodiments, electronic device 600 does not display scene user interface objects corresponding to scenes that do not control and/or adjust a state of at least one accessory device that is associated with the entry room and/or area of the location on scene region 834.

Similar to scenes region 610, electronic device 600 is configured to arrange, order, and/or position scene user interface objects 834*a* and 834*b* based on the context-based conditions, such as a current time of day, a location of electronic device 600 and/or habits of the user. In some embodiments, electronic device 600 arranges, orders, and/or positions scene user interface objects 834*a* and 834*b* in respective positions on scene region 834 based on the context-based conditions when scene region 834 includes more than the predetermined number of scene user interface objects (e.g., more than two scene user interface objects).

FIGS. 9A-9C are a flow diagram illustrating a method for managing accessory groups using a computer system in accordance with some embodiments. Method 900 is performed at a computer system (e.g., 100, 300, 500, and/or 600) (e.g., an electronic device; a smart device, such as a smartphone or a smartwatch; a mobile device; a wearable device) that is in communication with one or more input devices and a display generation component (e.g., 602) (e.g., a display controller, a touch-sensitive display system, a projector, a display screen, a display monitor, and/or a holographic display). Some operations in method 700 are, optionally, combined, the orders of some operations are, optionally, changed, and some operations are, optionally, omitted.

As described below, method 900 provides an intuitive way for managing accessory groups. The method reduces the cognitive burden on a user for managing accessory groups, thereby creating a more efficient human-machine interface. For battery-operated computing devices, enabling a user to manage accessory groups faster and more efficiently conserves power and increases the time between battery charges.

The computer system (e.g., 100, 300, 500, and/or 600) receives (902) (e.g., detecting), via the one or more input devices, a request (e.g., one or more user inputs) to display a user interface (e.g., 604 and/or 832) (e.g., a home and/or default user interface of an application that is configured to enable control of one or more accessories and/or devices that are part of a home automation system) of a home automation system (or an application) (e.g., a system or application that includes one or more accessories and/or devices of a home and/or other structure that are able to be controlled and/or adjusted via the computer system).

In response to receiving the request to display the user interface (e.g., 604 and/or 832) of the home automation system, the computer system (e.g., 100, 300, 500, and/or 600) displays (904), via the display generation component (e.g., 602), the user interface (e.g., 604 and/or 832) of the home automation system that includes two or more representations (e.g., 610*a*-610*c*, 934*a*, and/or 834*b*) (e.g., two or more user interface objects and/or affordances that, when selected, is configured to adjust a state of operation of one or more respective devices and/or a respective set of accessories) of scenes (e.g., a control option that enables adjustment (e.g., coordinated and/or concurrent adjustment) of multiple devices and/or accessories of a home to a predefined state and/or operating mode) associated with one or more respective devices of the home automation system.

In accordance with a determination that a set of one or more suggestion criteria (e.g., a set of criteria that predicts and/or suggests a scene that a user of the computer system is likely to use, activate, and/or interact with (e.g., more likely when compared to the other scenes) based on a time of day, a location of the computer system, a location of the user, and/or habits (e.g., patterns of user inputs that occur within particular ranges of times) of the user) indicates a first relative priority (e.g., a first ranking and/or order of hierarchy of scenes that a user of the computer system is more likely to use, activate, and/or interact with as compared to the other scenes) of the scenes (e.g., scenes indicated by 610*a*-610*c*, 934*a*, and/or 834*b*), the computer system (e.g., 100, 300, 500, and/or 600) displays (906) the two or more representations (e.g., 610*a*-610*c*, 934*a*, and/or 834*b*) of the scenes in a first arrangement (e.g., an arrangement shown at FIG. 8G) (e.g., a first order and/or displaying the two or more representations of the scenes at respective first positions) on the user interface (e.g., 604 and/or 832) of the home automation system.

In accordance with a determination that the set of one or more suggestion criteria indicates a second relative priority (e.g., a second ranking and/or order of hierarchy of scenes that a user of the computer system is more likely to use, activate, and/or interact with as compared to the other scenes) of the scenes (e.g., scenes indicated by 610*a*-610*c*, 934*a*, and/or 834*b*), different from the first relative priority (e.g., the second relative priority indicates that a first scene is more or less likely to be used, activated, and/or interacted with by a user as compared to the first relative priority), the computer system (e.g., 100, 300, 500, and/or 600) displays (908) the two or more representations (e.g., 610*a*-610*c*, 934*a*, and/or 834*b*) of the scenes in a second arrangement (e.g., an arrangement shown at FIG. 8I) (e.g., a second order and/or displaying the two or more representations of the scenes at respective second positions), different from the first arrangement (e.g., a first representation of a first scene is displayed at a first position when in the first arrangement and the first representation of the first scene is displayed at a second position, different from the first position, when in the second arrangement), on the user interface (e.g., 604 and/or 832) of the home automation system.

After displaying the user interface (e.g., 604 and/or 832) of the home automation system including the two or more representations (e.g., 610*a*-610*c*, 934*a*, and/or 834*b*) of the scenes (910) and in accordance with a determination that the set of one or more suggestion criteria indicates a change in relative priority of the scenes (e.g., scenes indicated by 610*a*-610*c*, 934*a*, and/or 834*b*) (e.g., the computer system determines, based on the set of one or more suggestion criteria, that the relative priority of the scenes has changed from the first relative priority to a third relative priority or from the second relative priority to a fourth relative priority), the computer system (e.g., 100, 300, 500, and/or 600) displays (912) the user interface (e.g., 604 and/or 832) of the home automation system with the two or more representations (e.g., 610*a*-610*c*, 934*a*, and/or 834*b*) of the scenes in a third arrangement (e.g., the arrangement shown at FIG. 8G and/or the arrangement shown at FIG. 8I) (e.g., a third order and/or displaying the two or more representations of the scenes at respective third positions) (in some embodiments, displaying the user interface of the home automation system with the two or more representations of the scenes in a third arrangement includes changing the two or more representations of the scenes from the first arrangement to the second arrangement, changing the two or more representations of the scenes from the second arrangement to the first arrangement, and/or changing the two or more representations of the scenes from the first arrangement or the second arrangement to a third arrangement that is different from the first arrangement and the second arrangement) on the user interface (e.g., 604 and/or 832) of the home automation system.

Arranging the two or more representations of the scenes based on the relative priority of the scenes determined by the set of one or more suggestion criteria allows the computer system to display representations of scenes that are determined to be most relevant to a user so that the user does not have to provide additional user inputs to find a desired representation of a scene, thereby reducing the number of inputs needed to perform an operation.

In some embodiments, a first scene of the scenes is user defined (e.g., generated via user input, as shown at FIGS. 8A-8D) (e.g., the first scene is configured to adjust an operating state of one or more accessories of the home automation system to a predefined state, where the one or more accessories and/or the predefined state are selected and/or configured by a user (e.g., via one or more user inputs)). The first scene of the scenes being user defined allows a user of the computer system to easily control and/or adjust a state of multiple accessories of the home automation system in a way that is convenient for the user, thereby reducing the number of inputs needed to perform an operation.

In some embodiments, the two or more representations (e.g., 610*a*-610*c*, 934*a*, and/or 834*b*) of scenes include a first representation (e.g., 610*a*-610*c*, 934*a*, and/or 834*b*) (e.g., a user interface object and/or affordance that, when selected, is configured to adjust a state of operation of one or more first devices and/or a first set of accessories of the home automation system) of a second scene (e.g., a control option that enables adjustment (e.g., coordinated and/or concurrent adjustment) of multiple devices and/or accessories of a home to a predefined state and/or operating mode) associated with one or more first devices of the home automation system, and the first representation (e.g., 610*a*-610*c*, 934*a*, and/or 834*b*) of the second scene includes an appearance (e.g., an appearance of scene user interface object 610*a* shown at FIG. 8E and/or an appearance of scene user interface object 610*a* shown at FIG. 8G) (e.g., a visual characteristic, such as a color, a brightness, an amount of blur, an opacity, a transparency, and/or a size) that indicates a state of the one or more first devices of the home automation system (e.g., the appearance of the first representation indicates whether the second scene has been activated (e.g., the one or more first devices of the home automation system are in a first state) and/or inactive (e.g., the one or more first devices of the home automation system are in a second state)). The first representation of the second scene including an appearance that indicates a state of the one or more first devices of the home automation system allows a user of the computer system to quickly determine whether the second scene is in an active or an inactive state, thereby providing improved visual feedback.

In some embodiments, while displaying the user interface (e.g., 604 and/or 832) of the home automation system that includes the two or more representations (e.g., 610a-610c, 934a, and/or 834b) of scenes, the computer system (e.g., 100, 300, 500, and/or 600) detects (914), via the one or more input devices, a first user input (e.g., 850g) (e.g., a tap gesture) corresponding to selection of a second representation (e.g., 610a-610c, 934a, and/or 834b) (e.g., a user interface object and/or affordance that, when selected, is configured to adjust a state of operation of one or more devices and/or a set of accessories of the home automation system) of a third scene (e.g., a control option that enables adjustment (e.g., coordinated and/or concurrent adjustment) of multiple devices and/or accessories of a home to a predefined state and/or operating mode) of the two or more representations (e.g., 610a-610c, 934a, and/or 834b) of scenes, where the third scene is associated with one or more second devices of the home automation system. In response to detecting the first user input (e.g., 850g), the computer system (e.g., 100, 300, 500, and/or 600) causes (916) the one or more second devices of the home automation system to transition from a first state (e.g., on, off, open, closed, locked, unlocked, outputting content, and/or not outputting content) to a second state (e.g., on, off, open, closed, locked, unlocked, outputting content, and/or not outputting content), different from the first state.

Causing the one or more second devices to transition from the first state to the second state in response to detecting the first user input allows a user of the computer system to easily control and/or adjust a state of multiple accessories of the home automation system in a way that is convenient for the user, thereby reducing the number of inputs needed to perform an operation.

In some embodiments, prior to detecting the first user input (e.g., 850g), the computer system (e.g., 100, 300, 500, and/or 600) displays (918), via the display generation component (e.g., 602), the second representation (e.g., 610a-610c, 934a, and/or 834b) of the third scene with a first appearance (e.g., an appearance of scene user interface object 610a shown at FIG. 8E) (e.g., a first visual characteristic, such as a first color, a first brightness, a first amount of blur, a first amount of opacity, a first amount of transparency, and/or a first size). In response to detecting the first user input (e.g., 850g), the computer system (e.g., 100, 300, 500, and/or 600) displays (920), via the display generation component (e.g., 602), the second representation (e.g., 610a-610c, 934a, and/or 834b) of the third scene with a second appearance (e.g., an appearance of scene user interface object 610a shown at FIG. 8G) (e.g., a second visual characteristic, such as a second color, a second brightness, a second amount of blur, a second amount of opacity, a second amount of transparency, and/or a second size), different from the first appearance (e.g., the second appearance is visually distinguishable from the first appearance to confirm and/or indicate that the first user input was detected and/or received). Displaying the second representation of the third scene with the second appearance, different from the first appearance, in response to detecting the first user input allows a user of the computer system to confirm that the first user input was received and/or that the third scene was activated and/or deactivated, thereby providing improved visual feedback.

In some embodiments, the two or more representations (e.g., 610a-610c, 934a, and/or 834b) of scenes associated with one or more respective devices of the home automation system include a third representation (e.g., 610a-610c, 934a, and/or 834b) (e.g., a user interface object and/or affordance that, when selected, is configured to adjust a state of operation of one or more devices and/or a set of accessories of the home automation system) of a fourth scene (e.g., a control option that enables adjustment (e.g., coordinated and/or concurrent adjustment) of multiple devices and/or accessories of a home to a predefined state and/or operating mode) that is associated with one or more third devices of the home automation system, the third representation (e.g., 610a-610c, 934a, and/or 834b) of the fourth scene includes a visual indicator (e.g., 801a and/or 801b) (e.g., a color, an image, an icon, and/or a symbol) associated with the fourth scene (e.g., the visual indicator represents a function and/or purpose of the fourth scene), and the visual indicator (e.g., 801a and/or 801b) is selected based on user input (e.g., user input detected while displaying appearance settings user interface 828) (e.g., the visual indicator is selected by a user via one or more user inputs and/or the visual indicator can be changed via one or more user inputs to more accurately and/or appropriately reflect and/or represent the function and/or purpose of the fourth scene). Displaying the third representation of the fourth scene with the visual indicator associated with the fourth scene allows a user of the computer system to quickly find the third representation and/or to quickly determine the purpose of the fourth scene, thereby providing improved visual feedback.

In some embodiments, the user interface (e.g., 604 and/or 832) of the home automation system corresponds to a room (e.g., 832) (e.g., a physical region and/or area, such as a room and/or a portion) of a location (e.g., a home, an office, an apartment, a condominium, and/or a building) associated with the home automation system and the two or more representations (e.g., 610a-610c, 934a, and/or 834b) of scenes are associated with at least one respective device of the home automation that is associated with the location (e.g., the two or more representations are each associated with a respective scene that includes a device that has been associated with (e.g., programmatically mapped to) the room of the location). Displaying the user interface that corresponds to a room of a location associated with the home automation system and including the two or more representations of scenes that are associated with at least one respective device of the home automation system that is associated with the location allows a user of the computer system to view and/or interact with representations of scenes that are relevant to the currently displayed user interface, thereby providing improved visual feedback.

In some embodiments, the user interface (e.g., 604 and/or 832) of with the home automation system includes a home user interface (e.g., 604) (e.g., a default and/or home screen user interface) that is displayed (e.g., first displayed) after (e.g., in response to) launching an application that enables control of the home automation system (e.g., the home user interface is first displayed when the application is launched). In some embodiments, the home user interface includes an appearance, such as a color and/or a background, that the computer system changes and/or updates based on a current time of day. For instance, in some embodiments, the home user interface includes a first appearance having darker and/or cooler colors during the nighttime hours and a second appearance having warmer and/or brighter colors during the daytime hours. Arranging the two or more representations of the scenes on the home user interface allows the computer system to display representations of scenes that are determined to be most relevant to a user so that the user does not have to provide additional user inputs to find a desired representation of a scene, thereby reducing the number of inputs needed to perform an operation.

In some embodiments, while displaying the user interface (e.g., 604 and/or 832) of the home automation system that includes two or more representations (e.g., 610*a*-610*c*, 934*a*, and/or 834*b*) of the scenes, the computer system detects (922), via the one or more input devices, second user input (e.g., 850*i*) (e.g., a gesture with a duration that satisfies a threshold duration) corresponding to a fourth representation (e.g., 610*a*-610*c*, 934*a*, and/or 834*b*) (e.g., a user interface object and/or affordance that, when selected, is configured to adjust a state of operation of one or more devices and/or a set of accessories of the home automation system) of a fifth scene (e.g., a control option that enables adjustment (e.g., coordinated and/or concurrent adjustment) of multiple devices and/or accessories of a home to a predefined state and/or operating mode) of the two or more representations (e.g., 610*a*-610*c*, 934*a*, and/or 834*b*) of the scenes. In response to detecting the second user input (e.g., 850*i*), the computer system (e.g., 100, 300, 500, and/or 600) displays (924) displaying, via the display generation component (e.g., 602), a first selectable option (926) (e.g., 816*a*) (e.g., a first selectable user interface object and/or an affordance) that, when selected via user input (e.g., a tap gesture), causes the computer system (e.g., 100, 300, 500, and/or 600) to display an editing user interface (e.g., 822) for the fifth scene (e.g., a user interface that enables one or more accessories associated with the fifth scene to be modified (e.g., add and/or remove accessories), predetermined operations and/or states of the one or more accessories associated with the fifth scene to be modified, and/or an appearance of the fourth representation to be modified) and a second selectable option (928) (e.g., 816*b*) (e.g., a second selectable user interface object and/or an affordance) that, when selected via user input, causes the computer system (e.g., 100, 300, 500, and/or 600) to cease displaying (e.g., stop displaying and/or not display) the fourth representation (e.g., 610*a*-610*c*, 934*a*, and/or 834*b*) of the fifth scene on the user interface (e.g., 604 and/or 832) of the home automation system. In some embodiments, in response to detecting selection of the second selectable option, the computer system does not display the fourth representation of the fifth scene on the user interface of the home automation system, but the computer system displays a fifth representation of the fifth scene on a different user interface (e.g., a user interface that includes representations of all scenes of the home automation system) of the home automation system.

Displaying the first selectable option and the second selectable option in response to detecting the second user input allows the computer system to provide control options for editing the scene and/or the fourth representation without additional user inputs that navigate to a different user interface, thereby reducing the number of inputs needed to perform an operation.

In some embodiments, displaying the user interface (e.g., 604 and/or 832) of the home automation system that includes the two or more representations (e.g., 610*a*-610*c*, 934*a*, and/or 834*b*) of the scenes includes, in accordance with a determination that a scene suggestion setting (e.g., a setting that enables and/or causes the computer system to arrange the two or more representations of the scenes based on the relative priority of the scenes using the set of one or more suggestion criteria) of the computer system is disabled (e.g., scene suggestion user interface object 824*a* is in an inactive position) (e.g., the computer system is not enabled and/or does not arrange the two or more representations of the scenes based on the relative priority of the scenes using the set of one or more suggestion criteria), the computer system (e.g., 100, 300, 500, and/or 600) displaying the two or more representations (e.g., 610*a*-610*c*, 934*a*, and/or 834*b*) of the scenes in a fourth arrangement (e.g., a fourth order and/or displaying the two or more representations of the scenes at respective fourth positions) on the user interface (e.g., 604 and/or 832) of the home automation system, where the fourth arrangement is not based on the relative priority of the scenes determined by the set of one or more suggestion criteria (e.g., the fourth arrangement of the two or more representations of the scenes is based on a different set of criteria, such as alphabetical order, most recently used and/or activated, and/or an order at which the scenes were created and/or associated with the home automation system). Displaying the two or more representations of the scenes in the fourth arrangement when the scene suggestion setting is not enabled allows the user of the computer system to customize how the two or more representations of the scenes are arranged so that the user can quickly and easily access a desired representation of a scene, thereby reducing the number of inputs needed to perform an operation.

In some embodiments, in response to receiving the request to display the user interface (e.g., 604 and/or 832) of the home automation system (930) and in accordance with a determination that a display setting (e.g., a setting that causes the computer system to either display (e.g., when the display setting is enabled) or not display (e.g., when the display setting is disabled) a representation of a respective scene on the user interface) associated with a sixth scene (e.g., a control option that enables adjustment (e.g., coordinated and/or concurrent adjustment) of multiple devices and/or accessories of a home to a predefined state and/or operating mode) is disabled (e.g., display user interface object 822*d* is in an inactive state) (e.g., the computer system forgoes and/or does not display a representation of the sixth scene on the user interface), the computer system (e.g., 100, 300, 500, and/or 600) forgoes (932) displaying (e.g., not displaying) a fifth representation (e.g., 610*a*-610*c*, 934*a*, and/or 834*b*) (e.g., a user interface object and/or affordance that, when selected, is configured to adjust a state of operation of one or more devices and/or a set of accessories of the home automation system) of the sixth scene on the user interface (e.g., 604 and/or 832) of the home automation system. Forgoing displaying the fifth representation of the sixth scene when the display setting associated with the sixth scene is disabled allows a user of the computer system to customize which representations of scenes are displayed on the user interface so that the user does not have to provide additional user inputs to find and/or access a desired representation of a scene, thereby reducing the number of inputs needed to perform an operation.

Note that details of the processes described above with respect to method 900 (e.g., FIGS. 9A-9C) are also applicable in an analogous manner to the methods described below/above. For example, methods 700, 1100, 1300, and/or 1500 optionally include one or more of the characteristics of the various methods described above with reference to method 900. For example, computer systems that perform methods 700, 1100, 1300, and/or 1500 can arrange the two or more representations of the scenes based on a relative priority of the scenes determined by a set of one or more suggestion criteria. For brevity, these details are not repeated below.

FIGS. 10A-10AA illustrate exemplary user interfaces for managing speaker accessories, in accordance with some embodiments. The user interfaces in these figures are used to illustrate the processes described below, including the processes in FIGS. 11A-11G.

In some embodiments, any of the inputs described herein (e.g., input 1050*a*, 1050*b*, 1050*c*, 1050*d*, 1050*e*, 1050*f*, 1050*g*, 1050*h*, 1050*i*, 1050*j*, 1050*k*, 1050*l*, 1050*m*, 1050*n*, 1050*o*, 1050*p*, 1050*q*, 1050*r*, 1050*s*, 1050*t*, 1050*u*, 1050*v*, 1050*w*, 1050*x*, 1050*y*, 1050*z*, and/or 1050*aa*) is or includes a touch input (e.g., a tap gesture and/or a swipe gesture). In some embodiments, any of the inputs described herein (e.g., input 1050*a*, 1050*b*, 1050*c*, 1050*d*, 1050*e*, 1050*f*, 1050*g*, 1050*h*, 1050*i*, 1050*j*, 1050*k*, 1050*l*, 1050*m*, 1050*n*, 1050*o*, 1050*p*, 1050*q*, 1050*r*, 1050*s*, 1050*t*, 1050*u*, 1050*v*, 1050*w*, 1050*x*, 1050*y*, 1050*z*, and/or 1050*aa*) is or includes a voice input (e.g., a voice command to select a user interface element or to activate a feature or perform a function, such as a feature or function associated with a user interface element). In some embodiments, any of the inputs described herein (e.g., input 1050*a*, 1050*b*, 1050*c*, 1050*d*, 1050*e*, 1050*f*, 1050*g*, 1050*h*, 1050*i*, 1050*j*, 1050*k*, 1050*l*, 1050*m*, 1050*n*, 1050*o*, 1050*p*, 1050*q*, 1050*r*, 1050*s*, 1050*t*, 1050*u*, 1050*v*, 1050*w*, 1050*x*, 1050*y*, 1050*z*, and/or 1050*aa*) is or includes an air gesture (e.g., an air gesture to select a user interface element or to activate a feature or perform a function, such as a feature or function associated with a user interface element). In some embodiments, any of the inputs described herein (e.g., input 1050*a*, 1050*b*, 1050*c*, 1050*d*, 1050*e*, 1050*f*, 1050*g*, 1050*h*, 1050*i*, 1050*j*, 1050*k*, 1050*l*, 1050*m*, 1050*n*, 1050*o*, 1050*p*, 1050*q*, 1050*r*, 1050*s*, 1050*t*, 1050*u*, 1050*v*, 1050*w*, 1050*x*, 1050*y*, 1050*z*, and/or 1050*aa*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIG. 10A illustrates electronic device 600 displaying, via display 602, home user interface 604 associated with a home automation system. Home user interface 604 includes category region 606, scenes region 610, and living room region 1000. Living room region 1000 includes first accessory user interface object 1002 corresponding to a first speaker accessory device of the home automation system. The first speaker accessory device is associated with (e.g., programmatically mapped to) a living room area of the location associated with the home automation system, and thus, electronic device displays first accessory user interface object 1002 in living room region 1000. As set forth below, in some embodiments, when electronic device 600 adds and/or associates a new accessory device to the home automation system, electronic device 600 determines whether to create and/or add the new accessory device to an accessory group. For instance, in some embodiments, when electronic device 600 determines that a new device is of a same type of device as an existing device and/or when the new device is being associated with a predetermined room and/or area of the location associated with the home automation system, electronic device 600 groups the new device with an existing device.

At FIG. 10A, electronic device 600 detects user input 1050*a* (e.g., a tap gesture or other selection/navigation input) corresponding to add user interface object 1004 of home user interface 604. After detecting user input 1050*a*, electronic device 600 displays add accessory user interface 1006, as shown at FIG. 10B.

Figure 10B:
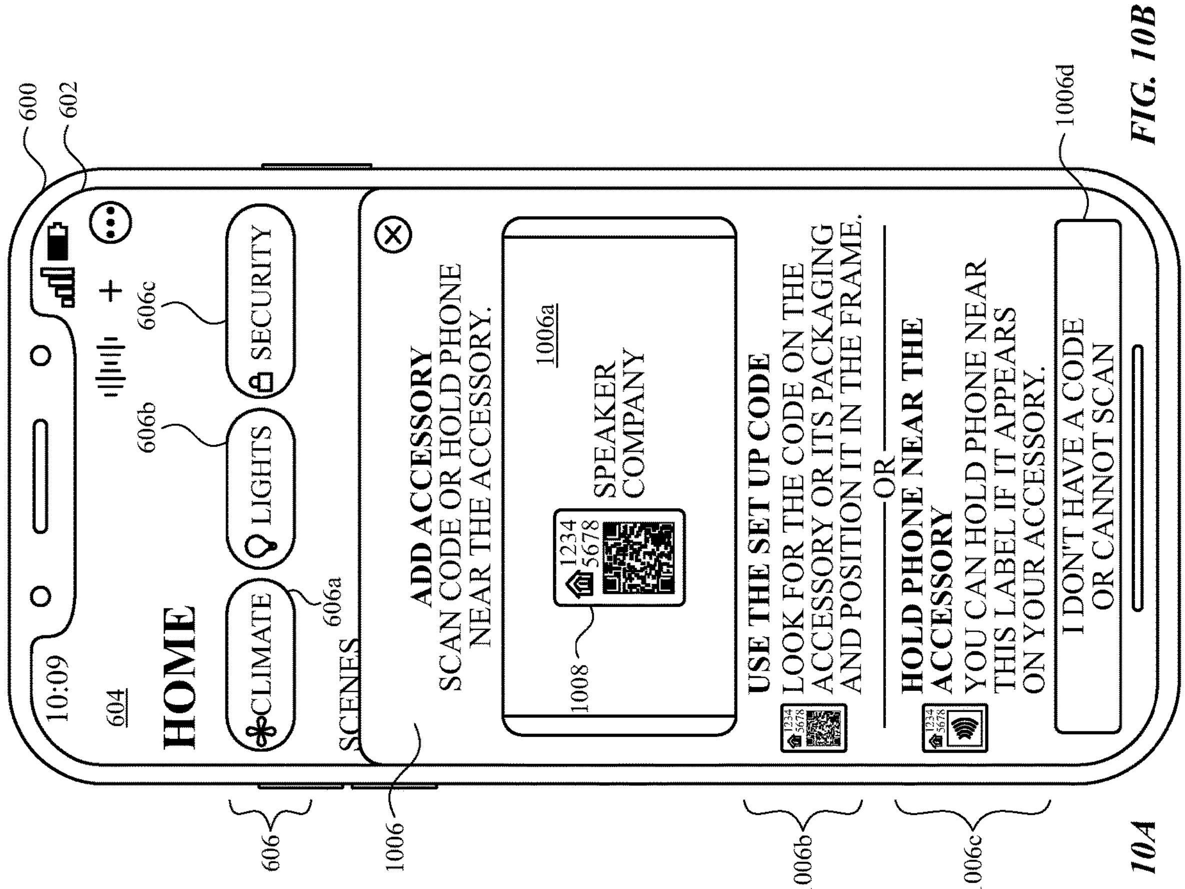
FIGS. 10A-10AA illustrate exemplary user interfaces for managing speaker accessories, in accordance with some embodiments.
Figure 10A:
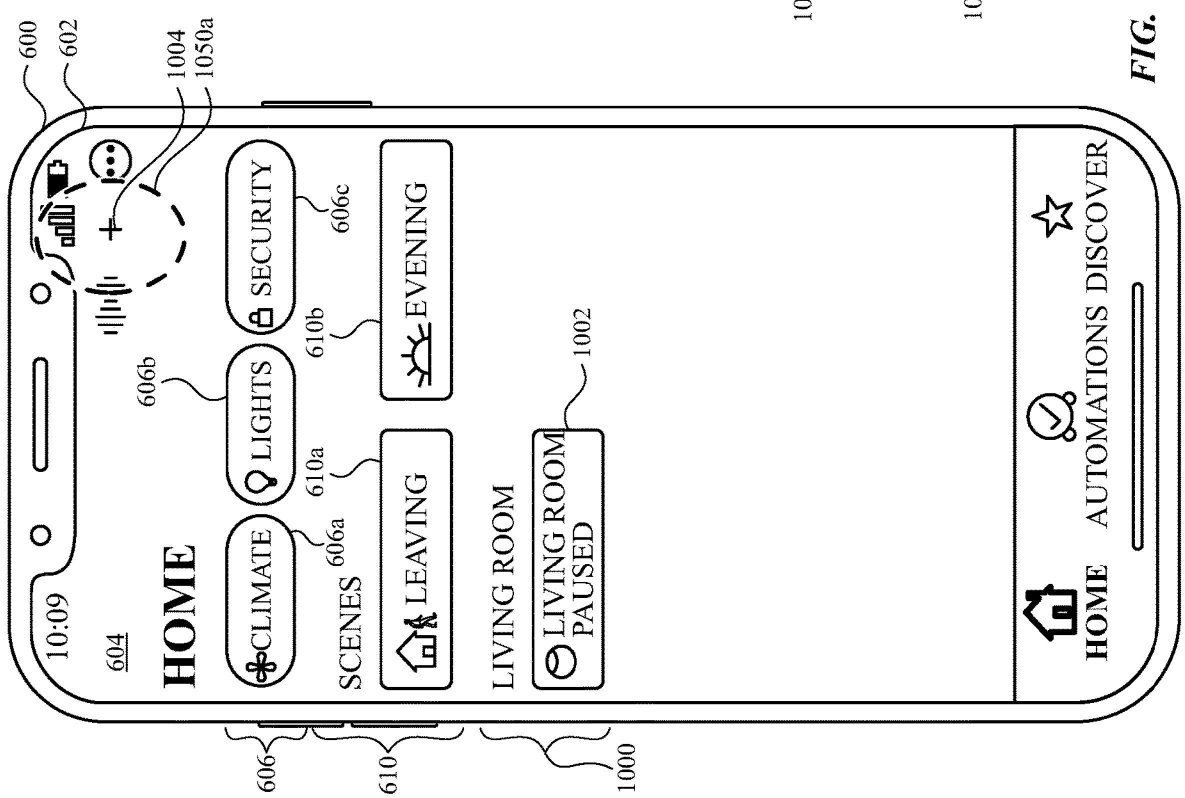

At FIG. 10B, add accessory user interface 1006 includes camera field of view 1006*a*, first details region 1006*b*, second details region 1006*c*, and manual setup user interface object 1006*d*.

First details region 1006*b* of add accessory user interface 1006 includes a visual indication of instructions for a first option for adding an accessory device (e.g., a new accessory device) to the home automation system. For instance, first details region 1006*b* includes the visual indication, which prompts a user to position a portion of packaging of the accessory device that includes a code (e.g., a QR code, a bar code, an alphanumeric code) within a field of view of the camera of electronic device 600. Camera field of view 1006*a* is a visual representation of a field of view of a camera of electronic device 600. At FIG. 10B, camera field of view 1006*a* includes a visual representation of a portion of the packaging of a second speaker accessory device having code 1008 that is within the field of view of the camera of electronic device 600. When code 1008 is within the field of view of the camera (e.g., and while displaying add accessory user interface 1006), electronic device 600 detects code 1008. In response to detecting code 1008, electronic device 600 displays first accessory user interface 1010, as shown in FIG. 10C.

At FIG. 10B, second details region 1006*c* of add accessory user interface 1006 includes a visual indication of instructions for a second option for adding an accessory device (e.g., a new accessory device) to the home automation system. For instance, second details region 1006*c* includes the visual indication, which prompts a user to position the accessory device proximate to (e.g., within a predefined distance of) electronic device 600. In some embodiments, in response to detecting that the accessory device is within a predefined distance of electronic device 600, electronic device 600 detects the accessory device and displays first accessory user interface 1010, as shown in FIG. 10C.

At FIG. 10B, manual setup user interface object 1006*d* corresponds to a manual setup process for adding an accessory device (e.g., a new accessory device) to the home automation system. In some embodiments, in response to detecting user input corresponding to manual setup user interface object 1006*d*, electronic device 600 displays a detection user interface that prompts a user to position electronic device 600 proximate to the accessory device and/or to turn the accessory device on.

Figure 10D:
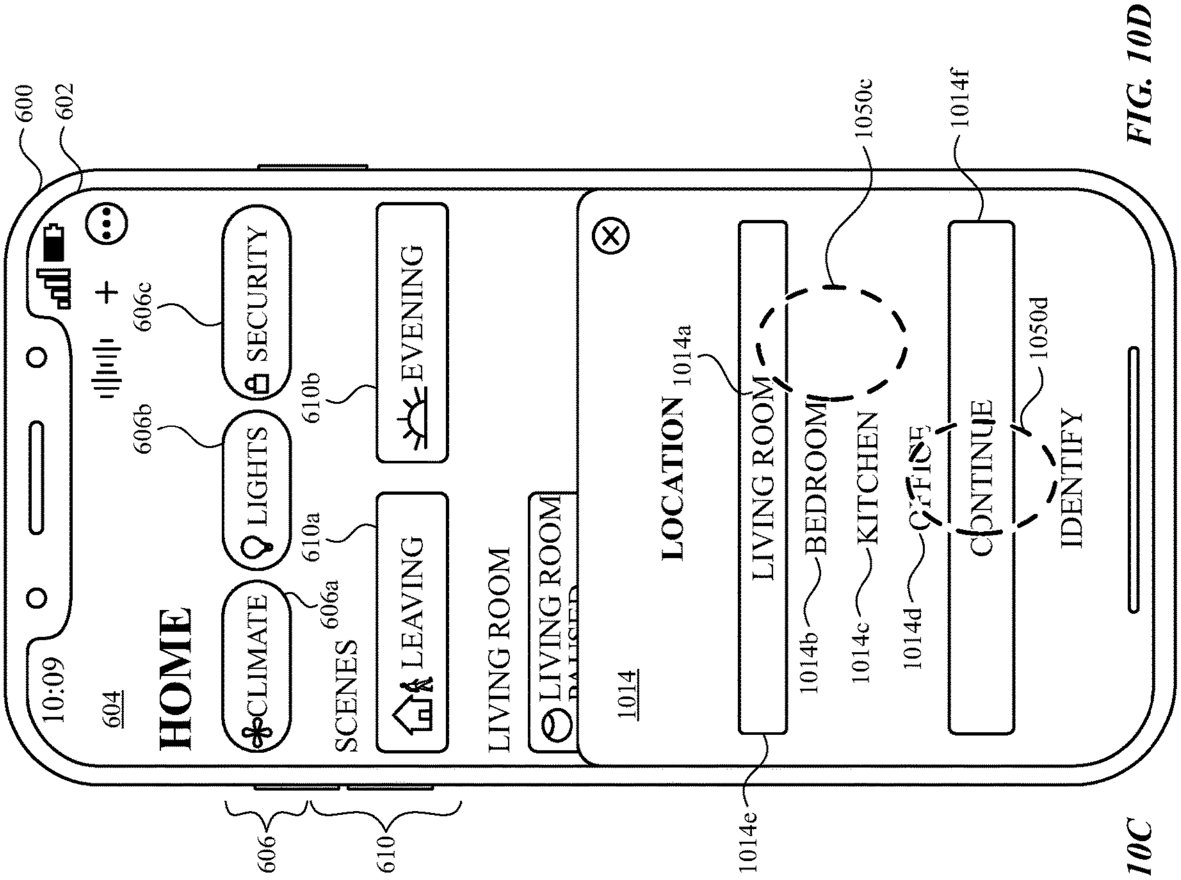
Figure 10C:
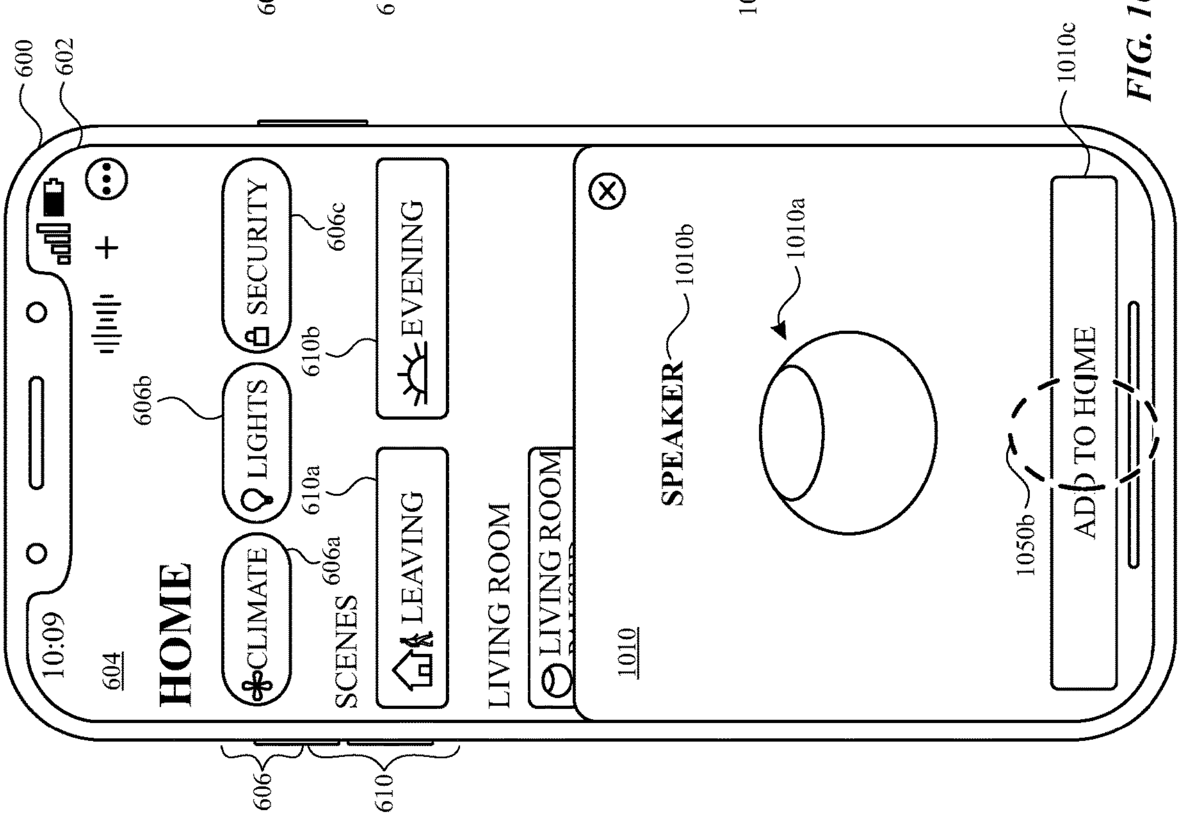

At FIG. 10C, first accessory user interface 1010 includes visual representation 1010*a* of the second speaker accessory device that has been detected by electronic device 600 (e.g., via code 1008 and/or via a proximity to the accessory device), identifier 1010*b* of the second speaker accessory device that has been detected by electronic device 600, and add user interface object 1010*c*. Visual representation 1010*a* includes an image of a type of accessory device detected by electronic device 600. For example, at FIG. 10C, visual representation 1010*a* includes an image representative of the second speaker accessory device. In some embodiments, visual representation 1010*a* corresponds to a type of accessory that electronic device 600 detects via code 1008 and/or via establishing a wireless communication with the accessory device. In some embodiments, visual representation 1010*a* includes a generic image corresponding to a type of accessory device detected by electronic device 600. At FIG. 10C, identifier 1010*b* (e.g., "Speaker") includes a description of the accessory device and/or a type of accessory device.

At FIG. 10C, electronic device 600 detects user input 1050*b* (e.g., a tap gesture or other selection/navigation input) corresponding to selection of add user interface object 1010*c*. In response to detecting user input 1050*b*, electronic device 600 displays room user interface 1014, as shown at FIG. 10D.

At FIG. 10D, room user interface 1014 enables electronic device 600 to associate the second speaker accessory device with a room of the location associated with the home automation system. At FIG. 10D, room user interface 1014 includes first room indicator 1014*a* (e.g., "Living Room"), second room indicator 1014*b* (e.g., "Bedroom"), third room indicator 1014*c* (e.g., "Kitchen"), and fourth room indicator 1014*d* (e.g., "Office"). At FIG. 10D, electronic device 600 displays focus indicator 1014*e* (e.g., a box and/or border) around first room indicator 1014*a*. In response to detecting user input corresponding to continue user interface object 1014*f*, electronic device 600 associates the second speaker accessory device with the room of the home corresponding to first room indicator 1014*a* (e.g., the "Living Room"). In some embodiments, electronic device 600 is configured to display focus indicator 1014*e* around one of room indicators 1014*b*-1014*d* instead of around first room indicator 1014*a*. For instance, in response to detecting user input 1050*c* (e.g., a tap gesture or other selection/navigation input) corresponding to selection of second room indicator 1014*b*, electronic device 600 displays focus indicator 1014*e* around second room indicator 1014*b*.

In some embodiments, room indicators 1014*a*-1014*d* correspond to rooms of the location associated with the home automation system that have been created via user input (e.g., electronic device 600 detects one or more user inputs that cause electronic device 600 to include a room and/or area of the location that can be associated with one or more accessory devices that are added to the home automation system). In some embodiments, room indicators 1014*a*-1014*d* are generated by electronic device 600 as suggested rooms for which to associate the second speaker accessory device (e.g., default rooms that are associated with the home when the home automation system is created by electronic device 600 and/or another electronic device).

Figure 10F:
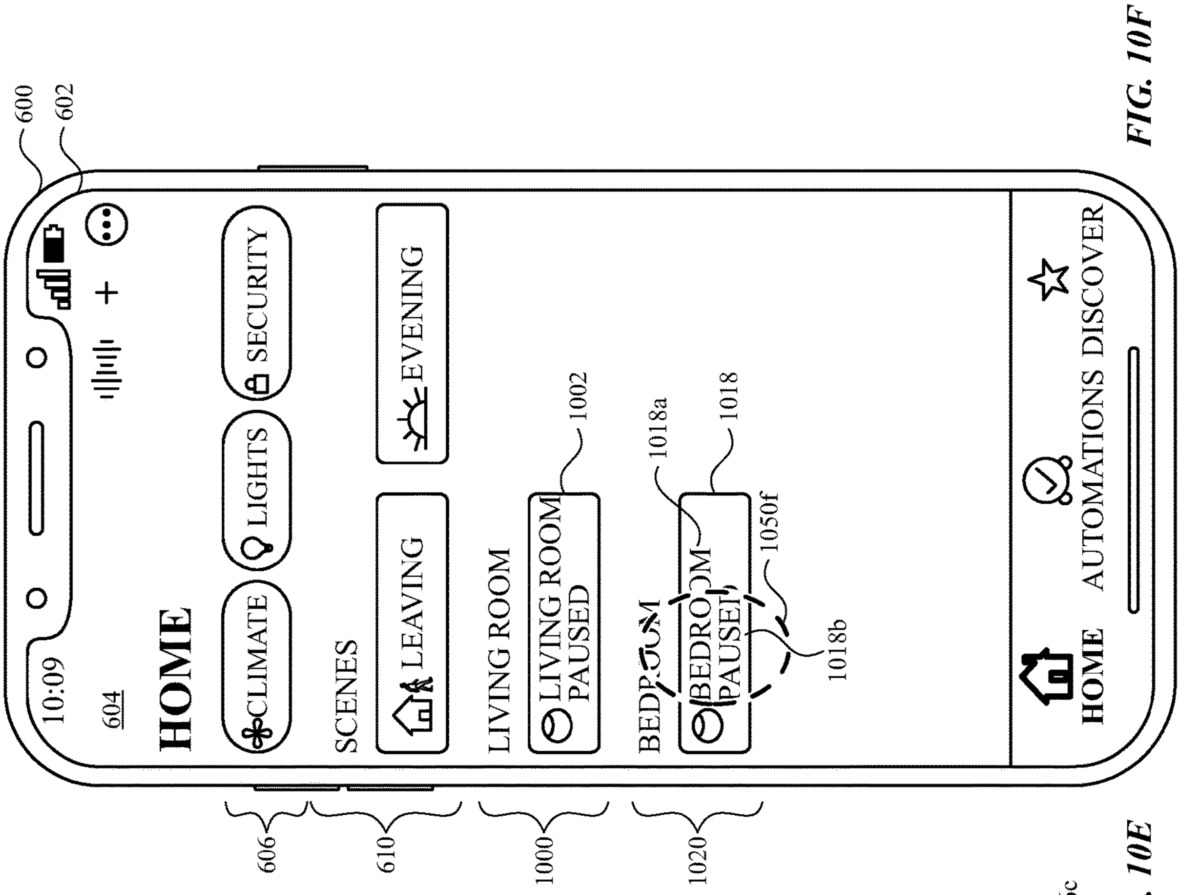
Figure 10E:
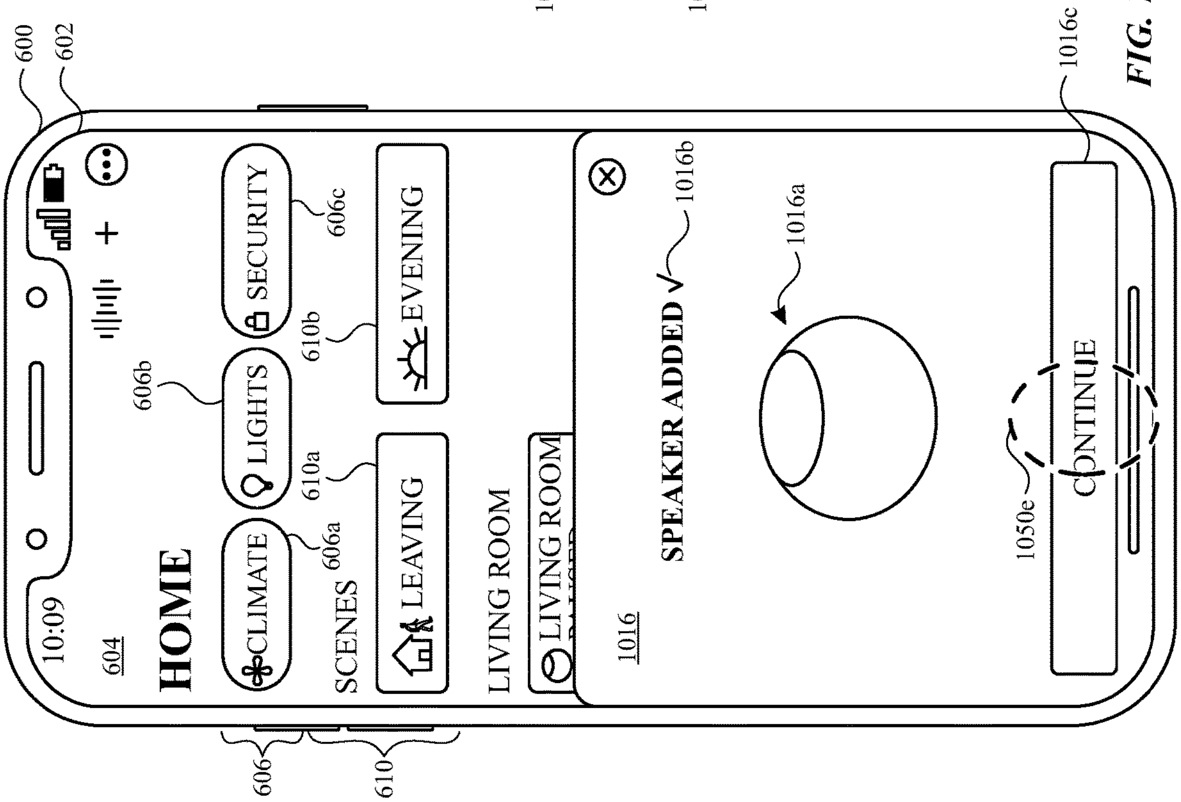

At FIG. 10D, electronic device 600 detects user input 1050*d* (e.g., a tap gesture or other selection/navigation input) corresponding to selection of continue user interface object 1014*f* (e.g., continue user interface affordance 10140. In response to detecting user input 1050*d* when focus indicator 1014*e* is around first room indicator 1014*a*, electronic device 600 associates the second speaker accessory device with the living room of the location and displays confirmation user interface 1016, as shown at FIG. 10E. After electronic device 600 associates the second speaker accessory device with the living room of the location, electronic device 600 determines that another speaker accessory device is associated with the living room of the location (e.g., the first speaker accessory device associated with first accessory user interface object 1002). Based on the determination that another speaker accessory device is associated with the living room of the location, electronic device 600 creates an accessory group that includes the second speaker accessory device and the first speaker accessory device associated with first accessory user interface object 1002, as set forth below with reference to FIGS. 10W-10AA. In some embodiments, the accessory group enables multiple accessory devices to operate and/or perform a function in conjunction with one another. For instance, when the accessory group includes multiple speaker accessory devices, electronic device 600 is configured to cause the speaker accessory devices to output (e.g., concurrently output) the same audio content and/or audio content from the same media file.

In response to detecting user input 1050*d* when focus indicator 1014*e* is around second room indicator 1014*b* (e.g., after detecting user input 1050*c*), electronic device 600 associates the second speaker accessory device with the bedroom of the location and displays confirmation user interface 1016, as shown at FIG. 10E. After electronic device 600 associates the second speaker accessory device with the bedroom of the location, electronic device 600 determines that another speaker accessory device is not associated with the bedroom of the location. Based on the determination that another speaker accessory device is not associated with the bedroom of the location, electronic device 600 adds the second speaker accessory device to the home automation system, but does not create an accessory group with another accessory device of the home automation system. When electronic device 600 does not create the accessory group, electronic device 600 enables the second speaker accessory device to be controlled independently from other accessory devices of the home automation system. For example, adjusting an operating state of the second speaker accessory device does not adjust and/or affect an operating state of another accessory device of the home automation system.

At FIG. 10E, confirmation user interface 1016 includes visual representation 1016*a* of the second speaker accessory device, confirmation indicator 1016*b*, and continue user interface object 1016*c*. As set forth above, visual representation 1016*a* of the second speaker accessory device includes an image representative of the second speaker accessory device. Confirmation indicator 1016*b* includes a visual representation indicating that electronic device 600 successfully added the second speaker accessory device to the home automation system. At FIG. 10E, electronic device 600 detects user input 1050*e* (e.g., a tap gesture or other selection navigation input) corresponding to continue user interface object 1016*c*. In response to detecting user input 1050*e* and when the second speaker accessory device was associated with the bedroom of the location associated with the home automation system (e.g., focus indicator 1014*e* was around second room indicator 1014*b* at FIG. 10D), electronic device 600 displays home user interface 604, as shown at FIG. 10F. In response to detecting user input 1050*e* and when the second speaker accessory device was associated with the living room of the location associated with the home automation system (e.g., focus indicator 1014*e* was around first room indicator 1014*a* at FIG. 10D), electronic device 600 displays home user interface 604, as shown at FIG.

At FIG. 10F, home user interface 604 includes first accessory user interface object 1002 in living room region 1000 and second accessory user interface object 1018 in bedroom region 1020. Second accessory user interface object 1018 corresponds to the second speaker accessory device that electronic device 600 detected and configured as described above with reference to FIGS. 10A-10E. At FIG. 10F, second accessory user interface object 1018 includes identifier 1018*a* (e.g., "Bedroom") and status indicator 1018*b* (e.g., "Paused"). Second accessory user interface object 1018 thus includes visual indications providing information (e.g., a current mode, such as "Paused") related to the second speaker accessory device corresponding to second accessory user interface object 1018.

As set forth above, electronic device 600 did not create an accessory group that includes the second speaker accessory device associated with second accessory user interface object 1018 because another speaker accessory device (and/or another accessory device) was not associated with the bedroom of the location associated with the home automation system. Accordingly, at FIG. 10F, electronic device 600 displays separate accessory user interface objects for the first speaker accessory device associated with the living room and the second speaker accessory device associated with the bedroom.

At FIG. 10F, electronic device 600 detects user input 1050*f* (e.g., a tap gesture or other selection/navigation input) corresponding to selection of second accessory user interface object 1018. In response to detecting user input 1050*f*, electronic device 600 displays accessory settings user interface 1022, as shown at FIG. 10G.

Figure 10H:
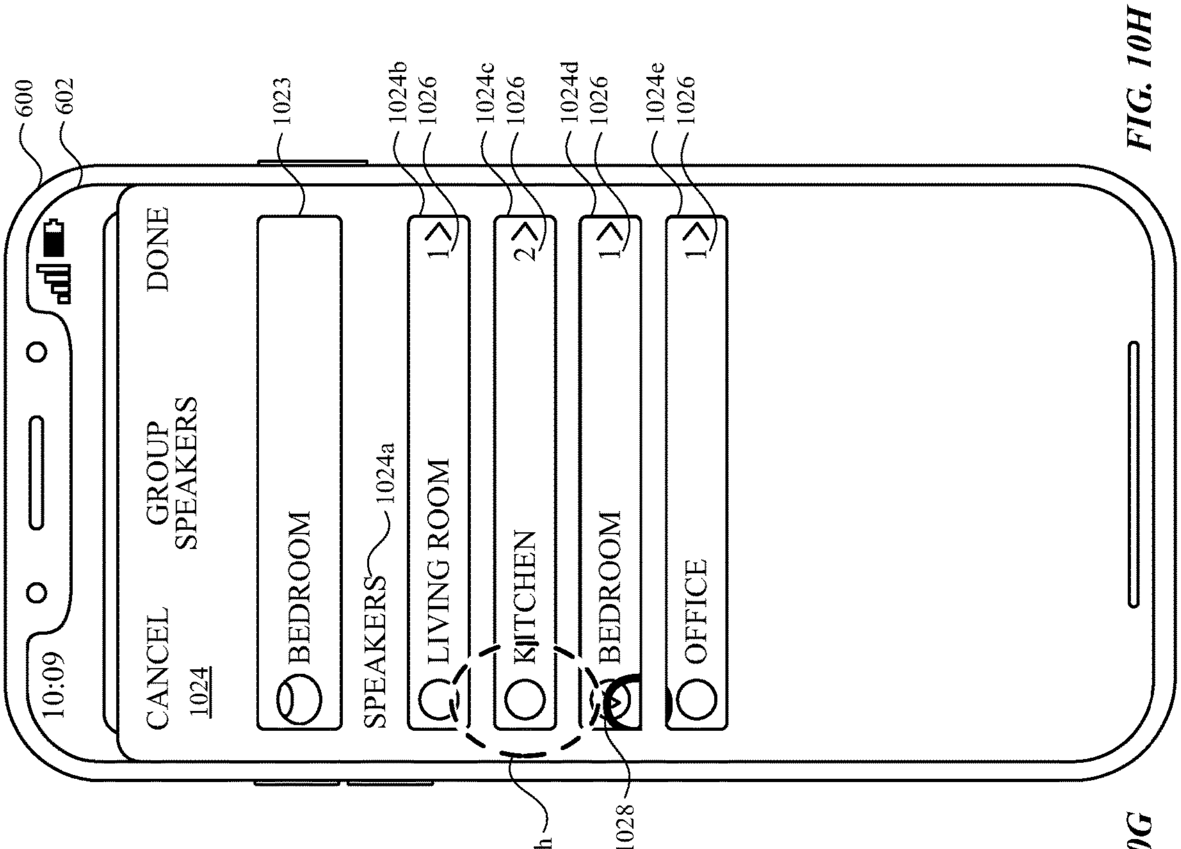
Figure 10G:
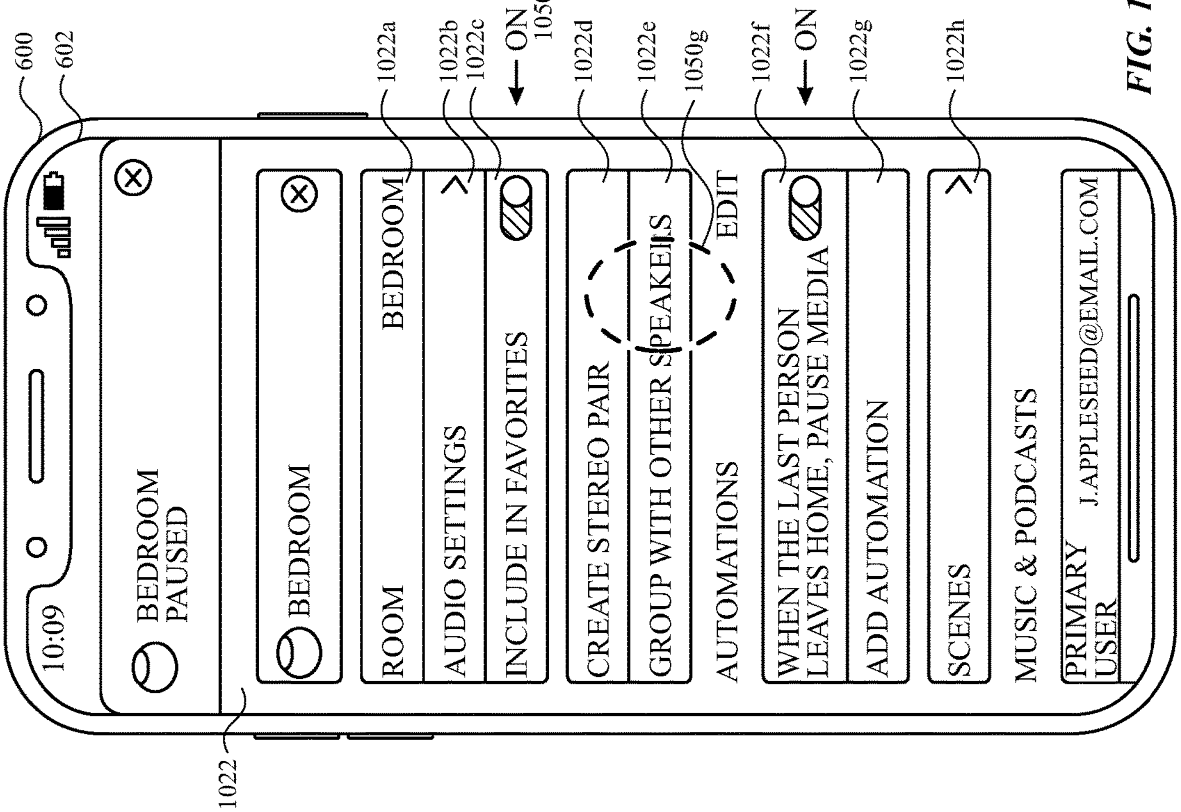

At FIG. 10G, accessory settings user interface 1022 enables electronic device 600 to adjust and/or configure settings of the second speaker accessory device associated with second accessory user interface object 1018. For instance, accessory settings user interface 1022 includes room user interface object 1022*a*, audio settings user interface object 1022*b*, favorites user interface object 1022*c*, stereo pair user interface object 1022*d*, group user interface object 1022*e*, and automation user interface objects 1022*f*-1022*h*. In some embodiments, in response to selection of room user interface object 1022*a*, electronic device 600 is configured to adjust, change, and/or modify a room with which the second speaker accessory device is associated (e.g., change the associated room from bedroom to a different room in the location associated with the home automation system). In some embodiments, in response to selection of audio settings user interface object 1022*b*, electronic device 600 is configured to adjust, change, and/or modify one or more audio output settings of the second speaker accessory device (e.g., volume settings, bass settings, treble settings, and/or balance settings). In some embodiments, in response to detecting selection of favorites user interface object 1022*c*, electronic device 600 is configured to display or not display a user interface object corresponding to the second speaker accessory devices in a favorites region (e.g., favorites region 672) of home user interface 604.

As set forth below with reference to FIGS. 10X-10AA, stereo pair user interface object 1022*d* enables electronic device 600 to create a stereo pair that includes the second speaker accessory device and another speaker accessory device of the home automation system. In some embodiments, a stereo pair includes a left speaker accessory device that outputs a left channel of audio output and a right speaker accessory device that outputs a right channel of audio output. Group user interface object 1022*e* enables electronic device 600 to create an accessory group and/or add the second speaker accessory device to an existing accessory group, such that accessory devices of the accessory group output content, such as audio output, in conjunction with one another. Automation user interface objects 1022*f*-1022*h* enable electronic device 600 control and/or adjust an operating state of the second speaker accessory device when electronic device 600 detects an occurrence of an event, such as location information that indicates that electronic device 600 is not at the location associated with the home automation system, a current time of day is at a predefined time of day, and/or user inputs requesting to change the operating state of the second speaker accessory device.

At FIG. 10G, electronic device 600 detects user input 1050*g* (e.g., a tap gesture or other selection/navigation input) corresponding to selection of group user interface object 1022*e*. In response to detecting user input 1050*g*, electronic device 600 displays group user interface 1024, as shown at FIG. 10H.

At FIG. 10H, group user interface 1024 includes group indicator 1023 (e.g., "BEDROOM") that provides a name and/or identification of which speaker accessory devices and/or rooms associated with speaker accessory devices are to be included in the new accessory group. Group user interface 1024 also includes a list of accessory devices of the home automation system that can be selected to form an accessory group with the second speaker accessory device. At FIG. 10H, group user interface 1024 organizes and/or arranges the list of accessory devices by device type and by room. For instance, group user interface 1024 includes device type indicator 1024*a*, which indicates that the list of accessory devices correspond to speaker accessory devices. In some embodiments, group user interface 1024 includes additional device type indicators that enable the second speaker accessory device to be grouped with accessory devices of different types (e.g., televisions and/or other devices that can output audio).

At FIG. 10H, group user interface 1024 includes room indicators 1024*b*-1024*e*, which further arranges and/or organizes the list of accessory devices by room of the location associated with the home automation system. Room indicators 1024*b*-1024*e* include a device number indicator 1026, which provides a visual indication as to how many speaker accessory devices are associated with and/or included in the respective room associated with room indicators 1024*b*-1024*e*. As set forth below, room indicators 1024*b*-1024*e* can be expanded to display the respective speaker accessory devices that are associated with and/or included in room indicators 1024*b*-1024*e*. As such, a user of electronic device 600 can select individual speaker accessory devices to group with the second speaker accessory devices without having to select all of the speaker accessory devices associated with and/or included in a respective room indicator 1024*b*-1024*e*.

In response to detecting user input corresponding to one or more of room indicators 1024*b*-1024*e*, electronic device 600 selects the speaker accessory devices associated with and/or included in the selected room indicator to group with the second speaker accessory device. At FIG. 10H, electronic device 600 displays selection indicator 1028 on room indicator 1024*d* because room indicator 1024*d* corresponds to the room of the second speaker accessory device and the second speaker accessory device is the only speaker accessory device associated with and/or included in room indicator 1024*d*.

At FIG. 10H, electronic device 600 detects user input 1050*h* (e.g., a tap gesture or other selection/navigation input) corresponding to room indicator 1024*c*. In response to detecting user input 1050*h*, electronic device selects the speaker accessory devices associated with and/or included in room indicator 1024*c* for grouping with the second speaker accessory, as shown at FIG. 10I.

Figure 10J:
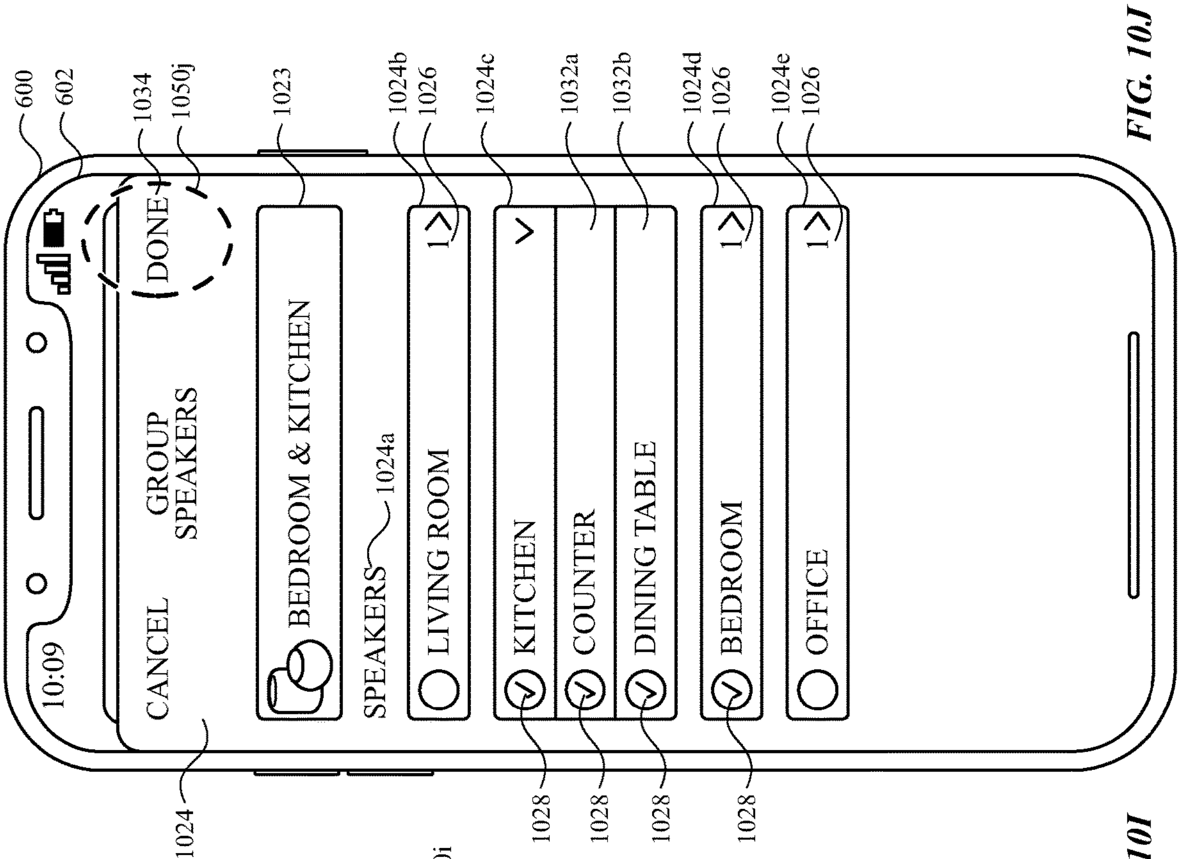
Figure 10I:
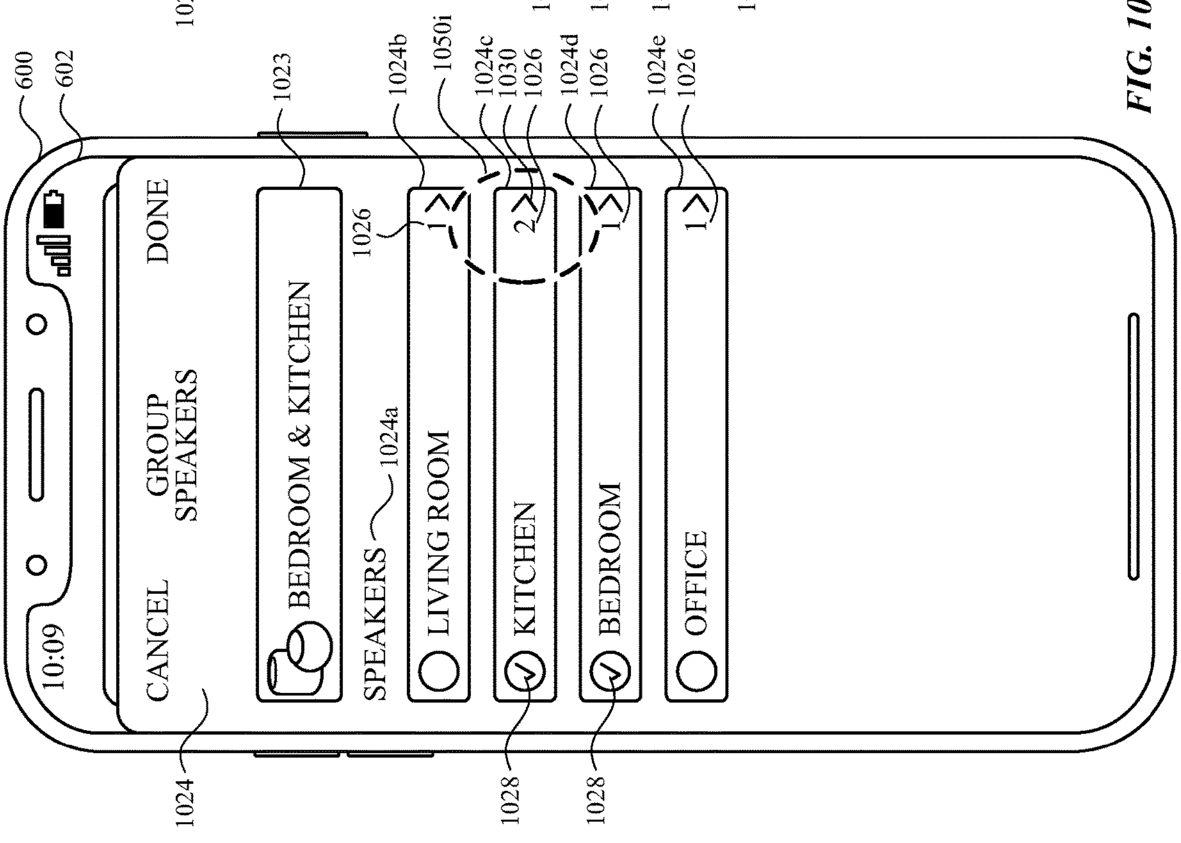

At FIG. 10I, electronic device 600 display selection indicator 1028 on room indicator 1024*c* to confirm that user input 1050*h* was received and that electronic device 600 selected the speaker accessory devices associated with and/or included in room indicator 1024*c*. Electronic device 600 updates group indicator 1023 (e.g., "BEDROOM & KITCHEN") to indicate that room indicator 1024*c* was selected. For instance, at FIG. 10I, group indicator 1023 indicates that electronic device 600 is configured to create an accessory group with speaker accessory devices located in both the bedroom and the kitchen of the location associated with the home automation system.

At FIG. 10I, electronic device 600 detects user input 1050*i* (e.g., a tap gesture or other selection/navigation input) corresponding to expand user interface object 1030 of room indicator 1024*c*. In response to detecting user input 1050*i*, electronic device 600 expands room indicator 1024*c* to show the speaker accessory devices associated with room indicator 1024*c*, as shown at FIG. 10J.

At FIG. 10J, electronic device 600 displays counter speaker user interface object 1032*a* and dining table user interface object 1032*b* within room indicator 1024*c*. As such, electronic device 600 is able to allow a user to select (or deselect) individual speaker accessory devices within room indicator 1024*c*. At FIG. 10J, both counter speaker user interface object 1032*a* and dining table user interface object 1032*b* include selection indicator 1028 indicating that a counter speaker accessory device associated with counter speaker user interface object 1032*a* and a dining table speaker accessory device associated with dining table user interface object 1032*b* are selected to group with the second speaker accessory device. As such, in response to detecting user input 1050*h*, electronic device 600 selects all of the speaker accessory devices associated with room indicator 1024*c* for grouping with second speaker accessory device. In some embodiments, in response to detecting user input corresponding to selection of counter speaker user interface object 1032*a* and/or dining table user interface object 1032*b*, electronic device deselects the selected user interface object and ceases displaying selection indicator 1028. Thus, a user of electronic device 600 can easily choose which speaker accessory devices to group with the second speaker accessory device.

At FIG. 10J, electronic device 600 detects user input 1050*j* (e.g., a tap gesture or other selection/navigation input) corresponding to selection of done user interface object 1034 of group user interface 1024. In response to detecting user input 1050*j*, electronic device 600 creates the accessory group, which includes the second speaker accessory device and the speaker accessory devices associated with room indicator 1024*c* (e.g., counter speaker accessory device and dining table speaker accessory device).

Figure 10L:
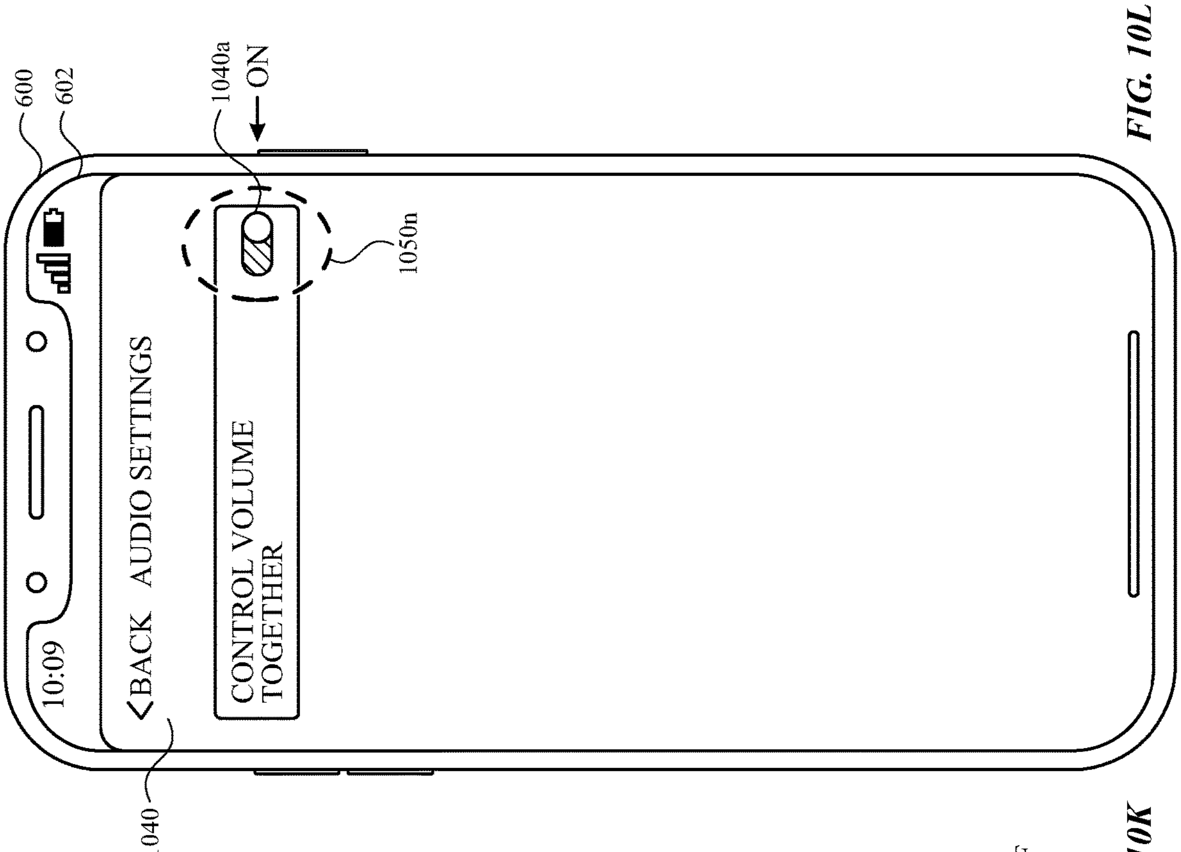
Figure 10K:
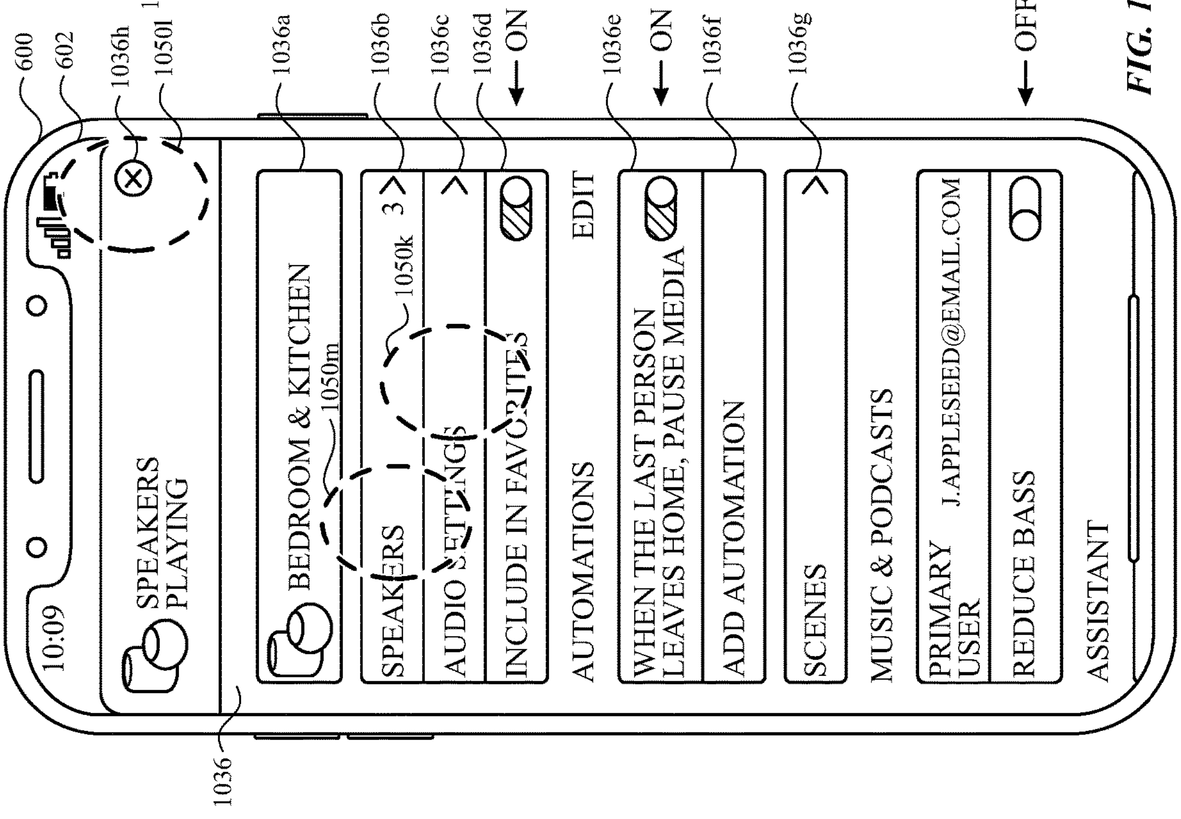

After creating the accessory group, electronic device 600 displays group settings user interface 1036, as shown at FIG. 10K. At FIG. 10K, group settings user interface 1036 includes group indicator 1036*a* (e.g., "BEDROOM & SPEAKER"), which is based on group indicator 1023 of group user interface 1024. Group settings user interface 1036 enables electronic device 600 to adjust and/or modify one or more settings of the accessory group that includes the second speaker accessory device and the kitchen speaker accessory devices. For example, group settings user interface 1036 enables electronic device 600 to concurrently adjust and/or modify settings for the accessory devices (e.g., all of the accessory devices) included in the accessory group. At FIG. 10K, group settings user interface 1036 includes speaker user interface object 1036*b*, audio settings user interface object 1036*c*, favorites user interface object 1036*d*, and automations user interface objects 1036*e*-1036*g*.

Figures 10M, 10N:
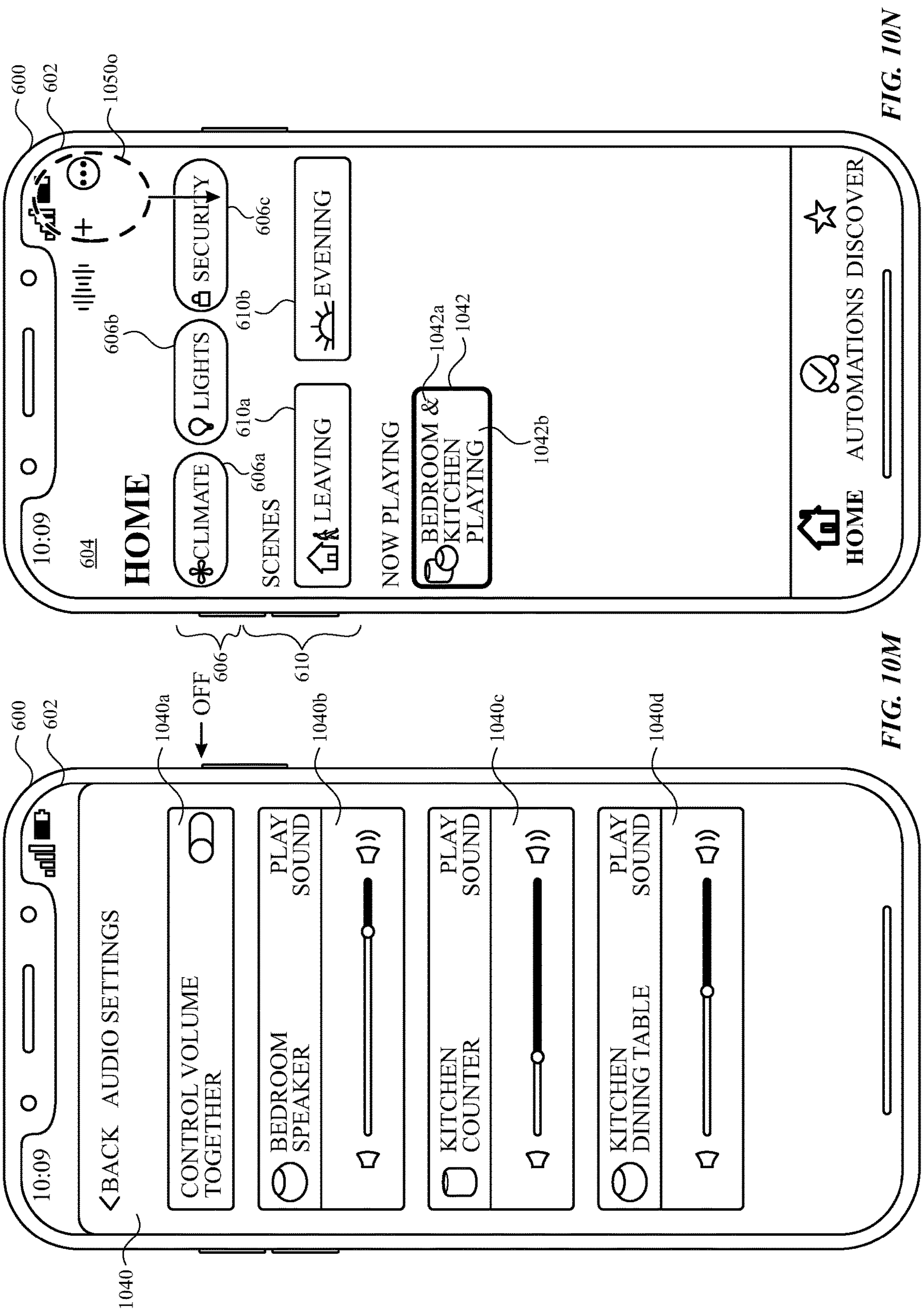
Figure 10P:
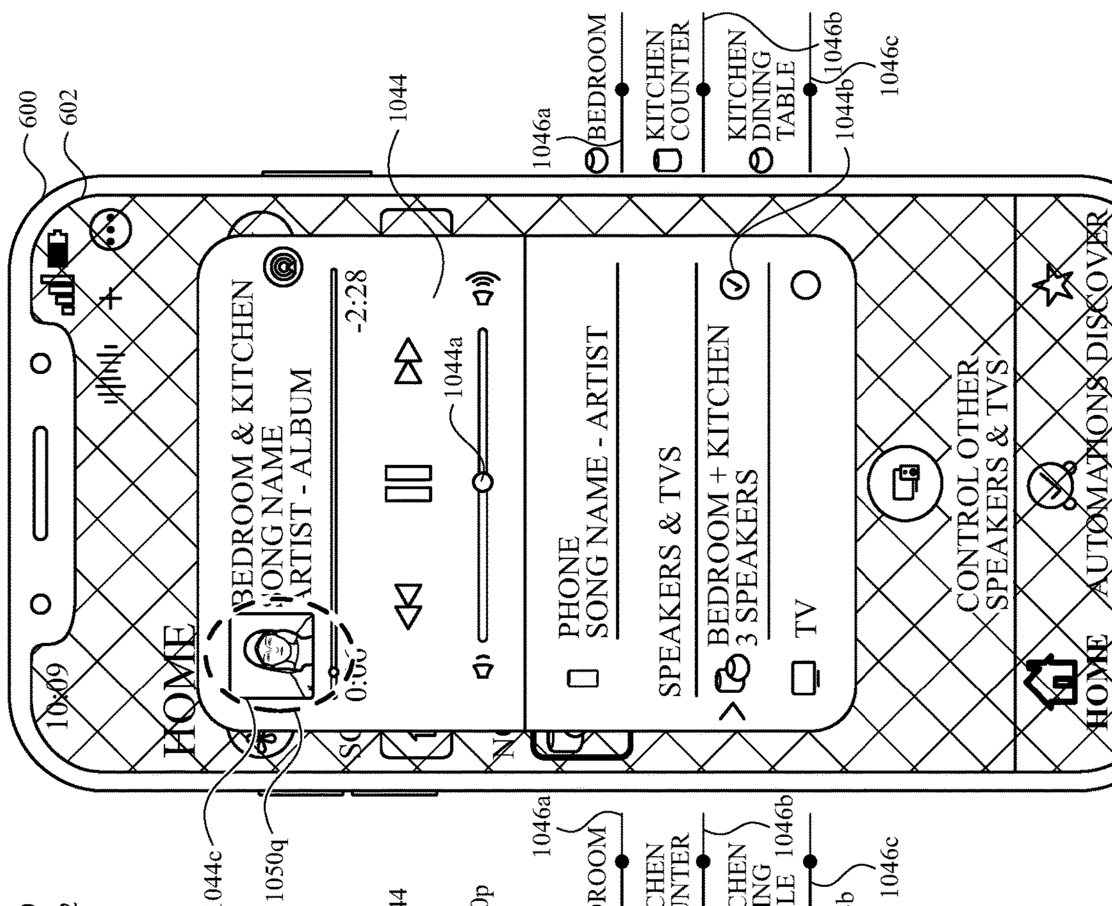
Figure 10O:
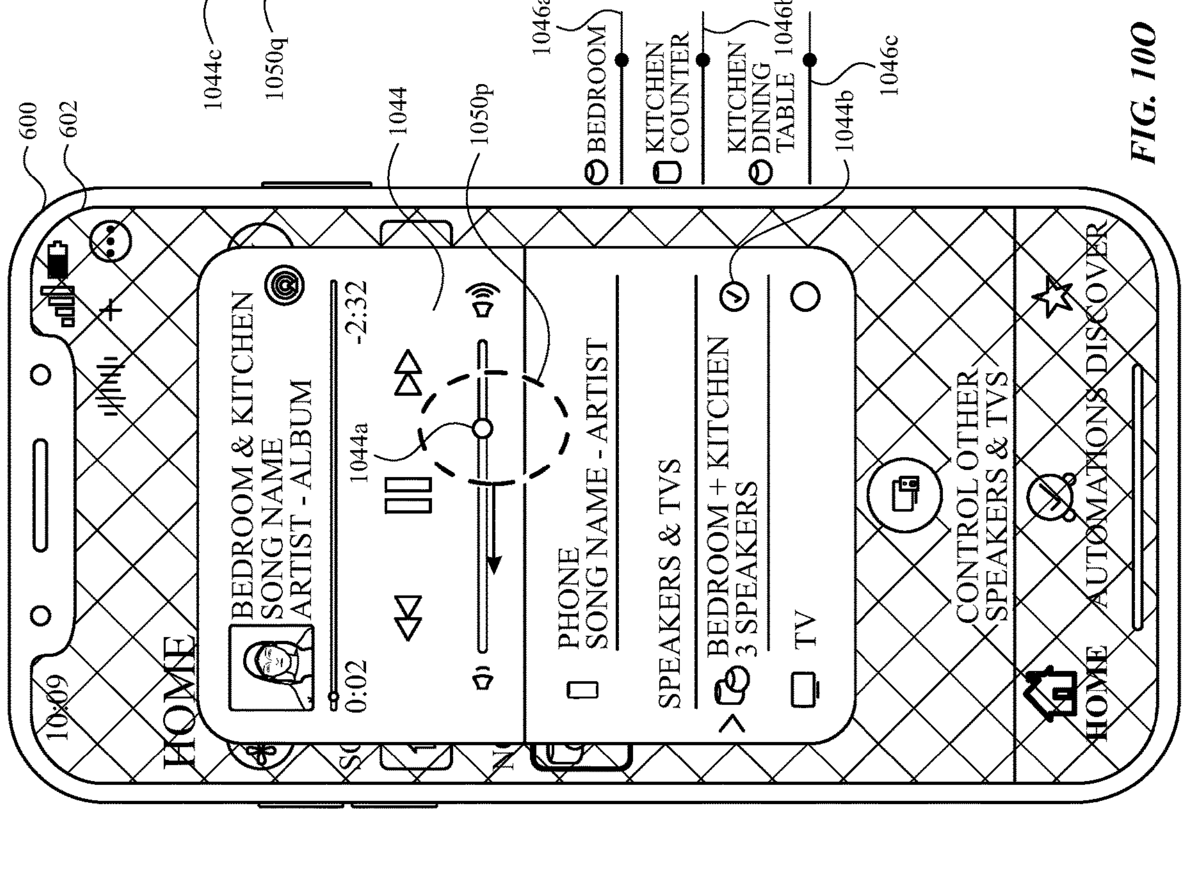
Figure 10R:
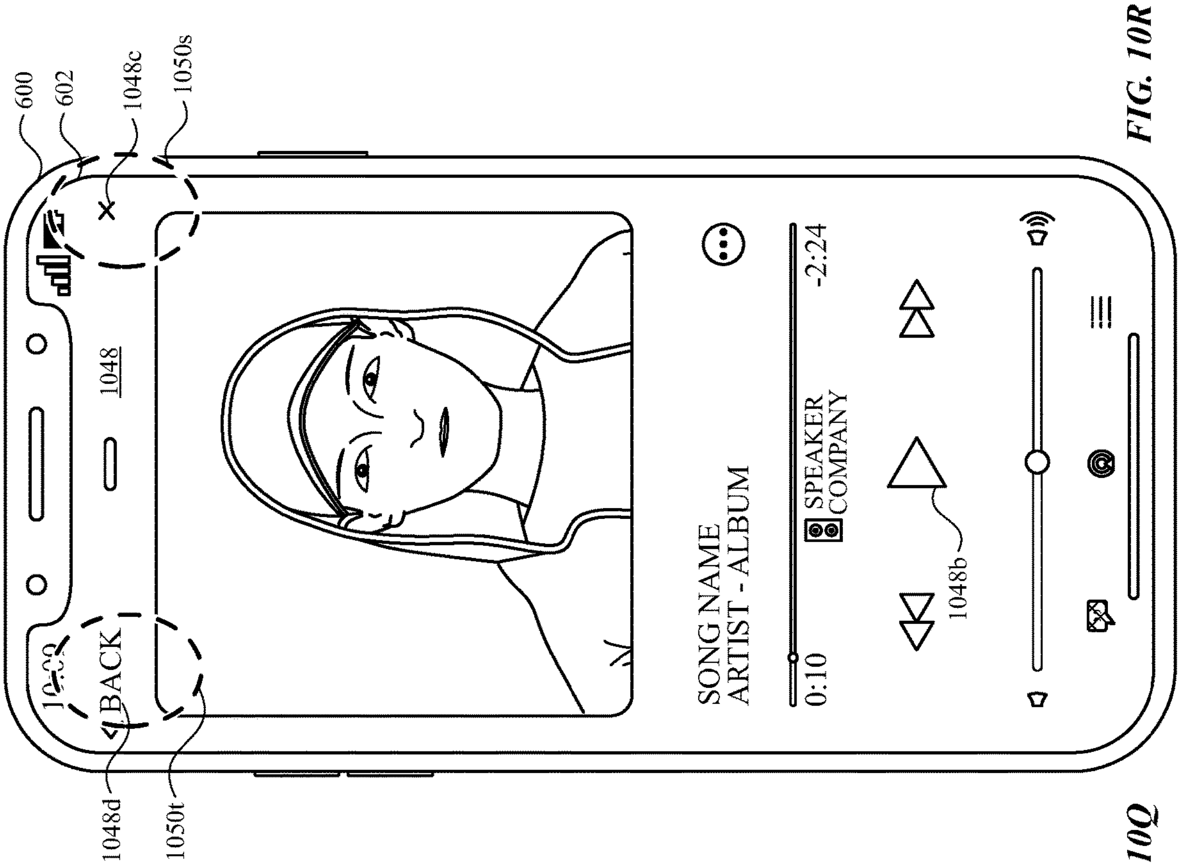
Figure 10Q:
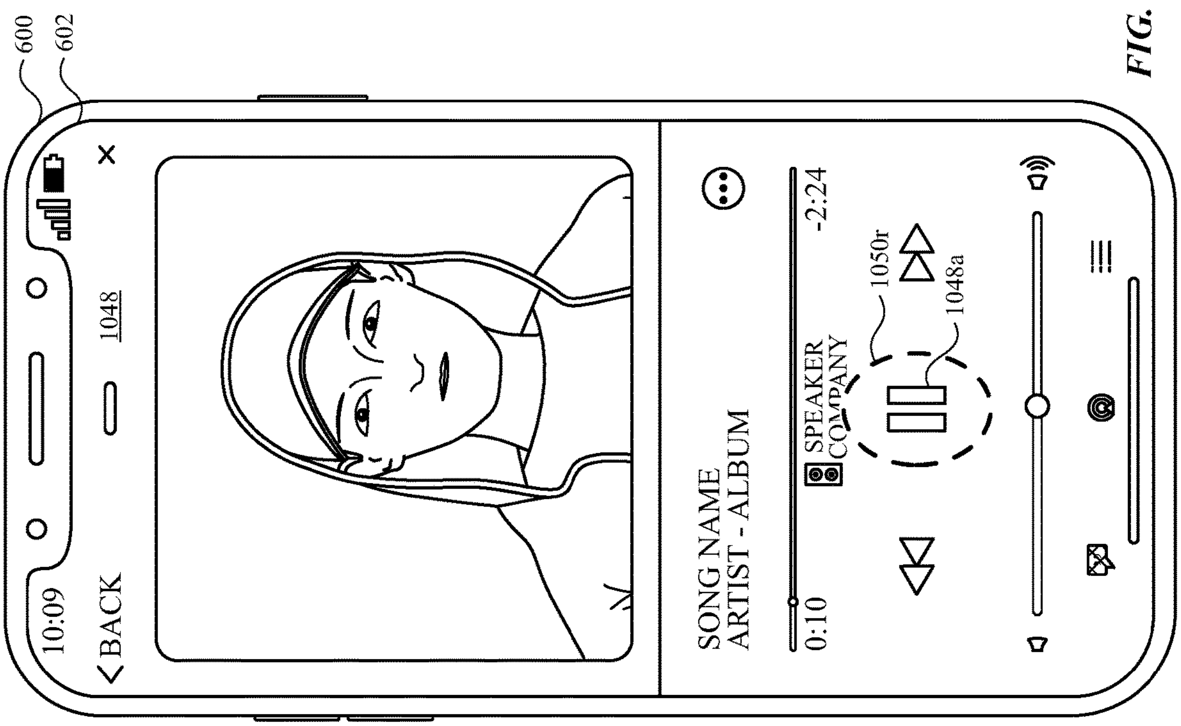
Figure 10S:
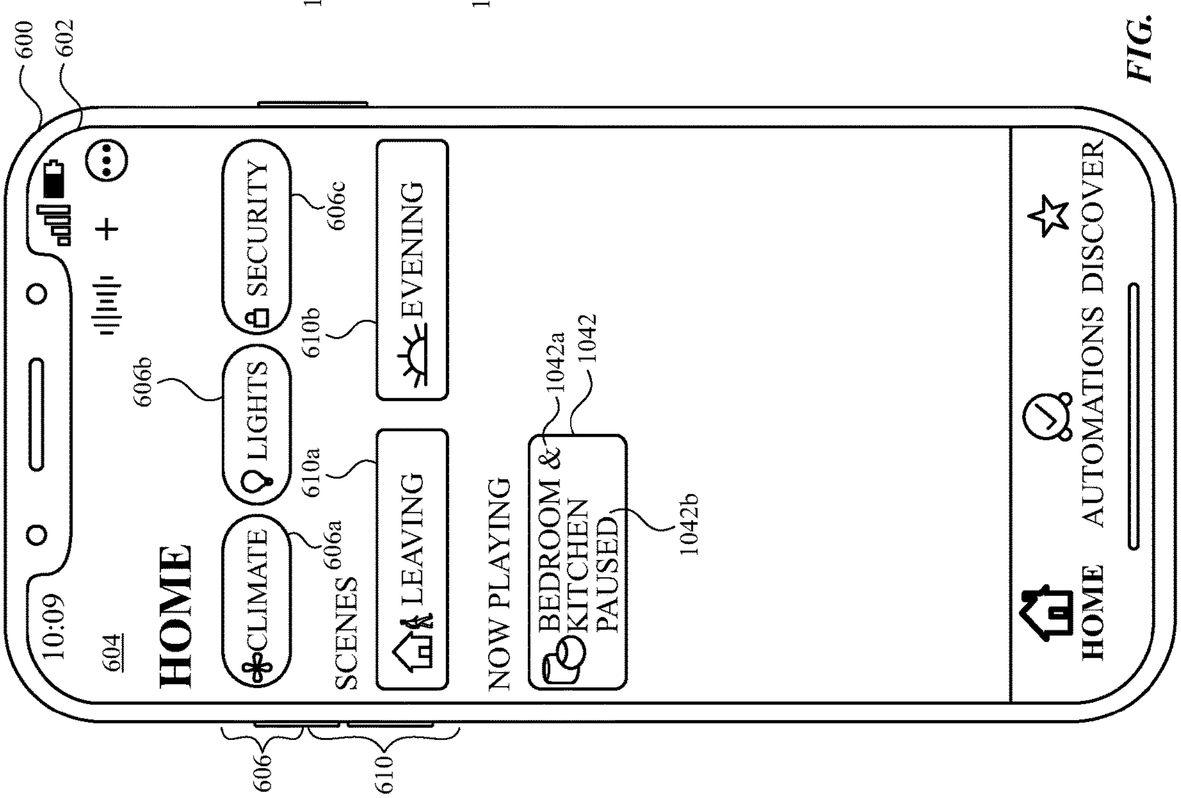
Figure 10T:
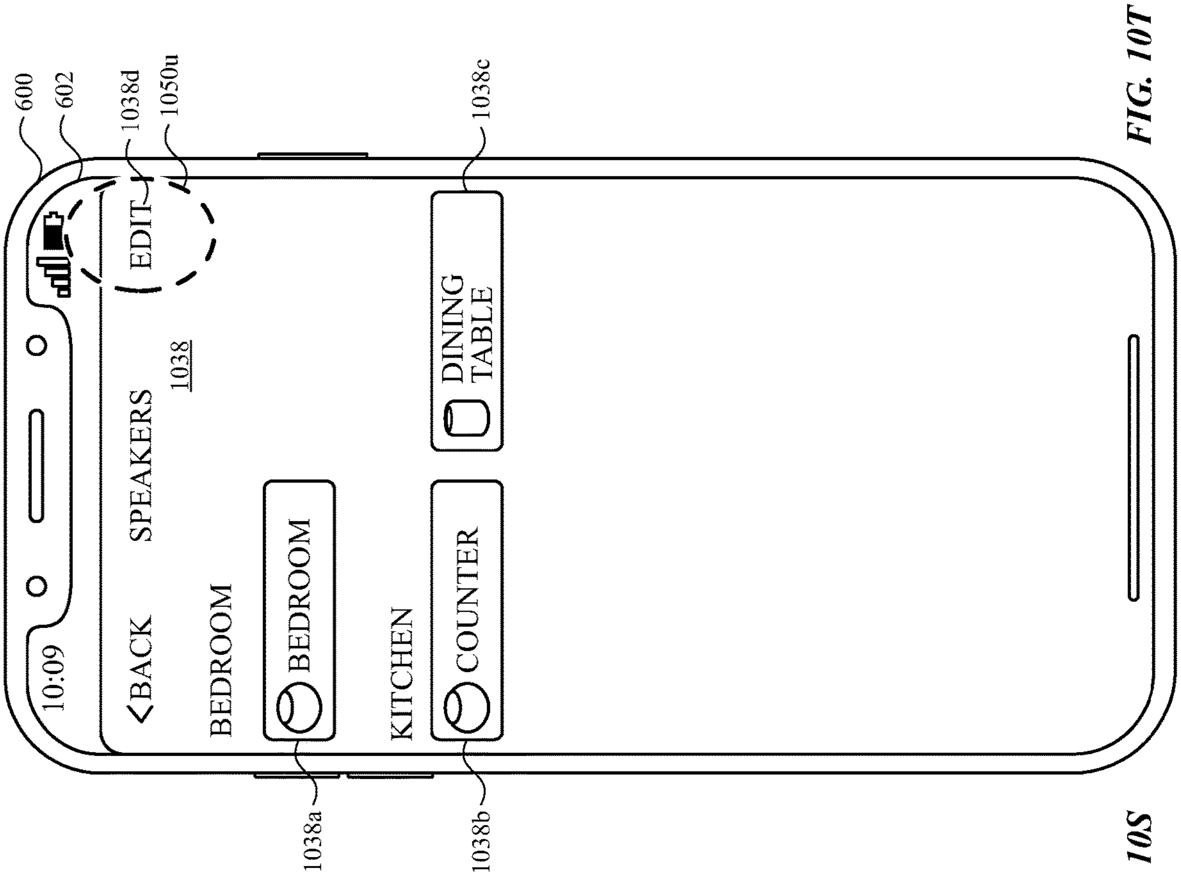

As set forth below, in response to detecting user input (e.g., user input 1050*m*) corresponding to speaker user interface object 1036*b*, electronic device 600 displays group accessories user interface 1038, as shown at FIG. 10T. Group accessories user interface 1038 includes accessory user interface objects 1038*a*-1038*c* corresponding to the accessory devices in the accessory group. In some embodiments, group accessories user interface 1038 includes accessory user interface objects for all accessory devices in the accessory group. As set forth below, audio settings user interface object 1036*c* enables electronic device 600 to control and/or adjust audio settings of the accessory devices in the group either together or independent of one another. Favorites user interface object 1036*d* enables electronic device 600 to either display or not display a user interface object corresponding to the accessory group in a favorites region (e.g., favorites region 672) of home user interface 604. Automations user interface objects 1036*e*-1036*g* enable electronic device 600 to control and/or adjust an operating state of the accessory group when electronic device 600 detects an occurrence of an event, such as location information that indicates that electronic device 600 is not at the location associated with the home automation system, a current time of day is at a predefined time of day, and/or user inputs requesting to change the operating state of the accessory group.

At FIG. 10K, electronic device detects user input 1050*k* (e.g., a tap gesture or other selection/navigation input) corresponding to audio settings user interface object 1036*c*. In response to detecting user input 1050*k*, electronic device 600 displays first audio settings user interface 1040, as shown at FIG. 10L. Additionally or alternatively, electronic device 600 detects user input 1050*l* (e.g., a tap gesture or other selection navigation input) corresponding to exit user interface object 1036*h* of group settings user interface 1036. In response to detecting user input 1050*l*, electronic device 600 displays home user interface 604, as shown at FIG. 10N. Additionally or alternatively, electronic device 600 detects user input 1050*m* (e.g., a tap gesture or other navigation/selection input) corresponding to selection of speaker user interface object 1036*b*. In response to detecting user input 1050*m*, electronic device 600 displays group accessories user interface 1038, as shown at FIG. 10T.

At FIG. 10L, first audio settings user interface 1040 includes volume control user interface object 1040*a*. At FIG. 10L, volume control user interface object 1040*a* is in an active and/or on state, indicating that electronic device 600 is configured to synchronize a volume adjustment for all accessory devices of the accessory group. For example, when volume control user interface object 1040*a* is in the active and/or on position and electronic device 600 receives a request to adjust volume output (e.g., a request to adjust volume output for at least one speaker accessory device of the accessory group), electronic device adjusts a volume for all of the accessory devices of the accessory group by the same amount and in the same direction (e.g., an increase in volume or a decrease in volume). At FIG. 10L, electronic device 600 detects user input 1050*n* (e.g., a tap gesture or other selection/navigation input) corresponding to volume control user interface object 1040*a*. In response to detecting user input 1050*n*, electronic device 600 causes volume control user interface object 1040*a* to transition to an inactive and/or off state, as shown at FIG. 10M.

At FIG. 10M, when volume control user interface object 1040*a* is in the inactive and/or off position, electronic device 600 does not synchronize volume adjustment of the accessory devices of the accessory group. Instead, electronic device 600 can adjust and/or control a volume level of a respective accessory device of the accessory group independently of the other accessory devices of the accessory group. For example, when volume control user interface object 1040*a* is in the inactive and/or off position and when electronic device 600 receives a request to adjust the volume of the second speaker accessory device (e.g., "bedroom speaker"), electronic device 600 causes a volume adjustment of the second speaker accessory device without adjusting the volume of the other accessory devices of the accessory group.

At FIG. 10M, after receiving user input 1050*n*, electronic device 600 displays individual volume control user interface objects 1040*b*-1040*d*. Individual volume control user interface objects 1040*b*-1040*d* enable electronic device 600 to individually and/or independently control the volume of the respective accessory devices of the accessory group. For instance, first individual volume control user interface object 1040*b* corresponds to the second speaker accessory device (e.g., "bedroom speaker"), second individual volume control user interface object 1040*c* corresponds to the counter speaker accessory device (e.g., "kitchen counter"), and third individual volume control user interface object 1040*d* corresponds to the dining table speaker accessory device (e.g., "kitchen dining table"). As such, electronic device 600 can either control the accessory devices of the accessory group together or individually based on whether volume control user interface object 1040*a* is in the active position or the inactive position. As set forth below, in some embodiments, electronic device 600 displays additional and/or different user interface objects on first audio settings user interface 1040 based on whether the accessory group includes and/or is a stereo pair.

As set forth above, in response to detecting user input 1050*l* corresponding to exit user interface object 1036*h* of group settings user interface 1036, electronic device 600 displays home user interface 604, as shown at FIG. 10N. At FIG. 10N, home user interface 604 includes accessory group user interface object 1042 and does not include second accessory user interface object 1018. In some embodiments, electronic device 600 does not display second accessory user interface object 1018 because the second speaker accessory device associated with second accessory user interface object 1018 is included in the accessory group associated with accessory group user interface object 1042. In some embodiments, when the second speaker accessory device is included in the accessory group, electronic device 600 cannot individually control and/or adjust an operating state of the second speaker accessory device, and thus, electronic device 600 does not display second accessory user interface object 1018. At FIG. 10N, accessory group user interface object 1042 includes group indicator 1042*a* (e.g., "BEDROOM & KITCHEN") and operating state indicator 1042*b* (e.g., "PLAYING"). Group indicator 1042*a* includes an icon, image, and/or symbol indicating types of accessory devices that are included in the accessory group, as well as text indicative of the name and/or identifier of the group. Operating state indicator 1042*b* provides a visual indication of a current state (e.g., on, off, playing, paused, open, closed, locked, and/or unlocked) of the accessory devices of the accessory group. At FIG. 10N, operating state indicator 1042*b* indicates that the accessory devices of the accessory group are currently outputting audio content in conjunction with one another (e.g., all accessory devices of the accessory group are outputting the same audio content and/or audio content associated with the same media (e.g., audio) file).

At FIG. 10N, electronic device 600 detects user input 1050*o* (e.g., a swipe gesture or other selection/navigation input) corresponding to home user interface 604. After detecting user input 1050*o* (and, optionally, after detecting one or more additional user inputs), electronic device 600 displays first music user interface 1044, a shown at FIG. 10O.

At FIG. 10O, first music user interface 1044 includes volume user interface object 1044*a* and output indicator 1044*b*. Output indicator 1044*b* shows that audio output is currently being played and/or output by the accessory group (e.g., as indicated by "BEDROOM+KITCHEN 3 SPEAKERS" of output indicator 1044*b*). At FIG. 10O, the accessory devices of the accessory group are currently outputting audio content at the same volume, as indicated by volume indicators 1046*a*-1046*c*. Illustrated volume indicators 1046*a*-1046 are provided for clarity, but are not part of the user interface of electronic device 600.

At FIG. 10O, electronic device 600 detects user input 1050*p* (e.g., a swipe gesture or other selection/navigation input) on volume user interface object 1044*a*. In response to detecting user input 1050*p*, electronic device 600 adjusts the volume output of all of the accessory devices of the accessory group, as shown at FIG. 10P. For instance, at FIG. 10P, volume user interface object 1044*a* has moved toward the left (e.g., relative to display 602) as compared to the position of volume user interface object 1044*a* shown at FIG. 10O. In addition, volume indicators 1046*a*-1046*c* show that the volume of audio output by the accessory devices of the accessory group has changed. At FIG. 10P, the volume of audio output by the accessory devices of the accessory group has changed by the same amount and in the same direction (e.g., decreased and/or moved to the left). Accordingly, a volume adjustment of audio output for an accessory device of the accessory group and/or for the accessory group causes the same volume adjustment for all of the accessory devices in the accessory group (e.g., when volume control user interface object 1040*a* in the active and/or on position).

At FIG. 10P, electronic device 600 detects user input 1050*q* (e.g., a tap gesture or other selection navigation input) corresponding to audio indicator 1044*c* of first music user interface 1044. In response to detecting user input 1050*q*, electronic device 600 displays second music user interface 1048, as shown at FIG. 10Q. At FIG. 10Q, electronic device 600 has launched and/or opened a music application associated with second music user interface 1048. In some embodiments, second music user interface 1048 is configured to control and/or adjust audio output by the accessory group in the same way as first music user interface 1044. At FIG. 10Q, electronic device 600 detects user input 1050*r* (e.g., a tap gesture or other selection/navigation input) corresponding to pause user interface object 1048*a* of second music user interface 1048. In response to detecting user input 1050*r*, electronic device 600 causes the accessory group to pause audio output (e.g., stop outputting audio until additional user input is detected).

At FIG. 10R, electronic device 600 displays second music user interface 1048, which includes play user interface object 1048*b* and does not include pause user interface object 1048*a*. Displaying play user interface object 1048*b* provides visual confirmation that the audio output of the accessory group has been paused and/or stopped. Accordingly, the accessory devices of the accessory group do not output audio content. At FIG. 10R, electronic device 600 detects user input 1050*s* (e.g., a tap gesture or other selection/navigation input) corresponding to exit user interface object 1048*c* of second music user interface 1048. In response to detecting user input 1050*s*, electronic device 600 closes the music application associated with second music user interface 1048. Additionally or alternatively, electronic device 600 detects user input 1050*t* (e.g., a tap gesture or other selection/navigation input) corresponding to back user interface object 1048*d* of second music user interface 1048. After detecting user input 1050*t*, electronic device 600 displays home user interface 604, as shown at FIG. 10S.

At FIG. 10S, home user interface 604 includes accessory group user interface object 1042 indicating that the accessory group is maintained after electronic device 600 detects user inputs 1050*r*, 1050*s*, and/or 1050*t*. Accordingly, even though electronic device 600 has caused the accessory group to pause and/or stop outputting audio content and/or electronic device 600 has closed the music application, electronic device 600 maintains the association between the accessory devices of the accessory group. For example, electronic device 600 does not remove and/or delete the accessory group, but maintains the association between the accessory devices of the accessory group even when electronic device 600 causes the accessory group to pause and/or stop outputting audio content.

As set forth above, in response to detecting user input 1050*m* corresponding to selection of speaker user interface object 1036*b*, electronic device 600 displays group accessories user interface 1038, as shown at FIG. 10T. At FIG. 10T, group accessories user interface 1038 includes accessory user interface objects 1038*a*-1038*c* corresponding to the respective device of the accessory group. In some embodiments, in response to detecting user input corresponding one of accessory user interface objects 1038*a*-1038*c*, electronic device 600 displays an accessory settings user interface (e.g., a user interface similar to accessory settings user interface 1022) that enables electronic device 600 to adjust and/or modify settings of the respective accessory device (e.g., independent of the other accessory devices of the accessory group). Accordingly, group accessories user interface 1038 allows a user of electronic device 600 to view the accessory devices that are included in the accessory group (e.g., the accessory group associated with accessory group user interface object 1042) and/or to access additional user interfaces for modifying and/or adjusting settings of the individual accessory devices. For instance, in some embodiments, group settings user interface 1036 enables electronic device 600 to adjust and/or modify settings for all of the accessory devices of the accessory group together, whereas an accessory settings user interface (e.g., accessory settings user interface 1022) accessed via group accessories user interface 1038, enables electronic device 600 to adjust individual settings for a respective device of the accessory group.

At FIG. 10T, electronic device 600 detects user input 1050*u* (e.g., a tap gesture or other selection/navigation input) corresponding to edit user interface object 1038*d* of group accessories user interface 1038. In response to detecting user input 1050*u*, electronic device 600 activates and/or enables an editing mode for removing accessory devices from the accessory group, as shown at FIG. 10U.

Figure 10V:
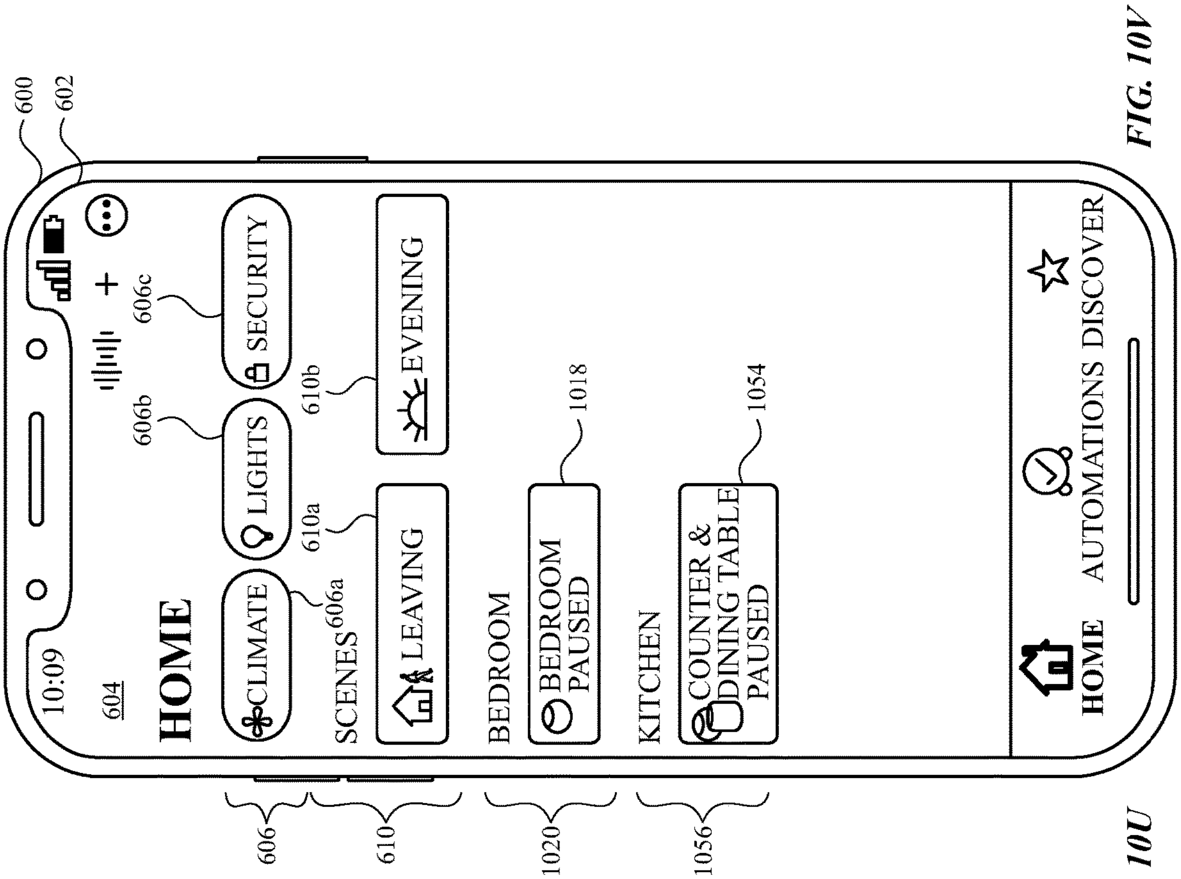
Figure 10U:
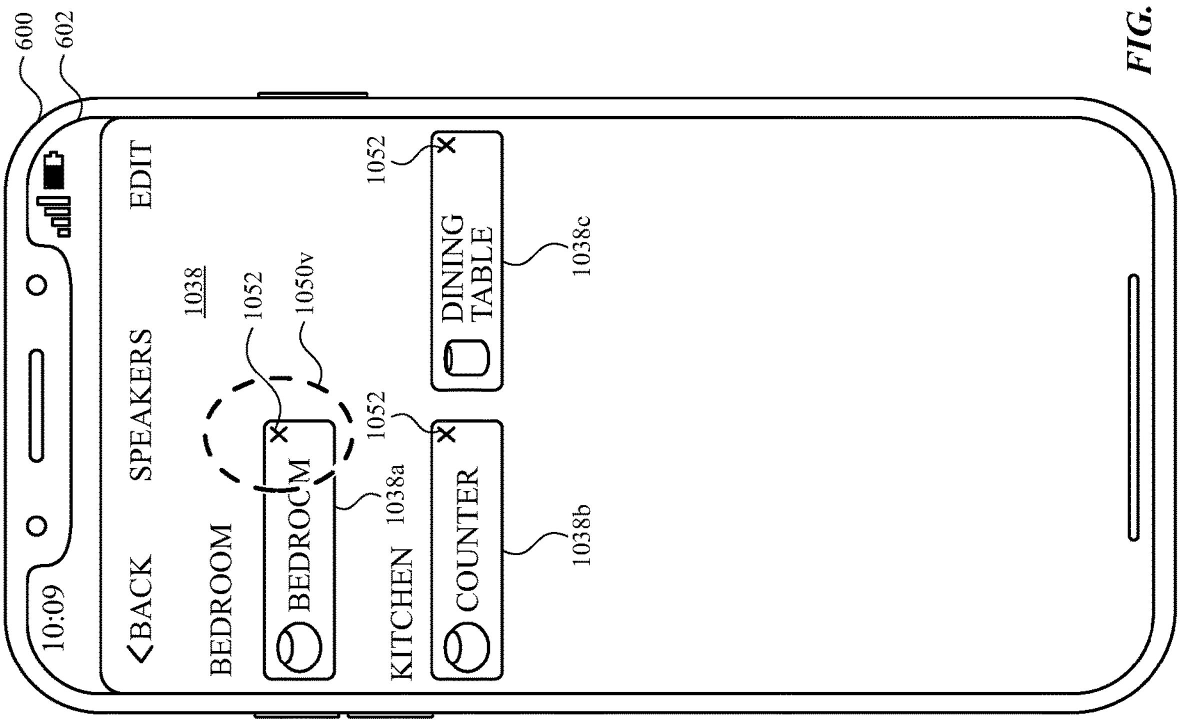

At FIG. 10U, electronic device 600 displays group accessories user interface 1038, where accessory user interface objects 1038*a*-1038*c* include remove user interface object 1052 indicating that electronic device 600 is in an editing mode. At FIG. 10U, electronic device 600 detects user input 1050*v* (e.g., a tap gesture or other selection/navigation input) corresponding to first accessory user interface object 1038*a* (e.g., remove user interface object 1052 of first accessory user interface object 1038*a*) and requesting to remove the second speaker accessory device from the accessory group. In response to detecting user input 1050*v*, electronic device 600 removes the second speaker accessory device, which corresponds to first accessory user interface object 1038*a*, from the accessory group.

After detecting user input 1050*v*, electronic device 600 displays home user interface 604, as shown at FIG. 10V. At FIG. 10V, home user interface 604 includes second accessory user interface object 1018 in bedroom region 1020 and accessory group user interface object 1054 in kitchen region 1056. Accessory group user interface object 1054 corresponds to the accessory group, which no longer includes the second speaker accessory device. For instance, at FIG. 10V, accessory group user interface object 1054 indicates that the accessory group includes the counter speaker accessory device and the dining table speaker accessory device (e.g., accessory group user interface object 1054 includes the text "COUNTER & DINING TABLE"). As such, when electronic device 600 removes the second speaker accessory device from the accessory group, electronic device 600 displays second accessory user interface object 1018 that is separate and distinct from accessory group user interface object 1054. In response to detecting user input corresponding to second accessory user interface object 1018, electronic device 600 is configured to control and/or adjust operation of the second speaker accessory device individually and/or independently from other accessory devices of the home automation system.

As set forth above, in some embodiments, electronic device 600 automatically creates an accessory group and/or adds the second speaker accessory device to an existing accessory group after electronic device 600 adds the second speaker accessory device to the home automation system. For instance, in response to detecting user input 1050*e* and when the second speaker accessory device was associated with the living room of the location associated with the home automation system (e.g., focus indicator 1014*e* was around first room indicator 1014*a* at FIG. 10D), electronic device 600 displays home user interface 604, as shown at FIG. 10W.

Figure 10X:
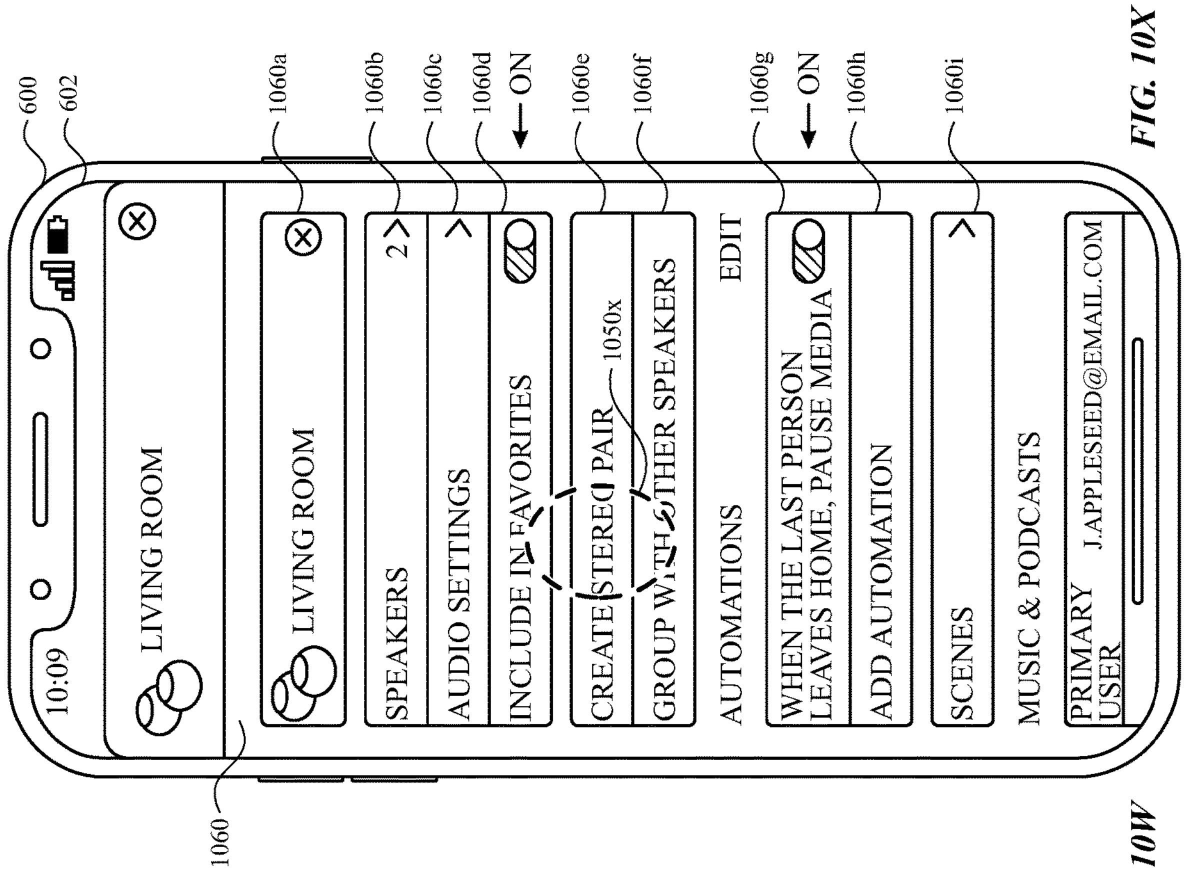
Figure 10W:
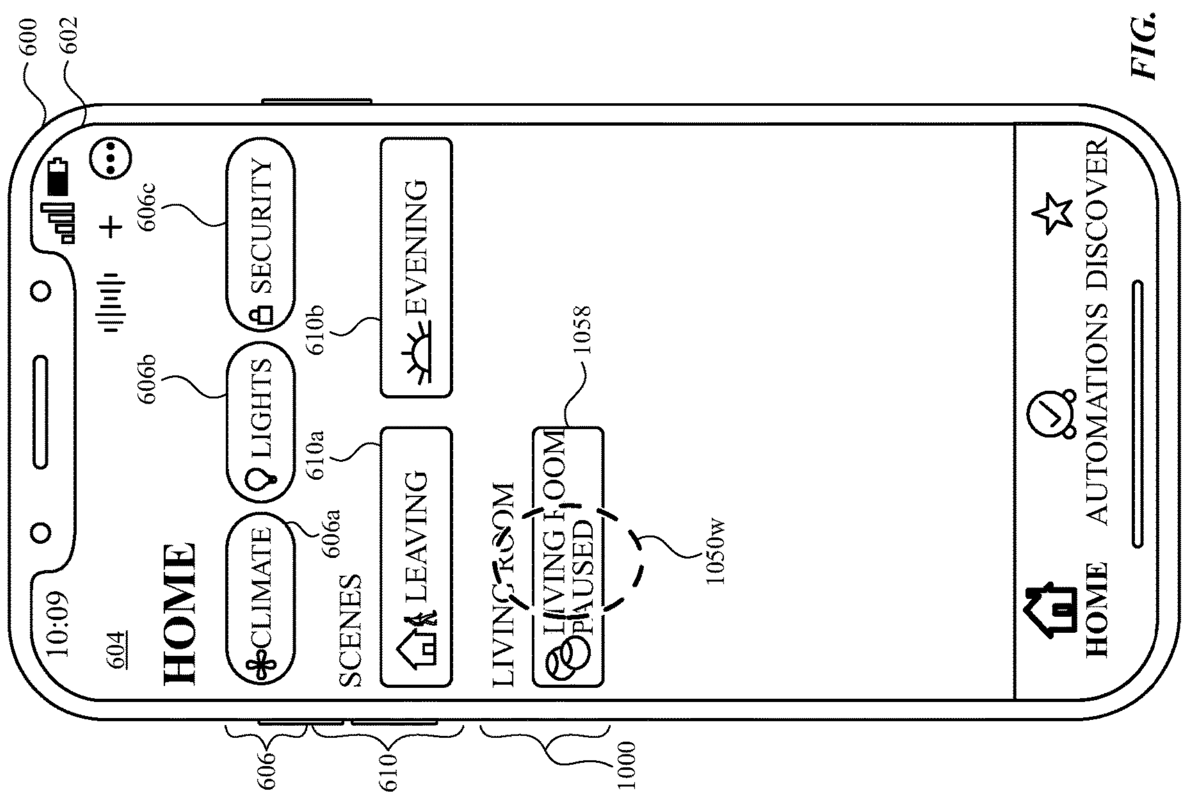

At FIG. 10W, electronic device 600 displays home user interface 604 having accessory group user interface object 1058 in living room region 1000. Accessory group user interface object 1058 corresponds to an accessory group that includes the first speaker accessory device (e.g., an existing speaker accessory device of the home automation system associated with the living room) and the second speaker accessory device (e.g., a newly added speaker accessory device of the home automation system that was associated with the living room during a process for adding the speaker accessory device to the home automation system). In some embodiments, electronic device 600 automatically creates the accessory group because electronic device 600 determined that the second speaker accessory device is associated with and/or being associated with a same room as an existing speaker accessory device (e.g., the first speaker accessory device) of the home automation system. Therefore, after electronic device 600 adds the second speaker accessory device to the home automation system, electronic device 600 creates the accessory group (and/or adds the second speaker accessory device to an existing accessory group) and displays accessory group user interface object 1058 on home user interface 604. At FIG. 10W, electronic device 600 does not display first accessory user interface object 1002 and/or second accessory user interface object 1018, as shown at FIG. 10F. Instead, electronic device 600 displays accessory group user interface object 1058 to indicate that the first speaker accessory device and the second speaker accessory device are grouped and/or included in the accessory group.

At FIG. 10W, electronic device 600 detects user input 1050*w* (e.g., a tap gesture or other selection/navigation input) corresponding to selection of accessory group user interface object 1058. In response to detecting user input

1050*w*, electronic device 600 displays group settings user interface 1060, as shown at FIG. 10X.

At FIG. 10X, group settings user interface 1060 enables electronic device 600 to adjust and/or configure settings of the accessory group that includes the first and second speaker accessory devices. For example, group settings user interface 1060 enables electronic device 600 to concurrently adjust and/or modify settings for all of the accessory devices included in the accessory group. Group settings user interface 1060 includes group indicator 1060*a* (e.g., "LIVING ROOM"). At FIG. 10X, group settings user interface 1060 includes speaker user interface object 1060*b*, audio settings user interface object 1060*c*, favorites user interface object 1060*d*, stereo pair user interface object 1060*e*, group user interface object 1060*f*, and automations user interface objects 1060*g*-1060*i*.

As set forth above, in response to detecting user input corresponding to speaker user interface object 1060*b*, electronic device 600 displays a user interface (e.g., group accessories user interface 1038), which includes accessory user interface objects corresponding to the accessory devices in the accessory group. As set forth above, audio settings user interface object 1060*c* enables electronic device 600 to control and/or adjust audio settings of the accessory devices in the group either together or independent of one another. Favorites user interface object 1060*d* enables electronic device 600 to either display or not display a user interface object corresponding to the accessory group in a favorites region (e.g., favorites region 672) of home user interface 604. As set forth below, stereo pair user interface object 1060*e* enables electronic device 600 to create a stereo pair (e.g., a pair of speaker accessory devices that includes a left speaker accessory device configured to output a left audio channel of audio content and a right speaker accessory device configured to output a right audio channel of audio content) with devices of the home automation system and to include in the accessory group. Group user interface object 1060*f* enables electronic device 600 to add (and/or remove) one or more additional accessory devices to the accessory group. Automations user interface objects 1060*g*-1060*i* enable electronic device 600 to control and/or adjust an operating state of the accessory group when electronic device 600 detects an occurrence of an event, such as location information that indicates that electronic device 600 is not at the location associated with the home automation system, a current time of day is at a predefined time of day, and/or user inputs requesting to change the operating state of the accessory group.

At FIG. 10X, electronic device detects user input 1050*x* (e.g., a tap gesture or other selection/navigation input) corresponding to stereo pair user interface object 1060*e*. In response to detecting user input 1050*x*, electronic device 600 displays stereo pair user interface 1062, as shown at FIG. 10Y.

Figure 10Y:
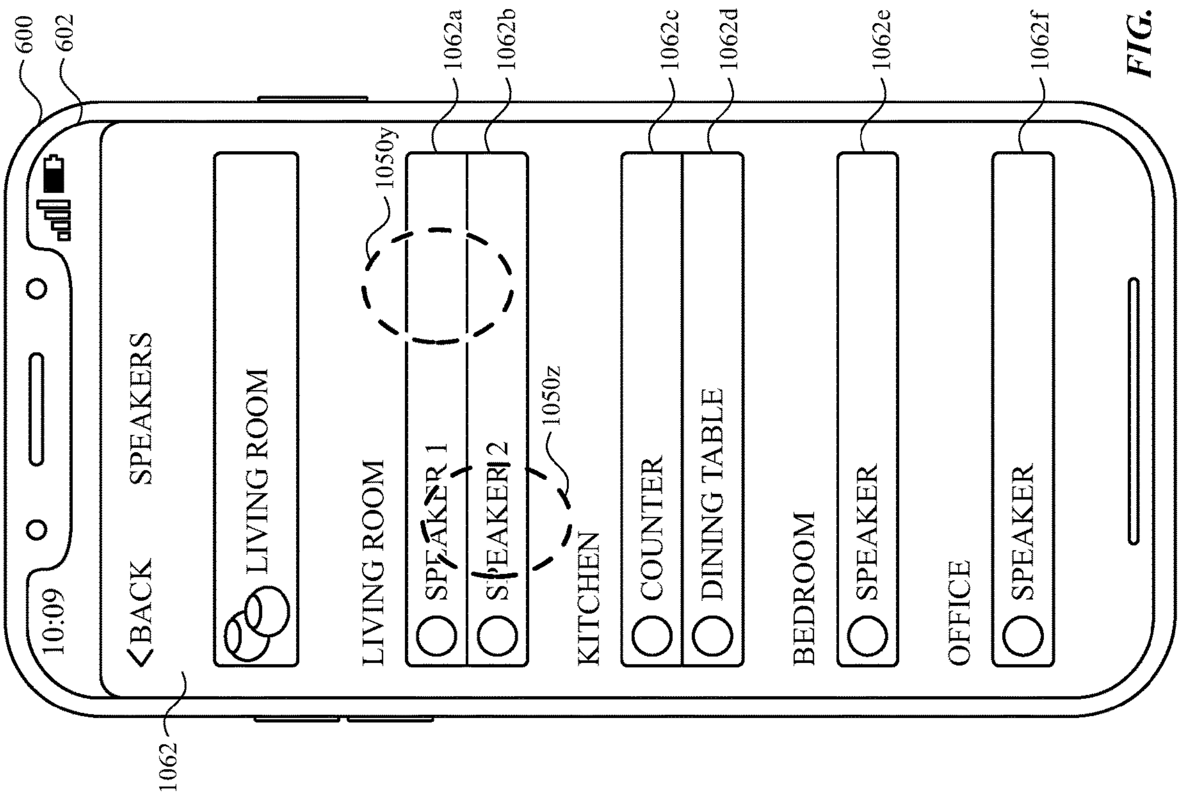

At FIG. 10Y, stereo pair user interface 1062 includes accessory user interface objects 1062*a*-1062*f* corresponding to accessory devices of the home automation system that can be included in a stereo pair. In some embodiments, accessory user interface objects 1062*a*-1062*f* correspond to all accessory devices of the home automation system that can be included in and/or used to form a stereo pair. In some embodiments, accessory user interface objects 1062-1062*f* correspond to accessory devices of the accessory group (e.g., the accessory group associated with accessory group user interface object 1058) that can be included in and/or used to form a stereo pair. In some embodiments, stereo pair user interface 1062 is scrollable, such that electronic device 600 displays additional accessory user interface objects in response to detecting a swipe and/or scroll gesture.

At FIG. 10Y, electronic device 600 detects user input 1050*y* (e.g., a tap gesture or other selection/navigation input) corresponding to selection of first accessory user interface object 1062*a* and user input 1050*z* (e.g., a tap gesture or other selection/navigation input) corresponding to second accessory user interface object 1062*b*. After detecting user inputs 1050*y* and 1050*z*, electronic device 600 creates a stereo pair including the first speaker accessory device (e.g., the speaker accessory device corresponding to first accessory user interface object 1062*a*) and the second speaker accessory device (e.g., the speaker accessory device corresponding to second accessory user interface object 1062*b*). Because the first speaker accessory device and the second speaker accessory device are already included in the accessory group, electronic device 600 does not add additional accessory devices to the accessory group. In some embodiments, in response to detecting user input corresponding to an accessory user interface object that is associated with an accessory device that is not included in the accessory group, electronic device 600 adds the accessory device to the accessory group.

Figure 10Z:
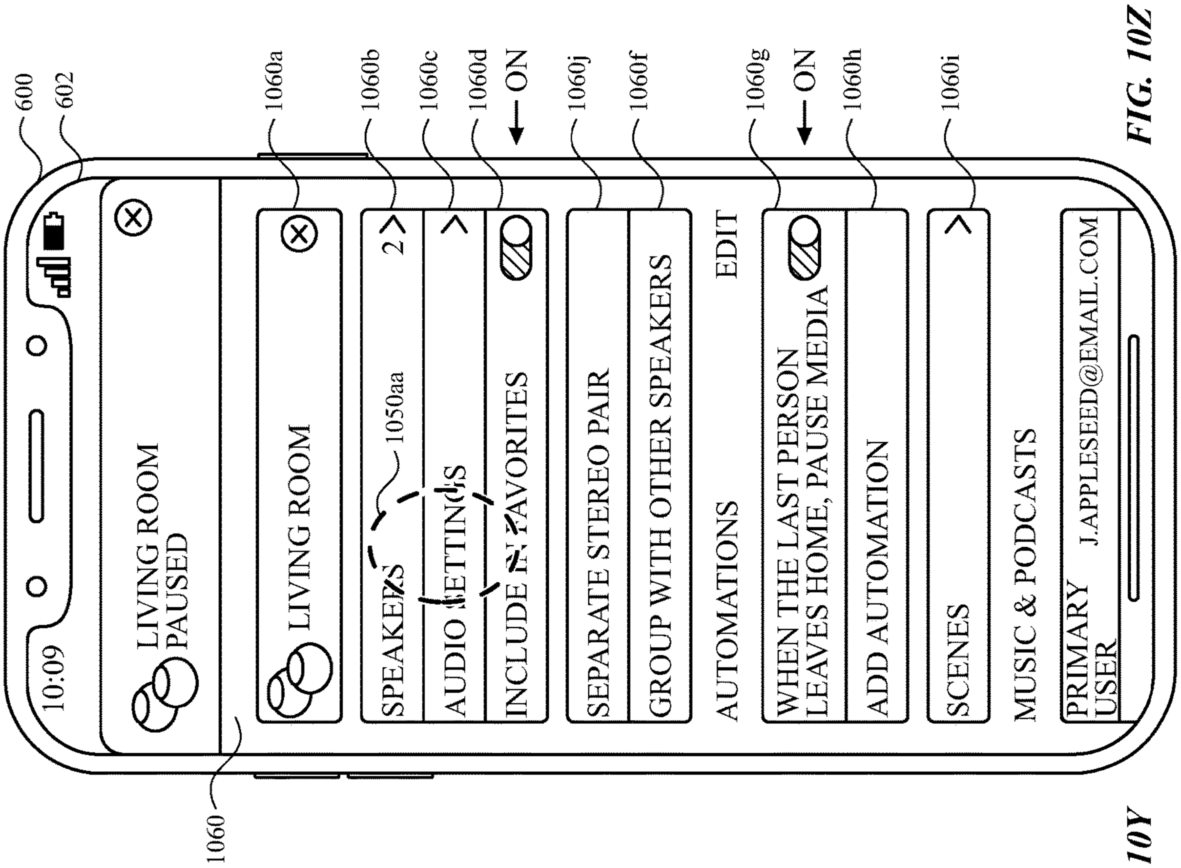
Figure 10A:
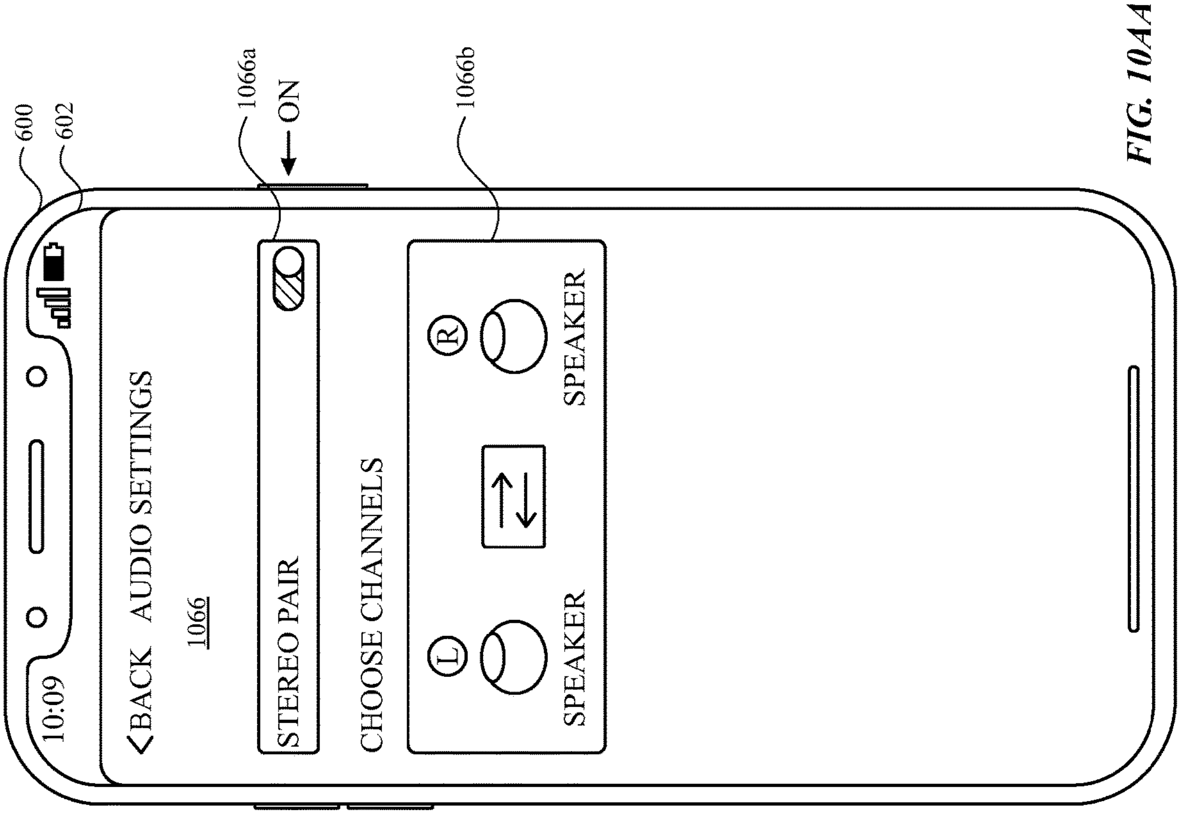
Figure 11A:
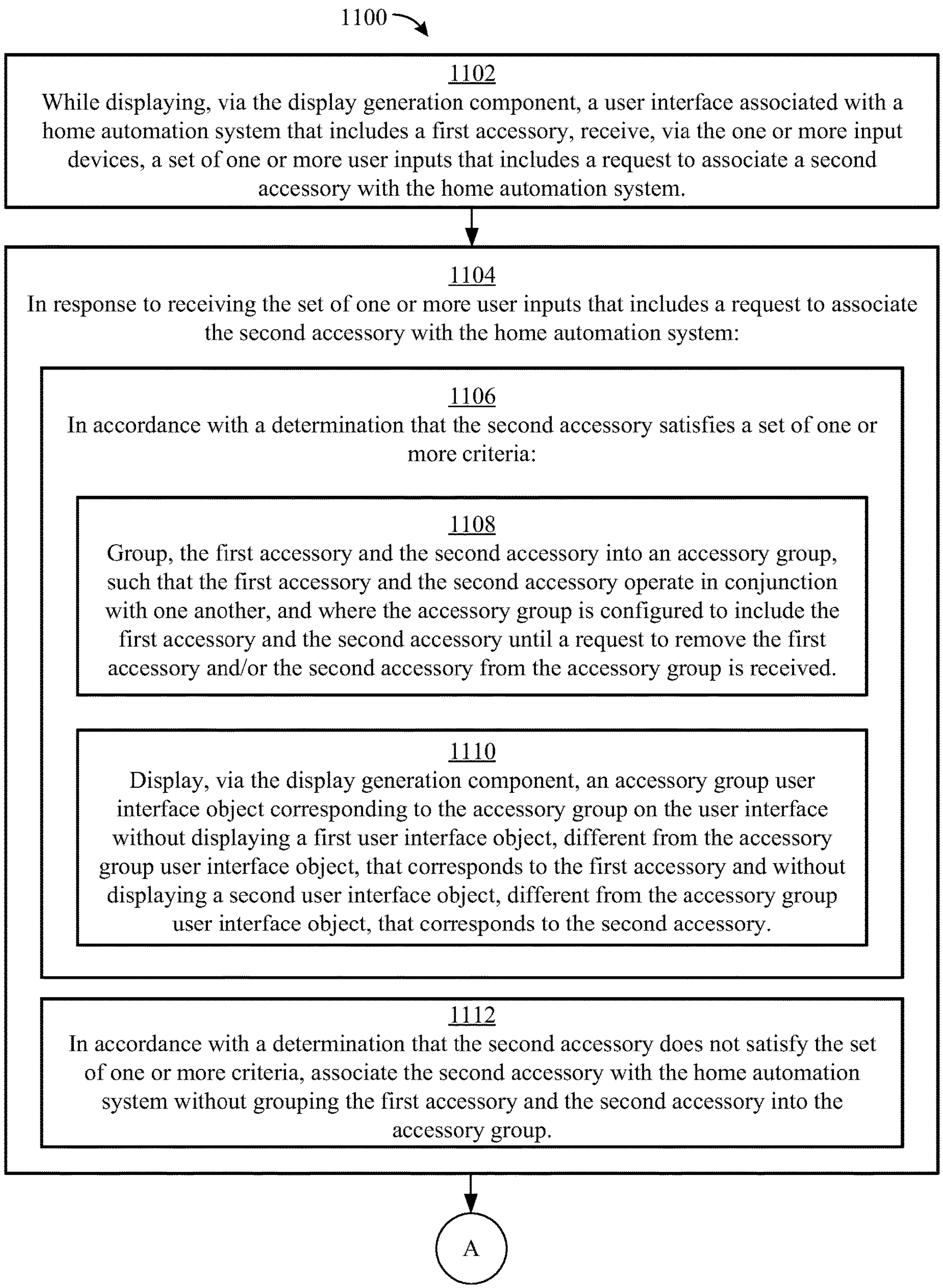
Figure 11C:
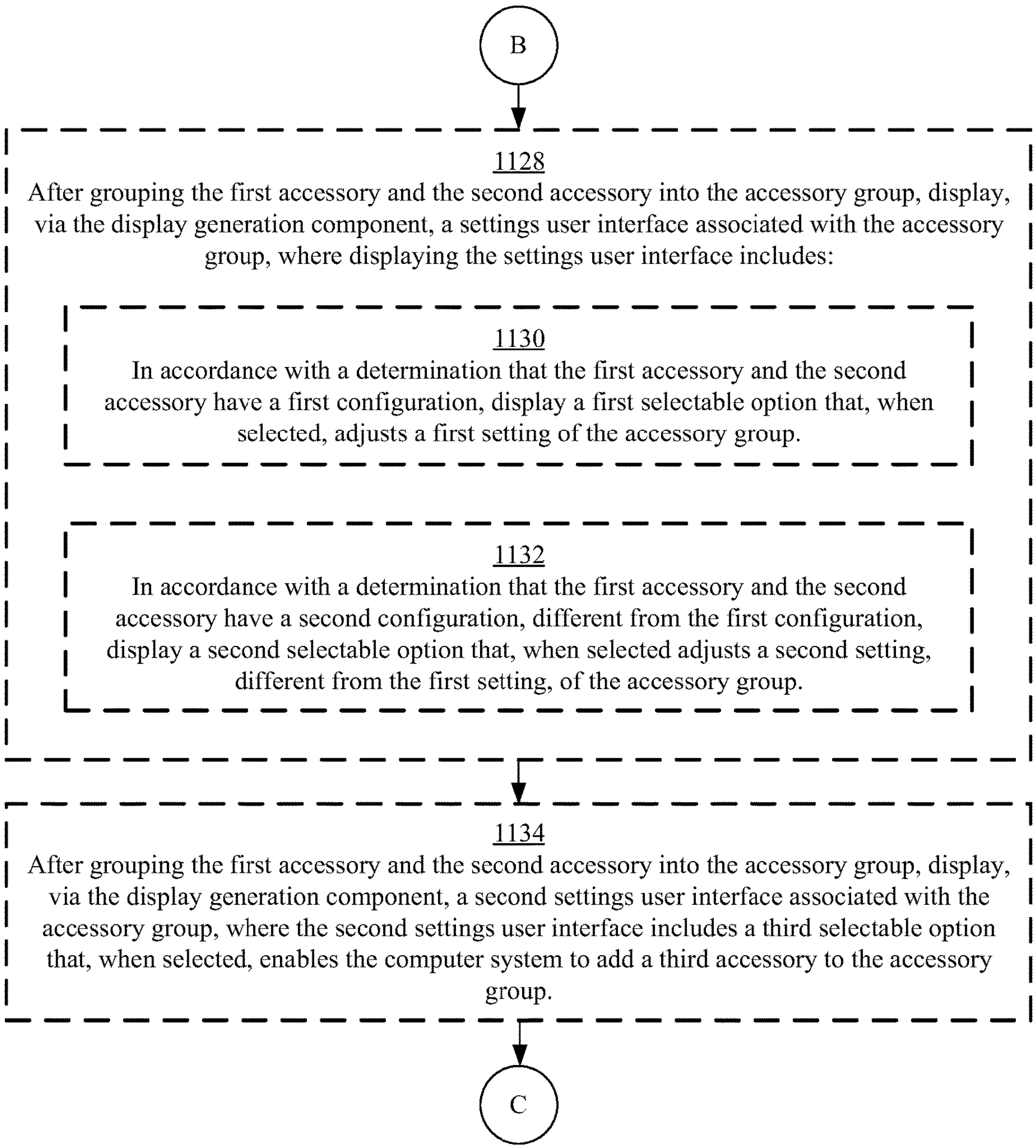
Figure 11D:
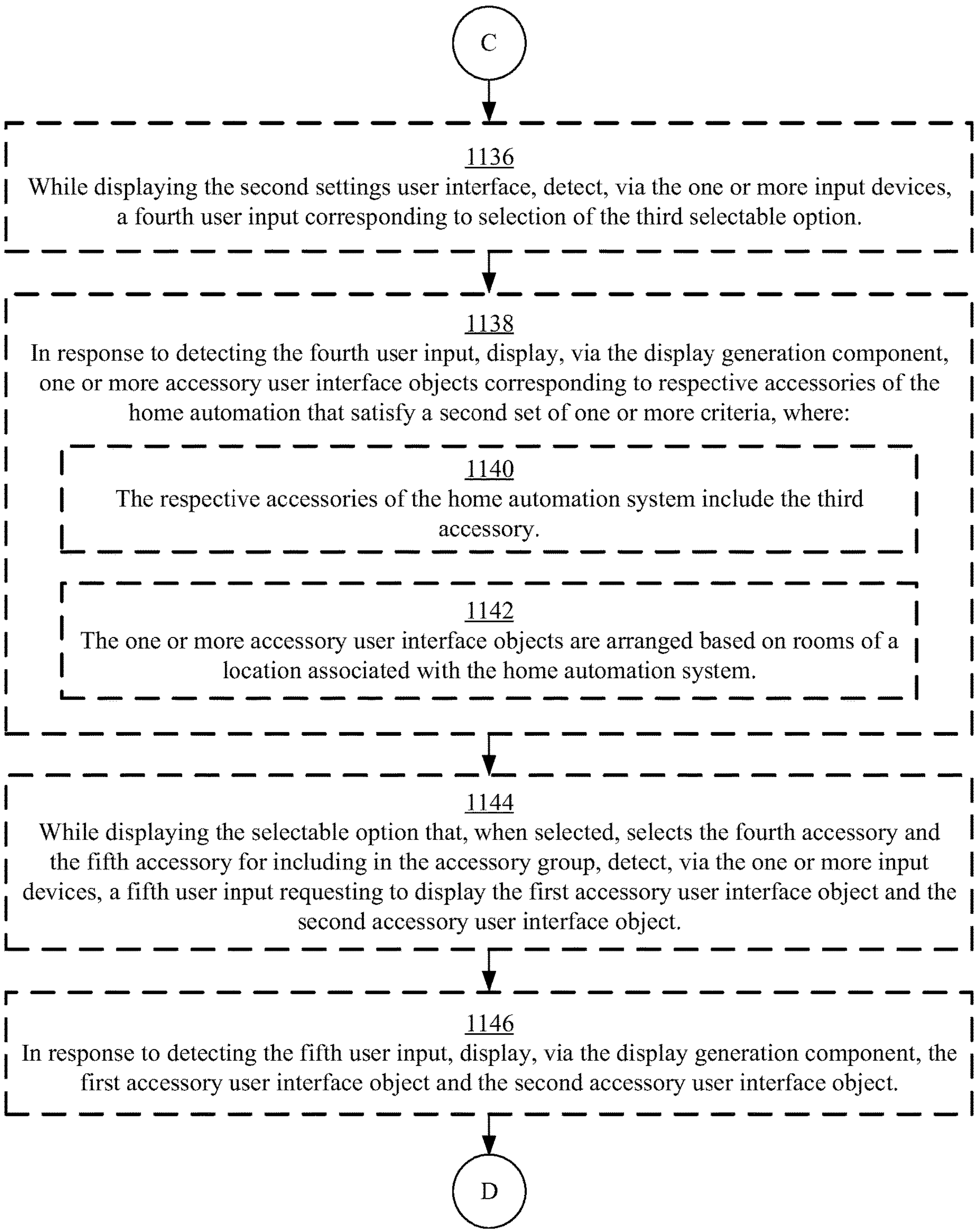
Figure 11E:
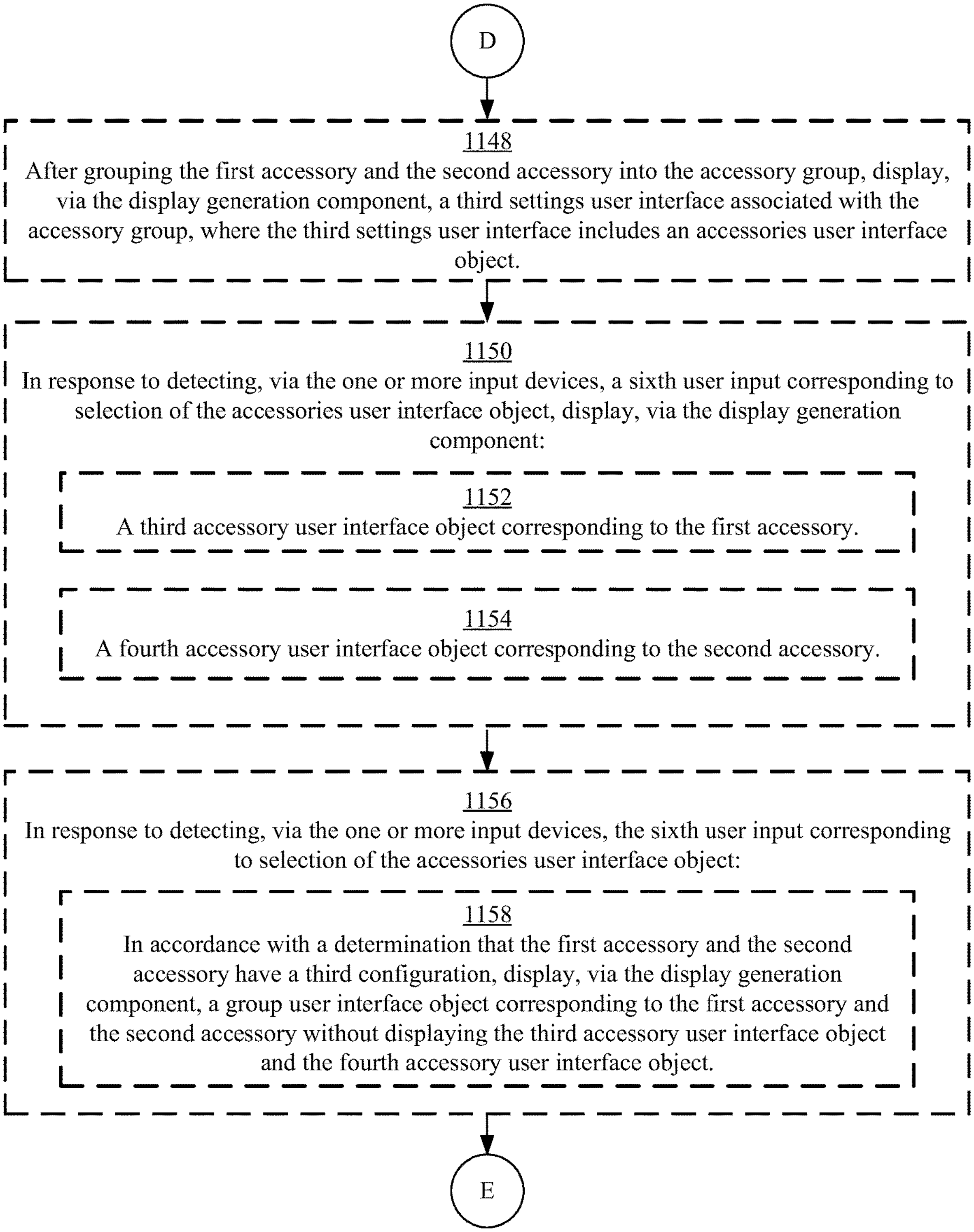
Figure 11F:
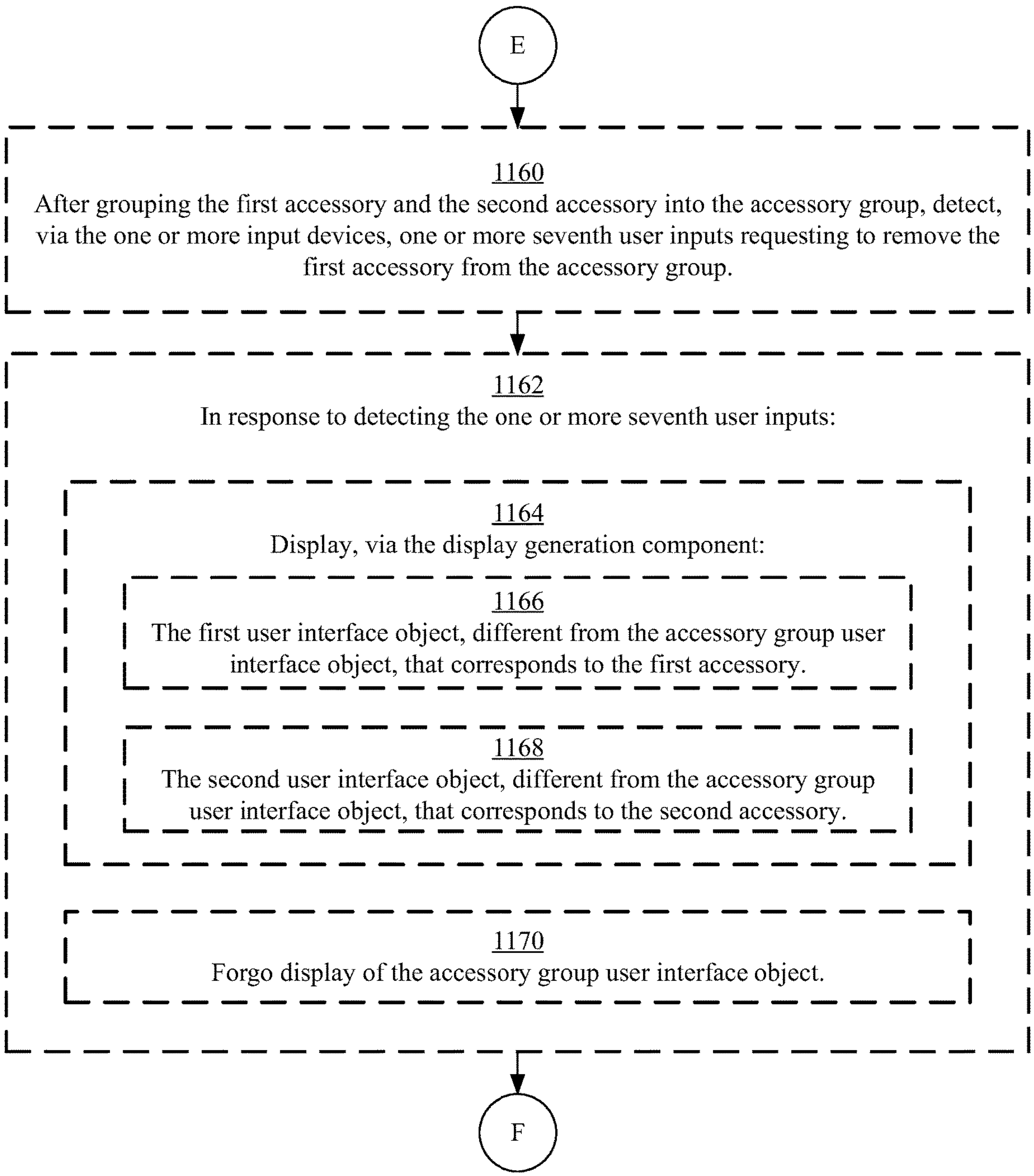
Figure 11G:
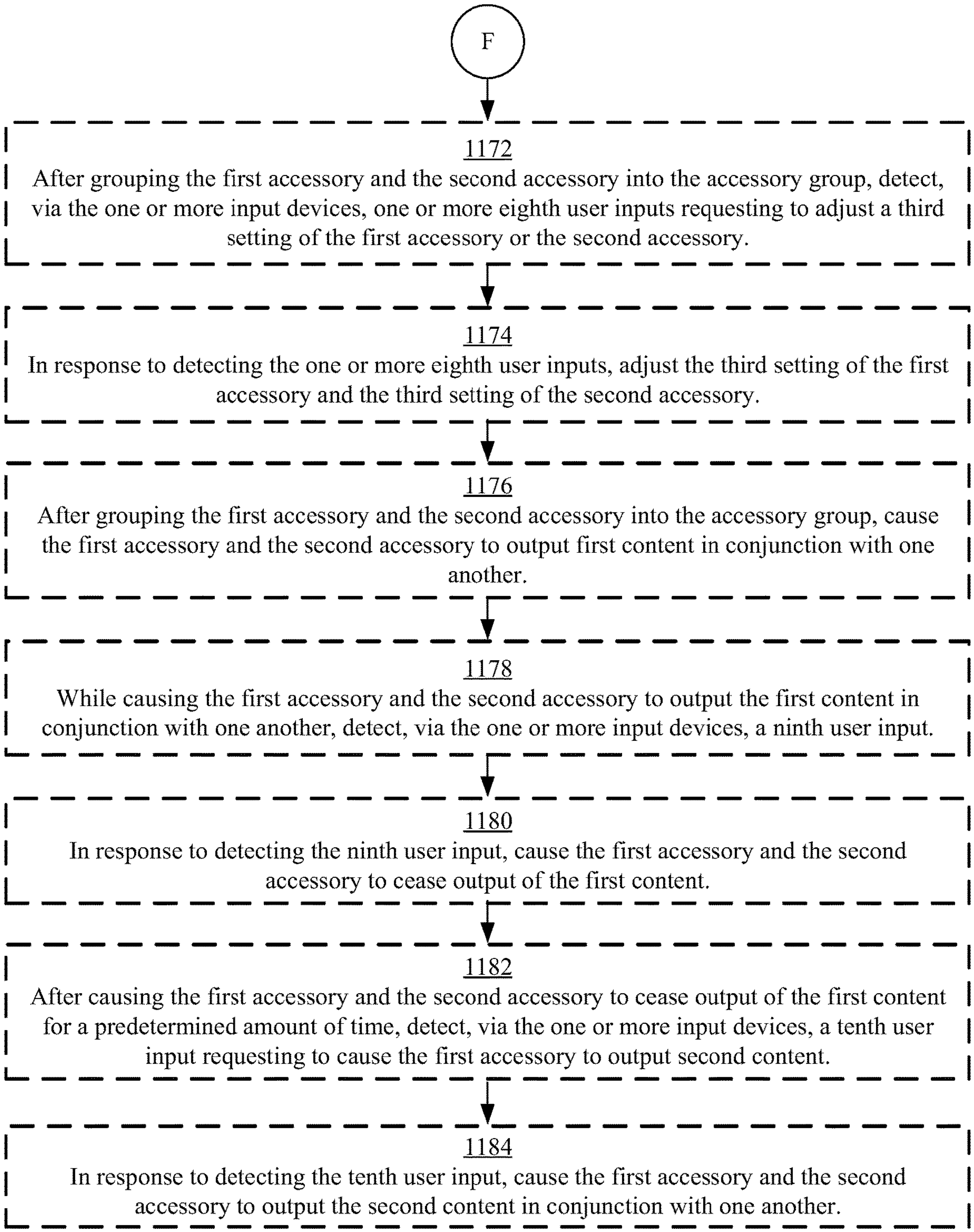

After creating the stereo pair including the first speaker accessory device and the second speaker accessory device, electronic device 600 displays group settings user interface 1060, as shown at FIG. 10Z. At FIG. 10Z, group settings user interface 1060 includes separate stereo pair user interface object 1060*j*, which indicates and/or confirms that the stereo pair has been created and/or included in the accessory group. In some embodiments, in response to detecting user input corresponding to selection of separate stereo pair user interface object 1060*j*, electronic device 600 maintains the first speaker accessory device and the second speaker accessory device in the accessory group, but removes and/or disassociates the stereo pair. In some embodiments, removing and/or disassociating the stereo pair enables the first speaker accessory device and the second speaker accessory device to operate in conjunction with one another via the accessory group, but the first speaker accessory device and the second speaker accessory device do not output separate audio channels of audio content.

At FIG. 10Z, electronic device 600 detects user input 1050*aa* (e.g., a tap gesture or other selection/navigation input) corresponding to audio settings user interface object 1060*c* of group settings user interface 1060. In response to detecting user input 1050*aa* and after the stereo pair has been created and/or formed, electronic device 600 displays second audio settings user interface 1066, as shown at FIG. 10AA.

Electronic device 600 is configured to display different controls for audio settings based on whether an accessory group includes a stereo pair. For instance, at FIGS. 10L and 10N, electronic device 600 displays volume control user interface object 1040*a* based on a determination that the accessory group does not include a stereo pair. At FIG. 10AA, electronic device 600 displays second audio settings user interface 1066, which includes stereo pair user interface object 1066*a* and channel user interface object 1066*b*, based on a determination that the accessory group includes a stereo pair (e.g., the stereo pair that includes the first and second speaker accessory devices). In some embodiments, when electronic device 600 determines that an accessory group includes a stereo pair and additional accessory devices that are not part of a stereo pair, electronic device 600 displays an audio settings user interface that includes volume control user interface object 1040*a*, stereo pair user interface object 1066*a*, and/or channel user interface object 1066*b*.

At FIG. 10AA, in response to detecting user input corresponding to stereo pair user interface object 1066*a*, electronic device 600 is configured to remove and/or disassociate the stereo pair. In some embodiments, in response to detecting user input corresponding to stereo pair user interface object 1066*a*, electronic device 600 removes and/or disassociates the stereo pair and displays volume control user interface object 1040*a*. Channel user interface object 1066*b* enables electronic device 600 to change, adjust, and/or modify which of the first speaker accessory device and the second speaker accessory device output a left channel of audio content and a right channel of audio content. For instance, in some embodiments, in response to detecting user input corresponding to channel user interface object 1066*b*, electronic device 600 switches which of the first speaker accessory device and the second speaker accessory device outputs the left channel of audio content and which of the first speaker accessory device and the second speaker accessory device outputs the right channel of audio content.

FIGS. 11A-11G are a flow diagram illustrating a method for managing speaker accessories using a computer system in accordance with some embodiments. Method 1100 is performed at a computer system (e.g., 100, 300, 500, and/or 600) (e.g., an electronic device; a smart device, such as a smartphone or a smartwatch; a mobile device; a wearable device) that is in communication with one or more input devices and a display generation component (e.g., 602) (e.g., a display controller, a touch-sensitive display system, a projector, a display screen, a display monitor, and/or a holographic display). Some operations in method 1100 are, optionally, combined, the orders of some operations are, optionally, changed, and some operations are, optionally, omitted.

As described below, method 1100 provides an intuitive way for managing speaker accessories. The method reduces the cognitive burden on a user for managing speaker accessories, thereby creating a more efficient human-machine interface. For battery-operated computing devices, enabling a user to manage speaker accessories faster and more efficiently conserves power and increases the time between battery charges.

While displaying, via the display generation component (e.g., 602), a user interface (e.g., 604) (e.g., a home and/or default user interface of an application that is configured to enable control of one or more accessories and/or devices that are part of a home automation system) associated with a home automation system (or an application) (e.g., a system or application that includes one or more accessories and/or devices of a home and/or other structure that are able to be controlled and/or adjusted via the computer system) that includes a first accessory (e.g., an accessory associated with first accessory user interface object 1002) (e.g., a first external device that is configured to be controlled and/or adjusted by the computer system, such as a light (e.g., a light bulb), an outlet, a television, a speaker (e.g., a smart speaker), a lock, and/or a sensor), the computer system (e.g., 100, 300, 500, and/or 600) receives (1102), via the one or more input devices, a set of one or more user inputs (e.g., 1050*a*-1050*e*) that includes a request to associate a second accessory (e.g., an accessory associated with second accessory user interface object 1018) (e.g., a second external device that is configured to be controlled and/or adjusted by the computer system, such as a light (e.g., a light bulb), an outlet, a television, a speaker (e.g., a smart speaker), a lock, and/or a sensor) with the home automation system (e.g., requesting to add a new accessory (e.g., the second accessory) to the home automation system so that the computer system can control and/or otherwise adjust operation of the new accessory, requesting to reconnect the second accessory to the home automation system, and/or requesting to designate an area (e.g., a room and/or other predefined zone) of a home of the home automation system with which the second accessory will be associated).

In response to receiving the set of one or more user inputs (1104) (e.g., 1050*a*-1050*e*) that includes a request to associate the second accessory with the home automation system and in accordance with a determination that the second accessory (e.g., an accessory associated with second accessory user interface object 1018) satisfies a set of one or more criteria (1106) (e.g., the second accessory is a same type of accessory and/or device as the first accessory, the second accessory includes a function that is the same as and/or compatible with a function of the first accessory, the second accessory is designated and/or is being designated to a same area (e.g., same room and/or zone) of a home of the home automation system, and/or the second accessory has been enabled for forming an accessory group with the first accessory (e.g., via user input)), the computer system (e.g., 100, 300, 500, and/or 600) groups (1108) the first accessory and the second accessory into an accessory group (e.g., an accessory group associated with accessory group user interface object 1058) (e.g., the accessory group enables the first accessory and the second accessory to be controlled together and/or concurrently with one another), such that the first accessory and the second accessory operate (or are configured to operate or enabled to operate) in conjunction with one another (e.g., the first accessory and the second accessory output (e.g., concurrently) content (e.g., audio) from the same media file; the first accessory and the second accessory can be selected to output content (e.g., concurrently output content) as a group of accessories (e.g., rather than requiring individual selection of both the first accessory and the second accessory); and/or settings of the first accessory and the second accessory can be controlled together as a group (e.g., rather than requiring individual control of a first setting of the first accessory and a second setting of the second accessory)), and where the accessory group is configured to include the first accessory and the second accessory until (or unless) a request (e.g., e.g., 1050*u* and/or 1050*v*) to remove the first accessory and/or the second accessory from the accessory group is received (e.g., the accessory group is configured to last indefinitely; when the output of the first accessory and/or the second accessory is paused and/or stopped, the first accessory and the second accessory remain in the group, such that when output of the first accessory and/or the second accessory is resumed and/or initiated (e.g., re-initiated), the first accessory and the second accessory still operate in conjunction with one another). In some embodiments, the first accessory and the second accessory are maintained in the accessory group until the computer system receives user input requesting that the first accessory and the second accessory not be grouped together (e.g., the first accessory and the second accessory are maintained as the accessory group absent user input requesting that the first accessory and the second accessory not be grouped together).

In response to receiving the set of one or more user inputs (1104) (e.g., 1050*a*-1050*e*) that includes a request to associate the second accessory with the home automation system and in accordance with a determination that the second accessory (e.g., an accessory associated with second accessory user interface object 1018) satisfies a set of one or more criteria (1106) (e.g., the second accessory is a same type of accessory and/or device as the first accessory, the second accessory includes a function that is the same as and/or compatible with a function of the first accessory, the second accessory is designated and/or is being designated to a same area (e.g., same room and/or zone) of a home of the home automation system, and/or the second accessory has been enabled for forming an accessory group with the first accessory (e.g., via user input)), the computer system (e.g., 100, 300, 500, and/or 600) displays (1110), via the display generation component (e.g., 602), an accessory group user interface object (e.g., 1042 and/or 1058) (e.g., an affordance that, when selected, enables control of the first accessory and the second accessory) corresponding to the accessory group (e.g., the accessory group including the first accessory and the second accessory) on the user interface (e.g., 604) without displaying a first user interface object (e.g., 1002), different from the accessory group user interface object (e.g., 1042 and/or 1058), that corresponds to the first accessory and without displaying a second user interface object (e.g., 1018), different from the accessory group user interface object (e.g., 1042 and/or 1058), that corresponds to the second accessory (e.g., displaying a single user interface object for the accessory group without displaying separate user interface objects and/or affordances for both the first accessory and the second accessory).

In response to receiving the set of one or more user inputs (1104) (e.g., 1050*a*-1050*e*) that includes a request to associate the second accessory with the home automation system and in accordance with a determination that the second accessory does not satisfy the set of one or more criteria (e.g., the second accessory is not the same type of accessory and/or device as the first accessory, the second accessory does not include a function that is the same as and/or compatible with a function of the first accessory, the second accessory is not designated and/or is not being designated to a same area (e.g., same room and/or zone) of a home of the home automation system, and/or the second accessory has been disabled from forming an accessory group with the first accessory (e.g., via user input)), the computer system (e.g., 100, 300, 500, and/or 600) associates (1112) the second accessory (e.g., an accessory associated with second accessory user interface object 1018) with the home automation system (e.g., adding the second accessory to the home automation system, such that the computer system is configured to control and/or adjust operation of the second accessory (e.g., via one or more user inputs)) without grouping the first accessory and the second accessory into the accessory group (e.g., forgoing grouping the first accessory and the second accessory into the accessory group, such that the first accessory and the second accessory are not controlled together and/or concurrently with one another). In some embodiments, associating the second accessory with the home automation system without grouping the first accessory and the second accessory into the accessory group causes the computer system to display a first user interface object (e.g., 1002) for the first accessory and a second user interface object (e.g., 1018) for the second accessory without displaying the user interface object (e.g., 1042 and/or 1058) for the accessory group (e.g., the computer system displays separate user interface objects and/or affordances for both the first accessory and the second accessory).

Grouping the first accessory and the second accessory into the accessory group when the second accessory satisfies the set of one or more criteria allows the computer system to automatically create the accessory group when it is determined that the accessory group will be convenient for the user and without the user having to provide additional user inputs to create the accessory group, thereby reducing the number of inputs needed to perform an operation.

In some embodiments, the first accessory (e.g., an accessory associated with first accessory user interface object 1002) is associated with a first room (e.g., "Living Room," as shown at FIGS. 10A-10AA) (e.g., a first area, region, section, and/or portion of a location (e.g., structure and/or building)) of the home automation system, and the set of one or more criteria includes a criterion that is met when the second accessory (e.g., an accessory associated with second accessory user interface object 1018) is associated with the first room of the home automation system (e.g., the set of one or more user inputs that includes a request to associate the second accessory with the home automation system includes one or more user inputs that associate and/or request to associate the second accessory with the first room). Group the first accessory and the second accessory into the accessory group when the second accessory is associated with the same room as the first accessory allows the computer system to automatically create the accessory group when it is determined that the accessory group will be convenient for the user and without the user having to provide additional user inputs to create the accessory group, thereby reducing the number of inputs needed to perform an operation.

In some embodiments, after grouping the first accessory and the second accessory into the accessory group, the computer system (e.g., 100, 300, 500, and/or 600) detects (1114), via the one or more input devices, one or more second user inputs (e.g., 1050*k*, 1050*m*, 1050*n*, and/or 1050*p*) (e.g., one or more tap gestures and/or one or more press gestures) requesting to adjust a setting (e.g., a volume setting and/or a playback setting) of the first accessory and/or the second accessory (e.g., a request to adjust the setting of the first accessory, a request to adjust the setting of the second accessory, and/or a request to adjust the setting of the first accessory and the second accessory (e.g., a concurrent and/or synchronous adjustment of the setting of both the first accessory and the second accessory)). In response to detecting the one or more second user inputs (e.g., 1050*k*, 1050*m*, 1050*n*, and/or 1050*p*) requesting to adjust the setting of the first accessory and/or the second accessory, the computer system (e.g., 100, 300, 500, and/or 600) displays (1116), via the display generation component (e.g., 602), a settings user interface object (e.g., 1040*a*) (e.g., a selectable user interface object, a slider, a toggle, and/or an affordance) in an active position (e.g., a position shown at FIG. 10L) (e.g., an enabled and/or on position), where the computer system (e.g., 100, 300, 500, and/or 600) is configured to adjust both a first setting of the first accessory and a second setting of the second accessory (e.g., concurrently and/or synchronously adjust the same setting of the first accessory and the second accessory in response to user input) when the settings user interface object (e.g., 1040*a*) is in the active position.

Enabling the computer system to adjust both the first setting of the first accessory and the second setting of the second accessory when the settings user interface object is in an active position allows the computer system to adjust the settings of the accessories of the accessory group without individual inputs that adjust each accessory, thereby reducing the number of inputs needed to perform an operation.

In some embodiments, while displaying the settings user interface object (e.g., 1040*a*), the computer system (e.g., 100, 300, 500, and/or 600) detects (1118), via the one or more input devices, a third user input (e.g., 1050*n*) (e.g., a tap gesture) corresponding to selection of the settings user interface object (e.g., 1040*a*). In response to receiving the third user input (e.g., 1050*n*) corresponding to selection of the settings user interface object (e.g., 1040*a*), the computer system (e.g., 100, 300, 500, and/or 600) displays (1120), via the display generation component, the settings user interface object (1122) (e.g., 1040*a*) in an inactive position (e.g., a position shown at FIG. 10M) (e.g., a disabled and/or off position), where the computer system (e.g., 100, 300, 500, and/or 600) is configured to separately (e.g., independently and/or individually) adjust the first setting of the first accessory and the second setting of the second accessory (e.g., adjust the first setting of the first accessory without adjusting the second setting of the second accessory in response to first user input and/or adjust the second setting of the second accessory without adjusting the first setting of the first accessory in response to detecting second user input) when the settings user interface object (e.g., 1040*a*) is in the inactive position, a first setting user interface object (1124) (e.g., 1040*b*-1040*d*) (e.g., a first selectable user interface object and/or an affordance) that, when selected via user input, causes the computer system (e.g., 100, 300, 500, and/or 600) to adjust the first setting of the first accessory without adjusting the second setting of the second accessory, and a second setting user interface object (1126) (e.g., 1040*b*-1040*d*) (e.g., a first selectable user interface object and/or an affordance) that, when selected via user input, causes the computer system (e.g., 100, 300, 500, and/or 600) to adjust the second setting of the second accessory without adjusting the first setting of the first accessory.

Displaying the first setting user interface object and the second setting user interface object in response to detecting selection of the settings user interface object allows a user of the computer system to confirm that the computer system can individually control the accessories of the accessory group, thereby providing improved visual feedback.

In some embodiments, after grouping the first accessory and the second accessory into the accessory group, the computer system (e.g., 100, 300, 500, and/or 600) displays (1128), via the display generation component (e.g., 602), a settings user interface (e.g., 1040 and/or 1066) (e.g., a user interface that is associated with the accessory group and includes one or more selectable options that enable the computer system to configure one or more settings of the accessory group (e.g., adjust and/or configure settings for each of the accessories of the accessory group together and/or individually)) associated with the accessory group, where displaying the settings user interface includes (e.g., 1040 and/or 1066), in accordance with a determination that the first accessory and the second accessory have a first configuration (e.g., the first accessory and the second accessory have been designated and/or configured as a stereo pair, such that the first accessory is configured to output a left channel of audio content and the second accessory is configured to output a right channel of the audio content), the computer system (e.g., 100, 300, 500, and/or 600) displaying (1130) (e.g., in the settings user interface) a first selectable option (e.g., 1040*a*, 1066*a*, and/or 1066*b*) (e.g., a first selectable user interface object and/or an affordance) that, when selected, adjusts a first setting of the accessory group (e.g., adjust, modify, and/or change which channel of audio content (e.g., left or right) is output by the first accessory and the second accessory). and in accordance with a determination that the first accessory and the second accessory have a second configuration (e.g., the first accessory and the second accessory are not designated and/or configured as a stereo pair, such that the first accessory and the second accessory output audio content in conjunction with one another), different from the first configuration, the computer system (e.g., 100, 300, 500, and/or 600) displaying (1132) (e.g., in the settings user interface) a second selectable option (e.g., 1040*a*, 1066*a*, and/or 1066*b*) (e.g., a second selectable user interface object and/or an affordance) that, when selected, adjusts a second setting (e.g., whether the volume of the first accessory and the second accessory are configured to be adjusted synchronously or concurrently with one another and/or independently of one another), different from the first setting of the accessory group.

Displaying the first selectable option when the first accessory and the second accessory have the first configuration and displaying the second selectable option when the first accessory and the second accessory have the second configuration provides a user of the computer system with relevant controls based on a configuration of the accessory group without having to provide additional user inputs to find and/or navigate to the relevant control, thereby reducing the number of inputs needed to perform an operation.

In some embodiments, after grouping the first accessory and the second accessory into the accessory group, the computer system (e.g., 100, 300, 500, and/or 600) displays (1134), via the display generation component (e.g., 602), a second settings user interface (e.g., 1036 and/or 1060) (e.g., a user interface that is associated with the accessory group and includes one or more selectable options that enable the computer system to configure one or more settings of the accessory group (e.g., adjust and/or configure settings for each of the accessories of the accessory group together and/or individually)) associated with the accessory group, where the second settings user interface (e.g., 1036 and/or 1060) includes a third selectable option (e.g., 1022*e* and/or 10600 (e.g., a third selectable user interface object and/or an affordance) that, when selected, enables the computer system (e.g., 100, 300, 500, and/or 600) to add a third accessory to the accessory group (e.g., via group user interface 1024) (e.g., the third accessory, when added to the accessory group, is configured to be control together and/or concurrently with the first accessory and the second accessory). Displaying the third selectable option that enables the computer system to add a third accessory to the accessory group allows a user of the computer system to customize the accessory group via a user interface associated with the accessory group and without having to navigate to an additional user interface, thereby reducing the number of inputs needed to perform an operation.

In some embodiments, while displaying the second settings user interface (e.g., 1036 and/or 1060), the computer system (e.g., 100, 300, 500, and/or 600) detects (1136), via the one or more input devices, a fourth user input (e.g., 1050*g*) (e.g., a tap gesture) corresponding to selection of the third selectable option (e.g., 1022*e* and/or 1060*f*). In response to detecting the fourth user input (e.g., 1050*g*), the computer system (e.g., 100, 300, 500, and/or 600) displays (1138), via the display generation component (e.g., 602), one or more accessory user interface objects (e.g., 1024*b*-1024*e*, 1032*a*, and/or 1032*b*) (e.g., one or more affordances that, when selected, select a respective accessory of the home automation system to add to the accessory group) corresponding to respective accessories of the home automation system that satisfy a second set of one or more criteria (e.g., the respective accessories of the home automation system are accessories of the same type as the first accessory and the second accessory and/or the respective accessories of the home automation system include a function (e.g., a primary function) that is the same as a function (e.g., primary function) as the first accessory and the second accessory). The respective accessories of the home automation system include the third accessory (1140) and the one or more accessory user interface objects (e.g., 1024*b*-1024*e*, 1032*a*, and/or 1032*b*) are arranged (1142) (e.g., ordered, grouped, and/or displayed at respective positions on the display generation component) based on rooms (e.g., areas, sections, and/or regions) of a location (e.g., a structure and/or building) associated with the home automation system (e.g., the respective accessories of the one or more accessory user interface objects are associated with (e.g., programmatically mapped to) respective rooms of the location and the one or more accessory user interface objects are displayed in regions and/or groups corresponding to the respective rooms with which the respective accessories are associated).

Displaying the one or more accessory user interface objects in response to detecting the fourth user input, where the one or more accessory user interface objects are arranged based on rooms of a location associated with the home automation system allows a user of the computer system to quickly find an accessory user interface object associated with a desired accessory, thereby providing improved visual feedback.

In some embodiments, displaying the one or more accessory user interface objects (e.g., 1024*b*-1024*e*, 1032*a*, and/or 1032*b*) corresponding to respective accessories of the home automation system that satisfy the second set of one or more criteria includes, in accordance with a determination that a fourth accessory that satisfies the second set of one or more criteria and a fifth accessory that satisfies the second set of one or more criteria are associated with (e.g., programmatically mapped to) a first room (e.g., "Kitchen" as shown at FIGS. 10H-10J) (e.g., a first area, section, and/or region) of the rooms of the location associated with the home automation system, the computer system (e.g., 100, 300, 500, and/or 600) displaying, via the display generation component (e.g., 602), a selectable option (e.g., 1024*b*-1024*e*) (e.g., a selectable user interface object and/or an affordance) that, when selected, selects the fourth accessory and the fifth accessory for including in the accessory group (e.g., designates the fourth accessory and the fifth accessory to add to the accessory group that includes the first accessory and the second accessory), where the selectable option (e.g., 1024*b*-1024*e*) is displayed without displaying a first accessory user interface object (e.g., 1032*a*) corresponding to the fourth accessory and a second accessory user interface object (e.g., 1032*b*) corresponding to the fifth accessory (e.g., the selectable option corresponds to all the respective accessories associated with the first room and the computer system does not display separate, individual accessory user interface objects when multiple accessories are associated with a room of the location associated with the home automation system).

Displaying the selectable option that, when selected, selects the fourth accessory and the fifth accessory for including in the accessory group allows a user of the computer system to add multiple accessories to the accessory group via a single user input, thereby reducing the number of inputs needed to perform an operation.

In some embodiments, while displaying the selectable option (e.g., 1024*b*-1024*e*) that, when selected, selects the fourth accessory and the fifth accessory for including in the accessory group, the computer system (e.g., 100, 300, 500, and/or 600) detects (1144), via the one or more input devices, a fifth user input (e.g., 1050*i*) (e.g., a tap gesture) requesting to display the first accessory user interface object (e.g., 1032*a*) and the second accessory user interface object (e.g., 1032*b*) (e.g., a user input on an expand user interface object of the selectable option). In response to detecting the fifth user input (e.g., 1050*i*), the computer system (e.g., 100, 300, 500, and/or 600) displays (1146), via the display generation component (e.g., 602), the first accessory user interface object (e.g., 1032*a*) and the second accessory user interface object (e.g., 1032*b*) (e.g., expanding a region corresponding to the first room to show accessory user interface objects corresponding to each of the accessories associated with the first room). Displaying the first accessory user interface object and the second user interface object in response to detecting the fifth user input allows a user of the computer system to view individual accessory user interface objects corresponding to the accessories associated with the first room, thereby improving visual feedback.

In some embodiments, after grouping the first accessory and the second accessory into the accessory group, the computer system (e.g., 100, 300, 500, and/or 600) displays (1148), via the display generation component (e.g., 602), a third settings user interface (e.g., 1036 and/or 1060) (e.g., a user interface that is associated with the accessory group and includes one or more selectable options that enable the computer system to configure one or more settings of the accessory group (e.g., adjust and/or configure settings for each of the accessories of the accessory group together and/or individually)) associated with the accessory group, where the settings user interface (e.g., 1036 and/or 1060) includes an accessories user interface object (e.g., 1036*b* and/or 1060*b*) (e.g., a selectable user interface object and/or affordance that includes information about the accessories of the accessory group and/or enables individual control of settings of the accessories of the accessory group). In response to detecting, via the one or more input devices, a sixth user input (e.g., 1050*m*) (e.g., a tap gesture) corresponding to selection of the accessories user interface object (e.g., 1036*b* and/or 1060*b*), the computer system (e.g., 100, 300, 500, and/or 600) displays (1150), via the display generation component (e.g., 602), a third accessory user interface object (1152) (e.g., 1038*a*-1038*c*) (e.g., an affordance that, when selected, enables control of the first accessory (and not the second accessory)) corresponding to the first accessory and a fourth accessory user interface object (1154) (e.g., 1038*a*-1038*c*) (e.g., an affordance that, when selected, enables control of the second accessory (and not the first accessory)) corresponding to the second accessory. In some embodiments, the accessories user interface object includes an indication of a number of accessories in the accessory group. Displaying the third accessory user interface object and the fourth user interface object in response to detecting the sixth user input allows a user of the computer system to view individual accessory user interface objects corresponding to the accessories of the accessory group, thereby improving visual feedback.

In some embodiments, in response to detecting, via the one or more input devices, the sixth user input (e.g., 1050*m*) corresponding to selection of the accessories user interface object (1156) (e.g., 1036*b* and/or 1060*b*) and in accordance with a determination that the first accessory and the second accessory have a third configuration (e.g., a configuration shown at FIGS. 10Z and 10AA) (e.g., the first accessory and the second accessory have been designated and/or configured as a stereo pair, such that the first accessory is configured to output a left channel of audio content and the second accessory is configured to output a right channel of the audio content), the computer system (e.g., 100, 300, 500, and/or 600) displays (1158), via the display generation component (e.g., 602), a group user interface object (e.g., an affordance that, when selected, enables control of the first accessory and the second accessory) corresponding to the first accessory and the second accessory without displaying the third accessory user interface object (e.g., 1038*a*-1038*c*) and the fourth accessory user interface object (e.g., 1038*a*-1038*c*). Displaying the group user interface object without displaying the third accessory user interface object and the fourth accessory user interface object when the first accessory and the second accessory have a third configuration allows a user of the computer system to confirm and/or determine a configuration of the first accessory and the second accessory, thereby improving visual feedback.

In some embodiments, after grouping the first accessory and the second accessory into the accessory group, the computer system (e.g., 100, 300, 500, and/or 600) detects (1160), via the one or more input devices, one or more seventh user inputs (e.g., 1050*u* and/or 1050*v*) (e.g., one or more user inputs corresponding to an accessory user interface object corresponding to the first accessory (e.g., when the computer system is in an editing mode)) requesting to remove the first accessory from the accessory group (e.g., separate the first accessory from the accessory group so that the first accessory is not controlled together and/or concurrently with another accessory (e.g., the second accessory)). In response to detecting the one or more seventh user inputs (1162) (e.g., 1050*u* and/or 1050*v*), the computer system (e.g., 100, 300, 500, and/or 600) displays (1164), via the display generation component (e.g., 602), the first user interface object (1166) (e.g., 1002), different from the accessory group user interface object (e.g., 1042 and/or 1058), that corresponds to the first accessory and the second user interface object (1168) (e.g., 1018), different from the accessory group user interface object (e.g., 1042 and/or 1018), that corresponds to the second accessory. In response to detecting the one or more seventh user inputs (1162) (e.g., 1050*u* and/or 1050*v*), the computer system (e.g., 100, 300, 500, and/or 600) forgoes (1170) display of the accessory group user interface object (e.g., 1042 and/or 1058) (e.g., not displaying the accessory group user interface because the accessory group does not include other accessories in addition to the second accessory). Displaying the first user interface object and the second user interface object without displaying the accessory group user interface object when the first accessory is removed from the accessory group allows a user of the computer system to confirm and/or determine an association and/or configuration between accessories, thereby improving visual feedback.

In some embodiments, after grouping the first accessory and the second accessory into the accessory group, the computer system (e.g., 100, 300, 500, and/or 600) detects (1172), via the one or more input devices, one or more eighth user inputs (e.g., 1050*p*) requesting to adjust a third setting of the first accessory or the second accessory (e.g., one or more user inputs that request to a volume of content output by the first accessory or the second accessory and/or request to adjust playback settings of content output by the first accessory or the second accessory). In response to detecting the one or more eighth user inputs (e.g., 1050*p*), the computer system (e.g., 100, 300, 500, and/or 600) adjusts (1174) (e.g., concurrently adjusting) the third setting of the first accessory and the third setting of the second accessory (e.g., concurrently adjusts the volume as shown at FIGS. 10O and 10P) (e.g., synchronizing and/or concurrently adjusting the same setting of the first accessory and the second accessory by the same amount and/or in the same direction (e.g., increase or decrease)). Adjusting the third setting of the first accessory and the third setting of the second accessory in response to detecting the one or more eighth user inputs allows a user of the computer system to concurrently adjust the settings of multiple accessories, thereby reducing the number of inputs needed to perform an operation.

In some embodiments, after grouping the first accessory and the second accessory into the accessory group, the computer system (e.g., 100, 300, 500, and/or 600) causes (1176) the first accessory and the second accessory to output first content in conjunction with one another (e.g., playing music together as shown at FIGS. 10O-10Q) (e.g., the first accessory and the second accessory output (e.g., concurrently) content (e.g., audio) from the same media file). While causing the first accessory and the second accessory to output the first content in conjunction with one another, the computer system (e.g., 100, 300, 500, and/or 600) detects (1178), via the one or more input devices, a ninth user input (e.g., 1050*r*) (e.g., a tap gesture corresponding to selection of a pause and/or stop user interface object of a music user interface). In response to detecting the ninth user input (e.g., 1050*r*), the computer system (e.g., 100, 300, 500, and/or 600) causes (1180) the first accessory and the second accessory to cease output of the first content (e.g., pauses and/or stops playing music as shown at FIG. 10R) (e.g., causing both the first accessory and the second accessory to stop and/or pause output of the content). After causing the first accessory and the second accessory to cease output of the first content for a predetermined amount of time (e.g., one hour, one day, two days, five days, one week, three weeks, one month, two months, six months, one year, and/or longer than one year), the computer system (e.g., 100, 300, 500, and/or 600) detects (1182), via the one or more input devices, a tenth user input (e.g., user input corresponding to play user interface object 1048*b*) (e.g., a tap gesture corresponding to a play user interface object of a music user interface) requesting to cause the first accessory to output second content (e.g., the first content and/or content different from the first content). In response to detecting the tenth user input, the computer system (e.g., 100, 300, 500, and/or 600) causes (1184) the first accessory and the second accessory to output the second content in conjunction with one another (e.g., playing music together as shown at FIGS. 10O-10Q (e.g., the first accessory and the second accessory output (e.g., concurrently) content (e.g., audio) from the same media file). In some embodiments, the computer system maintains the first accessory and the second accessory in the accessory group so that the first accessory and the second accessory are configured to output content in conjunction with one another until the computer system receives user input requesting to remove the first accessory and/or the second accessory from the accessory group. In some embodiments, the computer system maintains the first accessory and the second accessory in the first accessory group indefinitely in the absence of user input requesting to separate the first accessory and/or the second accessory from the accessory group.

Causing the first accessory and the second accessory to output the second content in conjunction with one another in response to detecting the tenth user input allows the computer system to maintain the accessory group even after receiving a request to cease outputting the first content so that a user does not have to recreate the accessory group each time the accessory group ceases outputting content, thereby reducing the number of inputs needed to perform an operation.

Note that details of the processes described above with respect to method 1100 (e.g., FIGS. 11A-11G) are also applicable in an analogous manner to the methods described below/above. For example, methods 700, 900, 1300, and/or 1500 optionally include one or more of the characteristics of the various methods described above with reference to method 1100. For example, computer systems that perform methods 700, 900, 1300, and/or 1500 can group the first accessory and the second accessory into the accessory group. For brevity, these details are not repeated below.

FIGS. 12A-12I illustrate exemplary user interfaces for managing camera accessories, in accordance with some embodiments. The user interfaces in these figures are used to illustrate the processes described below, including the processes in FIGS. 13A-13C.

In some embodiments, any of the inputs described herein (e.g., input 1250*a*, 1250*b*, 1250*c*, 1250*d*, 1250*e*, 1250*f*, 1250*g*, 1250*h*, 1250*i*, and/or 1250*j*) is or includes a touch input (e.g., a tap gesture and/or a swipe gesture). In some embodiments, any of the inputs described herein (e.g., input 1250*a*, 1250*b*, 1250*c*, 1250*d*, 1250*e*, 1250*f*, 1250*g*, 1250*h*, 1250*i*, and/or 1250*j*) is or includes a voice input (e.g., a voice command to select a user interface element or to activate a feature or perform a function, such as a feature or function associated with a user interface element). In some embodiments, any of the inputs described herein (e.g., input 1250*a*, 1250*b*, 1250*c*, 1250*d*, 1250*e*, 1250*f*, 1250*g*, 1250*h*, 1250*i*, and/or 1250*j*) is or includes an air gesture (e.g., an air gesture to select a user interface element or to activate a feature or perform a function, such as a feature or function associated with a user interface element). In some embodiments, any of the inputs described herein (e.g., input 1250*a*, 1250*b*, 1250*c*, 1250*d*, 1250*e*, 1250*f*, 1250*g*, 1250*h*, 1250*i*, and/or 1250*j*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

Figure 12A:
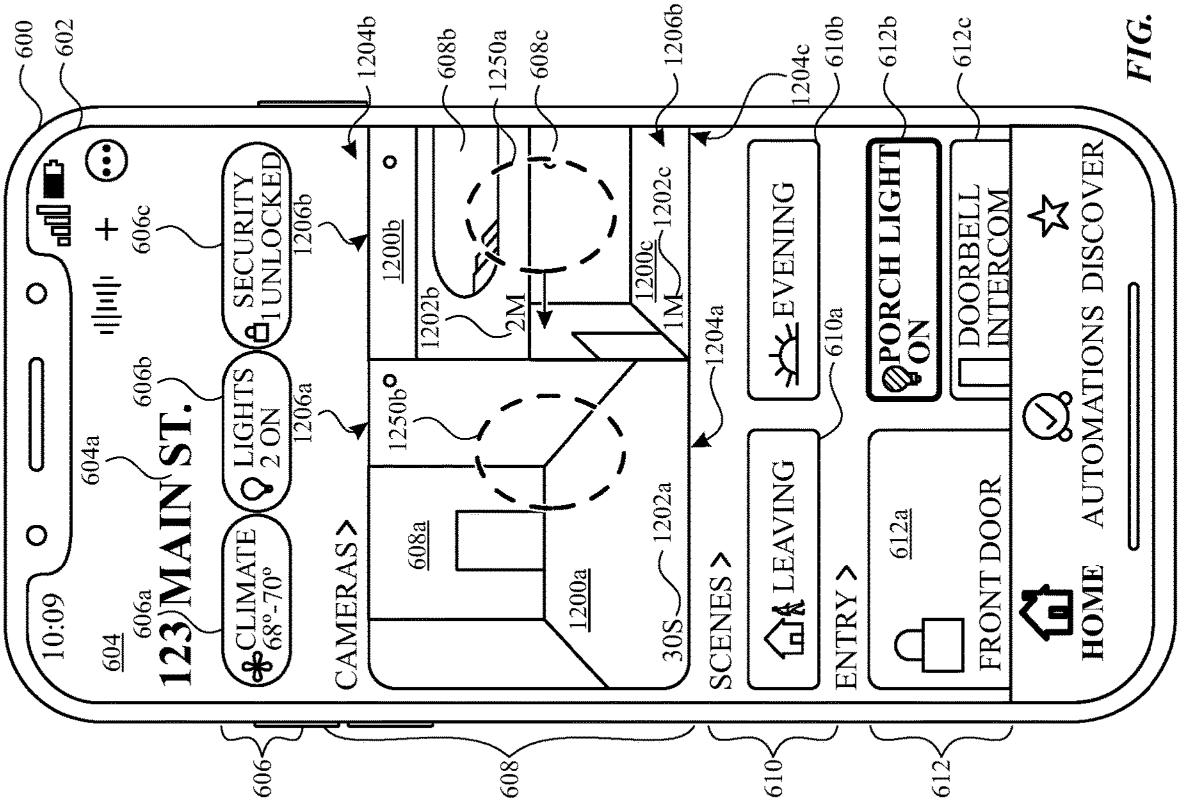
Figure 13A:
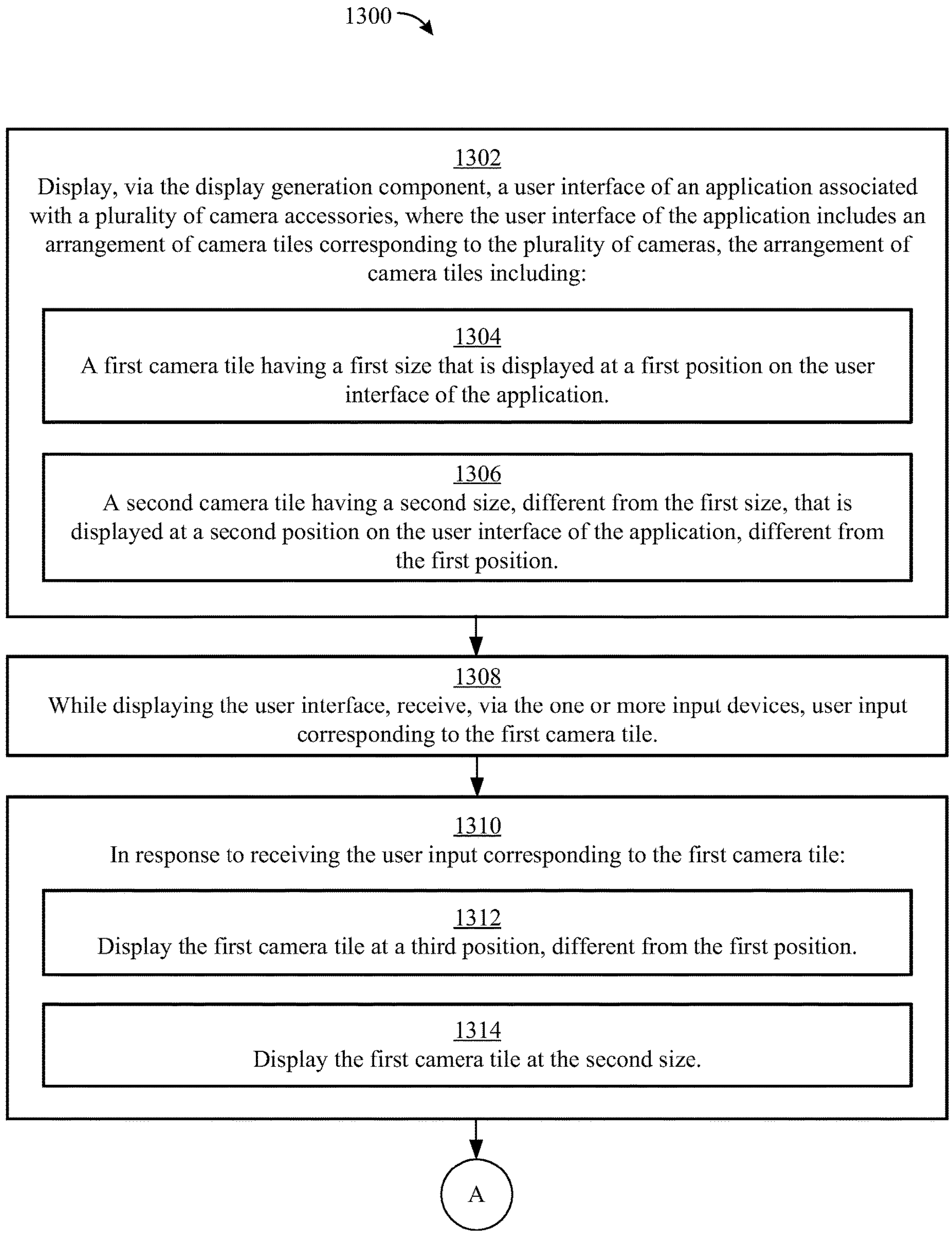
FIGS. 13A-13C are a flow diagram illustrating methods for managing camera accessories, in accordance with some embodiments.
Figure 13B:
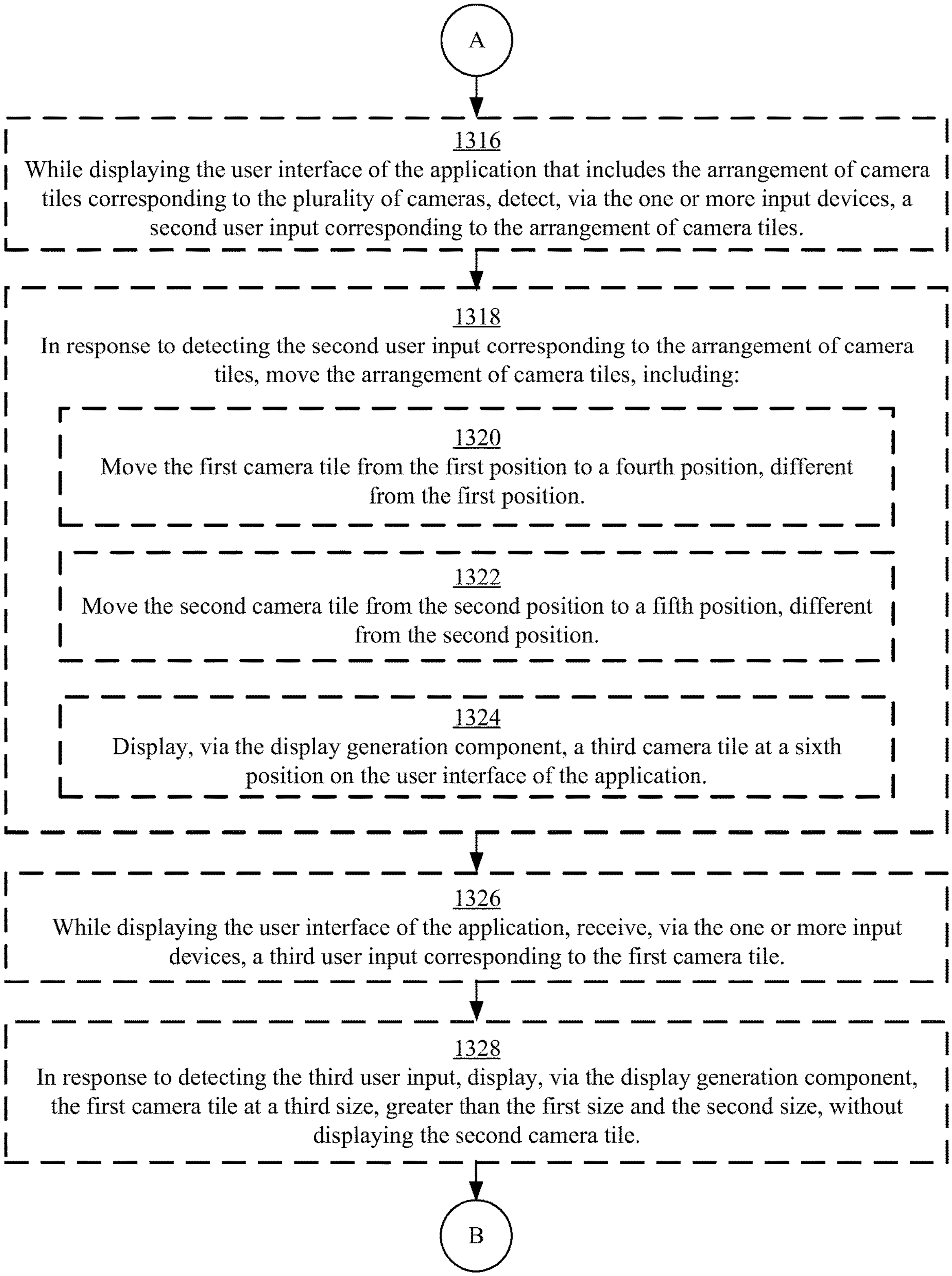
Figure 13C:
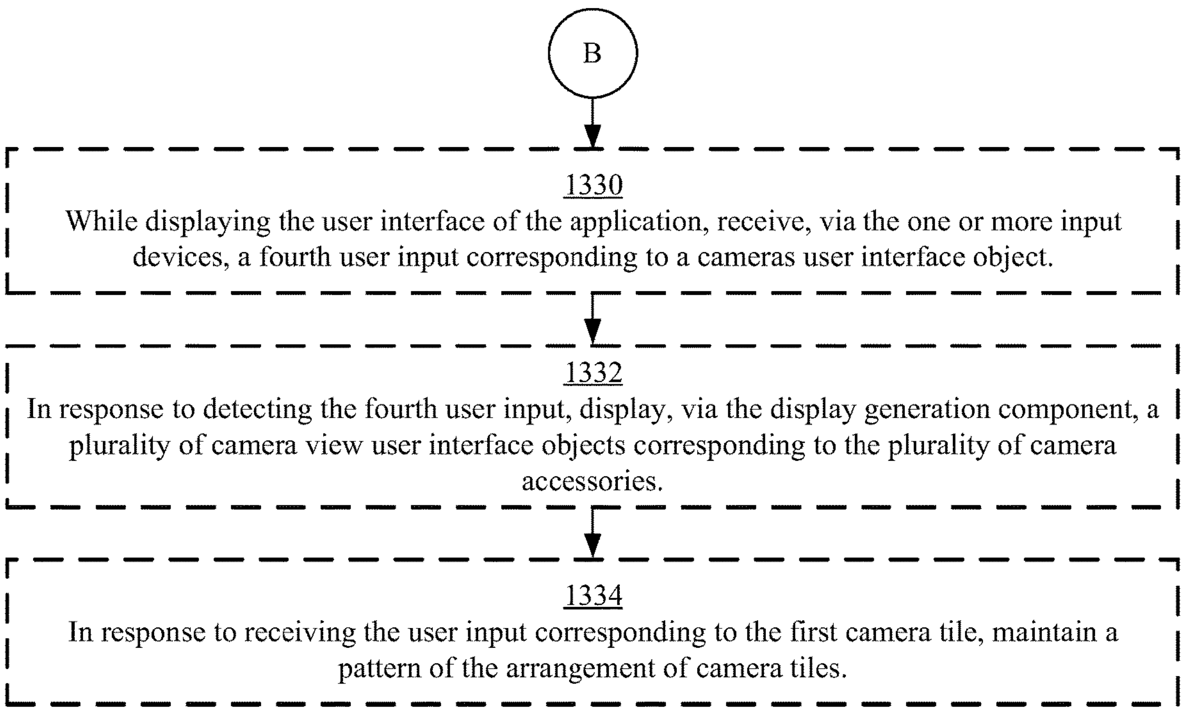

FIG. 12A illustrates electronic device 600 displaying, via display 602, home user interface 604 that is associated with the home automation system. At FIG. 12A, home user interface 604 includes camera region 608 having camera tiles 608*a*-608*c*. Camera tiles 608*a*-608*c* correspond to respective camera accessory devices of the home automation system. At FIG. 12A, camera tiles 608*a*-608*c* include camera views 1200*a*-1200*c* (e.g., one or more images and/or video (e.g., live video)) that are based on information (e.g., image and/or video data) received from the respective camera accessory device. Camera tiles 608*a*-608*c* include time indicators 1202*a*-1202*c*, which provide an indication about a time at which camera views 1200*a*-1200*c* were last updated (e.g., a time at which electronic device 600 last received image and/or video data from the respective camera accessory device). Accordingly, camera region 608 allows a user of electronic device 600 to quickly view images associated with respective camera accessory devices to determine a status of the location (e.g., a home) associated with the home automation system.

At FIG. 12A, electronic device 600 displays camera tiles 608*a*-608*c* in a first arrangement (e.g., a first pattern of respective positions of camera tiles 608*a*-608*c*, such as a mosaic pattern). For instance, at FIG. 12A, first camera tile 608*a* is displayed at first position 1204*a* and having first size 1206*a*, second camera tile 608*b* is displayed at a second position 1204*b* and having second size 1206*b*, and third camera tile 608*c* is displayed at third position 1204*c* and having second size 1206*b*. At FIG. 12A, first size 1206*a* of first camera tile 608*a* is larger than second size 1206*b* of second camera tile 608*b* and third camera tile 608*c*. In some embodiments, first size 1206*a* of first camera tile 608*a* is twice the size of second size 1206*b* of second camera tile 608*b* and third camera tile 608*c*, such that first camera tile 608*a* occupies the same amount of a display area of display 602 as both second camera tile 608*b* and third camera tile 608*c*. At FIG. 12A, second camera tile 608*b* is displayed at position 1204*b*, which is above position 1204*c* of third camera tile 608*c*. Thus, second camera tile 608*b* and third camera tile 608*c* are displayed as being stacked relative to one another. At FIG. 12A, first camera tile 608*a* is not displayed as being stacked relative to another camera tile.

In some embodiments, electronic device 600 displays camera tiles 608*a*-608*c* in the first arrangement when electronic device 600 determines that at least a predetermined number (e.g., three) of camera accessory devices are associated with and/or included in the home automation system. In some embodiments, electronic device 600 displays camera region 608 as having two camera tiles that are the same size when electronic device 600 determines that two camera devices are associated with and/or included in the home automation system. In some embodiments, electronic device 600 displays camera region 608 having any number of camera tiles arranged in the first arrangement.

When the home automation system includes additional camera accessory devices (e.g., more than three camera accessory devices), electronic device 600 is able to display additional camera tiles (e.g., camera tiles different from camera tiles 608*a*-608*c*) in response to detecting user input. For instance, at FIG. 12A, electronic device 600 detects user input 1250*a* (e.g., a swipe gesture or other selection/navigation input) on camera region 608. In response to detecting user input 1250*a*, electronic device 600 scrolls and/or moves camera tiles 608*a*-608*c* to display fourth camera tile 608*d*, as shown at FIG. 12B.

Figure 12D:
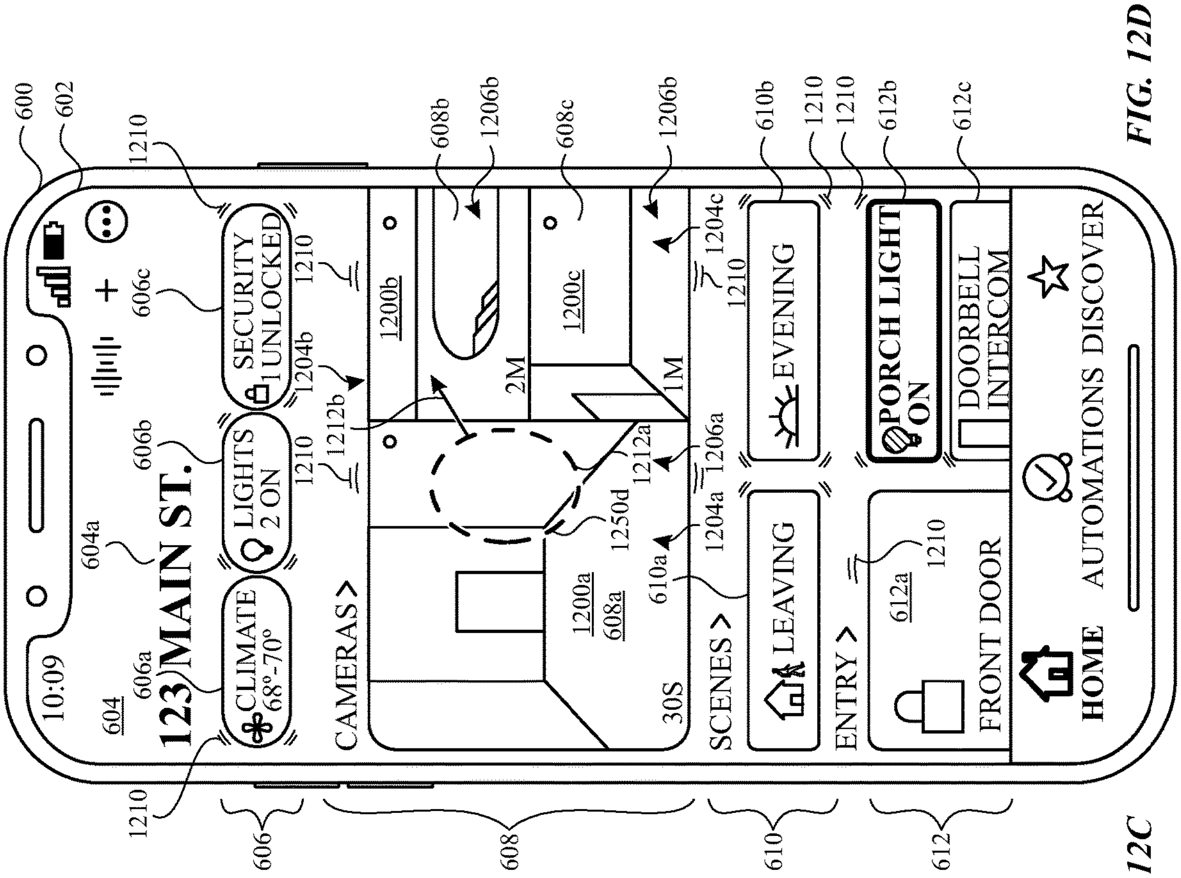

Electronic device 600 is also able to modify and/or change the respective positions of camera tiles 608*a*-608*c* within camera region 608 via an editing mode of electronic device 600. At FIG. 12A, electronic device 600 detects (e.g., in addition to detecting user input 1250*a* or in lieu of detecting user input 1250*a*) user input 1250*b* (e.g., a gesture with a duration that satisfies a threshold duration or other selection/navigation input) corresponding to home user interface 604. In response to detecting user input 1250*b*, electronic device 600 activates and/or initiates the editing mode, as shown at FIG. 12D.

At FIG. 12B, electronic device 600 displays home user interface 604 after scrolling and/or moving camera tiles 608*a*-608*c*, such that electronic device 600 displays fourth camera tile 608*d*. At FIG. 12B, electronic device 600 has moved camera tiles 608*a*-608*c* so that first camera tile 608*a* is not displayed (e.g., electronic device 600 moved first camera tile 608*a* off of display 602) and second camera tile 608*b* and third camera tile 608*c* have both moved to the left with respect to display 602. At FIG. 12B, electronic device 600 displays camera tiles 608*b*-608*d* in the first arrangement. For instance, second camera tile 608*b* is displayed at fourth position 1204*d* and having second size 1206*b*, third camera tile 608*c* is displayed at fifth position 1204*e* and having second size 1206*b*, and fourth camera tile 608*d* is displayed at sixth position 1204*f* and having first size 1206*a*. Therefore, electronic device 600 repeats a pattern (e.g., a pattern including one camera tile displayed at first size 1206*a* followed by two camera tiles displayed at second size 1206*b*) of the first arrangement, such that fourth camera tile 608*d* is displayed at the same size (e.g., first size 1206*a*) as first camera tile 608*a*. In some embodiments, in response to detecting another swipe and/or scroll gesture on camera region 608, electronic device 600 displays fifth and/or sixth camera tiles having second size 1206*b*. In some embodiments, electronic device 600 repeats the pattern of the first arrangement for all camera tiles that are included in camera region 608.

At FIG. 12B, electronic device 600 detects user input 1250*c* (e.g., a tap gesture or other selection/navigation input) corresponding to selection of fourth camera tile 608*d*. In response to detecting user input 1250*c*, electronic device 600 displays camera view user interface 1208, as shown at FIG. 12C.

Figure 12C:
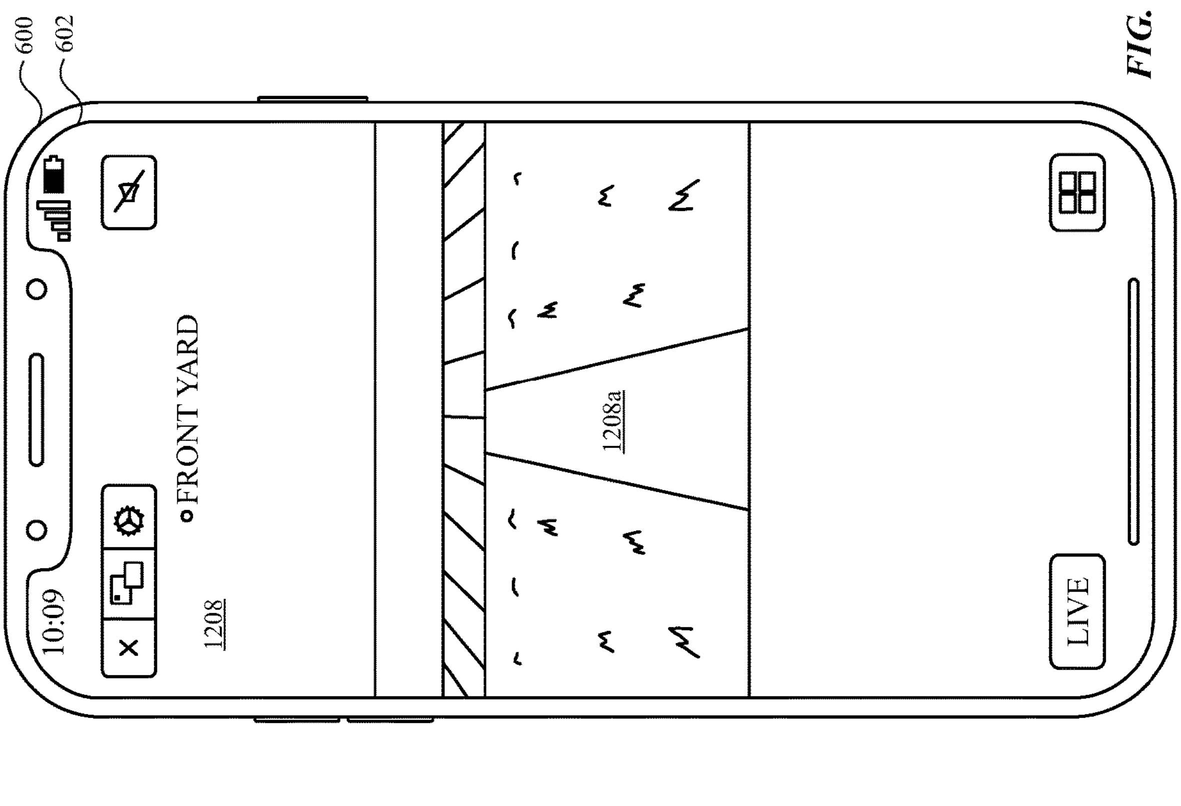

At FIG. 12C, camera view user interface 1208 includes camera view 1208*a* that includes an image and/or video of a camera accessory device associated with fourth camera tile 608*d*. Camera view user interface 1208 includes camera view 1208*a* at a size that is larger than camera view 1200*d* of fourth camera tile 608*d* shown at FIG. 12B. Accordingly, electronic device 600 enlarges and/or expands fourth camera tile 608*d* to display camera view user interface 1208 in response to detecting user input 1250*c*. Thus, a user of electronic device 600 can more easily view camera view 1208*a* and obtain information about the location associated with the home automation system.

As set forth above, in response to detecting user input 1250*b* corresponding to home user interface 604, electronic device 600 activates and/or initiates an editing mode of home user interface 604, as shown at FIG. 12D. At FIG. 12D, electronic device 600 displays user interface objects of home user interface 604 as moving over time (e.g., jiggling) to visually indicate that the editing mode is active. For instance, FIG. 12D shows movement indicators 1210 around user interface objects of home user interface 604 to indicate movement and/or an animation of the user interface objects. Illustrated movement indicators 1210 are provided for clarity, but are not part of the user interface of electronic device 600.

When electronic device 600 is in the editing mode, electronic device 600 is able to move respective positions of the displayed user interface objects of home user interface 604 in response to detecting user input. In particular, electronic device 600 can move camera tiles 608*a*-608*d* with respect to one another within camera region 608. In some embodiments, when electronic device 600 moves and/or adjusts a position of one of camera tiles 608*a*-608*d*, electronic device 600 also modifies and/or changes a size of the respective camera tile (e.g., changes the size of the respective camera tile from first size 1206*a* to second size 1206*b*, or vice versa). In some embodiments, when electronic device 600 moves and/or adjusts a position of one of camera tiles 608*a*-608*d*, electronic device also adjusts a position of one or more additional camera tiles 608*a*-608*d*.

At FIG. 12D, electronic device 600 detects user input 1250*d* (e.g., a tap and hold gesture followed by movement or other selection/navigation input) corresponding to first camera tile 608*a*. User input 1250*d* includes first component 1212*a* (e.g., a sustained contact component and/or a tap and hold gesture) and second component 1212*b* (e.g., a movement component). Second component 1212*b* includes movement of first component 1212*a* from first position 1204*a* of first camera tile 608*a* toward second position 1204*b* of second camera tile 608*b*. In response to detecting user input 1250*d*, electronic device 600 moves first camera tile 608*a* from first position 1204*a* to second position 1204*b*, as shown at FIG. 12E.

Figure 12F:
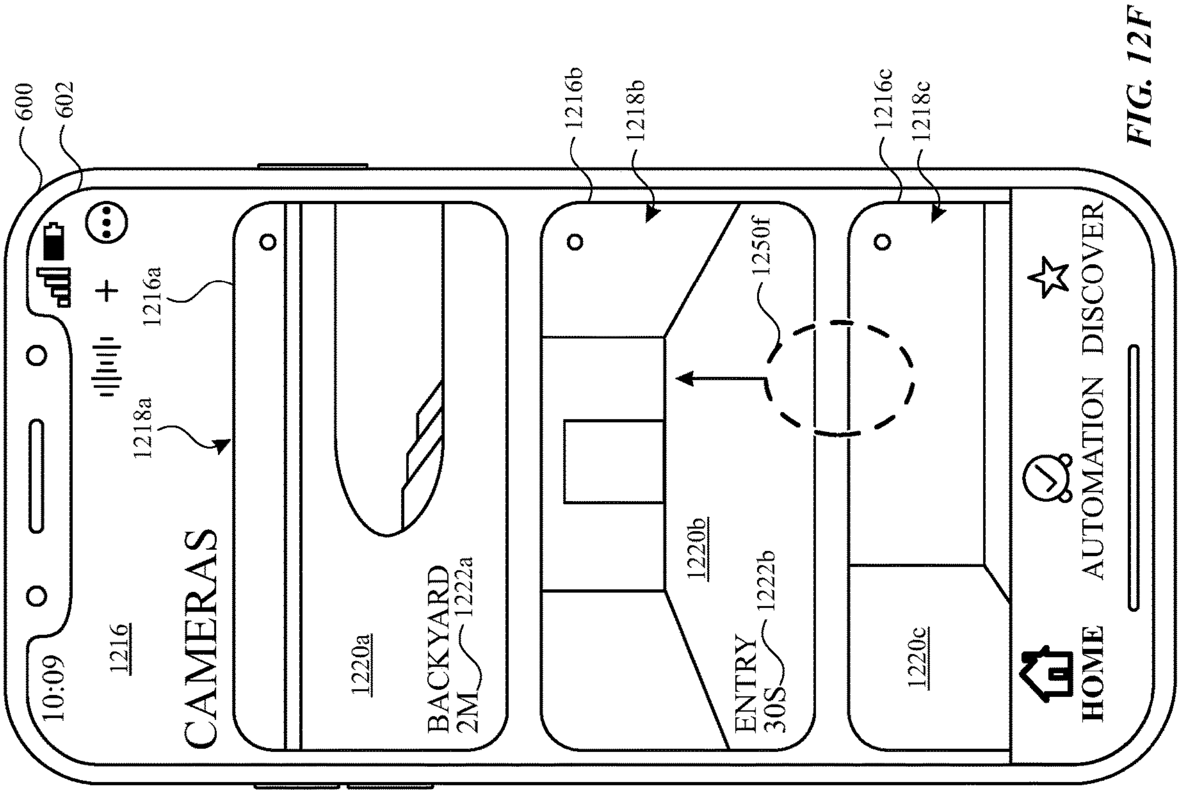
Figure 12E:
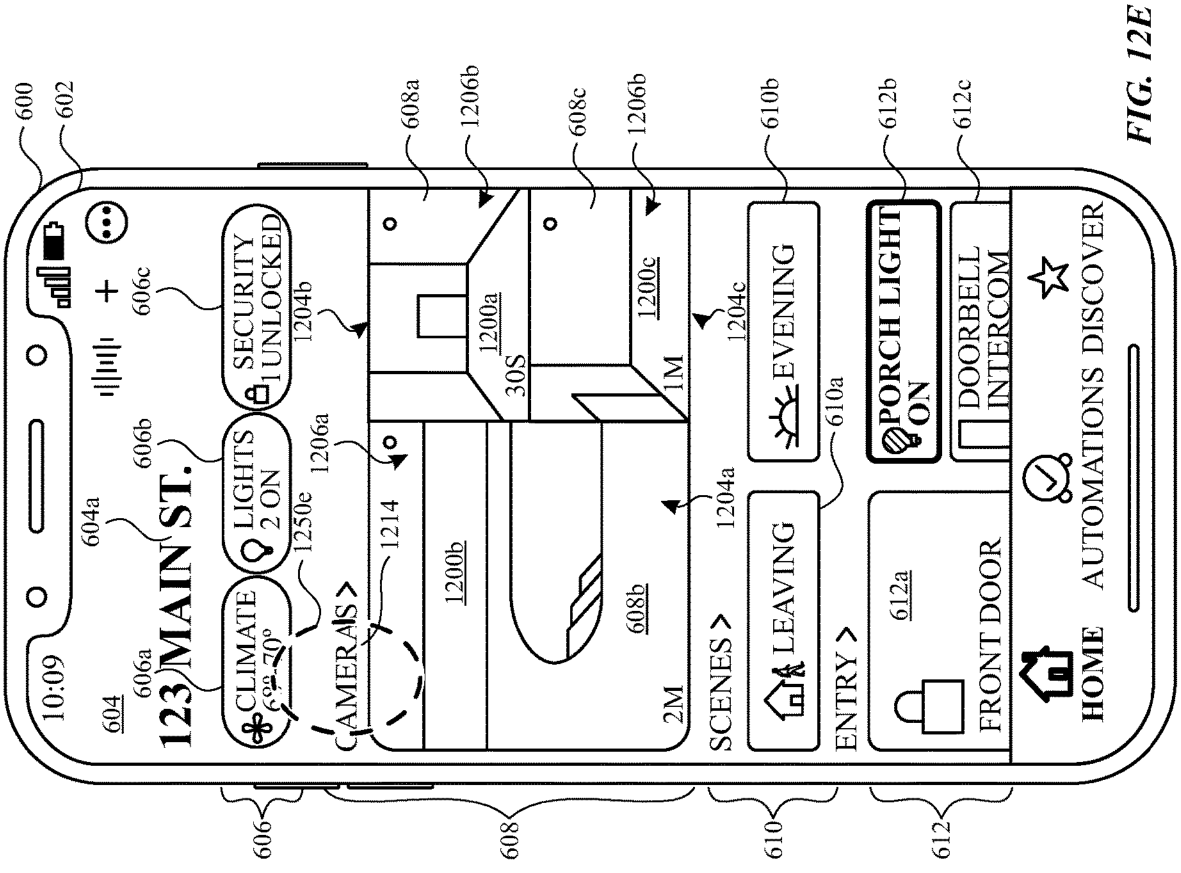

At FIG. 12E, electronic device 600 displays first camera tile 608*a* at second position 1204*b* and having second size 1206*b*. In addition, electronic device 600 displays second camera tile 608*b* at first position 1204*a* and having first size 1206*a*. Because second component 1212*b* included movement from first position 1204*a* to second position 1204*b*, electronic device 600 switches the respective positions of first camera tile 608*a* and second camera tile 608*b* on camera region 608. At FIG. 12E, electronic device 600 maintains display of the first arrangement of camera tiles 608*a*-608*c* on camera region 608. For example, electronic device 600 changes and/or adjusts the size of first camera tile 608*a* from first size 1206*a* to second size 1206*b* and changes and/or adjusts the size of second camera tile 608*b* from second size 1206*b* to first size 1206*a*. Therefore, electronic device 600 continues to display camera tiles 608*a*-608*c* in the same arrangement (e.g., the first arrangement) even though the respective positions and/or sizes of one or more camera tiles 608*a*-608*c* were changed.

In some embodiments, instead of switching the respective positions of first camera tile 608*a* and second camera tile 608*b*, electronic device 600 moves the respective positions of camera tiles 608*a*-608*c* in a clockwise and/or counter-clockwise direction. In some embodiments, electronic device 600 displays third camera tile 608*c* at first position 1204*a*, first camera tile 608*a* at second position 1204*b*, and second camera tile at third position 1204*c* in response to detecting user input 1250*d*.

At FIG. 12E, electronic device 600 has disabled and/or exited the editing mode, as indicated by the absence of movement indicators 1210. In some embodiments, electronic device 600 disables and/or exits the editing mode in response to detecting one or more user inputs, such as a swipe up gesture on home user interface 604. At FIG. 12E, electronic device 600 detects user input 1250*e* (e.g., a tap gesture or other selection/navigation input) corresponding to cameras user interface object 1214 of home user interface 604. In response to detecting user input 1250*e*, electronic device 600 displays camera user interface 1216, as shown at FIG. 12F.

At FIG. 12F, camera user interface 1216 includes camera user interface objects 1216*a*-1216*c* corresponding to respective camera accessory devices of the home automation system. In some embodiments, in response to detecting user input selecting a respective camera user interface object, electronic device 600 displays a camera view user interface (e.g., camera view user interface 1208), which provides an enlarged and/or expanded camera view associated with the selected camera user interface object.

At FIG. 12F, electronic device 600 arranges and/or displays camera user interface objects 1216*a*-1216*c* at positions that are associated with the first arrangement of camera region 608. For instance, first camera user interface object 1216*a* is displayed at first position 1218*a* (e.g., a top position) and first camera user interface object 1216*a* is associated with second camera tile 608*b*, which is displayed at first position 1204*a* of camera region 608. Second camera user interface object 1216*b* is displayed at second position 1218*b* and second camera user interface object 1216*b* is associated with first camera tile 608*a*, which is displayed at second position 1204*b* of camera region 608. Similarly, third camera user interface object 1216*c* is displayed at third position 1218c and third camera user interface object 1216c is associated with third camera tile 608c, which is displayed at third position 1204c of camera region 608. Accordingly, electronic device 600 displays and/or arranges camera user interface objects 1216a-1216c based on the arrangement of camera tiles 608a-608c of camera region 608. In some embodiments, electronic device 600 displays and/or arranges camera user interface objects 1216a-1216c based on a different criterion, such as alphabetical order and/or by room of the location associated with the home automation system.

At FIG. 12F, camera user interface objects 1216a-1216c include camera views 1220a-1220c (e.g., one or more images and/or video (e.g., live video)) that are based on information (e.g., image and/or video data) received from the respective camera accessory device. Camera user interface objects 1216a-1216c include time indicators 1222a-1222c, which provide an indication about a time at which camera views 1220a-1220c were last updated (e.g., a time at which electronic device 600 last received image and/or video data from the respective camera accessory device). Accordingly, camera user interface 1216 allows a user of electronic device 600 to quickly view images associated with respective camera accessory devices to determine a status of the location (e.g., a home) associated with the home automation system.

In some embodiments, camera user interface 1216 includes camera user interface objects for all camera accessory devices that are associated with and/or included in the home automation system. For instance, at FIG. 12F, electronic device 600 detects user input 1250f (e.g., a swipe gesture or other selection/navigation input) corresponding to camera user interface 1216. In response to detecting user input 1250f, electronic device 600 scrolls and/or moves camera user interface objects 1216a-1216c to display fourth camera user interface object 1216d, as shown at FIG. 12G.

Figure 12H:
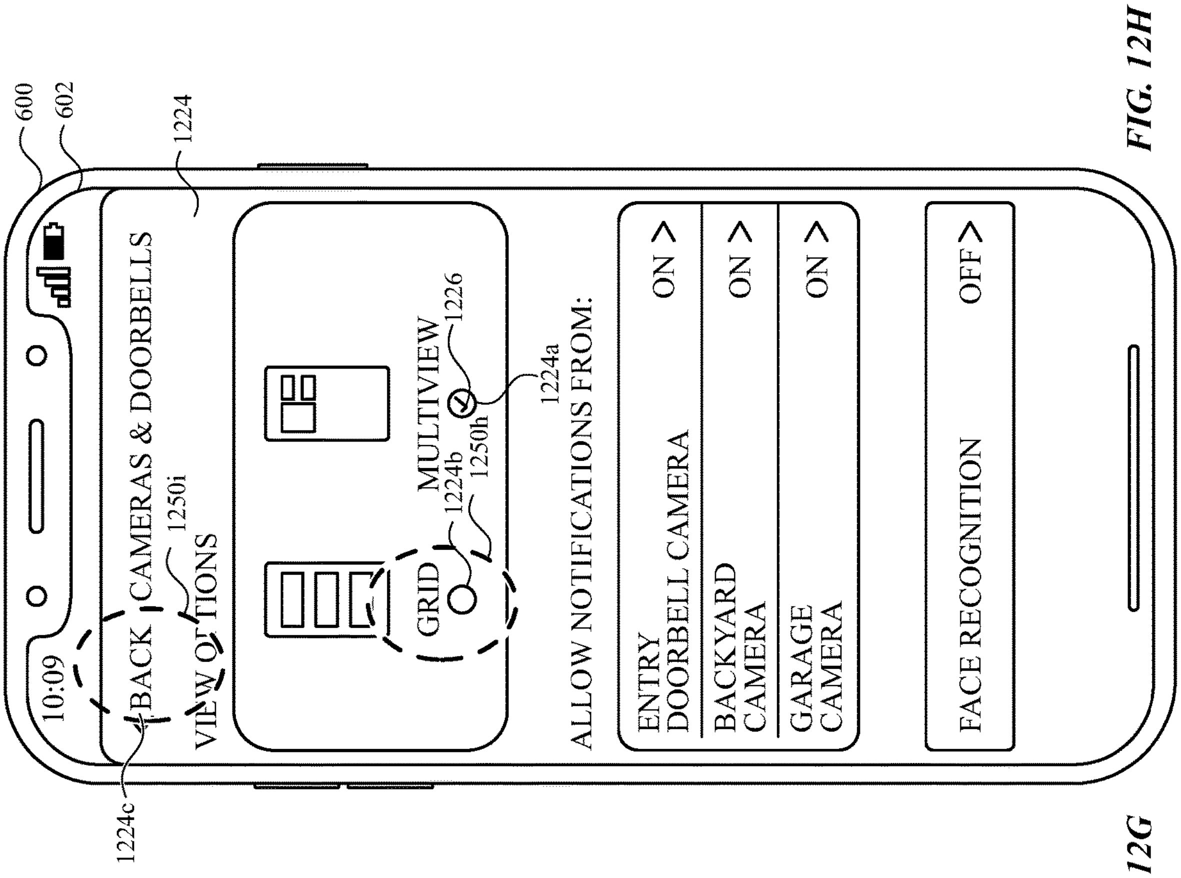
Figure 12G:
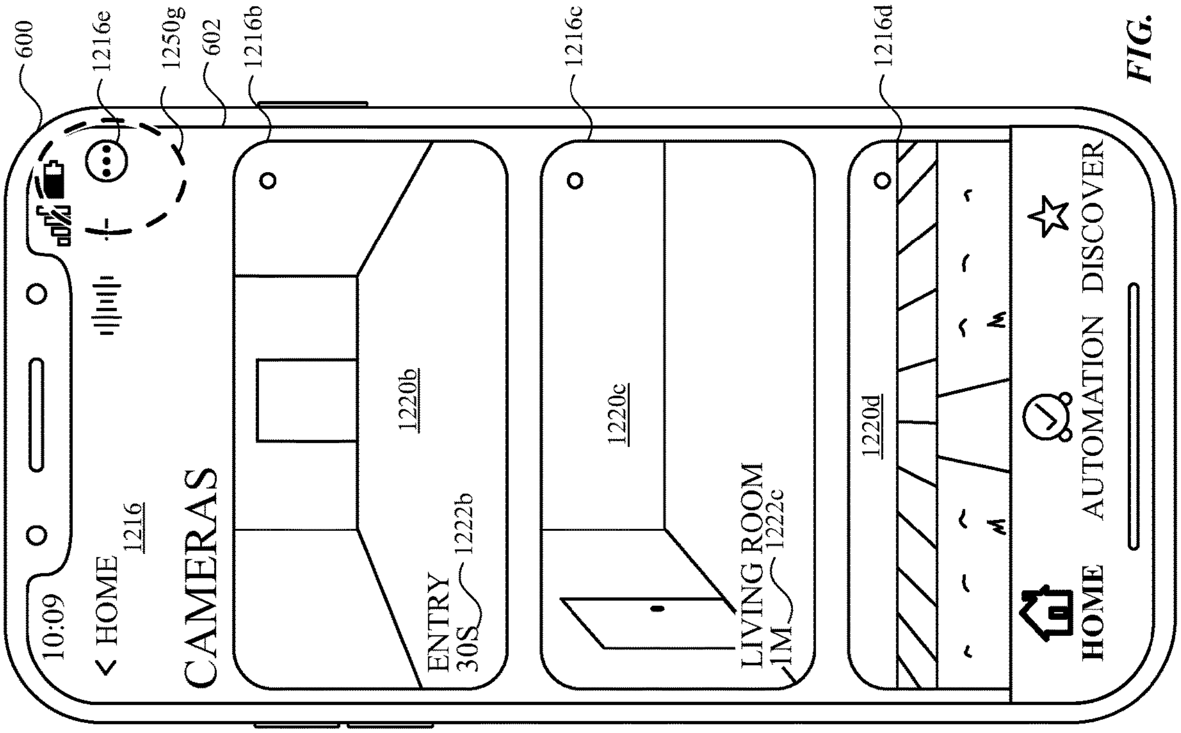

At FIG. 12G, fourth camera user interface object 1216d is associated with fourth camera tile 608d, and thus, electronic device 600 displays fourth camera user interface object 1216d after third camera user interface object 1216c. In some embodiments, electronic device 600 displays additional camera user interface objects in response to detecting additional user input (e.g., a swipe gesture) corresponding to camera user interface 1216.

Electronic device 600 is able to display camera tiles 608a-608d on camera region 608 of home user interface 604 in a second arrangement that is different from the first arrangement. For instance, at FIG. 12G, electronic device 600 detects user input 1250g (e.g., a tap gesture or other selection/navigation input) corresponding to settings user interface object 1216e of camera user interface 1216. In response to detecting user input 1250g, electronic device 600 displays camera settings user interface 1224, as shown at FIG. 12H.

At FIG. 12H, camera settings user interface 1224 includes first arrangement user interface object 1224a corresponding to the first arrangement of camera tiles 608a-608d on camera region 608 and second arrangement user interface object 1224b corresponding to a second arrangement of camera tiles 608a-608d on camera region 608. First arrangement user interface object 1224a includes selection indicator 1226 indicating and/or confirming that electronic device 600 displays camera tiles 608a-608d on camera region 608 with the first arrangement (e.g., the arrangement shown at FIGS. 12A-12E). At FIG. 12H, electronic device 600 detects user input 1250h (e.g., a tap gesture or other selection/navigation input) corresponding to second arrangement user interface object 1224b. In some embodiments, in response to detecting user input 1250h, electronic device 600 displays selection indicator 1226 on second arrangement user interface object 1224b and does not display (e.g., ceases to display and/or removes) selection indication 1226 on first arrangement user interface object 1224a.

At FIG. 12H, electronic device 600 detects user input 1250i (e.g., a tap gesture or other selection/navigation input) corresponding to back user interface object 1224c of camera settings user interface 1224. After detecting user input 1250i and 1250h, electronic device 600 displays home user interface 604 that includes camera tile 608a-608d displayed in the second arrangement, as shown at FIG. 12I.

Figure 12I:
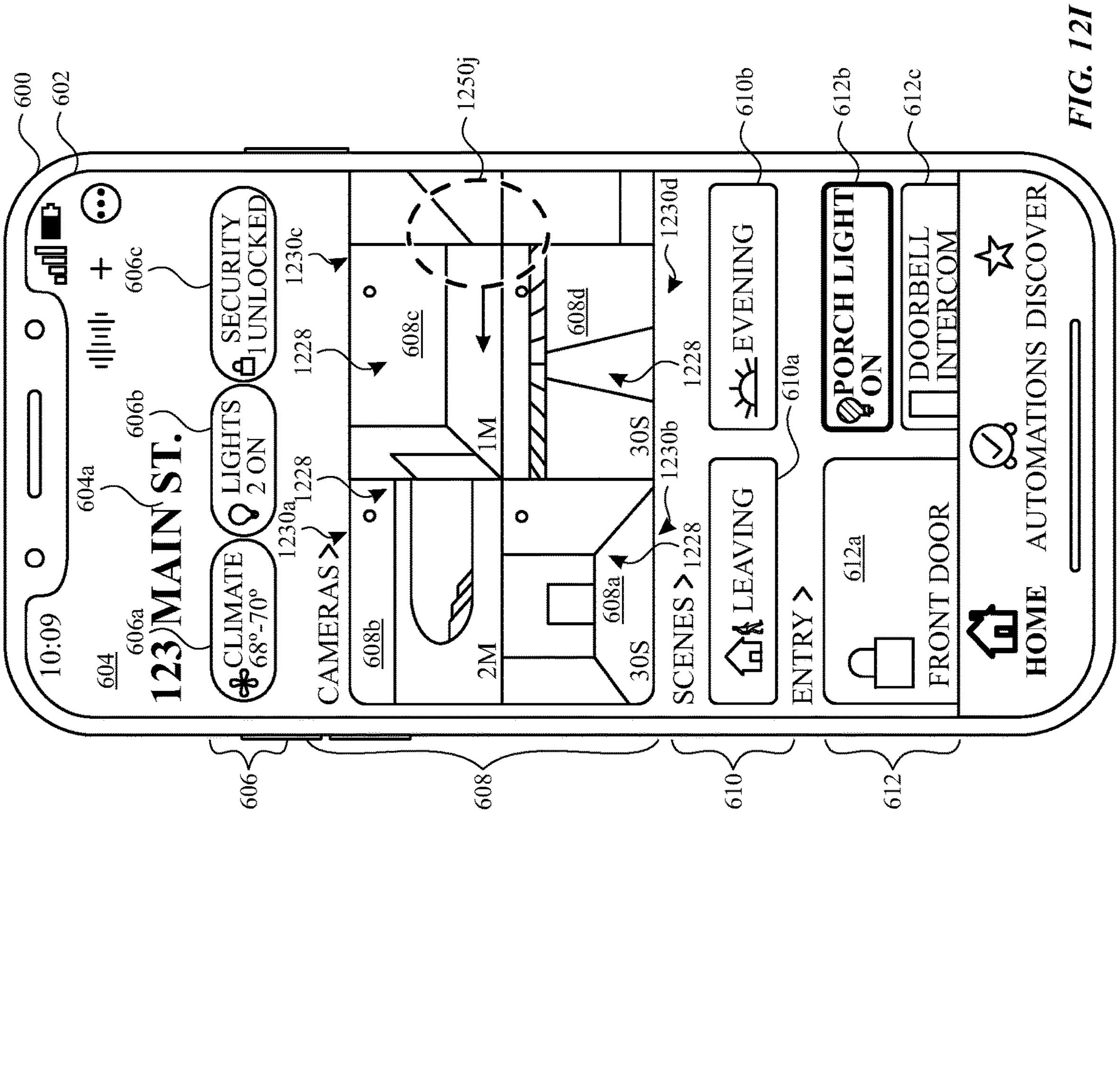

At FIG. 12I, the second arrangement of camera tiles 608a-608d includes electronic device 600 displaying camera tiles 608a-608d having third size 1228 and in a grid pattern. For instance, at FIG. 12I, electronic device 600 displays second camera tile 608b at first position 1230a having third size 1228, first camera tile 608a at second position 1230b having third size 1228, third camera tile 608c at third position 1230c having third size 1228, and fourth camera tile 608d at fourth position 1230d having third size 1228. Thus, electronic device 600 is configured to display camera tiles 608a-608d in different arrangements and/or patterns based on user preference.

In some embodiments, when electronic device 600 determines that more than four camera accessory devices are associated with and/or included in the home automation system, electronic device 600 can display additional camera tiles on camera region 608 having the second arrangement. For instance, at FIG. 12I, electronic device 600 detects user input 1250j (e.g., a swipe gesture or other selection/navigation input) corresponding to camera region 608. In some embodiments, in response to detecting user input 1250j, electronic device 600 moves camera tiles 608a-608d and displays one or more additional camera tiles on camera region 608 that are arranged in the second arrangement.

FIGS. 13A-13C are a flow diagram illustrating a method for managing camera accessories using a computer system in accordance with some embodiments. Method 1300 is performed at a computer system (e.g., 100, 300, 500, and/or 600) (e.g., an electronic device; a smart device, such as a smartphone or a smartwatch; a mobile device; a wearable device) that is in communication with one or more input devices and a display generation component (e.g., 602) (e.g., a display controller, a touch-sensitive display system, a projector, a display screen, a display monitor, and/or a holographic display). Some operations in method 1300 are, optionally, combined, the orders of some operations are, optionally, changed, and some operations are, optionally, omitted.

As described below, method 1300 provides an intuitive way for managing camera accessories. The method reduces the cognitive burden on a user for managing camera accessories, thereby creating a more efficient human-machine interface. For battery-operated computing devices, enabling a user to manage camera accessories faster and more efficiently conserves power and increases the time between battery charges.

The computer system (e.g., 100, 300, 500, and/or 600) displays (1302), via the display generation component (e.g., 602), a user interface (e.g., 604) (e.g., a home and/or default user interface of an application that is configured to enable control of one or more accessories and/or devices that are part of an automation system) of an application (e.g., an application of the computer system that corresponds to an automation system that includes one or more accessories and/or devices of a home, an enclosed space, and/or structure that are able to be controlled and/or adjusted via the computer system) associated with a plurality of camera accessories (e.g., two or more cameras that are configured to provide information about captured images and/or video (e.g., live video) to the computer system so that the computer system can display camera views on the user interface and/or other user interfaces of the application), where the user interface of the application includes an arrangement (e.g., an arrangement shown at FIGS. 12A, 12B, 12D and/or 12E) (e.g., a pattern, such as a mosaic pattern) of camera tiles (e.g., 608*a*-608*d*) (e.g., two or more user interface objects and/or affordances that include a camera view associated with a respective camera of the plurality of the cameras) (in some embodiments, the camera tiles are displayed and/or arranged in a mosaic pattern (e.g., a repeating mosaic pattern) that includes at least a first camera tile having a first size, a second camera tile having a second size, less than the first size, and a third camera tile having the second size (in some embodiments, the first size is twice the size of the second size, such that the first camera tile occupies the same area of the display generation component as both the second camera tile and the third camera tile) (in some embodiments, the mosaic pattern repeats itself based on a number of camera accessories in the plurality of camera accessories, such that a fourth camera tile is displayed at the first size, a fifth camera tile is displayed at the second size, and/or a sixth camera tile is displayed at the second size)) corresponding to the plurality of cameras.

The arrangement (e.g., an arrangement shown at FIGS. 12A, 12B, 12D and/or 12E) of camera tiles (e.g., 608*a*-608*d*) includes a first camera tile (1304) (e.g., 608*a*-608*d*) (e.g., a first user interface object and/or affordance that is associated with a first camera of the plurality of cameras) (in some embodiments, the first camera tile includes a first camera view associated with an image and/or video (e.g., a live video feed) captured by the first camera of the plurality of cameras) having a first size (e.g., 1206*a* and/or 1206*b*) (e.g., a first size relative to a display area of the display generation component) that is displayed at a first position (e.g., 1204*a*-1204*f*) (e.g., a first location of the display generation component) on the user interface (e.g., 604) of the application.

The arrangement (e.g., an arrangement shown at FIGS. 12A, 12B, 12D and/or 12E) of camera tiles (e.g., 608*a*-608*d*) includes a second camera tile (1306) (e.g., 608*a*-608*d*) (e.g., a second user interface object and/or affordance that is associated with a second camera of the plurality of cameras) (in some embodiments, the second camera tile includes a second camera view associated with an image and/or video (e.g., a live video feed) captured by the second camera of the plurality of cameras) having a second size (e.g., 1206*a* and/or 1206*b*) (e.g., a second size relative to the display area of the display generation component), different from the first size (e.g., 1206*a* and/or 1206*b*) (e.g., the second size is larger than or smaller than the first size), that is displayed at a second position (e.g., 1204*a*-1204*f*) (e.g., a second location of the display generation component) on the user interface (e.g., 604), different from the first position (e.g., 1204*a*-1204*f*) (e.g., the first camera tile and the second camera tile do not overlap one another).

While displaying the user interface (e.g., 604), the computer system (e.g., 100, 300, 500, and/or 600) receives (1308), via the one or more input devices, user input (e.g., 1250*d*) (e.g., a user input that includes a first component including sustained contact on the display generation component followed by a second component that includes movement of the sustained contact from a first position on the display generation component toward a second position on the display generation component) corresponding to the first camera tile (e.g., 608*a*-608*d*).

In response to receiving the user input (e.g., 1250*d*) corresponding to the first camera tile (1310) (e.g., 608*a*-608*d*), the computer system (e.g., 100, 300, 500, and/or 600) displays (1312) (e.g., moving and/or changing a position of) the first camera tile (e.g., 608*a*-608*d*) at a third position (e.g., 1204*a*-1204*f*) (e.g., a third location of the display generation component), different from the first position (e.g., 1204*a*-1204*f*) (e.g., the first camera tile moves from the first position to the third position). In some embodiments, in response to receiving the user input corresponding to the first camera tile, the second camera tile and/or a third camera tile moves, changes position, and/or is otherwise displayed at a different position when compared to a previous position at which that the second camera tile and/or the third camera tile was displayed prior to receiving the user input corresponding to the first camera tile.

In response to receiving the user input (e.g., 1250*d*) corresponding to the first camera tile (1310) (e.g., 608*a*-608*d*), the computer system (e.g., 100, 300, 500, and/or 600) displays (1314) the first camera tile (e.g., 608*a*-608*d*) at the second size (e.g., 1206*a* and/or 1206*b*) (e.g., changing, resizing, and/or adjusting display of the first camera tile to increase and/or decrease the size of the first camera tile). In some embodiments, in response to receiving the user input corresponding to the first camera tile, the computer system changes and/or adjusts a size of the second camera tile (e.g., from the second size to the first size) and/or a third camera tile.

Displaying the first camera tile at the third position and at the second size in response to receiving the user input allows a user of the computer system to customize the arrangement of camera tiles into a preferred arrangement so that the user does not have to provide additional user inputs searching for a desired camera tile, thereby reducing the number of inputs needed to perform an operation.

In some embodiments, while displaying the user interface (e.g., 604) of the application that includes the arrangement (e.g., an arrangement shown at FIGS. 12A, 12B, 12D and/or 12E) of camera tiles (e.g., 608*a*-608*d*) corresponding to the plurality of cameras, the computer system (e.g., 100, 300, 500, and/or 600) detects (1316), via the one or more input devices, a second user input (e.g., 1250*a*) (e.g., a swipe gesture, a rotational user input, and/or a scroll gesture) corresponding to the arrangement (e.g., an arrangement shown at FIGS. 12A, 12B, 12D and/or 12E) of camera tiles (e.g., 608*a*-608*d*). In response to detecting the second user input (e.g., 1250*a*) corresponding to the arrangement (e.g., an arrangement shown at FIGS. 12A, 12B, 12D and/or 12E) of camera tiles (e.g., 608*a*-608*d*), the computer system (e.g., 100, 300, 500, and/or 600) moves (1318)(e.g., scrolling) the arrangement (e.g., an arrangement shown at FIGS. 12A, 12B, 12D and/or 12E) of camera tiles (e.g., 608*a*-608*d*), including the computer system (e.g., 100, 300, 500, and/or 600) moving (1320) the first camera tile (e.g., 608*a*-608*d*) from the first position (e.g., 1204*a*-1204*f*) to a fourth position (e.g., 1204*a*-1204*f*), different from the first position (e.g., 1204*a*-1204*f*) (e.g., moving the first camera tile in a direction associated with a movement component of the second user input), the computer system (e.g., 100, 300, 500, and/or 600) moving (1322) the second camera tile (e.g., 608*a*-608*d*) from the second position (e.g., 1204*a*-1204*f*) to a fifth position (e.g., 1204*a*-1204*f*), different from the second position (e.g., 1204*a*-1204*f*) (e.g., moving the second camera tile in a direction associated with a movement component of the second user input), and the computer system (e.g., 100, 300, 500, and/or 600) displaying (1324), via the display generation component (e.g., 602), a third camera tile (e.g., 608*a*-608*d*) (e.g., a third user interface object and/or affordance that is associated with a third camera of the plurality of cameras) (in some embodiments, the third camera tile includes a third camera view associated with an image and/or video (e.g., a live video feed) captured by the third camera of the plurality of cameras) at a sixth position (e.g., 1204*a*-1204*f*) (e.g., the first position, the second position, and/or another position that causes at least a portion of the third camera tile to be displayed on a display area of the display generation component) on the user interface (e.g., 604). In some embodiments, moving the first camera tile from the first position to the fourth position includes moving the first camera tile off of and/or partially off of a display area of the display generation component. In some embodiments, moving the second camera tile from the second position to the fifth position includes moving the second camera tile off of and/or partially off of a display area of the display generation component. In some embodiments, the third camera tile includes the first size. In some embodiments, the third camera tile includes the second size. In some embodiments, the computer system displays a fourth camera tile concurrently with the third camera tile in response to detecting the second user input. In some embodiments, the computer system displays the arrangement of camera tiles having a repeating pattern as respective camera tiles are scrolled and/or moved on the user interface. In some embodiments, the computer system does not change the respective positions of the camera tiles relative to one another in response to detecting the second user input.

Moving the first camera tile, moving the second camera tile, and displaying the third camera tile in response to detecting the second user input allows a user of the computer system to quickly scroll through the camera tiles without having to navigate to another user interface, thereby reducing the number of inputs needed to perform an operation.

In some embodiments, moving the arrangement (e.g., an arrangement shown at FIGS. 12A, 12B, 12D and/or 12E) of camera tiles (e.g., 608*a*-608*d*) includes the computer system (e.g., 100, 300, 500, and/or 600) displaying the arrangement (e.g., an arrangement shown at FIGS. 12A, 12B, 12D and/or 12E) of camera tiles (e.g., 608*a*-608*d*) in a pattern (e.g., a pattern that includes a first number of camera tiles being displayed at the first size followed by a second number of camera tiles being displayed at the second size) that repeats (e.g., the second number of camera tiles displayed at the second size is followed by the first number of camera tiles being displayed at the first size, and so forth) as the arrangement of camera tiles moves (e.g., as shown at FIGS. 12A and 12B) (e.g., as additional camera tiles of the arrangement of camera tiles are displayed and displayed camera tiles of the arrangement of camera tiles move off of the display area of the display generation component). Displaying the pattern that repeats as the arrangement of camera tiles moves allows a user of the computer system to easily distinguish between different camera tiles as the camera tiles move because the repeating pattern includes camera tiles displayed at different sizes, thereby providing improved visual feedback.

In some embodiments, while displaying the user interface (e.g., 604) of the application, the computer system (e.g., 100, 300, 500, and/or 600) receives (1326), via the one or more input devices, a third user input (e.g., 1250*c*) (e.g., a tap gesture) corresponding to the first camera tile (e.g., 608*a*-608*d*). In response to detecting the third user input (e.g., 1250*c*), the computer system (e.g., 100, 300, 500, and/or 600) displays (1328), via the display generation component (e.g., 602), the first camera tile at a third size (e.g., a size shown at FIG. 12C) (e.g., a size that occupies at least a majority (e.g., at least half) of a display area of the display generation component and/or a size that occupies an entire display area of the display generation component), greater than the first size (e.g., 1206*a* and/or 1206*b*) and the second size (e.g., 1206*a* and/or 1206*b*), without displaying the second camera tile (e.g., 608*a*-608*d*) (e.g., the first camera tile is enlarged and/or expanded in response to detecting the third user input, such that the first camera tile is displayed without the other camera tiles of the arrangement of camera tiles). Displaying the first camera tile at the third size, greater than the first size and the second size, without displaying the second camera tile allows a user of the computer system to quickly enlarge and/or expand the first camera tile without having to navigate to another user interface, thereby reducing the number of inputs needed to perform an operation.

In some embodiments, while displaying the user interface (e.g., 604) of the application, the computer system (e.g., 100, 300, 500, and/or 600) receives (1330), via the one or more input devices, a fourth user input (e.g., 1250*e*) (e.g., a tap gesture) corresponding to a cameras user interface object (e.g., 1214) (e.g., a selectable user interface object and/or affordance that is displayed above the arrangement of camera tiles on the user interface). In response to detecting the fourth user input (e.g., 1250*e*), the computer system (e.g., 100, 300, 500, and/or 600) displays (1332), via the display generation component (e.g., 602), a plurality of camera view user interface objects (e.g., 1216*a*-1216*d*) (e.g., user interface objects that include an image and/or video (e.g., a live video feed) captured by a respective camera of an automation system that the computer system controls via the user interface) corresponding to the plurality of camera accessories (e.g., the plurality of camera view user interface objects correspond to all of the cameras accessories associated with the application). Displaying the plurality of camera view user interface objects in response to detecting the fourth user input allows a user of the computer system to access camera views associated with camera accessories that may not be displayed in the arrangement of camera tiles and without having to navigate to another user interface, thereby reducing the number of inputs needed to perform an operation.

In some embodiments, the first camera tile (e.g., 608*a*-608*d*) includes a first camera view (e.g., 1200*a*-1200*d*) (e.g., an image and/or video 9 e.g., live video feed) of a first camera accessory of the plurality of camera accessories and a time indicator (e.g., 1202*a*-1202*c*) (e.g., a time stamp and/or a numeric indicator) that indicates a time (e.g., a time of day and/or an amount of time that has passed since an image of the first camera view was captured by the first camera accessory and/or received by the computer system) at which an image of the first camera view was last updated (e.g., a time at which the image of the first camera view was captured by the first camera accessory, a time at which the image of the first camera view was last refreshed by the computer system, and/or a time at which the computer system last received information and/or data from the first camera accessory corresponding to the image of the first camera view). Displaying the first camera tile with the first camera view and the time indicator allows a user of the computer system to confirm and/or approximate when an image of the first camera view was taken, thereby providing improved visual feedback.

In some embodiments, the user input (e.g., 1250*d*) corresponding to the first camera tile (e.g., 608*a*-608*d*) is received while the computer system (e.g., 100, 300, 500, and/or 600) is in an editing mode of operation (e.g., a mode of operation shown at FIG. 12D) (e.g., a mode of operation that enables the computer system to move and/or resize user interface objects of the user interface with respect to one another in response to one or more user inputs). In some embodiments, the computer system is configured to activate and/or enable the editing mode in response to detecting user input with a duration that exceeds a threshold duration on the user interface. In some embodiments, the computer system displays movement and/or an animation of one or more of the user interface objects of the user interface to visually indicate that the computer system is in the editing mode. Receiving the user input when the computer system is in an editing mode of operation allows a user of the computer system to customize an arrangement of the user interface to position user interface objects in a manner that enables the user to quickly access relevant user interface objects, thereby reducing the number of inputs needed to perform an operation.

In some embodiments, in response to receiving the user input (e.g., 1250*d*) corresponding to the first camera tile (e.g., 608*a*-608*d*), the computer system (e.g., 100, 300, 500, and/or 600) maintains (1334) maintaining a pattern of the arrangement (e.g., an arrangement shown at FIGS. 12A, 12B, 12D and/or 12E) of camera tiles (e.g., 608*a*-608*d*) (e.g., even though the computer system moves the position of the first camera tile from the first position to the third position in response to receiving the user input, the computer system maintains an overall layout and/or pattern of arrangement of tiles (e.g., moving the first camera tile from the first position to the third position causes a third camera tile to move from the third position to the first position, the third camera tile changes from the second size to the first size when moving from the third position to the first position so that a respective camera tile at the first position includes the first size and a respective camera tile at the third position includes the second size)). Maintaining the pattern of the arrangement of camera tiles in response to receiving the user input allows a user of the computer system to easily distinguish between camera tiles because the arrangement of camera tiles displays camera tiles at different size, thereby providing improved visual feedback.

Note that details of the processes described above with respect to method 1300 (e.g., FIGS. 13A-13C) are also applicable in an analogous manner to the methods described below/above. For example, methods 700, 900, 1100, and/or 1500 optionally include one or more of the characteristics of the various methods described above with reference to method 1300. For example, computer systems that perform methods 700, 900, 1100, and/or 1500 can display the arrangement of camera tiles. For brevity, these details are not repeated below.

FIGS. 14A-14M illustrate exemplary user interfaces for displaying accessory user interface objects, in accordance with some embodiments. The user interfaces in these figures are used to illustrate the processes described below, including the processes in FIGS. 15A-15D.

In some embodiments, any of the inputs described herein (e.g., input 1450*a*, 1450*b*, 1450*c*, 1450*d*, 1450*e*, 1450*f*, 1450*g*, 1450*h*, 1450*i*, 1450*j*, and/or 1450*k*) is or includes a touch input (e.g., a tap gesture and/or a swipe gesture). In some embodiments, any of the inputs described herein (e.g., input 1450*a*, 1450*b*, 1450*c*, 1450*d*, 1450*e*, 1450*f*, 1450*g*, 1450*h*, 1450*i*, 1450*j*, and/or 1450*k*) is or includes a voice input (e.g., a voice command to select a user interface element or to activate a feature or perform a function, such as a feature or function associated with a user interface element). In some embodiments, any of the inputs described herein (e.g., input 1450*a*, 1450*b*, 1450*c*, 1450*d*, 1450*e*, 1450*f*, 1450*g*, 1450*h*, 1450*i*, 1450*j*, and/or 1450*k*) is or includes an air gesture (e.g., an air gesture to select a user interface element or to activate a feature or perform a function, such as a feature or function associated with a user interface element). In some embodiments, any of the inputs described herein (e.g., input 1450*a*, 1450*b*, 1450*c*, 1450*d*, 1450*e*, 1450*f*, 1450*g*, 1450*h*, 1450*i*, 1450*j*, and/or 1450*k*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

Figure 14B:
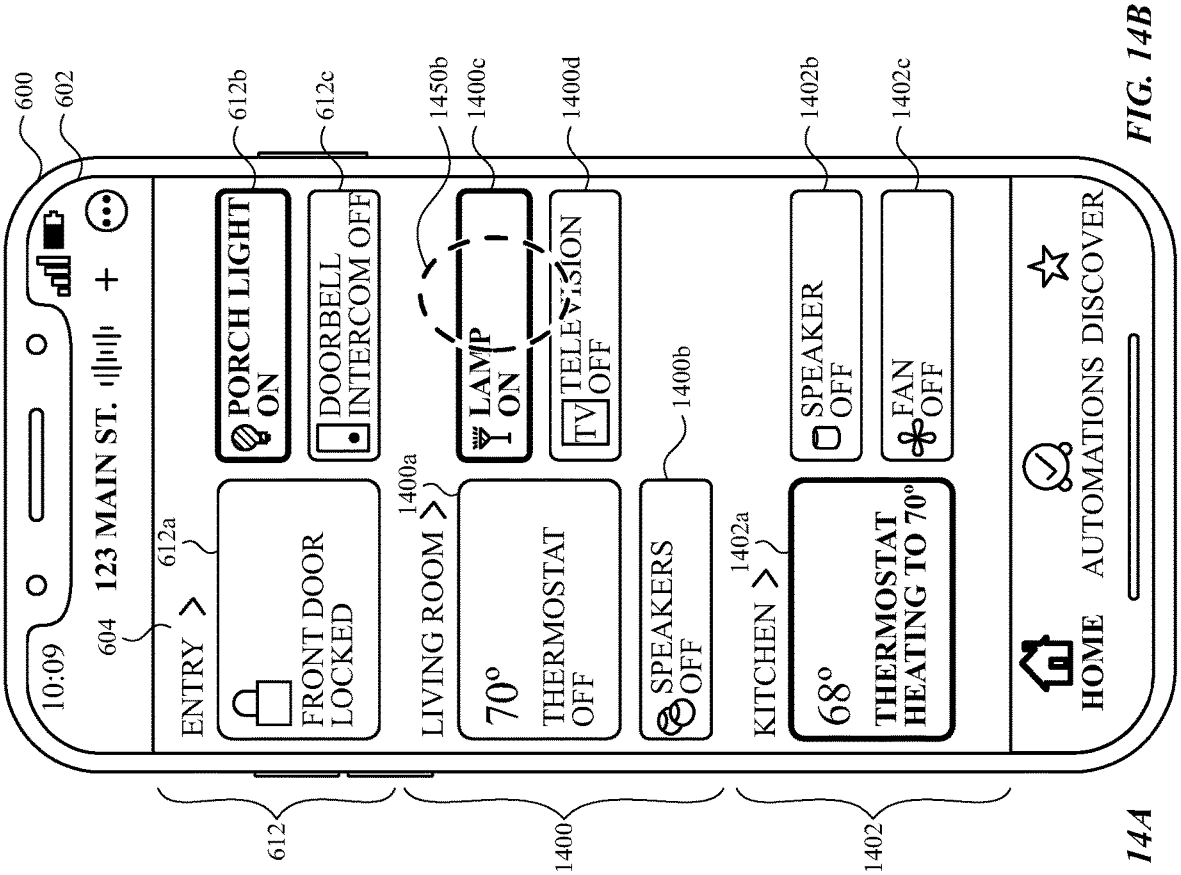
FIGS. 14A-14M illustrate exemplary user interfaces for displaying accessory user interface objects, in accordance with some embodiments.
Figure 14A:
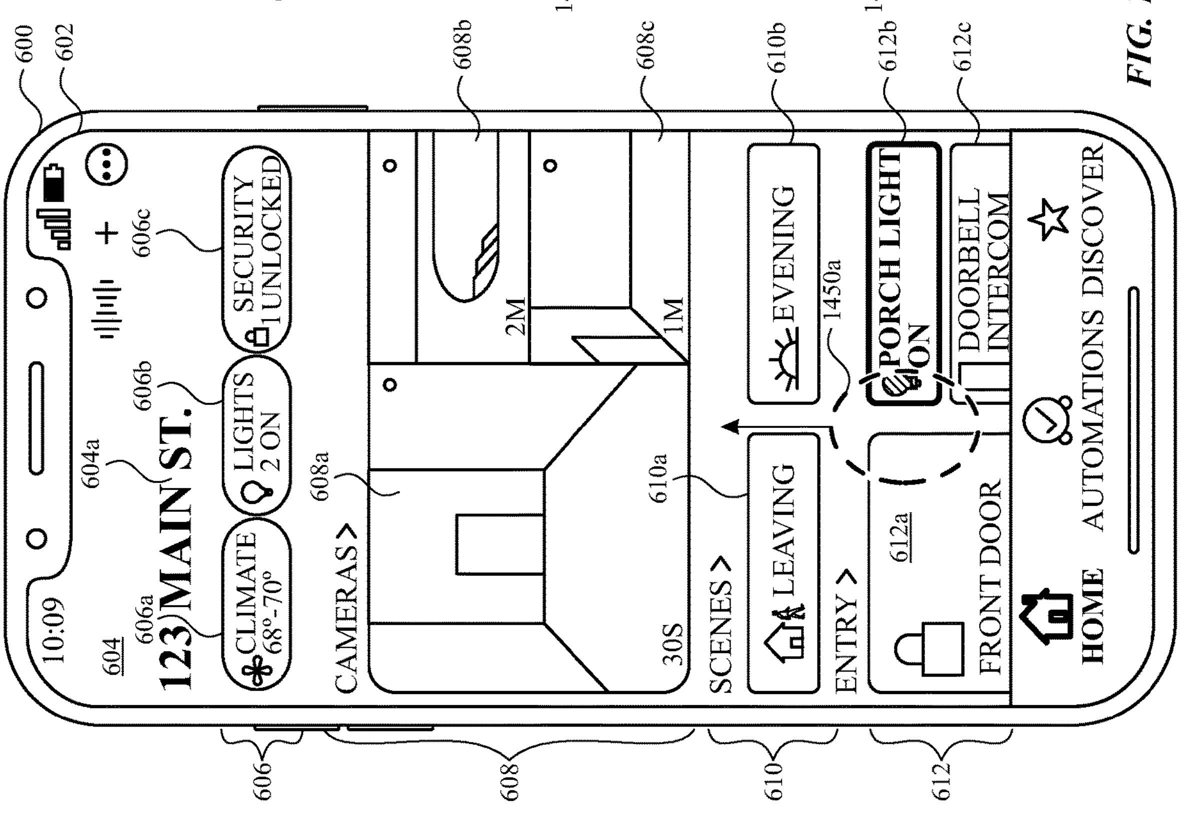

FIG. 14A illustrates electronic device 600 displaying, via display 602, home user interface 604 that is associated with the home automation system. At FIG. 14A, home user interface 604 includes home indicator 604*a* (e.g., "123 MAIN ST.") that provides an indication of a location (e.g., a physical address) of the location associated with the home automation system. In addition, home user interface 604 includes category region 606, camera region 608, scene region 610, and first room region 612. Home user interface 604 is scrollable so that one or more additional regions corresponding to respective rooms and/or accessories of the home automation system can be displayed in response to a swipe and/or scroll gesture on home user interface 604.

For instance, at FIG. 14A, electronic device 600 detects user input 1450*a* (e.g., a swipe gesture or other selection/navigation input) corresponding to home user interface 604. In response to detecting user input 1450*a*, electronic device 600 scrolls and/or moves regions of home user interface 604 and displays first room region 612, second room region 1400, and third room region 1402, as shown at FIG. 14B.

At FIG. 14B, first room region 612 is associated with an entry room and/or area of the location and includes accessory user interface objects 612*a*-612*c*. Accessory user interface objects 612*a*-612*c* are associated with accessory devices that are located in the entry room and/or area of the location associated with the home automation system. For instance, in some embodiments, electronic device 600 associates (e.g., programmatically maps) one or more accessory devices with the entry room and/or area of the location in response to receiving one or more user inputs (e.g., user inputs 1050*c* and/or 1050*d*, shown at FIG. 10D). When electronic device 600 associates the one or more accessory devices with the entry room and/or area of the location, electronic device 600 displays accessory user interface objects 612*a*-612*c* corresponding to the one or more accessory devices in first room region 612.

Second room region 1400 is associated with a living room area of the location and includes accessory user interface objects 1400*a*-1400*d*. Accessory user interface objects 1400*a*-1400*d* are associated with accessory devices that are located in the living room area of the location associated with the home automation system. For instance, in some embodiments, electronic device 600 associates (e.g., programmatically maps) one or more accessory devices with the living room area of the location in response to receiving one or more user inputs (e.g., user inputs 1050*c* and/or

1050*d*, shown at FIG. 10D). When electronic device 600 associates the one or more accessory devices with the living room area of the location, electronic device 600 displays accessory user interface objects 1400*a*-1400*d* corresponding to the one or more accessory devices in second room region 1400.

Third room region 1402 is associated with a kitchen area of the location and includes accessory user interface objects 1402*a*-1402*c*. Accessory user interface objects 1402*a*-1402*c* are associated with accessory devices that are located in the kitchen area of the location associated with the home automation system. For instance, in some embodiments, electronic device 600 associates (e.g., programmatically maps) one or more accessory devices with the kitchen area of the location in response to receiving one or more user inputs (e.g., user inputs 1050*c* and/or 1050*d*, shown at FIG. 10D). When electronic device 600 associates the one or more accessory devices with the kitchen area of the location, electronic device 600 displays accessory user interface objects 1402*a*-1402*c* corresponding to the one or more accessory devices in third room region 1402.

Electronic device 600 is configured to rearrange and/or adjust respective positions of accessory user interface objects 612*a*-612*c*, 1400*a*-1400*d*, and/or 1402*a*-1402*c* when in an editing mode. For instance, at FIG. 14B, electronic device 600 detects user input 1450*b* (e.g., a gesture with a duration that satisfies a threshold duration or other selection/navigation input) corresponding to home user interface 604. In response to detecting user input 1450*b*, electronic device 600 activates and/or initiates the editing mode, as shown at FIG. 14C.

Figure 14D:
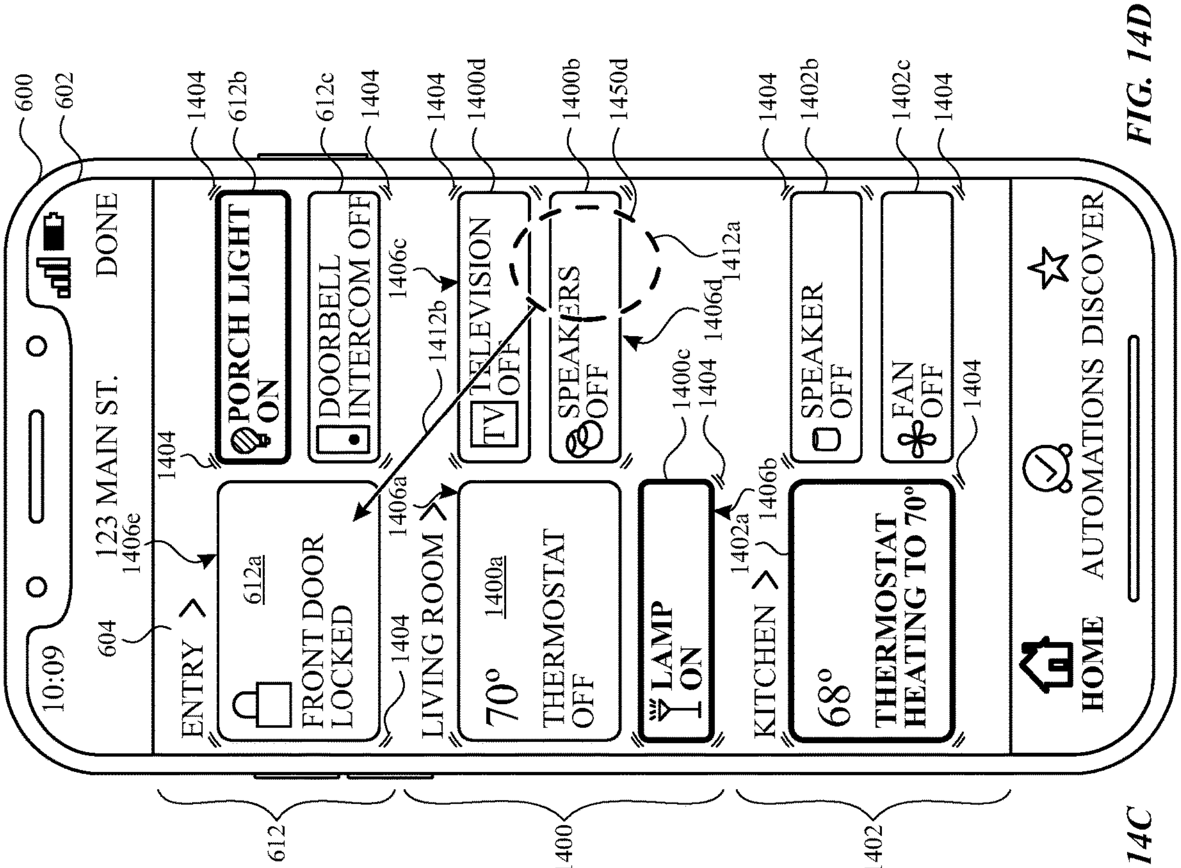
Figure 14C:
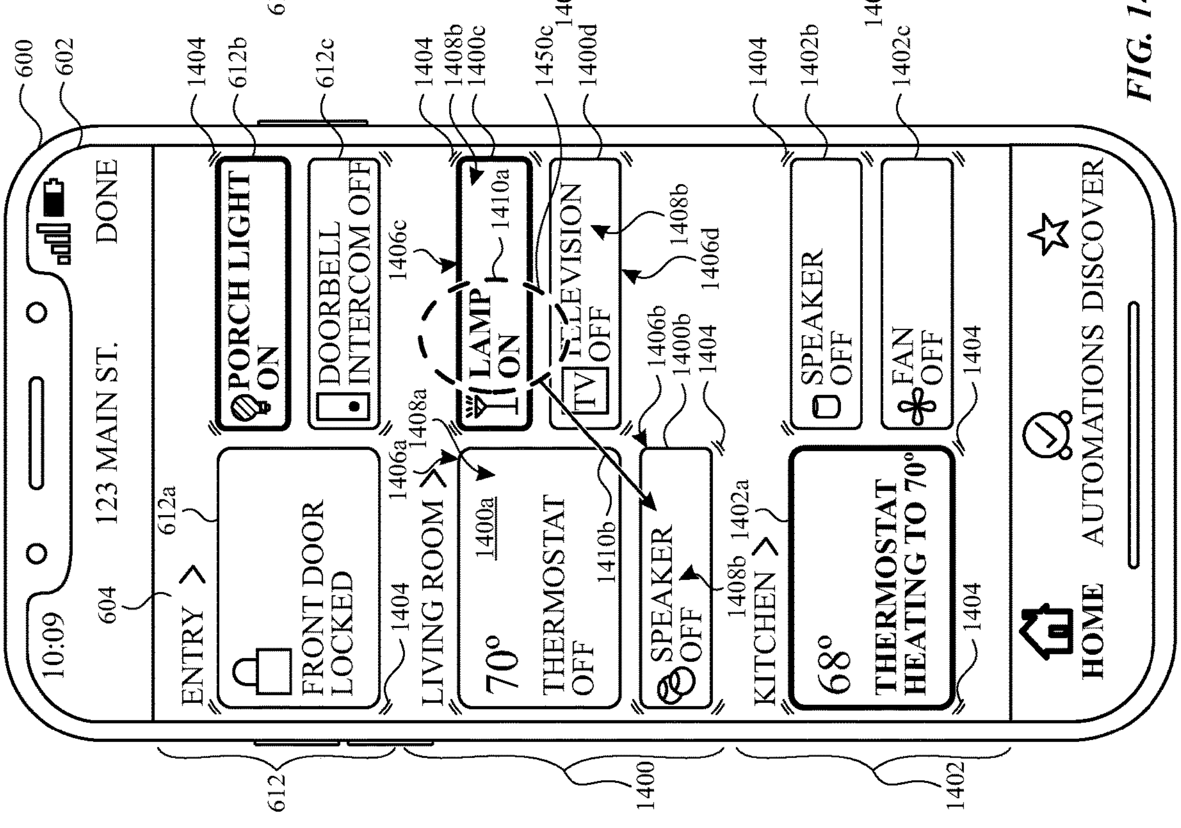

At FIG. 14C, electronic device 600 displays movement indicators 1404 around user interface objects of home user interface 604 to indicate movement and/or an animation of the user interface objects. Illustrated movement indicators 1404 are provided for clarity, but are not part of the user interface of electronic device 600. When electronic device 600 is in the editing mode, electronic device 600 can move and/or change the respective positions of accessory user interface objects 612*a*-612*c*, 1400*a*-1400*d*, and/or 1402*a*-1402*c* with respect to one another. As set forth below, in some embodiments, electronic device 600 can move and/or change the respective positions of accessory user interface objects 612*a*-612*c*, 1400*a*-1400*d*, and/or 1402*a*-1402*c* within their respective region, but electronic device 600 cannot move accessory user interface objects 612*a*-612*c*, 1400*a*-1400*d*, and/or 1402*a*-1402*c* between regions (e.g., move an accessory user interface object from one of regions 612, 1400, and/or 1402 to a different one of regions 612, 1400, and/or 1402).

At FIG. 14C, electronic device 600 displays accessory user interface objects 1400*a*-1400*d* of second room region 1400 in a first arrangement and/or at first respective positions. For instance, first accessory user interface object 1400*a* is displayed at first position 1406*a*, second accessory user interface object 1400*b* is displayed at second position 1406*b*, third accessory user interface object 1400*c* is displayed at third position 1406*c*, and fourth accessory user interface object 1400*d* is displayed at fourth position. In addition, at FIG. 14C, electronic device 600 displays first accessory user interface object 1400*a* at first size 1408*a* and displays accessory user interface objects 1400*b*-1400*d* at second size 1408*b*, where second size 1408*b* is smaller than first size 1408*a*. As set forth below, electronic device 600 can change and/or adjust a size of accessory user interface objects 612*a*-612*c*, 1400*a*-1400*d*, and/or 1402*a*-1402*c* in response to detecting one or more user inputs while electronic device 600 is in the editing mode.

At FIG. 14C, electronic device 600 detects user input 1450*c* (e.g., a tap and hold gesture followed by movement or other selection/navigation input) corresponding to third accessory user interface object 1400*c* of second room region 1400. User input 1450*c* includes first component 1410*a* (e.g., a sustained contact component and/or a tap and hold gesture) and second component 1410*b* (e.g., a movement component). Second component 1410*b* includes movement of first component 1410*a* from third position 1406*c* of third accessory user interface object 1400*c* toward second position 1406*b* of second accessory user interface object 1400*b* of second room region 1400. In response to detecting user input 1450*c*, electronic device 600 moves third accessory user interface object 1400*c* from third position 1406*c* to second position 1406*b*, as shown at FIG. 14D.

At FIG. 14D, electronic device 600 displays accessory user interface objects 1400*a*-1400*d* of second room region 1400 in a second arrangement and/or at second respective positions, different from the first arrangement and/or first respective positions shown at FIG. 14C. For instance, at FIG. 14D, first accessory user interface object 1400*a* is displayed at first position 1406*a*, third accessory user interface object 1400*c* is displayed at second position 1406*b*, fourth accessory user interface object 1400*d* is displayed at third position 1406*c*, and second accessory user interface object 1400*b* is displayed at fourth position 1406*d*. Accordingly, electronic device 600 rearranges and/or changes the respective positions of accessory user interface objects 1400*a*-1400*d* in response to detecting user input 1450*c*. At FIG. 14D, electronic device 600 moved and/or changed the respective positions of accessory user interface objects 1400*b*-1400*d*, but maintained display of first accessory user interface object 1400*a* at first position 1406*a*. In particular, electronic device 600 rotated the respective positions of accessory user interface objects 1400*b*-1400*d* in a counter-clockwise direction in response to detecting user input 1450*c*.

In some embodiments, electronic device 600 switches the respective positions of second accessory user interface object 1400*b* and third accessory user interface object 1400*c* without changing the position of fourth accessory user interface object 1400*d* in response to detecting user input 1450*c*. In some embodiments, electronic device 600 also causes the position of first accessory user interface object 1400*a* to change and/or move in response to detecting user input 1450*c*.

As set forth above, electronic device 600 can move and/or change the respective positions of accessory user interface objects 612*a*-612*c*, 1400*a*-1400*d*, and/or 1402*a*-1402*c* within the respective region in which accessory user interface objects 612*a*-612*c*, 1400*a*-1400*d*, and/or 1402*a*-1402*c* are associated. For instance, at FIGS. 14C and 14D, electronic device 600 changes the respective positions of accessory user interface objects 1400*b*-1400*d* because electronic device 600 determines that user input 1450*c* includes movement (e.g., second component 1410*b*) that is within second room region 1400 (e.g., a magnitude of second component 1410*b* is indicative of a request to move third accessory user interface object 1400*c* to another position within second room region 1400). However, electronic device 600 is not able to move user interface objects 612*a*-612*c*, 1400*a*-1400*d*, and/or 1402*a*-1402*c* to a different region.

For instance, at FIG. 14D, electronic device 600 detects user input 1450*d* (e.g., a tap and hold gesture followed by movement or other selection/navigation input) corresponding to second accessory user interface object 1400*b* of second room region 1400. User input 1450*d* includes first component 1412*a* (e.g., a sustained contact component and/or a tap and hold gesture) and second component 1412*b* (e.g., a movement component). Second component 1412*b* includes movement of first component 1412*a* from fourth position 1406*d* of second accessory user interface object 1400*b* toward fifth position 1406*e* of fifth accessory user interface object 612*a* of first room region 612. In response to detecting user input 1450*d*, electronic device 600 displays movement of second accessory user interface object 1400*b* toward fifth position 1406*e*, but does not associate second accessory user interface object 1400*b* with first room region 612 and/or rearrange accessory user interface objects 612*a*-612*c* of first room region 612, as shown at FIG. 14E.

Figure 14F:
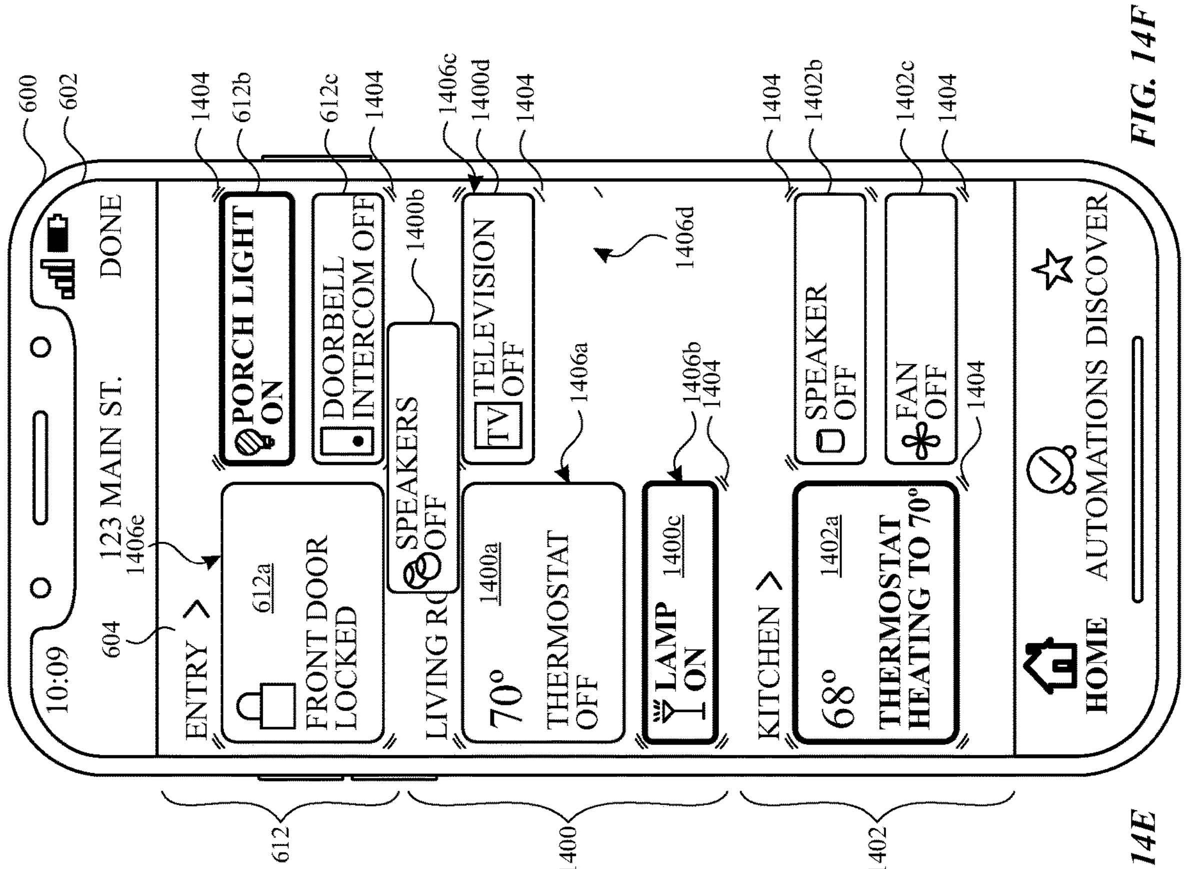
Figure 14E:
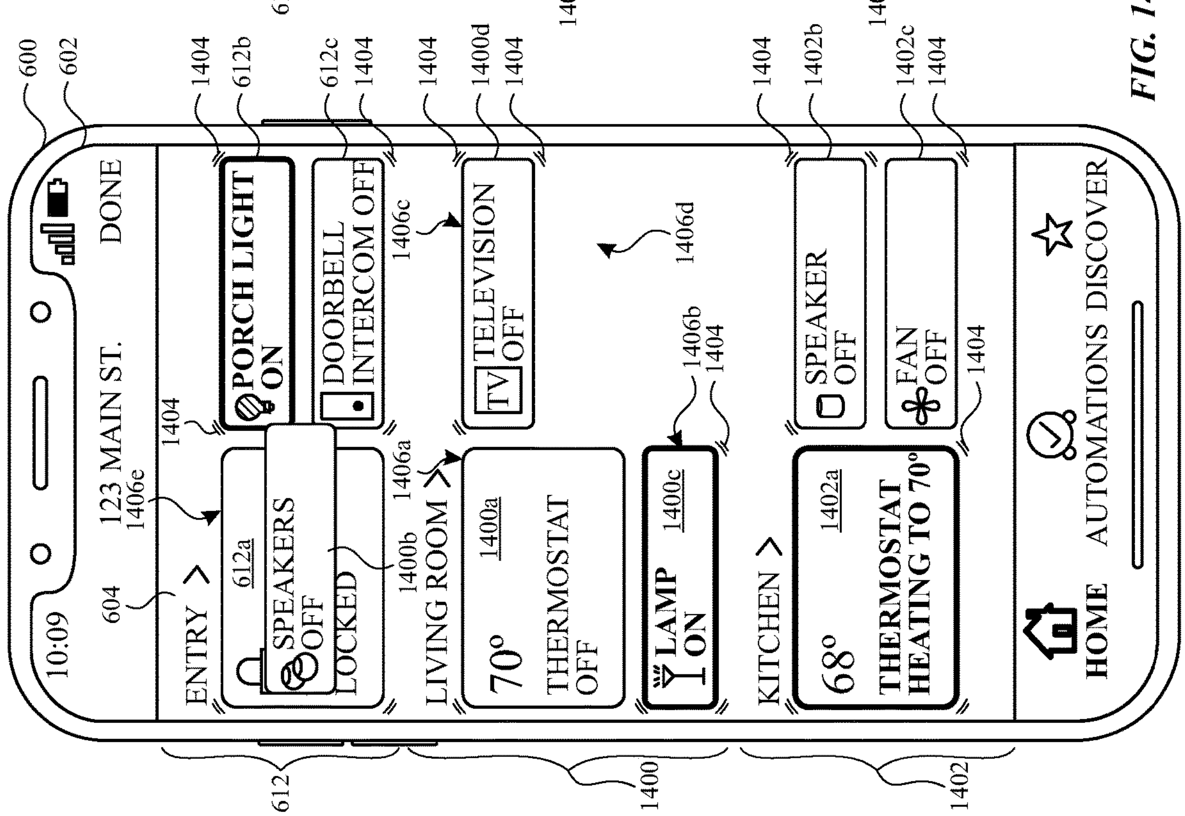

At FIG. 14E, electronic device 600 displays second accessory user interface object 1400*b* as being overlaid on fifth accessory user interface object 612*a* of first room region 612. Electronic device 600 does not move and/or change the respective positions of accessory user interface objects 612*a*-612*c* of first room region 612, but instead displays second accessory user interface object 1400*b* on top of and/or hovering over first room region 612. Thus, electronic device 600 indicates that second accessory user interface object 1400*b* cannot be moved from second room region 1400 to first room region 612 of home user interface 604. In some embodiments, electronic device 600 displays second accessory user interface object 1400*b* with a different appearance when second accessory user interface object 1400*b* is overlaid on first room region 612. For instance, in some embodiments, electronic device 600 darkens, blurs, and/or changes a color of second accessory user interface object 1400*b* when second accessory user interface object 1400*b* is overlaid on first room region 612 to further indicate that second accessory user interface object 1400*b* cannot be moved from second room region 1400 to first room region 612.

At FIG. 14E, electronic device 600 detects an end of user input 1450*d* corresponding to second accessory user interface object 1400*b*. In response to detecting the end of user input 1450*d*, electronic device 600 displays second accessory user interface object 1400*b* moving and/or bouncing back toward fourth position 1406*d*, as shown at FIG. 14F.

At FIG. 14F, electronic device 600 has moved second accessory user interface object 1400*b* from first room region 612 back toward fourth position 1406*d* of second room region 1400 and overlays second accessory user interface object 1400*b* over an area of home user interface 604 between first room region 612 and second room region 1400. Therefore, electronic device 600 displays second accessory user interface object 1400*b* moving and/or bouncing back toward fourth position 1406*d* to further indicate that second accessory user interface object 1400*b* cannot be moved from second room region 1400 to first room region 612.

Figure 14H:
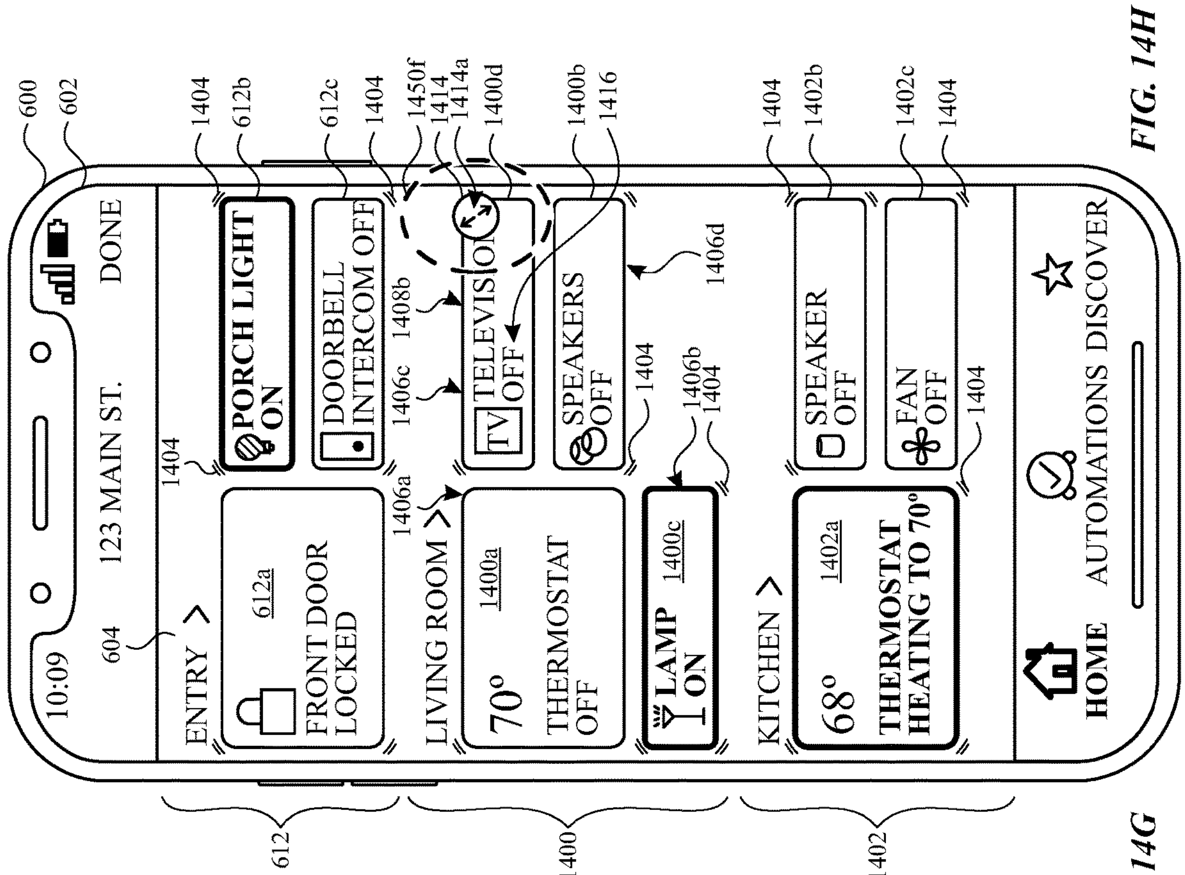
Figure 14G:
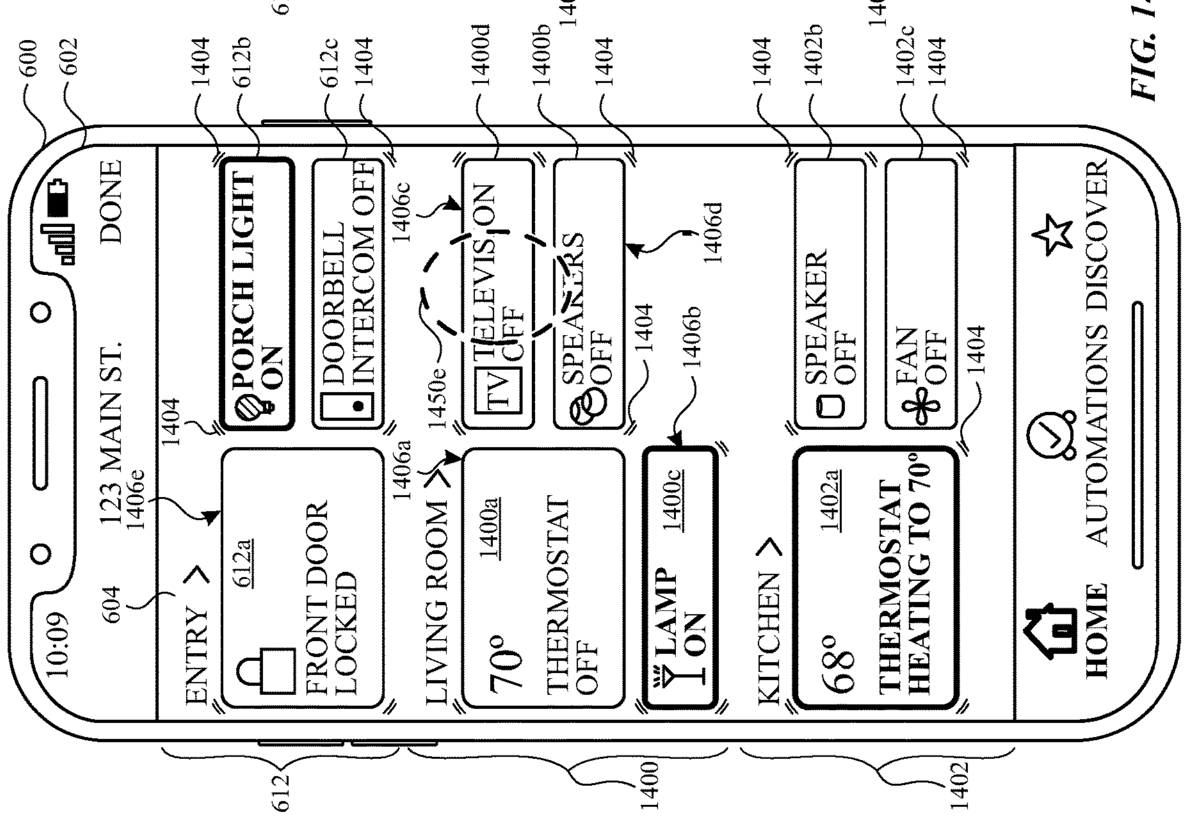

At FIG. 14G, electronic device 600 displays second accessory user interface object 1400*b* at fourth position 1406*d* of second room region 1400. Accordingly, electronic device 600 does not move and/or change the respective positions of user interface objects 612*a*-612*c*, 1400*a*-1400*d*, and/or 1402*a*-1402*c* in response to detecting user input 1450*d*. For example, electronic device 600 displays temporary movement of second accessory user interface object 1400*b* that is based on user input 1450*d*, but does not cause second accessory user interface object 1400*b* to be displayed at a different location from fourth position 1406*d*.

At FIG. 14G, electronic device 600 detects user input 1450*e* (e.g., a tap gesture or other selection/navigation input) corresponding to fourth accessory user interface object 1400*d* of second room region 1400 while electronic device 600 is in the editing mode. In response to detecting user input 1450*e*, electronic device 600 displays resize user interface object 1414 on fourth accessory user interface object 1400*d*, as shown at FIG. 14H.

At FIG. 14H, resize user interface object 1414 includes first appearance 1414*a* indicating that selection of resize user interface object 1414 causes electronic device 600 to display fourth accessory user interface object 1400*d* at a different size (e.g., a different size than second size 1408*b*). At FIG. 14H, while fourth accessory user interface object 1400*d* is displayed at second size 1408*b*, fourth accessory user interface object 1400*d* includes first indicator 1416. First indicator 1416 provides information about and/or a status (e.g., "Off") of the accessory device associated with fourth accessory user interface object 1400*d* (e.g., "TELEVISION"). As set forth below, electronic device 600 can change first indicator 1416 and/or an amount of information included on fourth accessory user interface object 1400*d* when fourth accessory user interface object 1400*d* is displayed at a different size.

At FIG. 14H, electronic device 600 detects user input 1450*f* (e.g., a tap gesture or other selection/navigation input) corresponding to selection of resize user interface object 1414. In response to detecting user input 1450*f*, electronic device 600 displays fourth accessory user interface object 1400*d* at first size 1408*a*, different from second size 1408*b*, as shown at FIG. 14I.

Figure 14J:
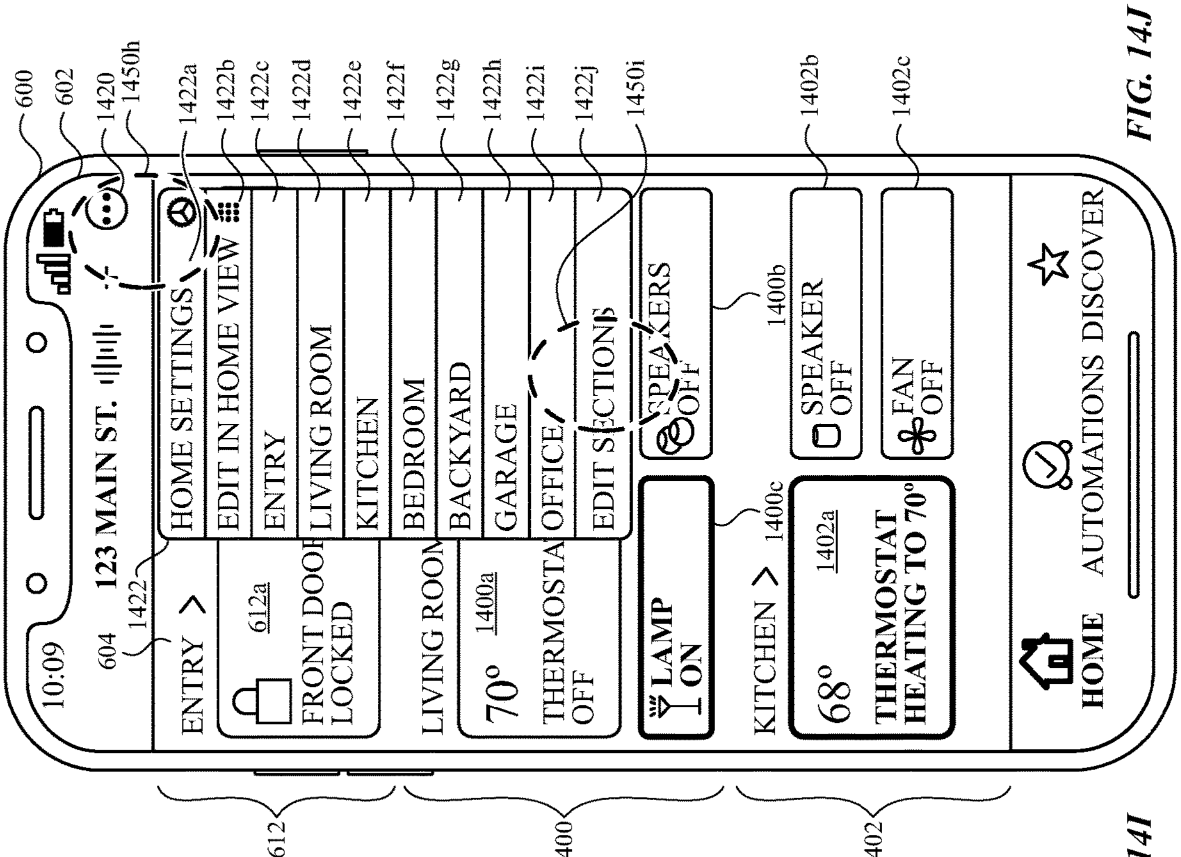
Figure 14I:
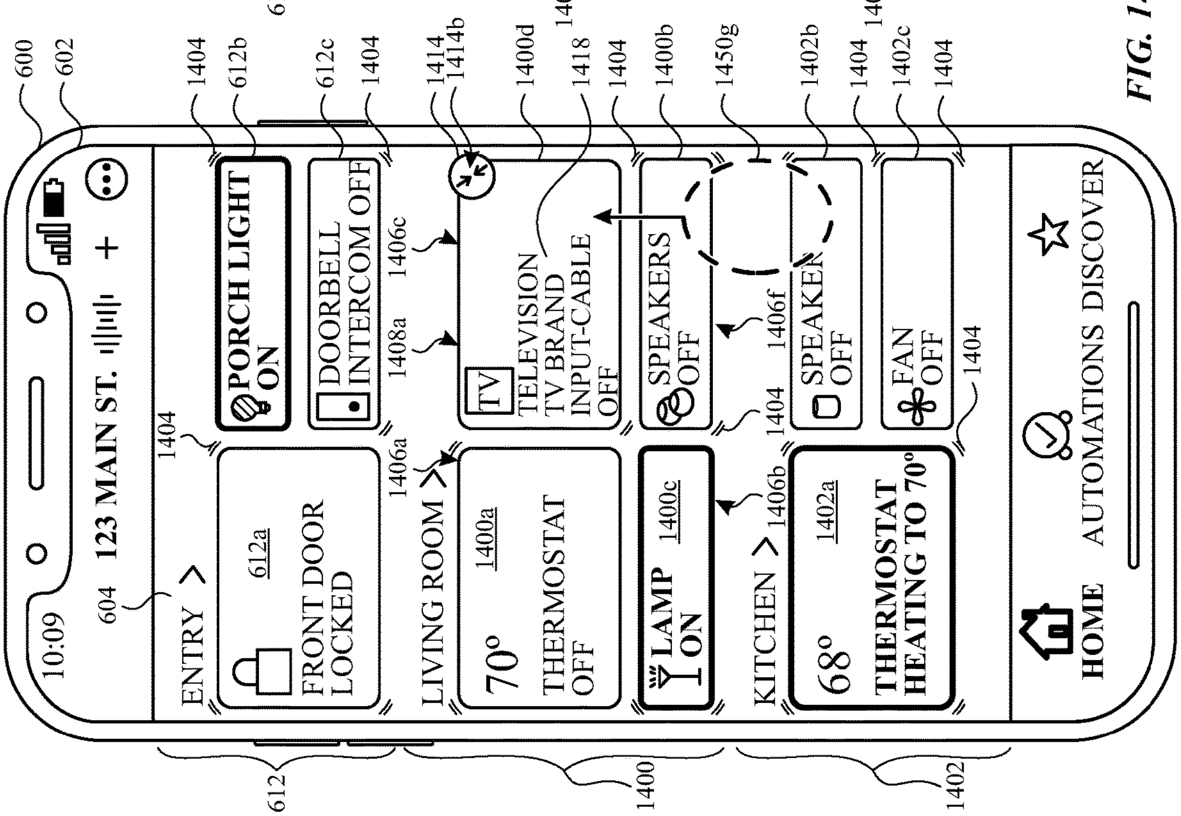

At FIG. 14I, electronic device 600 displays fourth accessory user interface object 1400*d* at first size 1408*a* and at third position 1406*c* of second room region 1400. Electronic device 600 moves and/or shifts second accessory user interface object 1400*b* from fourth position 1406*d* to sixth position 1406*f* within second room region 1400 because fourth accessory user interface object 1400*d* is displayed at a larger size. However, electronic device 600 does not change the relative positions of accessory user interface objects 1400*a*-1400*d* relative to one another based on the change in size of fourth accessory user interface object 1400*d*.

At FIG. 14I, fourth accessory user interface object 1400*d* includes second indicator 1418, which includes more information about the accessory device associated with fourth accessory user interface object 1400*d* as compared to first indicator 1416. For instance, second indicator 1418 includes a brand of the accessory device (e.g., "TV BRAND") and/or an input channel of the accessory device (e.g., "INPUT-CABLE"), which are not included in first indicator 1416. Thus, when electronic device 600 displays fourth accessory user interface object 1400*d* at a larger size (e.g., first size 1408*a* that is larger than second size 1408*b*), electronic device 600 displays additional information about the accessory device on fourth accessory user interface object 1400*d*.

Further, in response to detecting user input 1450*f*, electronic device 600 displays resize user interface object 1414 with second appearance 1414*b*, different from first appearance 1414*a*. For instance, first appearance 1414*a* of resize user interface object 1414 includes arrows pointing away from one another indicating that selection of resize user interface object 1414 causes electronic device 600 to display fourth accessory user interface object 1400*d* at a larger size (e.g., at first size 1408*a*). Second appearance 1414*b* of resize user interface object 1414 includes arrows pointing toward one another indicating that selection of resize user interface object 1414 causes electronic device 600 to display fourth accessory user interface object 1400*d* at a smaller size (e.g., at second size 1408*b*).

At FIG. 14I, electronic device 600 detects user input 1450*g* (e.g., a sweep gesture or other selection/navigation input) corresponding to home user interface 604. In response to detecting user input 1450*g*, electronic device 600 exits and/or deactivates the editing mode, as shown at FIG. 14J.

At FIG. 14J, movement indicators 1404 are not shown to indicate that electronic device 600 is no longer operating in the editing mode. Therefore, electronic device 600 is not configured to rearrange, move the respective positions of, and/or change the size of accessory user interface objects 612*a*-612*c*, 1400*a*-1400*d*, and/or 1402*a*-1402*c*. At FIG. 14J, electronic device 600 detects user input 1450*h* (e.g., a tap gesture or other selection/navigation input) corresponding to selection of settings user interface object 1420 of home user interface 604. In response to detecting user input 1450*h*, electronic device 600 displays menu 1422, as shown at FIG. 14J. At FIG. 14J, menu includes selectable options 1422*a*-1422*j* that enable electronic device 600 to adjust and/or modify settings of home user interface 604 and/or the home automation system. At FIG. 14J, electronic device 600 detects user input 1450*i* (e.g., a tap gesture or other selection/navigation input) corresponding to selection of selectable option 1422*j* of menu 1422. In response to detecting user input 1450*i*, electronic device 600 displays region arrangement user interface 1424, as shown at FIG. 14K.

Figure 14L:
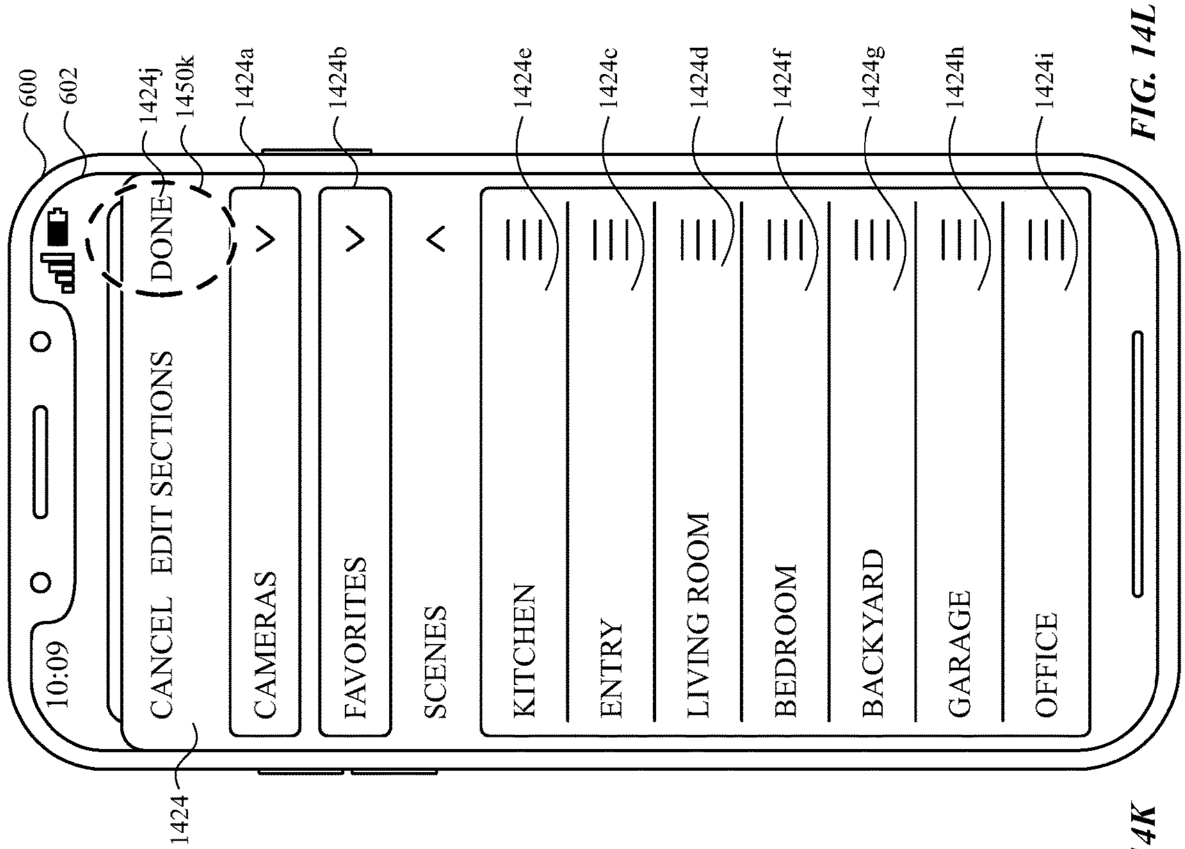
Figure 14K:
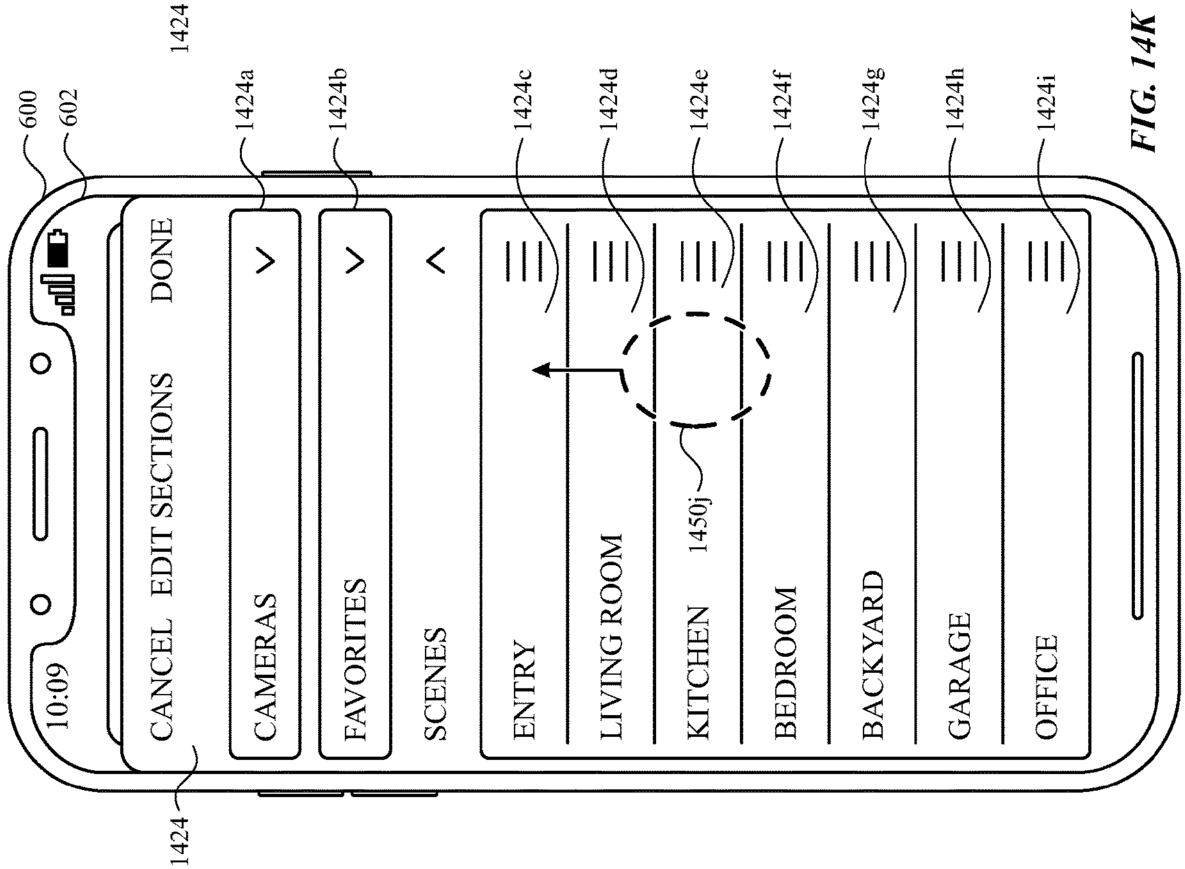

At FIG. 14K, region arrangement user interface 1424 enables electronic device 600 to rearrange and/or reorder the respective positions of room regions 612, 1400, and/or 1402 with respect to one another on home user interface 604. For instance, region arrangement user interface 1424 includes region user interface objects 1424*a*-1424*i* corresponding to different regions of home user interface 604. At FIG. 14K, an order of region user interface objects 1424*a*-1424*i* corresponds to a current order and/or arrangement of regions that electronic device 600 is configured to display on home user interface 604. Accordingly, third region user interface object 1424*c* corresponds to first room region 612, fourth region user interface object 1424*d* corresponds to second room region 1400, and fifth region user interface object 1424*e* corresponds to third room region 1402. At FIGS. 14B-14J, first room region 612 is positioned above second room region 1400 and third room region 1402, and second room region 1400 is positioned between first room region 612 and third room region 1402. Thus, third region user interface object 1424*c* (e.g., corresponding to first room region 612) is positioned above fourth region user interface object 1424*d* (e.g., corresponding to second room region 1400) and fifth region user interface object 1424*e* (e.g., corresponding to third room region 1402), and fourth region user interface object 1424*d* is positioned between third region user interface object 1424*c* and fifth region user interface object 1424*e*.

At FIG. 14K, electronic device 600 detects user input 1450*j* (e.g., a swipe gesture, a slide gesture, a tap and hold gesture followed by movement, or other selection/navigation input) corresponding to fifth region user interface object 1424*e*. In response to detecting user input 1450*j*, electronic device 600 moves and/or changes the positions of region user interface objects 1424*a*-1424*i* with respect to one another, as shown at FIG. 14L.

At FIG. 14L, electronic device 600 displays fifth region user interface object 1424*e* above third region user interface object 1424*c* and fourth region user interface object 1424*d*. Thus, electronic device 600 is configured to display third room region 1402 above first room region 612 and second room region 1400 on home user interface 604. At FIG. 14L, electronic device 600 detects user input 1450*k* (e.g., a tap gesture or other selection/navigation input) corresponding to done user interface object 1424*j* of region arrangement user interface 1424. In response to detecting user input 1450*k*, electronic device 600 displays home user interface 604, as shown at FIG. 14M.

Figure 14M:
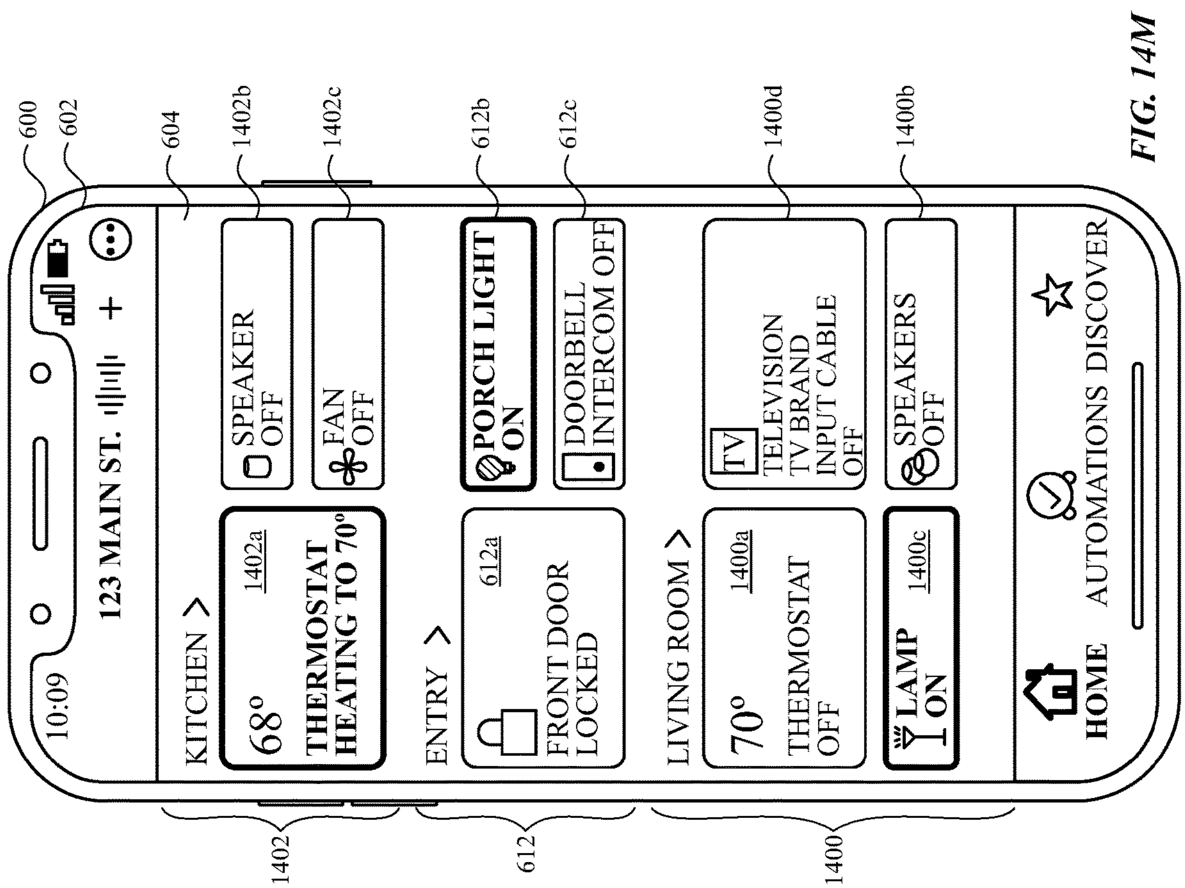
Figure 15B:
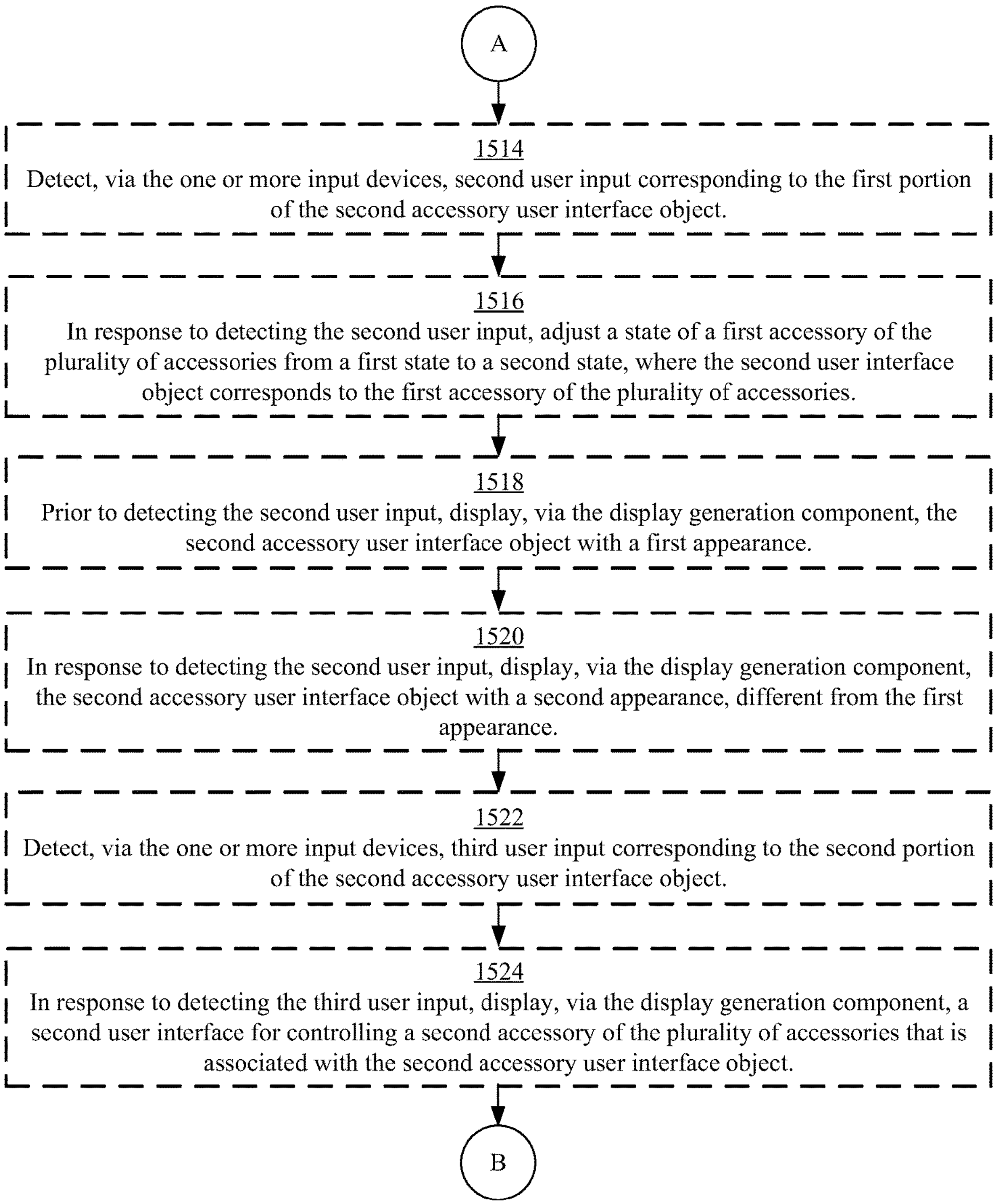
Figure 15C:
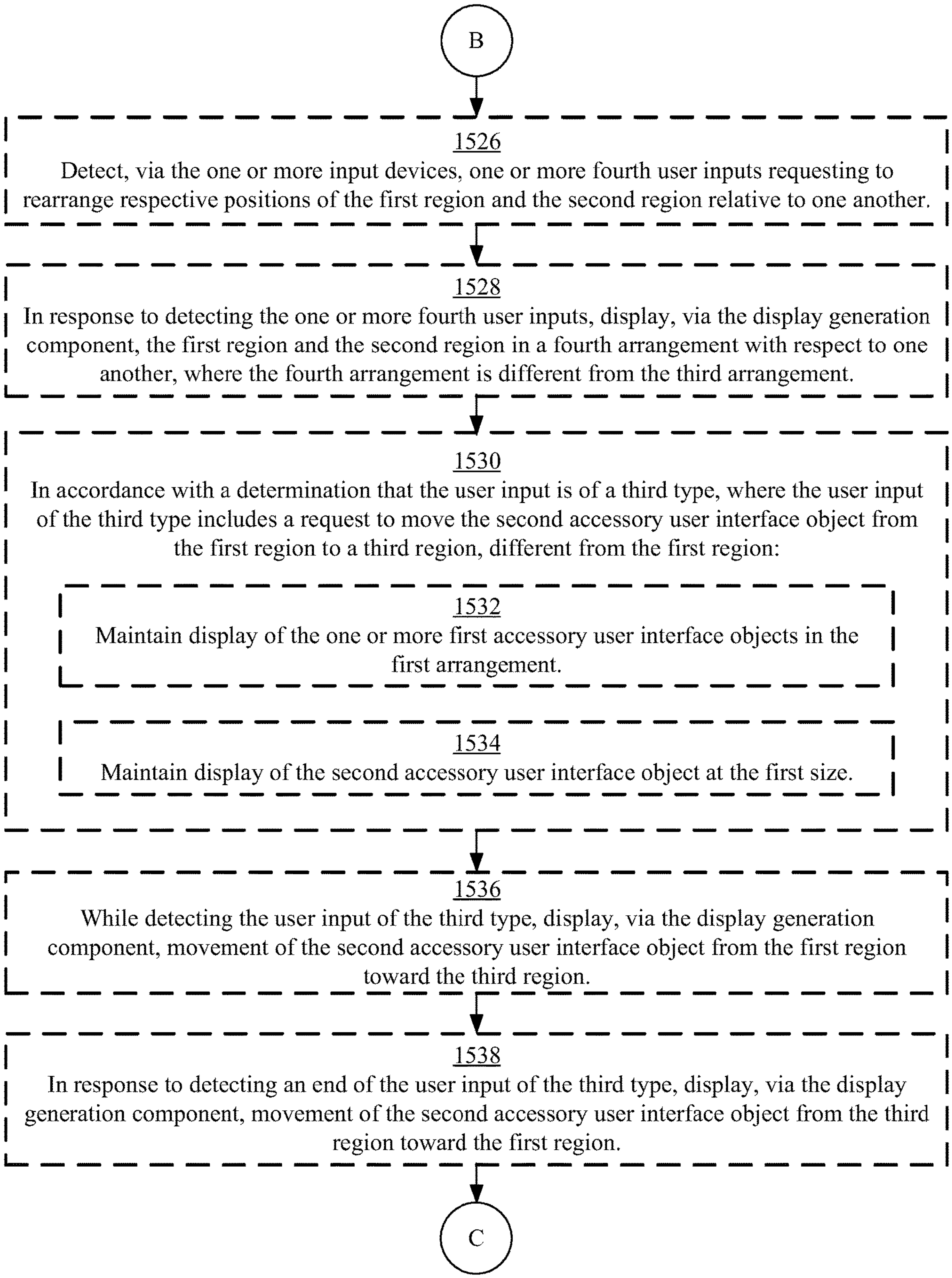
Figure 15D:
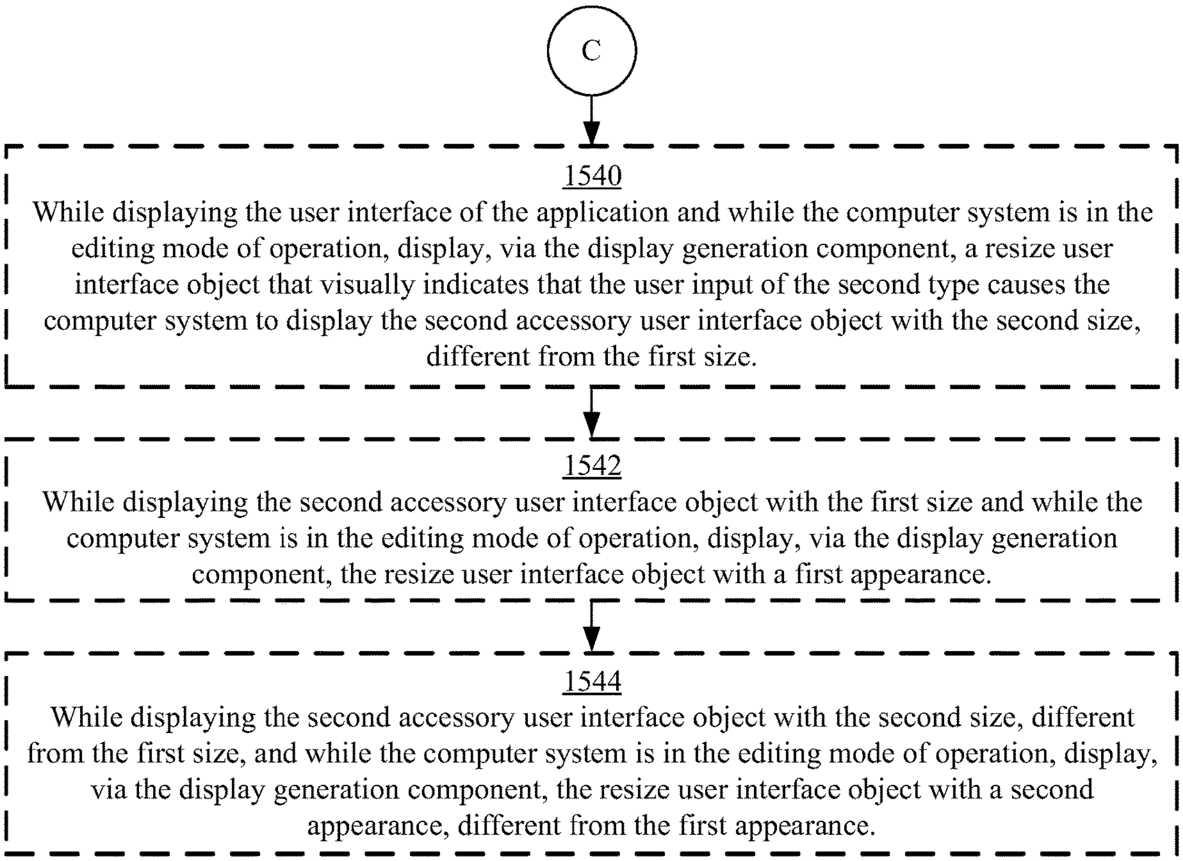

At FIG. 14M, third room region 1402 is displayed above first room region 612 and second room region 1400 on home user interface 604. Therefore, electronic device 600 enables a user to customize and/or arrange regions of home user interface 604 so that regions that are more important or more frequently used by the user can be viewed closer to the top of home user interface 604.

FIGS. 15A-15D are a flow diagram illustrating a method for displaying accessory user interface objects using a computer system in accordance with some embodiments. Method 1500 is performed at a computer system (e.g., 100, 300, 500, and/or 600) (e.g., an electronic device; a smart device, such as a smartphone or a smartwatch; a mobile device; a wearable device) that is in communication with one or more input devices and a display generation component (e.g., 602) (e.g., a display controller, a touch-sensitive display system, a projector, a display screen, a display monitor, and/or a holographic display). Some operations in method 1500 are, optionally, combined, the orders of some operations are, optionally, changed, and some operations are, optionally, omitted.

As described below, method 1500 provides an intuitive way for displaying accessory user interface objects. The method reduces the cognitive burden on a user for arranging accessory user interface objects, thereby creating a more efficient human-machine interface. For battery-operated computing devices, enabling a user to arrange accessory user interface objects faster and more efficiently conserves power and increases the time between battery charges.

The computer system (e.g., 100, 300, 500, and/or 600) displays (1502), via the display generation component (e.g., 602), a user interface (e.g., 604) (e.g., a home and/or default user interface of an application that is configured to enable control of one or more accessories and/or devices that are part of an automation system) of an application (e.g., an application of the computer system that corresponds to an automation system that includes one or more accessories and/or devices of a home, an enclosed space, and/or structure that are able to be controlled and/or adjusted via the computer system) associated with a plurality of accessories (e.g., two or more devices that are configured to be controlled and/or adjusted by the computer system via the user interface of the application, such as lights (e.g., light bulbs), outlets, televisions, speakers (e.g., smart speakers), locks, and/or sensors).

The user interface (e.g., 604) of the application includes a first region (1504) (e.g., 612, 1400, and/or 1402) (e.g., a first display area occupying a first portion of the user interface of the application) including one or more first accessory user interface objects (e.g., 612*a*-612*c*, 1400*a*-1400*d*, and/or 1402*a*-1402*c*) (e.g., affordances and/or selectable objects corresponding to respective accessories that, when selected, enable the computer system to cause a respective accessory to change states (e.g., transition between an on state and an off state, a locked state and an unlocked state, and/or an open state and a closed state)) associated in a first arrangement (e.g., an arrangements shown at FIG. 14B) (e.g., a first pattern and/or respective positions of the first accessory user interface objects with respect to one another), where the one or more first accessory user interface objects (e.g., 612*a*-612*c*, 1400*a*-1400*d*, and/or 1402*a*-1402*c*) correspond to one or more first accessories (e.g., a first subset of accessories of the plurality of accessories) of the plurality of accessories that are associated with a first context (e.g., a first function configured to be performed by the one or more first accessories, a first location and/or area of a structure associated with the application, and/or a first type of accessory of the one or more first accessories), and where the one or more first accessory user interface objects (e.g., 612*a*-612*c*, 1400*a*-1400*d*, and/or 1402*a*-1402*c*) include a second accessory user interface object (e.g., 612*a*-612*c*, 1400*a*-1400*d*, and/or 1402*a*-1402*c*) displayed at a first size (e.g., 1408*a* and/or 1408*b*) (e.g., the second accessory user interface object occupies a first amount of a display area of the display generation component); In some embodiments, the user interface (e.g., 604) of the application includes a second region (e.g., 612, 1400, and/or 1402) (e.g., a second display area occupying a second portion of the user interface of the application) including one or more third accessory user interface objects (e.g., 612*a*-612*c*, 1400*a*-1400*d*, and/or 1402*a*-1402*c*) (e.g., affordances and/or selectable objects corresponding to respective accessories that, when selected, enable the computer system to cause a respective accessory to change states (e.g., transition between an on state and an off state, a locked state and an unlocked state, and/or an open state and a closed state)) in a second arrangement (e.g., an arrangement shown at FIG. 14B) (e.g., a second pattern and/or respective positions of the third accessory user interface objects with respect to one another), wherein the one or more third accessory user interface objects (e.g., 612*a*-612*c*, 1400*a*-1400*d*, and/or 1402*a*-1402*c*) correspond to one or more second accessories (e.g., a second subset of accessories of the plurality of accessories) of the plurality of accessories that are associated with a second context (e.g., a second function configured to be performed by the one or more third accessories, a second location and/or area of a structure, and/or a second type of accessory of the one or more third accessories).

While displaying the user interface (e.g., 604) of the application and while the computer system (e.g., 100, 300, 500, and/or 600) is in an editing mode of operation (e.g., a mode of operation shown at FIGS. 14C-14I) (e.g., a mode of operation that enables the computer system to modify and/or adjust (e.g., in response to receiving one or more user inputs) an appearance, layout, and/or arrangement of regions and/or user interface objects displayed on the user interface of the application) (in some embodiments, the computer system is configured to activate the editing mode of operation in response to receiving one or more user inputs, such as a long tap gesture corresponding to the user interface of the application), the computer system (e.g., 100, 300, 500, and/or 600) receives (1506) user input (e.g., 1450*c*, 1450*e*, and/or 14500 (e.g., a swipe gesture, a tap gesture that includes movement from a first position to a second position, and/or a tap gesture) corresponding to the second accessory user interface object (e.g., 612*a*-612*c*, 1400*a*-1400*d*, and/or 1402*a*-1402*c*) of the one or more first accessory user interface objects (e.g., 612*a*-612*c*, 1400*a*-1400*d*, and/or 1402*a*-1402*c*).

In response to receiving the user input (1508) (e.g., 1450*c*, 1450*e*, and/or 14500 and in accordance with a determination that the user input (e.g., 1450*c*, 1450*e*, and/or 14500 is of a first type (e.g., the user input includes a first component that includes a sustained contact on the display generation component followed by a second component that includes movement of the sustained contact from a first position on the display generation component toward a second position on the display generation component), the computer system (e.g., 100, 300, 500, and/or 600) displays (1510) the one or more first accessory user interface objects (e.g., 612*a*-612*c*, 1400*a*-1400*d*, and/or 1402*a*-1402*c*) in a second arrangement (e.g., an arrangement shown at FIG. 14D) (e.g., a second pattern and/or respective positions of the first accessory user interface objects with respect to one another), different from the first arrangement (e.g., an arrangement shown at FIG. 14B) (e.g., the computer system moves and/or rearranges at least one accessory user interface object (e.g., the second accessory user interface object) of the one or more first accessory user interface objects to a different position on the user interface as compared to a position at which the at least one accessory user interface object was displayed prior to receiving the user input of the first type). In some embodiments, the computer system does not enable the second user interface object to be moved from the first region to the second region.

In response to receiving the user input (1508) (e.g., 1450*c*, 1450*e*, and/or 14500 and in accordance with a determination that the user input (e.g., 1450*c*, 1450*e*, and/or 14500 is of a second type (e.g., one or more tap gestures corresponding to the second accessory user interface object), different from the first type, the computer system (e.g., 100, 300, 500, and/or 600) displays (1512) the second accessory user interface object (e.g., 612*a*-612*c*, 1400*a*-1400*d*, and/or 1402*a*-1402*c*) with a second size (e.g., 1408*a* and/or 1408*b*) (e.g., a larger size or a smaller size compared to the first size), different from the first size (e.g., 1408*a* and/or 1408*b*). In some embodiments, the computer system adjusts a size and/or appearance of the first region in response to receiving the user input of the second type, but does not rearrange the respective positions of the one or more first accessory user interface objects with respect to one another.

Displaying the one or more first accessory user interface objects in the second arrangement when the user input is of a first type and displaying the second accessory user interface object with a second size when the user input is of a second type allows a user to easily customize the first region and/or the user interface to position user interface objects at locations that are convenient and/or easily accessible to the user, thereby reducing the number of inputs needed to perform an operation.

In some embodiments, the second accessory user interface object (e.g., 612*a*-612*c*, 1400*a*-1400*d*, and/or 1402*a*-1402*c*) includes a first portion (e.g., 656*a*) (e.g., a toggle portion that includes a left portion, a right portion, a top portion, or a bottom portion of the first accessory user interface object) that, when selected via user input, causes the computer system (e.g., 100, 300, 500, and/or 600) to perform a first operation (e.g., adjusting an operating state (e.g., transmitting data and/or information to a first accessory that causes the first accessory to change between operating states) of a first accessory that is associated with the second accessory user interface object) and a second portion (e.g., 656*b*) (e.g., a non-toggle portion that includes a left portion, a right portion, a top portion, or a bottom portion of the first accessory user interface object) that, when selected via user input, causes the computer system (e.g., 100, 300, 500, and/or 600) to perform a second operation (e.g., display, via the display generation component, a second user interface that includes one or more control user interface objects that enable the computer system to adjust an operating state of the first accessory corresponding to the second accessory user interface object and/or one or more settings user interface objects that enable the computer system to modify and/or configure settings of the first accessory corresponding to the second accessory user interface object) for controlling (e.g., adjusting an operating state (e.g., on, off, open, closed, locked, unlocked, playing, and/or paused) of the first accessory and/or modifying and/or configuring settings (e.g., audio settings, playback settings, automation settings, authorization settings, and/or notification settings) of the first accessory) the first accessory that is associated with the second accessory user interface object), different from the first operation.

The first accessory user interface object including different portions that perform different operations in response to user input allows a user of the computer system to quickly adjust a state of the first accessory and/or access additional controls for the first accessory, thereby reducing the number of inputs needed to perform an operation.

In some embodiments, the computer system (e.g., 100, 300, 500, and/or 600) detects (1514), via the one or more input devices, second user input (e.g., 650*g*) (e.g., a tap gesture) corresponding to the first portion (e.g., 656*a*) of the second accessory user interface object (e.g., 612*a*-612*c*, 1400*a*-1400*d*, and/or 1402*a*-1402*c*). In response to detecting the second user input (e.g., 650*g*), the computer system (e.g., 100, 300, 500, and/or 600) adjusts (1516) a state (e.g., transmitting data and/or information to a first accessory that causes the first accessory to change between operating states) of a first accessory of the plurality of accessories from a first state (e.g., on, open, unlocked, and/or outputting content) to a second state (e.g., off, closed, locked, and/or pausing and/or ceasing output of content), where the second user interface object (e.g., 612*a*-612*c*, 1400*a*-1400*d*, and/or 1402*a*-1402*c*) corresponds to the first accessory of the plurality of accessories. Adjusting the state of the first accessory of the plurality of accessories from the first state to the second state in response to detecting the second user input allows a user of the computer system to quickly adjust a state of the first accessory without having to navigate to another user interface, thereby reducing the number of inputs needed to perform an operation.

In some embodiments, prior to detecting the second user input (e.g., 650*g*), the computer system (e.g., 100, 300, 500, and/or 600) displays (1518), via the display generation component (e.g., 602), the second accessory user interface object (e.g., 612*a*-612*c*, 1400*a*-1400*d*, and/or 1402*a*-1402*c*) with a first appearance (e.g., a first visual characteristic, such as a first color, a first brightness, a first amount of blur, a first amount of opacity, a first amount of transparency, and/or a first size). In response to detecting the second user input (e.g., 650*g*), the computer system (e.g., 100, 300, 500, and/or 600) displays (1520), via the display generation component (e.g., 602), the second accessory user interface object (e.g., 612*a*-612*c*, 1400*a*-1400*d*, and/or 1402*a*-1402*c*) with a second appearance (e.g., a second visual characteristic, such as a second color, a second brightness, a second amount of blur, a second amount of opacity, a second amount of transparency, and/or a second size), different from the first appearance (e.g., the second appearance is visually distinguishable from the first appearance to confirm and/or indicate that the second user input was detected and/or received). Displaying the second accessory user interface object with the second appearance, different from the first appearance, in response to detecting the second user input allows a user of the computer system to confirm that the second user input was received and/or that the state of the first accessory was adjusted, thereby providing improved visual feedback.

In some embodiments, the computer system (e.g., 100, 300, 500, and/or 600) detects (1522), via the one or more input devices, third user input (e.g., 650*h*) (e.g., a tap gesture) corresponding to the second portion (e.g., 656*b*) of the second accessory user interface object (e.g., 612*a*-612*c*, 1400*a*-1400*d*, and/or 1402*a*-1402*c*). In response to detecting the third user input (e.g., 650*h*), the computer system (e.g., 100, 300, 500, and/or 600) displays (1524), via the display generation component (e.g., 602) (and, optionally without adjusting a state of an accessory associated with the second accessory user interface object), a second user interface (e.g., 632 and/or 658) (e.g., a user interface that includes one or more control user interface objects that enable the computer system to adjust an operating state of the second accessory corresponding to the second accessory user interface object and/or one or more settings user interface objects that enable the computer system to modify and/or configure settings of the second accessory corresponding to the second accessory user interface object) for controlling (e.g., adjusting an operating state (e.g., on, off, open, closed, locked, unlocked, playing, and/or paused) of the second accessory and/or modifying and/or configuring settings (e.g., audio settings, playback settings, automation settings, authorization settings, and/or notification settings) of the second accessory) a second accessory of the plurality of accessories that is associated with the second accessory user interface object (e.g., 612*a*-612*c*, 1400*a*-1400*d*, and/or 1402*a*-1402*c*). Displaying the second user interface in response to detecting the third user input allows a user of the computer system to quickly access additional controls for the first accessory without having to provide additional user inputs, thereby reducing the number of inputs needed to perform an operation.

In some embodiments, the user interface (e.g., 604) of the application includes a second region (e.g., 612, 1400, and/or 1402) (e.g., a second display area occupying a second portion of the user interface of the application) (in some embodiments, the first region and the second region are visually distinct from one another, the first region and the second region are separated from one another by a header, the first region and the second region are mutually exclusive, and/or the first region and the second region to not overlap with one another) including one or more third accessory user interface objects (e.g., 612*a*-612*c*, 1400*a*-1400*d*, and/or 1402*a*-1402*c*) (e.g., affordances and/or selectable objects corresponding to respective accessories that, when selected, enable the computer system to cause a respective accessory to change states (e.g., transition between an on state and an off state, a locked state and an unlocked state, and/or an open state and a closed state)) corresponding to one or more third accessories (e.g., a second subset of accessories of the plurality of accessories) of the plurality of accessories that are associated with a second context (e.g., a second function configured to be performed by the one or more third accessories, a second location and/or area of a structure, and/or a second type of accessory of the one or more first accessories), different from the first context. The first region (e.g., 612, 1400, and/or 1402) and the second region (e.g., 612, 1400, and/or 1402) are displayed on the user interface (e.g., 604) of the application in a third arrangement (e.g., an arrangement shown at FIG. 14B) with respect to one another (e.g., a first order and/or first respective positions of the first region and the second region with respect to one another). The computer system (e.g., 100, 300, 500, and/or 600) detects (1526), via the one or more input devices, one or more fourth user inputs (1450*h*-1450*k*) (e.g., one or more tap gestures and/or one or more drag and drop gestures) requesting to rearrange (e.g., change and/or modify) respective positions of the first region (e.g., 612, 1400, and/or 1402) and the second region (e.g., 612, 1400, and/or 1402) relative to one another (e.g., relative to one another as displayed on the user interface). In response to detecting the one or more fourth user inputs (e.g., 1450*h*-1450*k*), the computer system (e.g., 100, 300, 500, and/or 600) displays (1528), via the display generation component (e.g., 602), the first region (e.g., 612, 1400, and/or 1402) and the second region (e.g., 600, 1400, and/or 1402) in a fourth arrangement (e.g., an arrangement shown at FIG. 14M) with respect to one another (e.g., a second order and/or second respective positions of the first region and the second region with respect to one another), wherein the fourth arrangement is different from the third arrangement (e.g., an arrangement shown at FIG. 14B). In some embodiments, the computer system causes the respective positions of one or more additional regions of the user interface to change in response to detecting the one or more fourth user inputs (e.g., the respective positions of the one or more additional regions change based on the change in the respective positions of the first and second region).

Displaying the first region and the second region in the fourth arrangement with respect to one another in response to detecting the one or more fourth user inputs allows a user to easily customize the displayed locations of the first region and the second region on the user interface to locations that are convenient and/or easily accessible to the user, thereby reducing the number of inputs needed to perform an operation.

In some embodiments, in accordance with a determination that the user input (e.g., 1450*d*) is of a third type (1530) (e.g., the user input includes a first component that includes a sustained contact on the display generation component followed by a second component that includes movement of the sustained contact from a first position corresponding to the first region on the display generation component toward a second position corresponding to a second region, different from the first region, on the display generation component), where the user input (e.g., 1450*d*) of the third type includes a request to move the second accessory user interface object (e.g., 612*a*-612*c*, 1400*a*-1400*d*, and/or 1402*a*-1402*c*) from the first region (e.g., 612, 1400, and/or 1402) to a third region (e.g., 612, 1400, and/or 1402) (e.g., a third display area occupying a third portion of the user interface of the application and including one or more fourth accessory user interface objects corresponding to one or more fourth accessories associated with a third context, different from the first context), different from the first region (e.g., 612, 1400, and/or 1402), the computer system (e.g., 100, 300, 500, and/or 600) maintains (1532) display of the one or more first accessory user interface objects (e.g., 612*a*-612*c*, 1400*a*-1400*d*, and/or 1402*a*-1402*c*) in the first arrangement (e.g., maintaining display of the second accessory user interface object in the first region, forgoing displaying the one or more first accessory user interface objects in the second arrangement, different from the first arrangement, and/or forgoing displaying the second accessory user interface object in the third region) and the computer system (e.g., 100, 300, 500, and/or 600) maintains (1534) display of the second accessory user interface object (e.g., 612*a*-612*c*, 1400*a*-1400*d*, and/or 1402*a*-1402*c*) at the first size (e.g., 1408*a* and/or 1408*b*) (e.g., forgoing displaying the second accessory user interface object at the second size).

Maintaining display of the one or more first accessory user interface objects in the first arrangement and maintaining display of the second accessory user interface object at the first size when the user input is of a third type prevents the user of the computer system from inadvertently positioning a user interface object in a region in which the user interface object is not associated, thereby providing improved visual feedback.

In some embodiments, while detecting the user input (e.g., 1450*d*) of the third type, the computer system (e.g., 100, 300, 500, and/or 600) displays (1536), via the display generation component (e.g., 602), movement (e.g., temporary movement) of the second accessory user interface object (e.g., 612*a*-612*c*, 1400*a*-1400*d*, and/or 1402*a*-1402*c*) from the first region (e.g., 612, 1400, and/or 1402) toward the third region (e.g., 612, 1400, and/or 1402) (e.g., the computer system displays the second accessory user interface object moving toward the third region but does not display the second accessory user interface object in the third region). In response to detecting an end of the user input (e.g., 1450*d*) of the third type, the computer system (e.g., 100, 300, 500, and/or 600) displays (1538), via the display generation component (e.g., 602), movement of second accessory user interface object (e.g., 612*a*-612*c*, 1400*a*-1400*d*, and/or 1402*a*-1402*c*) from the third region (e.g., 612, 1400, and/or 1402) toward the first region (e.g., 612, 1400, and/or 1402) (e.g., the computer system displays the second accessory user interface object bouncing back and/or moving back toward an original position of the second accessory user interface object within the first region that the second accessory user interface object was displayed at prior to detecting the user input of the third type). In some embodiments, the computer system displays the second accessory user interface object as being overlaid on and/or hovering over the third region without displaying the second accessory user interface object in the third region and/or rearranging accessory user interface objects of the third region.

Displaying movement of the second accessory user interface object from the third region toward the first region in response to detecting an end of the user input of the third type provides visual confirmation that the second accessory user interface object cannot be moved to and/or displayed in the third region, thereby providing improved visual feedback.

In some embodiments, displaying the second accessory user interface object (e.g., 612*a*-612*c*, 1400*a*-1400*d*, and/or 1402*a*-1402*c*) with the second size (e.g., 1408*a* and/or 1408*b*), different from the first size (e.g., 1408*a* and/or 1408*b*), includes changing a size of the first region (e.g., 612, 1400, and/or 1402) (e.g., changing a size of the first region from a third size to a fourth size, where a change in the size of the first region is proportional to the change in size of the second accessory user interface object). Changing the size of the first region when the second accessory user interface is displayed with the second size provides further visual confirmation that the size of the second accessory user interface object changed, thereby providing improved visual feedback.

In some embodiments, the user interface (e.g., 604) of the application includes a fourth region (e.g., 672) (e.g., a fourth display area occupying a fourth portion of the user interface of the application) including one or more fourth accessory user interface objects (e.g., 672*a*-672*d*) (e.g., affordances and/or selectable objects corresponding to respective accessories that, when selected, enable the computer system to cause a respective accessory to change states (e.g., transition between an on state and an off state, a locked state and an unlocked state, and/or an open state and a closed state)), the one or more fourth accessory user interface objects (e.g., 672*a*-672*d*) correspond to one or more fourth accessories (e.g., a fourth subset of accessories of the plurality of accessories) that include a first designation (e.g., a designation assigned to the one or more fourth accessories by the computer system in response to the computer system receiving one or more user inputs requesting to designate the accessories with the first designation (e.g., a favorites and/or frequently used designation)), the one or more fourth accessory user interface objects (e.g., 672*a*-672*d*) include room indicators (e.g., 678) (e.g., textual and/or visual indicators that identify a room with which an accessory corresponding to the respective one or more fourth accessor user interface object is associated (e.g., programmatically mapped to)) that provide a visual indication of a room (e.g., a physical room, area, section, and/or portion of a structure and/or building) of a location (e.g., a structure and/or building) for which a respective fourth accessory is associated (e.g., the room indicators identify the room in which the accessory corresponding to the accessory user interface object has been associated with and/or programmatically mapped to), and the one or more first accessory user interface objects (e.g., 612*a*-612*c*, 1400*a*-1400*d*, and/or 1402*a*-1402*c*) do not include the room indicators (e.g., 678) (e.g., the first region corresponds to a first room of the location, and thus, each of the accessories corresponding to the respective one or more first accessory user interface objects is associated with the first room).

Displaying the room indicators on the one or more fourth accessory user interface objects allows a user to quickly determine and/or identify a location and/or an accessory associated with a respective fourth accessory user interface object, thereby providing improved visual feedback.

In some embodiments, displaying the second accessory user interface object (e.g., 612*a*-612*c*, 1400*a*-1400*d*, and/or 1402*a*-1402*c*) with the second size (e.g., 1408*a* and/or 1408*b*), different from the first size (e.g., 1408*a* and/or 1408*b*), includes the computer system (e.g., 100, 300, 500, and/or 600) maintaining display of the one or more first accessory user interface objects (e.g., 612*a*-612*c*, 1400*a*-1400*d*, and/or 1402*a*-1402*c*) in the first arrangement (e.g., maintaining the respective positions of the one or more first accessory user interface objects with respect to one another). Maintaining display of the one or more first accessory user interface objects in the first arrangement when the second accessory user interface object is displayed with the second size allows the computer system to maintain the arrangement of the one or more first accessory user interface objects, which may have become familiar to the user of the computer system and allows the user of the computer system to quickly locate and/or find a desired accessory user interface object, thereby reducing a number of inputs needed to perform an operation.

In some embodiments, while displaying the user interface (e.g., 604) of the application and while the computer system (e.g., 100, 300, 500, and/or 600) is in the editing mode of operation (e.g., a mode of operation shown at FIGS. 14C-14I), the computer system (e.g., 100, 300, 500, and/or 600) displays (1540), via the display generation component (e.g., 602), a resize user interface object (e.g., 1414) (e.g., a selectable user interface object and/or an affordance that is displayed on and/or adjacent to the second accessory user interface object) that visually indicates (e.g., includes text, an image, an icon, and/or a symbol, such as arrows pointing toward one another and/or arrows pointing away from one another) that the user input (e.g., 1450*f*) of the second type (e.g., a tap gesture on the resize user interface object) causes the computer system (e.g., 100, 300, 500, and/or 600) to display the second accessory user interface object (e.g., 612*a*-612*c*, 1400*a*-1400*d*, and/or 1402*a*-1402*c*) with the second size (e.g., 1408*a* and/or 1408*b*), different from the first size (e.g., 1408*a* and/or 1408*b*). In some embodiments, the computer system displays the resize user interface object in response to detecting a tap gesture on the resize user interface object when the computer system is in the editing mode of operation. Displaying the resize user interface object allows the user of the computer system to quickly determine and/or confirm that the user input of the second type causes the second accessory user interface object to be displayed at the second size, thereby reducing providing improved visual feedback.

In some embodiments, while displaying the second accessory user interface object (e.g., 612*a*-612*c*, 1400*a*-1400*d*, and/or 1402*a*-1402*c*) with the first size (e.g., 1408*a* and/or 1408*b*) and while the computer system is in the editing mode of operation (e.g., a mode of operation shown at FIGS. 14C-14I), the computer system (e.g., 100, 300, 500, and/or 600) displays (1542), via the display generation component (e.g., 602), the resize user interface object (e.g., 1414) with a first appearance (e.g., 1414*a* and/or 1414*b*) (e.g., a first color, a first brightness, a first size, having first text, and/or having a first symbol). While displaying the second accessory user interface object (e.g., 612*a*-612*c*, 1400*a*-1400*d*, and/or 1402*a*-1402*c*) with the second size (e.g., 1408*a* and/or 1408*b*), different from the first size (e.g., 1408*a* and/or 1408*b*), and while the computer system is in the editing mode of operation (e.g., a mode of operation shown at FIGS. 14C-14I), the computer system (e.g., 100, 300, 500, and/or 600) displays (1544), via the display generation component (e.g., 602), the resize user interface object (e.g., 1414) with a second appearance (e.g., 1414*a* and/or 1414*b*) (e.g., a second color, a second brightness, a second size, having second text, and/or having a second symbol), different from the first appearance (e.g., 1414*a* and/or 1414*b*). Displaying the resize user interface object with the second appearance while displaying the second accessory user interface object at the second size allows the user of the computer system to quickly determine that additional user input selecting the resize user interface object will cause the second accessory user interface object to be displayed at the first size, thereby reducing providing improved visual feedback.

In some embodiments, the second accessory user interface object (e.g., 612*a*-612*c*, 1400*a*-1400*d*, and/or 1402*a*-1402*c*) includes a first amount of content (e.g., 1416 and/or 1418) (e.g., a first amount of information, such as text, images, symbols, and/or icons) when displayed at the first size (e.g., 1408*a* and/or 1408*b*), and the second accessory user interface object (e.g., 612*a*-612*c*, 1400*a*-1400*d*, and/or 1402*a*-1402*c*) includes a second amount of content (e.g., 1416 and/or 1418) (e.g., a second amount of information, such as text, images, symbols, and/or icons), different from the first amount of content (e.g., 1416 and/or 1418), when displayed at the second size (e.g., 1408*a* and/or 1408*b*), different from the first size (e.g., 1408*a* and/or 1408*b*). In some embodiments, the second accessory user interface object includes more content and/or information when the second accessory user interface is displayed at a larger size and includes less content and/or information when displayed at a smaller size. Displaying the second accessory user interface object with a first amount of content when displayed at a first size and displaying the second accessory user interface object with a second amount of content when displayed at a second size provides relevant information to the user about an accessory that corresponds to the second accessory user interface object, thereby reducing providing improved visual feedback.

Note that details of the processes described above with respect to method 1500 (e.g., FIGS. 15A-15D) are also applicable in an analogous manner to the methods described above. For example, method 700, 900, 1100, and/or 1300 optionally include one or more of the characteristics of the various methods described above with reference to method 1500. For example, computer systems that perform methods 700, 900, 1100, and/or 1300 can display the first region in different arrangements and/or display the second accessory user interface object at different sizes. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to display control user interface objects that are relevant to a user. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to display relevant control user interface objects. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying relevant control user interface objects, the present technology can be configured to allow users to select to "opt in" or "opt out" of participation in the collection of personal information data during registration for services or anytime thereafter. In another example, users can select not to suggest control user interface objects based on usage history and/or location information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, control user interface objects can be displayed to users by inferring preferences based on non-personal information data or a bare minimum amount of personal information, such as the content being requested by the device associated with a user, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

while displaying, via the display generation component, a user interface associated with a home automation system, the user interface including a first selectable category option of a plurality of selectable category options that correspond to respective contexts of the home automation system and a second selectable category option of the plurality of selectable category options, detecting, via the one or more input devices, user input corresponding to selection of the first selectable category option of the plurality of selectable category options, wherein the first selectable category option of the plurality of selectable category options corresponds to a first context of the home automation system, and wherein the first selectable category option includes a first appearance; and in response to detecting the user input corresponding to selection of the first selectable category option of the plurality of selectable category options, displaying, via the display generation component:

the first selectable category option of the plurality of selectable category options;

the second selectable category option of the plurality of selectable category options;

a first accessory user interface object on the user interface, wherein the first accessory user interface object corresponds to a first accessory of the home automation system that is associated with the first context of the first selectable category option;

a second accessory user interface object on the user interface, wherein the second accessory user interface object corresponds to a second accessory of the home automation system that is associated with the first context of the first selectable category option; and a first selectable sub-category option corresponding to a sub-category of a category associated with the first selectable category option, wherein the first selectable sub-category option includes a status indication related to one or more accessories of the home automation system that are associated with the sub-category, and wherein the first selectable sub-category option includes a second appearance that is different from the first appearance.

2. The computer system of claim 1, wherein the one or more programs further include instructions for:

in response to detecting the user input corresponding to selection of the first selectable category option of the plurality of selectable category options, displaying, via the display generation component, a plurality of accessory user interface objects on the user interface, wherein the plurality of accessory user interface objects includes the first accessory user interface object and the second accessory user interface object, and wherein the plurality of accessory user interface objects corresponds to all accessories of the home automation system that are associated with the first context of the first selectable category option.

3. The computer system of claim 1, wherein the one or more programs further include instructions for:

while displaying, via the display generation component, the first accessory user interface object, the second accessory user interface object, and the first selectable sub-category option, detecting, via the one or more input devices, second user input corresponding to selection of the first accessory user interface object; and in response to detecting the second user input corresponding to selection of the first accessory user interface object, displaying, via the display generation component, a second user interface for controlling the first accessory.

4. The computer system of claim 3, wherein the second user interface for controlling the first accessory includes a status user interface object that, when selected, causes the computer system to adjust whether or not information associated with the first accessory is included in a status displayed on the first selectable category option.

5. The computer system of claim 1, wherein the one or more programs further include instructions for:

while displaying, via the display generation component, the first accessory user interface object, the second accessory user interface object, and the first selectable sub-category option, detecting, via the one or more input devices, third user input corresponding to selection of the first accessory user interface object; and in response to detecting the third user input corresponding to selection of the first accessory user interface object:

in accordance with a determination that the third user input corresponds to a first portion of the first accessory user interface object, adjusting an operating state of the first accessory from a first state to a second state; and in accordance with a determination that the third user input corresponds to a second portion of the first accessory user interface object, different from the first portion, displaying, via the display generation component, a third user interface for controlling the first accessory.

6. The computer system of claim 1, wherein the one or more programs further include instructions for:

while displaying, via the display generation component, the first accessory user interface object, the second accessory user interface object, and the first selectable sub-category option, detecting, via the one or more input devices, fourth user input corresponding to selection of the first selectable sub-category option; and in response to detecting the fourth user input corresponding to selection of the first selectable sub-category option, displaying, via the display generation component:

a third accessory user interface object corresponding to a third accessory of the home automation system that contributes to the status indication of the first selectable sub-category option; and a fourth accessory user interface object corresponding to a fourth accessory of the home automation system that contributes to the status indication of the first selectable sub-category option.

7. The computer system of claim 6, wherein the one or more programs further include instructions for:

while displaying, via the display generation component, the third accessory user interface object and the fourth accessory user interface object, detecting, via the one or more input devices, fifth user input corresponding to selection of the third accessory user interface object; and in response to detecting the fifth user input corresponding to selection of the third accessory user interface object, displaying, via the display generation component, a fourth user interface for controlling the third accessory of the home automation system that contributes to the status indication of the first selectable sub-category option.

8. The computer system of claim 6, wherein the one or more programs further include instructions for:

while displaying, via the display generation component the third accessory user interface object and the fourth accessory user interface object, detecting, via the one or more input devices, sixth user input corresponding to selection of the third accessory user interface object; and in response to detecting the sixth user input corresponding to selection of the third accessory user interface object, displaying, via the display generation component, a status user interface object that, when selected, causes the computer system to cease including the third accessory of the home automation system as a contributor to the status indication of the first selectable sub-category option.

9. The computer system of claim 6, wherein the one or more programs further include instructions for:

in response to detecting the fourth user input corresponding to selection of the first selectable sub-category option:

in accordance with a determination that a fifth accessory of the home automation system satisfies a set of one or more contribution criteria, displaying, via the display generation component, a fifth accessory user interface object that corresponds to the fifth accessory of the home automation system; and in accordance with a determination that the fifth accessory of the home automation system does not satisfy the set of one or more contribution criteria, forgoing display of the fifth accessory user interface object that corresponds to the fifth accessory of the home automation system.

10. The computer system of claim 1, wherein displaying the user interface includes:

in accordance with a determination that a set of one or more status criteria is met, displaying, via the display generation component, the first selectable category option of the plurality of selectable category options with a status indicator; and in accordance with a determination that the set of one or more status criteria is not met, displaying the first selectable category option of the plurality of selectable category options without the status indicator.

11. The computer system of claim 10, wherein the set of one or more status criteria includes a criterion that is met when a sixth accessory of the home automation system that is associated with the first context of the first selectable category option is in an active state.

12. The computer system of claim 1, wherein the one or more programs further include instructions for:

displaying, via the display generation component, the first selectable category option with a first status indicator corresponding to a first status of the category associated with the first selectable category option, wherein the first status includes a first priority; and in response to receiving an indication about a change in status of the category associated with the first selectable category option:

in accordance with a determination that the change in status is indicative of a second status of the category associated with the first selectable category option that includes a second priority, greater than or equal to the first priority, displaying, via the display generation component, the first selectable category option with a second status indicator corresponding to the second status; and in accordance with a determination that the change in status is indicative of a third status of the category associated with the first selectable category option that includes a third priority, lower than the first priority, maintaining display of the first selectable category option with the first status indicator corresponding to the first status.

13. The computer system of claim 1, wherein the user input is of a first type, and wherein the one or more programs further include instructions for:

in response to detecting, via the one or more input devices, seventh user input of a second type, different from the first type, corresponding to selection of the first selectable category option of the plurality of selectable category options, displaying, via the display generation component, a first selectable option that, when selected, causes one or more accessories of the home automation system that are associated with the first context of the first selectable category option to perform a predetermined action.

14. The computer system of claim 13, wherein the one or more programs further include instructions for:

in response to detecting the seventh user input of the second type, different from the first type, corresponding to selection of the first selectable category option of the plurality of selectable category options, displaying, via the display generation component, a second selectable option that, when selected, causes the computer system to display a third user interface that includes one or more accessory user interface objects corresponding to the one or more accessories of the home automation system that are associated with the first context of the first selectable category option.

15. The computer system of claim 1, wherein the first appearance of the first selectable category option is associated with the first context of the home automation system and the second selectable category option of the plurality of selectable category options includes a third appearance, different from the first appearance, associated with a second context of the home automation system.

16. The computer system of claim 1, wherein the user interface includes a first notification associated with the home automation system.

17. The computer system of claim 16, wherein the first notification corresponds to a first event of a first type, and wherein the one or more programs further include instructions for:

in response to receiving an indication about a second event of a second type, different from the first type:

in accordance with a determination that the second event of the second type is associated with a lower priority than the first event of the first type, forgoing display of a second notification corresponding to the second event of the second type.

18. The computer system of claim 16, wherein the first notification corresponds to a first event of a first type, and wherein the one or more programs further include instructions for:

in response to receiving an indication about a third event of the first type, displaying, via the display generation component, and concurrently with the first notification, a third notification corresponding to the third event of the first type.

19. The computer system of claim 1, wherein the one or more programs further include instructions for:

in response to detecting the user input corresponding to selection of the first selectable category option of the plurality of selectable category options, displaying, via the display generation component, a first camera view user interface object associated with a first camera that is associated with the first context of the first selectable category option.

20. A non-transitory computer-readable storage medium storing one or more programs configured to be executed by one or more processors of a computer system that is in communication with a display generation component and one or more input devices, the one or more programs including instructions for:

while displaying, via the display generation component, a user interface associated with a home automation system, the user interface including a first selectable category option of a plurality of selectable category options that correspond to respective contexts of the home automation system and a second selectable category option of the plurality of selectable category options, detecting, via the one or more input devices, user input corresponding to selection of the first selectable category option of the plurality of selectable category options, wherein the first selectable category option of the plurality of selectable category options corresponds to a first context of the home automation system, wherein the first selectable category option includes a first appearance; and in response to detecting the user input corresponding to selection of the first selectable category option of the plurality of selectable category options, displaying, via the display generation component:

the first selectable category option of the plurality of selectable category options;

the second selectable category option of the plurality of selectable category options;

a first accessory user interface object on the user interface, wherein the first accessory user interface object corresponds to a first accessory of the home automation system that is associated with the first context of the first selectable category option;

a second accessory user interface object on the user interface, wherein the second accessory user interface object corresponds to a second accessory of the home automation system that is associated with the first context of the first selectable category option; and a first selectable sub-category option corresponding to a sub-category of a category associated with the first selectable category option, wherein the first selectable sub-category option includes a status indication related to one or more accessories of the home automation system that are associated with the sub-category, and wherein the first selectable sub-category option includes a second appearance that is different from the first appearance.

21. A method, comprising:

at a computer system that is in communication with a display generation component and one or more input devices:

while displaying, via the display generation component, a user interface associated with a home automation system, the user interface including a first selectable category option of a plurality of selectable category options that correspond to respective contexts of the home automation system and a second selectable category option of the plurality of selectable category options, detecting, via the one or more input devices, user input corresponding to selection of the first selectable category option of the plurality of selectable category options, wherein the first selectable category option of the plurality of selectable category options corresponds to a first context of the home automation system, and wherein the first selectable category option includes a first appearance; and in response to detecting the user input corresponding to selection of the first selectable category option of the plurality of selectable category options, displaying, via the display generation component:

the first selectable category option of the plurality of selectable category options;

the second selectable category option of the plurality of selectable category options;

a first accessory user interface object on the user interface, wherein the first accessory user interface object corresponds to a first accessory of the home automation system that is associated with the first context of the first selectable category option;

a second accessory user interface object on the user interface, wherein the second accessory user interface object corresponds to a second accessory of the home automation system that is associated with the first context of the first selectable category option; and a first selectable sub-category option corresponding to a sub-category of a category associated with the first selectable category option, wherein the first selectable sub-category option includes a status indication related to one or more accessories of the home automation system that are associated with the sub-category, and wherein the first selectable sub-category option includes a second appearance that is different from the first appearance.

22. The non-transitory computer-readable storage medium of claim 20, wherein the one or more programs further include instructions for:

in response to detecting the user input corresponding to selection of the first selectable category option of the plurality of selectable category options, displaying, via the display generation component, a plurality of accessory user interface objects on the user interface, wherein the plurality of accessory user interface objects includes the first accessory user interface object and the second accessory user interface object, and wherein the plurality of accessory user interface objects corresponds to all accessories of the home automation system that are associated with the first context of the first selectable category option.

23. The non-transitory computer-readable storage medium of claim 20, wherein the one or more programs further include instructions for:

while displaying, via the display generation component, the first accessory user interface object, the second accessory user interface object, and the first selectable sub-category option, detecting, via the one or more input devices, second user input corresponding to selection of the first accessory user interface object; and in response to detecting the second user input corresponding to selection of the first accessory user interface object, displaying, via the display generation component, a second user interface for controlling the first accessory.

24. The non-transitory computer-readable storage medium of claim 23, wherein the second user interface for controlling the first accessory includes a status user interface object that, when selected, causes the computer system to adjust whether or not information associated with the first accessory is included in a status displayed on the first selectable category option.

25. The non-transitory computer-readable storage medium of claim 20, wherein the one or more programs further include instructions for:

while displaying, via the display generation component, the first accessory user interface object, the second accessory user interface object, and the first selectable sub-category option, detecting, via the one or more input devices, third user input corresponding to selection of the first accessory user interface object; and in response to detecting the third user input corresponding to selection of the first accessory user interface object:

in accordance with a determination that the third user input corresponds to a first portion of the first accessory user interface object, adjusting an operating state of the first accessory from a first state to a second state; and in accordance with a determination that the third user input corresponds to a second portion of the first accessory user interface object, different from the first portion, displaying, via the display generation component, a third user interface for controlling the first accessory.

26. The non-transitory computer-readable storage medium of claim 20, wherein the one or more programs further include instructions for:

while displaying, via the display generation component, the first accessory user interface object, the second accessory user interface object, and the first selectable sub-category option, detecting, via the one or more input devices, fourth user input corresponding to selection of the first selectable sub-category option; and in response to detecting the fourth user input corresponding to selection of the first selectable sub-category option, displaying, via the display generation component:

a third accessory user interface object corresponding to a third accessory of the home automation system that contributes to the status indication of the first selectable sub-category option; and a fourth accessory user interface object corresponding to a fourth accessory of the home automation system that contributes to the status indication of the first selectable sub-category option.

27. The non-transitory computer-readable storage medium of claim 26, wherein the one or more programs further include instructions for:

while displaying, via the display generation component, the third accessory user interface object and the fourth accessory user interface object, detecting, via the one or more input devices, fifth user input corresponding to selection of the third accessory user interface object; and in response to detecting the fifth user input corresponding to selection of the third accessory user interface object, displaying, via the display generation component, a fourth user interface for controlling the third accessory of the home automation system that contributes to the status indication of the first selectable sub-category option.

28. The non-transitory computer-readable storage medium of claim 26, wherein the one or more programs further include instructions for:

while displaying, via the display generation component the third accessory user interface object and the fourth accessory user interface object, detecting, via the one or more input devices, sixth user input corresponding to selection of the third accessory user interface object; and in response to detecting the sixth user input corresponding to selection of the third accessory user interface object, displaying, via the display generation component, a status user interface object that, when selected, causes the computer system to cease including the third accessory of the home automation system as a contributor to the status indication of the first selectable sub-category option.

29. The non-transitory computer-readable storage medium of claim 26, wherein the one or more programs further include instructions for:

in response to detecting the fourth user input corresponding to selection of the first selectable sub-category option:

in accordance with a determination that a fifth accessory of the home automation system satisfies a set of one or more contribution criteria, displaying, via the display generation component, a fifth accessory user interface object that corresponds to the fifth accessory of the home automation system; and in accordance with a determination that the fifth accessory of the home automation system does not satisfy the set of one or more contribution criteria, forgoing display of the fifth accessory user interface object that corresponds to the fifth accessory of the home automation system.

30. The non-transitory computer-readable storage medium of claim 20, wherein displaying the user interface includes:

in accordance with a determination that a set of one or more status criteria is met, displaying, via the display generation component, the first selectable category option of the plurality of selectable category options with a status indicator; and in accordance with a determination that the set of one or more status criteria is not met, displaying the first selectable category option of the plurality of selectable category options without the status indicator.

31. The non-transitory computer-readable storage medium of claim 30, wherein the set of one or more status criteria includes a criterion that is met when a sixth accessory of the home automation system that is associated with the first context of the first selectable category option is in an active state.

32. The non-transitory computer-readable storage medium of claim 20, wherein the one or more programs further include instructions for:

displaying, via the display generation component, the first selectable category option with a first status indicator corresponding to a first status of the category associated with the first selectable category option, wherein the first status includes a first priority; and in response to receiving an indication about a change in status of the category associated with the first selectable category option:

in accordance with a determination that the change in status is indicative of a second status of the category associated with the first selectable category option that includes a second priority, greater than or equal to the first priority, displaying, via the display generation component, the first selectable category option with a second status indicator corresponding to the second status; and in accordance with a determination that the change in status is indicative of a third status of the category associated with the first selectable category option that includes a third priority, lower than the first priority, maintaining display of the first selectable category option with the first status indicator corresponding to the first status.

33. The non-transitory computer-readable storage medium of claim 20, wherein the user input is of a first type, and wherein the one or more programs further include instructions for:

in response to detecting, via the one or more input devices, seventh user input of a second type, different from the first type, corresponding to selection of the first selectable category option of the plurality of selectable category options, displaying, via the display generation component, a first selectable option that, when selected, causes one or more accessories of the home automation system that are associated with the first context of the first selectable category option to perform a predetermined action.

34. The non-transitory computer-readable storage medium of claim 33, wherein the one or more programs further include instructions for:

in response to detecting the seventh user input of the second type, different from the first type, corresponding to selection of the first selectable category option of the plurality of selectable category options, displaying, via the display generation component, a second selectable option that, when selected, causes the computer system to display a third user interface that includes one or more accessory user interface objects corresponding to the one or more accessories of the home automation system that are associated with the first context of the first selectable category option.

35. The non-transitory computer-readable storage medium of claim 20, wherein the first appearance of the first selectable category option is associated with the first context of the home automation system and the second selectable category option of the plurality of selectable category options includes a third appearance, different from the first appearance, associated with a second context of the home automation system.

36. The non-transitory computer-readable storage medium of claim 20, wherein the user interface includes a first notification associated with the home automation system.

37. The non-transitory computer-readable storage medium of claim 36, wherein the first notification corresponds to a first event of a first type, and wherein the one or more programs further include instructions for:

in response to receiving an indication about a second event of a second type, different from the first type:

in accordance with a determination that the second event of the second type is associated with a lower priority than the first event of the first type, forgoing display of a second notification corresponding to the second event of the second type.

38. The non-transitory computer-readable storage medium of claim 36, wherein the first notification corresponds to a first event of a first type, and wherein the one or more programs further include instructions for:

in response to receiving an indication about a third event of the first type, displaying, via the display generation component, and concurrently with the first notification, a third notification corresponding to the third event of the first type.

39. The non-transitory computer-readable storage medium of claim 20, wherein the one or more programs further include instructions for:

in response to detecting the user input corresponding to selection of the first selectable category option of the plurality of selectable category options, displaying, via the display generation component, a first camera view user interface object associated with a first camera that is associated with the first context of the first selectable category option.

40. The method of claim 21, further comprising:

in response to detecting the user input corresponding to selection of the first selectable category option of the plurality of selectable category options, displaying, via the display generation component, a plurality of accessory user interface objects on the user interface, wherein the plurality of accessory user interface objects includes the first accessory user interface object and the second accessory user interface object, and wherein the plurality of accessory user interface objects corresponds to all accessories of the home automation system that are associated with the first context of the first selectable category option.

41. The method of claim 21, further comprising:

while displaying, via the display generation component, the first accessory user interface object, the second accessory user interface object, and the first selectable sub-category option, detecting, via the one or more input devices, second user input corresponding to selection of the first accessory user interface object; and in response to detecting the second user input corresponding to selection of the first accessory user interface object, displaying, via the display generation component, a second user interface for controlling the first accessory.

42. The method of claim 41, wherein the second user interface for controlling the first accessory includes a status user interface object that, when selected, causes the computer system to adjust whether or not information associated with the first accessory is included in a status displayed on the first selectable category option.

43. The method of claim 21, further comprising:

while displaying, via the display generation component, the first accessory user interface object, the second accessory user interface object, and the first selectable sub-category option, detecting, via the one or more input devices, third user input corresponding to selection of the first accessory user interface object; and in response to detecting the third user input corresponding to selection of the first accessory user interface object:

in accordance with a determination that the third user input corresponds to a first portion of the first accessory user interface object, adjusting an operating state of the first accessory from a first state to a second state; and in accordance with a determination that the third user input corresponds to a second portion of the first accessory user interface object, different from the first portion, displaying, via the display generation component, a third user interface for controlling the first accessory.

44. The method of claim 21, further comprising:

while displaying, via the display generation component, the first accessory user interface object, the second accessory user interface object, and the first selectable sub-category option, detecting, via the one or more input devices, fourth user input corresponding to selection of the first selectable sub-category option; and in response to detecting the fourth user input corresponding to selection of the first selectable sub-category option, displaying, via the display generation component:

a third accessory user interface object corresponding to a third accessory of the home automation system that contributes to the status indication of the first selectable sub-category option; and a fourth accessory user interface object corresponding to a fourth accessory of the home automation system that contributes to the status indication of the first selectable sub-category option.

45. The method of claim 44, further comprising:

while displaying, via the display generation component, the third accessory user interface object and the fourth accessory user interface object, detecting, via the one or more input devices, fifth user input corresponding to selection of the third accessory user interface object; and in response to detecting the fifth user input corresponding to selection of the third accessory user interface object, displaying, via the display generation component, a fourth user interface for controlling the third accessory of the home automation system that contributes to the status indication of the first selectable sub-category option.

46. The method of claim 44, further comprising:

while displaying, via the display generation component the third accessory user interface object and the fourth accessory user interface object, detecting, via the one or more input devices, sixth user input corresponding to selection of the third accessory user interface object; and in response to detecting the sixth user input corresponding to selection of the third accessory user interface object, displaying, via the display generation component, a status user interface object that, when selected, causes the computer system to cease including the third accessory of the home automation system as a contributor to the status indication of the first selectable sub-category option.

47. The method of claim 44, further comprising:

in response to detecting the fourth user input corresponding to selection of the first selectable sub-category option:

in accordance with a determination that a fifth accessory of the home automation system satisfies a set of one or more contribution criteria, displaying, via the display generation component, a fifth accessory user interface object that corresponds to the fifth accessory of the home automation system; and in accordance with a determination that the fifth accessory of the home automation system does not satisfy the set of one or more contribution criteria, forgoing display of the fifth accessory user interface object that corresponds to the fifth accessory of the home automation system.

48. The method of claim 21, wherein displaying the user interface includes:

in accordance with a determination that a set of one or more status criteria is met, displaying, via the display generation component, the first selectable category option of the plurality of selectable category options with a status indicator; and in accordance with a determination that the set of one or more status criteria is not met, displaying the first selectable category option of the plurality of selectable category options without the status indicator.

49. The method of claim 48, wherein the set of one or more status criteria includes a criterion that is met when a sixth accessory of the home automation system that is associated with the first context of the first selectable category option is in an active state.

50. The method of claim 21, further comprising:

displaying, via the display generation component, the first selectable category option with a first status indicator corresponding to a first status of the category associated with the first selectable category option, wherein the first status includes a first priority; and in response to receiving an indication about a change in status of the category associated with the first selectable category option:

in accordance with a determination that the change in status is indicative of a second status of the category associated with the first selectable category option that includes a second priority, greater than or equal to the first priority, displaying, via the display generation component, the first selectable category option with a second status indicator corresponding to the second status; and in accordance with a determination that the change in status is indicative of a third status of the category associated with the first selectable category option that includes a third priority, lower than the first priority, maintaining display of the first selectable category option with the first status indicator corresponding to the first status.

51. The method of claim 21, wherein the user input is of a first type, the method further comprising:

in response to detecting, via the one or more input devices, seventh user input of a second type, different from the first type, corresponding to selection of the first selectable category option of the plurality of selectable category options, displaying, via the display generation component, a first selectable option that, when selected, causes one or more accessories of the home automation system that are associated with the first context of the first selectable category option to perform a predetermined action.

52. The method of claim 51, further comprising:

in response to detecting the seventh user input of the second type, different from the first type, corresponding to selection of the first selectable category option of the plurality of selectable category options, displaying, via the display generation component, a second selectable option that, when selected, causes the computer system to display a third user interface that includes one or more accessory user interface objects corresponding to the one or more accessories of the home automation system that are associated with the first context of the first selectable category option.

53. The method of claim 21, wherein the first appearance of the first selectable category option is associated with the first context of the home automation system and the second selectable category option of the plurality of selectable category options includes a third appearance, different from the first appearance, associated with a second context of the home automation system.

54. The method of claim 21, wherein the user interface includes a first notification associated with the home automation system.

55. The method of claim 54, wherein the first notification corresponds to a first event of a first type, the method further comprising:

in response to receiving an indication about a second event of a second type, different from the first type:

in accordance with a determination that the second event of the second type is associated with a lower priority than the first event of the first type, forgoing display of a second notification corresponding to the second event of the second type.

56. The method of claim 54, wherein the first notification corresponds to a first event of a first type, the method further comprising:

in response to receiving an indication about a third event of the first type, displaying, via the display generation component, and concurrently with the first notification, a third notification corresponding to the third event of the first type.

57. The method of claim 21, further comprising:

in response to detecting the user input corresponding to selection of the first selectable category option of the plurality of selectable category options, displaying, via the display generation component, a first camera view user interface object associated with a first camera that is associated with the first context of the first selectable category option.

* * * * *